US008671041B2

(12) United States Patent
Haaf et al.

(10) Patent No.: US 8,671,041 B2
(45) **Date of Patent: *Mar. 11, 2014**

(54) MANAGING CONSISTENT INTERFACES FOR CREDIT PORTFOLIO BUSINESS OBJECTS ACROSS HETEROGENEOUS SYSTEMS

(75) Inventors: Hermann Haaf, Heidelberg (DE); Markus Kahn, Walldorf (DE); Oliver Klueglich, Walldorf (DE); Dirk Vogel, Bensheim (DE); Manfred Wanninger, Bad Schoenborn (DE)

(73) Assignee: SAP AG, Walldorf (DE)

( * ) Notice: Subject to any disclaimer, the term of this patent is extended or adjusted under 35 U.S.C. 154(b) by 66 days.

This patent is subject to a terminal disclaimer.

(21) Appl. No.: 13/349,477

(22) Filed: Jan. 12, 2012

(65) Prior Publication Data

US 2012/0117000 A1 May 10, 2012

Related U.S. Application Data

(63) Continuation of application No. 12/334,175, filed on Dec. 12, 2008, now abandoned.

(51) Int. Cl.
*G06Q 40/00* (2012.01)

(52) U.S. Cl.
USPC .................................. 705/35; 705/39; 705/40

(58) Field of Classification Search
USPC ..................................................... 705/35–45
See application file for complete search history.

(56) References Cited

U.S. PATENT DOCUMENTS 3,223,321 A 12/1965 Baumgartner
5,126,936 A 6/1992 Champion et al.
5,210,686 A 5/1993 Jernigan
5,247,575 A 9/1993 Sprague et al.
5,255,181 A 10/1993 Chapman et al.
5,321,605 A 6/1994 Chapman et al.
5,463,555 A 10/1995 Ward et al.
5,627,764 A 5/1997 Schutzman et al.
5,717,925 A 2/1998 Harper et al.

(Continued)

FOREIGN PATENT DOCUMENTS

CN 1501296 6/2004
CN 1609866 4/2005

(Continued)

OTHER PUBLICATIONS

"Integrating and customizing heterogeneous e-commerce applications" Anat Kyal, Tova Milo, Computer Science Department, Tel Aviv University, Raman Aviv, Tel Aviv 69978, Israel, Published on Aug. 2, 2001.*

(Continued)

*Primary Examiner* — Hai Tran
(74) *Attorney, Agent, or Firm* — Fish & Richardson P.C.

(57) ABSTRACT

A business object model, which reflects data that is used during a given business transaction, is utilized to generate interfaces. This business object model facilitates commercial transactions by providing consistent interfaces that are suitable for use across industries, across businesses, and across different departments within a business during a business transaction. In some operations, software creates, updates, or otherwise processes information related to a credit portfolio model, a credit portfolio analytical result, a credit portfolio management process control, a financial instrument exposure profile analytical result, and/or a material supply and demand allocation business object.

6 Claims, 520 Drawing Sheets

(56) References Cited

U.S. PATENT DOCUMENTS

| | | | | |
|---|---|---|---|---|
| 5,787,237 | A | 7/1998 | Reilly | |
| 5,812,987 | A | 9/1998 | Luskin et al. | |
| 5,966,695 | A * | 10/1999 | Melchione et al. | 705/7.33 |
| 5,970,465 | A | 10/1999 | Dietrich et al. | |
| 5,970,475 | A | 10/1999 | Barnes et al. | |
| 5,983,284 | A | 11/1999 | Argade | |
| 6,044,134 | A | 3/2000 | De La Huerga | |
| 6,047,264 | A | 4/2000 | Fisher et al. | |
| 6,058,378 | A | 5/2000 | Clark et al. | |
| 6,073,137 | A | 6/2000 | Brown et al. | |
| 6,092,196 | A | 7/2000 | Reiche | |
| 6,104,393 | A | 8/2000 | Santos-Gomez | |
| 6,115,690 | A | 9/2000 | Wong | |
| 6,125,391 | A | 9/2000 | Meltzer et al. | |
| 6,138,118 | A | 10/2000 | Koppstein et al. | |
| 6,154,732 | A | 11/2000 | Tarbox | |
| 6,222,533 | B1 | 4/2001 | Notani et al. | |
| 6,226,675 | B1 | 5/2001 | Meltzer et al. | |
| 6,229,551 | B1 | 5/2001 | Huang | |
| 6,295,548 | B1 | 9/2001 | Klein et al. | |
| 6,308,163 | B1 | 10/2001 | Du et al. | |
| 6,311,165 | B1 | 10/2001 | Coutts et al. | |
| 6,327,700 | B1 | 12/2001 | Chen et al. | |
| 6,331,972 | B1 | 12/2001 | Harris et al. | |
| 6,332,163 | B1 | 12/2001 | Bowman-Amuah | |
| 6,374,252 | B1 | 4/2002 | Althoff et al. | |
| 6,375,252 | B1 | 4/2002 | Cheron et al. | |
| 6,401,101 | B1 | 6/2002 | Britton et al. | |
| 6,424,979 | B1 | 7/2002 | Livingston et al. | |
| 6,434,159 | B1 | 8/2002 | Woodward et al. | |
| 6,438,594 | B1 | 8/2002 | Bowman-Amuah | |
| 6,442,620 | B1 | 8/2002 | Thatte et al. | |
| 6,446,136 | B1 | 9/2002 | Pohlmann et al. | |
| 6,457,041 | B1 | 9/2002 | Hutchison | |
| 6,496,825 | B1 | 12/2002 | Klein et al. | |
| 6,513,019 | B2 | 1/2003 | Lewis | |
| 6,523,027 | B1 | 2/2003 | Underwood | |
| 6,542,912 | B2 | 4/2003 | Meltzer et al. | |
| 6,591,260 | B1 | 7/2003 | Schwartzhoff et al. | |
| 6,643,660 | B1 | 11/2003 | Miller et al. | |
| 6,725,122 | B2 | 4/2004 | Mori et al. | |
| 6,738,747 | B1 | 5/2004 | Tanaka et al. | |
| 6,745,229 | B1 | 6/2004 | Gobin et al. | |
| 6,763,353 | B2 | 7/2004 | Li et al. | |
| 6,775,647 | B1 | 8/2004 | Evans et al. | |
| 6,868,370 | B1 | 3/2005 | Burbridge et al. | |
| 6,937,992 | B1 | 8/2005 | Benda et al. | |
| 6,957,230 | B2 | 10/2005 | Cameron et al. | |
| 6,970,844 | B1 | 11/2005 | Bierenbaum | |
| 7,020,594 | B1 | 3/2006 | Chacon | |
| 7,039,606 | B2 | 5/2006 | Hoffman et al. | |
| 7,055,132 | B2 | 5/2006 | Bogdan et al. | |
| 7,069,278 | B2 | 6/2006 | Telkowski | |
| 7,076,449 | B2 | 7/2006 | Tsunenari et al. | |
| 7,131,069 | B1 | 10/2006 | Rush et al. | |
| 7,206,768 | B1 | 4/2007 | deGroeve et al. | |
| 7,249,157 | B2 | 7/2007 | Stewart et al. | |
| 7,249,195 | B2 | 7/2007 | Panec et al. | |
| 7,269,569 | B2 | 9/2007 | Spira et al. | |
| 7,292,965 | B1 | 11/2007 | Mehta et al. | |
| 7,321,864 | B1 | 1/2008 | Gendler | |
| 7,363,271 | B2 | 4/2008 | Morimoto | |
| 7,379,931 | B2 | 5/2008 | Morinville | |
| 7,383,990 | B2 | 6/2008 | Veit | |
| 7,406,358 | B2 | 7/2008 | Preiss | |
| 7,426,520 | B2 | 9/2008 | Gorelik et al. | |
| 7,451,177 | B1 | 11/2008 | Johnson et al. | |
| 7,454,362 | B1 | 11/2008 | Hayes et al. | |
| 7,481,367 | B2 | 1/2009 | Fees et al. | |
| 7,509,278 | B2 | 3/2009 | Jones | |
| 7,515,697 | B2 | 4/2009 | Eng et al. | |
| 7,516,088 | B2 | 4/2009 | Johnson et al. | |
| 7,523,466 | B2 | 4/2009 | DeAngelis | |
| 7,536,697 | B2 | 5/2009 | Wiseman et al. | |
| 7,574,383 | B1 | 8/2009 | Parasnis et al. | |
| 7,617,128 | B2 | 11/2009 | Greak | |
| 7,617,328 | B2 | 11/2009 | Lewis et al. | |
| 7,627,504 | B2 | 12/2009 | Brady et al. | |
| 7,634,482 | B2 | 12/2009 | Mukherjee et al. | |
| 7,641,110 | B2 | 1/2010 | Hursta et al. | |
| 7,657,466 | B2 | 2/2010 | Klingenberg et al. | |
| 7,689,711 | B2 | 3/2010 | Brouk et al. | |
| 7,788,319 | B2 | 8/2010 | Schmidt et al. | |
| 7,797,204 | B2 | 9/2010 | Balent | |
| 7,805,383 | B2 | 9/2010 | Veit et al. | |
| 7,813,949 | B2 | 10/2010 | Grendel et al. | |
| 7,853,491 | B2 | 12/2010 | Wittmer et al. | |
| 7,865,426 | B2 | 1/2011 | Volpert | |
| 7,873,965 | B2 | 1/2011 | Hayton et al. | |
| 7,895,209 | B2 | 2/2011 | Spence et al. | |
| 7,941,236 | B2 | 5/2011 | Spearman | |
| 7,962,385 | B2 | 6/2011 | Falk et al. | |
| 8,010,376 | B2 | 8/2011 | Buchmann et al. | |
| 8,082,243 | B2 | 12/2011 | Gorelik et al. | |
| 8,104,681 | B2 | 1/2012 | Eisenson | |
| 8,127,035 | B1 | 2/2012 | Hood et al. | |
| 8,150,798 | B2 | 4/2012 | Ma et al. | |
| 8,185,430 | B2 | 5/2012 | Edwards et al. | |
| 8,219,444 | B2 | 7/2012 | Zuerl et al. | |
| 8,234,375 | B2 | 7/2012 | Ghadialy et al. | |
| 8,326,795 | B2 | 12/2012 | Markovic | |
| RE43,905 | E | 1/2013 | Bierenbaum | |
| 8,370,272 | B2 | 2/2013 | Wicket et al. | |
| 8,396,749 | B2 | 3/2013 | Koegler et al. | |
| 8,396,751 | B2 | 3/2013 | Becker et al. | |
| 8,423,428 | B2 | 4/2013 | Grendel et al. | |
| 8,433,585 | B2 | 4/2013 | Sr et al. | |
| 8,463,666 | B2 | 6/2013 | Dorais et al. | |
| 8,473,317 | B2 | 6/2013 | Santoso et al. | |
| 2001/0042032 | A1 | 11/2001 | Crawshaw et al. | |
| 2001/0047372 | A1 | 11/2001 | Gorelik et al. | |
| 2002/0013721 | A1 | 1/2002 | Dabbiere et al. | |
| 2002/0026394 | A1 | 2/2002 | Savage et al. | |
| 2002/0046053 | A1 * | 4/2002 | Hare et al. | 705/1 |
| 2002/0052754 | A1 | 5/2002 | Joyce et al. | |
| 2002/0065680 | A1 | 5/2002 | Kojima et al. | |
| 2002/0072988 | A1 | 6/2002 | Aram | |
| 2002/0087481 | A1 | 7/2002 | Harif | |
| 2002/0087483 | A1 | 7/2002 | Harif | |
| 2002/0099634 | A1 | 7/2002 | Coutts et al. | |
| 2002/0107765 | A1 | 8/2002 | Walker | |
| 2002/0112171 | A1 | 8/2002 | Ginter et al. | |
| 2002/0138318 | A1 * | 9/2002 | Ellis et al. | 705/7 |
| 2002/0147668 | A1 | 10/2002 | Smith et al. | |
| 2002/0152104 | A1 | 10/2002 | Ojha et al. | |
| 2002/0152145 | A1 | 10/2002 | Wanta et al. | |
| 2002/0156693 | A1 | 10/2002 | Stewart et al. | |
| 2002/0156930 | A1 | 10/2002 | Velasquez | |
| 2002/0157017 | A1 | 10/2002 | Mi et al. | |
| 2002/0169657 | A1 | 11/2002 | Singh et al. | |
| 2002/0184070 | A1 | 12/2002 | Chen et al. | |
| 2002/0186876 | A1 | 12/2002 | Jones et al. | |
| 2002/0194045 | A1 | 12/2002 | Shay et al. | |
| 2003/0004799 | A1 | 1/2003 | Kish | |
| 2003/0041178 | A1 | 2/2003 | Brouk et al. | |
| 2003/0046639 | A1 | 3/2003 | Fai et al. | |
| 2003/0069648 | A1 | 4/2003 | Douglas et al. | |
| 2003/0083910 | A1 | 5/2003 | Sayal et al. | |
| 2003/0083955 | A1 | 5/2003 | Ookura | |
| 2003/0084428 | A1 | 5/2003 | Agostini et al. | |
| 2003/0086594 | A1 | 5/2003 | Gross | |
| 2003/0097287 | A1 | 5/2003 | Franz et al. | |
| 2003/0120502 | A1 | 6/2003 | Robb et al. | |
| 2003/0120665 | A1 | 6/2003 | Fox et al. | |
| 2003/0126077 | A1 | 7/2003 | Kantor et al. | |
| 2003/0167193 | A1 | 9/2003 | Jones et al. | |
| 2003/0171962 | A1 | 9/2003 | Hirth et al. | |
| 2003/0172007 | A1 | 9/2003 | Helmolt et al. | |
| 2003/0172135 | A1 | 9/2003 | Bobick et al. | |
| 2003/0172343 | A1 | 9/2003 | Leymater et al. | |
| 2003/0177139 | A1 | 9/2003 | Cameron et al. | |
| 2003/0195815 | A1 | 10/2003 | Li et al. | |
| 2003/0204452 | A1 | 10/2003 | Wheeler | |
| 2003/0204637 | A1 | 10/2003 | Chong | |

(56) References Cited

U.S. PATENT DOCUMENTS

2003/0208389 A1 11/2003 Kurihara et al.
2003/0212614 A1 11/2003 Chu et al.
2003/0216978 A1 11/2003 Sweeney et al.
2003/0220835 A1 11/2003 Barnes, Jr.
2003/0220875 A1 11/2003 Lam et al.
2003/0229522 A1 12/2003 Thompson et al.
2003/0229550 A1 12/2003 DiPrima et al.
2003/0233295 A1 12/2003 Tozawa et al.
2003/0236748 A1 12/2003 Gressel et al.
2004/0002883 A1 1/2004 Andrews et al.
2004/0006653 A1 1/2004 Kamen et al.
2004/0015366 A1 1/2004 Wiseman et al.
2004/0024662 A1* 2/2004 Gray et al. .................... 705/29
2004/0024862 A1 2/2004 Wall et al.
2004/0034577 A1 2/2004 Van Hoose et al.
2004/0039665 A1 2/2004 Ouchi
2004/0073510 A1 4/2004 Logan
2004/0083201 A1 4/2004 Sholl et al.
2004/0083233 A1 4/2004 Willoughby
2004/0122730 A1 6/2004 Tucciarone et al.
2004/0133445 A1 7/2004 Rajan et al.
2004/0138942 A1 7/2004 Pearson et al.
2004/0148227 A1 7/2004 Tabuchi et al.
2004/0167894 A1 8/2004 Ziv
2004/0172360 A1 9/2004 Mabrey et al.
2004/0186891 A1 9/2004 Panec et al.
2004/0187140 A1 9/2004 Aigner et al.
2004/0220910 A1 11/2004 Zang et al.
2004/0254945 A1 12/2004 Schmidt et al.
2004/0267597 A1 12/2004 Kobrosly et al.
2004/0267714 A1 12/2004 Frid et al.
2005/0005190 A1 1/2005 Ofir et al.
2005/0015273 A1 1/2005 Iyer
2005/0021366 A1 1/2005 Pool et al.
2005/0033588 A1 2/2005 Ruiz et al.
2005/0038718 A1 2/2005 Barnes et al.
2005/0038744 A1 2/2005 Viijoen
2005/0049903 A1 3/2005 Raja
2005/0055369 A1 3/2005 Gorelik et al.
2005/0065987 A1 3/2005 Telkowski et al.
2005/0066240 A1 3/2005 Sykes et al.
2005/0071262 A1 3/2005 Kobeh et al.
2005/0080640 A1 4/2005 Bhaskaran et al.
2005/0102250 A1 5/2005 Carr et al.
2005/0108085 A1 5/2005 Dakar et al.
2005/0108168 A1 5/2005 Halpin et al.
2005/0108276 A1 5/2005 Sriram
2005/0131947 A1 6/2005 Laub et al.
2005/0149539 A1 7/2005 Cameron et al.
2005/0159997 A1 7/2005 John
2005/0171833 A1 8/2005 Jost et al.
2005/0182639 A1 8/2005 Dale
2005/0187797 A1 8/2005 Johnson
2005/0187866 A1 8/2005 Lee
2005/0194431 A1 9/2005 Fees et al.
2005/0194439 A1 9/2005 Zuerl et al.
2005/0197849 A1 9/2005 Fotteler et al.
2005/0197851 A1 9/2005 Veit
2005/0197878 A1 9/2005 Fotteler et al.
2005/0197881 A1 9/2005 Fotteler et al.
2005/0197882 A1 9/2005 Fotteler et al.
2005/0197886 A1 9/2005 Veit
2005/0197887 A1 9/2005 Zuerl et al.
2005/0197896 A1 9/2005 Veit et al.
2005/0197897 A1 9/2005 Veit et al.
2005/0197898 A1 9/2005 Veit et al.
2005/0197899 A1 9/2005 Veit et al.
2005/0197900 A1 9/2005 Veit
2005/0197901 A1 9/2005 Veit et al.
2005/0197902 A1 9/2005 Veit
2005/0197913 A1 9/2005 Grendel et al.
2005/0197928 A1 9/2005 Fotteler et al.
2005/0197941 A1 9/2005 Veit
2005/0209732 A1 9/2005 Audimoolam et al.
2005/0210406 A1 9/2005 Biwer et al.
2005/0216321 A1 9/2005 Veit
2005/0216359 A1 9/2005 Welter et al.
2005/0216371 A1 9/2005 Fotteler et al.
2005/0216421 A1 9/2005 Barry et al.
2005/0222888 A1 10/2005 Hosoda et al.
2005/0222896 A1 10/2005 Rhyne et al.
2005/0222945 A1 10/2005 Pannicke et al.
2005/0228821 A1 10/2005 Gold
2005/0234754 A1 10/2005 Veit
2005/0240488 A1 10/2005 Grendel et al.
2005/0246240 A1 11/2005 Padilla
2005/0256753 A1 11/2005 Veit et al.
2005/0278693 A1 12/2005 Brunell et al.
2006/0004934 A1 1/2006 Guldner et al.
2006/0005098 A1 1/2006 Lotz et al.
2006/0020515 A1 1/2006 Lee et al.
2006/0026552 A1 2/2006 Mazzitelli et al.
2006/0026586 A1 2/2006 Remmel et al.
2006/0036941 A1 2/2006 Neil
2006/0047574 A1 3/2006 Sundaram et al.
2006/0047598 A1 3/2006 Hansen
2006/0059005 A1 3/2006 Horn et al.
2006/0059059 A1 3/2006 Horn et al.
2006/0059060 A1 3/2006 Horn et al.
2006/0069598 A1 3/2006 Schweitzer et al.
2006/0069629 A1 3/2006 Schweitzer et al.
2006/0069632 A1 3/2006 Kahn et al.
2006/0074728 A1 4/2006 Schweitzer et al.
2006/0080338 A1 4/2006 Seubert et al.
2006/0085336 A1 4/2006 Seubert et al.
2006/0085412 A1 4/2006 Johnson et al.
2006/0085450 A1* 4/2006 Seubert et al. ............... 707/100
2006/0089885 A1 4/2006 Finke et al.
2006/0095373 A1 5/2006 Venkatasubramanian et al.
2006/0106824 A1 5/2006 Stuhec
2006/0184435 A1 8/2006 Mostowfi
2006/0195563 A1 8/2006 Chapin et al.
2006/0212376 A1* 9/2006 Snyder et al. .................. 705/35
2006/0280302 A1 12/2006 Baumann et al.
2006/0282360 A1 12/2006 Kahn et al.
2007/0016601 A1 1/2007 Cameron et al.
2007/0027742 A1 2/2007 Emuchay et al.
2007/0027891 A1 2/2007 Schauerte et al.
2007/0043583 A1 2/2007 Davulcu et al.
2007/0055688 A1 3/2007 Blattner
2007/0061154 A1 3/2007 Markvoort et al.
2007/0067411 A1 3/2007 Angelov
2007/0067753 A1 3/2007 Pocklington et al.
2007/0078799 A1 4/2007 Huber-Buschbeck et al.
2007/0100491 A1 5/2007 Burrell et al.
2007/0112574 A1 5/2007 Greene
2007/0118391 A1 5/2007 Malaney et al.
2007/0124227 A1* 5/2007 Dembo et al. ............. 705/36 R
2007/0129978 A1 6/2007 Shirasu et al.
2007/0132585 A1 6/2007 Llorca et al.
2007/0150387 A1 6/2007 Seubert et al.
2007/0150836 A1 6/2007 Deggelmann et al.
2007/0156428 A1 7/2007 Brecht-Tillinger et al.
2007/0156545 A1 7/2007 Lin
2007/0156552 A1 7/2007 Manganiello
2007/0156690 A1 7/2007 Moser et al.
2007/0165622 A1 7/2007 O'Rourke et al.
2007/0174811 A1 7/2007 Kaetker et al.
2007/0214065 A1 9/2007 Kahlon et al.
2007/0219864 A1 9/2007 Vollrath et al.
2007/0225949 A1 9/2007 Sundararajan et al.
2007/0226066 A1 9/2007 Brunner et al.
2007/0226090 A1 9/2007 Stratton
2007/0233574 A1 10/2007 Koegler et al.
2007/0255639 A1 11/2007 Seifert
2007/0265860 A1* 11/2007 Herrmann et al. ............... 705/1
2007/0265862 A1 11/2007 Freund et al.
2007/0288250 A1 12/2007 Lemcke et al.
2007/0294159 A1* 12/2007 Cottle ........................... 705/37
2007/0295803 A1 12/2007 Levine et al.
2008/0005012 A1 1/2008 Deneef
2008/0016242 A1 1/2008 Panec et al.
2008/0021754 A1 1/2008 Horn et al.
2008/0027836 A1 1/2008 Chapin

(56) References Cited

U.S. PATENT DOCUMENTS

| | | | | |
|---|---|---|---|---|
| 2008/0040243 | A1 | 2/2008 | Chang et al. | |
| 2008/0046104 | A1 | 2/2008 | Van Camp et al. | |
| 2008/0046421 | A1 | 2/2008 | Bhatia et al. | |
| 2008/0065443 | A1 | 3/2008 | Gorur et al. | |
| 2008/0120129 | A1 | 5/2008 | Seubert et al. | |
| 2008/0120190 | A1 | 5/2008 | Joao et al. | |
| 2008/0120204 | A1 | 5/2008 | Conner et al. | |
| 2008/0120206 | A1 | 5/2008 | Weiler et al. | |
| 2008/0120313 | A1 | 5/2008 | O'Brien et al. | |
| 2008/0133303 | A1 | 6/2008 | Singh et al. | |
| 2008/0144791 | A1 | 6/2008 | Harifi et al. | |
| 2008/0154969 | A1 | 6/2008 | DeBie | |
| 2008/0162266 | A1 | 7/2008 | Griessmann et al. | |
| 2008/0184265 | A1 | 7/2008 | Kasi et al. | |
| 2008/0189360 | A1 | 8/2008 | Kiley et al. | |
| 2008/0196108 | A1 * | 8/2008 | Dent et al. | 726/28 |
| 2008/0215354 | A1 | 9/2008 | Halverson et al. | |
| 2008/0243578 | A1 | 10/2008 | Veit | |
| 2008/0263051 | A1 | 10/2008 | Kanyetzna et al. | |
| 2008/0288317 | A1 | 11/2008 | Kakar | |
| 2008/0300962 | A1 | 12/2008 | Cawston et al. | |
| 2008/0314981 | A1 | 12/2008 | Eisenson | |
| 2009/0006203 | A1 | 1/2009 | Fordyce et al. | |
| 2009/0063287 | A1 | 3/2009 | Tribout et al. | |
| 2009/0077074 | A1 | 3/2009 | Hosokawa | |
| 2009/0089198 | A1 | 4/2009 | Kroutik | |
| 2009/0094274 | A1 | 4/2009 | Gorelik et al. | |
| 2009/0144624 | A1 | 6/2009 | Barnes, Jr. | |
| 2009/0164497 | A1 | 6/2009 | Steinmaier et al. | |
| 2009/0192926 | A1 | 7/2009 | Tarapata | |
| 2009/0193432 | A1 | 7/2009 | McKegney et al. | |
| 2009/0222360 | A1 | 9/2009 | Schmitt et al. | |
| 2009/0248429 | A1 | 10/2009 | Doenig et al. | |
| 2009/0248430 | A1 | 10/2009 | Hubert et al. | |
| 2009/0248431 | A1 | 10/2009 | Schoknecht et al. | |
| 2009/0248463 | A1 | 10/2009 | Piochon et al. | |
| 2009/0248473 | A1 | 10/2009 | Doenig et al. | |
| 2009/0248487 | A1 | 10/2009 | Santoso et al. | |
| 2009/0248547 | A1 | 10/2009 | Doenig et al. | |
| 2009/0248558 | A1 | 10/2009 | Hollberg et al. | |
| 2009/0248586 | A1 | 10/2009 | Kaisermayr et al. | |
| 2009/0248698 | A1 | 10/2009 | Rehmann | |
| 2009/0249358 | A1 | 10/2009 | Schuette | |
| 2009/0249362 | A1 | 10/2009 | Lindemann et al. | |
| 2009/0254971 | A1 | 10/2009 | Herz et al. | |
| 2009/0271245 | A1 | 10/2009 | Joshi et al. | |
| 2009/0276338 | A1 | 11/2009 | Masermann et al. | |
| 2009/0300544 | A1 | 12/2009 | Psenka et al. | |
| 2009/0300578 | A1 | 12/2009 | Neil | |
| 2009/0326988 | A1 | 12/2009 | Barth et al. | |
| 2009/0327009 | A1 | 12/2009 | Schmitt et al. | |
| 2009/0327105 | A1 | 12/2009 | Moussa et al. | |
| 2009/0327106 | A1 | 12/2009 | Bartelt et al. | |
| 2010/0001834 | A1 | 1/2010 | Brunswig et al. | |
| 2010/0014510 | A1 | 1/2010 | Boreli et al. | |
| 2010/0070391 | A1 | 3/2010 | Storr et al. | |
| 2010/0070395 | A1 | 3/2010 | Elkeles et al. | |
| 2010/0106555 | A1 | 4/2010 | Mneimneh et al. | |
| 2010/0131379 | A1 | 5/2010 | Dorais et al. | |
| 2010/0131394 | A1 | 5/2010 | Rutsch et al. | |
| 2010/0153297 | A1 | 6/2010 | Haaf et al. | |
| 2010/0161366 | A1 | 6/2010 | Clemens et al. | |
| 2010/0161425 | A1 | 6/2010 | Sideman | |
| 2010/0169888 | A1 | 7/2010 | Hare et al. | |
| 2010/0198631 | A1 | 8/2010 | Edwards et al. | |
| 2010/0217645 | A1 | 8/2010 | Jin et al. | |
| 2010/0217820 | A1 | 8/2010 | Brouk et al. | |
| 2010/0218245 | A1 | 8/2010 | Brouk et al. | |
| 2010/0241729 | A1 | 9/2010 | Angelov | |
| 2010/0306536 | A1 | 12/2010 | Brouk et al. | |
| 2011/0046775 | A1 | 2/2011 | Bailey et al. | |
| 2011/0077999 | A1 | 3/2011 | Becker et al. | |
| 2011/0078048 | A1 | 3/2011 | Becker et al. | |
| 2011/0088000 | A1 | 4/2011 | Mackay | |
| 2011/0153505 | A1 | 6/2011 | Brunswig et al. | |
| 2011/0153767 | A1 | 6/2011 | Coldicott et al. | |
| 2011/0276360 | A1 | 11/2011 | Barth et al. | |
| 2011/0276636 | A1 | 11/2011 | Cheng et al. | |
| 2011/0307289 | A1 | 12/2011 | Hosur et al. | |
| 2011/0307353 | A1 | 12/2011 | Ringl et al. | |
| 2012/0117000 | A1 | 5/2012 | Haaf et al. | |
| 2012/0118983 | A1 | 5/2012 | Harris | |
| 2012/0191604 | A1 | 7/2012 | Allin et al. | |
| 2013/0021978 | A1 | 1/2013 | Tamura et al. | |
| 2013/0144741 | A1 | 6/2013 | Becker et al. | |
| 2013/0159146 | A1 | 6/2013 | Schmitt et al. | |

FOREIGN PATENT DOCUMENTS

| | | |
|---|---|---|
| CN | 1632806 | 6/2005 |
| CN | 1765138 | 4/2006 |
| CN | 1767537 | 5/2006 |
| CN | 101174957 | 5/2008 |
| CN | 101288092 | 10/2008 |
| WO | WO2008/005102 | 1/2008 |

OTHER PUBLICATIONS

SAP Structured Entity Relationship Model (SAP-SERM) for R/3 System Release 4.0 Introduction and Index; Dec. 1998; 26 pages.

SAP Structured Entity Relationship Model (SAP-SERM) for R/3 System Release 4.0 (Part 1); Dec. 1998; 5954 pages.

SAP Structured Entity Relationship Model (SAP-SERM) for R/3 System Release 4.0 (Part 2); Dec. 1998; 7838 pages.

Zencke, Peter; "Engineering a Business Platform"; SAP AG 2005; Engineering BPP; [Online] previously available at URL www.sap.com/community/pub/webcast/2006_01_16_Analyst_Summit_Vegas/2006_01_16_Analyst_Summit_Vegas_009.pdf ; 36 pages.

"UML in the .com Enterprise: Modeling CORBA, Components, XML/XMI and Metadata Workshop"; <http://www.omg.org/news/meetings/workshops/uml_presentations.htm>.

Medjahed, Brahim et al; "Business-to-Business Interactions: Issues and Enabling Technologies"; The VLDB Journal; vol. 12, No. 1; Apr. 3, 2003; pp. 59-89.

Medjahed, Brahim et al.; "Composing Web Services on the Semantic Web"; The VLDB Journal; vol. 12, No. 4, Sep. 23, 2003; pp. 333-351.

Born, Marc et al.; "Customizing UML for Component Design"; www.dot-profile.de; UML Workshop, Palm Springs, CA; Nov. 2000.

Kappel, Gerti et al.; "A Framework for Workflow Management Systems Based on Objects, Rules, and Roles"; ACM Computing Surveys; ACM Press; vol. 32; Mar. 2000; 5 pages.

Skonnard, Aaron et al.; "BizTalk Server 2000: Architecture and Tools for Trading Partner Integration"; MSDn Magazine; 2000; ms-help://ms.msdnqtr.2003apr.1033/dnmag00/htmal/biztalk.htm; 7 pages.

Microsoft; "Creating an XML Web Service Proxy"; 2001; mshelp://ms.msdnqtr.2003apr.1033/cpguide/html/cpconcreatingwebserviceproxy.htm; 3 pages.

Proceedings of OMG Workshops; http://www.omg.org/news/meetings/workshops/proceedings.htm; pp. 1-3.

Meltzer, Bart et al.; "XML and Electronic Commerce: Enabling the Network Economy"; SIGMOD Record; ACM Press; vol. 27, No. 4; Dec. 1998; pp. 21-24.

Huhns, Michael N. et al.; "Automating Supply-Chain Mangement"; Jul. 15-19, 2002; pp. 1017-1024.

Soederstroem, Eva; "Standardising the Business Vocabulary of Standards"; SAC, Madrid, Spain; 2002; pp. 1048-1052.

Bastide, Remi et al.; "Formal Specification of CORBA Services: Experience and Lessons Learned"; 2000; pp. 105-117.

Glushko, Robert J. et al.; "An XML Framework for Agent-Based E-Commerce"; Communications of the ACM; vol. 42, No. 3; Mar. 1999; pp. 106-114.

Coen-Porisini, Alberto et al.; "A Formal Approach for Designing CORBA-Based Applications"; ACM Transactions on Software Engineering and Methodology; vol. 12, No. 2; Apr. 2003; pp. 107-151.

Yang, J. et al.; "Service Deployment for Virtual Enterprises"; IEEE; 2001; pp. 107-115.

Karp, Alan H.; "E-speak E-xplained"; Communications of the ACM; vol. 46, No. 7; Jul. 2003; pp. 113-118.

(56) References Cited

OTHER PUBLICATIONS

Gillibrand, David; "Essential Business Object Design"; Communications of the ACM; vol. 43, No. 2; Feb. 2000; pp. 117-119.
Cole, James et al.; "Extending Support for Contracts in ebXML"; IEEE; 2001; pp. 119-127.
DiNitto, Elisabetta et al.; "Deriving Executable Process Descriptions from UML"; ICSE '02; May 19-25, 2002; pp. 155-165.
Stumptner, Markus et al.; "On the Road to Behavior-Based Integration"; First Asia-Pacific Conferences on Conceptual Modelling; Dunedin, New Zealand; Jan. 2004; pp. 15-22.
Gosain, Sanjay et al.; "The Impact of Common E-Business Interfaces"; Communications of the ACM; vol. 46, No. 2; Dec. 2003; pp. 186-195.
Damodaran, Suresh; "B2B Integration over the Internet with XML—RosettaNet Successes and Challenges"; WWW2004; May 17-22, 2004; pp. 188-195.
Schulze, Wolfgang et al.; "Standardising on Workflow-Management—The OMG Workflow Management Facility"; SIGGROUP Bulletin; vol. 19, No. 1; Apr. 1998; pp. 24-30.
Sutherland, Jeff; "Business Objects in Corporate Information Systems"; ACM Computing Surveys; vol. 27, No. 2; Jun. 1995; pp. 274-276.
Arsanjani, Ali; "Developing and Integrating Enterprise Components and Services"; Communications of the ACM; vol. 45, No. 10; Oct. 2002; pp. 31-34.
Kim, Dan Jong et al.; "A Comparison of B2B E-Service Solutions"; Communications of the ACM; vol. 46, No. 12; Dec. 2003; pp. 317-324.
Hasselbring, Wilhelm; "Information System Integration"; Communications of the ACM; vol. 43, No. 6; Jun. 2000; pp. 33-38.
Khosravi, Navid et al.; "An Approach to Building Model Driven Enterprise Systems in Nebras Enterprise Framework"; OOPSLA '02: Companion of the 17th Annual ACM SIGPLAN Conference on Object-Oriented Programming, Systems, Languages, and Applications; Nov. 4-8, 2002; pp. 32-33.
Hogg, K. et al.; "An Evaluation of Web Services in the Design of a B2B Application"; 27th Australasian Computer Science Conference; Dunedin, New Zealand; 2004; pp. 331-340.
Gruhn, Volker et al.; "Workflow Management Based on Process Model Repositories"; IEEE 1998; pp. 379-388.
Kim, HyoungDo; "Conceptual Modeling and Specification Generation for B2B Business Processes Based on ebXML"; SIGMOD Record; vol. 31, No. 1; Mar. 2002; pp. 37-42.
Siegel, Jon; "OMG Overview: CORBA and the OMA in Enterprise Computing"; Communications of the ACM; vol. 41, No. 10; Oct. 1998; pp. 37-43.
Yang, Jian et al.; "Interoperation Support for Electronic Business"; Communications of the ACM; vol. 43, No. 6; Jun. 2000; pp. 39-47.
Levi, Keith et al.; "A Goal-Driven Approach to Enterprise Component Identification and Specification"; Communications of the ACM; vol. 45, No. 10; Oct. 2002; pp. 45-52.
Terai, Koichi et al.; "Coordinating Web Services Based on Business Models"; 2003; pp. 473-478.
Aversano, Lerina et al.; "Introducing eServices in Business Process Models"; SEKE '02; Ischia Italy; Jul. 15-19, 2002; pp. 481-488.
Quix, Christoph et al.; "Business Data Management for Business-to-Business Electronic Commerce"; SIGMOD Record; vol. 31, No. 1; Mar. 2002; pp. 49-54.
Sutherland, Jeff; "Why I Love the OMG: Emergence of a Business Object Component Architecture"; StandardView; vol. 6, No. 1; Mar. 1998; pp. 4-13.
Dogac, Asuman et al.; "An ebXML Infrastructure Implementation through UDDI Registries and RosettaNet PIPs"; ACM SIGMOD; Madison, Wisconsin; Jun. 4-6, 2002; pp. 512-523.
Lee, Jinyoul et al.; "Enterprise Integration with ERP and EAI"; Communications of the ACM; vol. 46, No. 2; Feb. 2003; pp. 54-60.
Bratthall, Lars G. et al.; "Integrating Hundreds of Products through One Architecture—The Industrial IT Architecture"; ICSE '02; Orlando, Florida; May 19-25, 2002; pp. 604-614.
Fingar, Peter; "Component-Based Frameworks for E-Commerce"; Communications of the ACM; vol. 43, No. 10; Oct. 2000; pp. 61-66.
Sprott, David; "Componentizing the Enterprise Application Packages"; Communications of the ACM; vol. 43, No. 4; Apr. 2000; pp. 63-69.
Gokhale, Aniruddha et al.; "Applying Model-Integrated Computing to Component Middleware and Enterprise Applications"; Communications of the ACM; vol. 45, No. 10; Oct. 2002; pp. 65-70.
Bussler, Christoph; "The Role of B2B Engines in B2B Integration Architectures"; SIGMOD Record; vol. 31, No. 1; Mar. 2002; pp. 67-72.
Fremantle, Paul et al.; "Enterprise Services"; Communications of the ACM; vol. 45, No. 10; Oct. 2002; pp. 77-79.
Trastour, David et al.; "Semantic Web Support for the Business-to-Business E-Commerce Lifecycle"; WWW2002, Honolulu, Hawaii; May 7-11, 2002; pp. 89-98.
Jaeger, Dirk et al.; "Using UML for Software Process Modeling"; pp. 91-108.
Han, Zaw Z. et al.; "Interoperability from Electronic Commerce to Litigation Using XML Rules"; 2003; pp. 93-94.
Carlson, David A.; "Designing XML Vocabularies with UML"; OOPSLA 2000 Companion; Minneapolis, Minnesota; 2000; pp. 95-96.
Stonebraker, Michael; "Too Much Middleware"; SIGMOD Record; vol. 31, No. 1; Mar. 2002; pp. 97-106.
Maamar, Zakaria et al.; "Toward Intelligent Business Objects"; Communications of the ACM; vol. 43, No. 10; Oct. 2000; pp. 99-101.
Tenenbaum, Jay M. et al.; "Eco System: An Internet Commerce Architecture"; IEEE; May 1997; pp. 48-55.
Eyal, Anat et al.; "Integrating and Customizing Heterogeneous E-Commerce Applications"; The VLDB Journal; Aug. 2001; pp. 16-38.
He, Ning et al.; "B2B Contract Implementation Using Windows DNS"; 2001; pp. 71-79.
FSML-Financial Services Markup Language (Jul. 14, 1999) http://xml.coverpages.org/FSML-v1500a.pdf; pp. 1-159.
Webster's Revised Unabridged Dictionary (1913+1828); Def. "merchandise".
Statement in Accordance with the Notice from the European Patent Office dated Oct. 1, 2007 Concerning Business Methods—EPC; Official Journal of the European Patent Office; Munich; Nov. 1, 2007; pp. 592-593.
Lynn, Chris; "Sony Enters Brand Asset Management Market"; The Seybold Report; Analyzing Publishing Technologies; Aug. 4, 2004; <www.Seybold365.com>; 3 pages.
International Search Report and Written Opinion of the International Searching Authority issued in International Application No. PCT/US2007/011378 on Apr. 30, 2008; 17 pages.
International Preliminary Report on Patentability under Chapter I issued in International Application No. PCT/US2007/011378 on Nov. 17, 2008; 11 pages.
International Search Report and Written Opinion of the International Searching Authority issued in International Application No. PCT/IB2006/001401 on Aug. 27, 2008; 8 pages.
International Search Report and Written Opinion of the International Searching Authority issued in International Application No. PCT/US2005/019961 on Sep. 22, 2005; 8 pages.
International Preliminary Report on Patentability under Chapter I issued in International Application No. PCT/US2005/019961 on Dec. 4, 2006; 6 pages.
International Search Report and Written Opinion of the International Searching Authority issued in International Application No. PCT/US2005/021481 on Apr. 11, 2006; 7 pages.
International Search Report and Written Opinion of the International Searching Authority issued in International Application No. PCT/US2005/021481 on May 29, 2007; 6 pages.
International Preliminary Report on Patentability under Chapter I issued in International Application No. PCT/US2005/021481 on Dec. 20, 2006; 6 pages.
International Preliminary Report on Patentability under Chapter I issued in International Application No. PCT/US2005/021481 on Jul. 15, 2008; 5 pages.

(56) References Cited

OTHER PUBLICATIONS

International Search Report and Written Opinion of the International Searching Authority issued in International Application No. PCT/US2005/022137 on Sep. 23, 2005; 7 pages.
International Search Report and Written Opinion of the International Searching Authority issued in International Application No. PCT/US2005/022137 on May 12, 2006; 7 pages.
International Preliminary Report on Patentability under Chapter I issued in International Application No. PCT/US2005/022137 on Dec. 28, 2006; 5 pages.
Office Action issued in related U.S. Appl. No. 11/640,422 on Apr. 2, 2009; 13 pages.
Office Action issued in related U.S. Appl. No. 11/640,422 on Dec. 30, 2009; 9 pages.
Office Action issued in related U.S. Appl. No. 11/803,178 on Jun. 29, 2009; 5 pages.
Office Action issued in related U.S. Appl. No. 11/803,178 on Mar. 4, 2010; 43 pages.
Office Action issued in related U.S. Appl. No. 11/775,821 on Jan. 22, 2010; 16 pages.
Office Action issued in related U.S. Appl. No. 11/364,538 on Aug. 4, 2009; 5 pages.
Office Action issued in related U.S. Appl. No. 11/364,538 on Mar. 4, 2010; 40 pages.
Office Action issued in related U.S. Appl. No. 11/731,857 on May 15, 2009; 11 pages.
Office Action issued in related U.S. Appl. No. 11/731,857 on Feb. 4, 2010; 22 pages.
Office Action issued in related U.S. Appl. No. 11/864,786 on Jun. 22, 2009; 7 pages.
Office Action issued in related U.S. Appl. No. 11/864,786 on Mar. 3, 2010; 12 pages.
Office Action issued in related U.S. Appl. No. 11/864,832 on Sep. 18, 2009; 14 pages.
Notice of Allowance issued in related U.S. Appl. No. 11/864,832 on Mar. 24, 2010; 11 pages.
Office Action issued in related U.S. Appl. No. 12/059,867 on Aug. 18, 2009; 37 pages.
Office Action issued in related U.S. Appl. No. 12/059,867 on Feb. 22, 2010; 24 pages.
Office Action issued in related U.S. Appl. No. 12/060,178 on Dec. 7, 2009; 6 pages.
Office Action issued in related U.S. Appl. No. 12/060,171 on Aug. 11, 2009; 11 pages.
Office Action issued in related U.S. Appl. No. 12/060,171 on Mar. 19, 2010; 10 pages.
Office Action issued in related U.S. Appl. No. 11/145,464 on Aug. 5, 2009; 31 pages.
Office Action issued in related U.S. Appl. No. 11/145,464 on Jan. 22, 2009; 30 pages.
Office Action issued in related U.S. Appl. No. 11/145,464 on Feb. 5, 2010; 57 pages.
Office Action issued in related U.S. Appl. No. 11/155,368 on May 14, 2009; 6 pages.
Office Action issued in related U.S. Appl. No. 11/155,368 on Dec. 10, 2009; 43 pages.
Office Action issued in related U.S. Appl. No. 11/166,065 on Jun. 24, 2009; 6 pages.
Office Action issued in related U.S. Appl. No. 11/166,065 on Mar. 3, 2010; 25 pages.
Communication Pursuant to Article 94(3) EPC issued in related European Application No. 05757432.9 on Jan. 26, 2009; 4 pages.
Supplementary European Search Report issued in related European Application No. 05823434.5 on Sep. 28, 2009; 3 pages.
Supplementary European Search Report issued in related European Application No. 05766672.9 on Oct. 6, 2009; 3 pages.
"Header", Newton's Telecom Dictionary; 12th Edition, 2004; pp. 389-390).
Office Action issued in U.S. Appl. No. 11/640,422 on May 14, 2010; 12 pages.
Notice of Allowance issued in related U.S. Appl. No. 11/775,821 on Jul. 16, 2010; 4 pages.
Office Action issued in related U.S. Appl. No. 11/864,871 on Apr. 21, 2010; 20 pages.
Office Action issued in related U.S. Appl. No. 12/060,178 on May 25, 2010; 19 pages.
Office Action issued in related U.S. Appl. No. 12/060,171 on Jul. 1, 2010; 19 pages.
Advisory Action issued in U.S. Appl. No. 11/155,368 on Mar. 31, 2010; 3 pages.
Newton's Telecom Dictionary; 18th Edition; 2002; pp. 347, 454.
Baker, Stacy; "Benefits of Assortment Planning"; Assortment Planning for Apparel Retailers—2005 Management Briefing; Just Style; Jun. 2005; 3 pages.
"Visual and Quantitative Assortment Planning Applications Drive Partnership and Profit"; PR Newswire; Jan. 12, 2006; 3 pages.
"Dots Inc. Selects Compass Software's smartmerchandising for Merchandise Planning and Assortment Planning"; PR Newswire; Dec. 11, 2002; 2 pages.
SAP; "BC-Central Maintenance and Transport Objects"; Release 4.6C; Apr. 200; 15 pages.
Annevelink et al.; "Heterogeneous Database Intergration in a Physician Workstation"; 1992; 5 pages.
Ketabchi et al.; "Object-Oriented Database Management Support for Software Maintenance and Reverse Engineering"; Department of Electrical Engineering and Computer Science, Santa Clara University; 1989; 4 pages.
Diehl et al.; "Service Architecture for an Object-Oriented Next Generation Profile Register"; date unknown; 8 pages.
International Search Report and Written Opinion of the International Searching Authority issued in International Application No. PCT/CN2010/073856 on Mar. 17, 2011; 8 pages.
International Search Report and Written Opinion of the International Searching Authority issued in International Application No. PCT/CN2010/073864 on Mar. 3, 2011; 8 pages.
International Search Report and Written Opinion of the International Searching Authority issued in International Application No. PCT/CN2010/073868 on Mar. 17, 2011; 10 pages.
Communication Pursuant to Rules 70(2) and 70a(2) EPC issued in related European Application No. 07835755.5 on Feb. 28, 2011; 6 pages.
Communication Pursant to Article 94(3) issued in European Application No. 05757432.9 on Apr. 12, 2011; 5 pages.
Notice of Allowance issued in related U.S. Appl. No. 12/147,395 on Oct. 26, 2010; 10 pages.
Notice of Allowance issued in U.S. Appl. No. 12/147,395 on May 4, 2011; 10 pages.
Notice of Allowance issued in related U.S. Appl. No. 12/147,449 on Apr. 28, 2011; 9 pages.
Office Action issued in related U.S. Appl. No. 12/147,399 on Jan. 26, 2011; 16 pages.
Notice of Allowance issued in related U.S. Appl. No. 11/731,857 on Nov. 29, 2010; 4 pages.
Notice of Allowance issued in related U.S. Appl. No. 11/731,857 on Apr. 11, 2011; 8 pages.
Office Action issued in U.S. Appl. No. 12/147,414 on Apr. 14, 2011; 30 pages.
Office Action issued in U.S. Appl. No. 12/147,378 on Jun. 17, 2011; 10 pages.
Notice of Allowance issued in U.S. Appl. No. 12/323,139 on Mar. 4, 2011; 13 pages.
Office Action issued in related U.S. Appl. No. 12/059,971 on Nov. 4, 2010; 20 pages.
Office Action issued in related U.S. Appl. No. 12/059,971 on May 18, 2011; 13 pages.
Office Action issued in related U.S. Appl. No. 12/060,054 on Jun. 29, 2011; 15 pages.
Office Action issued in U.S. Appl. No. 12/060,144 on Jun. 23, 2011; 16 pages.
Office Action issued in related U.S. Appl. No. 12/059,804 on Apr. 28, 2011; 14 pages.
Office Action issued in related U.S. Appl. No. 12/059,860 on Aug. 3, 2011; 15 pages.

(56) References Cited

OTHER PUBLICATIONS

Office Action issued in related U.S. Appl. No. 12/060,149 on Aug. 26, 2010; 15 pages.
Office Action issued in related U.S. Appl. No. 12/060,149 on Feb. 4, 2011; 19 pages.
Office Action issued in related U.S. Appl. No. 12/060,192 on Apr. 14, 2011; 18 pages.
Notice of Allowance issued in related U.S. Appl. No. 12/060,178 on Dec. 6, 2010; 4 pages.
Office Action issued in related U.S. Appl. No. 12/060,062 on Jul. 13, 2011; 16 pages.
Office Action issued in related U.S. Appl. No. 12/060,155 on May 10, 2011; 8 pages.
Office Action issued in related U.S. Appl. No. 12/060,171 on Jan. 26, 2011; 17 pages.
Notice of Allowance issued in related U.S. Appl. No. 11/145,464 on Nov. 1, 2010; 4 pages.
Notice of Allowance issued in related U.S. Appl. No. 11/145,464 on Feb. 23, 2011; 7 pages.
Notice of Allowance issued in U.S. Appl. No. 11/155,368 on Oct. 7, 2010; 4 pages.
Notice of Allowance issued in U.S. Appl. No. 11/155,368 on Mar. 14, 2011; 7 pages.
Notice of Allowance issued in related U.S. Appl. No. 11/166,065 on Sep. 20, 2010; 6 pages.
Notice of Allowance issued in U.S. Appl. No. 11/166,065 on Mar. 8, 2011; 5 pages.
Office Action issued in related U.S. Appl. No. 11/864,866 on Feb. 3, 2011; 20 pages.
Notice of Allowance issued in related U.S. Appl. No. 11/864,866 on Jul. 22, 2011; 6 pages.
Notice of Allowance issued in related U.S. Appl. No. 11/775,821 on Oct. 22, 2010; 4 pages.
Notice of Allowance issued in related U.S. Appl. No. 11/775,821 on Feb. 4, 2011; 4 pages.
Notice of Allowance issued in related U.S. Appl. No. 11/364,538 on Dec. 13, 2010; 5 pages.
Notice of Allowance issued in related U.S. Appl. No. 11/364,538 on Jul. 26, 2011; 6 pages.
Office Action issued in U.S. Appl. No. 11/864,811 on Mar. 18, 2011; 10 pages.
Office Action issued in U.S. Appl. No. 11/864,811 on Jul. 26, 2011; 7 pages.
Notice of Allowance issued in related U.S. Appl. No. 11/864,832 on Aug. 23, 2010; 4 pages.
Notice of Allowance issued in related U.S. Appl. No. 11/864,832 on Dec. 3, 2010; 9 pages.
Notice of Allowance issued in related U.S. Appl. No. 11/864,832 on Jul. 7, 2011;11 pages.
Office Action issued in related U.S. Appl. No. 11/864,863 on Jul. 21, 2011; 29 pages.
Office Action issued in related U.S. Appl. No. 11/864,871 on Oct. 1, 2010; 30 pages.
Notice of Allowance issued in related U.S. Appl. No. 11/803,178 on May 17, 2011; 13 pages.
"SAP Labs and HP Team to Advance Internet-Based Supply Chain Collaboration"; Business Editors and Technology Writers; Business Wire; New York; Feb. 3, 2000; 4 pages.
Altintas et al.; "Aurora Software Product Line"; Cybersoft Information Technologies Co.; 2005; pp. 1-8.
Boetterweck, Goetz; "A Model-Driven Approach to the Engineering of Multiple User Interfaces"; Lecture Notes in Computer Science; 2007; vol. 4364/2007; pp. 106-115.
Communication Pursuant to Article 94(3) EPC issued in European Application No. 07835755.5 on Feb. 22, 2012; 7 pages.
Communication Pursuant to Article 94(3) issued in European Application No. 05766672.9 on Jul. 14, 2011; 4 pages.
Gable, Julie; "Enterprise Application Integration"; Information Management Journal; Mar./Apr. 2002; pp. 48-52.
Himoff et al.; "MAGENTA Technology: Multi-Agent Systems for Industrial Logistics"; AAMAS'05; Jul. 25-29, 2005; 2005 ACM; pp. 60-66:1-7).
International Search Report and Written Opinion issued in International Application No. PCT/CN2011/001238 on May 3, 2012; 9 pages.
Lockemann et al.; "Flexibility through Multi-Agent Systems: Solutions or Illusions"; SOFSEM 2004; pp. 41-56.
Mascolo et al.; "An Analytical Method for Performance Evaluation of Kanban Controlled Production Systems"; Operations Research; vol. 44, No. 1; 1996; pp. 50-64.
Notice of Allowance issued in related U.S. Appl. No. 11/864,866 on Mar. 13, 2012; 7 pages.
Notice of Allowance issued in related U.S. Appl. No. 12/060,178 on Sep. 2, 2011; 9 pages.
Notice of Allowance issued in related U.S. Appl. No. 11/145,464 on Feb. 6, 2012; 7 pages.
Notice of Allowance issued in related U.S. Appl. No. 11/364,538 on Jul. 13, 2012; 7 pages.
Notice of Allowance issued in related U.S. Appl. No. 11/731,857 on Dec. 14, 2011; 7 pages.
Notice of Allowance issued in related U.S. Appl. No. 11/864,832 on Jan. 9, 2012;12 pages.
Notice of Allowance issued in related U.S. Appl. No. 11/864,832 on Jul. 30, 2012;12 pages.
Notice of Allowance issued in U.S. Appl. No. 11/155,368 on Nov. 8, 2011; 7 pages.
Notice of Allowance issued in U.S. Appl. No. 11/166,065 on Feb. 15, 2012; 7 pages.
Notice of Allowance issued in U.S. Appl. No. 11/775,821 on Sep. 21, 2011; 5 pages.
Notice of Allowance issued in U.S. Appl. No. 11/775,821 on Dec. 30, 2011; 5 pages.
Notice of Allowance issued in U.S. Appl. No. 11/864,811 on Nov. 14, 2011; 8 pages.
Notice of Allowance issued in U.S. Appl. No. 11/864,811 on Mar. 2, 2012; 8 pages.
Notice of Allowance issued in U.S. Appl. No. 12/060,062 on Mar. 20, 2012; 16 pages.
Notice of Allowance issued in U.S. Appl. No. 12/060,155 on Apr. 24, 2012; 15 pages.
Notice of Allowance issued in U.S. Appl. No. 12/060,192 on Mar. 2, 2012; 18 pages.
Notice of Allowance issued in U.S. Appl. No. 12/147,378 on Nov. 9, 2011; 16 pages.
Notice of Allowance issued in U.S. Appl. No. 12/323,116 on Jun. 11, 2012; 10 pages.
Notice of Allowance issued in U.S. Appl. No. 12/323,139 on Mar. 14, 2012; 10 pages.
Notice of Allowance issued in U.S. Appl. No. 12/571,140 on Mar. 20, 2012; 16 pages.
Notice of Allowance issued in U.S. Appl. No. 12/815,618 on May 10, 2012; 7 pages.
Office Action issued in related U.S. Appl. No. 11/864,863 on Dec. 22, 2011; 20 pages.
Office Action issued in related U.S. Appl. No. 12/059,860 on Jan. 23, 2012; 16 pages.
Office Action issued in related U.S. Appl. No. 12/060,054 on Dec. 7, 2011; 15 pages.
Office Action issued in related U.S. Appl. No. 12/060,155 on Oct. 31, 2011; 15 pages.
Office Action issued in related U.S. Appl. No. 12/060,171 on Mar. 1, 2012; 19 pages.
Office Action issued in related U.S. Appl. No. 12/060,192 on Sep. 6, 2011; 18 pages.
Office Action issued in related U.S. Appl. No. 12/334,175 on May 27, 2011; 12 pages.
Office Action issued in U.S. Appl. No. 11/864,786 on Mar. 30, 2012; 12 pages.
Office Action issued in U.S. Appl. No. 12/059,804 on Nov. 14, 2011; 15 pages.
Office Action issued in U.S. Appl. No. 12/060,144 on Dec. 8, 2011; 18 pages.

(56) References Cited

OTHER PUBLICATIONS

Office Action issued in U.S. Appl. No. 12/147,414 on Oct. 26, 2011; 27 pages.
Office Action issued in U.S. Appl. No. 12/323,116 on Jan. 27, 2012; 7 pages.
Office Action issued in U.S. Appl. No. 12/323,116 on Sep. 6, 2011; 8 pages.
Office Action issued in U.S. Appl. No. 12/571,140 on Sep. 26, 2011; 14 pages.
Office Action issued in U.S. Appl. No. 12/571,154 on Apr. 2, 2012; 13 pages.
Office Action issued in U.S. Appl. No. 12/571,154 on Aug. 15, 2012; 15 pages.
Office Action issued in U.S. Appl. No. 12/815,618 on Dec. 22, 2011; 8 pages.
Office Action issued in U.S. Appl. No. 12/815,639 on May 24, 2012; 7 pages.
Office Action issued in U.S. Appl. No. 12/815,698 on Jan. 20, 2012; 10 pages.
Office Action issued in U.S. Appl. No. 12/815,698 on Jul. 20, 2012; 13 pages.
Office Action issued in U.S. Appl. No. 12/815,802 on Jul. 20, 2012; 16 pages.
Office Action issued in U.S. Appl. No. 12/816,083 on May 9, 2012; 20 pages.
Office Action issued in U.S. Appl. No. 12/816,170 on Jul. 24, 2012; 9 pages.
Office Action issued in U.S. Appl. No. 12/816,293 on Apr. 25, 2012; 10 pages.
Office Action issued in U.S. Appl. No. 13/192,543 on Aug. 28, 2012; 14 pages.
Office Action issued in U.S. Appl. No. 13/192,555 on Jul. 20, 2012; 7 pages.
SAP 2008 Annual Report; 256 pages.
Shi, Min-Hua et al.; "MQML—Message Queuing Markup Language"; Proceedings of the 4th IEEE International Workshop on Advanced Issues of E-Commerce and Web-Based Information Systems (WECWIS 2002); 2002; 8 pages.
Notice of Allowance issued in related U.S. Appl. No. 11/166,065 on Oct. 9, 2012; 10 pages.
Notice of Allowance issued in related U.S. Appl. No. 11/731,857 on Oct. 9, 2012; 7 pages.
Notice of Allowance issued in related U.S. Appl. No. 11/775,821 on Nov. 2, 2012; 5 pages.
Notice of Allowance issued in related U.S. Appl. No. 11/803,178 on Jul. 17, 2012; 15 pages.
Notice of Allowance issued in related U.S. Appl. No. 12/147,395 on Dec. 24, 2012; 11 pages.
Notice of Allowance issued in U.S. Appl. No. 11/155,368 on Jul. 23, 2012; 7 pages.
Notice of Allowance issued in U.S. Appl. No. 11/640,422 on May 22, 2012; 7 pages.
Notice of Allowance issued in U.S. Appl. No. 11/640,422 on Sep. 29, 2011; 7 pages.
Notice of Allowance issued in U.S. Appl. No. 11/864,786 on Nov. 7, 2012; 7 pages.
Notice of Allowance issued in U.S. Appl. No. 11/864,811 on Sep. 10, 2012; 10 pages.
Notice of Allowance issued in U.S. Appl. No. 12/060,062 on Nov. 9, 2012; 7 pages.
Notice of Allowance issued in U.S. Appl. No. 12/060,171 on Oct. 3, 2012; 10 pages.
Notice of Allowance issued in U.S. Appl. No. 12/060,192 on Oct. 29, 2012; 12 pages.
Notice of Allowance issued in U.S. Appl. No. 12/147,378 on Aug. 31, 2012; 9 pages.
Notice of Allowance issued in U.S. Appl. No. 12/571,140 on Nov. 9, 2012; 8 pages.
Notice of Allowance issued in U.S. Appl. No. 12/815,639 on Sep. 24, 2012; 9 pages.
Notice of Allowance issued in U.S. Appl. No. 12/816,293 on Sep. 19, 2012; 7 pages.
Office Action issued in U.S. Appl. No. 12/815,576 on Oct. 12, 2012; 11 pages.
Office Action issued in U.S. Appl. No. 12/815,750 on Sep. 28, 2012; 66 pages.
Office Action issued in U.S. Appl. No. 12/815,911 on Sep. 26, 2012; 14 pages.
Office Action issued in U.S. Appl. No. 12/816,083 on Sep. 21, 2012; 22 pages.
Office Action issued in U.S. Appl. No. 12/816,268 on Oct. 11, 2012; 11 pages.
Office Action issued in U.S. Appl. No. 13/192,574 on Oct. 24, 2012; 6 pages.
Office Action issued in U.S. Appl. No. 13/192,612 on Oct. 4, 2012; 12 pages.
Office Action issued in U.S. Appl. No. 13/535,881 on Dec. 21, 2012; 7 pages.
Business Object DTF, Common Business Objects, Ver 1.5; OMG Document bom; Framingham Corporate Center, Framingham, MA; 20 pages; Dec. 4, 1997.
Chou et al. "Web Services for Service-Oriented Communication", International Conference on Collaborative Computing: Networking, Applications and Worksharing, CollaborateCom 2006, pp. 1-8, 2006.
Intersystems, Evaluating Integration Software, Ensemble White Paper, 2007, http://www.intersystems.com/ensemble/whitepapers/pdf/evaluating-integration-software.pdf.
Nemuraite, Lina; "Business Object Modeling Framework for Distributed Enterprise", Kaunas University of Technology, Launas, Lithuania, Jan. 1999; pp. 189-202.
Oracle Application Integration Architecture Enterprise Business Objects (EBO) Concepts—Concepts, Structure, Terminologies and Design Rules, An Oracle White Paper; 29 pages; Aug. 2009.
Chinnapen-Rimer, Subendi et al.; "An XML Model for Use Across heterogeneous Client-Server Applications," IEEE Transactions on Intrumentastion and Measurement, Oct. 2008, vol. 50, No. 10, pp. 2128-2135.
Notice of Allowance issued in U.S. Appl. No. 11/155,368 on Jun. 13, 2013; 9 pages.
Notice of Allowance issued in U.S. Appl. No. 11/640,422 on Apr. 23, 2012; 8 pages.
Notice of Allowance issued in U.S. Appl. No. 11/864,811 on Mar. 19, 2013; 9 pages.
Notice of Allowance issued in U.S. Appl. No. 11/864,832 on Jul. 3, 2013; 14 pages.
Notice of Allowance issued in U.S. Appl. No. 11/864,866 on Jan. 25, 2013; 7 pages.
Notice of Allowance issued in U.S. Appl. No. 11/864,871 on Aug. 14, 2013; _pages.
Notice of Allowance issued in U.S. Appl. No. 12/059,867 on Jul. 17, 2013; 22 pages.
Notice of Allowance issued in U.S. Appl. No. 12/060,144 on Mar. 20, 2013; 12 pages.
Notice of Allowance issued in U.S. Appl. No. 12/060,149 on Jul. 9, 2013; 18 pages.
Notice of Allowance issued in U.S. Appl. No. 12/060,155 on Jan. 11, 2013; 5 pages.
Notice of Allowance issued in U.S. Appl. No. 12/060,178 on Feb. 14, 2013; 7 pages.
Notice of Allowance issued in U.S. Appl. No. 12/147,449 on Sep. 17, 2013; 9 pages.
Notice of Allowance issued in U.S. Appl. No. 12/323,116 on Jun. 27, 2013; 8 pages.
Notice of Allowance issued in U.S. Appl. No. 12/323,139 on Feb. 8, 2013; 9 pages.
Notice of Allowance issued in U.S. Appl. No. 12/147,414 on Jun. 19, 2013; 23 pages.
Notice of Allowance issued in U.S. Appl. No. 12/815,618 on May 7, 2013; 8 pages.
Notice of Allowance issued in U.S. Appl. No. 12/815,802 on Nov. 27, 2012; 9 pages.
Notice of Allowance issued in U.S. Appl. No. 13/186,361 on Jun. 10, 2013; 11 pages.

(56) References Cited

OTHER PUBLICATIONS

Notice of Allowance issued in U.S. Appl. No. 13/192,553 on May 1, 2013; 21 pages.
Notice of Allowance issued in U.S. Appl. No. 13/192,574 on Jun. 14, 2013; 11 pages.
Notice of Allowance issued in U.S. Appl. No. 13/192,599 on Sep. 12, 2013; 14 pages.
Notice of Allowance issued in U.S. Appl. No. 13/754,608 on Jul. 9, 2013; 12 pages.
Office Action issued in U.S. Appl. No. 12/815,576 on Feb. 15, 2013; 13 pages.
Office Action issued in U.S. Appl. No. 12/815,750 on Feb. 21, 2013; 67 pages.
Office Action issued in U.S. Appl. No. 12/815,869 on Feb. 15, 2013; 27 pages.
Office Action issued in U.S. Appl. No. 12/815,869 on Jul. 18, 2013; 27 pages.
Office Action issued in U.S. Appl. No. 12/815,911 on Feb. 25, 2013; 15 pages.
Office Action issued in U.S. Appl. No. 12/816,268 on Apr. 26, 2013; 17 pages.
Office Action issued in U.S. Appl. No. 12/823,996 on Apr. 25, 2013; 8 pages.
Office Action issued in U.S. Appl. No. 12/823,996 on Mar. 22, 2013, 7 pages.
Office Action issued in U.S. Appl. No. 13/186,361 on Feb. 26, 2013, 10 pages.
Office Action issued in U.S. Appl. No. 13/192,543 on Dec. 13, 2012; 26 pages.
Office Action issued in U.S. Appl. No. 13/192,548 on Jun. 7, 2013; 15 pages.
Office Action issued in U.S. Appl. No. 13/192,553 on Feb. 11, 2013, 23 pages.
Office Action issued in U.S. Appl. No. 13/192,555 on Mar. 1, 2013; 11 pages.
Office Action issued in U.S. Appl. No. 13/192,564 on Apr. 22, 2013; 21 pages.
Office Action issued in U.S. Appl. No. 13/192,574 on Apr. 30, 2013; 5 pages.
Office Action issued in U.S. Appl. No. 13/192,599 on Mar. 21, 2013; 29 pages.
Office Action issued in U.S. Appl. No. 13/218,876 on Apr. 5, 2013; 10 pages.
Office Action issued in U.S. Appl. No. 13/218,876 on Jul. 16, 2013; 14 pages.
Office Action issued in U.S. Appl. No. 13/535,419 on Apr. 19, 2013; 14 pages.
Office Action issued in U.S. Appl. No. 13/535,433 on Mar. 4, 2013; 11 pages.
Office Action issued in U.S. Appl. No. 13/535,433 on Aug. 2, 2013; 11 pages.
Office Action issued in U.S. Appl. No. 13/535,435 on Jun. 21, 2013; 13 pages.
Office Action issued in U.S. Appl. No. 13/535,453 on Jul. 5, 2013; 22 pages.
Office Action issued in U.S. Appl. No. 13/535,512 on Jul. 5, 2013; 10 pages.
Office Action issued in U.S. Appl. No. 13/535,521 on Apr. 16, 2013; 16 pages.
Office Action issued in U.S. Appl. No. 13/535,625 on Aug. 15, 2013; 22 pages.
Office Action issued in U.S. Appl. No. 13/535,648 on Jun. 21, 2013; 14 pages.
Office Action issued in U.S. Appl. No. 13/535,667 on Dec. 26, 2012; 9 pages.
Office Action issued in U.S. Appl. No. 13/535,667 on Jun. 26, 2013; 12 pages.
Office Action issued in U.S. Appl. No. 13/535,674 on Jul. 3, 2013; 17 pages.
Office Action issued in U.S. Appl. No. 13/535,723 on Apr. 24, 2013; 16 pages.
Office Action Issued in U.S. Appl. No. 13/535,864 on May 10, 2013; 9 pages.
Office Action issued in U.S. Appl. No. 13/754,608 on Apr. 215, 2013; 15 pages.
Office Action issued in U.S. Appl. No. 13/535,670 on Jun. 24, 2013; 13 pages.

* cited by examiner

FIG. 63-1

| Package | level 1 | level 2 | level 3 | level 4 | level 5 | level 6 | level 7 | level 8 | level 9 | level 10 | Data Type Name |
|---|---|---|---|---|---|---|---|---|---|---|---|
| CreditPortfolioModelFSInputDataRequest 630000 | CreditPortfolioModelFSInputDataRequest 630002 | | | | | | | | | | CreditPortfolioModelFSInputDataYieldCurveRequestMessage 630004 |
| MessageHeader 630006 | | MessageHeader 630008 | | | | | | | | | BusinessDocumentMessageHeader 630010 |
| CreditPortfolioModel 630012 | | CreditPortfolioModel 630014 | | | | | | | | | |

FIG. 63-2

| Package | level 1 | level 2 | level 3 | level 4 | level 5 | level 6 | level 7 | level 8 | level 9 | level 10 | Data Type Name |
|---|---|---|---|---|---|---|---|---|---|---|---|
| | | | ID 630016 | | | | | | | | PDT_CreditPortfolioModelID 630018 |
| | | | CreditPortfolioManagementProcessControl 630020 | | | | | | | | |
| | | | | DataTransferID 630022 | | | | | | | PDT_CreditPortfolioManagementProcessControlDataTransferID 630024 |
| | | | CreditPortfolio 630026 | | | | | | | | |

FIG. 63-3

| Package | level 1 | level 2 | level 3 | level 4 | level 5 | level 6 | level 7 | level 8 | level 9 | level 10 | Data Type Name |
|---|---|---|---|---|---|---|---|---|---|---|---|
| | | | | ID 630028 | | | | | | | PDT_CreditPortfolioID 630030 |
| InputData 630032 | | | InputData 630034 | | | | | | | | |
| YieldCurve 630036 | | | | YieldCurve 630038 | | | | | | | |
| | | | | | ID 630040 | | | | | | YieldCurveID 630042 |
| | | | | | YieldCurveModelID 630044 | | | | | | PDT_YieldCurveModelID 630046 |
| | | | | | ValidityDate 630048 | | | | | | Date 630050 |
| Item 630052 | | | | | Item 630054 | | | | | | |

FIG. 63-4

| Package | level 1 | level 2 | level 3 | level 4 | level 5 | level 6 | level 7 | level 8 | level 9 | level 10 | Data Type Name |
|---|---|---|---|---|---|---|---|---|---|---|---|
| | | | | | | TenorDuration 630056 | | | | | Duration 630058 |
| | | | | | | InterestRateDoubleValue 630060 | | | | | DoubleValue 630062 |
| ExchangeRateItem 630064 | | | | ExchangeRate 630066 | | | | | | | |
| | | | | | ID 630068 | | | | | | PDT_ExchangeRateID 630070 |
| | | | | | ValidityDate 630072 | | | | | | Date 630074 |
| | | | | | ExchangeRate 630076 | | | | | | ExchangeRate 630078 |

FIG. 63-5

| Package | level 1 | level 2 | level 3 | level 4 | level 5 | level 6 | level 7 | level 8 | level 9 | level 10 | Data Type Name |
|---|---|---|---|---|---|---|---|---|---|---|---|
| RatingTransition Matrix 630080 | | | | RatingTransitionMatrix 630082 | | | | | | | |
| | | | | | ID 630084 | | | | | | PDT_RatingTransitionMatrixID 630086 |
| | | | | | RatingModelID 630088 | | | | | | PDT_RatingModelID 630090 |
| | | | | | ValidityDatePeriod 630092 | | | | | | CLOSED_DatePeriod 630094 |
| Item 630096 | | | | | Item 630098 | | | | | | |

FIG. 63-6

| Package | level 1 | level 2 | level 3 | level 4 | level 5 | level 6 | level 7 | level 8 | level 9 | level 10 | Data Type Name |
|---|---|---|---|---|---|---|---|---|---|---|---|
| | | | | | | PeriodBeginCreditRatingCode 630100 | | | | | CreditRatingCode 630102 |
| | | | | | | PeriodEndCreditRatingCode 630104 | | | | | CreditRatingCode 630106 |
| | | | | | | ProbabilityOfTransitionDoubleValue 630108 | | | | | DoubleValue 630110 |
| CreditSpreadMatrix 630112 | | | | CreditSpreadMatrix 630114 | | | | | | | |

FIG. 63-7

| Package | level 1 | level 2 | level 3 | level 4 | level 5 | level 6 | level 7 | level 8 | level 9 | level 10 | Data Type Name |
|---|---|---|---|---|---|---|---|---|---|---|---|
| | | | | | ID 630116 | | | | | | PDT_CreditSpreadMatrixID 630118 |
| | | | | | RatingModelID 630120 | | | | | | PDT_RatingModelID 630122 |
| | | | | | ValidityDate 630124 | | | | | | Date 630126 |
| Item 630128 | | | | | Item 630130 | | | | | | |
| | | | | | | CreditRatingCode 630132 | | | | | CreditRatingCode 630134 |
| | | | | | | YieldCurveModelID 630136 | | | | | PDT_YieldCurveModelID 630138 |

FIG. 63-8

| Package | level 1 | level 2 | level 3 | level 4 | level 5 | level 6 | level 7 | level 8 | level 9 | level 10 | Data Type Name |
|---|---|---|---|---|---|---|---|---|---|---|---|
| | | | | | | CreditSpread 630140 | | | | | |
| | | | | | | | TermDuration 630142 | | | | Duration 630144 |
| | | | | | | | SpreadDecimalValue 630146 | | | | DecimalValue 630148 |
| ProbabilityOfDefaultCalibrationMatrix 630150 | | | | ProbabilityOfDefaultCalibrationMatrix 630152 | | | | | | | |
| | | | | | ID 630154 | | | | | | PDT_ProbabilityOfDefaultCalibrationMatrixID 630156 |

FIG. 63-9

| Package | level 1 | level 2 | level 3 | level 4 | level 5 | level 6 | level 7 | level 8 | level 9 | level 10 | Data Type Name |
|---|---|---|---|---|---|---|---|---|---|---|---|
| | | | | | RatingModelID 630158 | | | | | | PDT_RatingModelID 630160 |
| | | | | | ValidityDate 630162 | | | | | | Date 630164 |
| Item 630166 | | | | | Item 630168 | | | | | | |
| | | | | | | CreditRatingCode 630170 | | | | | CreditRatingCode 630172 |
| | | | | | | ProbabilityOfDefault 630174 | | | | | |
| | | | | | | | TermDuration 630176 | | | | Duration 630178 |

FIG. 63-10

| Package | | | | | level 1 | level 2 | level 3 | level 4 | level 5 | level 6 | level 7 | level 8 | level 9 | level 10 | Data Type Name |
|---|---|---|---|---|---|---|---|---|---|---|---|---|---|---|---|
| | | | | | | | | | | | ProbabilityOfDefaultDoubleValue 630180 | | | | DoubleValue 630182 |
| | | | TraditionalOffBalanceSheetItem 630184 | | | | | TraditionalOffBalanceSheetItem 630186 | | | | | | | |
| | | | | | | | | | ID 630188 | | | | | | PDT_TraditionalOffBalanceSheetItemID 630190 |
| | | | | | | | | | GuaranteeID 630192 | | | | | | Identifier 630194 |

FIG. 63-11

| Package | | | | | level 1 | level 2 | level 3 | level 4 | level 5 | level 6 | level 7 | level 8 | level 9 | level 10 | Data Type Name |
|---|---|---|---|---|---|---|---|---|---|---|---|---|---|---|---|
| | | | | | | | | | Description 630196 | | | | | | Description 630198 |
| | | | | | | | | | CurrencyCode 630200 | | | | | | CurrencyCode 630202 |
| | | | | | | | | | ValidityPeriod 630204 | | | | | | CLOSED_DatePeriod 630206 |
| | | | | | | | | | ExternalLineAmount 630208 | | | | | | Amount 630210 |
| | | | | | | | | | UtilizationAmount 630212 | | | | | | Amount 630214 |
| | | | | Counterparty 630216 | | | | | Counterparty 630218 | | | | | | |

FIG. 63-12

| Package | | | | | | level 1 | level 2 | level 3 | level 4 | level 5 | level 6 | level 7 | level 8 | level 9 | level 10 | Data Type Name |
|---|---|---|---|---|---|---|---|---|---|---|---|---|---|---|---|---|
| | | | | | | | | | | | InternalID 630220 | | | | | PartyInternalID 630222 |
| | | | | | GuarantorParty 630224 | | | | | Guarantor Party 630226 | | | | | | |
| | | | | | | | | | | | InternalID 630228 | | | | | PartyInternalID 630230 |
| | | | | | | | | | | | GuarantorSubstitutionCategoryCode 630232 | | | | | CategoryCode 630234 |

FIG. 63-13

| Package | level 1 | level 2 | level 3 | level 4 | level 5 | level 6 | level 7 | level 8 | level 9 | level 10 | Data Type Name |
|---|---|---|---|---|---|---|---|---|---|---|---|
| CreditExposureData 630236 | | | | | CreditExposureData 630238 | | | | | | |
| | | | | | | LossGivenDefaultDecimalValue 630240 | | | | | DecimalValue 630242 |
| | | | | | | ShapeBetaDistributionDecimalValue 630244 | | | | | DecimalValue 630246 |
| | | | | | | ExpectedLossGivenDefaultDecimalValue 630248 | | | | | DecimalValue 630250 |

FIG. 63-14

| Package | level 1 | level 2 | level 3 | level 4 | level 5 | level 6 | level 7 | level 8 | level 9 | level 10 | Data Type Name |
|---|---|---|---|---|---|---|---|---|---|---|---|
| | | | | | | ExposureAtDefaultAmount 630252 | | | | | Amount 630254 |
| | | | | | | ExpectedUsageDecimalValue 630256 | | | | | DecimalValue 630258 |
| | | | | | | UsageGivenDefaultDecimalValue 630260 | | | | | DecimalValue 630262 |
| | | | | | | CreditPortfolioManagementProductCode 630264 | | | | | Code 630266 |

FIG. 63-15

| Package | level 1 | level 2 | level 3 | level 4 | level 5 | level 6 | level 7 | level 8 | level 9 | level 10 | Data Type Name |
|---|---|---|---|---|---|---|---|---|---|---|---|
| | | | | | | IndividualAggregationConstituentsNumberValue 630268 | | | | | NumberValue 630270 |
| | | | | | | ActualAggregateNumberValue 630272 | | | | | NumberValue 630274 |
| | | | | | | PriceAtHorizon 630276 | | | | | |
| | | | | | | | Duration 630278 | | | | Duration 630280 |
| | | | | | | | Amount 630282 | | | | Amount 630284 |

FIG. 63-16

| Package | level 1 | level 2 | level 3 | level 4 | level 5 | level 6 | level 7 | level 8 | level 9 | level 10 | Data Type Name |
|---|---|---|---|---|---|---|---|---|---|---|---|
| | | | | | | | DecimalValue 630286 | | | | DecimalValue 630288 |
| | | | | | | CurrentPrice 630290 | | | | | |
| | | | | | | | Amount 630292 | | | | Amount 630294 |
| | | | | | | | DecimalValue 630296 | | | | DecimalValue 630298 |
| FinancialCondition 630300 | | | | | FinancialCondition 630302 | | | | | | |
| | | | | | | InterestCondition 630304 | | | | | |

FIG. 63-17

| Package | | | | | level 1 | level 2 | level 3 | level 4 | level 5 | level 6 | level 7 | level 8 | level 9 | level 10 | Data Type Name |
|---|---|---|---|---|---|---|---|---|---|---|---|---|---|---|---|
| | | | | | | | | | | | BankContractFinancialConditionSpecification 630306 | | | | |
| | | | | | | | | | | | | BankContractFinancialConditionUsageCode 630308 | | | BankContractFinancialConditionTypeUsageCode 630310 |
| | | | | | | | | | | | | Calculation 630312 | | | |
| | | | | | | | | | | | | | RecurrenceSpecification 630314 | | |

FIG. 63-18

| Package | | | | | level 1 | level 2 | level 3 | level 4 | level 5 | level 6 | level 7 | level 8 | level 9 | level 10 | Data Type Name |
|---|---|---|---|---|---|---|---|---|---|---|---|---|---|---|---|
| | | | | | | | | | | | | | | PeriodDurationDayRecurrence 630316 | PeriodDurationDayRecurrence 630318 |
| | | | | | | | | | | | | AmountSpecification 630320 | | | |
| | | | | | | | | | | | | | Amount 630322 | | Amount 630324 |
| | | | | | | | | | | | | | Percent 630326 | | Percent 630328 |
| | | | | | | | | | | | | | InterestSpecification 630330 | | |

FIG. 63-19

| Package | | | | | level 1 | level 2 | level 3 | level 4 | level 5 | level 6 | level 7 | level 8 | level 9 | level 10 | Data Type Name |
|---|---|---|---|---|---|---|---|---|---|---|---|---|---|---|---|
| | | | | | | | | | | | | | | InterestCalculationMethodCode 630332 | InterestCalculationMethodCode 630334 |
| | | | | | | | | | | | | | VariableInterest 630336 | | |
| | | | | | | | | | | | | | | ReferenceInterestCurveCode 630338 | ReferenceInterestCurveCode 630340 |
| | | | | | | | | | | | | | | MarginPercent 630342 | Percent; Qualifier: Margin 630344 |

FIG. 63-20

| Package | | | | | level 1 | level 2 | level 3 | level 4 | level 5 | level 6 | level 7 | level 8 | level 9 | level 10 | Data Type Name |
|---|---|---|---|---|---|---|---|---|---|---|---|---|---|---|---|
| | | | | | | | | | | | | | | AdjustmentRecuurence 630346 | |
| | | | | | | | | | | | | | | YieldCurveModelID 630348 | PDT_YieldCurveModelID 630350 |
| | | | | | | | | | | FeeCondition 630352 | | | | | |
| | | | | | | | | | | | BankContractFinancialConditionSpecification 630354 | | | | |

FIG. 63-21

| Package | | | | | level 1 | level 2 | level 3 | level 4 | level 5 | level 6 | level 7 | level 8 | level 9 | level 10 | Data Type Name |
|---|---|---|---|---|---|---|---|---|---|---|---|---|---|---|---|
| | | | | | | | | | | | | BankContractFinancialConditionUsageCode 630356 | | | BankContractFinancialConditionTypeUsageCode 630358 |
| | | | | | | | | | | | | Calculation 630360 | | | |
| | | | | | | | | | | | | | RecurrenceSpecification 630362 | | |
| | | | | | | | | | | | | | | PeriodDurationDayRecurrence 630364 | PeriodDurationDayRecurrence 630366 |

FIG. 63-22

| Package | | | | | level 1 | level 2 | level 3 | level 4 | level 5 | level 6 | level 7 | level 8 | level 9 | level 10 | Data Type Name |
|---|---|---|---|---|---|---|---|---|---|---|---|---|---|---|---|
| | | | | | | | | | | | | AmountSpecification 630368 | | | |
| | | | | | | | | | | | | | Amount 630370 | | Amount 630372 |
| | | | | | | | | | | | | | Percent 630374 | | Percent 630376 |
| | | | | | | | | | | PaymentCondition 630378 | | | | | |
| | | | | | | | | | | | BankContractFinancialConditionSpecification 630380 | | | | |

FIG. 63-23

| Package | | | | | level 1 | level 2 | level 3 | level 4 | level 5 | level 6 | level 7 | level 8 | level 9 | level 10 | Data Type Name |
|---|---|---|---|---|---|---|---|---|---|---|---|---|---|---|---|
| | | | | | | | | | | | | BankContractFinancialConditionUsageCode 630382 | | | BankContractFinancialConditionTypeUsageCode 630384 |
| | | | | | | | | | | | | Calculation 630386 | | | |
| | | | | | | | | | | | | | RecurrenceSpecification 630388 | | |
| | | | | | | | | | | | | | | PeriodDurationDayRecurrence 630390 | PeriodDurationDayRecurrence 630392 |

FIG. 63-24

| Package | level 1 | level 2 | level 3 | level 4 | level 5 | level 6 | level 7 | level 8 | level 9 | level 10 | Data Type Name |
|---|---|---|---|---|---|---|---|---|---|---|---|
| | | | | | | | | AmountSpecification 630394 | | | |
| | | | | | | | | | Amount 630396 | | Amount 630398 |
| | | | | | | | | | Percent 630400 | | Percent 630402 |
| ProbabilityOfDefault 630404 | | | | | ProbabilityOfDefault 630406 | | | | | | |
| | | | | | | ValidityDatePeriod 630408 | | | | | CLOSED_DatePeriod 630410 |
| | | | | | | TermDuration 630412 | | | | | Duration 630414 |

FIG. 63-25

| Package | | | | | level 1 | level 2 | level 3 | level 4 | level 5 | level 6 | level 7 | level 8 | level 9 | level 10 | Data Type Name |
|---|---|---|---|---|---|---|---|---|---|---|---|---|---|---|---|
| | | | | | | | | | | ProbabilityOfDefaultDoubleValue 630416 | | | | | DoubleValue 630418 |
| | | | | Rating 630420 | | | | | Rating 630422 | | | | | | |
| | | | | | | | | | | ModelID 630424 | | | | | PDT_RatingModelID 630426 |
| | | | | | | | | | | ValidityDatePeriod 630428 | | | | | CLOSED_DatePeriod 630430 |
| | | | | | | | | | | Code 630432 | | | | | CreditRatingCode 630434 |

FIG. 63-26

| Package | | | | | level 1 | level 2 | level 3 | level 4 | level 5 | level 6 | level 7 | level 8 | level 9 | level 10 | Data Type Name |
|---|---|---|---|---|---|---|---|---|---|---|---|---|---|---|---|
| | | | | | | | | | | MasterCreditRatingCode 630436 | | | | | CreditRatingCode 630438 |
| | | | | | | | | | | InternalRatingIndicator 630440 | | | | | Indicator 630442 |
| | | | | | | | | | | MaturityCode 630444 | | | | | Code 630446 |
| | | | | | | | | | | Date 630448 | | | | | Date 630450 |
| | | | | | | | | | | TendencyCode 630452 | | | | | Code 630454 |

FIG. 63-27

| Package | level 1 | level 2 | level 3 | level 4 | level 5 | level 6 | level 7 | level 8 | level 9 | level 10 | Data Type Name |
|---|---|---|---|---|---|---|---|---|---|---|---|
| ProbabilityOfDefaultPriceMatrix 630456 | | | | | ProbabilityOfDefaultPriceMatrix 630458 | | | | | | |
| | | | | | | item 630460 | | | | | |
| | | | | | | | ValidityDate 630462 | | | | Date 630464 |
| | | | | | | | ProbabilityOfDefaultDecimalValue 630466 | | | | DecimalValue 630468 |
| | | | | | | | UsageDecimalValue 630470 | | | | DecimalValue 630472 |

FIG. 63-28

| Package | | | | | level 1 | level 2 | level 3 | level 4 | level 5 | level 6 | level 7 | level 8 | level 9 | level 10 | Data Type Name |
|---|---|---|---|---|---|---|---|---|---|---|---|---|---|---|---|
| | | | | | | | | | | | CommitmentFeeDecimalValue 630474 | | | | DecimalValue 630476 |
| | | | | | | | | | | | FacilityFeeDecimalValue 630478 | | | | DecimalValue 630480 |
| | | | | | | | | | | | SpreadDecimalValue 630482 | | | | DecimalValue 630484 |
| | | | | RatingPriceMatrix 630486 | | | | | RatingPriceMatrix 630488 | | | | | | |
| | | | | | | | | | | Item 630490 | | | | | |

FIG. 63-29

| Package | level 1 | level 2 | level 3 | level 4 | level 5 | level 6 | level 7 | level 8 | level 9 | level 10 | Data Type Name |
|---|---|---|---|---|---|---|---|---|---|---|---|
| | | | | | | | ValidityDate 630492 | | | | Date 630494 |
| | | | | | | | RatingModelID 630496 | | | | PDT_RatingModelID 630498 |
| | | | | | | | MinimumCreditRatingCode 630500 | | | | CreditRatingCode 630502 |
| | | | | | | | MaximumCreditRatingCode 630504 | | | | CreditRatingCode 630506 |
| | | | | | | | ProbabilityOfDefaultCalibrationMatrixID 630508 | | | | PDT_ProbabilityOfDefaultCalibrationMatrixID 630510 |

FIG. 63-30

| Package | | level 1 | level 2 | level 3 | level 4 | level 5 | level 6 | level 7 | level 8 | level 9 | level 10 | Data Type Name |
|---|---|---|---|---|---|---|---|---|---|---|---|---|
| | | | | | | | | UsageDecimalValue 630512 | | | | DecimalValue 630514 |
| | | | | | | | | CommitmentFeeDecimalValue 630516 | | | | DecimalValue 630518 |
| | | | | | | | | FacilityFeeDecimalValue 630520 | | | | DecimalValue 630522 |
| | | | | | | | | SpreadDecimalValue 630524 | | | | DecimalValue 630526 |
| | Prepayment 630528 | | | | | Prepayment 630530 | | | | | | |

FIG. 63-31

| Package | level 1 | level 2 | level 3 | level 4 | level 5 | level 6 | level 7 | level 8 | level 9 | level 10 | Data Type Name |
|---|---|---|---|---|---|---|---|---|---|---|---|
| | | | | | | PrepayableIndicator 630532 | | | | | Indicator 630534 |
| | | | | | | Item 630536 | | | | | |
| | | | | | | | PaymentDate 630538 | | | | Date 630540 |
| | | | | | | | CostsOfPrepaymentFractionDecimalValue 630542 | | | | DecimalValue 630544 |
| | | | | | | | PenaltyOfPrepaymentFractionDecimalValue 630546 | | | | DecimalValue 630548 |

FIG. 63-32

| Package | level 1 | level 2 | level 3 | level 4 | level 5 | level 6 | level 7 | level 8 | level 9 | level 10 | Data Type Name |
|---|---|---|---|---|---|---|---|---|---|---|---|
| Spread Curve 630550 | | | | | SpreadCurve 630552 | | | | | | |
| | | | | | | Item 630554 | | | | | |
| | | | | | | | ValidityDate 630556 | | | | Date 630558 |
| | | | | | | | Duration 630560 | | | | Duration 630562 |
| | | | | | | | SpreadDecimalValue 630564 | | | | DecimalValue 630566 |
| Property 630568 | | | | | Property 630570 | | | | | | |

FIG. 63-33

| Package | level 1 | level 2 | level 3 | level 4 | level 5 | level 6 | level 7 | level 8 | level 9 | level 10 | Data Type Name |
|---|---|---|---|---|---|---|---|---|---|---|---|
| | | | | | | ID 630572 | | | | | PropertyID 630574 |
| | | | | | | Value 630576 | | | | | PropertyValue 630578 |
| Loan 630580 | | | | Loan 630582 | | | | | | | |
| | | | | | ID 630584 | | | | | | PDT_LoanID 630586 |
| | | | | | GuaranteeID 630588 | | | | | | Identifier 630590 |
| | | | | | Description 630592 | | | | | | Description 630594 |
| | | | | | CurrencyCode 630596 | | | | | | CurrencyCode 630598 |

FIG. 63-34

| Package | | | | | level 1 | level 2 | level 3 | level 4 | level 5 | level 6 | level 7 | level 8 | level 9 | level 10 | Data Type Name |
|---|---|---|---|---|---|---|---|---|---|---|---|---|---|---|---|
| | | | | | | | | | ValidityPeriod 630600 | | | | | | CLOSED_DatePeriod 630602 |
| | | | | | | | | | ExternalLineAmount 630604 | | | | | | Amount 630606 |
| | | | | | | | | | UtilizationAmount 630608 | | | | | | Amount 630610 |
| | | | | Counterparty 630612 | | | | | Counterparty 630614 | | | | | | |
| | | | | | | | | | | InternalID 630616 | | | | | PartyInternalID 630618 |

FIG. 63-35

| Package | level 1 | level 2 | level 3 | level 4 | level 5 | level 6 | level 7 | level 8 | level 9 | level 10 | Data Type Name |
|---|---|---|---|---|---|---|---|---|---|---|---|
| GuarantorParty 630620 | | | | | GuarantorParty 630622 | | | | | | |
| | | | | | | InternalID 630624 | | | | | PartyInternalID 630626 |
| | | | | | | GuarantorSubstitutionCategoryCode 630628 | | | | | Code 630630 |
| CreditExposureData 630632 | | | | | CreditExposureData 630634 | | | | | | |

FIG. 63-36

| Package | | | | | level 1 | level 2 | level 3 | level 4 | level 5 | level 6 | level 7 | level 8 | level 9 | level 10 | Data Type Name |
|---|---|---|---|---|---|---|---|---|---|---|---|---|---|---|---|
| | | | | | | | | | | LossGivenDefaultDecimalValue 630636 | | | | | DecimalValue 630638 |
| | | | | | | | | | | ShapeBetaDistributionDecimalValue 630640 | | | | | DecimalValue 630642 |
| | | | | | | | | | | ExpectedLossGivenDefaultDecimalValue 630644 | | | | | DecimalValue 630646 |
| | | | | | | | | | | ExposureAtDefaultAmount 630648 | | | | | Amount 630650 |

FIG. 63-37

| Package | level 1 | level 2 | level 3 | level 4 | level 5 | level 6 | level 7 | level 8 | level 9 | level 10 | Data Type Name |
|---|---|---|---|---|---|---|---|---|---|---|---|
| | | | | | | ExpectedUsageDecimalValue 630652 | | | | | DecimalValue 630654 |
| | | | | | | UsageGivenDefaultDecimalValue 630656 | | | | | DecimalValue 630658 |
| | | | | | | CreditPortfolioManagementProductCode 630660 | | | | | Code 630662 |
| | | | | | | IndividualAggregationConstituentsNumberValue 630664 | | | | | NumberValue 630666 |

FIG. 63-38

| Package | level 1 | level 2 | level 3 | level 4 | level 5 | level 6 | level 7 | level 8 | level 9 | level 10 | Data Type Name |
|---|---|---|---|---|---|---|---|---|---|---|---|
| | | | | | | ActualAggregateNumberValue 630668 | | | | | NumberValue 630670 |
| | | | | | | PriceAtHorizon 630672 | | | | | |
| | | | | | | | Duration 630674 | | | | Duration 630676 |
| | | | | | | | Amount 630678 | | | | Amount 630680 |
| | | | | | | | DecimalValue 630682 | | | | DecimalValue 630684 |
| | | | | | | CurrentPrice 630686 | | | | | |

FIG. 63-39

| Package | | | | | | level 1 | level 2 | level 3 | level 4 | level 5 | level 6 | level 7 | level 8 | level 9 | level 10 | Data Type Name |
|---|---|---|---|---|---|---|---|---|---|---|---|---|---|---|---|---|
| | | | | | | | | | | | | Amount 630688 | | | | Amount 630690 |
| | | | | | | | | | | | | DecimalValue 630692 | | | | DecimalValue 630694 |
| | | | | | FinancialCondition 630696 | | | | | FinancialCondition 630698 | | | | | | |
| | | | | | | | | | | | InterestCondition 630700 | | | | | |
| | | | | | | | | | | | | BankContractFinancialConditionSpecification 630702 | | | | |

FIG. 63-40

| Package | level 1 | level 2 | level 3 | level 4 | level 5 | level 6 | level 7 | level 8 | level 9 | level 10 | Data Type Name |
|---|---|---|---|---|---|---|---|---|---|---|---|
| | | | | | | | | BankContractFinancialConditionUsageCode 630704 | | | BankContractFinancialConditionTypeUsageCode 630706 |
| | | | | | | | | Calculation 630708 | | | |
| | | | | | | | | | RecurrenceSpecification 630710 | | |
| | | | | | | | | | | PeriodDurationDayRecurrence 630712 | PeriodDurationDayRecurrence 630714 |

FIG. 63-41

| Package | | | | | level 1 | level 2 | level 3 | level 4 | level 5 | level 6 | level 7 | level 8 | level 9 | level 10 | Data Type Name |
|---|---|---|---|---|---|---|---|---|---|---|---|---|---|---|---|
| | | | | | | | | | | | | AmountSpecification 630716 | | | |
| | | | | | | | | | | | | | Amount 630718 | | Amount 630720 |
| | | | | | | | | | | | | | Percent 630722 | | Percent 630724 |
| | | | | | | | | | | | | | InterestSpecification 630726 | | |
| | | | | | | | | | | | | | | InterestCalculationMethodCode 630728 | InterestCalculationMethodCode 630730 |

FIG. 63-42

| Package | level 1 | level 2 | level 3 | level 4 | level 5 | level 6 | level 7 | level 8 | level 9 | level 10 | Data Type Name |
|---|---|---|---|---|---|---|---|---|---|---|---|
| | | | | | | | | | VariableInterest 630732 | | |
| | | | | | | | | | | ReferenceInterestCurveCode 630734 | ReferenceInterestCurveCode 630736 |
| | | | | | | | | | | MarginPercent 630738 | Percent; Qualifier: Margin 630740 |
| | | | | | | | | | | AdjustmentRecuurence 630742 | |
| | | | | | | | | | | YieldCurveModelID 630744 | PDT_YieldCurveModelID 630746 |

FIG. 63-43

| Package | level 1 | level 2 | level 3 | level 4 | level 5 | level 6 | level 7 | level 8 | level 9 | level 10 | Data Type Name |
|---|---|---|---|---|---|---|---|---|---|---|---|
| | | | | | | FeeCondition 630748 | | | | | |
| | | | | | | | BankContractFinancialConditionSpecification 630750 | | | | |
| | | | | | | | | BankContractFinancialConditionUsageCode 630752 | | | BankContractFinancialConditionTypeUsageCode 630754 |
| | | | | | | | | Calculation 630756 | | | |

FIG. 63-44

| Package | level 1 | level 2 | level 3 | level 4 | level 5 | level 6 | level 7 | level 8 | level 9 | level 10 | Data Type Name |
|---|---|---|---|---|---|---|---|---|---|---|---|
| | | | | | | | | | RecurrenceSpecification 630758 | | |
| | | | | | | | | | | PeriodDurationDayRecurrence 630760 | PeriodDurationDayRecurrence 630762 |
| | | | | | | | | AmountSpecification 630764 | | | |
| | | | | | | | | | Amount 630766 | | Amount 630768 |
| | | | | | | | | | Percent 630770 | | Percent 630772 |
| | | | | | | PaymentCondition 630774 | | | | | |

FIG. 63-45

| Package | level 1 | level 2 | level 3 | level 4 | level 5 | level 6 | level 7 | level 8 | level 9 | level 10 | Data Type Name |
|---|---|---|---|---|---|---|---|---|---|---|---|
| | | | | | | | BankContractFinancialConditionSpecification 630776 | | | | |
| | | | | | | | | BankContractFinancialConditionUsageCode 630778 | | | BankContractFinancialConditionTypeUsageCode 630780 |
| | | | | | | | | Calculation 630782 | | | |
| | | | | | | | | | RecurrenceSpecification 630784 | | |

FIG. 63-46

| Package | | | | | | level 1 | level 2 | level 3 | level 4 | level 5 | level 6 | level 7 | level 8 | level 9 | level 10 | Data Type Name |
|---|---|---|---|---|---|---|---|---|---|---|---|---|---|---|---|---|
| | | | | | | | | | | | | | | | PeriodDurationDayRecurrence 630786 | PeriodDurationDayRecurrence 630788 |
| | | | | | | | | | | | | | AmountSpecification 630790 | | | |
| | | | | | | | | | | | | | | Amount 630792 | | Amount 630794 |
| | | | | | | | | | | | | | | Percent 630796 | | Percent 630798 |
| | | | | | CashFlowItem 630800 | | | | | CashFlowItem 630802 | | | | | | |

FIG. 63-47

| Package | level 1 | level 2 | level 3 | level 4 | level 5 | level 6 | level 7 | level 8 | level 9 | level 10 | Data Type Name |
|---|---|---|---|---|---|---|---|---|---|---|---|
| | | | | | | CashFlow Date 630804 | | | | | Date 630806 |
| | | | | | | InterestCashFlowAmount 630808 | | | | | Amount 630810 |
| | | | | | | ChargeCashFlowAmount 630812 | | | | | Amount 630814 |
| | | | | | | PaymentCashFlowAmount 630816 | | | | | Amount 630818 |
| ProbabilityOfDefault 630820 | | | | | ProbabilityOfDefault 630822 | | | | | | |

FIG. 63-48

| Package | | level 1 | level 2 | level 3 | level 4 | level 5 | level 6 | level 7 | level 8 | level 9 | level 10 | Data Type Name |
|---|---|---|---|---|---|---|---|---|---|---|---|---|
| | | | | | | | ValidityDatePeriod 630824 | | | | | CLOSED_DatePeriod 630826 |
| | | | | | | | TermDuration 630828 | | | | | Duration 630830 |
| | | | | | | | ProbabilityOfDefaultDoubleValue 630832 | | | | | DoubleValue 630834 |
| | Rating 630836 | | | | | Rating 630838 | | | | | | |
| | | | | | | | ModelID 630840 | | | | | PDT_RatingModelID 630842 |
| | | | | | | | ValidityDatePeriod 630844 | | | | | CLOSED_DatePeriod 630846 |

FIG. 63-49

| Package | level 1 | level 2 | level 3 | level 4 | level 5 | level 6 | level 7 | level 8 | level 9 | level 10 | Data Type Name |
|---|---|---|---|---|---|---|---|---|---|---|---|
| | | | | | | Code 630848 | | | | | CreditRatingCode 630850 |
| | | | | | | MasterCreditRatingCode 630852 | | | | | CreditRatingCode 630854 |
| | | | | | | InternalRatingIndicator 630856 | | | | | Indicator 630858 |
| | | | | | | MaturityCode 630860 | | | | | Code 630862 |
| | | | | | | Date 630864 | | | | | Date 630866 |
| | | | | | | TendencyCode 630868 | | | | | Code 630870 |

FIG. 63-50

| Package | level 1 | level 2 | level 3 | level 4 | level 5 | level 6 | level 7 | level 8 | level 9 | level 10 | Data Type Name |
|---|---|---|---|---|---|---|---|---|---|---|---|
| ProbabilityOfDefaultPriceMatrix 630872 | | | | | ProbabilityOfDefaultPriceMatrix 630874 | | | | | | |
| | | | | | | Item 630876 | | | | | |
| | | | | | | | ValidityDate 630878 | | | | Date 630880 |
| | | | | | | | ProbabilityOfDefaultDecimalValue 630882 | | | | DecimalValue 630884 |
| | | | | | | | UsageDecimalValue 630886 | | | | DecimalValue 630888 |

FIG. 63-51

| Package | level 1 | level 2 | level 3 | level 4 | level 5 | level 6 | level 7 | level 8 | level 9 | level 10 | Data Type Name |
|---|---|---|---|---|---|---|---|---|---|---|---|
| | | | | | | | CommitmentFeeDecimalValue 630890 | | | | DecimalValue 630892 |
| | | | | | | | FacilityFeeDecimalValue 630894 | | | | DecimalValue 630896 |
| | | | | | | | SpreadDecimalValue 630898 | | | | DecimalValue 630900 |
| RatingPriceMatrix 630902 | | | | | RatingPriceMatrix 630904 | | | | | | |
| | | | | | | Item 630906 | | | | | |

FIG. 63-52

| Package | level 1 | level 2 | level 3 | level 4 | level 5 | level 6 | level 7 | level 8 | level 9 | level 10 | Data Type Name |
|---|---|---|---|---|---|---|---|---|---|---|---|
| | | | | | | | ValidityDate 630908 | | | | Date 630910 |
| | | | | | | | RatingModelID 630912 | | | | PDT_RatingModelID 630914 |
| | | | | | | | MinimumCreditRatingCode 630916 | | | | CreditRatingCode 630918 |
| | | | | | | | MaximumCreditRatingCode 630920 | | | | CreditRatingCode 630922 |
| | | | | | | | ProbabilityOfDefaultCalibrationMatrixID 630924 | | | | PDT_ProbabilityOfDefaultCalibrationMatrixID 630926 |

FIG. 63-53

| Package | | | | | level 1 | level 2 | level 3 | level 4 | level 5 | level 6 | level 7 | level 8 | level 9 | level 10 | Data Type Name |
|---|---|---|---|---|---|---|---|---|---|---|---|---|---|---|---|
| | | | | | | | | | | | UsageDecimalValue 630928 | | | | DecimalValue 630930 |
| | | | | | | | | | | | CommitmentFeeDecimalValue 630932 | | | | DecimalValue 630934 |
| | | | | | | | | | | | FacilityFeeDecimalValue 630936 | | | | DecimalValue 630938 |
| | | | | | | | | | | | SpreadDecimalValue 630940 | | | | DecimalValue 630942 |
| | | | | Prepayment 630944 | | | | | Prepayment 630946 | | | | | | |

FIG. 63-54

| Package | level 1 | level 2 | level 3 | level 4 | level 5 | level 6 | level 7 | level 8 | level 9 | level 10 | Data Type Name |
|---|---|---|---|---|---|---|---|---|---|---|---|
| | | | | | | PrepayableIndicator 630948 | | | | | Indicator 630950 |
| | | | | | | Item 630952 | | | | | |
| | | | | | | | PaymentDate 630954 | | | | Date 630956 |
| | | | | | | | CostsOfPrepaymentFractionDecimalValue 630958 | | | | DecimalValue 630960 |
| | | | | | | | PenaltyOfPrepaymentFractionDecimalValue 630962 | | | | DecimalValue 630964 |

FIG. 63-55

| Package | level 1 | level 2 | level 3 | level 4 | level 5 | level 6 | level 7 | level 8 | level 9 | level 10 | Data Type Name |
|---|---|---|---|---|---|---|---|---|---|---|---|
| Spread Curve 630966 | | | | | SpreadCurve 630968 | | | | | | |
| | | | | | | Item 630970 | | | | | |
| | | | | | | | ValidityDate 630972 | | | | Date 630974 |
| | | | | | | | Duration 630976 | | | | Duration 630978 |
| | | | | | | | SpreadDecimalValue 630980 | | | | DecimalValue 630982 |
| Property 630984 | | | | | Property 630986 | | | | | | |

FIG. 63-56

| Package | level 1 | level 2 | level 3 | level 4 | level 5 | level 6 | level 7 | level 8 | level 9 | level 10 | Data Type Name |
|---|---|---|---|---|---|---|---|---|---|---|---|
| | | | | | | ID 630988 | | | | | PropertyID 630990 |
| | | | | | | Value 630992 | | | | | PropertyValue 630994 |
| OTCDerivative 630996 | | | | OTCDerivative 630998 | | | | | | | |
| | | | | | ID 631000 | | | | | | PDT_OTCDerivativeID 631002 |
| | | | | | GuaranteeID 631004 | | | | | | Identifier 631006 |
| | | | | | Description 631008 | | | | | | Description 631010 |

FIG. 63-57

| Package | level 1 | level 2 | level 3 | level 4 | level 5 | level 6 | level 7 | level 8 | level 9 | level 10 | Data Type Name |
|---|---|---|---|---|---|---|---|---|---|---|---|
| | | | | | CurrencyCode 631012 | | | | | | CurrencyCode 631014 |
| | | | | | ValidityPeriod 631016 | | | | | | CLOSED_Date Period 631018 |
| Counterparty 631020 | | | | | Counterparty 631022 | | | | | | |
| | | | | | | InternalID 631024 | | | | | PartyInternalID 631026 |
| GuarantorParty 631028 | | | | | Guarantor Party 631030 | | | | | | |

FIG. 63-58

| Package | | | | | level 1 | level 2 | level 3 | level 4 | level 5 | level 6 | level 7 | level 8 | level 9 | level 10 | Data Type Name |
|---|---|---|---|---|---|---|---|---|---|---|---|---|---|---|---|
| | | | | | | | | | | InternalID 631032 | | | | | PartyInternalID 631034 |
| | | | | | | | | | | GuarantorSubstitutionCategoryCode 631036 | | | | | CategoryCode 631038 |
| | | | | CreditExposureData 631040 | | | | | CreditExposureData 631042 | | | | | | |
| | | | | | | | | | | LossGivenDefaultDecimalValue 631044 | | | | | DecimalValue 631046 |

FIG. 63-59

| Package | level 1 | level 2 | level 3 | level 4 | level 5 | level 6 | level 7 | level 8 | level 9 | level 10 | Data Type Name |
|---|---|---|---|---|---|---|---|---|---|---|---|
| | | | | | | ShapeBetaDistributionDecimalValue 631048 | | | | | DecimalValue 631050 |
| | | | | | | ExpectedLossGivenDefaultDecimalValue 631052 | | | | | DecimalValue 631054 |
| | | | | | | ExposureAtDefaultAmount 631056 | | | | | Amount 631058 |
| | | | | | | PriceAtHorizon 631060 | | | | | |
| | | | | | | | Duration 631062 | | | | Duration 631064 |

FIG. 63-60

| Package | level 1 | level 2 | level 3 | level 4 | level 5 | level 6 | level 7 | level 8 | level 9 | level 10 | Data Type Name |
|---|---|---|---|---|---|---|---|---|---|---|---|
| | | | | | | | Amount 631066 | | | | Amount 631068 |
| | | | | | | | DecimalValue 631070 | | | | DecimalValue 631072 |
| | | | | | | CurrentPrice 631074 | | | | | |
| | | | | | | | Amount 631076 | | | | Amount 631078 |
| | | | | | | | DecimalValue 631080 | | | | DecimalValue 631082 |
| | | | | | | CreditPortfolioManagementProductCode 631084 | | | | | Code 631086 |

FIG. 63-61

| Package | level 1 | level 2 | level 3 | level 4 | level 5 | level 6 | level 7 | level 8 | level 9 | level 10 | Data Type Name |
|---|---|---|---|---|---|---|---|---|---|---|---|
| ProbabilityOfDefault 631088 | | | | | ProbabilityOfDefault 631090 | | | | | | |
| | | | | | | ValidityDatePeriod 631092 | | | | | CLOSED_DatePeriod 631094 |
| | | | | | | TermDuration 631096 | | | | | Duration 631098 |
| | | | | | | ProbabilityOfDefaultDecimalValue 631100 | | | | | Decimalvalue 631102 |
| Rating 631104 | | | | | Rating 631106 | | | | | | |

FIG. 63-62

| Package | level 1 | level 2 | level 3 | level 4 | level 5 | level 6 | level 7 | level 8 | level 9 | level 10 | Data Type Name |
|---|---|---|---|---|---|---|---|---|---|---|---|
| | | | | | | ValidityDatePeriod 631108 | | | | | CLOSED_DatePeriod 631110 |
| | | | | | | RatingModelID 631112 | | | | | PDT_RatingModelID 631114 |
| | | | | | | CreditRatingCode 631116 | | | | | CreditRatingCode 631118 |
| | | | | | | MasterCreditRatingCode 631120 | | | | | CreditRatingCode 631122 |
| | | | | | | RatingSource 631124 | | | | | RatingSource 631126 |
| | | | | | | MaturityCode 631128 | | | | | Code 631130 |

FIG. 63-63

| Package | | | | | level 1 | level 2 | level 3 | level 4 | level 5 | level 6 | level 7 | level 8 | level 9 | level 10 | Data Type Name |
|---|---|---|---|---|---|---|---|---|---|---|---|---|---|---|---|
| | | | | | | | | | | RatingDate 631132 | | | | | Date 631134 |
| | | | | | | | | | | RatingTen dencyCode 631136 | | | | | Code 631138 |
| | | | | Exposu re Profile 631140 | | | | | Exposure Profile 631142 | | | | | | |
| | | | | | | | | | | Item 631144 | | | | | |
| | | | | | | | | | | | Date 631146 | | | | Date 631148 |
| | | | | | | | | | | | NegativeEx posureAmo unt 631150 | | | | Amount 631152 |

FIG. 63-64

| Package | | | | | level 1 | level 2 | level 3 | level 4 | level 5 | level 6 | level 7 | level 8 | level 9 | level 10 | Data Type Name |
|---|---|---|---|---|---|---|---|---|---|---|---|---|---|---|---|
| | | | | | | | | | | | PositiveExposureAmount 631154 | | | | Amount 631156 |
| | | | | RiskFreeProfile 631158 | | | | | RiskFreeProfile 631160 | | | | | | |
| | | | | | | | | | | Item 631162 | | | | | |
| | | | | | | | | | | | Date 631164 | | | | Date 631166 |
| | | | | | | | | | | | RiskFreeAmount 631168 | | | | Amount 631170 |
| | | | | Property 631172 | | | | | Property 631174 | | | | | | Property 631176 |

FIG. 63-65

| Package | level 1 | level 2 | level 3 | level 4 | level 5 | level 6 | level 7 | level 8 | level 9 | level 10 | Data Type Name |
|---|---|---|---|---|---|---|---|---|---|---|---|
| | | | | | | ID 631178 | | | | | PropertyID 631180 |
| | | | | | | Value 631182 | | | | | PropertyValue 631184 |
| SecuritiesFinancingTransaction 631186 | | | | Securities Financing Transaction 631188 | | | | | | | |
| | | | | | ID 631190 | | | | | | PDT_SecuritiesFinancingTransactionID 631192 |
| | | | | | GuaranteeID 631194 | | | | | | Identifier 631196 |
| | | | | | Description 631198 | | | | | | Description 631200 |

FIG. 63-66

| Package | level 1 | level 2 | level 3 | level 4 | level 5 | level 6 | level 7 | level 8 | level 9 | level 10 | Data Type Name |
|---|---|---|---|---|---|---|---|---|---|---|---|
| | | | | | CurrencyCode 631202 | | | | | | CurrencyCode 631204 |
| | | | | | ValidityPeriod 631206 | | | | | | CLOSED_DatePeriod 631208 |
| Counterparty 631210 | | | | | Counterparty 631212 | | | | | | |
| | | | | | | InternalID 631214 | | | | | PartyInternalID 631216 |
| GuarantorParty 631218 | | | | | GuarantorParty 631220 | | | | | | |

FIG. 63-67

| Package | | | | | | level 1 | level 2 | level 3 | level 4 | level 5 | level 6 | level 7 | level 8 | level 9 | level 10 | Data Type Name |
|---|---|---|---|---|---|---|---|---|---|---|---|---|---|---|---|---|
| | | | | | | | | | | | InternalID 631222 | | | | | PartyInternalID 631224 |
| | | | | | | | | | | | GuarantorSubstitutionCategoryCode 631226 | | | | | CategoryCode 631228 |
| | | | | | CreditExposureData 631230 | | | | | CreditExposureData 631232 | | | | | | |
| | | | | | | | | | | | LossGivenDefaultDecimalValue 631234 | | | | | DecimalValue 631236 |

FIG. 63-68

| Package | | | | | level 1 | level 2 | level 3 | level 4 | level 5 | level 6 | level 7 | level 8 | level 9 | level 10 | Data Type Name |
|---|---|---|---|---|---|---|---|---|---|---|---|---|---|---|---|
| | | | | | | | | | | ShapeBetaDistributionDecimalValue 631238 | | | | | DecimalValue 631240 |
| | | | | | | | | | | ExpectedLossGivenDefaultDecimalValue 631242 | | | | | DecimalValue 631244 |
| | | | | | | | | | | ExposureAtDefaultAmount 631246 | | | | | Amount 631248 |
| | | | | | | | | | | PriceAtHorizon 631250 | | | | | |
| | | | | | | | | | | | Duration 631252 | | | | Duration 631254 |

FIG. 63-69

| Package | level 1 | level 2 | level 3 | level 4 | level 5 | level 6 | level 7 | level 8 | level 9 | level 10 | Data Type Name |
|---|---|---|---|---|---|---|---|---|---|---|---|
| | | | | | | | Amount 631256 | | | | Amount 631258 |
| | | | | | | | DecimalValue 631260 | | | | DecimalValue 631262 |
| | | | | | | CurrentPrice 631264 | | | | | |
| | | | | | | | Amount 631266 | | | | Amount 631268 |
| | | | | | | | DecimalValue 631270 | | | | DecimalValue 631272 |
| | | | | | | CreditPortfolioManagementProductCode 631274 | | | | | Code 631276 |

FIG. 63-70

| Package | | | | | level 1 | level 2 | level 3 | level 4 | level 5 | level 6 | level 7 | level 8 | level 9 | level 10 | Data Type Name |
|---|---|---|---|---|---|---|---|---|---|---|---|---|---|---|---|
| | | | | ProbabilityOfDefault 631278 | | | | | ProbabilityOfDefault 631280 | | | | | | |
| | | | | | | | | | | ValidityDatePeriod 631282 | | | | | CLOSED_DatePeriod 631284 |
| | | | | | | | | | | TermDuration 631286 | | | | | Duration 631288 |
| | | | | | | | | | | ProbabilityOfDefaultDoubleValue 631290 | | | | | DoubleValue 631292 |
| | | | | Rating 631294 | | | | | Rating 631296 | | | | | | |
| | | | | | | | | | | ModelID 631298 | | | | | PDT_RatingModelID 631300 |

FIG. 63-71

| Package | level 1 | level 2 | level 3 | level 4 | level 5 | level 6 | level 7 | level 8 | level 9 | level 10 | Data Type Name |
|---|---|---|---|---|---|---|---|---|---|---|---|
| | | | | | | ValidityDatePeriod 631302 | | | | | CLOSED_DatePeriod 631304 |
| | | | | | | Code 631306 | | | | | CreditRatingCode 631308 |
| | | | | | | MasterCreditRatingCode 631310 | | | | | CreditRatingCode 631312 |
| | | | | | | InternalRatingIndicator 631314 | | | | | Indicator 631316 |
| | | | | | | MaturityCode 631318 | | | | | Code 631320 |
| | | | | | | Date 631322 | | | | | Date 631324 |

FIG. 63-72

| Package | | | | | level 1 | level 2 | level 3 | level 4 | level 5 | level 6 | level 7 | level 8 | level 9 | level 10 | Data Type Name |
|---|---|---|---|---|---|---|---|---|---|---|---|---|---|---|---|
| | | | | | | | | | | TendencyCode 631326 | | | | | Code 631328 |
| | | | | Exposure Profile 631330 | | | | | Exposure Profile 631332 | | | | | | |
| | | | | | | | | | | Item 631334 | | | | | |
| | | | | | | | | | | | Date 631336 | | | | Date 631338 |
| | | | | | | | | | | | NegativeExposureAmount 631340 | | | | Amount 631342 |
| | | | | | | | | | | | PositiveExposureAmount 631344 | | | | Amount 631346 |

FIG. 63-73

| Package | level 1 | level 2 | level 3 | level 4 | level 5 | level 6 | level 7 | level 8 | level 9 | level 10 | Data Type Name |
|---|---|---|---|---|---|---|---|---|---|---|---|
| RiskFreeProfile 631348 | | | | | RiskFreeProfile 631350 | | | | | | |
| | | | | | | Item 631352 | | | | | |
| | | | | | | | Date 631354 | | | | Date 631356 |
| | | | | | | | RiskFreeAmount 631358 | | | | Amount 631360 |
| Property 631362 | | | | | Property 631364 | | | | | | Property 631366 |
| | | | | | | ID 631368 | | | | | PropertyID 631370 |

FIG. 63-74

| Package | level 1 | level 2 | level 3 | level 4 | level 5 | level 6 | level 7 | level 8 | level 9 | level 10 | Data Type Name |
|---|---|---|---|---|---|---|---|---|---|---|---|
| | | | | | | Value 631372 | | | | | PropertyValue 631374 |
| Stock 631376 | | | | Stock 631378 | | | | | | | |
| | | | | | ID 631380 | | | | | | PDT_StockID 631382 |
| | | | | | GuaranteeID 631384 | | | | | | Identifier 631386 |
| | | | | | Description 631388 | | | | | | Description 631390 |
| | | | | | CurrencyCode 631392 | | | | | | CurrencyCode 631394 |
| | | | | | ValidityPeriod 631396 | | | | | | CLOSED_Date Period 631398 |

FIG. 63-75

| Package | level 1 | level 2 | level 3 | level 4 | level 5 | level 6 | level 7 | level 8 | level 9 | level 10 | Data Type Name |
|---|---|---|---|---|---|---|---|---|---|---|---|
| IssuerParty 631400 | | | | | IssuerParty 631402 | | | | | | |
| | | | | | | InternalID 631404 | | | | | PartyInternalID 631406 |
| GuarantorParty 631408 | | | | | Guarantor Party 631410 | | | | | | |
| | | | | | | InternalID 631412 | | | | | PartyInternalID 631414 |
| | | | | | | GuarantorSubstitutionCode 631416 | | | | | Code 631418 |

FIG. 63-76

| Package | level 1 | level 2 | level 3 | level 4 | level 5 | level 6 | level 7 | level 8 | level 9 | level 10 | Data Type Name |
|---|---|---|---|---|---|---|---|---|---|---|---|
| CreditExposureData 631420 | | | | | CreditExposureData 631422 | | | | | | |
| | | | | | | LossGivenDefaultDecimalValue 631424 | | | | | DecimalValue 631426 |
| | | | | | | ShapeBetaDistributionDecimalValue 631428 | | | | | DecimalValue 631430 |
| | | | | | | ExpectedLossGivenDefaultDecimalValue 631432 | | | | | DecimalValue 631434 |

FIG. 63-77

| Package | level 1 | level 2 | level 3 | level 4 | level 5 | level 6 | level 7 | level 8 | level 9 | level 10 | Data Type Name |
|---|---|---|---|---|---|---|---|---|---|---|---|
| | | | | | | ExposureAtDefaultAmount 631436 | | | | | Amount 631438 |
| | | | | | | PriceAtHorizon 631440 | | | | | |
| | | | | | | | Duration 631442 | | | | Duration 631444 |
| | | | | | | | Amount 631446 | | | | Amount 631448 |
| | | | | | | | DecimalValue 631450 | | | | DecimalValue 631452 |
| | | | | | | CurrentPrice 631454 | | | | | |
| | | | | | | | Amount 631456 | | | | Amount 631458 |

FIG. 63-78

| Package | | | | | level 1 | level 2 | level 3 | level 4 | level 5 | level 6 | level 7 | level 8 | level 9 | level 10 | Data Type Name |
|---|---|---|---|---|---|---|---|---|---|---|---|---|---|---|---|
| | | | | | | | | | | | DecimalValue 631460 | | | | DecimalValue 631462 |
| | | | | | | | | | | CreditPortfolioManagementProductCode 631464 | | | | | Code 631466 |
| | | | | | | | | | | RecoveryAmount 631468 | | | | | Amount 631470 |
| | | | | ProbabilityOfDefault 631472 | | | | | ProbabilityOfDefault 631474 | | | | | | |
| | | | | | | | | | | ValidityDatePeriod 631476 | | | | | CLOSED_DatePeriod 631478 |

FIG. 63-79

| Package | level 1 | level 2 | level 3 | level 4 | level 5 | level 6 | level 7 | level 8 | level 9 | level 10 | Data Type Name |
|---|---|---|---|---|---|---|---|---|---|---|---|
| | | | | | | TermDuration 631480 | | | | | Duration 631482 |
| | | | | | | ProbabilityOfDefaultDoubleValue 631484 | | | | | DoubleValue 631486 |
| Rating 631488 | | | | | Rating 631490 | | | | | | |
| | | | | | | ModelID 631492 | | | | | PDT_RatingModelID 631494 |
| | | | | | | ValidityDatePeriod 631496 | | | | | CLOSED_DatePeriod 631498 |
| | | | | | | Code 631500 | | | | | CreditRatingCode 631502 |

FIG. 63-80

| Package | | | | | level 1 | level 2 | level 3 | level 4 | level 5 | level 6 | level 7 | level 8 | level 9 | level 10 | Data Type Name |
|---|---|---|---|---|---|---|---|---|---|---|---|---|---|---|---|
| | | | | | | | | | | MasterCreditRatingCode 631504 | | | | | CreditRatingCode 631506 |
| | | | | | | | | | | InternalRatingIndicator 631508 | | | | | Indicator 631510 |
| | | | | | | | | | | MaturityCode 631512 | | | | | Code 631514 |
| | | | | | | | | | | Date 631516 | | | | | Date 631518 |
| | | | | | | | | | | TendencyCode 631520 | | | | | Code 631522 |
| | | | | Property 631524 | | | | | Property 631526 | | | | | | |

FIG. 63-81

| Package | level 1 | level 2 | level 3 | level 4 | level 5 | level 6 | level 7 | level 8 | level 9 | level 10 | Data Type Name |
|---|---|---|---|---|---|---|---|---|---|---|---|
| | | | | | | ID 631528 | | | | | PropertyID 631530 |
| | | | | | | Value 631532 | | | | | PropertyValue 631534 |
| CreditDerivative 631536 | | | | CreditDerivative 631538 | | | | | | | |
| | | | | | ID 631540 | | | | | | PDT_CreditDerivativeID 631542 |
| | | | | | GuaranteeID 631544 | | | | | | Identifier 631546 |
| | | | | | Description 631548 | | | | | | Description 631550 |

FIG. 63-82

| Package | level 1 | level 2 | level 3 | level 4 | level 5 | level 6 | level 7 | level 8 | level 9 | level 10 | Data Type Name |
|---|---|---|---|---|---|---|---|---|---|---|---|
| | | | | | CurrencyCode 631552 | | | | | | CurrencyCode 631554 |
| | | | | | ValidityPeriod 631556 | | | | | | CLOSED_DatePeriod 631558 |
| | | | | | BasketName 631560 | | | | | | Name 631562 |
| | | | | | FundedIndicator 631564 | | | | | | Indicator 631566 |
| | | | | | OriginalNumberValue 631568 | | | | | | NumberValue 631570 |
| | | | | | BeginCountNumberValue 631572 | | | | | | NumberValue 631574 |

FIG. 63-83

| Package | | | | | level 1 | level 2 | level 3 | level 4 | level 5 | level 6 | level 7 | level 8 | level 9 | level 10 | Data Type Name |
|---|---|---|---|---|---|---|---|---|---|---|---|---|---|---|---|
| | | | | | | | | | EndCountNumberValue 631576 | | | | | | NumberValue 631578 |
| | | | | Counterparty 631580 | | | | | Counterparty 631582 | | | | | | |
| | | | | | | | | | | InternalID 631584 | | | | | PartyInternalID 631586 |
| | | | | GuarantorParty 631588 | | | | | GuarantorParty 631590 | | | | | | |
| | | | | | | | | | | InternalID 631592 | | | | | PartyInternalID 631594 |

FIG. 63-84

| Package | | | | | level 1 | level 2 | level 3 | level 4 | level 5 | level 6 | level 7 | level 8 | level 9 | level 10 | Data Type Name |
|---|---|---|---|---|---|---|---|---|---|---|---|---|---|---|---|
| | | | | | | | | | | GuarantorSubstitutionCategoryCode 631596 | | | | | CategoryCode 631598 |
| | | | | CreditExposureData 631600 | | | | | CreditExposureData 631602 | | | | | | |
| | | | | | | | | | | LossGivenDefaultDecimalValue 631604 | | | | | DecimalValue 631606 |
| | | | | | | | | | | ShapeBetaDistributionDecimalValue 631608 | | | | | DecimalValue 631610 |

FIG. 63-85

| Package | level 1 | level 2 | level 3 | level 4 | level 5 | level 6 | level 7 | level 8 | level 9 | level 10 | Data Type Name |
|---|---|---|---|---|---|---|---|---|---|---|---|
| | | | | | | ExpectedLossGivenDefaultDecimalValue 631612 | | | | | DecimalValue 631614 |
| | | | | | | ExposureAtDefaultAmount 631616 | | | | | Amount 631618 |
| | | | | | | PriceAtHorizon 631620 | | | | | |
| | | | | | | | Duration 631622 | | | | Duration 631624 |
| | | | | | | | Amount 631626 | | | | Amount 631628 |
| | | | | | | | DecimalValue 631630 | | | | DecimalValue 631632 |

FIG. 63-86

| Package | level 1 | level 2 | level 3 | level 4 | level 5 | level 6 | level 7 | level 8 | level 9 | level 10 | Data Type Name |
|---|---|---|---|---|---|---|---|---|---|---|---|
| | | | | | | CurrentPrice 631634 | | | | | |
| | | | | | | | Amount 631636 | | | | Amount 631638 |
| | | | | | | | DecimalValue 631640 | | | | DecimalValue 631642 |
| | | | | | | CreditPortfolioManagementProductCode 631644 | | | | | Code 631646 |
| | | | | | | ProtectionBuyerIndicator 631648 | | | | | Indicator 631650 |

FIG. 63-87

| Package | | | | | level 1 | level 2 | level 3 | level 4 | level 5 | level 6 | level 7 | level 8 | level 9 | level 10 | Data Type Name |
|---|---|---|---|---|---|---|---|---|---|---|---|---|---|---|---|
| | | | | | | | | | | RestructuringCategoryCode 631652 | | | | | Code 631654 |
| | | | | ReferenceAssetItem 631656 | | | | | ReferenceAssetItem 631658 | | | | | | |
| | | | | | | | | | | ID 631660 | | | | | PDT_ReferenceAssetDataItemID 631662 |
| | | | | | | | | | | GuaranteeID 631664 | | | | | PDT_GuaranteeID 631666 |
| | | | | | | | | | | Counterparty 631668 | | | | | |

FIG. 63-88

| Package | level 1 | level 2 | level 3 | level 4 | level 5 | level 6 | level 7 | level 8 | level 9 | level 10 | Data Type Name |
|---|---|---|---|---|---|---|---|---|---|---|---|
| | | | | | | | InternalID 631670 | | | | PartyInternalID 631672 |
| | | | | | | Guarantor Party 631674 | | | | | |
| | | | | | | | InternalID 631676 | | | | PartyInternalID 631678 |
| | | | | | | | GuarantorSubstitutionCategoryCode 631680 | | | | CategoryCode 631682 |
| | | | | | | CreditExposureData 631684 | | | | | |

FIG. 63-89

| Package | level 1 | level 2 | level 3 | level 4 | level 5 | level 6 | level 7 | level 8 | level 9 | level 10 | Data Type Name |
|---|---|---|---|---|---|---|---|---|---|---|---|
| | | | | | | | LossGivenDefaultDecimalValue 631686 | | | | DecimalValue 631688 |
| | | | | | | | ShapeBetaDistributionDecimalValue 631690 | | | | DecimalValue 631692 |
| | | | | | | | ExpectedLossGivenDefaultDecimalValue 631694 | | | | DecimalValue 631696 |
| | | | | | | | SeniorityCode 631698 | | | | |

FIG. 63-90

| Package | level 1 | level 2 | level 3 | level 4 | level 5 | level 6 | level 7 | level 8 | level 9 | level 10 | Data Type Name |
|---|---|---|---|---|---|---|---|---|---|---|---|
| FinancialCondition 631700 | | | | | FinancialCondition 631702 | | | | | | |
| | | | | | | InterestCondition 631704 | | | | | |
| | | | | | | | BankContractFinancialConditionSpecification 631706 | | | | |
| | | | | | | | | BankContractFinancialConditionUsageCode 631708 | | | BankContractFinancialConditionTypeUsageCode 631710 |

FIG. 63-91

| Package | level 1 | level 2 | level 3 | level 4 | level 5 | level 6 | level 7 | level 8 | level 9 | level 10 | Data Type Name |
|---|---|---|---|---|---|---|---|---|---|---|---|
| | | | | | | | | Calculation 631712 | | | |
| | | | | | | | | | RecurrenceSpecification 631714 | | |
| | | | | | | | | | | PeriodDurationDayRecurrence 631716 | PeriodDurationDayRecurrence 631718 |
| | | | | | | | | AmountSpecification 631720 | | | |
| | | | | | | | | | Amount 631722 | | Amount 631724 |
| | | | | | | | | | Percent 631726 | | Percent 631728 |

FIG. 63-92

| Package | | | | | level 1 | level 2 | level 3 | level 4 | level 5 | level 6 | level 7 | level 8 | level 9 | level 10 | Data Type Name |
|---|---|---|---|---|---|---|---|---|---|---|---|---|---|---|---|
| | | | | | | | | | | | | | InterestSpecification 631730 | | |
| | | | | | | | | | | | | | | InterestCalculationMethodCode 631732 | InterestCalculationMethodCode 631734 |
| | | | | | | | | | | | | | VariableInterest 631736 | | |
| | | | | | | | | | | | | | | ReferenceInterestCurveCode 631738 | ReferenceInterestCurveCode 631740 |

FIG. 63-93

| Package | level 1 | level 2 | level 3 | level 4 | level 5 | level 6 | level 7 | level 8 | level 9 | level 10 | Data Type Name |
|---|---|---|---|---|---|---|---|---|---|---|---|
| | | | | | | | | | | MarginPercent 631742 | Percent; Qualifier: Margin 631744 |
| | | | | | | | | | | AdjustmentRecuurence 631746 | |
| | | | | | | | | | | YieldCurveModelID 631748 | PDT_YieldCurveModelID 631750 |
| | | | | | | FeeCondition 631752 | | | | | |
| | | | | | | | BankContractFinancialConditionSpecification 631754 | | | | |

FIG. 63-94

| Package | level 1 | level 2 | level 3 | level 4 | level 5 | level 6 | level 7 | level 8 | level 9 | level 10 | Data Type Name |
|---|---|---|---|---|---|---|---|---|---|---|---|
| | | | | | | | | BankContractFinancialConditionUsageCode 631756 | | | BankContractFinancialConditionTypeUsageCode 631758 |
| | | | | | | | | Calculation 631760 | | | |
| | | | | | | | | | RecurrenceSpecification 631762 | | |
| | | | | | | | | | | PeriodDurationDayRecurrence 631764 | PeriodDurationDayRecurrence 631766 |

FIG. 63-95

| Package | level 1 | level 2 | level 3 | level 4 | level 5 | level 6 | level 7 | level 8 | level 9 | level 10 | Data Type Name |
|---|---|---|---|---|---|---|---|---|---|---|---|
| | | | | | | | | AmountSpecification 631768 | | | |
| | | | | | | | | | Amount 631770 | | Amount 631772 |
| | | | | | | | | | Percent 631774 | | Percent 631776 |
| | | | | | | PaymentCondition 631778 | | | | | |
| | | | | | | | BankContractFinancialConditionSpecification 631780 | | | | |

FIG. 63-96

| Package | level 1 | level 2 | level 3 | level 4 | level 5 | level 6 | level 7 | level 8 | level 9 | level 10 | Data Type Name |
|---|---|---|---|---|---|---|---|---|---|---|---|
| | | | | | | | | BankContractFinancialConditionUsageCode 631782 | | | BankContractFinancialConditionTypeUsageCode 631784 |
| | | | | | | | | Calculation 631786 | | | |
| | | | | | | | | | RecurrenceSpecification 631788 | | |
| | | | | | | | | | | PeriodDurationDayRecurrence 631790 | PeriodDurationDayRecurrence 631792 |

FIG. 63-97

| Package | | | | | level 1 | level 2 | level 3 | level 4 | level 5 | level 6 | level 7 | level 8 | level 9 | level 10 | Data Type Name |
|---|---|---|---|---|---|---|---|---|---|---|---|---|---|---|---|
| | | | | | | | | | | | | AmountSp ecification 631794 | | | |
| | | | | | | | | | | | | | Amount 631796 | | Amount 631798 |
| | | | | | | | | | | | | | Percent 631800 | | Percent 631802 |
| | | | | ProbabilityOfDefault 631804 | | | | | ProbabilityOfDefault 631806 | | | | | | |
| | | | | | | | | | | ValidityDatePeriod 631808 | | | | | CLOSED_Date Period 631810 |
| | | | | | | | | | | TermDuration 631812 | | | | | Duration 631814 |

FIG. 63-98

| Package | | | | | level 1 | level 2 | level 3 | level 4 | level 5 | level 6 | level 7 | level 8 | level 9 | level 10 | Data Type Name |
|---|---|---|---|---|---|---|---|---|---|---|---|---|---|---|---|
| | | | | | | | | | | ProbabilityOfDefaultDoubleValue 631816 | | | | | DoubleValue 631818 |
| | | | | Rating 631820 | | | | | Rating 631822 | | | | | | |
| | | | | | | | | | | ModelID 631824 | | | | | PDT_RatingModelID 631826 |
| | | | | | | | | | | ValidityDatePeriod 631828 | | | | | CLOSED_DatePeriod 631830 |
| | | | | | | | | | | Code 631832 | | | | | CreditRatingCode 631834 |

FIG. 63-99

| Package | level 1 | level 2 | level 3 | level 4 | level 5 | level 6 | level 7 | level 8 | level 9 | level 10 | Data Type Name |
|---|---|---|---|---|---|---|---|---|---|---|---|
| | | | | | | MasterCreditRatingCode 631836 | | | | | CreditRatingCode 631838 |
| | | | | | | InternalRatingIndicator 631840 | | | | | Indicator 631842 |
| | | | | | | MaturityCode 631844 | | | | | Code 631846 |
| | | | | | | Date 631848 | | | | | Date 631850 |
| | | | | | | TendencyCode 631852 | | | | | Code 631854 |

FIG. 63-100

| Package | level 1 | level 2 | level 3 | level 4 | level 5 | level 6 | level 7 | level 8 | level 9 | level 10 | Data Type Name |
|---|---|---|---|---|---|---|---|---|---|---|---|
| Spread Curve 631856 | | | | | SpreadCurve 631858 | | | | | | |
| | | | | | | Item 631860 | | | | | |
| | | | | | | | ValidityDate 631862 | | | | Date 631864 |
| | | | | | | | Duration 631866 | | | | Duration 631868 |
| | | | | | | | SpreadDecimalValue 631870 | | | | DecimalValue 631872 |
| Property 631874 | | | | | Property 631876 | | | | | | |

FIG. 63-101

| Package | | | | | level 1 | level 2 | level 3 | level 4 | level 5 | level 6 | level 7 | level 8 | level 9 | level 10 | Data Type Name |
|---|---|---|---|---|---|---|---|---|---|---|---|---|---|---|---|
| | | | | | | | | | | ID<br><br>631878 | | | | | PropertyID<br><br>631880 |
| | | | | | | | | | | Value<br><br>631882 | | | | | PropertyValue<br><br>631884 |
| | | | Securitization<br><br>631886 | | | | | Securitization<br><br>631888 | | | | | | | |
| | | | | | | | | | ID<br><br>631890 | | | | | | Identifier<br><br>631892 |
| | | | | | | | | | GuaranteeID<br><br>631894 | | | | | | Identifier<br><br>631896 |
| | | | | BasicData<br><br>631898 | | | | | BasicData<br><br>631900 | | | | | | |

FIG. 63-102

| Package | level 1 | level 2 | level 3 | level 4 | level 5 | level 6 | level 7 | level 8 | level 9 | level 10 | Data Type Name |
|---|---|---|---|---|---|---|---|---|---|---|---|
| | | | | | | ObjectDate Period 631902 | | | | | CLOSED_Date Period 631904 |
| | | | | | | FundedIndi cator 631906 | | | | | Indicator 631908 |
| | | | | | | Attachment PointPerce nt 631910 | | | | | Percent 631912 |
| | | | | | | Detachmen tPointPerc ent 631914 | | | | | Percent 631916 |

FIG. 63-103

| Package | level 1 | level 2 | level 3 | level 4 | level 5 | level 6 | level 7 | level 8 | level 9 | level 10 | Data Type Name |
|---|---|---|---|---|---|---|---|---|---|---|---|
| ABSRsqApproximatedCorrelation 631918 | | | | | ABSRsqApproximatedCorrelation 631920 | | | | | | |
| | | | | | | Date 631922 | | | | | Date 631924 |
| | | | | | | RSquaredApproximationScalingFactor 631926 | | | | | |
| Rating 631928 | | | | | SpreadQuote 631930 | | | | | | |
| | | | | | | PriceDate 631932 | | | | | PriceDate 634934 |

FIG. 63-104

| Package | | | | | level 1 | level 2 | level 3 | level 4 | level 5 | level 6 | level 7 | level 8 | level 9 | level 10 | Data Type Name |
|---|---|---|---|---|---|---|---|---|---|---|---|---|---|---|---|
| | | | | | | | | | | UpfrontFee 631936 | | | | | |
| | | | | | | | | | | MarkUpDownReferenceInterest 631938 | | | | | |
| | | | | SpreadCurveMatrix 631940 | | | | | ABSCorrelationData 631942 | | | | | | |
| | | | | | | | | | | Date 631944 | | | | | Date 631946 |
| | | | | | | | | | | ABSCorrelation 631948 | | | | | |

FIG. 63-105

| Package | level 1 | level 2 | level 3 | level 4 | level 5 | level 6 | level 7 | level 8 | level 9 | level 10 | Data Type Name |
|---|---|---|---|---|---|---|---|---|---|---|---|
| Property 631950 | | | | | Property 631952 | | | | | | Property 631954 |
| | | | | | | ID 631956 | | | | | |
| | | | | | | Value 631958 | | | | | |
| Bond 631960 | | | | Bond 631962 | | | | | | | |
| | | | | | ID 631964 | | | | | | PDT_BondID 631966 |
| | | | | | GuaranteeID 631968 | | | | | | Identifier 631970 |
| | | | | | Description 631972 | | | | | | Description 631974 |

FIG. 63-106

| Package | | | | | level 1 | level 2 | level 3 | level 4 | level 5 | level 6 | level 7 | level 8 | level 9 | level 10 | Data Type Name |
|---|---|---|---|---|---|---|---|---|---|---|---|---|---|---|---|
| | | | | | | | | | CurrencyCode 631976 | | | | | | CurrencyCode 631978 |
| | | | | | | | | | ValidityPeriod 631980 | | | | | | CLOSED_DatePeriod 631982 |
| | | | | | | | | | SeniorityCode 631984 | | | | | | Code 631986 |
| | | | | | | | | | IssuedAmount 631988 | | | | | | Amount 631990 |
| | | | | Counterparty 631992 | | | | | Counterparty 631994 | | | | | | |
| | | | | | | | | | | InternalID 631996 | | | | | PartyInternalID 631998 |

FIG. 63-107

| Package | level 1 | level 2 | level 3 | level 4 | level 5 | level 6 | level 7 | level 8 | level 9 | level 10 | Data Type Name |
|---|---|---|---|---|---|---|---|---|---|---|---|
| GuarantorParty 632000 | | | | | GuarantorParty 632002 | | | | | | |
| | | | | | | InternalID 632004 | | | | | PartyInternalID 632006 |
| | | | | | | GuarantorSubstitutionCategoryCode 632008 | | | | | Code 632010 |
| CreditExposureData 632012 | | | | | CreditExposureData 632014 | | | | | | |

FIG. 63-108

| Package | level 1 | level 2 | level 3 | level 4 | level 5 | level 6 | level 7 | level 8 | level 9 | level 10 | Data Type Name |
|---|---|---|---|---|---|---|---|---|---|---|---|
| | | | | | | LossGivenDefaultDecimalValue 632016 | | | | | DecimalValue 632018 |
| | | | | | | ShapeBetaDistributionDecimalValue 632020 | | | | | DecimalValue 632022 |
| | | | | | | ExpectedLossGivenDefaultDecimalValue 632024 | | | | | DecimalValue 632026 |
| | | | | | | ExposureAtDefaultAmount 632028 | | | | | Amount 632030 |

FIG. 63-109

| Package | level 1 | level 2 | level 3 | level 4 | level 5 | level 6 | level 7 | level 8 | level 9 | level 10 | Data Type Name |
|---|---|---|---|---|---|---|---|---|---|---|---|
| | | | | | | PriceAtHorizon 632032 | | | | | |
| | | | | | | | Duration 632034 | | | | Duration 632036 |
| | | | | | | | Amount 632038 | | | | Amount 632040 |
| | | | | | | | DecimalValue 632042 | | | | DecimalValue 632044 |
| | | | | | | CurrentPrice 632046 | | | | | |
| | | | | | | | Amount 632048 | | | | Amount 632050 |
| | | | | | | | DecimalValue 632052 | | | | DecimalValue 632054 |

FIG. 63-110

| Package | | | | | level 1 | level 2 | level 3 | level 4 | level 5 | level 6 | level 7 | level 8 | level 9 | level 10 | Data Type Name |
|---|---|---|---|---|---|---|---|---|---|---|---|---|---|---|---|
| | | | | | | | | | | CreditPortfolioManagementProductCode 632056 | | | | | Code 632058 |
| | | | | | | | | | | RecoveryAmount 632060 | | | | | Amount 632062 |
| | | | | FinancialCondition 632064 | | | | | FinancialCondition 632066 | | | | | | |
| | | | | | | | | | | InterestCondition 632068 | | | | | |

FIG. 63-111

| Package | level 1 | level 2 | level 3 | level 4 | level 5 | level 6 | level 7 | level 8 | level 9 | level 10 | Data Type Name |
|---|---|---|---|---|---|---|---|---|---|---|---|
| | | | | | | | BankContractFinancialConditionSpecification 632070 | | | | |
| | | | | | | | | BankContractFinancialConditionUsageCode 632072 | | | BankContractFinancialConditionTypeUsageCode 632074 |
| | | | | | | | | Calculation 632076 | | | |
| | | | | | | | | | RecurrenceSpecification 632078 | | |

FIG. 63-112

| Package | | | | | level 1 | level 2 | level 3 | level 4 | level 5 | level 6 | level 7 | level 8 | level 9 | level 10 | Data Type Name |
|---|---|---|---|---|---|---|---|---|---|---|---|---|---|---|---|
| | | | | | | | | | | | | | | PeriodDurationDayRecurrence 632080 | PeriodDurationDayRecurrence 632082 |
| | | | | | | | | | | | | AmountSpecification 632084 | | | |
| | | | | | | | | | | | | | Amount 632086 | | Amount 632088 |
| | | | | | | | | | | | | | Percent 632090 | | Percent 632092 |
| | | | | | | | | | | | | InterestSpecification 632094 | | | |

FIG. 63-113

| Package | level 1 | level 2 | level 3 | level 4 | level 5 | level 6 | level 7 | level 8 | level 9 | level 10 | Data Type Name |
|---|---|---|---|---|---|---|---|---|---|---|---|
| | | | | | | | | | InterestCalculationMethodCode 632096 | | InterestCalculationMethodCode 632098 |
| | | | | | | | | | VariableInterest 632100 | | |
| | | | | | | | | | | ReferenceInterestCurveCode 632102 | ReferenceInterestCurveCode 632104 |
| | | | | | | | | | | MarginPercent 632106 | Percent; Qualifier: Margin 632108 |
| | | | | | | | | | | AdjustmentRecuurence 632110 | |

FIG. 63-114

| Package | level 1 | level 2 | level 3 | level 4 | level 5 | level 6 | level 7 | level 8 | level 9 | level 10 | Data Type Name |
|---|---|---|---|---|---|---|---|---|---|---|---|
| | | | | | | | | | | YieldCurveModelID 632112 | PDT_YieldCurveModelID 632114 |
| | | | | | | FeeCondition 632116 | | | | | |
| | | | | | | | BankContractFinancialConditionSpecification 632118 | | | | |
| | | | | | | | | BankContractFinancialConditionUsageCode 632120 | | | BankContractFinancialConditionTypeUsageCode 632122 |

FIG. 63-115

| Package | level 1 | level 2 | level 3 | level 4 | level 5 | level 6 | level 7 | level 8 | level 9 | level 10 | Data Type Name |
|---|---|---|---|---|---|---|---|---|---|---|---|
| | | | | | | | | Calculation 632124 | | | |
| | | | | | | | | | RecurrenceSpecification 632126 | | |
| | | | | | | | | | | PeriodDurationDayRecurrence 632128 | PeriodDurationDayRecurrence 632130 |
| | | | | | | | | AmountSpecification 632132 | | | |
| | | | | | | | | | Amount 632134 | | Amount 632136 |
| | | | | | | | | | Percent 632138 | | Percent 632140 |

FIG. 63-116

| Package | level 1 | level 2 | level 3 | level 4 | level 5 | level 6 | level 7 | level 8 | level 9 | level 10 | Data Type Name |
|---|---|---|---|---|---|---|---|---|---|---|---|
| | | | | | | PaymentCondition 632142 | | | | | |
| | | | | | | | BankContractFinancialConditionSpecification 632144 | | | | |
| | | | | | | | | BankContractFinancialConditionUsageCode 632146 | | | BankContractFinancialConditionTypeUsageCode 632148 |
| | | | | | | | | Calculation 632150 | | | |

FIG. 63-117

| Package | level 1 | level 2 | level 3 | level 4 | level 5 | level 6 | level 7 | level 8 | level 9 | level 10 | Data Type Name |
|---|---|---|---|---|---|---|---|---|---|---|---|
| | | | | | | | | | RecurrenceSpecification 632152 | | |
| | | | | | | | | | | PeriodDurationDayRecurrence 632154 | PeriodDurationDayRecurrence 632156 |
| | | | | | | | | AmountSpecification 632158 | | | |
| | | | | | | | | | Amount 632160 | | Amount 632162 |
| | | | | | | | | | Percent 632164 | | Percent 632166 |

FIG. 63-118

| Package | level 1 | level 2 | level 3 | level 4 | level 5 | level 6 | level 7 | level 8 | level 9 | level 10 | Data Type Name |
|---|---|---|---|---|---|---|---|---|---|---|---|
| CashFlowItem 632168 | | | | | CashFlowItem 632170 | | | | | | |
| | | | | | | CashFlowDate 632172 | | | | | Date 632174 |
| | | | | | | InterestCashFlowAmount 632176 | | | | | Amount 632178 |
| | | | | | | ChargeCashFlowAmount 632180 | | | | | Amount 632182 |
| | | | | | | PaymentCashFlowAmount 632184 | | | | | Amount 632186 |

FIG. 63-119

| Package | | | | | level 1 | level 2 | level 3 | level 4 | level 5 | level 6 | level 7 | level 8 | level 9 | level 10 | Data Type Name |
|---|---|---|---|---|---|---|---|---|---|---|---|---|---|---|---|
| | | | | ProbabilityOfDefault 632188 | | | | | ProbabilityOfDefault 632190 | | | | | | |
| | | | | | | | | | | ValidityDatePeriod 632192 | | | | | CLOSED_DatePeriod 632194 |
| | | | | | | | | | | TermDuration 632196 | | | | | Duration 632198 |
| | | | | | | | | | | ProbabilityOfDefaultDoubleValue 632200 | | | | | DoubleValue 632202 |
| | | | | Rating 632204 | | | | | Rating 632206 | | | | | | |

FIG. 63-120

| Package | level 1 | level 2 | level 3 | level 4 | level 5 | level 6 | level 7 | level 8 | level 9 | level 10 | Data Type Name |
|---|---|---|---|---|---|---|---|---|---|---|---|
| | | | | | | ModelID 632208 | | | | | PDT_RatingModelID 632210 |
| | | | | | | ValidityDatePeriod 632212 | | | | | CLOSED_DatePeriod 632214 |
| | | | | | | Code 632216 | | | | | CreditRatingCode 632218 |
| | | | | | | MasterCreditRatingCode 632220 | | | | | CreditRatingCode 632222 |
| | | | | | | InternalRatingIndicator 632224 | | | | | Indicator 632226 |
| | | | | | | MaturityCode 632228 | | | | | Code 632230 |

FIG. 63-121

| Package | | | | | level 1 | level 2 | level 3 | level 4 | level 5 | level 6 | level 7 | level 8 | level 9 | level 10 | Data Type Name |
|---|---|---|---|---|---|---|---|---|---|---|---|---|---|---|---|
| | | | | | | | | | | Date 632232 | | | | | Date 632234 |
| | | | | | | | | | | TendencyCode 632236 | | | | | Code 632238 |
| | | | | SinkData 632240 | | | | | SinkData 632242 | | | | | | |
| | | | | | | | | | | Item 632244 | | | | | |
| | | | | | | | | | | | Repayment Date 632246 | | | | Date 632248 |
| | | | | | | | | | | | Repayment Amount 632250 | | | | Amount 632252 |

FIG. 63-122

| Package | | | | | level 1 | level 2 | level 3 | level 4 | level 5 | level 6 | level 7 | level 8 | level 9 | level 10 | Data Type Name |
|---|---|---|---|---|---|---|---|---|---|---|---|---|---|---|---|
| | | | | | | | | | | | PriceOfRepaymentFractionDecimalValue 632254 | | | | DecimalValue 632256 |
| | | | | Option 632258 | | | | | Option 632260 | | | | | | |
| | | | | | | | | | | ValidityPeriod 632262 | | | | | CLOSED_DatePeriod 632264 |
| | | | | | | | | | | CategoryCode 632266 | | | | | Code 632268 |
| | | | | | | | | | | StyleCode 632270 | | | | | Code 632272 |

FIG. 63-123

| Package | | | | | level 1 | level 2 | level 3 | level 4 | level 5 | level 6 | level 7 | level 8 | level 9 | level 10 | Data Type Name |
|---|---|---|---|---|---|---|---|---|---|---|---|---|---|---|---|
| | | | | | | | | | | MutualRightOfNoticePurchaseIndicator 632274 | | | | | Indicator 632276 |
| | | | | | | | | | | QuotationCode 632278 | | | | | Code 632280 |
| | | | | | | | | | | SingleExerciseIndicator 632282 | | | | | Indicator 632284 |
| | | | | | | | | | | Item 632286 | | | | | |
| | | | | | | | | | | | ValidityPeriod 632288 | | | | CLOSED_DatePeriod 632290 |

FIG. 63-124

| Package | level 1 | level 2 | level 3 | level 4 | level 5 | level 6 | level 7 | level 8 | level 9 | level 10 | Data Type Name |
|---|---|---|---|---|---|---|---|---|---|---|---|
| | | | | | | | ExercisePriceFractionDecimalValue 632292 | | | | DecimalValue 632294 |
| | | | | | | | StrikePercent 632296 | | | | Percent 632298 |
| | | | | | | | StrikeAmount 632300 | | | | StrikeAmount 632302 |
| | | | | | | ExerciseDateSpecification 632304 | | | | | CLOSED_DatePeriod 632306 |
| | | | | | | | ExcerciseValidityPeriod 632308 | | | | |

FIG. 63-125

| Package | level 1 | level 2 | level 3 | level 4 | level 5 | level 6 | level 7 | level 8 | level 9 | level 10 | Data Type Name |
|---|---|---|---|---|---|---|---|---|---|---|---|
| Spread Curve 632310 | | | | | SpreadCurve 632312 | | | | | | |
| | | | | | | Item 632314 | | | | | |
| | | | | | | | ValidityDate 632316 | | | | Date 632318 |
| | | | | | | | Duration 632320 | | | | Duration 632322 |
| | | | | | | | SpreadDecimalValue 632324 | | | | DecimalValue 632326 |
| Property 632328 | | | | | Property 632330 | | | | | | |

FIG. 63-126

| Package | level 1 | level 2 | level 3 | level 4 | level 5 | level 6 | level 7 | level 8 | level 9 | level 10 | Data Type Name |
|---|---|---|---|---|---|---|---|---|---|---|---|
| | | | | | | ID 632332 | | | | | PropertyID 632334 |
| | | | | | | Value 632336 | | | | | PropertyValue 632338 |
| BusinessPartner 632340 | | | | BusinessPartner 632342 | | | | | | | |
| | | | | | ID 632344 | | | | | | PartyInternalID 632346 |
| | | | | | Name 632348 | | | | | | Name 632350 |
| | | | | | CountryCode 632352 | | | | | | CountryCode 632354 |

FIG. 63-127

| Package | level 1 | level 2 | level 3 | level 4 | level 5 | level 6 | level 7 | level 8 | level 9 | level 10 | Data Type Name |
|---|---|---|---|---|---|---|---|---|---|---|---|
| | | | | | SegmentCode 632356 | | | | | | Code 632358 |
| | | | | | ValidityDate 632360 | | | | | | Date 632362 |
| ProbabilityOfDefault 632364 | | | | | ProbabilityOfDefault 632366 | | | | | | |
| | | | | | | ValidityDatePeriod 632368 | | | | | CLOSED_DatePeriod 632370 |
| | | | | | | TermDuration 632372 | | | | | Duration 632374 |
| | | | | | | ProbabilityOfDefaultDoubleValue 632376 | | | | | DoubleValue 632378 |

FIG. 63-128

| Package | level 1 | level 2 | level 3 | level 4 | level 5 | level 6 | level 7 | level 8 | level 9 | level 10 | Data Type Name |
|---|---|---|---|---|---|---|---|---|---|---|---|
| Rating 632380 | | | | | Rating 632382 | | | | | | |
| | | | | | | ModelID 632384 | | | | | PDT_RatingModelID 632386 |
| | | | | | | ValidityDatePeriod 632388 | | | | | CLOSED_DatePeriod 632390 |
| | | | | | | Code 632392 | | | | | CreditRatingCode 632394 |
| | | | | | | MasterCreditRatingCode 632396 | | | | | CreditRatingCode 632398 |
| | | | | | | InternalRatingIndicator 632400 | | | | | Indicator 632402 |

FIG. 63-129

| Package | | | | | level 1 | level 2 | level 3 | level 4 | level 5 | level 6 | level 7 | level 8 | level 9 | level 10 | Data Type Name |
|---|---|---|---|---|---|---|---|---|---|---|---|---|---|---|---|
| | | | | | | | | | | MaturityCode 632404 | | | | | Code 632406 |
| | | | | | | | | | | Date 632408 | | | | | Date 632410 |
| | | | | | | | | | | TendencyCode 632412 | | | | | Code 632414 |
| | | | | FinancialData 632416 | | | | | FinancialData 632418 | | | | | | |
| | | | | | | | | | | Item 632420 | | | | | |
| | | | | | | | | | | | FiscalYear 632422 | | | | FiscalYearID 632424 |

FIG. 63-130

| Package | level 1 | level 2 | level 3 | level 4 | level 5 | level 6 | level 7 | level 8 | level 9 | level 10 | Data Type Name |
|---|---|---|---|---|---|---|---|---|---|---|---|
| | | | | | | | FiscalValidityDatePeriod 632426 | | | | CLOSED_DatePeriod 632428 |
| | | | | | | | BalanceSheetCurrencyCode 632430 | | | | CurrencyCode 632432 |
| | | | | | | | TotalAssetsAmount 632434 | | | | Amount 632436 |
| | | | | | | | AnnualSalesAmount 632438 | | | | Amount 632440 |
| FactorCorrelationModelData 632442 | | | | | FactorCorrelationModelData 632444 | | | | | | |

FIG. 63-131

| Package | level 1 | level 2 | level 3 | level 4 | level 5 | level 6 | level 7 | level 8 | level 9 | level 10 | Data Type Name |
|---|---|---|---|---|---|---|---|---|---|---|---|
| | | | | | | Item 632446 | | | | | |
| | | | | | | | CorrelationModel 632448 | | | | PDT_CorrelationModelID 632450 |
| | | | | | | | RSquaredDoubleValue 632452 | | | | DoubleValue 632454 |
| | | | | | | | FactorWeight 632456 | | | | |
| | | | | | | | | ValidityDate 632458 | | | Date 632460 |
| | | | | | | | | FactorTypeCode 632462 | | | Code 632464 |

FIG. 63-132

| Package | | | | | level 1 | level 2 | level 3 | level 4 | level 5 | level 6 | level 7 | level 8 | level 9 | level 10 | Data Type Name |
|---|---|---|---|---|---|---|---|---|---|---|---|---|---|---|---|
| | | | | | | | | | | | | FactorName 632466 | | | Name 632468 |
| | | | | | | | | | | | | WeightingFactorValue 632470 | | | WeightingFactorValue 632472 |
| | | | | Property 632474 | | | | | Property 632476 | | | | | | |
| | | | | | | | | | | ID 632478 | | | | | PropertyID 632480 |
| | | | | | | | | | | Value 632482 | | | | | PropertyValue 632484 |

FIG. 63-133

| Package | level 1 | level 2 | level 3 | level 4 | level 5 | level 6 | level 7 | level 8 | level 9 | level 10 | Data Type Name |
|---|---|---|---|---|---|---|---|---|---|---|---|
| PortfolioAnalysisData 632486 | | | | PortfolioAnalysisData 632488 | | | | | | | |
| | | | | | ID 632490 | | | | | | PDT_PortfolioAnalysisDataID 632492 |
| | | | | | ValidityDate 632494 | | | | | | Date 632496 |
| | | | | | CreditPortfolioAssignment 632498 | | | | | | |
| | | | | | | CreditPortfolioID 632500 | | | | | PDT_CreditPortfolioID 632502 |

FIG. 63-134

| Package | level 1 | level 2 | level 3 | level 4 | level 5 | level 6 | level 7 | level 8 | level 9 | level 10 | Data Type Name |
|---|---|---|---|---|---|---|---|---|---|---|---|
| FinancialInstrumentExposure 632504 | | | | | | FinancialInstrumentExposure 632506 | | | | | |
| | | | | | | | ID 632508 | | | | Identifier 632510 |
| | | | | | | | GuaranteeID 632512 | | | | PDT_GuaranteeID 632514 |
| | | | | | | | Description 632516 | | | | Description 632518 |
| | | | | | | | Amount 632520 | | | | Amount 632522 |

FIG. 63-135

| Package | | | | | level 1 | level 2 | level 3 | level 4 | level 5 | level 6 | level 7 | level 8 | level 9 | level 10 | Data Type Name |
|---|---|---|---|---|---|---|---|---|---|---|---|---|---|---|---|
| | | | | | | | | | | | ShareNumberValue 632524 | | | | NumberValue 632526 |
| | | | | Property 632528 | | | | | | | Property 632530 | | | | |
| | | | | | | | | | | | | ID 632532 | | | PropertyID 632534 |
| | | | | | | | | | | | | Value 632536 | | | PropertyValue 632538 |

FIG. 64-1

| Package | level1 | level2 | level3 | level4 | level5 | level6 | level7 | level8 | level9 | level10 | Cardinality |
|---|---|---|---|---|---|---|---|---|---|---|---|
| CrdtPrtfo-ModFSIn-DatLoan-CrteReqMsg 64000 | CrdtPrtfoModFSIn-DatLoan-CrteReqMsg 64002 | | | | | | | | | | |
| Message-Header 64004 | | Mes-sage-Header 64006 | | | | | | | | | 1 64008 |
| CreditPort-folioModel 64010 | | Credit-Portfo-lio-Model 64012 | | | | | | | | | 1 64014 |
| | | | ID 64016 | | | | | | | | 1 64018 |

FIG. 64-2

| Package | level1 | level2 | level3 | level4 | level5 | level6 | level7 | level8 | level9 | level10 | Cardinality |
|---|---|---|---|---|---|---|---|---|---|---|---|
| | | | CreditPortfolioManagementProcessControl 64020 | | | | | | | | 1 64022 |
| | | | | DataTransferID 64024 | | | | | | | 1 64026 |
| | | | CreditPortfolio 64028 | | | | | | | | 1 64030 |
| | | | | ID 64032 | | | | | | | 1 64034 |
| InputData 64036 | | | InputData 64038 | | | | | | | | |

FIG. 64-3

| Package | level1 | level2 | level3 | level4 | level5 | level6 | level7 | level8 | level9 | level10 | Cardinality |
|---|---|---|---|---|---|---|---|---|---|---|---|
| Loan 64040 | | | | Loan 64042 | | | | | | | 1 64044 |
| | | | | | ID 64046 | | | | | | 1 64048 |
| | | | | | Guaran-teeID 64050 | | | | | | 0..1 64052 |
| | | | | | Description 64054 | | | | | | 0..1 64056 |
| | | | | | Currency-Code 64058 | | | | | | 1 64060 |
| | | | | | ValidityPe-riod 64062 | | | | | | 1 64064 |

FIG. 64-4

| Package | level1 | level2 | level3 | level4 | level5 | level6 | level7 | level8 | level9 | level10 | Cardinality |
|---|---|---|---|---|---|---|---|---|---|---|---|
| | | | | | External-LineAmount 64066 | | | | | | 0..1 64068 |
| | | | | | Utiliza-tionAmount 64070 | | | | | | 0..1 64072 |
| Counter-party 64074 | | | | | Counter-party 64076 | | | | | | 1 64078 |
| | | | | | | InternalID 64080 | | | | | 1 64082 |
| Guaran-torParty 64084 | | | | | Guarantor-Party 64086 | | | | | | 0..1 64088 |
| | | | | | | InternalID 64090 | | | | | 0..1 64092 |

FIG. 64-5

| Package | level1 | level2 | level3 | level4 | level5 | level6 | level7 | level8 | level9 | level10 | Cardinality |
|---|---|---|---|---|---|---|---|---|---|---|---|
| | | | | | | GuarantorSubstitutionCategoryCode 64094 | | | | | |
| CreditExposure-Data 64096 | | | | | CreditExposureData 64098 | | | | | | 1 64100 |
| | | | | | | LossGivenDefaultDecimalValue 64102 | | | | | 0..1 64104 |
| | | | | | | ShapeBetaDistributionDecimalValue 64106 | | | | | 0..1 64108 |

FIG. 64-6

| Package | level1 | level2 | level3 | level4 | level5 | level6 | level7 | level8 | level9 | level10 | Cardinality |
|---|---|---|---|---|---|---|---|---|---|---|---|
| | | | | | | Expected-LossGivenDe-faultDecimal-Value 64110 | | | | | 0..1 64112 |
| | | | | | | ExposureAtDe-faultAmount 64114 | | | | | 0..1 64116 |
| | | | | | | ExpectedU-sageDecimal-Value 64118 | | | | | 0..1 64120 |
| | | | | | | Usage-GivenDefault-DecimalValue 64122 | | | | | 0..1 64124 |

FIG. 64-7

| Package | level1 | level2 | level3 | level4 | level5 | level6 | level7 | level8 | level9 | level10 | Cardinality |
|---|---|---|---|---|---|---|---|---|---|---|---|
| | | | | | | CreditPortfolioManagementProductCode 64126 | | | | | 1 64128 |
| | | | | | | IndividualAggregationConstituentsNumberValue 64130 | | | | | 0..1 64132 |
| | | | | | | ActualAggregateNumberValue 64134 | | | | | 0..1 64136 |
| | | | | | | PriceAtHorizon 64138 | | | | | 0..1 64140 |
| | | | | | | | Duration 64142 | | | | 0..1 64144 |

FIG. 64-8

| Package | level1 | level2 | level3 | level4 | level5 | level6 | level7 | level8 | level9 | level10 | Cardinality |
|---|---|---|---|---|---|---|---|---|---|---|---|
| | | | | | | | Amount 64146 | | | | 0..1 64148 |
| | | | | | | | DecimalValue 64150 | | | | 0..1 64152 |
| | | | | | | CurrentPrice 64154 | | | | | 0..1 64156 |
| | | | | | | | Amount 64158 | | | | 0..1 64160 |
| | | | | | | | DecimalValue 64162 | | | | 0..1 64164 |
| Finan-cialCon-dition 64166 | | | | | Financial-Condition 64168 | | | | | | 0..n 64170 |

FIG. 64-9

| Package | level1 | level2 | level3 | level4 | level5 | level6 | level7 | level8 | level9 | level10 | Cardinality |
|---|---|---|---|---|---|---|---|---|---|---|---|
| | | | | | | InterestCondition 64172 | | | | | |
| | | | | | | | BankContract-FinancialCondi-tionSpecification 64174 | | | | |
| | | | | | | | | BankContractFinancialConditionUsageCode 64176 | | | |
| | | | | | | | | Calculation 64178 | | | |

FIG. 64-10

| Package | level1 | level2 | level3 | level4 | level5 | level6 | level7 | level8 | level9 | level10 | Cardinality |
|---|---|---|---|---|---|---|---|---|---|---|---|
| | | | | | | | | | RecurrenceSpecification 64180 | | |
| | | | | | | | | | | Period-Duration-DayRecurrence 64182 | |
| | | | | | | | | AmountSpecification 64184 | | | |
| | | | | | | | | | Amount 64186 | | |
| | | | | | | | | | Percent 64188 | | |

FIG. 64-11

| Package | level1 | level2 | level3 | level4 | level5 | level6 | level7 | level8 | level9 | level10 | Cardinality |
|---|---|---|---|---|---|---|---|---|---|---|---|
| | | | | | | | | InterestS-pecifica-tion 64190 | | | |
| | | | | | | | | | Inter-estCal-culation Method Code 64192 | | |
| | | | | | | | | | Vari-ableIn-terest 64194 | | |
| | | | | | | | | | | Referen-ceInter-estCurve Code 64196 | |

FIG. 64-12

| Package | level1 | level2 | level3 | level4 | level5 | level6 | level7 | level8 | level9 | level10 | Cardinality |
|---|---|---|---|---|---|---|---|---|---|---|---|
| | | | | | | | | | | Margin-Percent 64198 | |
| | | | | | | | | | | Adjust-men-tRecuur-ence 64200 | |
| | | | | | | | | | | Yield-Curve-ModelID 64202 | |
| | | | | | | FeeCondition 64204 | | | | | |
| | | | | | | | BankContract-FinancialCondi-tionSpecification 64206 | | | | |

FIG. 64-13

| Package | level1 | level2 | level3 | level4 | level5 | level6 | level7 | level8 | level9 | level10 | Cardinality |
|---|---|---|---|---|---|---|---|---|---|---|---|
| | | | | | | | | BankContractFinancialConditionUsageCode 64208 | | | |
| | | | | | | | | Calculation 64210 | | | |
| | | | | | | | | | RecurrenceSpecification 64212 | | |
| | | | | | | | | | | PeriodDurationDayRecurrence 64214 | |

FIG. 64-14

| Package | level1 | level2 | level3 | level4 | level5 | level6 | level7 | level8 | level9 | level10 | Cardinality |
|---|---|---|---|---|---|---|---|---|---|---|---|
| | | | | | | | | AmountSpecification 64216 | | | |
| | | | | | | | | | Amount 64218 | | |
| | | | | | | | | | Percent 64220 | | |
| | | | | | | PaymentCondition 64222 | | | | | |
| | | | | | | | BankContractFinancialConditionSpecification 64224 | | | | |

FIG. 64-15

| Package | level1 | level2 | level3 | level4 | level5 | level6 | level7 | level8 | level9 | level10 | Cardinality |
|---|---|---|---|---|---|---|---|---|---|---|---|
| | | | | | | | | BankContractFinancialConditionUsageCode 64226 | | | |
| | | | | | | | | Calculation 64228 | | | |
| | | | | | | | | | RecurrenceSpecification 64230 | | |
| | | | | | | | | | | PeriodDurationDayRecurrence 64232 | |

FIG. 64-16

| Package | level1 | level2 | level3 | level4 | level5 | level6 | level7 | level8 | level9 | level10 | Cardinality |
|---|---|---|---|---|---|---|---|---|---|---|---|
| | | | | | | | | AmountSpecification 64234 | | | |
| | | | | | | | | | Amount 64236 | | |
| | | | | | | | | | Percent 64238 | | |
| CashFlowItem 64240 | | | | | CashFlowItem 64242 | | | | | | |
| | | | | | | CashFlowDate 64244 | | | | | |
| | | | | | | InterestCashFlowAmount 64246 | | | | | |

FIG. 64-17

| Package | level1 | level2 | level3 | level4 | level5 | level6 | level7 | level8 | level9 | level10 | Cardinality |
|---|---|---|---|---|---|---|---|---|---|---|---|
| | | | | | | ChargeCash-FlowAmount 64248 | | | | | |
| | | | | | | PaymentCash-FlowAmount 64250 | | | | | |
| Probabili-tyOfDe-fault 64252 | | | | | Probabili-tyOfDefault 64254 | | | | | | 0..n 64256 |
| | | | | | | ValidityDatePe-riod 64258 | | | | | 1 64260 |
| | | | | | | Code 64262 | | | | | 1 64264 |

FIG. 64-18

| Package | level1 | level2 | level3 | level4 | level5 | level6 | level7 | level8 | level9 | level10 | Cardinality |
|---|---|---|---|---|---|---|---|---|---|---|---|
| | | | | | | DoubleValue 64266 | | | | | 1 64268 |
| Rating 64270 | | | | | Rating 64272 | | | | | | 0..n 64274 |
| | | | | | | ModelID 64276 | | | | | 1 64278 |
| | | | | | | ValidityDatePe-riod 64280 | | | | | 1 64282 |
| | | | | | | Code 64284 | | | | | 1 64286 |
| | | | | | | Master-CreditRating-Code 64288 | | | | | 0..1 64290 |

FIG. 64-19

| Package | level1 | level2 | level3 | level4 | level5 | level6 | level7 | level8 | level9 | level10 | Cardinality |
|---|---|---|---|---|---|---|---|---|---|---|---|
| | | | | | | InternalRatingIndicator 64292 | | | | | 0..1 64294 |
| | | | | | | MaturityDuration 64296 | | | | | 0..1 64298 |
| | | | | | | Date 64300 | | | | | 1 64302 |
| | | | | | | TendencyCode 64304 | | | | | 0..1 64306 |
| ProbabilityOfDefault-PriceMatrix 64308 | | | | | ProbabilityOfDefaultPrice-Matrix 64310 | | | | | | 0..1 64312 |

FIG. 64-20

| Package | level1 | level2 | level3 | level4 | level5 | level6 | level7 | level8 | level9 | level10 | Cardinality |
|---|---|---|---|---|---|---|---|---|---|---|---|
| | | | | | | Item 64314 | | | | | 1..n 64316 |
| | | | | | | | ValidityDate 64318 | | | | 1 64320 |
| | | | | | | | ProbabilityOfDe-faultDecimal-Value 64322 | | | | 1 64324 |
| | | | | | | | UsageDecimal-Value 64326 | | | | 1 64328 |
| | | | | | | | Commitment-FeeDecimal-Value 64330 | | | | 0..1 64332 |

FIG. 64-21

| Package | level1 | level2 | level3 | level4 | level5 | level6 | level7 | level8 | level9 | level10 | Cardinality |
|---|---|---|---|---|---|---|---|---|---|---|---|
| | | | | | | | Facility-FeeDecimal-Value 64334 | | | | 0..1 64336 |
| | | | | | | | SpreadDeci-malValue 64338 | | | | 0..1 64340 |
| Rating-PriceMa-trix 64342 | | | | | Rating-PriceMatrix 64344 | | | | | | 0..1 64346 |
| | | | | | | Item 64348 | | | | | 1..n 64350 |
| | | | | | | | ValidityDate 64352 | | | | 1 64354 |

FIG. 64-22

| Package | level1 | level2 | level3 | level4 | level5 | level6 | level7 | level8 | level9 | level10 | Cardinality |
|---|---|---|---|---|---|---|---|---|---|---|---|
| | | | | | | | RatingModelID 64356 | | | | 1 64358 |
| | | | | | | | Minimum-CreditRating-Code 64360 | | | | 1 64362 |
| | | | | | | | Maximum-CreditRating-Code 64364 | | | | 1 64366 |
| | | | | | | | ProbabilityOfDe-faultCalibra-tionMatrixID 64368 | | | | 1 64370 |
| | | | | | | | UsageDecimal-Value 64372 | | | | 1 64374 |

FIG. 64-23

| Package | level1 | level2 | level3 | level4 | level5 | level6 | level7 | level8 | level9 | level10 | Cardinality |
|---|---|---|---|---|---|---|---|---|---|---|---|
| | | | | | | | Commitment-FeeDecimal-Value 64376 | | | | 0..1 64378 |
| | | | | | | | Facility-FeeDecimal-Value 64380 | | | | 0..1 64382 |
| | | | | | | | SpreadDeci-malValue 64384 | | | | 0..1 64386 |
| Prepay-ment 64388 | | | | | Prepay-ment 64390 | | | | | | 0..n 64392 |
| | | | | | | PrepayableIn-dicator 64394 | | | | | 1 64396 |

FIG. 64-24

| Package | level1 | level2 | level3 | level4 | level5 | level6 | level7 | level8 | level9 | level10 | Cardinality |
|---|---|---|---|---|---|---|---|---|---|---|---|
| | | | | | | Item 64398 | | | | | 0..n 64400 |
| | | | | | | | PaymentDate 64402 | | | | 1 64404 |
| | | | | | | | CostsOfPre-paymentFrac-tionDecimal-Value 64406 | | | | 0..1 64408 |
| | | | | | | | PenaltyOfPre-paymentFrac-tionDecimal-Value 64410 | | | | 0..1 64412 |
| Spread-Curve 64414 | | | | | Spread-Curve 64416 | | | | | | 0..1 64418 |

FIG. 64-25

| Package | level1 | level2 | level3 | level4 | level5 | level6 | level7 | level8 | level9 | level10 | Cardinality |
|---|---|---|---|---|---|---|---|---|---|---|---|
| | | | | | | Item 64420 | | | | | 1..n 64422 |
| | | | | | | | ValidityDate 64424 | | | | 1 64426 |
| | | | | | | | Duration 64428 | | | | 1 64430 |
| | | | | | | | Spread-DoubleValue 64432 | | | | 1 64434 |
| Property 64436 | | | | | Property 64438 | | | | | | 0..n 64440 |
| | | | | | | ID 64442 | | | | | 1 64444 |
| | | | | | | Value 64446 | | | | | 1 64448 |

FIG. 65-1

| Package | level1 | level2 | level3 | level4 | level5 | level6 | level7 | level8 | level9 | level10 | Cardinality |
|---|---|---|---|---|---|---|---|---|---|---|---|
| CrdtPrtfo-ModFSIn-DatBond-CrteReqMsg 65000 | CrdtPrtfoModFSInDat-Bond-CrteReqMsg 65002 | | | | | | | | | | |
| Message-Header 65004 | | Mes-sage-Header 65006 | | | | | | | | | 1 65008 |
| CreditPort-folioModel 65010 | | Credit-Portfo-lio-Model 65012 | | | | | | | | | 1 65014 |
| | | | ID 65016 | | | | | | | | 1 65018 |

FIG. 65-2

| Package | level1 | level2 | level3 | level4 | level5 | level6 | level7 | level8 | level9 | level10 | Cardinality |
|---|---|---|---|---|---|---|---|---|---|---|---|
| | | | CreditPort-folioMan-agement-Process-Control 65020 | | | | | | | | 1 65022 |
| | | | | Data-Trans-ferID 65024 | | | | | | | 1 65026 |
| | | | CreditPort-folio 65028 | | | | | | | | 1 65030 |
| | | | | ID 65032 | | | | | | | 1 65034 |
| InputData 65036 | | | InputData 65038 | | | | | | | | 1 65040 |

FIG. 65-3

| Package | level1 | level2 | level3 | level4 | level5 | level6 | level7 | level8 | level9 | level10 | Cardinality |
|---|---|---|---|---|---|---|---|---|---|---|---|
| Bond 65042 | | | | Bond 65044 | | | | | | | 1 65046 |
| | | | | | ID 65048 | | | | | | 1 65050 |
| | | | | | Guaran-teeID 65052 | | | | | | 0..1 65054 |
| | | | | | Descrip-tion 65056 | | | | | | 0..1 65058 |
| | | | | | Currency-Code 65060 | | | | | | 1 65062 |

FIG. 65-4

| Package | level1 | level2 | level3 | level4 | level5 | level6 | level7 | level8 | level9 | level10 | Cardinality |
|---|---|---|---|---|---|---|---|---|---|---|---|
| | | | | | Valid-ityPeriod 65064 | | | | | | 1 65066 |
| | | | | | Seniori-tyCode 65068 | | | | | | 1 65070 |
| | | | | | IssuedA-mount 65072 | | | | | | 1 65074 |
| Counter-party 65076 | | | | | Counter-party 65078 | | | | | | 1 65080 |
| | | | | | | InternalID 65082 | | | | | 1 65084 |

FIG. 65-5

| Package | level1 | level2 | level3 | level4 | level5 | level6 | level7 | level8 | level9 | level10 | Cardinality |
|---|---|---|---|---|---|---|---|---|---|---|---|
| | | | | | | Guarantor-Substitution-Category-Code 65086 | | | | | 0..1 65088 |
| Guaran-torParty 65090 | | | | | Guaran-torParty 65092 | | | | | | 0..1 65094 |
| | | | | | | InternalID 65096 | | | | | 0..1 65098 |
| CreditEx-posure-Data 65100 | | | | | CreditEx-posure-Data 65102 | | | | | | 1 65104 |
| | | | | | | LossGivenDefaultDecimal-Value 65106 | | | | | 0..1 65108 |

FIG. 65-6

| Package | level1 | level2 | level3 | level4 | level5 | level6 | level7 | level8 | level9 | level10 | Cardinality |
|---|---|---|---|---|---|---|---|---|---|---|---|
| | | | | | | ShapeBeta-Distribution-DecimalValue 65110 | | | | | 0..1 65112 |
| | | | | | | ExpectedLossGivenDe-faultDecimal-Value 65114 | | | | | 0..1 65116 |
| | | | | | | ExposureAt-DefaultA-mount 65118 | | | | | 0..1 65120 |
| | | | | | | PriceAtHori-zon 65122 | | | | | 0..1 65124 |
| | | | | | | | Duration 65126 | | | | 0..1 65128 |

FIG. 65-7

| Package | level1 | level2 | level3 | level4 | level5 | level6 | level7 | level8 | level9 | level10 | Cardinality |
|---|---|---|---|---|---|---|---|---|---|---|---|
| | | | | | | | Amount 65130 | | | | 0..1 65132 |
| | | | | | | | DecimalValue 65134 | | | | 0..1 65136 |
| | | | | | | CurrentPrice 65138 | | | | | 0..1 65140 |
| | | | | | | | Duration 65142 | | | | 0..1 65144 |
| | | | | | | | Amount 65146 | | | | 0..1 65148 |
| | | | | | | | DecimalValue 65150 | | | | 0..1 65152 |

FIG. 65-8

| Package | level1 | level2 | level3 | level4 | level5 | level6 | level7 | level8 | level9 | level10 | Cardinality |
|---|---|---|---|---|---|---|---|---|---|---|---|
| | | | | | | CreditPortfolioManagementProductCode 65154 | | | | | 1 65156 |
| | | | | | | RecoveryAmount 65158 | | | | | 0..1 65160 |
| FinancialCondition 65162 | | | | | FinancialCondition 65164 | | | | | | |
| | | | | | | InterestCondition 65166 | | | | | |

FIG. 65-9

| Package | level1 | level2 | level3 | level4 | level5 | level6 | level7 | level8 | level9 | level10 | Cardinality |
|---|---|---|---|---|---|---|---|---|---|---|---|
| | | | | | | | BankContractFinancialConditionSpecification 65168 | | | | |
| | | | | | | | | BankContractFinancialConditionUsageCode 65170 | | | |
| | | | | | | | | Calculation 65172 | | | |
| | | | | | | | | | RecurrenceSpecification 65174 | | |

FIG. 65-10

| Package | level1 | level2 | level3 | level4 | level5 | level6 | level7 | level8 | level9 | level10 | Cardinality |
|---|---|---|---|---|---|---|---|---|---|---|---|
| | | | | | | | | | | PeriodDurationDayRecurrence 65176 | |
| | | | | | | | | AmountSpecification 65178 | | | |
| | | | | | | | | | Amount 65180 | | |
| | | | | | | | | | Percent 65182 | | |
| | | | | | | | | InterestSpecification 65184 | | | |

FIG. 65-11

| Package | level1 | level2 | level3 | level4 | level5 | level6 | level7 | level8 | level9 | level10 | Cardinality |
|---|---|---|---|---|---|---|---|---|---|---|---|
| | | | | | | | | | Interest-Calculation Method-Code 65186 | | |
| | | | | | | | | | VariableIn-terest 65188 | | |
| | | | | | | | | | | Refer-enceIn-terest-Curve-Code 65190 | |
| | | | | | | | | | | Margin-Percent 65192 | |

FIG. 65-12

| Package | level1 | level2 | level3 | level4 | level5 | level6 | level7 | level8 | level9 | level10 | Cardinality |
|---|---|---|---|---|---|---|---|---|---|---|---|
| | | | | | | | | | | Adjust-men-tRecuur-ence 65194 | |
| | | | | | | | | | | Yield-Curve-ModelID 65196 | |
| | | | | | | FeeCondition 65198 | | | | | |
| | | | | | | | BankCon-tractFinan-cialCondi-tionSpecifica-tion 65200 | | | | |

FIG. 65-13

| Package | level1 | level2 | level3 | level4 | level5 | level6 | level7 | level8 | level9 | level10 | Cardinality |
|---|---|---|---|---|---|---|---|---|---|---|---|
| | | | | | | | | BankContractFinancialConditionUsageCode 65202 | | | |
| | | | | | | | | Calculation 65204 | | | |
| | | | | | | | | | RecurrenceSpecification 65206 | | |
| | | | | | | | | | | PeriodDurationDayRecurrence 65208 | |

FIG. 65-14

| Package | level1 | level2 | level3 | level4 | level5 | level6 | level7 | level8 | level9 | level10 | Cardinality |
|---|---|---|---|---|---|---|---|---|---|---|---|
| | | | | | | | | AmountS-pecification 65210 | | | |
| | | | | | | | | | Amount 65212 | | |
| | | | | | | | | | Percent 65214 | | |
| | | | | | | Payment-Condition 65216 | | | | | |
| | | | | | | | BankCon-tractFinan-cialCondi-tionSpecifica-tion 65218 | | | | |

FIG. 65-15

| Package | level1 | level2 | level3 | level4 | level5 | level6 | level7 | level8 | level9 | level10 | Cardinality |
|---|---|---|---|---|---|---|---|---|---|---|---|
| | | | | | | | | BankContractFinancialConditionUsageCode 65220 | | | |
| | | | | | | | | Calculation 65222 | | | |
| | | | | | | | | | RecurrenceSpecification 65224 | | |
| | | | | | | | | | | PeriodDurationDayRecurrence 65226 | |

FIG. 65-16

| Package | level1 | level2 | level3 | level4 | level5 | level6 | level7 | level8 | level9 | level10 | Cardinality |
|---|---|---|---|---|---|---|---|---|---|---|---|
| | | | | | | | | AmountS-pecification 65228 | | | |
| | | | | | | | | | Amount 65230 | | |
| | | | | | | | | | Percent 65232 | | |
| Cash-FlowItem 65234 | | | | | Cash-FlowItem 65236 | | | | | | |
| | | | | | | CashFlow-Date 65238 | | | | | |
| | | | | | | InterestCash-FlowAmount 65240 | | | | | |

FIG. 65-17

| Package | level1 | level2 | level3 | level4 | level5 | level6 | level7 | level8 | level9 | level10 | Cardinality |
|---|---|---|---|---|---|---|---|---|---|---|---|
| | | | | | | ChargeCash-FlowAmount 65242 | | | | | |
| | | | | | | Payment-CashFlowA-mount 65244 | | | | | |
| Probabili-tyOfDe-fault 65246 | | | | | Probabili-tyOfDe-fault 65248 | | | | | | 0..n 65250 |
| | | | | | | ValidityDate-Period 65252 | | | | | 1 65254 |
| | | | | | | Code 65256 | | | | | 1 65258 |

FIG. 65-18

| Package | level1 | level2 | level3 | level4 | level5 | level6 | level7 | level8 | level9 | level10 | Cardinality |
|---|---|---|---|---|---|---|---|---|---|---|---|
| | | | | | | DoubleValue 65260 | | | | | 1 65262 |
| Rating 65264 | | | | | Rating 65266 | | | | | | 0..n 65268 |
| | | | | | | ModelID 65270 | | | | | 1 65272 |
| | | | | | | ValidityDate-Period 65274 | | | | | 1 65276 |
| | | | | | | Code 65278 | | | | | 1 65280 |
| | | | | | | Master-CreditRating-Code 65282 | | | | | 0..1 65284 |

FIG. 65-19

| Package | level1 | level2 | level3 | level4 | level5 | level6 | level7 | level8 | level9 | level10 | Cardinality |
|---|---|---|---|---|---|---|---|---|---|---|---|
| | | | | | | InternalRat-ingIndicator 65286 | | | | | 0..1 65288 |
| | | | | | | Maturity 65290 | | | | | 0..1 65292 |
| | | | | | | Date 65294 | | | | | 1 65296 |
| | | | | | | Tendency-Code 65298 | | | | | 0..1 65300 |
| SinkData 65302 | | | | | SinkData 65304 | | | | | | 0..1 65306 |
| | | | | | | Item 65308 | | | | | 1..n 65310 |

FIG. 65-20

| Package | level1 | level2 | level3 | level4 | level5 | level6 | level7 | level8 | level9 | level10 | Cardinality |
|---|---|---|---|---|---|---|---|---|---|---|---|
| | | | | | | | Repayment-Date 65312 | | | | 1 65314 |
| | | | | | | | Repaymen-tAmount 65316 | | | | 1 65318 |
| | | | | | | | PriceOfRe-paymentFrac-tionDecimal-Value 65320 | | | | 1 65322 |
| Option 65324 | | | | | Option 65326 | | | | | | 1..n 65328 |
| | | | | | | ValidityPeriod 65330 | | | | | 1 65332 |

FIG. 65-21

| Package | level1 | level2 | level3 | level4 | level5 | level6 | level7 | level8 | level9 | level10 | Cardinality |
|---|---|---|---|---|---|---|---|---|---|---|---|
| | | | | | | Category-Code 65334 | | | | | 1 65336 |
| | | | | | | StyleCode 65338 | | | | | 1 65340 |
| | | | | | | MutualRigh-tOfNoticePur-chaseIndica-tor 65342 | | | | | 0..1 65344 |
| | | | | | | Quotation-Code 65346 | | | | | 0..1 65348 |
| | | | | | | SingleExer-ciseIndicator 65350 | | | | | 0..1 65352 |

FIG. 65-22

| Package | level1 | level2 | level3 | level4 | level5 | level6 | level7 | level8 | level9 | level10 | Cardinality |
|---|---|---|---|---|---|---|---|---|---|---|---|
| | | | | | | Item 65354 | | | | | 1..n 65356 |
| | | | | | | | ValidityPeriod 65358 | | | | 0..1 65360 |
| | | | | | | | Exercise-PriceFrac-tionDecimal-Value 65362 | | | | 0..1 65364 |
| | | | | | | | StrikePercent 65366 | | | | 0..1 65368 |
| | | | | | | | StrikeAmount 65370 | | | | 0..1 65372 |

FIG. 65-23

| Package | level1 | level2 | level3 | level4 | level5 | level6 | level7 | level8 | level9 | level10 | Cardinality |
|---|---|---|---|---|---|---|---|---|---|---|---|
| | | | | | | Exercise-DateSpecification 65374 | | | | | 0..n 65376 |
| | | | | | | | Excercis-eValidityPeriod 65378 | | | | 1 65380 |
| Spread-Curve 65382 | | | | | Spread-Curve 65384 | | | | | | 0..1 65386 |
| | | | | | | Item 65388 | | | | | 1..n 65390 |
| | | | | | | | ValidityDate 65392 | | | | 1 65394 |
| | | | | | | | Duration 65396 | | | | 1 65398 |

FIG. 65-24

| Package | level1 | level2 | level3 | level4 | level5 | level6 | level7 | level8 | level9 | level10 | Cardinality |
|---|---|---|---|---|---|---|---|---|---|---|---|
| | | | | | | | Spread-DoubleValue 65400 | | | | 1 65402 |
| Property 65404 | | | | | Property 65406 | | | | | | 0..n 65408 |
| | | | | | | ID 65410 | | | | | 1 65412 |
| | | | | | | Value 65414 | | | | | 1 65416 |

FIG. 66-1

| Package | level1 | level2 | level3 | level4 | level5 | level6 | level7 | level8 | level9 | level10 | Cardinality |
|---|---|---|---|---|---|---|---|---|---|---|---|
| CrdtPrtfo-ModFSIn-DatTOB-SltmCrteReqMsg 66000 | CrdtPrtfoModFSIn-DatTOB-SltmCrteReqMsg 66002 | | | | | | | | | | |
| Message-Header 66004 | | Mes-sage-Header 66006 | | | | | | | | | 1 66008 |
| Credit-Portfolio-Model 66010 | | Credit-Portfo-lio-Model 66012 | | | | | | | | | 1 66014 |
| | | | ID 66016 | | | | | | | | 1 66018 |

FIG. 66-2

| Package | level1 | level2 | level3 | level4 | level5 | level6 | level7 | level8 | level9 | level10 | Cardinality |
|---|---|---|---|---|---|---|---|---|---|---|---|
| | | | Credit-Portfolio-Management-Process-Control 66020 | | | | | | | | 1 66022 |
| | | | | Data-TransferID 66024 | | | | | | | 1 66026 |
| | | | Credit-Portfolio 66028 | | | | | | | | 1 66030 |
| | | | | ID 66032 | | | | | | | 1 66034 |
| Input-Data 66036 | | | InputData 66038 | | | | | | | | |

FIG. 66-3

| Package | level1 | level2 | level3 | level4 | level5 | level6 | level7 | level8 | level9 | level10 | Cardinality |
|---|---|---|---|---|---|---|---|---|---|---|---|
| Tradi-tionalOffBalanceSheetItem 66040 | | | | Tradi-tion-alOffBalance-SheetItem 66042 | | | | | | | 1 66044 |
| | | | | | ID 66046 | | | | | | 1 66048 |
| | | | | | Guaran-teeID 66050 | | | | | | 0..1 66052 |
| | | | | | Descrip-tion 66054 | | | | | | 0..1 66056 |

FIG. 66-4

| Package | level1 | level2 | level3 | level4 | level5 | level6 | level7 | level8 | level9 | level10 | Cardinality |
|---|---|---|---|---|---|---|---|---|---|---|---|
| | | | | | CurrencyCode 66058 | | | | | | 1 66060 |
| | | | | | ValidityPeriod 66062 | | | | | | 1 66064 |
| | | | | | ExternalLineAmount 66066 | | | | | | 0..1 66068 |
| | | | | | UtilizationAmount 66070 | | | | | | 0..1 66072 |
| Counterparty 66074 | | | | | Counterparty 66076 | | | | | | 1 66078 |

FIG. 66-5

| Package | level1 | level2 | level3 | level4 | level5 | level6 | level7 | level8 | level9 | level10 | Cardinality |
|---|---|---|---|---|---|---|---|---|---|---|---|
| | | | | | | InternalID 66080 | | | | | 1 66082 |
| | | | | | | GuarantorSubstitutionCategoryCode 66084 | | | | | |
| Guarantor-Party 66086 | | | | | GuarantorParty 66088 | | | | | | 0..1 66090 |
| | | | | | | InternalID 66092 | | | | | 0..1 66094 |
| CreditExposure-Data 66096 | | | | | CreditExposureData 66098 | | | | | | 1 66100 |

FIG. 66-6

| Package | level1 | level2 | level3 | level4 | level5 | level6 | level7 | level8 | level9 | level10 | Cardinality |
|---|---|---|---|---|---|---|---|---|---|---|---|
| | | | | | | LossGivenDefaultDecimalValue 66102 | | | | | 0..1 66104 |
| | | | | | | ShapeBetaDistributionDecimalValue 66106 | | | | | 0..1 66108 |
| | | | | | | ExpectedLossGivenDefaultDecimalValue 66110 | | | | | 0..1 66112 |
| | | | | | | ExposureAtDefaultAmount 66114 | | | | | 0..1 66116 |
| | | | | | | ExpectedUsageDecimalValue 66118 | | | | | 0..1 66120 |

FIG. 66-7

| Package | level1 | level2 | level3 | level4 | level5 | level6 | level7 | level8 | level9 | level10 | Cardinality |
|---|---|---|---|---|---|---|---|---|---|---|---|
| | | | | | | UsageGivenDefaultDecimalValue 66122 | | | | | 0..1 66124 |
| | | | | | | CreditPortfolioManagementProductCode 66126 | | | | | 1 66128 |
| | | | | | | IndividualAggregationConstituentsNumberValue 66130 | | | | | 0..1 66132 |
| | | | | | | ActualAggregateNumberValue 66134 | | | | | 0..1 66136 |
| | | | | | | PriceAtHorizon 66138 | | | | | 0..1 66140 |

FIG. 66-8

| Package | level1 | level2 | level3 | level4 | level5 | level6 | level7 | level8 | level9 | level10 | Cardinality |
|---|---|---|---|---|---|---|---|---|---|---|---|
| | | | | | | | Duration 66142 | | | | 0..1 66144 |
| | | | | | | | Amount 66146 | | | | 0..1 66148 |
| | | | | | | | Decimal-Value 66150 | | | | 0..1 66152 |
| | | | | | | CurrentPrice 66154 | | | | | 0..1 66156 |
| | | | | | | | Duration 66158 | | | | 0..1 66160 |
| | | | | | | | Amount 66162 | | | | 0..1 66164 |

FIG. 66-9

| Package | level1 | level2 | level3 | level4 | level5 | level6 | level7 | level8 | level9 | level10 | Cardinality |
|---|---|---|---|---|---|---|---|---|---|---|---|
| | | | | | | | Decimal-Value 66166 | | | | 0..1 66168 |
| Finan-cial-Condi-tion 66170 | | | | | Finan-cialCon-dition 66172 | | | | | | |
| | | | | | | InterestCondi-tion 66174 | | | | | |
| | | | | | | | BankCon-tractFinan-cialCondi-tionSpecifi-cation 66176 | | | | |

FIG. 66-10

| Package | level1 | level2 | level3 | level4 | level5 | level6 | level7 | level8 | level9 | level10 | Cardinality |
|---|---|---|---|---|---|---|---|---|---|---|---|
| | | | | | | | | BankContractFinancialConditionUsageCode 66178 | | | |
| | | | | | | | | Calculation 66180 | | | |
| | | | | | | | | | RecurrenceSpecification 66182 | | |
| | | | | | | | | | | PeriodDuration-DayRecurrence 66184 | |

FIG. 66-11

| Package | level1 | level2 | level3 | level4 | level5 | level6 | level7 | level8 | level9 | level10 | Cardinality |
|---|---|---|---|---|---|---|---|---|---|---|---|
| | | | | | | | | AmountS-pecification 66186 | | | |
| | | | | | | | | | Amount 66188 | | |
| | | | | | | | | | Percent 66190 | | |
| | | | | | | | | InterestS-pecification 66192 | | | |
| | | | | | | | | | InterestCal-culation-MethodCode 66194 | | |

FIG. 66-12

| Package | level1 | level2 | level3 | level4 | level5 | level6 | level7 | level8 | level9 | level10 | Cardinality |
|---|---|---|---|---|---|---|---|---|---|---|---|
| | | | | | | | | | VariableIn-terest 66196 | | |
| | | | | | | | | | | Referen-ceInter-estCurve-Code 66198 | |
| | | | | | | | | | | Margin-Percent 66200 | |
| | | | | | | | | | | Adjustmen tRecuur-ence 66202 | |

FIG. 66-13

| Package | level1 | level2 | level3 | level4 | level5 | level6 | level7 | level8 | level9 | level10 | Cardinality |
|---|---|---|---|---|---|---|---|---|---|---|---|
| | | | | | | | | | | Yield-Curve-ModelID 66204 | |
| | | | | | | FeeCondition 66206 | | | | | |
| | | | | | | | BankContractFinancialConditionSpecification 66208 | | | | |
| | | | | | | | | BankContractFinancialConditionUsage-Code 66210 | | | |

FIG. 66-14

| Package | level1 | level2 | level3 | level4 | level5 | level6 | level7 | level8 | level9 | level10 | Cardinality |
|---|---|---|---|---|---|---|---|---|---|---|---|
| | | | | | | | | Calculation 66212 | | | |
| | | | | | | | | | Recur-renceSpeci-fication 66214 | | |
| | | | | | | | | | | PeriodDu-ration-DayRecur-rence 66216 | |
| | | | | | | | | AmountS-pecification 66218 | | | |
| | | | | | | | | | Amount 66220 | | |

FIG. 66-15

| Package | level1 | level2 | level3 | level4 | level5 | level6 | level7 | level8 | level9 | level10 | Cardinality |
|---|---|---|---|---|---|---|---|---|---|---|---|
| | | | | | | | | | Percent 66222 | | |
| | | | | | | PaymentCondition 66224 | | | | | |
| | | | | | | | BankContractFinancialConditionSpecification 66226 | | | | |
| | | | | | | | | BankContractFinancialConditionUsageCode 66228 | | | |
| | | | | | | | | Calculation 66230 | | | |

FIG. 66-16

| Package | level1 | level2 | level3 | level4 | level5 | level6 | level7 | level8 | level9 | level10 | Cardinality |
|---|---|---|---|---|---|---|---|---|---|---|---|
| | | | | | | | | | Recur-renceSpeci-fication 66232 | | |
| | | | | | | | | | | PeriodDu-ration-DayRecur-rence 66234 | |
| | | | | | | | | AmountS-pecification 66236 | | | |
| | | | | | | | | | Amount 66238 | | |
| | | | | | | | | | Percent 66240 | | |

FIG. 66-17

| Package | level1 | level2 | level3 | level4 | level5 | level6 | level7 | level8 | level9 | level10 | Cardinality |
|---|---|---|---|---|---|---|---|---|---|---|---|
| Prob-ability-OfDe-fault 66242 | | | | | Probabili-tyOfDe-fault 66244 | | | | | | 0..n 66246 |
| | | | | | | ValidityDatePe-riod 66248 | | | | | 1 66250 |
| | | | | | | Code 66252 | | | | | 1 66254 |
| | | | | | | DoubleValue 66256 | | | | | 1 66258 |
| Rating 66260 | | | | | Rating 66262 | | | | | | 0..n 66264 |
| | | | | | | ModelID 66266 | | | | | 1 66268 |

FIG. 66-18

| Package | level1 | level2 | level3 | level4 | level5 | level6 | level7 | level8 | level9 | level10 | Cardinality |
|---|---|---|---|---|---|---|---|---|---|---|---|
| | | | | | | ValidityDatePe-riod 66270 | | | | | 1 66272 |
| | | | | | | Code 66274 | | | | | 1 66276 |
| | | | | | | Master-CreditRating-Code 66278 | | | | | 0..1 66280 |
| | | | | | | InternalRat-ingIndicator 66282 | | | | | 0..1 66284 |
| | | | | | | MaturityDuration 66286 | | | | | 0..1 66288 |
| | | | | | | Date 66290 | | | | | 1 66292 |

FIG. 66-19

| Package | level1 | level2 | level3 | level4 | level5 | level6 | level7 | level8 | level9 | level10 | Cardinality |
|---|---|---|---|---|---|---|---|---|---|---|---|
| | | | | | | TendencyCode 66294 | | | | | 0..1 66296 |
| Prob-ability-OfDe-fault-Price-Matrix 66298 | | | | | Probabili-tyOfDe-fault-PriceMa-trix 66300 | | | | | | 0..1 66302 |
| | | | | | | Item 66304 | | | | | 1..n 66306 |
| | | | | | | | ValidityDate 66308 | | | | 1 66310 |
| | | | | | | | Probability-OfDefault-Decimal-Value 66312 | | | | 1 66314 |

FIG. 66-20

| Package | level1 | level2 | level3 | level4 | level5 | level6 | level7 | level8 | level9 | level10 | Cardinality |
|---|---|---|---|---|---|---|---|---|---|---|---|
| | | | | | | | UsageDecimalValue 66316 | | | | 1 66318 |
| | | | | | | | CommitmentFeeDecimalValue 66320 | | | | 0..1 66322 |
| | | | | | | | Facility-FeeDecimalValue 66324 | | | | 0..1 66326 |
| | | | | | | | Spread-Decimal-Value 66328 | | | | 0..1 66330 |

FIG. 66-21

| Package | level1 | level2 | level3 | level4 | level5 | level6 | level7 | level8 | level9 | level10 | Cardinality |
|---|---|---|---|---|---|---|---|---|---|---|---|
| Rat-ingPriceMatrix 66332 | | | | | Rating-PriceMa-trix 66334 | | | | | | 0..1 66336 |
| | | | | | | Item 66338 | | | | | 1..n 66340 |
| | | | | | | | ValidityDate 66342 | | | | 1 66344 |
| | | | | | | | RatingMode-lID 66346 | | | | 1 66348 |
| | | | | | | | Minimum-CreditRat-ingCode 66350 | | | | 1 66352 |

FIG. 66-22

| Package | level1 | level2 | level3 | level4 | level5 | level6 | level7 | level8 | level9 | level10 | Cardinality |
|---|---|---|---|---|---|---|---|---|---|---|---|
| | | | | | | | Maximum-CreditRat-ingCode 66354 | | | | 1 66356 |
| | | | | | | | Probability-OfDefault-Calibration-MatrixID 66358 | | | | 1 66360 |
| | | | | | | | UsageDeci-malValue 66362 | | | | 1 66364 |
| | | | | | | | Commitment FeeDeci-malValue 66366 | | | | 0..1 66368 |

FIG. 66-23

| Package | level1 | level2 | level3 | level4 | level5 | level6 | level7 | level8 | level9 | level10 | Cardinality |
|---|---|---|---|---|---|---|---|---|---|---|---|
| | | | | | | | FacilityFeeDecimalValue 66370 | | | | 0..1 66372 |
| | | | | | | | SpreadDecimalValue 66374 | | | | 0..1 66376 |
| Prepayment 66378 | | | | | Prepayment 66380 | | | | | | 0..n 66382 |
| | | | | | | PrepayableIndicator 66384 | | | | | 1 66386 |
| | | | | | | Item 66388 | | | | | 0..n 66390 |

FIG. 66-24

| Package | level1 | level2 | level3 | level4 | level5 | level6 | level7 | level8 | level9 | level10 | Cardinality |
|---|---|---|---|---|---|---|---|---|---|---|---|
| | | | | | | | Payment-Date 66392 | | | | 1 66394 |
| | | | | | | | CostsOfPre-payment-Fraction-Decimal-Value 66396 | | | | 0..1 66398 |
| | | | | | | | PenaltyOf-Prepay-mentFrac-tionDecimal-Value 66400 | | | | 0..1 66402 |
| Spread Curve 66404 | | | | | Spread-Curve 66406 | | | | | | 0..1 66408 |

FIG. 66-25

| Package | level1 | level2 | level3 | level4 | level5 | level6 | level7 | level8 | level9 | level10 | Cardinality |
|---|---|---|---|---|---|---|---|---|---|---|---|
| | | | | | | Item 66410 | | | | | 1..n 66412 |
| | | | | | | | ValidityDate 66414 | | | | 1 66416 |
| | | | | | | | Duration 66418 | | | | 1 66420 |
| | | | | | | | Spread-DoubleValue 66422 | | | | 1 66424 |
| Prop-erty 66426 | | | | | Property 66428 | | | | | | 0..n 66430 |
| | | | | | | ID 66432 | | | | | 1 66434 |
| | | | | | | Value 66436 | | | | | 1 66438 |

FIG. 67-1

| Package | level1 | level2 | level3 | level4 | level5 | level6 | level7 | level8 | level9 | level10 | Cardinality |
|---|---|---|---|---|---|---|---|---|---|---|---|
| CrdtPrtfo-ModFSIn-DatCrdtDeriCrteReqMsg 67000 | CrdtPrtfoModFSIn-DatCrdtDeriCrteReqMsg 67002 | | | | | | | | | | |
| Mes-sageHeader 67004 | | Mes-sage-Header 67006 | | | | | | | | | 1 67008 |
| Credit-Portfolio-Model 67010 | | Credit-Portfo-lio-Model 67012 | | | | | | | | | 1 67014 |
| | | | ID 67016 | | | | | | | | 1 67018 |

FIG. 67-2

| Package | level1 | level2 | level3 | level4 | level5 | level6 | level7 | level8 | level9 | level10 | Cardinality |
|---|---|---|---|---|---|---|---|---|---|---|---|
| | | | CreditPortfolioManagementProcessControl 67020 | | | | | | | | 1 67022 |
| | | | | DataTransferID 67024 | | | | | | | 1 67026 |
| | | | CreditPortfolio 67028 | | | | | | | | 1 67030 |
| | | | | ID 67032 | | | | | | | 1 67034 |
| InputData 67036 | | | InputData 67038 | | | | | | | | |

FIG. 67-3

| Package | level1 | level2 | level3 | level4 | level5 | level6 | level7 | level8 | level9 | level10 | Cardinality |
|---|---|---|---|---|---|---|---|---|---|---|---|
| Credit-Deriva-tive 67040 | | | | Credit-Deriva-tive 67042 | | | | | | | |
| | | | | | ID 67044 | | | | | | 1 67046 |
| | | | | | Guaran-teeID 67048 | | | | | | 0..1 67050 |
| | | | | | Description 67052 | | | | | | 0..1 67054 |
| | | | | | Currency-Code 67056 | | | | | | 1 67058 |

FIG. 67-4

| Package | level1 | level2 | level3 | level4 | level5 | level6 | level7 | level8 | level9 | level10 | Cardinality |
|---|---|---|---|---|---|---|---|---|---|---|---|
| | | | | | ValidityPe-riod 67060 | | | | | | 1 67062 |
| | | | | | Basket-Name 67064 | | | | | | 0..1 67066 |
| | | | | | FundedIn-dicator 67068 | | | | | | 0..1 67070 |
| | | | | | Original-Number-Value 67072 | | | | | | 0..1 67074 |
| | | | | | Begin-CountNum-berValue 67076 | | | | | | 0..1 67078 |

FIG. 67-5

| Package | level1 | level2 | level3 | level4 | level5 | level6 | level7 | level8 | level9 | level10 | Cardinality |
|---|---|---|---|---|---|---|---|---|---|---|---|
| | | | | | EndCount-Number-Value 67080 | | | | | | 0..1 67082 |
| Coun-terparty 67084 | | | | | Counter-party 67086 | | | | | | 1 67088 |
| | | | | | | InternalID 67090 | | | | | 1 67092 |
| Guar-antor-Party 67094 | | | | | Guarantor-Party 67096 | | | | | | 0..1 67098 |
| | | | | | | InternalID 67100 | | | | | 0..1 67102 |

FIG. 67-6

| Package | level1 | level2 | level3 | level4 | level5 | level6 | level7 | level8 | level9 | level10 | Cardinality |
|---|---|---|---|---|---|---|---|---|---|---|---|
| | | | | | | Guarantor-Substitution-Category-Code 67104 | | | | | |
| Cred-itExpo-sure-Data 67106 | | | | | CreditEx-posureData 67108 | | | | | | 1 67110 |
| | | | | | | LossGivenDe faultDeci-malValue 67112 | | | | | 0..1 67114 |
| | | | | | | ShapeBeta-Distribution-Decimal-Value 67116 | | | | | 0..1 67118 |

FIG. 67-7

| Package | level1 | level2 | level3 | level4 | level5 | level6 | level7 | level8 | level9 | level10 | Cardinality |
|---|---|---|---|---|---|---|---|---|---|---|---|
| | | | | | | Expected-LossGivenDefaultDeci-malValue 67120 | | | | | 0..1 67122 |
| | | | | | | ExposureAt-DefaultA-mount 67124 | | | | | 0..1 67126 |
| | | | | | | PriceAtHori-zon 67128 | | | | | 0..1 67130 |
| | | | | | | | Duration 67132 | | | | 0..1 67134 |
| | | | | | | | Amount 67136 | | | | 0..1 67138 |

FIG. 67-8

| Package | level1 | level2 | level3 | level4 | level5 | level6 | level7 | level8 | level9 | level10 | Cardinality |
|---|---|---|---|---|---|---|---|---|---|---|---|
| | | | | | | | DecimalValue 67140 | | | | 0..1 67142 |
| | | | | | | CurrentPrice 67144 | | | | | |
| | | | | | | | Duration 67146 | | | | 0..1 67148 |
| | | | | | | | Amount 67150 | | | | 0..1 67152 |
| | | | | | | | DecimalValue 67154 | | | | 0..1 67156 |
| | | | | | | CreditPortfolioManagementProductCode 67158 | | | | | 1 67160 |

FIG. 67-9

| Package | level1 | level2 | level3 | level4 | level5 | level6 | level7 | level8 | level9 | level10 | Cardinality |
|---|---|---|---|---|---|---|---|---|---|---|---|
| | | | | | | Protection-BuyerIndica-tor 67162 | | | | | 0..1 67164 |
| | | | | | | Restructur-ingCate-goryCode 67166 | | | | | 0..1 67168 |
| Refer-enceAs setItem 67170 | | | | | Refer-enceAs-setItem 67172 | | | | | | 0..1 67174 |
| | | | | | | ID 67176 | | | | | 1 67178 |
| | | | | | | GuaranteeID 67180 | | | | | 1 67182 |

FIG. 67-10

| Package | level1 | level2 | level3 | level4 | level5 | level6 | level7 | level8 | level9 | level10 | Cardinality |
|---|---|---|---|---|---|---|---|---|---|---|---|
| | | | | | | Counterparty 67184 | | | | | 1 67186 |
| | | | | | | | InternalID 67188 | | | | 1 67190 |
| | | | | | | | Guarantor-Substitution-CategoryCode 67192 | | | | |
| | | | | | | Guarantor-Party 67194 | | | | | 0..1 67196 |
| | | | | | | | InternalID 67198 | | | | 0..1 67200 |
| | | | | | | CreditExpo-sureData 67202 | | | | | 1 67204 |

FIG. 67-11

| Package | level1 | level2 | level3 | level4 | level5 | level6 | level7 | level8 | level9 | level10 | Cardinality |
|---|---|---|---|---|---|---|---|---|---|---|---|
| | | | | | | | LossGivenDe-faultDecimal-Value 67206 | | | | 0..1 67208 |
| | | | | | | | ShapeBeta-Distribution-DecimalValue 67210 | | | | 0..1 67212 |
| | | | | | | | Expected-LossGivenDe-faultDecimal-Value 67214 | | | | 0..1 67216 |
| | | | | | | | SeniorityCode 67218 | | | | 0..1 67220 |

FIG. 67-12

| Package | level1 | level2 | level3 | level4 | level5 | level6 | level7 | level8 | level9 | level10 | Cardinality |
|---|---|---|---|---|---|---|---|---|---|---|---|
| Finan-cial-Condi-tion 67222 | | | | | Financial-Condition 67224 | | | | | | |
| | | | | | | InterestCon-dition 67226 | | | | | |
| | | | | | | | BankCon-tractFinan-cialCondition-Specification 67228 | | | | |
| | | | | | | | | BankCon-tractFinan-cialCondi-tionUsage-Code 67230 | | | |

FIG. 67-13

| Package | level1 | level2 | level3 | level4 | level5 | level6 | level7 | level8 | level9 | level10 | Cardinality |
|---|---|---|---|---|---|---|---|---|---|---|---|
| | | | | | | | | Calculation 67232 | | | |
| | | | | | | | | | Recur-renceSpecification 67234 | | |
| | | | | | | | | | | PeriodDu-ration-DayRe-currence 67236 | |
| | | | | | | | | AmountS-pecification 67238 | | | |
| | | | | | | | | | Amount 67240 | | |

FIG. 67-14

| Package | level1 | level2 | level3 | level4 | level5 | level6 | level7 | level8 | level9 | level10 | Cardinality |
|---|---|---|---|---|---|---|---|---|---|---|---|
| | | | | | | | | | Percent 67242 | | |
| | | | | | | | | InterestS-pecification 67244 | | | |
| | | | | | | | | | Interest-Calculation-Method-Code 67246 | | |
| | | | | | | | | | VariableIn-terest 67248 | | |

FIG. 67-15

| Package | level1 | level2 | level3 | level4 | level5 | level6 | level7 | level8 | level9 | level10 | Cardinality |
|---|---|---|---|---|---|---|---|---|---|---|---|
| | | | | | | | | | | Referen-ceInterest Curve-Code 67250 | |
| | | | | | | | | | | Margin-Percent 67252 | |
| | | | | | | | | | | Adjust-men-tRecuur-ence 67254 | |
| | | | | | | | | | | Yield-Curve-ModelID 67256 | |

FIG. 67-16

| Package | level1 | level2 | level3 | level4 | level5 | level6 | level7 | level8 | level9 | level10 | Cardinality |
|---|---|---|---|---|---|---|---|---|---|---|---|
| | | | | | | FeeCondition 67258 | | | | | |
| | | | | | | | BankContractFinancialCondition-Specification 67260 | | | | |
| | | | | | | | | BankContractFinancialConditionUsage-Code 67262 | | | |
| | | | | | | | | Calculation 67264 | | | |
| | | | | | | | | | RecurrenceSpecification 67266 | | |

FIG. 67-17

| Package | level1 | level2 | level3 | level4 | level5 | level6 | level7 | level8 | level9 | level10 | Cardinality |
|---|---|---|---|---|---|---|---|---|---|---|---|
| | | | | | | | | | | PeriodDu-ration-DayRe-currence 67268 | |
| | | | | | | | | AmountS-pecification 67270 | | | |
| | | | | | | | | | Amount 67272 | | |
| | | | | | | | | | Percent 67274 | | |
| | | | | | | Payment-Condition 67276 | | | | | |

FIG. 67-18

| Package | level1 | level2 | level3 | level4 | level5 | level6 | level7 | level8 | level9 | level10 | Cardinality |
|---|---|---|---|---|---|---|---|---|---|---|---|
| | | | | | | | BankContractFinancialConditionSpecification 67278 | | | | |
| | | | | | | | | BankContractFinancialConditionUsageCode 67280 | | | |
| | | | | | | | | Calculation 67282 | | | |
| | | | | | | | | | RecurrenceSpecification 67284 | | |

FIG. 67-19

| Package | level1 | level2 | level3 | level4 | level5 | level6 | level7 | level8 | level9 | level10 | Cardinality |
|---|---|---|---|---|---|---|---|---|---|---|---|
| | | | | | | | | | | PeriodDuration-DayRecurrence 67286 | |
| | | | | | | | | AmountSpecification 67288 | | | |
| | | | | | | | | | Amount 67290 | | |
| | | | | | | | | | Percent 67292 | | |
| Probability-OfDefault | | | | | ProbabilityOfDefault 67296 | | | | | | 0..n 67298 |

FIG. 67-20

| Package | level1 | level2 | level3 | level4 | level5 | level6 | level7 | level8 | level9 | level10 | Cardinality |
|---|---|---|---|---|---|---|---|---|---|---|---|
| 67294 | | | | | | ValidityDate-Period 67300 | | | | | 1 67302 |
| | | | | | | Code 67304 | | | | | 1 67306 |
| | | | | | | DoubleValue 67308 | | | | | 1 67310 |
| Rating 67312 | | | | | Rating 67314 | | | | | | 0..n 67316 |
| | | | | | | ModelID 67318 | | | | | 1 67320 |
| | | | | | | ValidityDate-Period 67322 | | | | | 1 67324 |

FIG. 67-21

| Package | level1 | level2 | level3 | level4 | level5 | level6 | level7 | level8 | level9 | level10 | Cardinality |
|---|---|---|---|---|---|---|---|---|---|---|---|
| | | | | | | Code 67326 | | | | | 1 67328 |
| | | | | | | Master-CreditRat-ingCode 67330 | | | | | 0..1 67332 |
| | | | | | | InternalRat-ingIndicator 67334 | | | | | 0..1 67336 |
| | | | | | | MaturityDura-tion 67338 | | | | | 0..1 67340 |
| | | | | | | Date 67342 | | | | | 1 67344 |

FIG. 67-22

| Package | level1 | level2 | level3 | level4 | level5 | level6 | level7 | level8 | level9 | level10 | Cardinality |
|---|---|---|---|---|---|---|---|---|---|---|---|
| | | | | | | Tendency-Code 67346 | | | | | 0..1 67348 |
| Spread Curve 67350 | | | | | Spread-Curve 67352 | | | | | | 0..1 67354 |
| | | | | | | Item 67356 | | | | | 1..n 67358 |
| | | | | | | | ValidityDate 67360 | | | | 1 67362 |
| | | | | | | | Duration 67364 | | | | 1 67366 |
| | | | | | | | Spread-DoubleValue 67368 | | | | 1 67370 |

FIG. 67-23

| Package | level1 | level2 | level3 | level4 | level5 | level6 | level7 | level8 | level9 | level10 | Cardinality |
|---|---|---|---|---|---|---|---|---|---|---|---|
| Prop-erty 67372 | | | | | Property 67374 | | | | | | 0..n 67376 |
| | | | | | | ID 67378 | | | | | 1 67380 |
| | | | | | | Value 67382 | | | | | 1 67384 |

FIG. 68-1

| Package | level1 | level2 | level3 | level4 | level5 | level6 | level7 | level8 | Cardinality |
|---|---|---|---|---|---|---|---|---|---|
| CrdtPrtfo-ModFSIn-DatPrtfoA-nlysDat-CrteReqMsg 68000 | CrdtPrtfo-ModFSIn-DatPrtfoA-nlysDat-CrteReqMsg 68002 | | | | | | | | |
| Message-Header 68004 | | Message-Header 68006 | | | | | | | 1 68008 |
| CreditPortfo-lioModel 68010 | | Credit-Portfolio-Model 68012 | | | | | | | 1 68014 |
| | | | ID 68016 | | | | | | 1 68018 |

FIG. 68-2

| Package | level1 | level2 | level3 | level4 | level5 | level6 | level7 | level8 | Cardinality |
|---|---|---|---|---|---|---|---|---|---|
| | | | CreditPortfolioManagementProcessControl 68020 | | | | | | |
| | | | | DataTransferID 68022 | | | | | |
| | | | CreditPortfolio 68024 | | | | | | 1 68026 |
| | | | | ID 68028 | | | | | 1 68030 |
| InputData 68032 | | | InputData 68034 | | | | | | 1 68036 |

FIG. 68-3

| Package | level1 | level2 | level3 | level4 | level5 | level6 | level7 | level8 | Cardinality |
|---|---|---|---|---|---|---|---|---|---|
| Portfolio-Analysis-Data 68038 | | | | PortfolioAnalysisData 68040 | | | | | 1 68042 |
| | | | | | ID 68044 | | | | 1 68046 |
| | | | | | ValidityDate 68048 | | | | |
| | | | | | CreditPortfolioAssignment 68050 | | | | 1 68052 |
| | | | | | | CreditPortfolioID 68054 | | | |

FIG. 68-4

| Package | level1 | level2 | level3 | level4 | level5 | level6 | level7 | level8 | Cardinality |
|---|---|---|---|---|---|---|---|---|---|
| Finan-cialIn-strumen-tExposure 68056 | | | | | | FinancialIn-strumentEx-posure 68058 | | | 1..n 68060 |
| | | | | | | | ID 68062 | | 1 68064 |
| | | | | | | | GuaranteeID 68066 | | 0..1 68068 |
| | | | | | | | Description 68070 | | 0..1 68072 |
| | | | | | | | Amount 68074 | | 1 68076 |

FIG. 68-5

| Package | level1 | level2 | level3 | level4 | level5 | level6 | level7 | level8 | Cardinality |
|---|---|---|---|---|---|---|---|---|---|
| | | | | | | | ShareNumberValue 68078 | | 1 68080 |
| Property 68082 | | | | | | | Property 68084 | | 0..n 68086 |
| | | | | | | | | ID 68088 | 1 68090 |
| | | | | | | | | Value 68092 | 1 68094 |

FIG. 69-1

| Package | level1 | level2 | level3 | level4 | level5 | level6 | Cardinality |
|---|---|---|---|---|---|---|---|
| CrdtPrtfo-ModFSInDatYld-CrvCrteReqMsg 69000 | CrdtPrtfo-ModFSInDatYld-CrvCrteReqMsg 69002 | | | | | | |
| MessageHeader 69004 | | Message-Header 69006 | | | | | 1 69008 |
| CreditPortfolio-Model 69010 | | CreditPort-folioModel 69012 | | | | | 1 69014 |
| | | | ID 69016 | | | | 1 69018 |
| | | | CreditPortfolio-Management-ProcessControl 69020 | | | | 1 69022 |

FIG. 69-2

| Package | level1 | level2 | level3 | level4 | level5 | level6 | Cardinality |
|---|---|---|---|---|---|---|---|
| | | | | DataTransferID 69024 | | | 1 69026 |
| | | | CreditPortfolio 69028 | | | | 1 69030 |
| | | | | ID 69032 | | | 1 69034 |
| InputData 69036 | | | InputData 69038 | | | | 1 69040 |
| YieldCurve 69042 | | | | YieldCurve 69044 | | | 1 69046 |
| | | | | | ID 69048 | | 1 69050 |

FIG. 69-3

| Package | level1 | level2 | level3 | level4 | level5 | level6 | Cardinality |
|---|---|---|---|---|---|---|---|
| | | | | | YieldCurve-ModelID 69052 | | |
| | | | | | VailidityDate 69054 | | 1 69056 |
| Item 69058 | | | | | Item 69060 | | 1..n 69062 |
| | | | | | | TenorDuration 69064 | 1 69066 |
| | | | | | | InterestRate-DoubleValue 69068 | 1 69070 |

FIG. 70-1

| Package | level1 | level2 | level3 | level4 | level5 | Cardinality |
|---|---|---|---|---|---|---|
| CrdtPrtfoModFSIn-DatExchRate-CrteReqMsg 70000 | CreditPortfolio-ModelFSInputDataEx-changeRateRequest-Message 70002 | | | | | |
| MessageHeader 70004 | | MessageHeader 70006 | | | | 1 70008 |
| CreditPortfolioModel 70010 | | CreditPortfolio-Model 70012 | | | | 1 70014 |
| | | | ID 70016 | | | 1 70018 |
| | | | CreditPortfolio-Management-ProcessControl 70020 | | | 1 70022 |

FIG. 70-2

| Package | level1 | level2 | level3 | level4 | level5 | Cardinality |
|---|---|---|---|---|---|---|
| | | | | DataTransferID 70024 | | 1 70026 |
| | | | CreditPortfolio 70028 | | | 1 70030 |
| | | | | ID 70032 | | 1 70034 |
| InputData 70036 | | | InputData 70038 | | | 1 70040 |
| ExchangeRateItem 70042 | | | | ExchangeRateItem 70044 | | 1..n 70046 |
| | | | | | ID 70048 | 1 70050 |
| | | | | | ValidityDate 70052 | 1 70054 |

FIG. 70-3

| Package | level1 | level2 | level3 | level4 | level5 | Cardinality |
|---|---|---|---|---|---|---|
| | | | | | ExchangeRate 70056 | 1 70058 |

FIG. 71-1

| Package | level1 | level2 | level3 | level4 | level5 | level6 | level7 | Cardinality |
|---|---|---|---|---|---|---|---|---|
| CrdtPrtfoModFSIn-DatPDClbrtMtxCrteReqMsg 71000 | CrdtPrtfo-ModFSIn-DatPDClbrtMtxCrteReqMsg 71002 | | | | | | | |
| MessageHeader 71004 | | Message-Header 71006 | | | | | | 1 71008 |
| CreditPortfolio-Model 71010 | | CreditPort-folioModel 71012 | | | | | | 1 71014 |
| | | | ID 71016 | | | | | 1 71018 |
| | | | CreditPortfolio-Management-ProcessControl 71020 | | | | | 1 71022 |

FIG. 71-2

| Package | level1 | level2 | level3 | level4 | level5 | level6 | level7 | Cardinality |
|---|---|---|---|---|---|---|---|---|
| | | | | DataTransferID 71024 | | | | 1 71026 |
| | | | CreditPortfolio 71028 | | | | | 1 71030 |
| | | | | ID 71032 | | | | 1 71034 |
| InputData 71036 | | | InputData 71038 | | | | | 1 71040 |
| ProbabilityOfDe-faultCalibration-Matrix 71042 | | | | ProbabilityOfDe-faultCalibration-Matrix 71044 | | | | 1 71046 |
| | | | | | ID 71048 | | | 1 71050 |

FIG. 71-3

| Package | level1 | level2 | level3 | level4 | level5 | level6 | level7 | Cardinality |
|---|---|---|---|---|---|---|---|---|
| | | | | | Rating-ModelID 71052 | | | 1 71054 |
| | | | | | Validity-DatePeriod 71056 | | | 1 71058 |
| Item 71060 | | | | | Item 71062 | | | 1..n 71064 |
| | | | | | | CreditRating-Code 71066 | | 1 71068 |
| | | | | | | Probability-OfDefault 71070 | | 1..n 71072 |
| | | | | | | | TermDuration 71074 | 1 71076 |

FIG. 71-4

| Package | level1 | level2 | level3 | level4 | level5 | level6 | level7 | Cardinality |
|---|---|---|---|---|---|---|---|---|
| | | | | | | | DoubleValue 71078 | 1 71080 |

FIG. 72-1

| Package | level1 | level2 | level3 | level4 | level5 | level6 | level7 | Cardinality |
|---|---|---|---|---|---|---|---|---|
| CrdtPrtfo-ModFSIn-DatCrdtSprdCrteReqMsg 72000 | CrdtPrtfoModFSInDatCrdtSprdCrteReqMsg 72002 | | | | | | | |
| Message-Header 72004 | | Message-Header 72006 | | | | | | 1 72008 |
| CreditPort-folioModel 72010 | | CreditPort-folioModel 72012 | | | | | | 1 72014 |
| | | | ID 72016 | | | | | 1 72018 |
| | | | CreditPortfo-lioManage-mentProcess-Control 72020 | | | | | |

FIG. 72-2

| Package | level1 | level2 | level3 | level4 | level5 | level6 | level7 | Cardinality |
|---|---|---|---|---|---|---|---|---|
| | | | | DataTransferID 72022 | | | | 1 72024 |
| | | | CreditPortfolio 72026 | | | | | 1 72028 |
| | | | | ID 72030 | | | | 1 72032 |
| InputData 72034 | | | InputData 72036 | | | | | 1 72038 |
| Cred-itSpread-Matrix 72040 | | | | CreditSpread-Matrix 72042 | | | | 1 72044 |
| | | | | | ID 72046 | | | 1 72048 |

FIG. 72-3

| Package | level1 | level2 | level3 | level4 | level5 | level6 | level7 | Cardinality |
|---|---|---|---|---|---|---|---|---|
| | | | | | RatingModelID 72050 | | | 1 72052 |
| | | | | | ValidityDatePeriod 72054 | | | 1 72056 |
| | | | | | Item 72058 | | | 1..n 72060 |
| Item 72062 | | | | | | CreditRatingCode 72064 | | 1 72066 |
| | | | | | | YieldCurveModelID 72068 | | |
| | | | | | | CreditSpread 72070 | | 1..n 72072 |
| | | | | | | | TermDuration 72074 | 1 72076 |

FIG. 72-4

| Package | level1 | level2 | level3 | level4 | level5 | level6 | level7 | Cardinality |
|---|---|---|---|---|---|---|---|---|
| | | | | | | | DecimalValue 72078 | 1 72080 |

FIG. 73-1

| Package | level1 | level2 | level3 | level4 | level5 | level6 | Cardinality |
|---|---|---|---|---|---|---|---|
| CrdtPrtfo-ModFSIn-DatRatgMtxCrteReqMsg 73000 | CrdtPrtfo-ModFSIn-DatRatgMtxCrteReqMsg 73002 | | | | | | |
| MessageHeader 73004 | | Message-Header 73006 | | | | | 1 73008 |
| CreditPortfolio-Model 73010 | | CreditPort-folioModel 73012 | | | | | 1 73014 |
| | | | ID 73016 | | | | 1 73018 |
| | | | CreditPortfolio-Management-ProcessControl 73020 | | | | 1 73022 |

FIG. 73-2

| Package | level1 | level2 | level3 | level4 | level5 | level6 | Cardinality |
|---|---|---|---|---|---|---|---|
| | | | | DataTransferID 73024 | | | 1 73026 |
| | | | CreditPortfolio 73028 | | | | 1 73030 |
| | | | | ID 73032 | | | 1 73034 |
| InputData 73036 | | | InputData 73038 | | | | |
| RatingTransitionMatrix 73040 | | | | RatingTransition-Matrix 73042 | | | 1 73044 |
| | | | | | ID 73046 | | 1 73048 |

FIG. 73-3

| Package | level1 | level2 | level3 | level4 | level5 | level6 | Cardinality |
|---|---|---|---|---|---|---|---|
| | | | | | RatingModelID 73050 | | 1 73052 |
| | | | | | ValidityDatePeriod 73054 | | 1 73056 |
| Item 73058 | | | | | Item 73060 | | 1..n 73062 |
| | | | | | | PeriodBegin-CreditRatingCode 73064 | 1 73066 |
| | | | | | | PeriodEnd-CreditRatingCode 73068 | 1 73070 |
| | | | | | | ProbabilityOfTransi-tionDoubleValue 73072 | 1 73074 |

FIG. 74-1

| Package | level1 | level2 | level3 | level4 | level5 | level6 | level7 | Cardinality |
|---|---|---|---|---|---|---|---|---|
| CrdtPrtfo-ModFSInDa-tOTCDeriCrteReqMsg 74000 | CrdtPrtfo-ModFSIn-Da-tOTCDeriCrteReqMsg 74002 | | | | | | | |
| Message-Header 74004 | | Message-Header 74006 | | | | | | 1 74008 |
| CreditPortfo-lioModel 74010 | | CreditPort-folioModel 74012 | | | | | | 1 74014 |
| | | | ID 74016 | | | | | 1 74018 |
| | | | CreditPortfolio-Management-ProcessControl 74020 | | | | | 1 74022 |

FIG. 74-2

| Package | level1 | level2 | level3 | level4 | level5 | level6 | level7 | Cardinality |
|---|---|---|---|---|---|---|---|---|
| | | | | Data-TransferID 74024 | | | | 1 74026 |
| | | | CreditPortfolio 74028 | | | | | 1 74030 |
| | | | | ID 74032 | | | | 1 74034 |
| InputData 74036 | | | InputData 74038 | | | | | 1 74040 |
| OTCDeriva-tive 74042 | | | | OTCDeri-vative 74044 | | | | 1 74046 |
| | | | | | ID 74048 | | | 1 74050 |

FIG. 74-3

| Package | level1 | level2 | level3 | level4 | level5 | level6 | level7 | Cardinality |
|---|---|---|---|---|---|---|---|---|
| | | | | | GuaranteeID 74052 | | | 0..1 74054 |
| | | | | | Description 74056 | | | 0..1 74058 |
| | | | | | CurrencyCode 74060 | | | 1 74062 |
| | | | | | ValidityPeriod 74064 | | | 1 74066 |
| Counter-party 74068 | | | | | Counterparty 74070 | | | 1 74072 |
| | | | | | | InternalID 74074 | | 1 76076 |

FIG. 74-4

| Package | level1 | level2 | level3 | level4 | level5 | level6 | level7 | Cardinality |
|---|---|---|---|---|---|---|---|---|
| | | | | | | GuarantorSubstitution-CategoryCode 74078 | | |
| Guaran-torParty 74080 | | | | | GuarantorParty 74082 | | | 0..1 74084 |
| | | | | | | InternalID 74086 | | 0..1 74088 |
| CreditEx-posure-Data 74090 | | | | | CreditExpo-sureData 74092 | | | 1 74094 |
| | | | | | | LossGivenDefaultDeci-malValue 74096 | | 0..1 74098 |

FIG. 74-5

| Package | level1 | level2 | level3 | level4 | level5 | level6 | level7 | Cardinality |
|---|---|---|---|---|---|---|---|---|
| | | | | | | ShapeBetaDistribution-DecimalValue 74100 | | 0..1 74102 |
| | | | | | | ExpectedLossGivenDe-faultDecimalValue 74104 | | 0..1 74106 |
| | | | | | | ExposureAtDefaultA-mount 74108 | | 0..1 74110 |
| | | | | | | PriceAtHorizon 74112 | | 0..1 74114 |
| | | | | | | | Duration 74116 | 0..1 74118 |
| | | | | | | | Amount 74120 | 0..1 74122 |

FIG. 74-6

| Package | level1 | level2 | level3 | level4 | level5 | level6 | level7 | Cardinality |
|---|---|---|---|---|---|---|---|---|
| | | | | | | | DecimalValue 74124 | 0..1 74126 |
| | | | | | | CurrentPrice 74128 | | |
| | | | | | | | Duration 74130 | 0..1 74132 |
| | | | | | | | Amount 74134 | 0..1 74136 |
| | | | | | | | DecimalValue 74138 | 0..1 74140 |
| | | | | | | CreditPortfolioManage-mentProductCode 74142 | | 1 74144 |

FIG. 74-7

| Package | level1 | level2 | level3 | level4 | level5 | level6 | level7 | Cardinality |
|---|---|---|---|---|---|---|---|---|
| Probabili-tyOfDefault 74146 | | | | | ProbabilityOf-Default 74148 | | | 0..n 74150 |
| | | | | | | ValidityDatePeriod 74152 | | 1 74154 |
| | | | | | | Code 74156 | | 1 74158 |
| | | | | | | DoubleValue 74160 | | 1 74162 |
| Rating 74164 | | | | | Rating 74166 | | | 0..n 74168 |
| | | | | | | ModelID 74170 | | 1 74172 |

FIG. 74-8

| Package | level1 | level2 | level3 | level4 | level5 | level6 | level7 | Cardinality |
|---|---|---|---|---|---|---|---|---|
| | | | | | | ValidityDatePeriod 74174 | | 1 74176 |
| | | | | | | Code 74178 | | 1 74180 |
| | | | | | | MasterCreditRatingCode 74182 | | 0..1 74184 |
| | | | | | | InternalRatingIndicator 74186 | | 0..1 74188 |
| | | | | | | Maturity 74190 | | 0..1 74192 |
| | | | | | | Date 74194 | | 1 74196 |
| | | | | | | TendencyCode 74198 | | 0..1 74200 |

FIG. 74-9

| Package | level1 | level2 | level3 | level4 | level5 | level6 | level7 | Cardinality |
|---|---|---|---|---|---|---|---|---|
| Exposure-Profile 74202 | | | | | ExposureProfile 74204 | | | 0..1 74206 |
| | | | | | | Item 74208 | | 0..n 74210 |
| | | | | | | | Date 74212 | 1 74214 |
| | | | | | | | NegativeEx-posureAmount 74216 | 0..1 74218 |
| | | | | | | | PositiveExpo-sureAmount 74220 | 0..1 74222 |
| Risk-FreeProfile 74224 | | | | | RiskFreeProfile 74226 | | | 0..1 74228 |

FIG. 74-10

| Package | level1 | level2 | level3 | level4 | level5 | level6 | level7 | Cardinality |
|---|---|---|---|---|---|---|---|---|
| | | | | | | Item 74230 | | 0..n 74232 |
| | | | | | | | Date 74234 | 1 74236 |
| | | | | | | | RiskFreeAmount 74238 | 1 74240 |
| Property 74242 | | | | | Property 74244 | | | 0..n 74246 |
| | | | | | | ID 74248 | | 1 74250 |
| | | | | | | Value 74252 | | 1 74254 |

FIG. 75-1

| Package | level1 | level2 | level3 | level4 | level5 | level6 | level7 | Cardinality |
|---|---|---|---|---|---|---|---|---|
| CrdtPrtfo-ModFSIn-DatSecFT-CrteReqMsg 75000 | CrdtPrtfoModFSInDatSecFTCrteReqMsg 75002 | | | | | | | |
| Message-Header 75004 | | MessageHeader 75006 | | | | | | 1 75008 |
| CreditPortfo-lioModel 75010 | | Credit-Portfo-lioModel 75012 | | | | | | 1 75014 |
| | | | ID 75016 | | | | | 1 75018 |

FIG. 75-2

| Package | level1 | level2 | level3 | level4 | level5 | level6 | level7 | Cardinality |
|---|---|---|---|---|---|---|---|---|
| | | | CreditPortfolio-Management-ProcessControl 75020 | | | | | 1 75022 |
| | | | | DataTrans-ferID 75024 | | | | 1 75026 |
| | | | CreditPortfolio 75028 | | | | | 1 75030 |
| | | | | ID 75032 | | | | 1 75034 |
| InputData 75036 | | | InputData 75038 | | | | | 1 75040 |

FIG. 75-3

| Package | level1 | level2 | level3 | level4 | level5 | level6 | level7 | Cardinality |
|---|---|---|---|---|---|---|---|---|
| Securities-Financing-Transaction 75042 | | | | SecuritiesFi-nancing-Transaction 75044 | | | | 1 75046 |
| | | | | | ID 75048 | | | 1 75050 |
| | | | | | GuaranteeID 75052 | | | 0..1 75054 |
| | | | | | Description 75056 | | | 0..1 75058 |
| | | | | | CurrencyCode 75060 | | | 1 75062 |
| | | | | | ValidityPeriod 75064 | | | 1 75066 |

FIG. 75-4

| Package | level1 | level2 | level3 | level4 | level5 | level6 | level7 | Cardinality |
|---|---|---|---|---|---|---|---|---|
| Counter-party 75068 | | | | | Counterparty 75070 | | | 1 75072 |
| | | | | | | InternalID 75074 | | 1 75076 |
| | | | | | | GuarantorSubstitution-CategoryCode 75078 | | |
| Guaran-torParty 75080 | | | | | GuarantorParty 75082 | | | 0..1 75084 |
| | | | | | | InternalID 75086 | | 0..1 75088 |

FIG. 75-5

| Package | level1 | level2 | level3 | level4 | level5 | level6 | level7 | Cardinality |
|---|---|---|---|---|---|---|---|---|
| CreditEx-posure-Data 75090 | | | | | CreditExpo-sureData 75092 | | | 1 75094 |
| | | | | | | LossGivenDefaultDeci-malValue 75096 | | 0..1 75098 |
| | | | | | | ShapeBetaDistribution-DecimalValue 75100 | | 0..1 75102 |
| | | | | | | ExpectedLossGivenDe-faultDecimalValue 75104 | | 0..1 75106 |
| | | | | | | ExposureAtDefaultA-mount 75108 | | 0..1 75110 |

FIG. 75-6

| Package | level1 | level2 | level3 | level4 | level5 | level6 | level7 | Cardinality |
|---|---|---|---|---|---|---|---|---|
| | | | | | | PriceAtHorizon 75112 | | 0..1 75114 |
| | | | | | | | Duration 75116 | 0..1 75118 |
| | | | | | | | Amount 75120 | 0..1 75122 |
| | | | | | | | DecimalValue 75124 | 0..1 75126 |
| | | | | | | CurrentPrice 75128 | | |
| | | | | | | | Duration 75130 | 0..1 75132 |
| | | | | | | | Amount 75134 | 0..1 75136 |

FIG. 75-7

| Package | level1 | level2 | level3 | level4 | level5 | level6 | level7 | Cardinality |
|---|---|---|---|---|---|---|---|---|
| | | | | | | | DecimalValue 75138 | 0..1 75140 |
| | | | | | | CreditPortfolioManage-mentProductCode 75142 | | 1 75144 |
| Probabili-tyOfDefault 75146 | | | | | ProbabilityOf-Default 75148 | | | 0..n 75150 |
| | | | | | | ValidityDatePeriod 75152 | | 1 75154 |
| | | | | | | Code 75156 | | 1 75158 |
| | | | | | | DoubleValue 75160 | | 1 75162 |

FIG. 75-8

| Package | level1 | level2 | level3 | level4 | level5 | level6 | level7 | Cardinality |
|---|---|---|---|---|---|---|---|---|
| Rating 75164 | | | | | Rating 75166 | | | 0..n 75168 |
| | | | | | | ModelID 75170 | | 1 75172 |
| | | | | | | ValidityDatePeriod 75174 | | 1 75176 |
| | | | | | | Code 75178 | | 1 75180 |
| | | | | | | MasterCreditRatingCode 75182 | | 0..1 75184 |
| | | | | | | InternalRatingIndicator 75186 | | 0..1 75188 |
| | | | | | | Maturity 75190 | | 0..1 75192 |

FIG. 75-9

| Package | level1 | level2 | level3 | level4 | level5 | level6 | level7 | Cardinality |
|---|---|---|---|---|---|---|---|---|
| | | | | | | Date 75194 | | 1 75196 |
| | | | | | | TendencyCode 75198 | | 0..1 75200 |
| Exposure-Profile 75202 | | | | | ExposureProfile 75204 | | | 0..1 75206 |
| | | | | | | Item 75208 | | 0..n 75210 |
| | | | | | | | Date 75212 | 1 75214 |
| | | | | | | | NegativeExpo-sureAmount 75216 | 0..1 75218 |

FIG. 75-10

| Package | level1 | level2 | level3 | level4 | level5 | level6 | level7 | Cardinality |
|---|---|---|---|---|---|---|---|---|
| | | | | | | | PositiveExpo-sureAmount 75220 | 0..1 75222 |
| Risk-FreeProfile 75224 | | | | | RiskFreeProfile 75226 | | | 0..1 75228 |
| | | | | | | Item 75230 | | 0..n 75232 |
| | | | | | | | Date 75234 | 1 75236 |
| | | | | | | | RiskFreeA-mount 75238 | 1 75240 |
| Property 75242 | | | | | Property 75244 | | | 0..n 75246 |

FIG. 75-11

| Package | level1 | level2 | level3 | level4 | level5 | level6 | level7 | Cardinality |
|---|---|---|---|---|---|---|---|---|
| | | | | | | ID 75248 | | 1 75250 |
| | | | | | | Value 75252 | | 1 75254 |

FIG. 76-1

| Package | level1 | level2 | level3 | level4 | level5 | level6 | level7 | Cardinality |
|---|---|---|---|---|---|---|---|---|
| CrdtPrtfo-ModFSIn-DatStock-CrteReqMsg 76000 | CrdtPrtfo ModFSIn-DatStock-CrteReq Msg 76002 | | | | | | | |
| Message-Header 76004 | | Message-Header 76006 | | | | | | 1 76008 |
| CreditPortfo-lioModel 76010 | | CreditPort-folioModel 76012 | | | | | | 1 76014 |
| | | | ID 76016 | | | | | 1 76018 |
| | | | CreditPortfo-lioManage-mentProcess-Control 76020 | | | | | 1 76022 |

FIG. 76-2

| Package | level1 | level2 | level3 | level4 | level5 | level6 | level7 | Cardinality |
|---|---|---|---|---|---|---|---|---|
| | | | | DataTransferID 76024 | | | | 1 76026 |
| | | | CreditPortfolio 76028 | | | | | 1 76030 |
| | | | | ID 76032 | | | | 1 76034 |
| InputData 76036 | | | InputData 76038 | | | | | 1 76040 |
| Stock 76042 | | | | Stock 76044 | | | | |
| | | | | | ID 76046 | | | 1 76048 |
| | | | | | GuaranteeID 76050 | | | 0..1 76052 |

FIG. 76-3

| Package | level1 | level2 | level3 | level4 | level5 | level6 | level7 | Cardinality |
|---|---|---|---|---|---|---|---|---|
| | | | | | Description 76054 | | | 0..1 76056 |
| | | | | | CurrencyCode 76058 | | | 1 76060 |
| | | | | | ValidityPeriod 76062 | | | 1 76064 |
| IssuerParty 76066 | | | | | IssuerParty 76068 | | | 1 76070 |
| | | | | | | InternalID 76072 | | 1 76074 |
| | | | | | | GuarantorSubstitu-tionCode 76076 | | 0..1 76078 |

FIG. 76-4

| Package | level1 | level2 | level3 | level4 | level5 | level6 | level7 | Cardinality |
| --- | --- | --- | --- | --- | --- | --- | --- | --- |
| Guarantor-Party 76080 | | | | | GuarantorParty 76082 | | | 0..1 76084 |
| | | | | | | InternalID 76086 | | 0..1 76088 |
| CreditExpo-sureData 76090 | | | | | CreditExpo-sureData 76092 | | | 1 76094 |
| | | | | | | LossGivenDefault-DecimalValue 76096 | | 0..1 76098 |
| | | | | | | ShapeBetaDistribu-tionDecimalValue 76100 | | 0..1 76102 |

FIG. 76-5

| Package | level1 | level2 | level3 | level4 | level5 | level6 | level7 | Cardinality |
|---|---|---|---|---|---|---|---|---|
| | | | | | | ExpectedLoss-GivenDefaultDecimal-Value 76104 | | 0..1 76106 |
| | | | | | | ExposureAtDefaultA-mount 76108 | | 0..1 76110 |
| | | | | | | PriceAtHorizon 76112 | | 0..1 76114 |
| | | | | | | | Duration 76116 | 0..1 76118 |
| | | | | | | | Amount 76120 | 0..1 76122 |
| | | | | | | | Decimal-Value 76124 | 0..1 76126 |

FIG. 76-6

| Package | level1 | level2 | level3 | level4 | level5 | level6 | level7 | Cardinality |
|---|---|---|---|---|---|---|---|---|
| | | | | | | CurrentPrice 76128 | | 0..1 76130 |
| | | | | | | | Duration 76132 | 0..1 76134 |
| | | | | | | | Amount 76136 | 0..1 76138 |
| | | | | | | | Decimal-Value 76140 | 0..1 76142 |
| | | | | | | CreditPortfolioMan-agementProductCode 76144 | | 1 76146 |
| | | | | | | RecoveryAmount 76148 | | 0..1 76150 |

FIG. 76-7

| Package | level1 | level2 | level3 | level4 | level5 | level6 | level7 | Cardinality |
|---|---|---|---|---|---|---|---|---|
| Probability-OfDefault 76152 | | | | | ProbabilityOf-Default 76154 | | | 0..n 76156 |
| | | | | | | ValidityDatePeriod 76158 | | 1 76160 |
| | | | | | | Code 76162 | | 1 76164 |
| | | | | | | DoubleValue 76166 | | 1 76168 |
| Rating 76170 | | | | | Rating 76172 | | | 0..n 76174 |
| | | | | | | ModelID 76176 | | 1 76178 |

FIG. 76-8

| Package | level1 | level2 | level3 | level4 | level5 | level6 | level7 | Cardinality |
|---|---|---|---|---|---|---|---|---|
| | | | | | | ValidityDatePeriod 76180 | | 1 76182 |
| | | | | | | Code 76184 | | 1 76186 |
| | | | | | | MasterCreditRating-Code 76188 | | 0..1 76190 |
| | | | | | | InternalRatingIndicator 76192 | | 0..1 76194 |
| | | | | | | Maturity 76196 | | 0..1 76198 |
| | | | | | | Date 76200 | | 1 76202 |

FIG. 76-9

| Package | level1 | level2 | level3 | level4 | level5 | level6 | level7 | Cardinality |
|---|---|---|---|---|---|---|---|---|
| | | | | | | TendencyCode 76204 | | 0..1 76206 |
| Property 76208 | | | | | Property 76210 | | | 0..n 76212 |
| | | | | | | ID 76214 | | 1 76216 |
| | | | | | | Value 76218 | | 1 76220 |

FIG. 77-1

| Package | level1 | level2 | level3 | level4 | level5 | level6 | level7 | level8 | Cardinality |
|---|---|---|---|---|---|---|---|---|---|
| CrdtPrtfo-ModFSInDat-BuPa-CrteReqMsg 77000 | CrdtPrtfo-ModFSIn-DatBuPa-CrteReqMsg 77002 | | | | | | | | |
| Message-Header 77004 | | Message-Header 77006 | | | | | | | 1 77008 |
| CreditPortfo-lioModel 77010 | | Credit-Portfolio-Model 77012 | | | | | | | 1 77014 |
| | | | ID 77016 | | | | | | 1 77018 |

FIG. 77-2

| Package | level1 | level2 | level3 | level4 | level5 | level6 | level7 | level8 | Cardinality |
|---|---|---|---|---|---|---|---|---|---|
| | | | CreditPortfolioManagementProcessControl 77020 | | | | | | 1 77022 |
| | | | | DataTransferID 77024 | | | | | 1 77026 |
| | | | CreditPortfolio 77028 | | | | | | 1 77030 |
| | | | | ID 77032 | | | | | 1 77034 |
| InputData 77036 | | | InputData 77038 | | | | | | 1 77040 |

FIG. 77-3

| Package | level1 | level2 | level3 | level4 | level5 | level6 | level7 | level8 | Cardinality |
|---|---|---|---|---|---|---|---|---|---|
| Business-Partner 77042 | | | | Busi-ness-Part-ner 77044 | | | | | 1 77046 |
| | | | | | ID 77048 | | | | 1 77050 |
| | | | | | Name 77052 | | | | 0..1 77054 |
| | | | | | CountryCode 77056 | | | | 0..1 77058 |
| | | | | | SegmentCode 77060 | | | | 0..1 77062 |

FIG. 77-4

| Package | level1 | level2 | level3 | level4 | level5 | level6 | level7 | level8 | Cardinality |
|---|---|---|---|---|---|---|---|---|---|
| | | | | | ValidityDate 77064 | | | | 1 77066 |
| Probabili-tyOfDefault 77068 | | | | | ProbabilityOf-Default 77070 | | | | 0..n 77072 |
| | | | | | | ValidityDate-Period 77074 | | | 1 77076 |
| | | | | | | Code 77078 | | | 1 77080 |
| | | | | | | DoubleValue 77082 | | | 1 77084 |

FIG. 77-5

| Package | level1 | level2 | level3 | level4 | level5 | level6 | level7 | level8 | Cardinality |
|---|---|---|---|---|---|---|---|---|---|
| Rating 77086 | | | | | Rating 77088 | | | | 0..n 77090 |
| | | | | | | ModelID 77092 | | | 1 77094 |
| | | | | | | ValidityDate-Period 77096 | | | 1 77098 |
| | | | | | | Code 77100 | | | 1 77102 |
| | | | | | | Master-CreditRating-Code 77104 | | | 0..1 77106 |

FIG. 77-6

| Package | level1 | level2 | level3 | level4 | level5 | level6 | level7 | level8 | Cardinality |
|---|---|---|---|---|---|---|---|---|---|
| | | | | | | InternalRatingIndicator 77108 | | | 0..1 77110 |
| | | | | | | Maturity 77112 | | | 0..1 77114 |
| | | | | | | Date 77116 | | | 1 77118 |
| | | | | | | TendencyCode 77120 | | | 0..1 77122 |
| FinancialData 77124 | | | | | FinancialData 77126 | | | | 0..1 77128 |

FIG. 77-7

| Package | level1 | level2 | level3 | level4 | level5 | level6 | level7 | level8 | Cardinality |
|---|---|---|---|---|---|---|---|---|---|
| | | | | | | Item 77130 | | | 1..n 77132 |
| | | | | | | | FiscalYear 77134 | | 1 77136 |
| | | | | | | | FiscalValid-ityDatePeriod 77138 | | 1 77140 |
| | | | | | | | Balance-SheetCur-rencyCode 77142 | | 1 77144 |
| | | | | | | | TotalAsset-sAmount 77146 | | 1 77148 |

FIG. 77-8

| Package | level1 | level2 | level3 | level4 | level5 | level6 | level7 | level8 | Cardinality |
|---|---|---|---|---|---|---|---|---|---|
| | | | | | | | AnnualSale-sAmount 77150 | | 1 77152 |
| FactorCor-relation-ModelData 77154 | | | | | FactorCorrela-tionModelData 77156 | | | | 0..1 77158 |
| | | | | | | Item 77160 | | | 1..n 77162 |
| | | | | | | | Correlation-Model 77164 | | 1 77166 |
| | | | | | | | RSquared-DoubleValue 77168 | | 1 77170 |

FIG. 77-9

| Package | level1 | level2 | level3 | level4 | level5 | level6 | level7 | level8 | Cardinality |
|---|---|---|---|---|---|---|---|---|---|
| | | | | | | | FactorWeight 77172 | | 1..n 77174 |
| | | | | | | | | ValidityDate 77176 | 1 77178 |
| | | | | | | | | FactorType-Code 77180 | 1 77182 |
| | | | | | | | | FactorName 77184 | 1 77186 |
| | | | | | | | | Weighting-FactorValue 77188 | 1 77190 |

FIG. 77-10

| Package | level1 | level2 | level3 | level4 | level5 | level6 | level7 | level8 | Cardinality |
|---|---|---|---|---|---|---|---|---|---|
| Property 77192 | | | | | Property 77194 | | | | 0..n 77196 |
| | | | | | | ID 77198 | | | 1 77200 |
| | | | | | | Value 77202 | | | 1 77204 |

FIG. 78

| Package | level1 | level2 | Cardinality | Data Type Name |
|---|---|---|---|---|
| CrdtPrtfoModFSInDatYld-CrvBulkCrteReqMsg 78000 | CrdtPrtfoModFSInDatYld-CrvBulkCrteReqMsg 78002 | | | CrdtPrtfoModFSInDatYld-CrvBulkCrteReqMsg 78004 |
| MessageHeader 78006 | | MessageHeader 78008 | 1 78010 | BusinessDocumentMessage-Header 78012 |
| CrdtPrtfoModFSInDatYld-CrvCrteReqMsg 78014 | | CrdtPrtfoModFSIn-DatYldCrvCrteReqMsg 78016 | 1..n 78018 | CrdtPrtfoModFSInDatYld-CrvCrteReqMsg 78020 |

FIG. 79

| Package | level1 | level2 | Cardinality | Data Type Name |
|---|---|---|---|---|
| CrdtPrtfoModFSInDatEx-chRateCrteReqMsg 79000 | CrdtPrtfoModFSInDatEx-chRateCrteReqMsg 79002 | | | CrdtPrtfoModFSInDatExchRate-CrteReqMsg 79004 |
| MessageHeader 79006 | | MessageHeader 79008 | 1 79010 | BusinessDocumentMessage-Header 79012 |
| CrdtPrtfoModFSInDatEx-chRateCrteReqMsg 79014 | | CrdtPrtfoModFSInDatEx-chRateCrteReqMsg 79016 | 1..n 79018 | CrdtPrtfoModFSInDatExchRate-CrteReqMsg 79020 |

FIG. 80

| Package | level1 | level2 | Cardinality | Data Type Name |
|---|---|---|---|---|
| CrdtPrtfoModFSIn-DatPDClbrtMtxBulk-CrteReqMsg 80000 | CrdtPrtfoModFSIn-DatPDClbrtMtxBulk-CrteReqMsg 80002 | | | CrdtPrtfoModFSIn-DatPDClbrtMtxBulk-CrteReqMsg 80004 |
| MessageHeader 80006 | | MessageHeader 80008 | 1 80010 | BusinessDocumentMessage-Header 80012 |
| CrdtPrtfoModFSIn-DatPDClbrtMtxCrteReq Msg 80014 | | CrdtPrtfoModFSIn-DatPDClbrtMtxCrteReqMsg 80016 | 1..n 80018 | CrdtPrtfoModFSIn-DatPDClbrtMtxCrteReqMsg 80020 |

FIG. 81

| Package | level1 | level2 | Cardinality | Data Type Name |
|---|---|---|---|---|
| CrdtPrtfoModFSIn-DatCrdtSprdBulk-CrteReqMsg 81000 | CrdtPrtfoModFSIn-DatCrdtSprdBulk-CrteReqMsg 81002 | | | CrdtPrtfoModFSIn-DatCrdtSprdBulkCrteReqMsg 81004 |
| MessageHeader 81006 | | MessageHeader 81008 | 1 81010 | BusinessDocumentMessage-Header 81012 |
| CrdtPrtfoModFSIn-DatCrdtSprdCrteReqMsg 81014 | | CrdtPrtfoModFSIn-DatCrdtSprdCrteReqMsg 81016 | 1..n 81018 | CrdtPrtfoModFSIn-DatCrdtSprdCrteReqMsg 81020 |

FIG. 82

| Package | level1 | level2 | Cardinality | Data Type Name |
|---|---|---|---|---|
| CrdtPrtfoModFSIn-DatRatgMtxBulk-CrteReqMsg 82000 | CrdtPrtfoModFSIn-DatRatgMtxBulk-CrteReqMsg 82002 | | | CrdtPrtfoModFSIn-DatRatgMtxBulkCrteReqMsg 82004 |
| MessageHeader 82006 | | MessageHeader 82008 | 1 82010 | BusinessDocumentMessage-Header 82012 |
| CrdtPrtfoModFSIn-DatRatgMtxCrteReqMsg 82014 | | CrdtPrtfoModFSIn-DatRatgMtxCrteReqMsg 82016 | 1..n 82018 | CrdtPrtfoModFSIn-DatRatgMtxCrteReqMsg 82020 |

FIG. 83

| Package | level1 | level2 | Cardinality | Data Type Name |
|---|---|---|---|---|
| CrdtPrtfoModFSInDat-TOBSItmBulkCrteReqMsg 83000 | CrdtPrtfoModFSInDat-TOBSItmBulkCrteReqMsg 83002 | | | CrdtPrtfoModFSInDatTOBSItmBulk-CrteReqMsg 83004 |
| MessageHeader 83006 | | MessageHeader 83008 | 1 83010 | BusinessDocumentMessageHeader 83012 |
| CrdtPrtfoModFSInDat-TOBSItmCrteReqMsg 83014 | | CrdtPrtfoModFSInDat-TOBSItmCrteReqMsg 83016 | 1..n 83018 | CrdtPrtfoModFSInDatTOB-SItmCrteReqMsg 83020 |

FIG. 84

| Package | level1 | level2 | Cardinality | Data Type Name |
|---|---|---|---|---|
| CrdtPrtfoModFSInDat-LoanBulkCrteReqMsg 84000 | CrdtPrtfoModFSInDat-LoanBulkCrteReqMsg 84002 | | | CrdtPrtfoModFSInDatLoanBulk-CrteReqMsg 84004 |
| MessageHeader 84006 | | MessageHeader 84008 | 1 84010 | BusinessDocumentMessage-Header 84012 |
| CrdtPrtfoModFSInDat-LoanCrteReqMsg 84014 | | CrdtPrtfoModFSInDat-LoanCrteReqMsg 84016 | 1..n 84018 | CrdtPrtfoModFSInDatLoan-CrteReqMsg 84020 |

FIG. 85

| Package | level1 | level2 | Cardinality | Data Type Name |
|---|---|---|---|---|
| CrdtPrtfoModFSInDa-tOTCDeriBulkCrteReqMsg 85000 | CrdtPrtfoModFSInDa-tOTCDeriBulkCrteReqMsg 85002 | | | CrdtPrtfoModFSInDa-tOTCDeriBulkCrteReqMsg 85004 |
| MessageHeader 85006 | | MessageHeader 85008 | 1 85010 | BusinessDocumentMes-sageHeader 85012 |
| CrdtPrtfoModFSInDa-tOTCDeriCrteReqMsg 85014 | | CrdtPrtfoModFSInDa-tOTCDeriCrteReqMsg 85016 | 1..n 85018 | CrdtPrtfoModFSInDa-tOTCDeriCrteReqMsg 85020 |

FIG. 86

| Package | level1 | level2 | Cardinality | Data Type Name |
|---|---|---|---|---|
| CrdtPrtfoModFSInDatSecFT-BulkCrteReqMsg 86000 | CrdtPrtfoModFSIn-DatSecFTBulkCrteReqMsg 86002 | | | CrdtPrtfoModFSInDatSecFT-BulkCrteReqMsg 86004 |
| MessageHeader 86006 | | MessageHeader 86008 | 1 86010 | BusinessDocumentMessage-Header 86012 |
| CrdtPrtfoModFSIn-DatSecFTCrteReqMsg 86014 | | CrdtPrtfoModFSIn-DatSecFTCrteReqMsg 86016 | 1..n 86018 | CrdtPrtfoModFSInDatSecFT-CrteReqMsg 86020 |

FIG. 87

| Package | level1 | level2 | Cardinality | Data Type Name |
|---|---|---|---|---|
| CrdtPrtfoModFSInDatStock-BulkCrteReqMsg 87000 | CrdtPrtfoModFSInDatStock-BulkCrteReqMsg 87002 | | | CrdtPrtfoModFSInDatStock-BulkCrteReqMsg 87004 |
| MessageHeader 87006 | | MessageHeader 87008 | 1 87010 | BusinessDocumentMessage-Header 87012 |
| CrdtPrtfoModFSInDatStock-CrteReqMsg 87014 | | CrdtPrtfoModFSInDatStock-CrteReqMsg 87016 | 1..n 87018 | CrdtPrtfoModFSInDatStock-CrteReqMsg 87020 |

FIG. 88

| Package | level1 | level2 | Cardinality | Data Type Name |
|---|---|---|---|---|
| CrdtPrtfoModFSIn-DatCrdtDeriBulkCrteReqMsg 88000 | CrdtPrtfoModFSIn-DatCrdtDeriBulkCrteReqMsg 88002 | | | CrdtPrtfoModFSIn-DatCrdtDeriBulkCrteReqMsg 88004 |
| MessageHeader 88006 | | MessageHeader 88008 | 1 88010 | BusinessDocumentMessage-Header 88012 |
| CrdtPrtfoModFSIn-DatCrdtDeriCrteReqMsg 88014 | | CrdtPrtfoModFSIn-DatCrdtDeriCrteReqMsg 88016 | 1..n 88018 | CrdtPrtfoModFSIn-DatCrdtDeriCrteReqMsg 88020 |

FIG. 89

| Package | level1 | level2 | Cardinality | Data Type Name |
|---|---|---|---|---|
| CrdtPrtfoModFSInDat-BondBulkCrteReqMsg 89000 | CrdtPrtfoModFSInDat-BondBulkCrteReqMsg 89002 | | | CrdtPrtfoModFSInDatBondBulk-CrteReqMsg 89004 |
| MessageHeader 89006 | | MessageHeader 89008 | 1 89010 | BusinessDocumentMessage-Header 89012 |
| CrdtPrtfoModFSInDat-BondCrteReqMsg 89014 | | CrdtPrtfoModFSInDat-BondCrteReqMsg 89016 | 1..n 89018 | CrdtPrtfoModFSInDatBond-CrteReqMsg 89020 |

FIG. 90

| Package | level1 | level2 | Cardinality | Data Type Name |
|---|---|---|---|---|
| CrdtPrtfoModFSInDatBu-PaBulkCrteReqMsg 90000 | CrdtPrtfoModFSInDatBu-PaBulkCrteReqMsg 90002 | | | CrdtPrtfoModFSInDatBu-PaBulkCrteReqMsg 90004 |
| MessageHeader 90006 | | MessageHeader 90008 | 1 90010 | BusinessDocumentMessage-Header 90012 |
| CrdtPrtfoModFSInDatBu-PaCrteReqMsg 90014 | | CrdtPrtfoModFSInDatBu-PaCrteReqMsg 90016 | 1..n 90018 | CrdtPrtfoModFSInDatBuPa-CrteReqMsg 90020 |

FIG. 91

| Package | level1 | level2 | Cardinality | Data Type Name |
|---|---|---|---|---|
| CrdtPrtfoModFSIn-DatPrtfoAnlysDatBulk-CrteReqMsg 91000 | CrdtPrtfoModFSIn-DatPrtfoAnlysDatBulk-CrteReqMsg 91002 | | | CrdtPrtfoModFSInDatPrtfoAnlys-DatBulkCrteReqMsg 91004 |
| MessageHeader 91006 | | MessageHeader 91008 | 1 91010 | BusinessDocumentMessage-Header 91012 |
| CrdtPrtfoModFSIn-DatPrtfoAnlysDat-CrteReqMsg 91014 | | CrdtPrtfoModFSInDatPrtfoA-nlysDatCrteReqMsg 91016 | 1..n 91018 | CrdtPrtfoModFSInDatPrtfoAnlys-DatCrteReqMsg 91020 |

FIG. 94-1

| Package | level1 | level2 | level3 | level4 | level5 | level6 | Data Type Name |
|---|---|---|---|---|---|---|---|
| CreditPortfolio-AnalyticalRe-sultFSCre-ateRequest-Message 94000 | CreditPort-folioAna-lyticalRe-sultFSCre-ateRe-questMes-sage 94002 | | | | | | CrdtPortfolioA-nlytlRsltFSLoss-ValueCrteReqMsg 94004 |
| Message-Header 94006 | | Message-Header 94008 | | | | | BusinessDocu-mentMessage-Header 94010 |
| CreditPortfo-lioAnalytical-Result 94012 | | CreditPort-folioAna-lyticalRe-sult 94014 | | | | | |
| | | | ID 94016 | | | | PDT_CreditPortfoli oAnalyticalResult 94018 |

FIG. 94-2

| Package | level1 | level2 | level3 | level4 | level5 | level6 | Data Type Name |
|---|---|---|---|---|---|---|---|
| | | | CreationDateTime 94020 | | | | GLOBAL_DateTime 94022 |
| | | | ExpectedLossAmount 94024 | | | | Amount 94026 |
| | | | UnexpectedLossAmount 94028 | | | | Amount 94030 |
| | | | ExpectedShortfallAmount 94032 | | | | Amount 94034 |
| | | | CreditValueAtRiskAmount 94036 | | | | Amount 94038 |

FIG. 94-3

| Package | level1 | level2 | level3 | level4 | level5 | level6 | Data Type Name |
|---|---|---|---|---|---|---|---|
| | | | EconomicCapitalAmount 94040 | | | | Amount 94042 |
| | | | TotalExposureAmount 94044 | | | | Amount 94046 |
| | | | MeanValueofLossesAmount 94048 | | | | Amount 94050 |
| | | | PortfolioDiversificationDecimalValue 94052 | | | | DecimalValue 94054 |
| CreditPortfolioManagementProcessControl 94056 | | | CreditPortfolioManagementProcessControl 94058 | | | | |

FIG. 94-4

| Package | level1 | level2 | level3 | level4 | level5 | level6 | Data Type Name |
|---|---|---|---|---|---|---|---|
| | | | | ID 94060 | | | PDT_CreditPortfolioManagement-ProcessControlID 94062 |
| | | | | DataTransferID 94064 | | | PDT_CreditPortfolioManagement-ProcessCon-trolDataTransferID 94066 |
| | | | | ValidityDate 94068 | | | Date 94070 |
| | | | | CreditPortfolioAnalysisRun 94072 | | | |
| | | | | | ID 94074 | | PDT_CreditPortfolioAnalysisRunID 94076 |

FIG. 94-5

| Package | level1 | level2 | level3 | level4 | level5 | level6 | Data Type Name |
|---|---|---|---|---|---|---|---|
| | | | | | LossDefinition-ParadigmCode 94078 | | Code 94080 |
| | | | | | Duration 94082 | | Duration 94084 |
| | | | | | SimulationTri-alsNumberValue 94086 | | NumberValue 94088 |
| | | | | | Confi-denceLevelCode 94090 | | Code 94092 |
| CreditPort-folioModel 94094 | | | | CreditPortfolioModel 94096 | | | |
| | | | | | ID 94098 | | PDT_CreditPortfolioModelID 94100 |

FIG. 94-6

| Package | level1 | level2 | level3 | level4 | level5 | level6 | Data Type Name |
|---|---|---|---|---|---|---|---|
| | | | | | CreditPortfolio 94102 | | |
| | | | | | | ID 94104 | PDT_CreditPortfolioID 94106 |
| LossDis-tribution 94108 | | | LossDistribution 94110 | | | | |
| | | | | LossAmount 94112 | | | Amount 94114 |
| | | | | LossPercent 94116 | | | Percentage 94118 |
| | | | | NumberOfSimulated-LossesNumberValue 94120 | | | NumberValue 94122 |

FIG. 94-7

| Package | level1 | level2 | level3 | level4 | level5 | level6 | Data Type Name |
|---|---|---|---|---|---|---|---|
| | | | | RelativeNumberOfSimulatedLossesDecimalValue 94124 | | | DecimalValue 94126 |
| Item 94128 | | | Item 94130 | | | | |
| | | | | ID 94132 | | | PDT_CreditPortfolioAnalyticalResultItemID 94134 |
| | | | | FinancialInstrumentID 94136 | | | BusinessTransactionDocumentID 94138 |
| | | | | FinancialInstrumentCategoryCode 94140 | | | FinancialInstrumentCategoryCode 94142 |

FIG. 94-8

| Package | level1 | level2 | level3 | level4 | level5 | level6 | Data Type Name |
|---|---|---|---|---|---|---|---|
| | | | | StandardisedFinancialInstrumentAccountID 94144 | | | FinancialInstrumentAccountID 94146 |
| | | | | GuaranteeID 94148 | | | Identifier 94150 |
| | | | | ExposureID 94152 | | | Identifier 94154 |
| | | | | AggregationID 94156 | | | Identifier 94158 |
| | | | | ExpectedLossAmount 94160 | | | Amount 94162 |
| | | | | UnexpectedLossAmount 94164 | | | Amount 94166 |

FIG. 94-9

| Package | level1 | level2 | level3 | level4 | level5 | level6 | Data Type Name |
|---|---|---|---|---|---|---|---|
| | | | | ContributionToUnexpected-LossAmount 94168 | | | |
| | | | | DiversificationDecimalValue 94170 | | | DecimalValue 94172 |
| | | | | ContributionToExpected-ShortfallAmount 94174 | | | Amount 94176 |
| | | | | ContributionToCreditVal-ueAtRiskAmount 94178 | | | Amount 94180 |
| | | | | ContributionToEconomic-CapitalAccordingToExpect-edShortfallAmount 94182 | | | Amount 94184 |

FIG. 94-10

| Package | level1 | level2 | level3 | level4 | level5 | level6 | Data Type Name |
|---|---|---|---|---|---|---|---|
| | | | | ContributionToEconomic-CapitalAccordingToCredit-ValueAtRiskAmount 94186 | | | Amount 94188 |
| | | | | ExposureAmount 94190 | | | Amount 94192 |

FIG. 95-1

| Package | level1 | level2 | level3 | level4 | level5 | level6 | Cardinality |
|---|---|---|---|---|---|---|---|
| CrdtPrtfoA-nlytRsltFSLoss-ValueCrteReqMsg 95000 | CrdtPrtfoA-nlytRsltFSLossValue-CrteReqMsg 95002 | | | | | | |
| MessageHeader 95004 | | Message-Header 95006 | | | | | 1 95008 |
| CreditPortfolio-AnalyticalResult 95010 | | Credit-Portfolio-Analyti-calResult 95012 | | | | | 1 95014 |
| | | | ID 95016 | | | | 1 95018 |
| | | | CreationDateTime 95020 | | | | 1 95022 |

FIG. 95-2

| Package | level1 | level2 | level3 | level4 | level5 | level6 | Cardinality |
|---|---|---|---|---|---|---|---|
| | | | ExpectedLossAmount 95024 | | | | 0..1 95026 |
| | | | UnexpectedLossAmount 95028 | | | | 0..1 95030 |
| | | | ExpectedShortfallAmount 95032 | | | | 0..1 95034 |
| | | | CreditValueAtRiskAmount 95036 | | | | 0..1 95038 |
| | | | EconomicCapitalAmount 95040 | | | | 0..1 95042 |
| | | | TotalExposureAmount 95044 | | | | 0..1 95046 |

FIG. 95-3

| Package | level1 | level2 | level3 | level4 | level5 | level6 | Cardinality |
|---|---|---|---|---|---|---|---|
| | | | MeanValueOfLossesAmount 95048 | | | | 0..1 95050 |
| | | | PortfolioDiversificationDecimalValue 95052 | | | | 0..1 95054 |
| CreditPortfolioManagementProcessControl 95056 | | | CreditPortfolioManagementProcessControl 95058 | | | | 1 95060 |
| | | | | ID 95062 | | | 1 95064 |
| | | | | DataTransferID 95066 | | | 1 95068 |

FIG. 95-4

| Package | level1 | level2 | level3 | level4 | level5 | level6 | Cardinality |
|---|---|---|---|---|---|---|---|
| | | | | ValidityDate 95070 | | | 1 95072 |
| | | | | CreditPortfolioAnalysisRun 95074 | | | 1 95076 |
| | | | | | ID 95078 | | 1 95080 |
| | | | | | LossDefinitionParadigmCode 95082 | | 0..1 95084 |
| | | | | | Duration 95086 | | 0..1 95088 |
| | | | | | SimulationTrialsNumberValue 95090 | | 0..1 95092 |

FIG. 95-5

| Package | level1 | level2 | level3 | level4 | level5 | level6 | Cardinality |
|---|---|---|---|---|---|---|---|
| | | | | | ConfidenceLevelCode 95094 | | 0..1 95096 |
| | | | | CreditPortfolioModel 95098 | | | 1 95100 |
| | | | | | ID 95102 | | 1 95104 |
| | | | | | CreditPortfolio 95106 | | 1 95108 |
| | | | | | | ID 95110 | 1 95112 |
| LossDistribution 95114 | | | LossDistribution 95116 | | | | 0..n 95118 |
| | | | | LossAmount 95120 | | | 1 95122 |

FIG. 95-6

| Package | level1 | level2 | level3 | level4 | level5 | level6 | Cardinality |
|---|---|---|---|---|---|---|---|
| | | | | LossPercent 95124 | | | 0..1 95126 |
| | | | | NumberOfSimulat-edLossesNumber-Value 95128 | | | 0..1 95130 |
| | | | | RelativeNumberOf-SimulatedLosses-DecimalValue 95132 | | | 0..1 95134 |

FIG. 96-1

| Package | level1 | level2 | level3 | level4 | level5 | level6 | Cardinality |
|---|---|---|---|---|---|---|---|
| CrdtPrtfoA-nlytRsltFSltmCrteReqMsg 96000 | CrdtPrtfoA-nlytRsltFSltmCrteReqMsg 96002 | | | | | | |
| MessageHeader 96004 | | Message-Header 96006 | | | | | 1 96008 |
| CreditPortfolio-AnalyticalResult 96010 | | CreditPortfo-lioAnalyti-calResult 96012 | | | | | 1 96014 |
| | | | ID 96016 | | | | 1 96018 |
| | | | Creation-DateTime 96020 | | | | 1 96022 |

FIG. 96-2

| Package | level1 | level2 | level3 | level4 | level5 | level6 | Cardinality |
|---|---|---|---|---|---|---|---|
| CreditPortfolio-Management-ProcessControl 96024 | | | CreditPortfo-lioManage-mentProc-essControl 96026 | | | | 1 96028 |
| | | | | ID 96030 | | | 1 96032 |
| | | | | DataTransferID 96034 | | | 1 96036 |
| | | | | ValidityDate 96038 | | | 1 96040 |
| | | | | CreditPortfolioAnalysisRun 96042 | | | 1 96044 |
| | | | | | ID 96046 | | 1 96048 |

FIG. 96-3

| Package | level1 | level2 | level3 | level4 | level5 | level6 | Cardinality |
|---|---|---|---|---|---|---|---|
| | | | | | LossDefinitionParadigmCode 96050 | | 1 96052 |
| | | | | | Duration 96054 | | 1 96056 |
| | | | | | SimulationTrialsNumberValue 96058 | | 1 96060 |
| | | | | | ConfidenceLevelCode 96062 | | 1 96064 |
| | | | | CreditPortfolioModel 96066 | | | 1 96068 |
| | | | | | ID 96070 | | 1 96072 |

FIG. 96-4

| Package | level1 | level2 | level3 | level4 | level5 | level6 | Cardinality |
|---|---|---|---|---|---|---|---|
| | | | | | CreditPortfolio 96074 | | 1 96076 |
| | | | | | | ID 96078 | 1 96080 |
| Item 96082 | | | Item 96084 | | | | 1..n 96086 |
| | | | | ID 96088 | | | 1 96090 |
| | | | | FinancialInstrumentID 96092 | | | 0..1 96094 |
| | | | | FinancialInstrumentCate-goryCode 96096 | | | 0..1 96098 |

FIG. 96-5

| Package | level1 | level2 | level3 | level4 | level5 | level6 | Cardinality |
|---|---|---|---|---|---|---|---|
| | | | | StandardisedFinancialInstrumentAccountID 96100 | | | 0..1 96102 |
| | | | | GuaranteeID 96104 | | | 0..1 96106 |
| | | | | ExposureID 96108 | | | 0..1 96110 |
| | | | | AggregationID 96112 | | | 0..1 96114 |
| | | | | ExpectedLossAmount 96116 | | | 0..1 96118 |
| | | | | UnexpectedLossAmount 96120 | | | 0..1 96122 |

FIG. 96-6

| Package | level1 | level2 | level3 | level4 | level5 | level6 | Cardinality |
|---|---|---|---|---|---|---|---|
| | | | | ContributionToUnexpected-LossAmount 96124 | | | 0..1 96126 |
| | | | | DiversificationDecimalValue 96128 | | | 0..1 96130 |
| | | | | ContributionToExpected-ShortfallAmount 96132 | | | 0..1 96134 |
| | | | | ContributionToCreditVal-ueAtRiskAmount 96136 | | | 0..1 96138 |
| | | | | ContributionToEconomic-CapitalAccordingToExpect-edShortfallAmount 96140 | | | 0..1 96142 |

FIG. 96-7

| Package | level1 | level2 | level3 | level4 | level5 | level6 | Cardinality |
|---|---|---|---|---|---|---|---|
| | | | | ContributionToEconomic-CapitalAccordingToCredit-ValueAtRiskAmount 96144 | | | 0..1 96146 |
| | | | | ExposureAmount 96148 | | | 0..1 96150 |

FIG. 97

| Package | level1 | level2 | Cardinality | Data Type Name |
|---|---|---|---|---|
| CrdtPrtfoAnlytRsltFSLossValue-BulkCrteReqMsg 97000 | CrdtPrtfoA-nlytRsltFSLossValue-BulkCrteReqMsg 97002 | | | CrdtPrtfoAnlytRsltFSLossValue-BulkCrteReqMsg 97004 |
| MessageHeader 97006 | | MessageHeader 97008 | 1 97010 | BusinessDocumentMessage-Header 97012 |
| CrdtPrtfoAnlytRsltFSLossValue-CrteReqMsg 97014 | | CrdtPrtfoA-nlytRsltFSLossValue-CrteReqMsg 97016 | 1..n 97018 | CrdtPrtfoAnlytRsltFSLossValue-CrteReqMsg 97020 |

FIG. 98

| Package | level1 | level2 | Cardinality | Data Type Name |
|---|---|---|---|---|
| CrdtPrtfoAnlytRsltFSItmBulk-CrteReqMsg 98000 | CrdtPrtfoAnlytRsltFSItmBulk-CrteReqMsg 98002 | | | CrdtPrtfoAnlytRsltFSItmBulk-CrteReqMsg 98004 |
| MessageHeader 98006 | | MessageHeader 98008 | 1 98010 | BusinessDocumentMessage-Header 98012 |
| CrdtPrtfoA-nlytRsltFSItmCrteReqMsg 98014 | | CrdtPrtfoA-nlytRsltFSItmCrteReqMsg 98016 | 1..n 98018 | CrdtPrtfoA-nlytRsltFSItmCrteReqMsg 98020 |

FIG. 100-1

| Package | level1 | level2 | level3 | level4 | level5 | level6 | level7 | level8 | Data Type Name |
|---|---|---|---|---|---|---|---|---|---|
| CreditPortfolio-Management-ProcessCon-trolMessage 100000 | CreditPort-folioMan-agement-Process-ControlMes sage 100002 | | | | | | | | CreditPortfolioMan-agementProcess-ControlMessage 100004 |
| MessageHeader 100006 | | Message-Header 100008 | | | | | | | BusinessDocu-mentMessage-Header 100010 |
| CreditPortfolio-Management-ProcessControl 100012 | | Credit-Portfolio-Manage-ment-Process-Control 100014 | | | | | | | CreditPortfolioMan-agementProcess-Control 100016 |

FIG. 100-2

| Package | level1 | level2 | level3 | level4 | level5 | level6 | level7 | level8 | Data Type Name |
|---|---|---|---|---|---|---|---|---|---|
| | | | ID 100018 | | | | | | CreditPortfolioMan-agementProcess-ControlID 100020 |
| | | | Validity-Date 100022 | | | | | | Date 100024 |
| DataTransfer 100026 | | | Data-Transfer 100028 | | | | | | |
| | | | | StatusCode 100030 | | | | | PDT_CreditPortfolio ManagementProc-essControlData-TransferStatusCode 100032 |

FIG. 100-3

| Package | level1 | level2 | level3 | level4 | level5 | level6 | level7 | level8 | Data Type Name |
|---|---|---|---|---|---|---|---|---|---|
| | | | | ID 100034 | | | | | PDT_CreditPortfolioManagementProcessControlDataTransferID 100036 |
| CreditPortfolioAnalysisRun 100038 | | | CreditPortfolioAnalysisRun 100040 | | | | | | |
| | | | | ID 100042 | | | | | CreditPortfolioAnalysisRunID 100044 |
| | | | | LossDefinitionParadigmCode 100046 | | | | | Code 100048 |

FIG. 100-4

| Package | level1 | level2 | level3 | level4 | level5 | level6 | level7 | level8 | Data Type Name |
|---|---|---|---|---|---|---|---|---|---|
| | | | | Duration 100050 | | | | | Duration 100052 |
| | | | | SimulationTrialsNumberValue 100054 | | | | | NumberValue 100056 |
| | | | | ConfidenceLevelCode 100058 | | | | | Code 100060 |
| CreditPortfolioModel 100062 | | | CreditPortfolioModel 100064 | | | | | | |

FIG. 100-5

| Package | level1 | level2 | level3 | level4 | level5 | level6 | level7 | level8 | Data Type Name |
|---|---|---|---|---|---|---|---|---|---|
| | | | | ID 100066 | | | | | CreditPortfolio-ModelID 100068 |
| CreditPortfolio 100070 | | | | CreditPortfolio 100072 | | | | | |
| | | | | | ID 100074 | | | | CreditPortfolioID 100076 |
| | | | | GroupID 100078 | | | | | BusinessTransac-tionDocument-GroupID 100080 |
| InputData 100082 | | | | InputData 100084 | | | | | |

FIG. 100-6

| Package | level1 | level2 | level3 | level4 | level5 | level6 | level7 | level8 | Data Type Name |
|---|---|---|---|---|---|---|---|---|---|
| | | | | | YieldCurveTo-talNumber-Value 100086 | | | | NumberValue 100088 |
| | | | | | ExchangeR-ateTotalNum-berValue 100090 | | | | NumberValue 100092 |
| | | | | | RatingTransi-tionMatrixTo-talNumber-Value 100094 | | | | NumberValue 100096 |
| | | | | | CreditSpre-adMatrixTo-talNumber-Value 100098 | | | | NumberValue 100100 |

FIG. 100-7

| Package | level1 | level2 | level3 | level4 | level5 | level6 | level7 | level8 | Data Type Name |
|---|---|---|---|---|---|---|---|---|---|
| | | | | | ProbabilityOf-DefaultCali-brationMatrix-TotalNumber-Value 100102 | | | | NumberValue 100104 |
| | | | | | Tradition-alOffBalance-SheetItemTo-talNumber-Value 100106 | | | | NumberValue 100108 |
| | | | | | LoanTotal-NumberValue 100110 | | | | NumberValue 100112 |

FIG. 100-8

| Package | level1 | level2 | level3 | level4 | level5 | level6 | level7 | level8 | Data Type Name |
|---|---|---|---|---|---|---|---|---|---|
| | | | | | OTCDerivativeTotalNumberValue 100114 | | | | NumberValue 100116 |
| | | | | | SecuritiesFinancingTransactionTotalNumberValue 100118 | | | | NumberValue 100120 |
| | | | | | StockTotalNumberValue 100122 | | | | NumberValue 100124 |
| | | | | | CreditDerivativeTotalNumberValue 100126 | | | | NumberValue 100128 |

FIG. 100-9

| Package | level1 | level2 | level3 | level4 | level5 | level6 | level7 | level8 | Data Type Name |
|---|---|---|---|---|---|---|---|---|---|
| | | | | | Securitization-TotalNumber-Value 100130 | | | | NumberValue 100132 |
| | | | | | BondTotal-NumberValue 100134 | | | | NumberValue 100136 |
| | | | | | BusinessPart-nerTotalNum-berValue 100138 | | | | NumberValue 100140 |
| | | | | | CreditPortfo-lioAnalysis-Data 100142 | | | | |

FIG. 100-10

| Package | level1 | level2 | level3 | level4 | level5 | level6 | level7 | level8 | Data Type Name |
|---|---|---|---|---|---|---|---|---|---|
| | | | | | | Credit-Portfolio-Assign-ment 100144 | | | |
| | | | | | | | CreditPort-folioID 100146 | | PDT_CreditPort-folioID 100148 |
| | | | | | | | Finan-cialInstru-mentEx-posure 100150 | | |

FIG. 100-11

| Package | level1 | level2 | level3 | level4 | level5 | level6 | level7 | level8 | Data Type Name |
|---|---|---|---|---|---|---|---|---|---|
| | | | | | | | | PortfolioAnalysisDataTotalNumberValue 100152 | NumberValue 100154 |
| Log 100156 | | Log 100158 | | | | | | | Log 100160 |

FIG. 101-1

| Package | level1 | level2 | level3 | level4 | Cardinality |
|---|---|---|---|---|---|
| CrdtPrtfoMgmtProcCtrlFSReq Msg 101000 | CrdtPrtfoMgmt ProcCtrlFSReq Msg 101002 | | | | |
| MessageHeader 101004 | | MessageHeader 101006 | | | 1 101008 |
| CreditPortfolioManagement-ProcessControl 101010 | | CreditPortfolio-Management-ProcessControl 101012 | | | 1 101014 |
| | | | ID 101016 | | 1 101018 |
| | | | ValidityDate 101020 | | 1 101022 |
| DataTransfer 101024 | | | DataTransfer 101026 | | 1 101028 |

FIG. 101-2

| Package | level1 | level2 | level3 | level4 | Cardinality |
|---|---|---|---|---|---|
| | | | | StatusCode 101030 | 1 101032 |
| CreditPortfolioAnalysisRun 101034 | | | CreditPortfolioAnalysisRun 101036 | | 1..n 101038 |
| | | | | ID 101040 | 1 101042 |
| | | | | LossDefinitionParadigmCode 101044 | 1 101046 |
| | | | | Duration 101048 | 1 101050 |
| | | | | SimulationTrialsNumberValue 101052 | 1 101054 |
| | | | | ConfidenceLevelCode 101056 | 1 101058 |

FIG. 101-3

| Package | level1 | level2 | level3 | level4 | Cardinality |
|---|---|---|---|---|---|
| CreditPortfolioModel 101060 | | | CreditPortfolioModel 101062 | | 1 101064 |
| | | | | ID 101066 | 1 101068 |

FIG. 102

| Package | level1 | level2 | level3 | level4 | Cardinality |
|---|---|---|---|---|---|
| CrdtPrtfoMgmtProcCtrlFSConf Msg 102000 | CrdtPrtfoMgmtProcCtrlFS ConfMsg 102002 | | | | |
| MessageHeader 102004 | | MessageHeader 102006 | | | 1 102008 |
| CreditPortfolioManagement-ProcessControl 102010 | | CreditPortfolioManagement-ProcessControl 102012 | | | 0..1 102014 |
| DataTransfer 102016 | | | DataTransfer 102018 | | 1 102020 |
| | | | | ID 102022 | 1 102024 |
| Log 102026 | | Log 102028 | | | 1 102030 |

FIG. 103-1

| Package | level1 | level2 | level3 | level4 | level5 | level6 | level7 | level8 | Cardinality |
|---|---|---|---|---|---|---|---|---|---|
| CrdtPrtfoMgmtProcCtrlFSData-TransfStsChgdNotifMsg 103000 | CrdtPrtfoMgmtProcCtrlFSData-TransfStsChgdNotifMsg 103002 | | | | | | | | |
| MessageHeader 103004 | | Message-Header 103006 | | | | | | | 1 103008 |
| CreditPortfolio-Management-ProcessControl 103010 | | CreditPort-folioMan-agement-Process-Control 103012 | | | | | | | 1 103014 |
| | | | ID 103016 | | | | | | 1 103018 |

FIG. 103-2

| Package | level1 | level2 | level3 | level4 | level5 | level6 | level7 | level8 | Cardinality |
|---|---|---|---|---|---|---|---|---|---|
| | | | Validity-Date 103020 | | | | | | 1 103022 |
| DataTransfer 103024 | | | Data-Transfer 103026 | | | | | | 1 103028 |
| | | | | ID 103030 | | | | | 1 103032 |
| | | | | Status-Code 103034 | | | | | 1 103036 |
| CreditPortfolioModel 103038 | | | Credit-PortfolioModel 103040 | | | | | | 1 103042 |

FIG. 103-3

| Package | level1 | level2 | level3 | level4 | level5 | level6 | level7 | level8 | Cardinality |
|---|---|---|---|---|---|---|---|---|---|
| | | | | ID 103044 | | | | | 1 103046 |
| InputData 103048 | | | | InputData 103050 | | | | | 1 103052 |
| | | | | | YieldCurveTotalNumberValue 103054 | | | | 1 103056 |
| | | | | | ExchangeRateTotalNumber-Value 103058 | | | | 1 103060 |
| | | | | | RatingTransitionMatrixTotal-NumberValue 103062 | | | | 1 103064 |
| | | | | | CreditSpreadMatrixTotal-NumberValue 103066 | | | | 1 103068 |

FIG. 103-4

| Package | level1 | level2 | level3 | level4 | level5 | level6 | level7 | level8 | Cardinality |
|---|---|---|---|---|---|---|---|---|---|
| | | | | | ProbabilityOfDefaultCalibrationMatrixTotalNumberValue 103070 | | | | 1 103072 |
| | | | | | TraditionalOffBalanceSheetItemTotalNumberValue 103074 | | | | 1 103076 |
| | | | | | LoanTotalNumberValue 103078 | | | | 1 103080 |
| | | | | | OTCDerivativeTotalNumberValue 103082 | | | | 1 103084 |
| | | | | | SecuritiesFinancingTransactionTotalNumberValue 103086 | | | | 1 103088 |
| | | | | | StockTotalNumberValue 103090 | | | | 1 103092 |

FIG. 103-5

| Package | level1 | level2 | level3 | level4 | level5 | level6 | level7 | level8 | Cardinality |
|---|---|---|---|---|---|---|---|---|---|
| | | | | | CreditDerivativeTotalNumberValue 103094 | | | | 1 103096 |
| | | | | | SecuritizationTotalNumberValue 103098 | | | | 1 103100 |
| | | | | | BondTotalNumberValue 103102 | | | | 1 103104 |
| | | | | | BusinessPartnerTotalNumberValue 103106 | | | | 1 103108 |
| | | | | | CreditPortfolioAnalysisData 103110 | | | | 1 103112 |

FIG. 103-6

| Package | level1 | level2 | level3 | level4 | level5 | level6 | level7 | level8 | Cardinality |
|---|---|---|---|---|---|---|---|---|---|
| | | | | | | Credit-Portfolio-Assign-ment 103114 | | | 1..n 103116 |
| | | | | | | | CreditPort-folioID 103118 | | 1 103120 |
| | | | | | | | Finan-cialInstru-mentEx-posure 103122 | | 1 103124 |
| | | | | | | | | Portfolio-Analy-sisData-Total-Number-Value 103126 | 1 103128 |

FIG. 106-1

| Package | level1 | level2 | level3 | level4 | Cardinality | Data Type Name |
|---|---|---|---|---|---|---|
| FinancialInstrumentExposureProfileAnalyticalResultFSMessage 106000 | FinancialInstrumentExposureProfileAnalyticalResultFSMessage 106002 | | | | | FinInstrsExposureProfileResultFSCrteReqMsg 106004 |
| MessageHeader 106006 | | MessageHeader 106008 | | | 1 106010 | BusinessDocumentMessageHeader 106012 |
| FinancialInstrumentExposureProfileAnalyticalResult 106014 | | FinancialInstrumentExposureProfileAnalyticalResult 106016 | | | 1 106018 | FinInstrsExposureProfileResult 106020 |
| | | | ID 106022 | | 1 106024 | PDT_FinancialInstrumentExposureProfileAnalyticalResultID 106026 |

FIG. 106-2

| Package | level1 | level2 | level3 | level4 | Cardinality | Data Type Name |
|---|---|---|---|---|---|---|
| | | | GroupID 106028 | | 1 106030 | BusinessTransaction-DocumentGroupID 106032 |
| | | | FinancialInstrumentID 106034 | | 0..1 106036 | BusinessTransaction-DocumentID 106038 |
| | | | FinancialInstrumentCate-goryCode 106040 | | 0..1 106042 | FinancialInstrumentCate-goryCode 106044 |
| | | | StandardisedFinancialIn-strumentAccountID 106046 | | 0..1 106048 | FinancialInstrumentAc-countID 106050 |
| | | | KeyDate 106052 | | 1 106054 | Date 106056 |
| | | | CreationDateTime 106058 | | 1 106060 | GLOBAL_DateTime 106062 |

FIG. 106-3

| Package | level1 | level2 | level3 | level4 | Cardinality | Data Type Name |
|---|---|---|---|---|---|---|
| | | | MaximumOriginalMaturi-tyDuration 106064 | | 0..1 106066 | DAY_Duration 106068 |
| Item 106070 | | | Item 106072 | | 0..n 106074 | FinInstrsExposureProfil-eResultItem 106076 |
| | | | | Date 106078 | 1 106080 | Date 106082 |
| | | | | PositiveExpo-sureAmount 106084 | 0..1 106086 | Amount 106088 |
| | | | | NegativeExpo-sureAmount 106090 | 0..1 106092 | Amount 106094 |
| | | | | Property 106096 | 0..n 106098 | Property 106100 |

FIG. 107-1

| Package | level1 | level2 | level3 | level4 | level5 | Cardinality | Data Type Name |
|---|---|---|---|---|---|---|---|
| FinInstrExpsrPrflAnlytlRsltFSCrteReqMsg 107000 | FinInstrExpsrPrflAnlytlRsltFSCrteReqMsg 107002 | | | | | | FinInstrExpsrPrflAnlytlRsltFSCrteReqMsg 107004 |
| MessageHeader 107006 | | Message-Header 107008 | | | | 1 107010 | BusinessDocu-mentMessage-Header 107012 |
| FinancialInstrumen-tExposureProfileAna-lyticalResult 107014 | | FinancialIn-strumentExpo-sureProfileAna-lyticalResult 107016 | | | | 1 107018 | FinInstrExpsrPrflAnlytlRsltFSCrteReqMs-gAnltlRslt 107020 |
| | | | ID 107022 | | | 1 107024 | PDT_FinancialInstru mentExposurePro-fileAnalyticalResul-tID 107026 |

FIG. 107-2

| Package | level1 | level2 | level3 | level4 | level5 | Cardinality | Data Type Name |
|---|---|---|---|---|---|---|---|
| | | | GroupID 107028 | | | 1 107030 | BusinessTransactionDocument-GroupID 107032 |
| | | | FinancialInstrumentID 107034 | | | 0..1 107036 | BusinessTransactionDocumentID 107038 |
| | | | FinancialInstrument-CategoryCode 107040 | | | 0..1 107042 | FinancialInstrumentCategoryCode 107044 |
| | | | StandardisedFinancialInstrumentAccountID 107046 | | | 0..1 107048 | FinancialInstrumentAccountID 107050 |
| | | | KeyDate 107052 | | | 1 107054 | Date 107056 |

FIG. 107-3

| Package | level1 | level2 | level3 | level4 | level5 | Cardinality | Data Type Name |
|---|---|---|---|---|---|---|---|
| | | | CreationDateTime 107058 | | | 1 107060 | GLOBAL_DateTime 107062 |
| | | | MaximumOriginal-MaturityDuration 107064 | | | 0..1 107066 | DAY_Duration 107068 |
| Item 107070 | | | Item 107072 | | | 0..n 107074 | FinInstrExpsrPrflAnlytlRsltFSCrteReqMs-gAnltlRsltItm 107076 |
| | | | | Date 107078 | | 1 107080 | Date 107082 |
| | | | | PositiveExpo-sureAmount 107084 | | 0..1 107086 | Amount 107088 |

FIG. 107-4

| Package | level1 | level2 | level3 | level4 | level5 | Cardinality | Data Type Name |
|---|---|---|---|---|---|---|---|
| | | | | NegativeExposureAmount 107090 | | 0..1 107092 | Amount 107094 |
| Property 107096 | | | | Property 107098 | | 0..n 107100 | FinInstrExpsrPrflAnlytlRsltFSCrteReqMsgAnltlRsltItmProp 107102 |
| | | | | | ID 107104 | 1 107106 | PropertyID 107108 |
| | | | | | Value 107110 | 1 107112 | PropertyValue 107114 |

FIG. 108

| Package | level1 | level2 | Cardinality | Data Type Name |
|---|---|---|---|---|
| FinInstrExpsrPrflAnlytlRslt FSBulkCrteReqMsg 108000 | FinancialInstrumentsExposureProfile AnalyticalResultFSCreateRequest-Message 108002 | | | FinInstrExpsrPrflAnlytlRslt FSBulkCrteReqMsg 108004 |
| MessageHeader 108006 | | MessageHeader 108008 | 1 108010 | BusinessDocumentMes-sageHeader 108012 |
| FinInstrExpsrPrflAnlytlRs ltFSCrteReqMsg 108014 | | FinInstrExpsrPrflAnlytlRslt FSCrteReqMsg 108016 | 1..n 108018 | FinInstrExpsrPrflAnlytlRslt FSCrteReqMsg 108020 |

FIG. 109-1

| Package | level1 | level2 | level3 | level4 | level5 | Data Type Name |
|---|---|---|---|---|---|---|
| MaterialSupply-AndDemandAllo-cationMessage 109000 | Material-Supply-AndDe-mandAllo-cationMes-sage 109002 | | | | | MatlSupAndDmndAl-locMsg 109004 |
| MessageHeader 109006 | | Message-Header 109008 | | | | BasicBusinessDocu-mentMessageHeader 109010 |
| MaterialSupply-AndDemandAllo-cationERP 109012 | | Material-SupplyAnd-DemandAllo-cation 109014 | | | | |
| | | | ID 109016 | | | MaterialSupplyAndDe-mandAllocationID 109018 |

FIG. 109-2

| Package | level1 | level2 | level3 | level4 | level5 | Data Type Name |
|---|---|---|---|---|---|---|
| | | | ChangeStateID 109020 | | | ChangeStateID 109022 |
| | | | ProcessingTypeCode 109024 | | | MaterialSupplyAndDemandAllocationProcessingTypeCode 109026 |
| | | | ProcessingTypeName 109028 | | | MEDIUM_Name 109030 |
| | | | SystemAdministrativeData 109032 | | | |
| | | | | CreationDate 109034 | | Date 109036 |
| | | | | CreationUserAccountID 109038 | | UserAccountID 109040 |

FIG. 109-3

| Package | level1 | level2 | level3 | level4 | level5 | Data Type Name |
|---|---|---|---|---|---|---|
| | | | | LastChangeDate 109042 | | Date 109044 |
| | | | Item 109046 | | | |
| | | | | @actionCode 109048 | | ActionCode 109050 |
| | | | | ProductInternalID 109052 | | ProductInternalID 109054 |
| | | | | PhysicalPropertyValue-CombinationID 109056 | | PropertyValueCombi-nationID 109058 |
| | | | | PlantID 109060 | | PlantID 109062 |

FIG. 109-4

| Package | level1 | level2 | level3 | level4 | level5 | Data Type Name |
|---|---|---|---|---|---|---|
| | | | | MaterialSupplyAndDemandAllocationStatusCode 109064 | | MaterialSupplyAndDemandAllocationItemStatusCode 109066 |
| | | | | MaterialSupplyAndDemandAllocationStatusName 109068 | | MEDIUM_Name 109070 |
| | | | | MaterialSupplyAndDemandAllocationUserStatusCode 109072 | | MaterialSupplyAndDemandAllocationItemUserStatusCode 109074 |
| | | | | MaterialSupplyAndDemandAllocationUserStatusName 109076 | | MEDIUM_Name 109078 |
| | | | | DemandReference 109080 | | |

FIG. 109-5

| Package | level1 | level2 | level3 | level4 | level5 | Data Type Name |
|---|---|---|---|---|---|---|
| | | | | | ID 109082 | BusinessTransaction-DocumentID 109084 |
| | | | | | ItemID 109086 | BusinessTransaction-DocumentItemID 109088 |
| | | | | | AlternateItemID 109090 | BusinessTransaction-DocumentItemID 109092 |
| | | | | | MaterialSupplyAnd-DemandTypeCode 109094 | MaterialSupplyAndDe-mandTypeCode 109096 |
| | | | | | MaterialSupplyAnd-DemandTypeName 109098 | LONG_Name 109100 |

FIG. 109-6

| Package | level1 | level2 | level3 | level4 | level5 | Data Type Name |
|---|---|---|---|---|---|---|
| | | | | | RequirementSeg-mentationProperty-ValueCombinationID 109102 | PropertyValueCombi-nationID 109104 |
| | | | | | SoldtoPartyInter-nalID 109106 | PartyInternalID 109108 |
| | | | | | ShiptoPartyInter-nalID 109110 | PartyInternalID 109112 |
| | | | | | ProductAvailability-Date 109114 | Date 109116 |
| | | | | | SalesOrderItem-ScheduleLineDate 109118 | Date 109120 |

FIG. 109-7

| Package | level1 | level2 | level3 | level4 | level5 | Data Type Name |
| --- | --- | --- | --- | --- | --- | --- |
| | | | | SupplyReference 109122 | | |
| | | | | | ID 109124 | BusinessTransaction-DocumentID 109126 |
| | | | | | ItemID 109128 | BusinessTransaction-DocumentItemID 109130 |
| | | | | | AlternateItemID 109132 | BusinessTransaction-DocumentItemID 109134 |
| | | | | | BatchID 109136 | BatchID 109138 |
| | | | | | InventoryManaged-LocationInternalID 109140 | LocationInternalID 109142 |

FIG. 109-8

| Package | level1 | level2 | level3 | level4 | level5 | Data Type Name |
|---|---|---|---|---|---|---|
| | | | | | MaterialSupplyAndDemandTypeCode 109144 | MaterialSupplyAndDemandTypeCode 109146 |
| | | | | | MaterialSupplyAndDemandTypeName 109148 | LONG_Name 109150 |
| | | | | | InventorySpecialStockTypeCode 109152 | InventorySpecialStockTypeCode 109154 |
| | | | | | InventorySpecialStockTypeName 109156 | MEDIUM_Name 109158 |
| | | | | | StockSegmentationAllowedPropertyValueCombinationID 109160 | PropertyValueCombinationID 109162 |

FIG. 109-9

| Package | level1 | level2 | level3 | level4 | level5 | Data Type Name |
|---|---|---|---|---|---|---|
| | | | | | VendorPartyInter-nalID 109164 | PartyInternalID 109166 |
| | | | | | Receiptdate 109168 | Date 109170 |
| | | | | | PurchaseOrde-rItemSched-uleLineDeliveryDate 109172 | Date 109174 |
| | | | | | PurchaseOrde-rItemConfirmation-DeliveryDate 109176 | Date 109178 |
| | | | | Quantity 109180 | | |

FIG. 109-10

| Package | level1 | level2 | level3 | level4 | level5 | Data Type Name |
|---|---|---|---|---|---|---|
| | | | | | OpenQuantity 109182 | Quantity 109184 |
| | | | | | ReleasedAllocated-Quantity 109186 | Quantity 109188 |
| | | | | | ReservedAllocated-Quantity 109190 | Quantity 109192 |
| | | | | | DeliveredQuantity 109194 | Quantity 109196 |
| ProcessingCon-ditions 109198 | | Processing-Conditions 109200 | | | | |
| | | | QueryHitsMaxi-mumNumberValue 109202 | | | NumberValue 109204 |

FIG. 109-11

| Package | level1 | level2 | level3 | level4 | level5 | Data Type Name |
|---|---|---|---|---|---|---|
| | | | ReturnedQuery-HitsNumberValue 109206 | | | NumberValue 109208 |
| | | | MoreElement-sAvailableIndicator 109210 | | | Indicator 109212 |
| Log 109214 | | Log 109216 | | | | LOG 109218 |

FIG. 110-1

| Package | level1 | level2 | level3 | level4 | level5 | Cardinality |
|---|---|---|---|---|---|---|
| MaterialSupply-AndDemandAllocationERPCreateRequestMessage_sync 110000 | MaterialSupply-AndDemandAllocationERPCreateRequestMessage_sync 110002 | | | | | |
| MessageHeader 110004 | | MessageHeader 110006 | | | | 0..1 110008 |
| MaterialSupply-AndDemandAllocationERP 110010 | | MaterialSupplyAnd-DemandAllocation 110012 | | | | 1 110014 |
| | | | Processing-TypeCode 110016 | | | 1 110018 |
| | | | Item 110020 | | | 1..n 110022 |

FIG. 110-2

| Package | level1 | level2 | level3 | level4 | level5 | Cardinality |
|---|---|---|---|---|---|---|
| | | | | DemandReference 110024 | | 1 110026 |
| | | | | | ID 110028 | 1 110030 |
| | | | | | ItemID 110032 | 0..1 110034 |
| | | | | | AlternateItemID 110036 | 0..1 110038 |
| | | | | SupplyReference 110040 | | 0..1 110042 |
| | | | | | ID 110044 | 0..1 110046 |
| | | | | | BatchID 110048 | 0..1 110050 |

FIG. 110-3

| Package | level1 | level2 | level3 | level4 | level5 | Cardinality |
|---|---|---|---|---|---|---|
| | | | | | InventoryManagedLocationInternalID 110052 | 0..1 110054 |
| | | | | | MaterialSupplyAndDemandTypeCode 110056 | 0..1 110058 |
| | | | | | InventorySpecialStockTypeCode 110060 | 0..1 110062 |
| | | | | Quantity 110064 | | 0..1 110066 |
| | | | | | OpenQuantity 110068 | 0..1 110070 |

FIG. 111-1

| Package | level1 | level2 | level3 | level4 | level5 | Cardinality |
|---|---|---|---|---|---|---|
| MaterialSupply-AndDemandAl-location-ERPCreateCon-firmationMes-sage_sync 111000 | MaterialSupply-AndDemandAl-location-ERPCreateCon-firmationMes-sage_sync 111002 | | | | | |
| Message-Header 111004 | | MessageHeader 111006 | | | | 0..1 111008 |
| Material-SupplyAndDe-mandAlloca-tionERP 111010 | | MaterialSupply-AndDemandAllo-cation 111012 | | | | 1 111014 |
| | | | ID 111016 | | | 1 111018 |

FIG. 111-2

| Package | level1 | level2 | level3 | level4 | level5 | Cardinality |
|---|---|---|---|---|---|---|
| | | | Processing-TypeCode 111020 | | | 1 111022 |
| | | | Processing-TypeName 111024 | | | 1 111026 |
| | | | SystemAdmin-istrativeData 111028 | | | 1 111030 |
| | | | | CreationDate 111032 | | 0..1 111034 |
| | | | | CreationUserAccountID 111036 | | 1 111038 |
| | | | | LastChangeDate 111040 | | 0..1 111042 |

FIG. 111-3

| Package | level1 | level2 | level3 | level4 | level5 | Cardinality |
|---|---|---|---|---|---|---|
| | | | Item 111044 | | | 0..n 111046 |
| | | | | ProductInternalID 111048 | | 1 111050 |
| | | | | PhysicalPropertyValue-CombinationID 111052 | | 0..1 111054 |
| | | | | PlantID 111056 | | 1 111058 |
| | | | | MaterialSupplyAndDe-mandAllocationStatus-Code 111060 | | 1 111062 |

FIG. 111-4

| Package | level1 | level2 | level3 | level4 | level5 | Cardinality |
|---|---|---|---|---|---|---|
| | | | | MaterialSupplyAndDemandAllocationStatusName 111064 | | 1 111066 |
| | | | | MaterialSupplyAndDemandAllocationUserStatusCode 111068 | | 0..1 111070 |
| | | | | MaterialSupplyAndDemandAllocationUserStatusName 111072 | | 0..1 111074 |
| | | | | DemandReference 111076 | | 1 111078 |
| | | | | | ID 111080 | 1 111082 |

FIG. 111-5

| Package | level1 | level2 | level3 | level4 | level5 | Cardinality |
|---|---|---|---|---|---|---|
| | | | | | ItemID 111084 | 1 111086 |
| | | | | | AlternateItemID 111088 | 1 111090 |
| | | | | | MaterialSupplyAndDemand-TypeCode 111092 | 1 111094 |
| | | | | | MaterialSupplyAndDemand-TypeName 111096 | 1 111098 |
| | | | | | RequirementSegmentation-PropertyValueCombinationID 111100 | 0..1 111102 |
| | | | | | SoldtoPartyInternalID 111104 | 0..1 111106 |

FIG. 111-6

| Package | level1 | level2 | level3 | level4 | level5 | Cardinality |
|---|---|---|---|---|---|---|
| | | | | | ShiptoPartyInternalID 111108 | 0..1 111110 |
| | | | | | ProductAvailabilityDate 111112 | 0..1 111114 |
| | | | | | SalesOrderItemSched-uleLineDate 111116 | 0..1 111118 |
| | | | | SupplyReference 111120 | | 0..1 111122 |
| | | | | | ID 111124 | 0..1 111126 |
| | | | | | ItemID 111128 | 0..1 111130 |

FIG. 111-7

| Package | level1 | level2 | level3 | level4 | level5 | Cardinality |
|---|---|---|---|---|---|---|
| | | | | | AlternateItemID 111132 | 0..1 111134 |
| | | | | | BatchID 111136 | 0..1 111138 |
| | | | | | InventoryManagedLocation-InternalID 111140 | 0..1 111142 |
| | | | | | MaterialSupplyAndDemand-TypeCode 111144 | 0..1 111146 |
| | | | | | MaterialSupplyAndDemand-TypeName 111148 | 0..1 111150 |
| | | | | | InventorySpecialStockType-Code 111152 | 0..1 111154 |

FIG. 111-8

| Package | level1 | level2 | level3 | level4 | level5 | Cardinality |
|---|---|---|---|---|---|---|
| | | | | | InventorySpecialStock-TypeName 111156 | 0..1 111158 |
| | | | | | StockSegmentationAllowed-PropertyValueCombinationID 111160 | 0..1 111162 |
| | | | | | VendorPartyInternalID 111164 | 0..1 111166 |
| | | | | | Receiptdate 111168 | 0..1 111170 |
| | | | | | PurchaseOrderItemSched-uleLineDeliveryDate 111172 | 0..1 111174 |
| | | | | | PurchaseOrderItemConfir-mationDeliveryDate 111176 | 0..1 111178 |

FIG. 111-9

| Package | level1 | level2 | level3 | level4 | level5 | Cardinality |
|---|---|---|---|---|---|---|
| | | | | Quantity 111180 | | 0..1 111182 |
| | | | | | OpenQuantity 111184 | 0..1 111186 |
| | | | | | ReleasedAllocatedQuantity 111188 | 0..1 111190 |
| | | | | | ReservedAllocatedQuantity 111192 | 0..1 111194 |
| | | | | | DeliveredQuantity 111196 | 0..1 111198 |
| Log 111200 | | Log 111202 | | | | 1 111204 |

FIG. 112-1

| Package | level1 | level2 | level3 | level4 | level5 | Cardinality |
| --- | --- | --- | --- | --- | --- | --- |
| MaterialSupply-AndDemandAllo-cationERPCan-celRequestMes-sage_sync 112000 | Material-Supply-AndDe-mandAllo-cation-ERPCan-celRe-questMes-sage_sync 112002 | | | | | |
| MessageHeader 112004 | | MessageHeader 112006 | | | | 0..1 112008 |
| MaterialSupply-AndDemandAllo-cationERP 112010 | | MaterialSupply-AndDemandAllo-cation 112012 | | | | 1 112014 |
| | | | ID 112016 | | | 1 112018 |

FIG. 112-2

| Package | level1 | level2 | level3 | level4 | level5 | Cardinality |
|---|---|---|---|---|---|---|
| | | | ChangeStateID 112020 | | | 1 112022 |
| | | | Item 112024 | | | 1..n 112026 |
| | | | | ProductInternalID 112028 | | 0..1 112030 |
| | | | | PlantID 112032 | | 0..1 112034 |
| | | | | MaterialSupply-AndDemandAllo-cationStatusCode 112036 | | 0..1 112038 |
| | | | | DemandReference 112040 | | 1 112042 |

FIG. 112-3

| Package | level1 | level2 | level3 | level4 | level5 | Cardinality |
|---|---|---|---|---|---|---|
| | | | | | ID 112044 | 1 112046 |
| | | | | | ItemID 112048 | 0..1 112050 |
| | | | | | AlternateItemID 112052 | 0..1 112054 |
| | | | | | SoldtoPartyInternalID 112056 | 0..1 112058 |
| | | | | SupplyReference 112060 | | 0..1 112062 |
| | | | | | ID 112064 | 0..1 112066 |
| | | | | | ItemID 112068 | 0..1 112070 |

FIG. 112-4

| Package | level1 | level2 | level3 | level4 | level5 | Cardinality |
|---|---|---|---|---|---|---|
| | | | | | AlternateItemID 112072 | 0..1 112074 |
| | | | | | BatchID 112076 | 0..1 112078 |
| | | | | | InventoryManagedLocationInternalID 112080 | 0..1 112082 |
| | | | | | MaterialSupplyAndDemandTypeCode 112084 | 0..1 112086 |
| | | | | | InventorySpecialStockTypeCode 112088 | 0..1 112090 |
| | | | | Quantity 112092 | | 0..1 112094 |
| | | | | | OpenQuantity 112096 | 0..1 112098 |

FIG. 113

| Package | level1 | level2 | Cardinality |
|---|---|---|---|
| MaterialSupplyAndDemandAllocation-ERPCancelConfirmationMessage_sync 113000 | MaterialSupplyAndDemandAllocation-ERPCancelConfirmationMessage_sync 113002 | | |
| MessageHeader 113004 | | MessageHeader 113006 | 0..1 113008 |
| Log 113010 | | Log 113012 | 1 113014 |

FIG. 114

| Package | level1 | level2 | level3 | Cardinality |
|---|---|---|---|---|
| MaterialSupplyAndDemandAllocationERPByIDQueryMessage_sync 114000 | MaterialSupplyAndDemandAllocationERPByIDQueryMessage_sync 114002 | | | |
| MaterialSupplyAndDemandAllocationERP 114004 | | MaterialSupplyAndDemandAllocationSelectionByID 114006 | | 1 114008 |
| | | | MaterialSupplyAndDemandAllocationID 114010 | 1 114012 |

FIG. 115-1

| Package | level1 | level2 | level3 | level4 | level5 | Cardinality |
|---|---|---|---|---|---|---|
| MaterialSupplyAndDemandAllocationERPByIDResponseMessage_sync 115000 | MaterialSupplyAndDemandAllocationERPByIDResponseMessage_sync 115002 | | | | | |
| MaterialSupplyAndDemandAllocationERP 115004 | | MaterialSupplyAndDemandAllocation 115006 | | | | 1 115008 |
| | | | ID 115010 | | | 1 115012 |
| | | | ChangeStateID 115014 | | | 1 115016 |

FIG. 115-2

| Package | level1 | level2 | level3 | level4 | level5 | Cardinality |
|---|---|---|---|---|---|---|
| | | | SystemAdministrativeData 115018 | | | 1 115020 |
| | | | | CreationDate 115022 | | 0..1 115024 |
| | | | | CreationUserAccountID 115026 | | 1 115028 |
| | | | | LastChangeDate 115030 | | 0..1 115032 |
| | | | Item 115034 | | | 0..n 115036 |
| | | | | ProductInternalID 115038 | | 1 115040 |

FIG. 115-3

| Package | level1 | level2 | level3 | level4 | level5 | Cardinality |
|---|---|---|---|---|---|---|
| | | | | PhysicalPropertyValue-CombinationID 115042 | | 0..1 115044 |
| | | | | PlantID 115046 | | 1 115048 |
| | | | | MaterialSupplyAndDemand-dAllocationStatusCode 115050 | | 1 115052 |
| | | | | MaterialSupplyAndDemand-dAllocationStatusName 115054 | | 1 115056 |
| | | | | MaterialSupplyAndDemand-dAllocationUserStatusCode 115058 | | 0..1 115060 |

FIG. 115-4

| Package | level1 | level2 | level3 | level4 | level5 | Cardinality |
|---|---|---|---|---|---|---|
| | | | | MaterialSupplyAndDemandAllocationUserStatusName 115062 | | 0..1 115064 |
| | | | | DemandReference 115066 | | 1 115068 |
| | | | | | ID 115070 | 1 115072 |
| | | | | | ItemID 115074 | 1 115076 |
| | | | | | AlternateItemID 115078 | 1 115080 |
| | | | | | MaterialSupplyAndDemandTypeCode 115082 | 1 115084 |

FIG. 115-5

| Package | level1 | level2 | level3 | level4 | level5 | Cardinality |
|---|---|---|---|---|---|---|
| | | | | | MaterialSupplyAndDemand-TypeName 115086 | 1 115088 |
| | | | | | RequirementSegmentation-PropertyValueCombinationID 115090 | 0..1 115092 |
| | | | | | SoldtoPartyInternalID 115094 | 0..1 115096 |
| | | | | | ShiptoPartyInternalID 115098 | 0..1 115100 |
| | | | | | ProductAvailabilityDate 115102 | 0..1 115104 |
| | | | | | SalesOrderItemSched-uleLineDate 115106 | 0..1 115108 |

FIG. 115-6

| Package | level1 | level2 | level3 | level4 | level5 | Cardinality |
|---|---|---|---|---|---|---|
| | | | | SupplyReference 115110 | | 0..1 115112 |
| | | | | | ID 115114 | 0..1 115116 |
| | | | | | ItemID 115118 | 0..1 115120 |
| | | | | | AlternateItemID 115122 | 0..1 115124 |
| | | | | | BatchID 115126 | 0..1 115128 |
| | | | | | InventoryManagedLocationInternalID 115130 | 0..1 115132 |

FIG. 115-7

| Package | level1 | level2 | level3 | level4 | level5 | Cardinality |
|---|---|---|---|---|---|---|
| | | | | | MaterialSupplyAndDemand-TypeCode 115134 | 0..1 115136 |
| | | | | | MaterialSupplyAndDemand-TypeName 115138 | 0..1 115140 |
| | | | | | InventorySpecialStockType-Code 115142 | 0..1 115144 |
| | | | | | InventorySpecialStock-TypeName 115146 | 0..1 115148 |
| | | | | | StockSegmentationAllowed-PropertyValueCombinationID 115150 | 0..1 115152 |

FIG. 115-8

| Package | level1 | level2 | level3 | level4 | level5 | Cardinality |
|---|---|---|---|---|---|---|
| | | | | | VendorPartyInternalID 115154 | 0..1 115156 |
| | | | | | ReceiptDate 115158 | 0..1 115160 |
| | | | | | PurchaseOrderItemSched-uleLineDeliveryDate 115162 | 0..1 115164 |
| | | | | | PurchaseOrderItemConfirma-tionDeliveryDate 115166 | 0..1 115168 |
| | | | | Quantity 115170 | | 0..1 115172 |
| | | | | | OpenQuantity 115174 | 0..1 115176 |

FIG. 115-9

| Package | level1 | level2 | level3 | level4 | level5 | Cardinality |
|---|---|---|---|---|---|---|
| | | | | | ReleasedAllocatedQuantity 115178 | 0..1 115180 |
| | | | | | ReservedAllocatedQuantity 115182 | 0..1 115184 |
| | | | | | DeliveredQuantity 115186 | 0..1 115188 |
| Log 115190 | | Log 115192 | | | | 1 115194 |

FIG. 116-1

| Package | level1 | level2 | level3 | level4 | Cardinality |
|---|---|---|---|---|---|
| MaterialSupplyAndDemandAllocationERPByElementsQueryMessage_sync 116000 | MaterialSupplyAndDemandAllocationERPByElementsQueryMessage_sync 116002 | | | | |
| Selection 116004 | | ItemBasicDataSelectionByElements 116006 | | | 1 116008 |
| | | | SelectionByID 116010 | | 0..N 116012 |
| | | | | InclusionExclusionCode 116014 | 0..1 116016 |

FIG. 116-2

| Package | level1 | level2 | level3 | level4 | Cardinality |
|---|---|---|---|---|---|
| | | | | IntervalBoundaryTypeCode 116018 | 0..1 116020 |
| | | | | LowerBoundaryMaterialSupply-AndDemandAllocationID 116022 | 0..1 116024 |
| | | | | UpperBoundaryMaterialSupply-AndDemandAllocationID 116026 | 0..1 116028 |
| | | | SelectionByRequirementDocumentID 116030 | | 0..N 116032 |
| | | | | InclusionExclusionCode 116034 | 0..1 116036 |
| | | | | IntervalBoundaryTypeCode 116038 | 0..1 116040 |

FIG. 116-3

| Package | level1 | level2 | level3 | level4 | Cardinality |
|---|---|---|---|---|---|
| | | | | LowerBoundaryBusinessTransactionDocumentID 116042 | 0..1 116044 |
| | | | | UpperBoundaryBusinessTransactionDocumentID 116046 | 0..1 116048 |
| | | | SelectionByRequirementSegmentationPropertyValueCombinationID 116050 | | 0..N 116052 |
| | | | | InclusionExclusionCode 116054 | 0..1 116056 |
| | | | | IntervalBoundaryTypeCode 116058 | 0..1 116060 |
| | | | | LowerBoundaryPropertyValue-CombinationID 116062 | 0..1 116064 |

FIG. 116-4

| Package | level1 | level2 | level3 | level4 | Cardinality |
|---|---|---|---|---|---|
| | | | | UpperBoundaryPropertyValue-CombinationID 116066 | 0..1 116068 |
| | | | SelectionByProductionOrderID 116070 | | 0..N 116072 |
| | | | | InclusionExclusionCode 116074 | 0..1 116076 |
| | | | | IntervalBoundaryTypeCode 116078 | 0..1 116080 |
| | | | | LowerBoundaryBusinessTransac-tionDocumentID 116082 | 0..1 116084 |
| | | | | UpperBoundaryBusinessTransac-tionDocumentID 116086 | 0..1 116088 |

FIG. 116-5

| Package | level1 | level2 | level3 | level4 | Cardinality |
|---|---|---|---|---|---|
| | | | SelectionByPurchaseOrderID 116090 | | 0..N 116092 |
| | | | | InclusionExclusionCode 116094 | 0..1 116096 |
| | | | | IntervalBoundaryTypeCode 116098 | 0..1 116100 |
| | | | | LowerBoundaryBusinessTransactionDocumentID 116102 | 0..1 116104 |
| | | | | UpperBoundaryBusinessTransactionDocumentID 116106 | 0..1 116108 |
| | | | SelectionByBatchD 116110 | | 0..N 116112 |

FIG. 116-6

| Package | level1 | level2 | level3 | level4 | Cardinality |
|---|---|---|---|---|---|
| | | | | InclusionExclusionCode 116114 | 0..1 116116 |
| | | | | IntervalBoundaryTypeCode 116118 | 0..1 116120 |
| | | | | LowerBoundaryBusinessTransac-tionDocumentID 116122 | 0..1 116124 |
| | | | | UpperBoundaryBusinessTransac-tionDocumentID 116126 | 0..1 116128 |
| | | | SelectionByVendorID 116130 | | 0..N 116132 |
| | | | | InclusionExclusionCode 116134 | 0..1 116136 |

FIG. 116-7

| Package | level1 | level2 | level3 | level4 | Cardinality |
|---|---|---|---|---|---|
| | | | | IntervalBoundaryTypeCode 116138 | 0..1 116140 |
| | | | | LowerBoundaryBusinessTransactionDocumentID 116142 | 0..1 116144 |
| | | | | UpperBoundaryBusinessTransactionDocumentID 116146 | 0..1 116148 |
| | | | SelectionByStockSegmentationAllowedPropertyValueCombinationID 116150 | | 0..N 116152 |
| | | | | InclusionExclusionCode 116154 | 0..1 116156 |
| | | | | IntervalBoundaryTypeCode 116158 | 0..1 116160 |

FIG. 116-8

| Package | level1 | level2 | level3 | level4 | Cardinality |
|---|---|---|---|---|---|
| | | | | LowerBoundaryPropertyValue-CombinationID 116162 | 0..1 116164 |
| | | | | UpperBoundaryPropertyValue-CombinationID 116166 | 0..1 116168 |
| | | | SelectionByMaterialSupplyAndDe-mandAllocationStatusCode 116170 | | 0..N 116172 |
| | | | | InclusionExclusionCode 116174 | 0..1 116176 |
| | | | | IntervalBoundaryTypeCode 116178 | 0..1 116180 |

FIG. 116-9

| Package | level1 | level2 | level3 | level4 | Cardinality |
|---|---|---|---|---|---|
| | | | | LowerBoundaryMaterialSupply-AndDemandAllocationItem-StatusCode 116182 | 0..1 116184 |
| | | | | UpperBoundaryMaterialSupply-AndDemandAllocationItem-StatusCode 116186 | 0..1 116188 |
| | | | SelectionByProductID 116190 | | 0..N 116192 |
| | | | | InclusionExclusionCode 116194 | 0..1 116196 |
| | | | | IntervalBoundaryTypeCode 116198 | 0..1 116200 |
| | | | | LowerBoundaryProductInternalID 116202 | 0..1 116204 |

FIG. 116-10

| Package | level1 | level2 | level3 | level4 | Cardinality |
|---|---|---|---|---|---|
| | | | | UpperBoundaryProductInternalID 116206 | 0..1 116208 |
| | | | SelectionByPhysicalPropertyValue-CombinationID 116210 | | 0..N 116212 |
| | | | | InclusionExclusionCode 116214 | 0..1 116216 |
| | | | | IntervalBoundaryTypeCode 116218 | 0..1 116220 |
| | | | | LowerBoundaryPropertyValue-CombinationID 116222 | 0..1 116224 |
| | | | | UpperBoundaryPropertyValue-CombinationID 116226 | 0..1 116228 |

FIG. 116-11

| Package | level1 | level2 | level3 | level4 | Cardinality |
|---|---|---|---|---|---|
| | | | SelectionByLocationID 116230 | | 0..N 116232 |
| | | | | InclusionExclusionCode 116234 | 0..1 116236 |
| | | | | IntervalBoundaryTypeCode 116238 | 0..1 116240 |
| | | | | LowerBoundaryLocationInternalID 116242 | 0..1 116244 |
| | | | | UpperBoundaryLocationInternalID 116246 | 0..1 116248 |
| | | | SelectionBySoldtoParty 116250 | | 0..N 116252 |
| | | | | InclusionExclusionCode 116254 | 0..1 116256 |

FIG. 116-12

| Package | level1 | level2 | level3 | level4 | Cardinality |
|---|---|---|---|---|---|
| | | | | IntervalBoundaryTypeCode 116258 | 0..1 116260 |
| | | | | LowerBoundaryPartyInternalID 116262 | 0..1 116264 |
| | | | | UpperBoundaryPartyInternalID 116266 | 0..1 116268 |
| | | | SelectionByProductAvailabilityDate 116270 | | 0..N 116272 |
| | | | | InclusionExclusionCode 116274 | 0..1 116276 |
| | | | | IntervalBoundaryTypeCode 116278 | 0..1 116280 |
| | | | | LowerBoundaryDate 116282 | 0..1 116284 |

FIG. 116-13

| Package | level1 | level2 | level3 | level4 | Cardinality |
|---|---|---|---|---|---|
| | | | | UpperBoundaryDate 116286 | 0..1 116288 |
| Processing-Conditions 116290 | | Processing-Conditions 116292 | | | 0..1 116294 |
| | | | QueryHitsMaximumNumberValue 116296 | | 1 116298 |

FIG. 117-1

| Package | level1 | level2 | level3 | level4 | level5 | Cardinality |
|---|---|---|---|---|---|---|
| MaterialSupplyAnd-DemandAllocation-ERPByElementsRe-sponseMessage_sync 117000 | MaterialSupply-AndDemandAlloca-tionERPByEle-mentsResponse-Message_sync 117002 | | | | | |
| MaterialSupplyAnd-DemandAllocation-ERP 117004 | | Material-SupplyAnd-DemandAllo-cation 117006 | | | | 0..n 117008 |
| | | | ID 117010 | | | 1 117012 |
| | | | Item 117014 | | | 1 117016 |
| | | | | ProductInternalID 117018 | | 1 117020 |

FIG. 117-2

| Package | level1 | level2 | level3 | level4 | level5 | Cardinality |
|---|---|---|---|---|---|---|
| | | | | PlantID 117022 | | 1 117024 |
| | | | | MaterialSupply-AndDemandAllo-cationStatusCode 117026 | | 1 117028 |
| | | | | MaterialSupply-AndDemandAllo-cationStatusName 117030 | | 1 117032 |
| | | | | DemandReference 117034 | | 1 117036 |
| | | | | | ID 117038 | 1 117040 |
| | | | | | ItemID 117042 | 1 117044 |

FIG. 117-3

| Package | level1 | level2 | level3 | level4 | level5 | Cardinality |
|---|---|---|---|---|---|---|
| | | | | | AlternateItemID 117046 | 1 117048 |
| | | | | | MaterialSupplyAndDemandTypeCode 117050 | 1 117052 |
| | | | | | MaterialSupplyAndDemandTypeName 117054 | 1 117056 |
| | | | | | SoldtoPartyInternalID 117058 | 0..1 117060 |
| | | | | SupplyReference 117062 | | 0..1 117064 |
| | | | | | ID 117066 | 0..1 117068 |

FIG. 117-4

| Package | level1 | level2 | level3 | level4 | level5 | Cardinality |
|---|---|---|---|---|---|---|
| | | | | | ItemID 117070 | 0..1 117072 |
| | | | | | AlternateItemID 117074 | 0..1 117076 |
| | | | | | BatchID 117078 | 0..1 117080 |
| | | | | | InventoryManagedLocationInternalID 117082 | 0.1 117084 |
| | | | | | MaterialSupplyAndDemandTypeCode 117086 | 0..1 117088 |
| | | | | | MaterialSupplyAndDemandTypeName 117090 | 0..1 117092 |

FIG. 117-5

| Package | level1 | level2 | level3 | level4 | level5 | Cardinality |
|---|---|---|---|---|---|---|
| | | | | | InventorySpecial-StockTypeCode 117094 | 0..1 117096 |
| | | | | | InventorySpecial-StockTypeName 117098 | 0..1 117100 |
| ProcessingConditions 117102 | | Processing-Conditions 117104 | | | | 0..1 117106 |
| | | | ReturnedQuery-HitsNumberValue 117108 | | | 1 117110 |
| | | | MoreElement-sAvailableIndicator 117112 | | | 1 117114 |

FIG. 117-6

| Package | level1 | level2 | level3 | level4 | level5 | Cardinality |
|---|---|---|---|---|---|---|
| Log 117116 | | Log 117118 | | | | 1 117120 |

FIG. 118-1

| Package | level1 | level2 | level3 | level4 | level5 | Cardinality |
|---|---|---|---|---|---|---|
| MaterialSupplyAndDemandAllocationERPUpdateRequestMessage_sync 118000 | MaterialSupplyAndDemandAllocationERPUpdateRequestMessage_sync 118002 | | | | | |
| MessageHeader 118004 | | MessageHeader 118006 | | | | 0..1 118008 |
| MaterialSupplyAndDemandAllocationERP 118010 | | MaterialSupplyAndDemandAllocation 118012 | | | | 1 118014 |
| | | | ID 118016 | | | 1 118018 |
| | | | ChangeStateID 118020 | | | 1 118022 |

FIG. 118-2

| Package | level1 | level2 | level3 | level4 | level5 | Cardinality |
|---|---|---|---|---|---|---|
| | | | Item 118024 | | | 1..n 118026 |
| | | | | ProductInternalID 118028 | | 0..1 118030 |
| | | | | PlantID 118032 | | 0..1 118034 |
| | | | | MaterialSupply-AndDemandAllocationStatusCode 118036 | | 1 118038 |
| | | | | DemandReference 118040 | | 1 118042 |
| | | | | | ID 118044 | 1 118046 |

FIG. 118-3

| Package | level1 | level2 | level3 | level4 | level5 | Cardinality |
|---|---|---|---|---|---|---|
| | | | | | ItemID 118048 | 0..1 118050 |
| | | | | | AlternateItemID 118052 | 0..1 118054 |
| | | | | | SoldtoPartyInternalID 118056 | 0..1 118058 |
| | | | | SupplyReference 118060 | | 0..1 118062 |
| | | | | | ID 118064 | 0..1 118066 |
| | | | | | ItemID 118068 | 0..1 118070 |
| | | | | | AlternateItemID 118072 | 0..1 118074 |

FIG. 118-4

| Package | level1 | level2 | level3 | level4 | level5 | Cardinality |
|---|---|---|---|---|---|---|
| | | | | | BatchID 118076 | 0..1 118078 |
| | | | | | InventoryManaged-LocationInternalID 118080 | 0..1 118082 |
| | | | | | MaterialSupplyAnd-DemandTypeCode 118084 | 0..1 118086 |
| | | | | | InventorySpecial-StockTypeCode 118088 | 0..1 118090 |

FIG. 119

| Package | level1 | level2 | Cardinality |
| --- | --- | --- | --- |
| MaterialSupplyAndDemandAllocation-ERPUpdateConfirmationMes-sage_sync 119000 | MaterialSupplyAndDemandAllocation-ERPUpdateConfirmationMessage_sync 119002 | | |
| MessageHeader 119004 | | MessageHeader 119006 | 0..1 119008 |
| Log 119010 | | Log 119012 | 1 119014 |

FIG. 120-1

| Package | level1 | level2 | level3 | level4 | level5 | Cardinality |
|---|---|---|---|---|---|---|
| MaterialSupply-AndDemandAllo-cationERPCre-ateCheckQuery-Message_sync 120000 | MaterialSupply-AndDemandAllo-cationERPCre-ateCheckQuery-Message_sync 120002 | | | | | |
| MaterialSupply-AndDemandAllo-cationERP 120004 | | MaterialSupply-AndDemandAllo-cation 120006 | | | | 1 120008 |
| | | | Processing-TypeCode 120010 | | | 1 120012 |
| | | | Item 120014 | | | 1..n 120016 |
| | | | | DemandReference 120018 | | 1 120020 |

FIG. 120-2

| Package | level1 | level2 | level3 | level4 | level5 | Cardinality |
|---|---|---|---|---|---|---|
| | | | | | ID 120022 | 1 120024 |
| | | | | | ItemID 120026 | 0..1 120028 |
| | | | | | AlternateItemID 120030 | 0..1 120032 |
| | | | | SupplyReference 120034 | | 0..1 120036 |
| | | | | | ID 120038 | 0..1 120040 |
| | | | | | BatchID 120042 | 0..1 120044 |

FIG. 120-3

| Package | level1 | level2 | level3 | level4 | level5 | Cardinality |
|---|---|---|---|---|---|---|
| | | | | | InventoryManaged-LocationInternalID 120046 | 0..1 120048 |
| | | | | | MaterialSupplyAnd-DemandTypeCode 120050 | 0..1 120052 |
| | | | | | InventorySpecial-StockTypeCode 120054 | 0..1 120056 |
| | | | | Quantity 120058 | | 0..1 120060 |
| | | | | | OpenQuantity 120062 | 0..1 120064 |

FIG. 121-1

| Package | level1 | level2 | level3 | level4 | level5 | Cardinality |
| --- | --- | --- | --- | --- | --- | --- |
| MaterialSupply-AndDemandAllo-cationERPCre-ateCheckRespon-seMessage_sync 121000 | Material-SupplyAnd-DemandAl-location-ERPCreate-CheckRe-sponseMes-sage_sync 121002 | | | | | |
| MaterialSupply-AndDemandAllo-cationERP 121004 | | Material-Supply-AndDe-mandAllo-cation 121006 | | | | 0..1 121008 |
| | | | Processing-TypeCode 121010 | | | 1 121012 |
| | | | Processing-TypeName 121014 | | | 1 121016 |

FIG. 121-2

| Package | level1 | level2 | level3 | level4 | level5 | Cardinality |
|---|---|---|---|---|---|---|
| | | | SystemAdministrativeData 121018 | | | 1 121020 |
| | | | | CreationDate 121022 | | 0..1 121024 |
| | | | | CreationUserAccountID 121026 | | 1 121028 |
| | | | | LastChangeDate 121030 | | 0..1 121032 |
| | | | Item 121034 | | | 0..n 121036 |
| | | | | ProductInternalID 121038 | | 1 121040 |

FIG. 121-3

| Package | level1 | level2 | level3 | level4 | level5 | Cardinality |
| --- | --- | --- | --- | --- | --- | --- |
| | | | | PhysicalProperty-ValueCombinationID 121042 | | 0..1 121044 |
| | | | | PlantID 121046 | | 1 121048 |
| | | | | MaterialSupplyAnd-DemandAllocation-StatusCode 121050 | | 1 121052 |
| | | | | MaterialSupplyAnd-DemandAllocation-StatusName 121054 | | 1 121056 |
| | | | | MaterialSupplyAnd-DemandAlloca-tionUserStatusCode 121058 | | 0..1 121060 |

FIG. 121-4

| Package | level1 | level2 | level3 | level4 | level5 | Cardinality |
|---|---|---|---|---|---|---|
| | | | | MaterialSupplyAndDemandAllocationUserStatusName 121062 | | 0..1 121064 |
| | | | | DemandReference 121066 | | 1 121068 |
| | | | | | ID 121070 | 1 121072 |
| | | | | | ItemID 121074 | 1 121076 |
| | | | | | AlternateItemID 121078 | 1 121080 |
| | | | | | MaterialSupplyAndDemandTypeCode 121082 | 1 121084 |

FIG. 121-5

| Package | level1 | level2 | level3 | level4 | level5 | Cardinality |
|---|---|---|---|---|---|---|
| | | | | | MaterialSupplyAndDemandTypeName 121086 | 1 121088 |
| | | | | | RequirementSegmentationProperty-ValueCombinationID 121090 | 0..1 121092 |
| | | | | | SoldtoPartyInternalID 121094 | 0..1 121096 |
| | | | | | ShiptoPartyInternalID 121098 | 0..1 121100 |
| | | | | | ProductAvailabilityDate 121102 | 0..1 121104 |
| | | | | | SalesOrderItemScheduleLineDate 121106 | 0..1 121108 |

FIG. 121-6

| Package | level1 | level2 | level3 | level4 | level5 | Cardinality |
|---|---|---|---|---|---|---|
| | | | | SupplyReference 121110 | | 0..1 121112 |
| | | | | | ID 121114 | 0..1 121116 |
| | | | | | ItemID 121118 | 0..1 121120 |
| | | | | | AlternateItemID 121122 | 0..1 121124 |
| | | | | | BatchID 121126 | 0..1 121128 |
| | | | | | InventoryManagedLocationInternalID 121130 | 0..1 121132 |
| | | | | | MaterialSupplyAndDemandTypeCode 121134 | 0..1 121136 |

FIG. 121-7

| Package | level1 | level2 | level3 | level4 | level5 | Cardinality |
|---|---|---|---|---|---|---|
| | | | | | MaterialSupplyAndDemandTypeName 121138 | 0..1 121140 |
| | | | | | InventorySpecialStockTypeCode 121142 | 0..1 121144 |
| | | | | | InventorySpecialStockTypeName 121146 | 0..1 121148 |
| | | | | | StockSegmentationAllowedProperty-ValueCombinationID 121150 | 0..1 121152 |
| | | | | | VendorPartyInternalID 121154 | 0..1 121156 |
| | | | | | ReceiptDate 121158 | 0..1 121160 |

FIG. 121-8

| Package | level1 | level2 | level3 | level4 | level5 | Cardinality |
|---|---|---|---|---|---|---|
| | | | | | PurchaseOrderItemScheduleLineDe-liveryDate 121162 | 0..1 121164 |
| | | | | | PurchaseOrderItemConfirmationDeliv-eryDate 121166 | 0..1 121168 |
| | | | | Quantity 121170 | | 0..1 121172 |
| | | | | | OpenQuantity 121174 | 0..1 121176 |
| | | | | | ReleasedAllocatedQuantity 121178 | 0..1 121180 |
| | | | | | ReservedAllocatedQuantity 121182 | 0..1 121184 |

FIG. 121-9

| Package | level1 | level2 | level3 | level4 | level5 | Cardinality |
|---|---|---|---|---|---|---|
| | | | | | DeliveredQuantity 121186 | 0..1 121188 |
| Log 121190 | | Log 121192 | | | | 1 121194 |

MANAGING CONSISTENT INTERFACES FOR CREDIT PORTFOLIO BUSINESS OBJECTS ACROSS HETEROGENEOUS SYSTEMS

CROSS-REFERENCE TO RELATED APPLICATION

This application is a continuation application of and claims priority to U.S. application Ser. No. 12/334,175, filed on Dec. 12, 2008, the entire disclosure of which is incorporated herein by reference.

TECHNICAL FIELD

The subject matter described herein relates generally to the generation and use of consistent interfaces (or services) derived from a business object model. More particularly, the present disclosure relates to the generation and use of consistent interfaces or services that are suitable for use across industries, across businesses, and across different departments within a business.

BACKGROUND

Transactions are common among businesses and between business departments within a particular business. During any given transaction, these business entities exchange information. For example, during a sales transaction, numerous business entities may be involved, such as a sales entity that sells merchandise to a customer, a financial institution that handles the financial transaction, and a warehouse that sends the merchandise to the customer. The end-to-end business transaction may require a significant amount of information to be exchanged between the various business entities involved. For example, the customer may send a request for the merchandise as well as some form of payment authorization for the merchandise to the sales entity, and the sales entity may send the financial institution a request for a transfer of funds from the customer's account to the sales entity's account.

Exchanging information between different business entities is not a simple task. This is particularly true because the information used by different business entities is usually tightly tied to the business entity itself. Each business entity may have its own program for handling its part of the transaction. These programs differ from each other because they typically are created for different purposes and because each business entity may use semantics that differ from the other business entities. For example, one program may relate to accounting, another program may relate to manufacturing, and a third program may relate to inventory control. Similarly, one program may identify merchandise using the name of the product while another program may identify the same merchandise using its model number. Further, one business entity may use U.S. dollars to represent its currency while another business entity may use Japanese Yen. A simple difference in formatting, e.g., the use of upper-case lettering rather than lower-case or title-case, makes the exchange of information between businesses a difficult task. Unless the individual businesses agree upon particular semantics, human interaction typically is required to facilitate transactions between these businesses. Because these "heterogeneous" programs are used by different companies or by different business areas within a given company, a need exists for a consistent way to exchange information and perform a business transaction between the different business entities.

Currently, many standards exist that offer a variety of interfaces used to exchange business information. Most of these interfaces, however, apply to only one specific industry and are not consistent between the different standards. Moreover, a number of these interfaces are not consistent within an individual standard.

SUMMARY

In a first aspect, a tangible computer readable medium includes program code for providing a message-based interface for performing a credit portfolio model service. The service exposes at least one service as defined in a service registry. Upon execution, the program code executes in an environment of computer systems providing message-based services. The program code receives, from a service consumer, a first message for processing a model-based risk analysis of a credit portfolio. The program code invokes a credit portfolio model business object. The business object is a logically centralized, semantically disjointed object representing a model-based risk analysis of a credit portfolio. The business object includes data logically organized as a credit portfolio model root node, and an input data subordinate node. The input data node contains a stock subordinate node, a credit spread matrix subordinate node, a bond subordinate node, a probability of default calibration matrix subordinate node, a rating transition matrix subordinate node, a traditional off balance sheet item subordinate node, an OTC derivative subordinate node, a securities financing transaction subordinate node, a loan subordinate node, a credit derivative subordinate node, a business partner subordinate node, an exchange rate subordinate node, a yield curve subordinate node, a credit portfolio analysis data subordinate node, and a securitization subordinate node. The credit portfolio analysis data node contains a credit portfolio assignment subordinate node. The credit portfolio node contains a financial instrument exposure subordinate node. The program code initiates transmission of a message to a heterogeneous second application, executing in the environment of computer systems providing message-based services. The message is based on the data in the credit portfolio model business object. The message includes a credit portfolio model entity and a credit portfolio model package.

In a second aspect, a tangible computer readable medium includes program code for providing a message-based interface for performing a credit portfolio model service. The service exposes at least one service as defined in a service registry. Upon execution, the program code executes in an environment of computer systems providing message-based services. The program code initiates transmission of a message to a heterogeneous second application, executing in the environment of computer systems providing message-based services. The message is based on data in a credit portfolio model business object invoked by the second application. The business object is a logically centralized, semantically disjointed object representing a model-based risk analysis of a credit portfolio. The business object includes data logically organized as a credit portfolio model root node, and an input data subordinate node. The input data node contains a stock subordinate node, a credit spread matrix subordinate node, a bond subordinate node, a probability of default calibration matrix subordinate node, a rating transition matrix subordinate node, a traditional off balance sheet item subordinate node, an OTC derivative subordinate node, a securities financing transaction subordinate node, a loan subordinate node, a credit derivative subordinate node, a business partner subordinate node, an exchange rate subordinate node, a yield curve subordinate node, a credit portfolio analysis data subordinate node, and a securitization subordinate node. The credit portfolio analysis data node contains a credit portfolio assignment subordinate node. The credit portfolio node contains a financial instrument exposure subordinate node. The message includes a credit portfolio model entity and a credit portfolio model package. The program code receives a second message from the second application. The second message is associated with the invoked credit portfolio model business object and is in response to the first message.

In a third aspect, a distributed system operates in a landscape of computer systems providing message-based services. The system processes business objects involving processing a model-based risk analysis of a credit portfolio. The system includes memory and a graphical user interface remote from the memory. The memory stores a business object repository storing a plurality of business objects. Each business object is a logically centralized, semantically disjointed object of a particular business object type. At least one of the business objects represents a model-based risk analysis of a credit portfolio. The business object includes data logically organized as a credit portfolio model root node, and an input data subordinate node. The input data node contains a stock subordinate node, a credit spread matrix subordinate node, a bond subordinate node, a probability of default calibration matrix subordinate node, a rating transition matrix subordinate node, a traditional off balance sheet item subordinate node, an OTC derivative subordinate node, a securities financing transaction subordinate node, a loan subordinate node, a credit derivative subordinate node, a business partner subordinate node, an exchange rate subordinate node, a yield curve subordinate node, a credit portfolio analysis data subordinate node, and a securitization subordinate node. The credit portfolio analysis data node contains a credit portfolio assignment subordinate node. The credit portfolio node contains a financial instrument exposure subordinate node. The graphical user interface presents data associated with an invoked instance of the credit portfolio model business object. The user interface includes tangible computer readable instructions embodied on tangible media.

In a fourth aspect, a tangible computer readable medium includes program code for providing a message-based interface for performing a credit portfolio analytical result service. The service exposes at least one service as defined in a service registry. Upon execution, the program code executes in an environment of computer systems providing message-based services. The program code receives, from a service consumer, a first message for processing an analytical result for a credit portfolio. The program code invokes a credit portfolio analytical result business object. The business object is a logically centralized, semantically disjointed object representing an analytical result for a credit portfolio. The business object includes data logically organized as a credit portfolio analytical result root node and an item subordinate node. The item node contains a property subordinate node. The program code initiates transmission of a message to a heterogeneous second application, executing in the environment of computer systems providing message-based services. The message is based on the data in the credit portfolio analytical result business object. The message includes a credit portfolio analytical result entity and a credit portfolio analytical result package.

In a fifth aspect, a tangible computer readable medium includes program code for providing a message-based interface for performing a credit portfolio analytical result service. The service exposes at least one service as defined in a service registry. Upon execution, the program code executes in an environment of computer systems providing message-based services. The program code initiates transmission of a message to a heterogeneous second application, executing in the environment of computer systems providing message-based services. The message is based on data in a credit portfolio analytical result business object invoked by the second application. The business object is a logically centralized, semantically disjointed object representing an analytical result for a credit portfolio. The business object includes data logically organized as a credit portfolio analytical result root node and an item subordinate node. The item node contains a property subordinate node. The message includes a credit portfolio analytical result entity and a credit portfolio analytical result package. The program code receives a second message from the second application. The second message is associated with the invoked credit portfolio analytical result business object and is in response to the first message.

In a sixth aspect, a distributed system operates in a landscape of computer systems providing message-based services. The system processes business objects involving processing an analytical result for a credit portfolio. The system includes memory and a graphical user interface remote from the memory. The memory stores a business object repository storing a plurality of business objects. Each business object is a logically centralized, semantically disjointed object of a particular business object type. At least one of the business objects represents an analytical result for a credit portfolio. The business object includes data logically organized as a credit portfolio analytical result root node and an item subordinate node. The item node contains a property subordinate node. The graphical user interface presents data associated with an invoked instance of the credit portfolio analytical result business object. The user interface includes tangible computer readable instructions embodied on tangible media.

In a seventh aspect, a tangible computer readable medium includes program code for providing a message-based interface for performing a credit portfolio management process control service. The service exposes at least one service as defined in a service registry. Upon execution, the program code executes in an environment of computer systems providing message-based services. The program code receives, from a service consumer, a first message for processing the selection of data relevant for credit portfolio management, and the transformation of these data into the credit portfolio management specific view format. The program code invokes a credit portfolio management process control business object. The business object is a logically centralized, semantically disjointed object representing the selection of data relevant for credit portfolio management, and the transformation of these data into the credit portfolio management specific view format. The business object includes data logically organized as a credit portfolio management process control root node, a data transfer subordinate node, and a credit portfolio analysis run subordinate node. The program code initiates transmission of a message to a heterogeneous second application, executing in the environment of computer systems providing message-based services. The message is based on the data in the credit portfolio management process control business object. The message includes a credit portfolio management process control entity and a credit portfolio management process control package.

In an eighth aspect, a tangible computer readable medium includes program code for providing a message-based interface for performing a credit portfolio management process control service. The service exposes at least one service as defined in a service registry. Upon execution, the program code executes in an environment of computer systems providing message-based services. The program code initiates transmission of a message to a heterogeneous second application, executing in the environment of computer systems providing message-based services. The message is based on data in a credit portfolio management process control business object invoked by the second application. The business object is a logically centralized, semantically disjointed object representing the selection of data relevant for credit portfolio management, and the transformation of these data into the credit portfolio management specific view format. The business object includes data logically organized as a credit portfolio management process control root node, a data transfer subordinate node, and a credit portfolio analysis run subordinate node. The message includes a credit portfolio management process control entity and a credit portfolio management process control package. The program code receives a second message from the second application. The second message is associated with the invoked credit portfolio management process control business object and is in response to the first message.

In a ninth aspect, a distributed system operates in a landscape of computer systems providing message-based services. The system processes business objects involving processing the selection of data relevant for credit portfolio management, and the transformation of these data into the credit portfolio management specific view format. The system includes memory and a graphical user interface remote from the memory. The memory stores a business object repository storing a plurality of business objects. Each business object is a logically centralized, semantically disjointed object of a particular business object type. At least one of the business objects represents the selection of data relevant for credit portfolio management, and the transformation of these data into the credit portfolio management specific view format. The business object includes data logically organized as a credit portfolio management process control root node, a data transfer subordinate node, and a credit portfolio analysis run subordinate node. The graphical user interface presents data associated with an invoked instance of the credit portfolio management process control business object. The user interface includes tangible computer readable instructions embodied on tangible media.

In a tenth aspect, a tangible computer readable medium includes program code for providing a message-based interface for performing a financial instrument exposure profile analytical result service. The service exposes at least one service as defined in a service registry. Upon execution, the program code executes in an environment of computer systems providing message-based services. The program code receives, from a service consumer, a first message for processing an analytical result of an exposure profile calculation of a financial instrument. The program code invokes a financial instrument exposure profile analytical result business object. The business object is a logically centralized, semantically disjointed object representing an analytical result of an exposure profile calculation of a financial instrument. The business object includes data logically organized as a financial instrument exposure profile analytical result root node and an item subordinate node. The item node contains a property subordinate node. The program code initiates transmission of a message to a heterogeneous second application, executing in the environment of computer systems providing message-based services. The message is based on the data in the financial instrument exposure profile analytical result business object. The message includes a financial instrument exposure profile analytical result entity and a financial instrument exposure profile analytical result package.

In an eleventh aspect, a tangible computer readable medium includes program code for providing a message-based interface for performing a financial instrument exposure profile analytical result service. The service exposes at least one service as defined in a service registry. Upon execution, the program code executes in an environment of computer systems providing message-based services. The program code initiates transmission of a message to a heterogeneous second application, executing in the environment of computer systems providing message-based services. The message is based on data in a financial instrument exposure profile analytical result business object invoked by the second application. The business object is a logically centralized, semantically disjointed object representing an analytical result of an exposure profile calculation of a financial instrument. The business object includes data logically organized as a financial instrument exposure profile analytical result root node and an item subordinate node. The item node contains a property subordinate node. The message includes a financial instrument exposure profile analytical result entity and a financial instrument exposure profile analytical result package. The program code receives a second message from the second application. The second message is associated with the invoked financial instrument exposure profile analytical result business object and is in response to the first message.

In a twelfth aspect, a distributed system operates in a landscape of computer systems providing message-based services. The system processes business objects involving processing an analytical result of an exposure profile calculation of a financial instrument. The system includes memory and a graphical user interface remote from the memory. The memory stores a business object repository storing a plurality of business objects. Each business object is a logically centralized, semantically disjointed object of a particular business object type. At least one of the business objects represents an analytical result of an exposure profile calculation of a financial instrument. The business object includes data logically organized as a financial instrument exposure profile analytical result root node and an item subordinate node. The item node contains a property subordinate node. The graphical user interface presents data associated with an invoked instance of the a financial instrument exposure profile analytical result business object. The user interface includes tangible computer readable instructions embodied on tangible media.

In a thirteenth aspect, a tangible computer readable medium includes program code for providing a message-based interface for performing a material supply and demand allocation service. The service exposes at least one service as defined in a service registry. Upon execution, the program code executes in an environment of computer systems providing message-based services. The program code receives, from a service consumer, a first message for processing allocation to optimally allocate the available quantities to open requirements. The program code invokes a material supply and demand allocation business object. The business object is a logically centralized, semantically disjointed object representing allocation to optimally allocate the available quantities to open requirements. The business object includes data logically organized as a material supply and demand allocation root node, a system administrative data subordinate node, and an item subordinate node. The item node contains a demand reference subordinate node, a supply reference subordinate node, and a quantity subordinate node. The program code initiates transmission of a message to a heterogeneous second application, executing in the environment of computer systems providing message-based services. The message is based on the data in the material supply and demand allocation business object. The message includes a material supply and demand allocation entity, a message header package, a material supply and demand allocation package, a processing conditions package, and a log package.

In a fourteenth aspect, a tangible computer readable medium includes program code for providing a message-based interface for performing a material supply and demand allocation service. The service exposes at least one service as defined in a service registry. Upon execution, the program code executes in an environment of computer systems providing message-based services. The program code initiates transmission of a message to a heterogeneous second application, executing in the environment of computer systems providing message-based services. The message is based on data in a material supply and demand allocation business object invoked by the second application. The business object is a logically centralized, semantically disjointed object representing allocation to optimally allocate the available quantities to open requirements. The business object includes data logically organized as a material supply and demand allocation root node, a system administrative data subordinate node, and an item subordinate node. The item node contains a demand reference subordinate node, a supply reference subordinate node, and a quantity subordinate node. The message includes a material supply and demand allocation entity, a message header package, a material supply and demand allocation package, a processing conditions package, and a log package. The program code receives a second message from the second application. The second message is associated with the invoked material supply and demand allocation business object and is in response to the first message.

In a fifteenth aspect, a distributed system operates in a landscape of computer systems providing message-based services. The system processes business objects involving processing allocation to optimally allocate the available quantities to open requirements. The system includes memory and a graphical user interface remote from the memory. The memory stores a business object repository storing a plurality of business objects. Each business object is a logically centralized, semantically disjointed object of a particular business object type. At least one of the business objects represents allocation to optimally allocate the available quantities to open requirements. The business object includes data logically organized as a material supply and demand allocation root node, a system administrative data subordinate node, and an item subordinate node. The item node contains a demand reference subordinate node, a supply reference subordinate node, and a quantity subordinate node. The graphical user interface presents data associated with an invoked instance of the material supply and demand allocation business object. The user interface includes tangible computer readable instructions embodied on tangible media.

In some implementations, processing business objects includes creating, updating and/or retrieving information associated with the business objects.

BRIEF DESCRIPTION OF THE DRAWINGS

FIGS. 33-1 through 33-3 illustrate an exemplary Credit Portfolio Model Object Model.

FIGS. 34-1 through 34-3 illustrate an exemplary CreditPortfolioModelFSInputDataRequest Message Data Type.

FIGS. 35-1 through 35-2 illustrate an exemplary CrdtPrtfoModFSInDatLoanCrteReqMsg Message Data Type.

FIGS. 36-1 through 36-2 illustrate an exemplary CrdtPrtfoModFSInDatBondCrteReqMsg Message Data Type.

FIGS. 45-1 through 45-2 illustrate an exemplary CrdtPrtfoModFSInDatOTCDeriCrteReqMsg Message Data Type.

FIGS. 46-1 through 46-2 illustrate an exemplary CrdtPrtfoModFSInDatSecFTCrteReqMsg Message Data Type.

FIGS. 47-1 through 47-2 illustrate an exemplary CrdtPrtfoModFSInDatStockCrteReqMsg Message Data Type.

FIGS. 48-1 through 48-2 illustrate an exemplary CrdtPrtfoModFSInDatBuPaCrteReqMsg Message Data Type.

FIGS. 63-1 through 63-135 illustrate an exemplary CreditPortfolioModelFSInputDataRequest Element Structure.

FIGS. 64-1 through 64-25 illustrate an exemplary CreditPortfolioModelFSInputDataLoanRequestMessage Element Structure.

FIGS. 65-1 through 65-24 illustrate an exemplary CreditPortfolioModelFSInputDataBondRequestMessage Element Structure.

FIGS. 66-1 through 66-25 illustrate an exemplary CrdtPrtfoModFSInDatTOBSItmCrteReqMsg Element Structure.

FIGS. 67-1 through 67-23 illustrate an exemplary CrdtPrtfoModFSInDatCrdtDeriCrteReqMsg Element Structure.

FIGS. 68-1 through 68-5 illustrate an exemplary CrdtPrtfoModFSInDatPrtfoAnlysDatCrteReqMsg Element Structure.

FIGS. 69-1 through 69-3 illustrate an exemplary CrdtPrtfoModFSInDatYldCrvCrteReqMsg Element Structure.

FIGS. 70-1 through 70-3 illustrate an exemplary CrdtPrtfoModFSInDatExchRateCrteReqMsg Element Structure.

FIGS. 71-1 through 71-4 illustrate an exemplary CrdtPrtfoModFSInDatPDClbrtMtxCrteReqMsg Element Structure.

FIGS. 72-1 through 72-4 illustrate an exemplary CreditPortfolioModelFSInputData-CreditSpreadMatrixRequestMessage Element Structure.

FIGS. 73-1 through 73-3 illustrate an exemplary CrdtPrtfoModFSInDatRatgTrnstnMtxCrteReqMsg Element Structure.

FIGS. 74-1 through 74-10 illustrate an exemplary CrdtPrtfoModFSInDatOTCDeriCrteReqMsg Element Structure.

FIGS. 75-1 through 75-11 illustrate an exemplary CrdtPrtfoModFSInDatSecFTCrteReqMsg Element Structure.

FIGS. 76-1 through 76-9 illustrate an exemplary CrdtPrtfoModFSInDatStockCrteReqMsg Element Structure.

FIGS. 77-1 through 77-10 illustrate an exemplary CrdtPrtfoModFSInDatBuPaCrteReqMsg Element Structure.

FIG. 78 illustrates an exemplary CrdtPrtfoModFSInDatBuPaCrteReqMsg Element Structure.

FIG. 79 illustrates an exemplary CrdtPrtfoModFSInDatYldCrvBulkCrteReqMsg Element Structure.

FIG. 80 illustrates an exemplary CreditPortfolioModelFS-InputDataExchangeRateCreateBulkRequestMessage Element Structure.

FIG. 81 illustrates an exemplary CrdtPrtfoModFSInDatP-DClbrtMtxBulkCrteReqMsg Element Structure.

FIG. 82 illustrates an exemplary CreditPortfolioModelFS-InputDataCreditSpreadMatrixCreateBulkRequestMessage Element Structure.

FIG. 83 illustrates an exemplary CrdtPrtfoModFSIn-DatRatgMtxBulkCrteReqMsg Element Structure.

FIG. 84 illustrates an exemplary CrdtPrtfoModFSInDat-TOBSItmBulkCrteReqMsg Element Structure.

FIG. 85 illustrates an exemplary CrdtPrtfoModFSInDat-LoanBulkCrteReqMsg Element Structure.

FIG. 86 illustrates an exemplary CrdtPrtfoModFSInDa-tOTCDeriBulkCrteReqMsg Element Structure.

FIG. 87 illustrates an exemplary CrdtPrtfoModFSInDat-SecFTBulkCrteReqMsg Element Structure.

FIG. 88 illustrates an exemplary CrdtPrtfoModFSInDat-StockBulkCrteReqMsg Element Structure.

FIG. 89 illustrates an exemplary CrdtPrtfoModFSInDat-CrdtDeriBulkCrteReqMsg Element Structure.

FIG. 90 illustrates an exemplary CrdtPrtfoModFSInDat-BuPaBulkCrteReqMsg Element Structure.

FIG. 91 illustrates an exemplary CrdtPrtfoModFSInDat-PrtfoAnlysDatBulkCrteReqMsg Element Structure.

FIGS. 94-1 through 94-10 illustrate an exemplary Credit-PortfolioAnalyticalResultFSCreateRequestMessage Element Structure.

FIGS. 95-1 through 95-6 illustrate an exemplary Credit-PortfolioAnalyticalResultFS-LossValueCreateRequestMessage Element Structure.

FIGS. 96-1 through 96-7 illustrate an exemplary Credit-PortfolioAnalyticalResultFSItemCreateRequestMessage Element Structure.

FIG. 97 illustrates an exemplary CrdtPrtfoAnlytRsltFS-LossValueBulkCrteReqMsg Element Structure.

FIG. 98 illustrates an exemplary CreditPortfolioAnalyticalResultFSItemBulkCreateRequestMessage Element Structure.

FIGS. 99-1 through 99-3 illustrate an exemplary Credit-PortfolioManagementProcessControlMessage Object Model.

FIGS. 100-1 through 100-11 show an exemplary CrdtPrtfoMgmtProcCtrlFSReqMsg Element Structure.

FIGS. 101-1 through 101-3 illustrate an exemplary Crdt-PrtfoMgmtProcCtrlFSReqMsg Element Structure.

FIG. 102 illustrates an exemplary CrdtPrtfoMgmtProcCtr-lFSConfMsg Element Structure.

FIGS. 103-1 through 103-6 illustrate an exemplary Crdt-PrtfoMgmtProcCtrlFSDataTransfStsChgdNotifMsg Element Structure.

FIGS. 106-1 through 106-3 show an exemplary FinInstr-ExpsrPrflAnlytlRsltFSCrteReqMsg Element Structure.

FIGS. 107-1 through 107-4 show an exemplary Financia-lInstrumentsExposureProfileA-nalyticalResultFSCreateRequestMessage Element Structure.

FIG. 108 shows an exemplary FinancialInstrumentsExpo-sureProfileAnalyticalResultFSCreateRequestMessage Element Structure.

FIGS. 109-1 through 109-11 show an exemplary Materi-alSupplyAndDemandAllocation-ERPCreateRequestMessage_sync Element Structure.

FIGS. 110-1 through 110-3 show an exemplary Material-SupplyAndDemandAllocationER-PCreateConfirmationMessage_sync Element Structure.

FIGS. 111-1 through 111-9 show an exemplary Material-SupplyAndDemandAllocationERP-CancelRequestMessage_sync Element Structure.

FIGS. 112-1 through 112-4 show an exemplary Material-SupplyAndDemandAllocationERP-CancelConfirmationMessage_sync Element Structure.

FIG. 113 shows an exemplary MaterialSupplyAndDeman-dAllocationERPCancelConfirmationMessage_sync Element Structure.

FIG. 114 shows an exemplary MaterialSupplyAndDeman-dAllocationERPByIDQueryMessage_sync Element Structure.

FIGS. 115-1 through 115-9 show an exemplary Material-SupplyAndDemandAllocationERP-ByElementsQueryMessage_sync Element Structure.

FIGS. 116-1 through 116-13 show an exemplary Materi-alSupplyAndDemandAllocation-ERPByElementsResponseMessage_sync Element Structure.

FIGS. 117-1 through 117-6 show an exemplary Material-SupplyAndDemandAllocationERP-UpdateRequestMessage_sync Element Structure.

FIGS. 118-1 through 118-4 show an exemplary Material-SupplyAndDemandAllocationERP-UpdateConfirmationMessage_sync Element Structure.

FIG. 119 shows an exemplary MaterialSupplyAndDeman-dAllocationERPUpdateConfirmationMessage_sync Element Structure.

FIGS. 120-1 through 120-3 show an exemplary Material-SupplyAndDemandAllocationER-PCreateCheckResponseMessage_sync Element Structure.

FIGS. 121-1 through 121-9 show an exemplary Material-SupplyAndDemandAllocationER-PCreateCheckResponseMessage_sync Element Structure.

DETAILED DESCRIPTION

A. Overview

Figure 1:
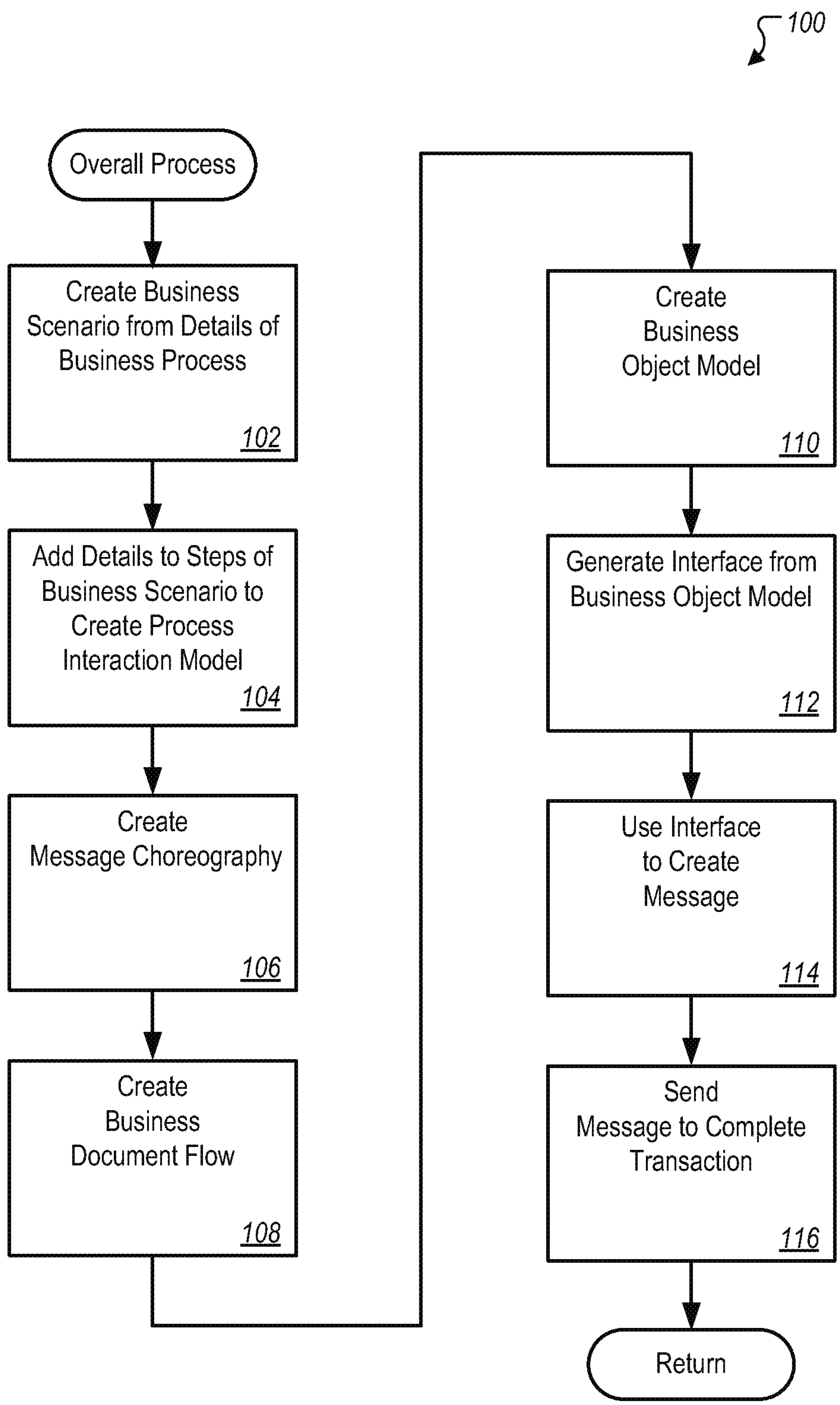
FIG. 1 depicts a flow diagram of the overall steps performed by methods and systems consistent with the subject matter described herein.

Methods and systems consistent with the subject matter described herein facilitate e-commerce by providing consistent interfaces that are suitable for use across industries, across businesses, and across different departments within a business during a business transaction. To generate consistent interfaces, methods and systems consistent with the subject matter described herein utilize a business object model, which reflects the data that will be used during a given business transaction. An example of a business transaction is the exchange of purchase orders and order confirmations between a buyer and a seller. The business object model is generated in a hierarchical manner to ensure that the same type of data is represented the same way throughout the business object model. This ensures the consistency of the information in the business object model. Consistency is also reflected in the semantic meaning of the various structural elements. That is, each structural element has a consistent business meaning. For example, the location entity, regardless of in which package it is located, refers to a location.

From this business object model, various interfaces are derived to accomplish the functionality of the business transaction. Interfaces provide an entry point for components to access the functionality of an application. For example, the interface for a Purchase Order Request provides an entry point for components to access the functionality of a Purchase Order, in particular, to transmit and/or receive a Purchase Order Request. One skilled in the art will recognize that each of these interfaces may be provided, sold, distributed, utilized, or marketed as a separate product or as a major component of a separate product. Alternatively, a group of related interfaces may be provided, sold, distributed, utilized, or marketed as a product or as a major component of a separate product. Because the interfaces are generated from the business object model, the information in the interfaces is consistent, and the interfaces are consistent among the business entities. Such consistency facilitates heterogeneous business entities in cooperating to accomplish the business transaction.

Generally, the business object is a representation of a type of a uniquely identifiable business entity (an object instance) described by a structural model. In the architecture, processes may typically operate on business objects. Business objects represent a specific view on some well-defined business content. In other words, business objects represent content, which a typical business user would expect and understand with little explanation. Business objects are further categorized as business process objects and master data objects. A master data object is an object that encapsulates master data (i.e., data that is valid for a period of time). A business process object, which is the kind of business object generally found in a process component, is an object that encapsulates transactional data (i.e., data that is valid for a point in time). The term business object will be used generically to refer to a business process object and a master data object, unless the context requires otherwise. Properly implemented, business objects are implemented free of redundancies.

The architectural elements also include the process component. The process component is a software package that realizes a business process and generally exposes its functionality as services. The functionality contains business transactions. In general, the process component contains one or more semantically related business objects. Often, a particular business object belongs to no more than one process component. Interactions between process component pairs involving their respective business objects, process agents, operations, interfaces, and messages are described as process component interactions, which generally determine the interactions of a pair of process components across a deployment unit boundary. Interactions between process components within a deployment unit are typically not constrained by the architectural design and can be implemented in any convenient fashion. Process components may be modular and context-independent. In other words, process components may not be specific to any particular application and as such, may be reusable. In some implementations, the process component is the smallest (most granular) element of reuse in the architecture. An external process component is generally used to represent the external system in describing interactions with the external system; however, this should be understood to require no more of the external system than that able to produce and receive messages as required by the process component that interacts with the external system. For example, process components may include multiple operations that may provide interaction with the external system. Each operation generally belongs to one type of process component in the architecture. Operations can be synchronous or asynchronous, corresponding to synchronous or asynchronous process agents, which will be described below. The operation is often the smallest, separately-callable function, described by a set of data types used as input, output, and fault parameters serving as a signature.

The architectural elements may also include the service interface, referred to simply as the interface. The interface is a named group of operations. The interface often belongs to one process component and process component might contain multiple interfaces. In one implementation, the service interface contains only inbound or outbound operations, but not a mixture of both. One interface can contain both synchronous and asynchronous operations. Normally, operations of the same type (either inbound or outbound) which belong to the same message choreography will belong to the same interface. Thus, generally, all outbound operations to the same other process component are in one interface.

The architectural elements also include the message. Operations transmit and receive messages. Any convenient messaging infrastructure can be used. A message is information conveyed from one process component instance to another, with the expectation that activity will ensue. Operation can use multiple message types for inbound, outbound, or error messages. When two process components are in different deployment units, invocation of an operation of one process component by the other process component is accomplished by the operation on the other process component sending a message to the first process component.

The architectural elements may also include the process agent. Process agents do business processing that involves the sending or receiving of messages. Each operation normally has at least one associated process agent. Each process agent can be associated with one or more operations. Process agents can be either inbound or outbound and either synchronous or asynchronous. Asynchronous outbound process agents are called after a business object changes such as after a “create”, “update”, or “delete” of a business object instance. Synchronous outbound process agents are generally triggered directly by business object. An outbound process agent will generally perform some processing of the data of the business object instance whose change triggered the event. The outbound agent triggers subsequent business process steps by sending messages using well-defined outbound services to another process component, which generally will be in another deployment unit, or to an external system. The outbound process agent is linked to the one business object that triggers the agent, but it is sent not to another business object but rather to another process component. Thus, the outbound process agent can be implemented without knowledge of the exact business object design of the recipient process component. Alternatively, the process agent may be inbound. For example, inbound process agents may be used for the inbound part of a message-based communication. Inbound process agents are called after a message has been received. The inbound process agent starts the execution of the business process step requested in a message by creating or updating one or multiple business object instances. Inbound process agent is not generally the agent of business object but of its process component. Inbound process agent can act on multiple business objects in a process component. Regardless of whether the process agent is inbound or outbound, an agent may be synchronous if used when a process component requires a more or less immediate response from another process component, and is waiting for that response to continue its work.

The architectural elements also include the deployment unit. Each deployment unit may include one or more process components that are generally deployed together on a single computer system platform. Conversely, separate deployment units can be deployed on separate physical computing systems. The process components of one deployment unit can interact with those of another deployment unit using messages passed through one or more data communication networks or other suitable communication channels. Thus, a deployment unit deployed on a platform belonging to one business can interact with a deployment unit software entity deployed on a separate platform belonging to a different and unrelated business, allowing for business-to-business communication. More than one instance of a given deployment unit can execute at the same time, on the same computing system or on separate physical computing systems. This arrangement allows the functionality offered by the deployment unit to be scaled to meet demand by creating as many instances as needed.

Since interaction between deployment units is through process component operations, one deployment unit can be replaced by other another deployment unit as long as the new deployment unit supports the operations depended upon by other deployment units as appropriate. Thus, while deployment units can depend on the external interfaces of process components in other deployment units, deployment units are not dependent on process component interaction within other deployment units. Similarly, process components that interact with other process components or external systems only through messages, e.g., as sent and received by operations, can also be replaced as long as the replacement generally supports the operations of the original.

Services (or interfaces) may be provided in a flexible architecture to support varying criteria between services and systems. The flexible architecture may generally be provided by a service delivery business object. The system may be able to schedule a service asynchronously as necessary, or on a regular basis. Services may be planned according to a schedule manually or automatically. For example, a follow-up service may be scheduled automatically upon completing an initial service. In addition, flexible execution periods may be possible (e.g. hourly, daily, every three months, etc.). Each customer may plan the services on demand or reschedule service execution upon request.

FIG. 1 depicts a flow diagram 100 showing an example technique, perhaps implemented by systems similar to those disclosed herein. Initially, to generate the business object model, design engineers study the details of a business process, and model the business process using a "business scenario" (step 102). The business scenario identifies the steps performed by the different business entities during a business process. Thus, the business scenario is a complete representation of a clearly defined business process.

After creating the business scenario, the developers add details to each step of the business scenario (step 104). In particular, for each step of the business scenario, the developers identify the complete process steps performed by each business entity. A discrete portion of the business scenario reflects a "business transaction," and each business entity is referred to as a "component" of the business transaction. The developers also identify the messages that are transmitted between the components. A "process interaction model" represents the complete process steps between two components.

After creating the process interaction model, the developers create a "message choreography" (step 106), which depicts the messages transmitted between the two components in the process interaction model. The developers then represent the transmission of the messages between the components during a business process in a "business document flow" (step 108). Thus, the business document flow illustrates the flow of information between the business entities during a business process.

Figure 2:
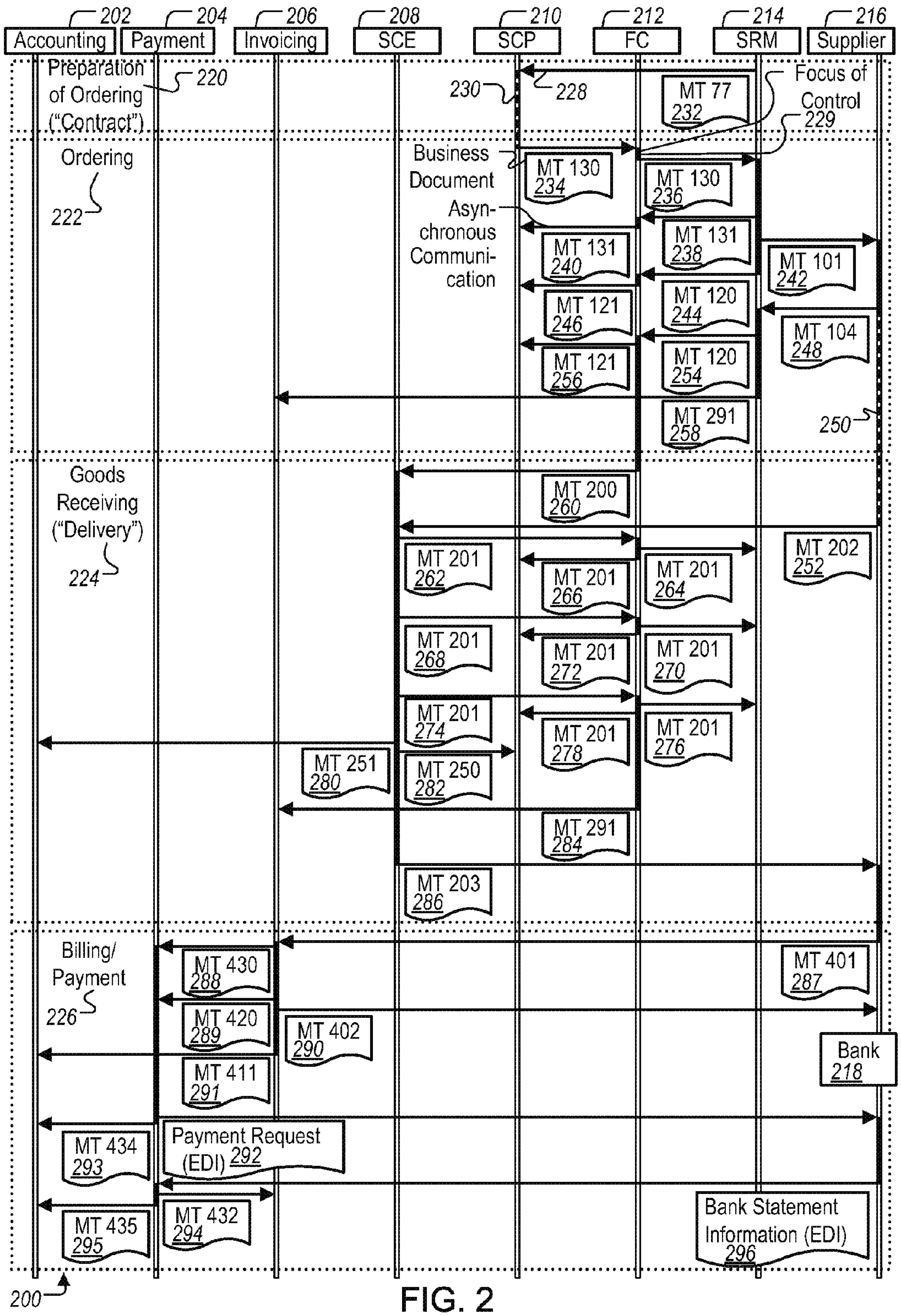
FIG. 2 depicts a business document flow for an invoice request in accordance with methods and systems consistent with the subject matter described herein.

FIG. 2 depicts an example business document flow 200 for the process of purchasing a product or service. The business entities involved with the illustrative purchase process include Accounting 202, Payment 204, Invoicing 206, Supply Chain Execution ("SCE") 208, Supply Chain Planning ("SCP") 210, Fulfillment Coordination ("FC") 212, Supply Relationship Management ("SRM") 214, Supplier 216, and Bank 218. The business document flow 200 is divided into four different transactions: Preparation of Ordering ("Contract") 220, Ordering 222, Goods Receiving ("Delivery") 224, and Billing/Payment 226. In the business document flow, arrows 228 represent the transmittal of documents. Each document reflects a message transmitted between entities. One of ordinary skill in the art will appreciate that the messages transferred may be considered to be a communications protocol. The process flow follows the focus of control, which is depicted as a solid vertical line (e.g., 229) when the step is required, and a dotted vertical line (e.g., 230) when the step is optional.

During the Contract transaction 220, the SRM 214 sends a Source of Supply Notification 232 to the SCP 210. This step is optional, as illustrated by the optional control line 230 coupling this step to the remainder of the business document flow 200. During the Ordering transaction 222, the SCP 210 sends a Purchase Requirement Request 234 to the FC 212, which forwards a Purchase Requirement Request 236 to the SRM 214. The SRM 214 then sends a Purchase Requirement Confirmation 238 to the FC 212, and the FC 212 sends a Purchase Requirement Confirmation 240 to the SCP 210. The SRM 214 also sends a Purchase Order Request 242 to the Supplier 216, and sends Purchase Order Information 244 to the FC 212. The FC 212 then sends a Purchase Order Planning Notification 246 to the SCP 210. The Supplier 216, after receiving the Purchase Order Request 242, sends a Purchase Order Confirmation 248 to the SRM 214, which sends a Purchase Order Information confirmation message 254 to the FC 212, which sends a message 256 confirming the Purchase Order Planning Notification to the SCP 210. The SRM 214 then sends an Invoice Due Notification 258 to Invoicing 206.

During the Delivery transaction 224, the FC 212 sends a Delivery Execution Request 260 to the SCE 208. The Supplier 216 could optionally (illustrated at control line 250) send a Dispatched Delivery Notification 252 to the SCE 208. The SCE 208 then sends a message 262 to the FC 212 notifying the FC 212 that the request for the Delivery Information was created. The FC 212 then sends a message 264 notifying the SRM 214 that the request for the Delivery Information was created. The FC 212 also sends a message 266 notifying the SCP 210 that the request for the Delivery Information was created. The SCE 208 sends a message 268 to the FC 212 when the goods have been set aside for delivery. The FC 212 sends a message 270 to the SRM 214 when the goods have been set aside for delivery. The FC 212 also sends a message 272 to the SCP 210 when the goods have been set aside for delivery.

The SCE 208 sends a message 274 to the FC 212 when the goods have been delivered. The FC 212 then sends a message 276 to the SRM 214 indicating that the goods have been delivered, and sends a message 278 to the SCP 210 indicating that the goods have been delivered. The SCE 208 then sends an Inventory Change Accounting Notification 280 to Accounting 202, and an Inventory Change Notification 282 to the SCP 210. The FC 212 sends an Invoice Due Notification 284 to Invoicing 206, and SCE 208 sends a Received Delivery Notification 286 to the Supplier 216.

During the Billing/Payment transaction 226, the Supplier 216 sends an Invoice Request 287 to Invoicing 206. Invoicing 206 then sends a Payment Due Notification 288 to Payment 204, a Tax Due Notification 289 to Payment 204, an Invoice Confirmation 290 to the Supplier 216, and an Invoice Accounting Notification 291 to Accounting 202. Payment 204 sends a Payment Request 292 to the Bank 218, and a Payment Requested Accounting Notification 293 to Accounting 202. Bank 218 sends a Bank Statement Information 296 to Payment 204. Payment 204 then sends a Payment Done Information 294 to Invoicing 206 and a Payment Done Accounting Notification 295 to Accounting 202.

Within a business document flow, business documents having the same or similar structures are marked. For example, in the business document flow 200 depicted in FIG. 2, Purchase Requirement Requests 234, 236 and Purchase Requirement Confirmations 238, 240 have the same structures. Thus, each of these business documents is marked with an "O6." Similarly, Purchase Order Request 242 and Purchase Order Confirmation 248 have the same structures. Thus, both documents are marked with an "O1." Each business document or message is based on a message type.

From the business document flow, the developers identify the business documents having identical or similar structures, and use these business documents to create the business object model (step 110). The business object model includes the objects contained within the business documents. These objects are reflected as packages containing related information, and are arranged in a hierarchical structure within the business object model, as discussed below.

Methods and systems consistent with the subject matter described herein then generate interfaces from the business object model (step 112). The heterogeneous programs use instantiations of these interfaces (called "business document objects" below) to create messages (step 114), which are sent to complete the business transaction (step 116). Business entities use these messages to exchange information with other business entities during an end-to-end business transaction. Since the business object model is shared by heterogeneous programs, the interfaces are consistent among these programs. The heterogeneous programs use these consistent interfaces to communicate in a consistent manner, thus facilitating the business transactions.

Standardized Business-to-Business ("B2B") messages are compliant with at least one of the e-business standards (i.e., they include the business-relevant fields of the standard). The e-business standards include, for example, RosettaNet for the high-tech industry, Chemical Industry Data Exchange ("CIDX"), Petroleum Industry Data Exchange ("PIDX") for the oil industry, UCCnet for trade, PapiNet for the paper industry, Odette for the automotive industry, HR-XML for human resources, and XML Common Business Library ("xCBL"). Thus, B2B messages enable simple integration of components in heterogeneous system landscapes. Application-to-Application ("A2A") messages often exceed the standards and thus may provide the benefit of the full functionality of application components. Although various steps of FIG. 1 were described as being performed manually, one skilled in the art will appreciate that such steps could be computer-assisted or performed entirely by a computer, including being performed by either hardware, software, or any other combination thereof.

B. Implementation Details

As discussed above, methods and systems consistent with the subject matter described herein create consistent interfaces by generating the interfaces from a business object model. Details regarding the creation of the business object model, the generation of an interface from the business object model, and the use of an interface generated from the business object model are provided below.

Figure 3A:
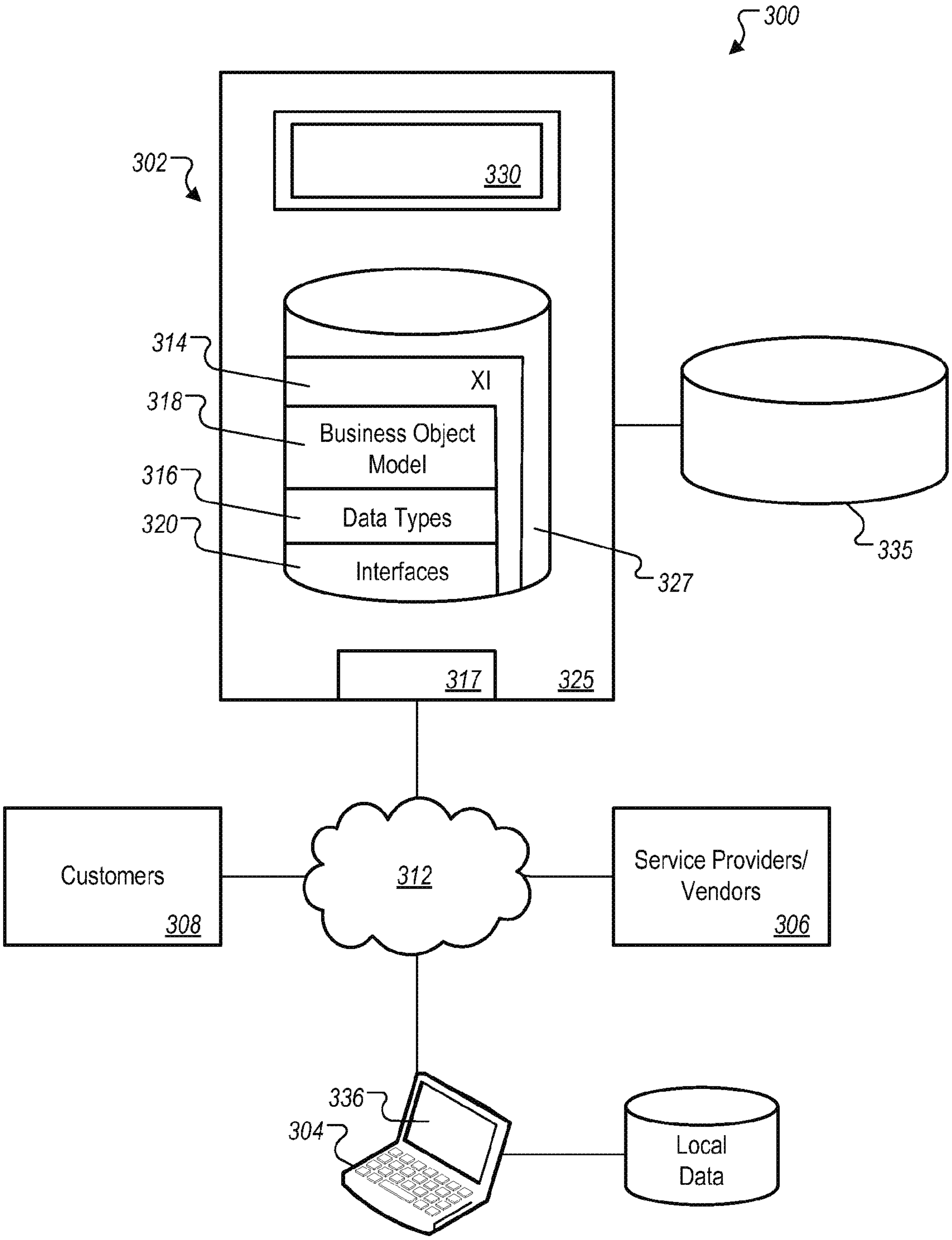
FIGS. 3A-B illustrate example environments implementing the transmission, receipt, and processing of data between heterogeneous applications in accordance with certain embodiments included in the present disclosure.

Turning to the illustrated embodiment in FIG. 3A, environment 300 includes or is communicably coupled (such as via a one-, bi- or multi-directional link or network) with server 302, one or more clients 304, one or more or vendors 306, one or more customers 308, at least some of which communicate across network 312. But, of course, this illustration is for example purposes only, and any distributed system or environment implementing one or more of the techniques described herein may be within the scope of this disclosure. Server 302 comprises an electronic computing device operable to receive, transmit, process and store data associated with environment 300. Generally, FIG. 3A provides merely one example of computers that may be used with the disclosure. Each computer is generally intended to encompass any suitable processing device. For example, although FIG. 3A illustrates one server 302 that may be used with the disclosure, environment 300 can be implemented using computers other than servers, as well as a server pool. Indeed, server 302 may be any computer or processing device such as, for example, a blade server, general-purpose personal computer (PC), Macintosh, workstation, Unix-based computer, or any other suitable device. In other words, the present disclosure contemplates computers other than general purpose computers as well as computers without conventional operating systems. Server 302 may be adapted to execute any operating system including Linux, UNIX, Windows Server, or any other suitable operating system. According to one embodiment, server 302 may also include or be communicably coupled with a web server and/or a mail server.

As illustrated (but not required), the server 302 is communicably coupled with a relatively remote repository 335 over a portion of the network 312. The repository 335 is any electronic storage facility, data processing center, or archive that may supplement or replace local memory (such as 327). The repository 335 may be a central database communicably coupled with the one or more servers 302 and the clients 304 via a virtual private network (VPN), SSH (Secure Shell) tunnel, or other secure network connection. The repository 335 may be physically or logically located at any appropriate location including in one of the example enterprises or offshore, so long as it remains operable to store information associated with the environment 300 and communicate such data to the server 302 or at least a subset of plurality of the clients 304.

Illustrated server 302 includes local memory 327. Memory 327 may include any memory or database module and may take the form of volatile or non-volatile memory including, without limitation, magnetic media, optical media, random access memory (RAM), read-only memory (ROM), removable media, or any other suitable local or remote memory component. Illustrated memory 327 includes an exchange infrastructure ("XI") 314, which is an infrastructure that supports the technical interaction of business processes across heterogeneous system environments. XI 314 centralizes the communication between components within a business entity and between different business entities. When appropriate, XI 314 carries out the mapping between the messages. XI 314 integrates different versions of systems implemented on different platforms (e.g., Java and ABAP). XI 314 is based on an open architecture, and makes use of open standards, such as eXtensible Markup Language (XML)™ and Java environments. XI 314 offers services that are useful in a heterogeneous and complex system landscape. In particular, XI 314 offers a runtime infrastructure for message exchange, configuration options for managing business processes and message flow, and options for transforming message contents between sender and receiver systems.

XI 314 stores data types 316, a business object model 318, and interfaces 320. The details regarding the business object model are described below. Data types 316 are the building blocks for the business object model 318. The business object model 318 is used to derive consistent interfaces 320. XI 314 allows for the exchange of information from a first company having one computer system to a second company having a second computer system over network 312 by using the standardized interfaces 320.

While not illustrated, memory 327 may also include business objects and any other appropriate data such as services, interfaces, VPN applications or services, firewall policies, a security or access log, print or other reporting files, HTML files or templates, data classes or object interfaces, child software applications or sub-systems, and others. This stored data may be stored in one or more logical or physical repositories. In some embodiments, the stored data (or pointers thereto) may be stored in one or more tables in a relational database described in terms of SQL statements or scripts. In the same or other embodiments, the stored data may also be formatted, stored, or defined as various data structures in text files, XML documents, Virtual Storage Access Method (VSAM) files, flat files, Btrieve files, comma-separated-value (CSV) files, internal variables, or one or more libraries. For example, a particular data service record may merely be a pointer to a particular piece of third party software stored remotely. In another example, a particular data service may be an internally stored software object usable by authenticated customers or internal development. In short, the stored data may comprise one table or file or a plurality of tables or files stored on one computer or across a plurality of computers in any appropriate format. Indeed, some or all of the stored data may be local or remote without departing from the scope of this disclosure and store any type of appropriate data.

Server 302 also includes processor 325. Processor 325 executes instructions and manipulates data to perform the operations of server 302 such as, for example, a central processing unit (CPU), a blade, an application specific integrated circuit (ASIC), or a field-programmable gate array (FPGA). Although FIG. 3A illustrates a single processor 325 in server 302, multiple processors 325 may be used according to particular needs and reference to processor 325 is meant to include multiple processors 325 where applicable. In the illustrated embodiment, processor 325 executes at least business application 330.

Figure 4:
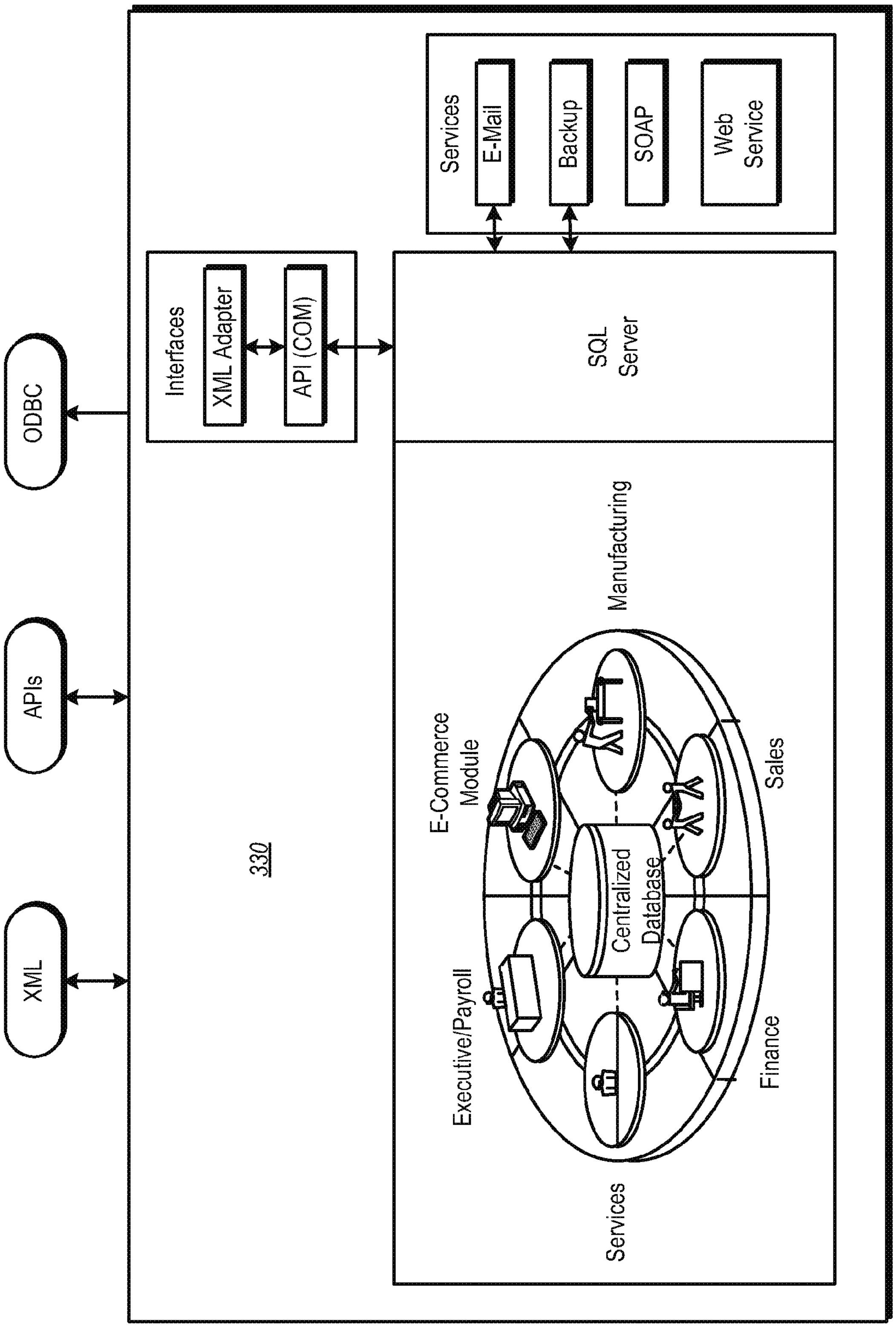
FIG. 4 illustrates an example application implementing certain techniques and components in accordance with one embodiment of the system of FIG. 1.

At a high level, business application 330 is any application, program, module, process, or other software that utilizes or facilitates the exchange of information via messages (or services) or the use of business objects. For example, application 330 may implement, utilize or otherwise leverage an enterprise service-oriented architecture (enterprise SOA), which may be considered a blueprint for an adaptable, flexible, and open IT architecture for developing services-based, enterprise-scale business solutions. This example enterprise service may be a series of web services combined with business logic that can be accessed and used repeatedly to support a particular business process. Aggregating web services into business-level enterprise services helps provide a more meaningful foundation for the task of automating enterprise-scale business scenarios Put simply, enterprise services help provide a holistic combination of actions that are semantically linked to complete the specific task, no matter how many cross-applications are involved. In certain cases, environment 300 may implement a composite application 330, as described below in FIG. 4. Regardless of the particular implementation, "software" may include software, firmware, wired or programmed hardware, or any combination thereof as appropriate. Indeed, application 330 may be written or described in any appropriate computer language including C, C++, Java, Visual Basic, assembler, Perl, any suitable version of 4GL, as well as others. For example, returning to the above mentioned composite application, the composite application portions may be implemented as Enterprise Java Beans (EJBs) or the design-time components may have the ability to generate run-time implementations into different platforms, such as J2EE (Java 2 Platform, Enterprise Edition), ABAP (Advanced Business Application Programming) objects, or Microsoft's .NET. It will be understood that while application 330 is illustrated in FIG. 4 as including various sub-modules, application 330 may include numerous other sub-modules or may instead be a single multi-tasked module that implements the various features and functionality through various objects, methods, or other processes. Further, while illustrated as internal to server 302, one or more processes associated with application 330 may be stored, referenced, or executed remotely. For example, a portion of application 330 may be a web service that is remotely called, while another portion of application 330 may be an interface object bundled for processing at remote client 304. Moreover, application 330 may be a child or sub-module of another software module or enterprise application (not illustrated) without departing from the scope of this disclosure. Indeed, application 330 may be a hosted solution that allows multiple related or third parties in different portions of the process to perform the respective processing.

More specifically, as illustrated in FIG. 4, application 330 may be a composite application, or an application built on other applications, that includes an object access layer (OAL) and a service layer. In this example, application 330 may execute or provide a number of application services, such as customer relationship management (CRM) systems, human resources management (HRM) systems, financial management (FM) systems, project management (PM) systems, knowledge management (KM) systems, and electronic file and mail systems. Such an object access layer is operable to exchange data with a plurality of enterprise base systems and to present the data to a composite application through a uniform interface. The example service layer is operable to provide services to the composite application. These layers may help the composite application to orchestrate a business process in synchronization with other existing processes (e.g., native processes of enterprise base systems) and leverage existing investments in the IT platform. Further, composite application 330 may run on a heterogeneous IT platform. In doing so, composite application may be cross-functional in that it may drive business processes across different applications, technologies, and organizations. Accordingly, composite application 330 may drive end-to-end business processes across heterogeneous systems or sub-systems. Application 330 may also include or be coupled with a persistence layer and one or more application system connectors. Such application system connectors enable data exchange and integration with enterprise sub-systems and may include an Enterprise Connector (EC) interface, an Internet Communication Manager/Internet Communication Framework (ICM/ICF) interface, an Encapsulated PostScript (EPS) interface, and/or other interfaces that provide Remote Function Call (RFC) capability. It will be understood that while this example describes a composite application 330, it may instead be a standalone or (relatively) simple software program. Regardless, application 330 may also perform processing automatically, which may indicate that the appropriate processing is substantially performed by at least one component of environment 300. It should be understood that automatically further contemplates any suitable administrator or other user interaction with application 330 or other components of environment 300 without departing from the scope of this disclosure.

Returning to FIG. 3A, illustrated server 302 may also include interface 317 for communicating with other computer systems, such as clients 304, over network 312 in a client-server or other distributed environment. In certain embodiments, server 302 receives data from internal or external senders through interface 317 for storage in memory 327, for storage in DB 335, and/or processing by processor 325. Generally, interface 317 comprises logic encoded in software and/or hardware in a suitable combination and operable to communicate with network 312. More specifically, interface 317 may comprise software supporting one or more communications protocols associated with communications network 312 or hardware operable to communicate physical signals.

Network 312 facilitates wireless or wireline communication between computer server 302 and any other local or remote computer, such as clients 304. Network 312 may be all or a portion of an enterprise or secured network. In another example, network 312 may be a VPN merely between server 302 and client 304 across wireline or wireless link. Such an example wireless link may be via 802.11a, 802.11b, 802.11g, 802.20, WiMax, and many others. While illustrated as a single or continuous network, network 312 may be logically divided into various sub-nets or virtual networks without departing from the scope of this disclosure, so long as at least portion of network 312 may facilitate communications between server 302 and at least one client 304. For example, server 302 may be communicably coupled to one or more "local" repositories through one sub-net while communicably coupled to a particular client 304 or "remote" repositories through another. In other words, network 312 encompasses any internal or external network, networks, sub-network, or combination thereof operable to facilitate communications between various computing components in environment 300. Network 312 may communicate, for example, Internet Protocol (IP) packets, Frame Relay frames, Asynchronous Transfer Mode (ATM) cells, voice, video, data, and other suitable information between network addresses. Network 312 may include one or more local area networks (LANs), radio access networks (RANs), metropolitan area networks (MANs), wide area networks (WANs), all or a portion of the global computer network known as the Internet, and/or any other communication system or systems at one or more locations. In certain embodiments, network 312 may be a secure network associated with the enterprise and certain local or remote vendors 306 and customers 308. As used in this disclosure, customer 308 is any person, department, organization, small business, enterprise, or any other entity that may use or request others to use environment 300. As described above, vendors 306 also may be local or remote to customer 308. Indeed, a particular vendor 306 may provide some content to business application 330, while receiving or purchasing other content (at the same or different times) as customer 308. As illustrated, customer 308 and vendor 06 each typically perform some processing (such as uploading or purchasing content) using a computer, such as client 304.

Client 304 is any computing device operable to connect or communicate with server 302 or network 312 using any communication link. For example, client 304 is intended to encompass a personal computer, touch screen terminal, workstation, network computer, kiosk, wireless data port, smart phone, personal data assistant (PDA), one or more processors within these or other devices, or any other suitable processing device used by or for the benefit of business 308, vendor 306, or some other user or entity. At a high level, each client 304 includes or executes at least GUI 336 and comprises an electronic computing device operable to receive, transmit, process and store any appropriate data associated with environment 300. It will be understood that there may be any number of clients 304 communicably coupled to server 302. Further, "client 304," "business," "business analyst," "end user," and "user" may be used interchangeably as appropriate without departing from the scope of this disclosure. Moreover, for ease of illustration, each client 304 is described in terms of being used by one user. But this disclosure contemplates that many users may use one computer or that one user may use multiple computers. For example, client 304 may be a PDA operable to wirelessly connect with external or unsecured network. In another example, client 304 may comprise a laptop that includes an input device, such as a keypad, touch screen, mouse, or other device that can accept information, and an output device that conveys information associated with the operation of server 302 or clients 304, including digital data, visual information, or GUI 336. Both the input device and output device may include fixed or removable storage media such as a magnetic computer disk, CD-ROM, or other suitable media to both receive input from and provide output to users of clients 304 through the display, namely the client portion of GUI or application interface 336.

GUI 336 comprises a graphical user interface operable to allow the user of client 304 to interface with at least a portion of environment 300 for any suitable purpose, such as viewing application or other transaction data. Generally, GUI 336 provides the particular user with an efficient and user-friendly presentation of data provided by or communicated within environment 300. For example, GUI 336 may present the user with the components and information that is relevant to their task, increase reuse of such components, and facilitate a sizable developer community around those components. GUI 336 may comprise a plurality of customizable frames or views having interactive fields, pull-down lists, and buttons operated by the user. For example, GUI 336 is operable to display data involving business objects and interfaces in a user-friendly form based on the user context and the displayed data. In another example, GUI 336 is operable to display different levels and types of information involving business objects and interfaces based on the identified or supplied user role. GUI 336 may also present a plurality of portals or dashboards. For example, GUI 336 may display a portal that allows users to view, create, and manage historical and real-time reports including role-based reporting and such. Of course, such reports may be in any appropriate output format including PDF, HTML, and printable text. Real-time dashboards often provide table and graph information on the current state of the data, which may be supplemented by business objects and interfaces. It should be understood that the term graphical user interface may be used in the singular or in the plural to describe one or more graphical user interfaces and each of the displays of a particular graphical user interface. Indeed, reference to GUI 336 may indicate a reference to the front-end or a component of business application 330, as well as the particular interface accessible via client 304, as appropriate, without departing from the scope of this disclosure. Therefore, GUI 336 contemplates any graphical user interface, such as a generic web browser or touchscreen, that processes information in environment 300 and efficiently presents the results to the user. Server 302 can accept data from client 304 via the web browser (e.g., Microsoft Internet Explorer or Netscape Navigator) and return the appropriate HTML or XML responses to the browser using network 312.

Figure 3B:
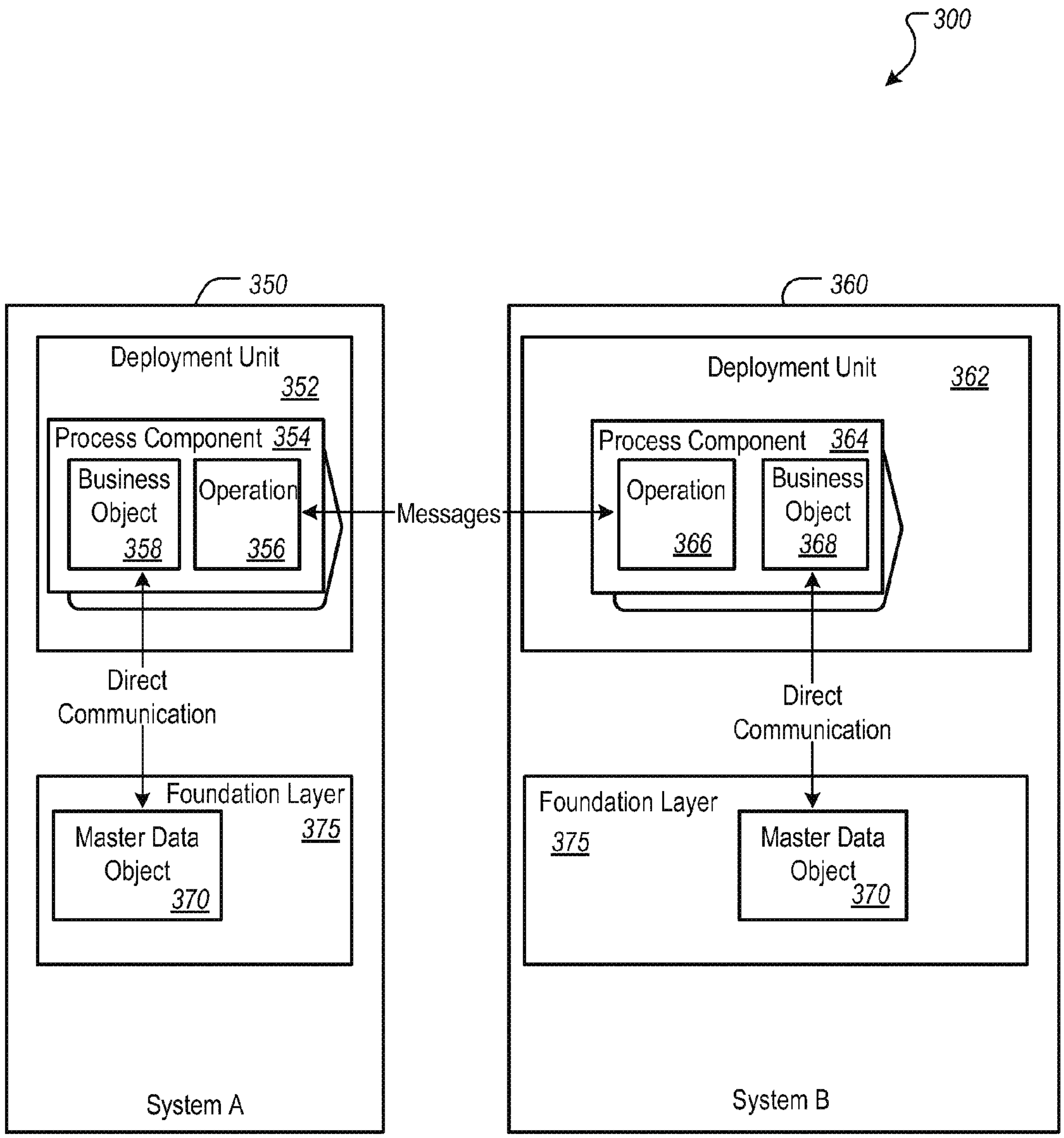

More generally in environment 300 as depicted in FIG. 3B, a Foundation Layer 375 can be deployed on multiple separate and distinct hardware platforms, e.g., System A 350 and System B 360, to support application software deployed as two or more deployment units distributed on the platforms, including deployment unit 352 deployed on System A and deployment unit 362 deployed on System B. In this example, the foundation layer can be used to support application software deployed in an application layer. In particular, the foundation layer can be used in connection with application software implemented in accordance with a software architecture that provides a suite of enterprise service operations having various application functionality. In some implementations, the application software is implemented to be deployed on an application platform that includes a foundation layer that contains all fundamental entities that can used from multiple deployment units. These entities can be process components, business objects, and reuse service components. A reuse service component is a piece of software that is reused in different transactions. A reuse service component is used by its defined interfaces, which can be, e.g., local APIs or service interfaces. As explained above, process components in separate deployment units interact through service operations, as illustrated by messages passing between service operations 356 and 366, which are implemented in process components 354 and 364, respectively, which are included in deployment units 352 and 362, respectively. As also explained above, some form of direct communication is generally the form of interaction used between a business object, e.g., business object 358 and 368, of an application deployment unit and a business object, such as master data object 370, of the Foundation Layer 375.

Various components of the present disclosure may be modeled using a model-driven environment. For example, the model-driven framework or environment may allow the developer to use simple drag-and-drop techniques to develop pattern-based or freestyle user interfaces and define the flow of data between them. The result could be an efficient, customized, visually rich online experience. In some cases, this model-driven development may accelerate the application development process and foster business-user self-service. It further enables business analysts or IT developers to compose visually rich applications that use analytic services, enterprise services, remote function calls (RFCs), APIs, and stored procedures. In addition, it may allow them to reuse existing applications and create content using a modeling process and a visual user interface instead of manual coding.

Figure 5A:
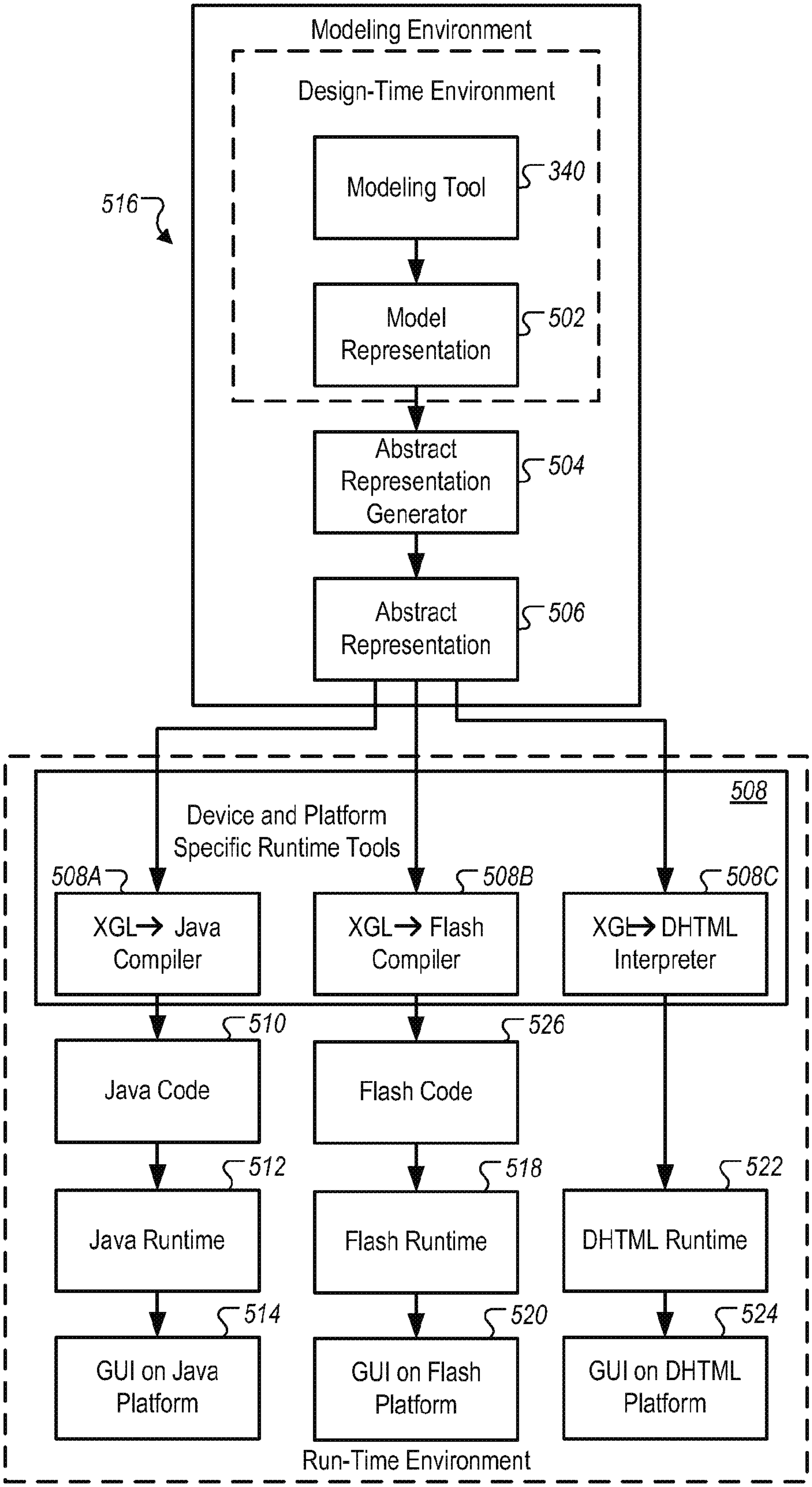
FIG. 5A depicts an example development environment in accordance with one embodiment of FIG. 1.

FIG. 5A depicts an example modeling environment 516, namely a modeling environment, in accordance with one embodiment of the present disclosure. Thus, as illustrated in FIG. 5A, such a modeling environment 516 may implement techniques for decoupling models created during design-time from the runtime environment. In other words, model representations for GUIs created in a design time environment are decoupled from the runtime environment in which the GUIs are executed. Often in these environments, a declarative and executable representation for GUIs for applications is provided that is independent of any particular runtime platform, GUI framework, device, or programming language.

According to some embodiments, a modeler (or other analyst) may use the model-driven modeling environment 516 to create pattern-based or freestyle user interfaces using simple drag-and-drop services. Because this development may be model-driven, the modeler can typically compose an application using models of business objects without having to write much, if any, code. In some cases, this example modeling environment 516 may provide a personalized, secure interface that helps unify enterprise applications, information, and processes into a coherent, role-based portal experience. Further, the modeling environment 516 may allow the developer to access and share information and applications in a collaborative environment. In this way, virtual collaboration rooms allow developers to work together efficiently, regardless of where they are located, and may enable powerful and immediate communication that crosses organizational boundaries while enforcing security requirements. Indeed, the modeling environment 516 may provide a shared set of services for finding, organizing, and accessing unstructured content stored in third-party repositories and content management systems across various networks 312. Classification tools may automate the organization of information, while subject-matter experts and content managers can publish information to distinct user audiences. Regardless of the particular implementation or architecture, this modeling environment 516 may allow the developer to easily model hosted business objects 140 using this model-driven approach.

In certain embodiments, the modeling environment 516 may implement or utilize a generic, declarative, and executable GUI language (generally described as XGL). This example XGL is generally independent of any particular GUI framework or runtime platform. Further, XGL is normally not dependent on characteristics of a target device on which the graphic user interface is to be displayed and may also be independent of any programming language. XGL is used to generate a generic representation (occasionally referred to as the XGL representation or XGL-compliant representation) for a design-time model representation. The XGL representation is thus typically a device-independent representation of a GUI. The XGL representation is declarative in that the representation does not depend on any particular GUI framework, runtime platform, device, or programming language. The XGL representation can be executable and therefore can unambiguously encapsulate execution semantics for the GUI described by a model representation. In short, models of different types can be transformed to XGL representations.

The XGL representation may be used for generating representations of various different GUIs and supports various GUI features including full windowing and componentization support, rich data visualizations and animations, rich modes of data entry and user interactions, and flexible connectivity to any complex application data services. While a specific embodiment of XGL is discussed, various other types of XGLs may also be used in alternative embodiments. In other words, it will be understood that XGL is used for example description only and may be read to include any abstract or modeling language that can be generic, declarative, and executable.

Turning to the illustrated embodiment in FIG. 5A, modeling tool 340 may be used by a GUI designer or business analyst during the application design phase to create a model representation 502 for a GUI application. It will be understood that modeling environment 516 may include or be compatible with various different modeling tools 340 used to generate model representation 502. This model representation 502 may be a machine-readable representation of an application or a domain specific model. Model representation 502 generally encapsulates various design parameters related to the GUI such as GUI components, dependencies between the GUI components, inputs and outputs, and the like. Put another way, model representation 502 provides a form in which the one or more models can be persisted and transported, and possibly handled by various tools such as code generators, runtime interpreters, analysis and validation tools, merge tools, and the like. In one embodiment, model representation 502 maybe a collection of XML documents with a well-formed syntax.

Illustrated modeling environment 516 also includes an abstract representation generator (or XGL generator) 504 operable to generate an abstract representation (for example, XGL representation or XGL-compliant representation) 506 based upon model representation 502. Abstract representation generator 504 takes model representation 502 as input and outputs abstract representation 506 for the model representation. Model representation 502 may include multiple instances of various forms or types depending on the tool/language used for the modeling. In certain cases, these various different model representations may each be mapped to one or more abstract representations 506. Different types of model representations may be transformed or mapped to XGL representations. For each type of model representation, mapping rules may be provided for mapping the model representation to the XGL representation 506. Different mapping rules may be provided for mapping a model representation to an XGL representation.

This XGL representation 506 that is created from a model representation may then be used for processing in the runtime environment. For example, the XGL representation 506 may be used to generate a machine-executable runtime GUI (or some other runtime representation) that may be executed by a target device. As part of the runtime processing, the XGL representation 506 may be transformed into one or more runtime representations, which may indicate source code in a particular programming language, machine-executable code for a specific runtime environment, executable GUI, and so forth, which may be generated for specific runtime environments and devices. Since the XGL representation 506, rather than the design-time model representation, is used by the runtime environment, the design-time model representation is decoupled from the runtime environment. The XGL representation 506 can thus serve as the common ground or interface between design-time user interface modeling tools and a plurality of user interface runtime frameworks. It provides a self-contained, closed, and deterministic definition of all aspects of a graphical user interface in a device-independent and programming-language independent manner. Accordingly, abstract representation 506 generated for a model representation 502 is generally declarative and executable in that it provides a representation of the GUI of model representation 502 that is not dependent on any device or runtime platform, is not dependent on any programming language, and unambiguously encapsulates execution semantics for the GUI. The execution semantics may include, for example, identification of various components of the GUI, interpretation of connections between the various GUI components, information identifying the order of sequencing of events, rules governing dynamic behavior of the GUI, rules governing handling of values by the GUI, and the like. The abstract representation 506 is also not GUI runtime-platform specific. The abstract representation 506 provides a self-contained, closed, and deterministic definition of all aspects of a graphical user interface that is device independent and language independent.

Abstract representation 506 is such that the appearance and execution semantics of a GUI generated from the XGL representation work consistently on different target devices irrespective of the GUI capabilities of the target device and the target device platform. For example, the same XGL representation may be mapped to appropriate GUIs on devices of differing levels of GUI complexity (i.e., the same abstract representation may be used to generate a GUI for devices that support simple GUIs and for devices that can support complex GUIs), the GUI generated by the devices are consistent with each other in their appearance and behavior.

Abstract representation generator 504 may be configured to generate abstract representation 506 for models of different types, which may be created using different modeling tools 340. It will be understood that modeling environment 516 may include some, none, or other sub-modules or components as those shown in this example illustration. In other words, modeling environment 516 encompasses the design-time environment (with or without the abstract generator or the various representations), a modeling toolkit (such as 340) linked with a developer's space, or any other appropriate software operable to decouple models created during design-time from the runtime environment. Abstract representation 506 provides an interface between the design time environment and the runtime environment. As shown, this abstract representation 506 may then be used by runtime processing.

As part of runtime processing, modeling environment 516 may include various runtime tools 508 and may generate different types of runtime representations based upon the abstract representation 506. Examples of runtime representations include device or language-dependent (or specific) source code, runtime platform-specific machine-readable code, GUIs for a particular target device, and the like. The runtime tools 508 may include compilers, interpreters, source code generators, and other such tools that are configured to generate runtime platform-specific or target device-specific runtime representations of abstract representation 506. The runtime tool 508 may generate the runtime representation from abstract representation 506 using specific rules that map abstract representation 506 to a particular type of runtime representation. These mapping rules may be dependent on the type of runtime tool, characteristics of the target device to be used for displaying the GUI, runtime platform, and/or other factors. Accordingly, mapping rules may be provided for transforming the abstract representation 506 to any number of target runtime representations directed to one or more target GUI runtime platforms. For example, XGL-compliant code generators may conform to semantics of XGL, as described below. XGL-compliant code generators may ensure that the appearance and behavior of the generated user interfaces is preserved across a plurality of target GUI frameworks, while accommodating the differences in the intrinsic characteristics of each and also accommodating the different levels of capability of target devices.

For example, as depicted in example FIG. 5A, an XGL-to-Java compiler 508A may take abstract representation 506 as input and generate Java code 510 for execution by a target device comprising a Java runtime 512. Java runtime 512 may execute Java code 510 to generate or display a GUI 514 on a Java-platform target device. As another example, an XGL-to-Flash compiler 508B may take abstract representation 506 as input and generate Flash code 526 for execution by a target device comprising a Flash runtime 518. Flash runtime 518 may execute Flash code 516 to generate or display a GUI 520 on a target device comprising a Flash platform. As another example, an XGL-to-DHTML (dynamic HTML) interpreter 508C may take abstract representation 506 as input and generate DHTML statements (instructions) on the fly which are then interpreted by a DHTML runtime 522 to generate or display a GUI 524 on a target device comprising a DHTML platform.

It should be apparent that abstract representation 506 may be used to generate GUIs for Extensible Application Markup Language (XAML) or various other runtime platforms and devices. The same abstract representation 506 may be mapped to various runtime representations and device-specific and runtime platform-specific GUIs. In general, in the runtime environment, machine executable instructions specific to a runtime environment may be generated based upon the abstract representation 506 and executed to generate a GUI in the runtime environment. The same XGL representation may be used to generate machine executable instructions specific to different runtime environments and target devices.

According to certain embodiments, the process of mapping a model representation 502 to an abstract representation 506 and mapping an abstract representation 506 to some runtime representation may be automated. For example, design tools may automatically generate an abstract representation for the model representation using XGL and then use the XGL abstract representation to generate GUIs that are customized for specific runtime environments and devices. As previously indicated, mapping rules may be provided for mapping model representations to an XGL representation. Mapping rules may also be provided for mapping an XGL representation to a runtime platform-specific representation.

Since the runtime environment uses abstract representation 506 rather than model representation 502 for runtime processing, the model representation 502 that is created during design-time is decoupled from the runtime environment. Abstract representation 506 thus provides an interface between the modeling environment and the runtime environment. As a result, changes may be made to the design time environment, including changes to model representation 502 or changes that affect model representation 502, generally to not substantially affect or impact the runtime environment or tools used by the runtime environment. Likewise, changes may be made to the runtime environment generally to not substantially affect or impact the design time environment. A designer or other developer can thus concentrate on the design aspects and make changes to the design without having to worry about the runtime dependencies such as the target device platform or programming language dependencies.

Figure 5B:
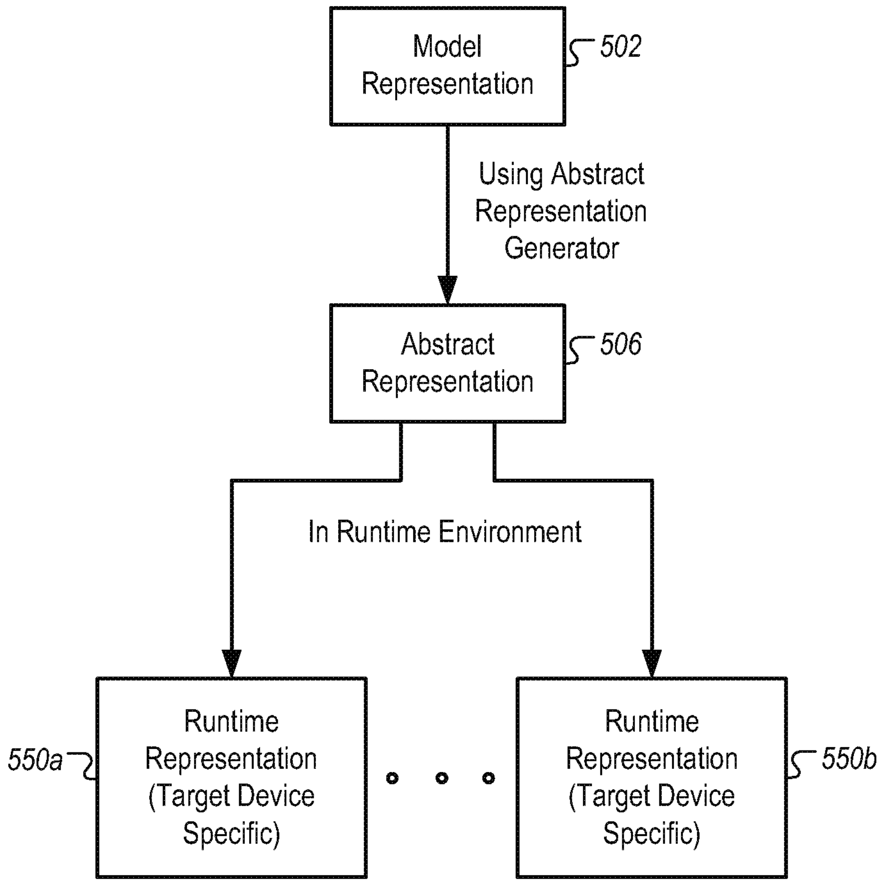
FIG. 5B depicts a simplified process for mapping a model representation to a runtime representation using the example development environment of FIG. 5A or some other development environment.

FIG. 5B depicts an example process for mapping a model representation 502 to a runtime representation using the example modeling environment 516 of FIG. 5A or some other modeling environment. Model representation 502 may comprise one or more model components and associated properties that describe a data object, such as hosted business objects and interfaces. As described above, at least one of these model components is based on or otherwise associated with these hosted business objects and interfaces. The abstract representation 506 is generated based upon model representation 502. Abstract representation 506 may be generated by the abstract representation generator 504. Abstract representation 506 comprises one or more abstract GUI components and properties associated with the abstract GUI components. As part of generation of abstract representation 506, the model GUI components and their associated properties from the model representation are mapped to abstract GUI components and properties associated with the abstract GUI components. Various mapping rules may be provided to facilitate the mapping. The abstract representation encapsulates both appearance and behavior of a GUI. Therefore, by mapping model components to abstract components, the abstract representation not only specifies the visual appearance of the GUI but also the behavior of the GUI, such as in response to events whether clicking/dragging or scrolling, interactions between GUI components and such.

One or more runtime representations 550*a*, including GUIs for specific runtime environment platforms, may be generated from abstract representation 506. A device-dependent runtime representation may be generated for a particular type of target device platform to be used for executing and displaying the GUI encapsulated by the abstract representation. The GUIs generated from abstract representation 506 may comprise various types of GUI elements such as buttons, windows, scrollbars, input boxes, etc. Rules may be provided for mapping an abstract representation to a particular runtime representation. Various mapping rules may be provided for different runtime environment platforms.

Methods and systems consistent with the subject matter described herein provide and use interfaces 320 derived from the business object model 318 suitable for use with more than one business area, for example different departments within a company such as finance, or marketing. Also, they are suitable across industries and across businesses. Interfaces 320 are used during an end-to-end business transaction to transfer business process information in an application-independent manner. For example the interfaces can be used for fulfilling a sales order.

1. Message Overview

To perform an end-to-end business transaction, consistent interfaces are used to create business documents that are sent within messages between heterogeneous programs or modules.

a) Message Categories

Figure 6:
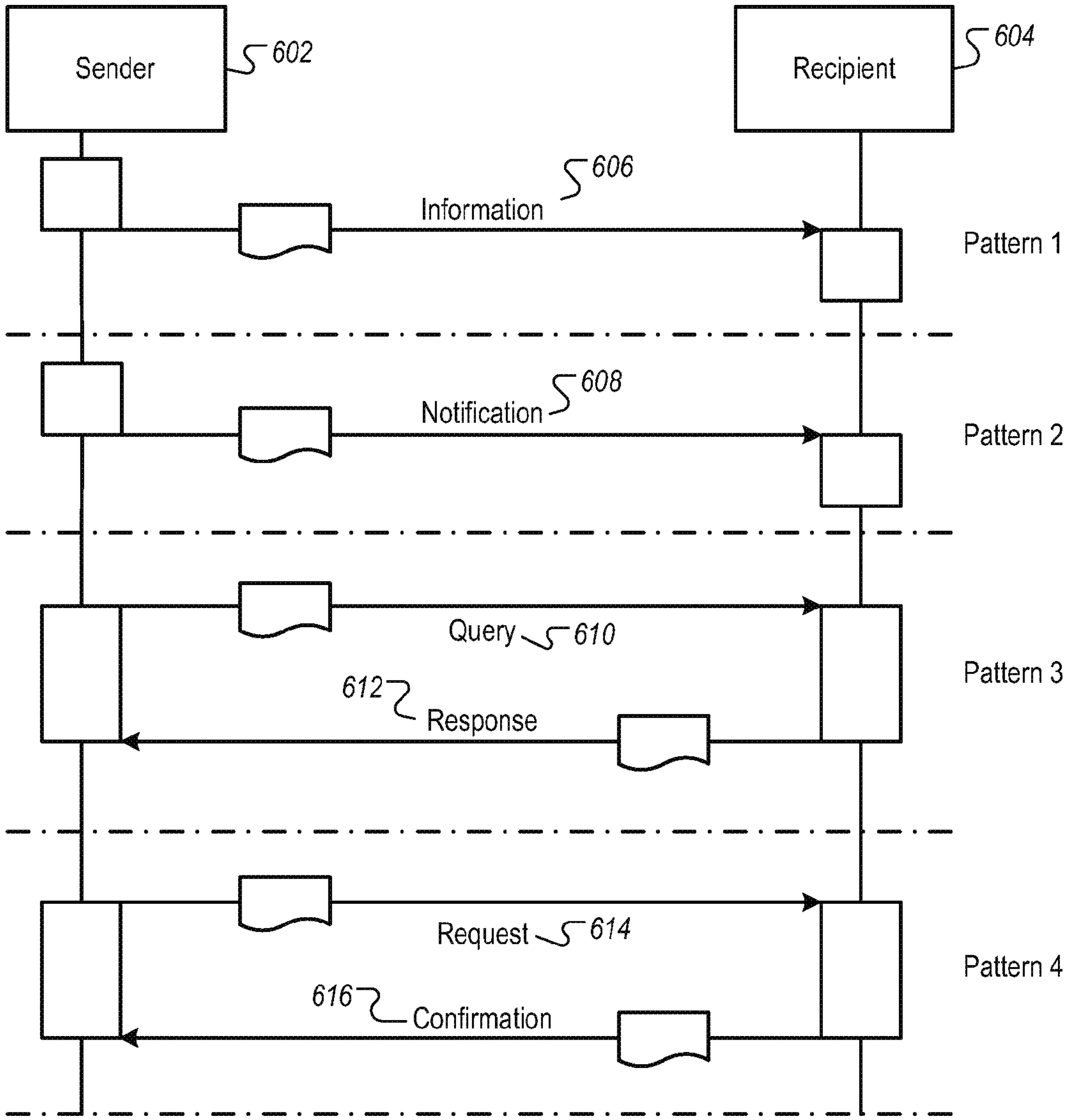
FIG. 6 depicts message categories in accordance with methods and systems consistent with the subject matter described herein.

As depicted in FIG. 6, the communication between a sender 602 and a recipient 604 can be broken down into basic categories that describe the type of the information exchanged and simultaneously suggest the anticipated reaction of the recipient 604. A message category is a general business classification for the messages. Communication is sender-driven. In other words, the meaning of the message categories is established or formulated from the perspective of the sender 602. The message categories include information 606, notification 608, query 610, response 612, request 614, and confirmation 616.

(1) Information

Information 606 is a message sent from a sender 602 to a recipient 604 concerning a condition or a statement of affairs. No reply to information is expected. Information 606 is sent to make business partners or business applications aware of a situation. Information 606 is not compiled to be application-specific. Examples of "information" are an announcement, advertising, a report, planning information, and a message to the business warehouse.

(2) Notification

A notification 608 is a notice or message that is geared to a service. A sender 602 sends the notification 608 to a recipient 604. No reply is expected for a notification. For example, a billing notification relates to the preparation of an invoice while a dispatched delivery notification relates to preparation for receipt of goods.

(3) Query

A query 610 is a question from a sender 602 to a recipient 604 to which a response 612 is expected. A query 610 implies no assurance or obligation on the part of the sender 602. Examples of a query 610 are whether space is available on a specific flight or whether a specific product is available. These queries do not express the desire for reserving the flight or purchasing the product.

(4) Response

A response 612 is a reply to a query 610. The recipient 604 sends the response 612 to the sender 602. A response 612 generally implies no assurance or obligation on the part of the recipient 604. The sender 602 is not expected to reply. Instead, the process is concluded with the response 612. Depending on the business scenario, a response 612 also may include a commitment, i.e., an assurance or obligation on the part of the recipient 604. Examples of responses 612 are a response stating that space is available on a specific flight or that a specific product is available. With these responses, no reservation was made.

(5) Request

A request 614 is a binding requisition or requirement from a sender 602 to a recipient 604. Depending on the business scenario, the recipient 604 can respond to a request 614 with a confirmation 616. The request 614 is binding on the sender 602. In making the request 614, the sender 602 assumes, for example, an obligation to accept the services rendered in the request 614 under the reported conditions. Examples of a request 614 are a parking ticket, a purchase order, an order for delivery and a job application.

(6) Confirmation

A confirmation 616 is a binding reply that is generally made to a request 614. The recipient 604 sends the confirmation 616 to the sender 602. The information indicated in a confirmation 616, such as deadlines, products, quantities and prices, can deviate from the information of the preceding request 614. A request 614 and confirmation 616 may be used in negotiating processes. A negotiating process can consist of a series of several request 614 and confirmation 616 messages. The confirmation 616 is binding on the recipient 604. For example, 100 units of X may be ordered in a purchase order request; however, only the delivery of 80 units is confirmed in the associated purchase order confirmation.

b) Message Choreography

A message choreography is a template that specifies the sequence of messages between business entities during a given transaction. The sequence with the messages contained in it describes in general the message "lifecycle" as it proceeds between the business entities. If messages from a choreography are used in a business transaction, they appear in the transaction in the sequence determined by the choreography. This illustrates the template character of a choreography, i.e., during an actual transaction, it is not necessary for all messages of the choreography to appear. Those messages that are contained in the transaction, however, follow the sequence within the choreography. A business transaction is thus a derivation of a message choreography. The choreography makes it possible to determine the structure of the individual message types more precisely and distinguish them from one another.

2. Components of the Business Object Model

The overall structure of the business object model ensures the consistency of the interfaces that are derived from the business object model. The derivation ensures that the same business-related subject matter or concept is represented and structured in the same way in all interfaces.

The business object model defines the business-related concepts at a central location for a number of business transactions. In other words, it reflects the decisions made about modeling the business entities of the real world acting in business transactions across industries and business areas. The business object model is defined by the business objects and their relationship to each other (the overall net structure).

Each business object is generally a capsule with an internal hierarchical structure, behavior offered by its operations, and integrity constraints. Business objects are semantically disjoint, i.e., the same business information is represented once. In the business object model, the business objects are arranged in an ordering framework. From left to right, they are arranged according to their existence dependency to each other. For example, the customizing elements may be arranged on the left side of the business object model, the strategic elements may be arranged in the center of the business object model, and the operative elements may be arranged on the right side of the business object model. Similarly, the business objects are arranged from the top to the bottom based on defined order of the business areas, e.g., finance could be arranged at the top of the business object model with CRM below finance and SRM below CRM.

To ensure the consistency of interfaces, the business object model may be built using standardized data types as well as packages to group related elements together, and package templates and entity templates to specify the arrangement of packages and entities within the structure.

a) Data Types

Data types are used to type object entities and interfaces with a structure. This typing can include business semantic. Such data types may include those generally described at pages 96 through 1642 (which are incorporated by reference herein) of U.S. patent application Ser. No. 11/803,178, filed on May 11, 2007 and entitled "Consistent Set Of Interfaces Derived From A Business Object Model". For example, the data type BusinessTransactionDocumentID is a unique identifier for a document in a business transaction. Also, as an example, Data type BusinessTransactionDocumentParty contains the information that is exchanged in business documents about a party involved in a business transaction, and includes the party's identity, the party's address, the party's contact person and the contact person's address. BusinessTransactionDocumentParty also includes the role of the party, e.g., a buyer, seller, product recipient, or vendor.

The data types are based on Core Component Types ("CCTs"), which themselves are based on the World Wide Web Consortium ("W3C") data types. "Global" data types represent a business situation that is described by a fixed structure. Global data types include both context-neutral generic data types ("GDTs") and context-based context data types ("CDTs"). GDTs contain business semantics, but are application-neutral, i.e., without context. CDTs, on the other hand, are based on GDTs and form either a use-specific view of the GDTs, or a context-specific assembly of GDTs or CDTs. A message is typically constructed with reference to a use and is thus a use-specific assembly of GDTs and CDTs. The data types can be aggregated to complex data types.

To achieve a harmonization across business objects and interfaces, the same subject matter is typed with the same data type. For example, the data type "GeoCoordinates" is built using the data type "Measure" so that the measures in a GeoCoordinate (i.e., the latitude measure and the longitude measure) are represented the same as other "Measures" that appear in the business object model.

b) Entities

Entities are discrete business elements that are used during a business transaction. Entities are not to be confused with business entities or the components that interact to perform a transaction. Rather, "entities" are one of the layers of the business object model and the interfaces. For example, a Catalogue entity is used in a Catalogue Publication Request and a Purchase Order is used in a Purchase Order Request. These entities are created using the data types defined above to ensure the consistent representation of data throughout the entities.

c) Packages

Packages group the entities in the business object model and the resulting interfaces into groups of semantically associated information. Packages also may include "sub"-packages, i.e., the packages may be nested.

Figure 7:
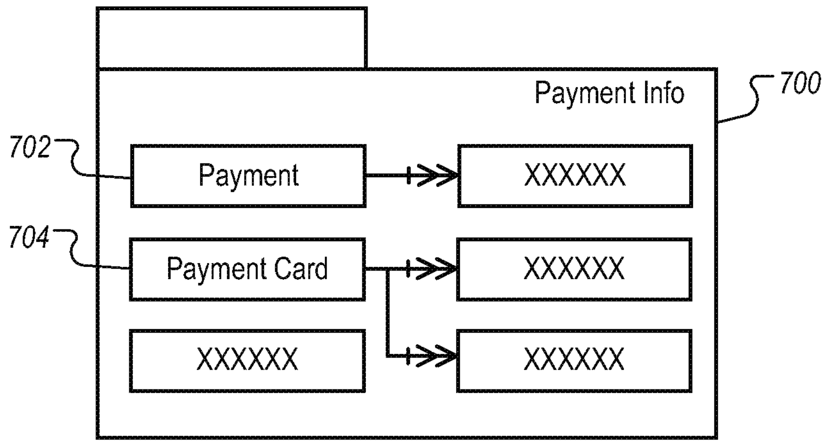
FIG. 7 depicts an example of a package in accordance with methods and systems consistent with the subject matter described herein.

Packages may group elements together based on different factors, such as elements that occur together as a rule with regard to a business-related aspect. For example, as depicted in FIG. 7, in a Purchase Order, different information regarding the purchase order, such as the type of payment 702, and payment card 704, are grouped together via the PaymentInformation package 700.

Figure 8:
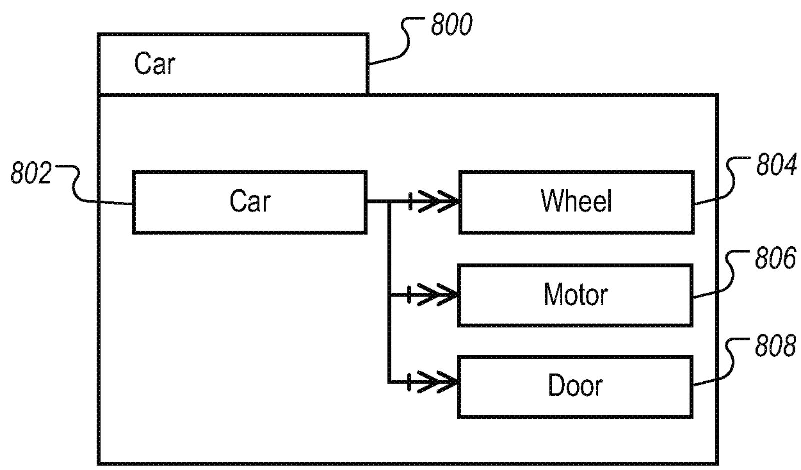
FIG. 8 depicts another example of a package in accordance with methods and systems consistent with the subject matter described herein.

Packages also may combine different components that result in a new object. For example, as depicted in FIG. 8, the components wheels 804, motor 806, and doors 808 are combined to form a composition "Car" 802. The "Car" package 800 includes the wheels, motor and doors as well as the composition "Car."

Figure 9:
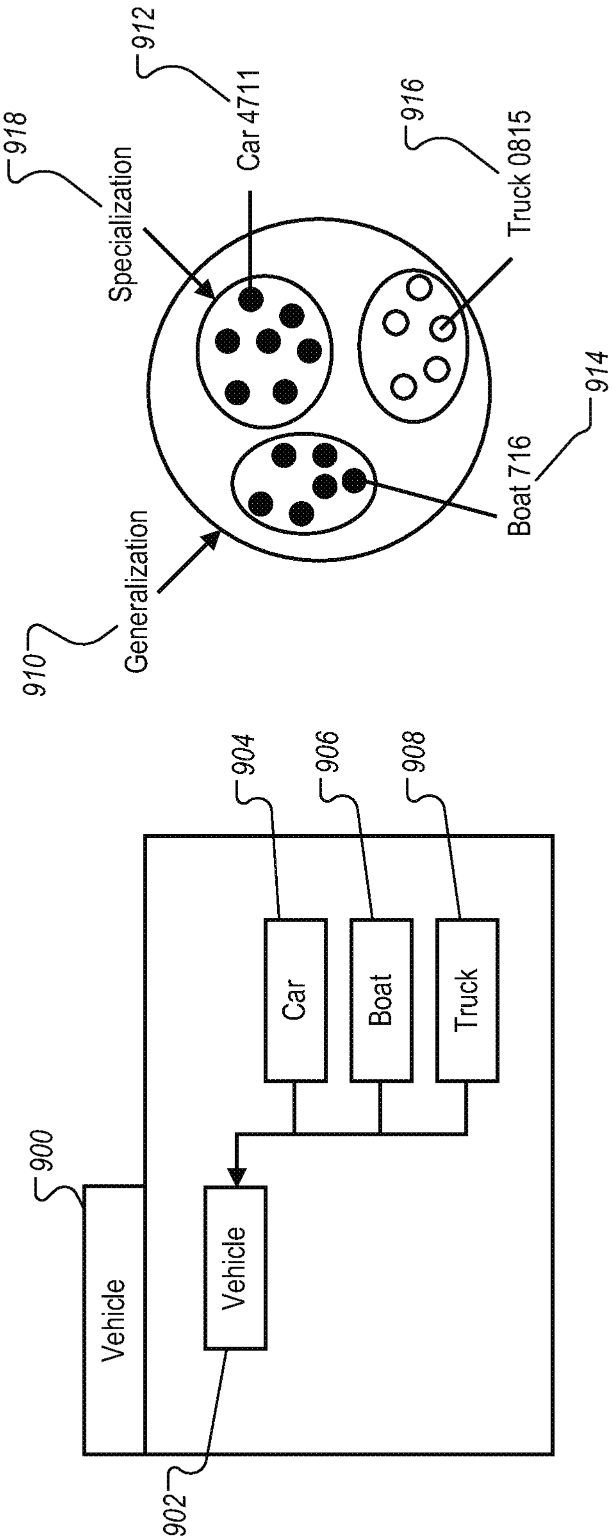
FIG. 9 depicts a third example of a package in accordance with methods and systems consistent with the subject matter described herein.

Another grouping within a package may be subtypes within a type. In these packages, the components are specialized forms of a generic package. For example, as depicted in FIG. 9, the components Car 904, Boat 906, and Truck 908 can be generalized by the generic term Vehicle 902 in Vehicle package 900. Vehicle in this case is the generic package 910, while Car 912, Boat 914, and Truck 916 are the specializations 918 of the generalized vehicle 910.

Figure 10:
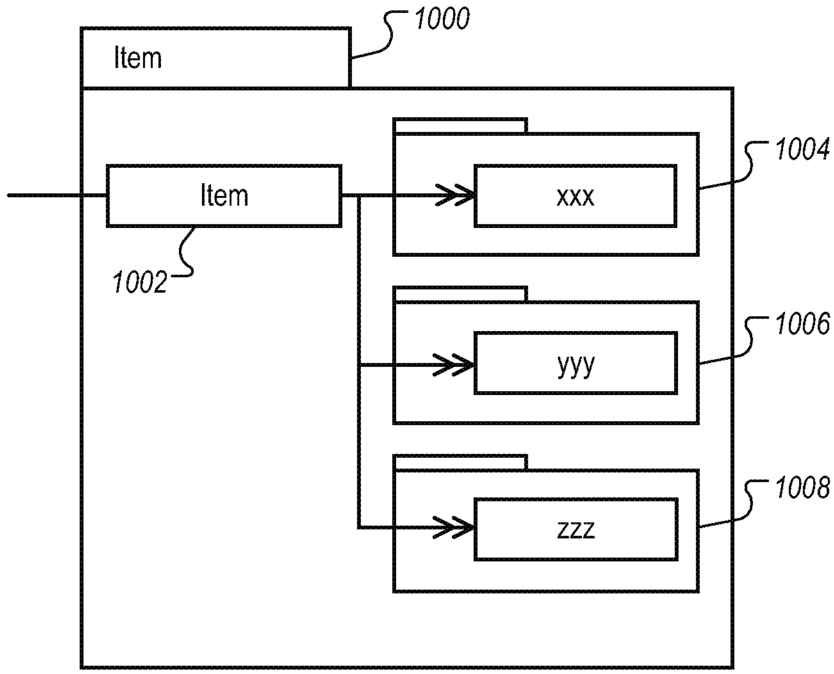
FIG. 10 depicts a fourth example of a package in accordance with methods and systems consistent with the subject matter described herein.

Packages also may be used to represent hierarchy levels. For example, as depicted in FIG. 10, the Item Package 1000 includes Item 1002 with subitem xxx 1004, subitem yyy 1006, and subitem zzz 1008.

Figure 11:
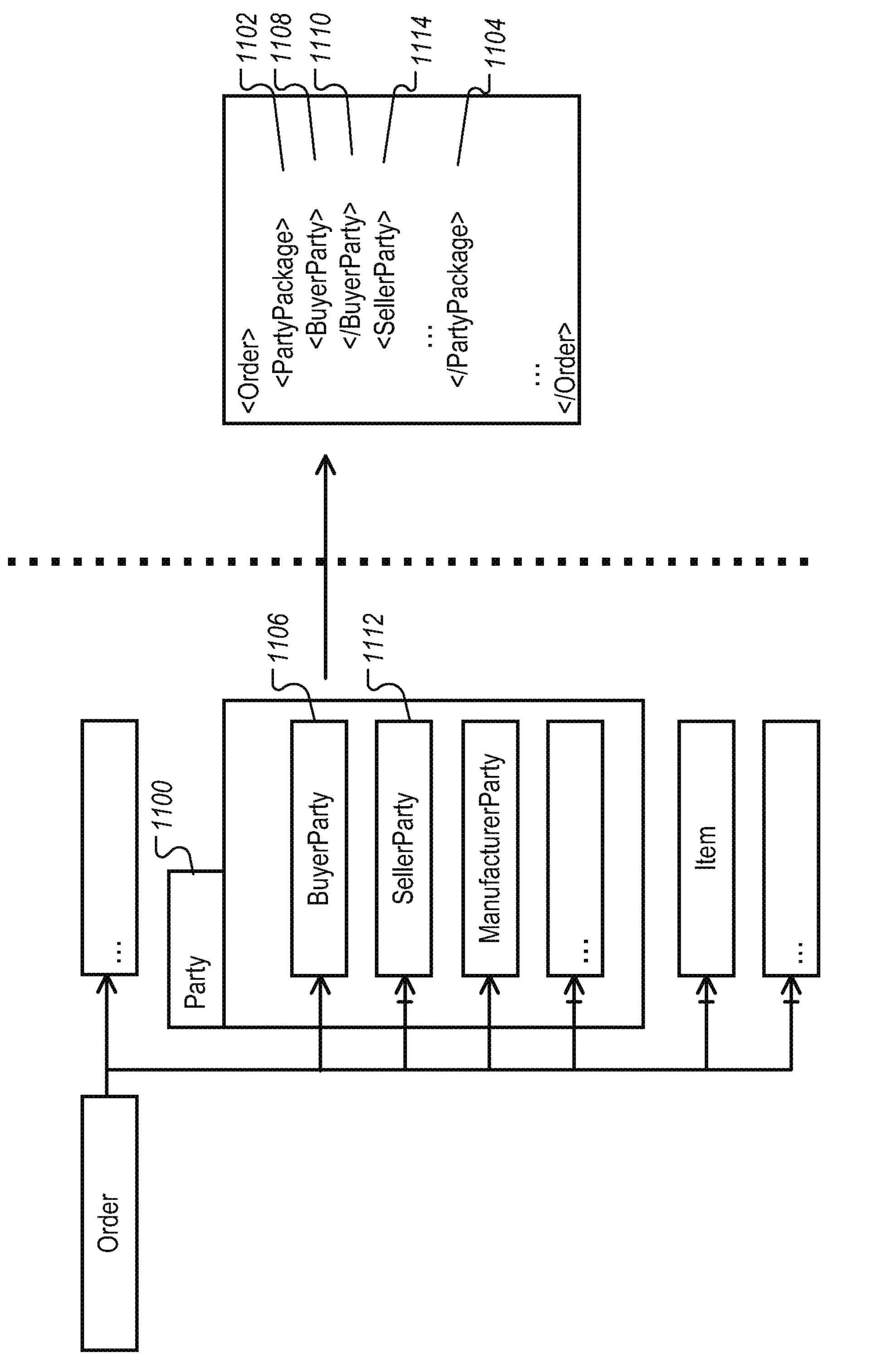
FIG. 11 depicts the representation of a package in the XML schema in accordance with methods and systems consistent with the subject matter described herein.

Packages can be represented in the XML schema as a comment. One advantage of this grouping is that the document structure is easier to read and is more understandable. The names of these packages are assigned by including the object name in brackets with the suffix "Package." For example, as depicted in FIG. 11, Party package 1100 is enclosed by <PartyPackage> 1102 and </PartyPackage> 1104. Party package 1100 illustratively includes a Buyer Party 1106, identified by <BuyerParty> 1108 and </BuyerParty> 1110, and a Seller Party 1112, identified by <SellerParty> 1114 and </SellerParty>, etc.

d) Relationships

Relationships describe the interdependencies of the entities in the business object model, and are thus an integral part of the business object model.

(1) Cardinality of Relationships

Figure 12:
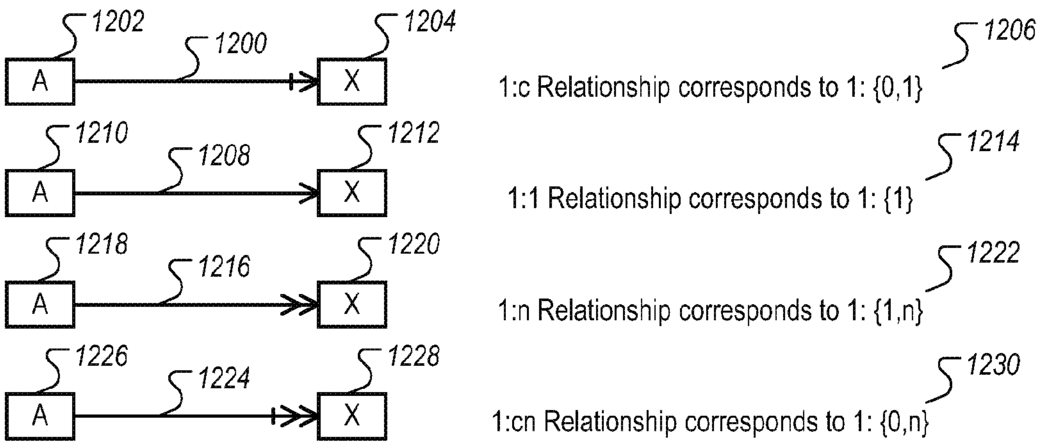
FIG. 12 depicts a graphical representation of cardinalities between two entities in accordance with methods and systems consistent with the subject matter described herein.

FIG. 12 depicts a graphical representation of the cardinalities between two entities. The cardinality between a first entity and a second entity identifies the number of second entities that could possibly exist for each first entity. Thus, a 1:c cardinality 1200 between entities A 1202 and X 1204 indicates that for each entity A 1202, there is either one or zero 1206 entity X 1204. A 1:1 cardinality 1208 between entities A 1210 and X 1212 indicates that for each entity A 1210, there is exactly one 1214 entity X 1212. A 1:n cardinality 1216 between entities A 1218 and X 1220 indicates that for each entity A 1218, there are one or more 1222 entity Xs 1220. A 1:cn cardinality 1224 between entities A 1226 and X 1228 indicates that for each entity A 1226, there are any number 1230 of entity Xs 1228 (i.e., 0 through n Xs for each A).

(2) Types of Relationships (a) Composition

Figure 13:
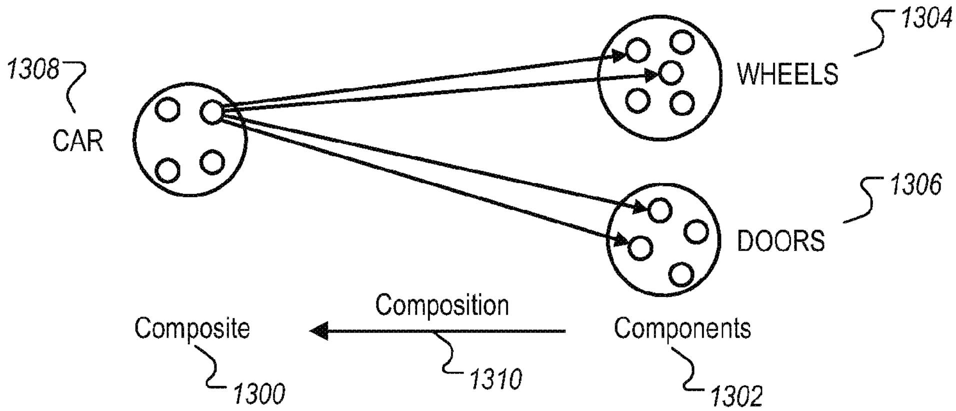
FIG. 13 depicts an example of a composition in accordance with methods and systems consistent with the subject matter described herein.
Figure 14:
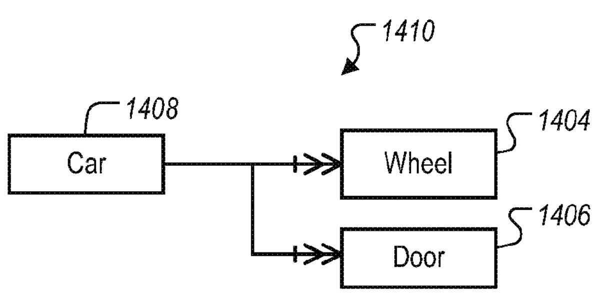
FIG. 14 depicts an example of a hierarchical relationship in accordance with methods and systems consistent with the subject matter described herein.

A composition or hierarchical relationship type is a strong whole-part relationship which is used to describe the structure within an object. The parts, or dependent entities, represent a semantic refinement or partition of the whole, or less dependent entity. For example, as depicted in FIG. 13, the components 1302, wheels 1304, and doors 1306 may be combined to form the composite 1300 "Car" 1308 using the composition 1310. FIG. 14 depicts a graphical representation of the composition 1410 between composite Car 1408 and components wheel 1404 and door 1406.

(b) Aggregation

Figure 15:
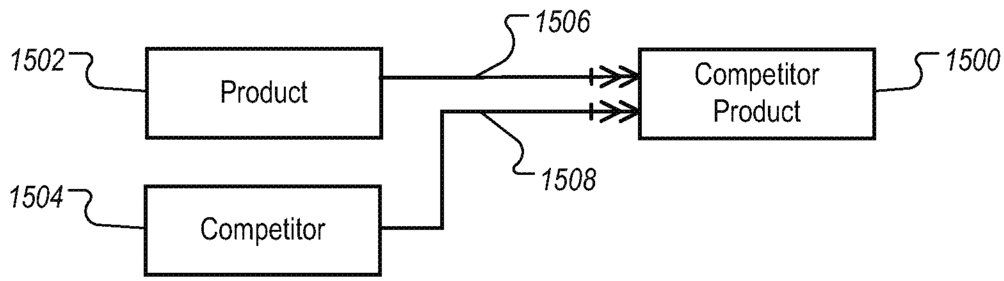
FIG. 15 depicts an example of an aggregating relationship in accordance with methods and systems consistent with the subject matter described herein.

An aggregation or an aggregating relationship type is a weak whole-part relationship between two objects. The dependent object is created by the combination of one or several less dependent objects. For example, as depicted in FIG. 15, the properties of a competitor product 1500 are determined by a product 1502 and a competitor 1504. A hierarchical relationship 1506 exists between the product 1502 and the competitor product 1500 because the competitor product 1500 is a component of the product 1502. Therefore, the values of the attributes of the competitor product 1500 are determined by the product 1502. An aggregating relationship 1508 exists between the competitor 1504 and the competitor product 1500 because the competitor product 1500 is differentiated by the competitor 1504. Therefore the values of the attributes of the competitor product 1500 are determined by the competitor 1504.

(c) Association

Figure 16:
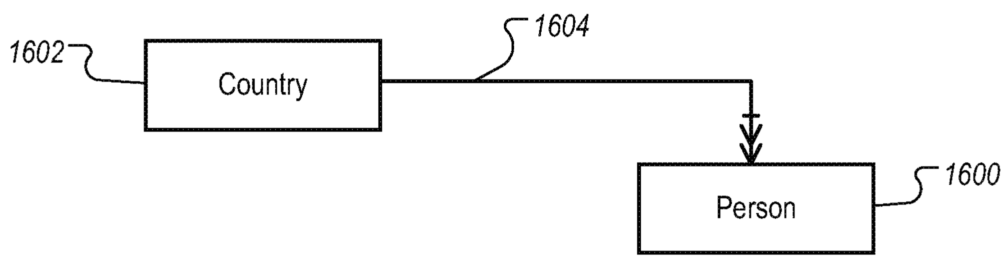
FIG. 16 depicts an example of an association in accordance with methods and systems consistent with the subject matter described herein.

An association or a referential relationship type describes a relationship between two objects in which the dependent object refers to the less dependent object. For example, as depicted in FIG. 16, a person 1600 has a nationality, and thus, has a reference to its country 1602 of origin. There is an association 1604 between the country 1602 and the person 1600. The values of the attributes of the person 1600 are not determined by the country 1602.

(3) Specialization

Figure 17:
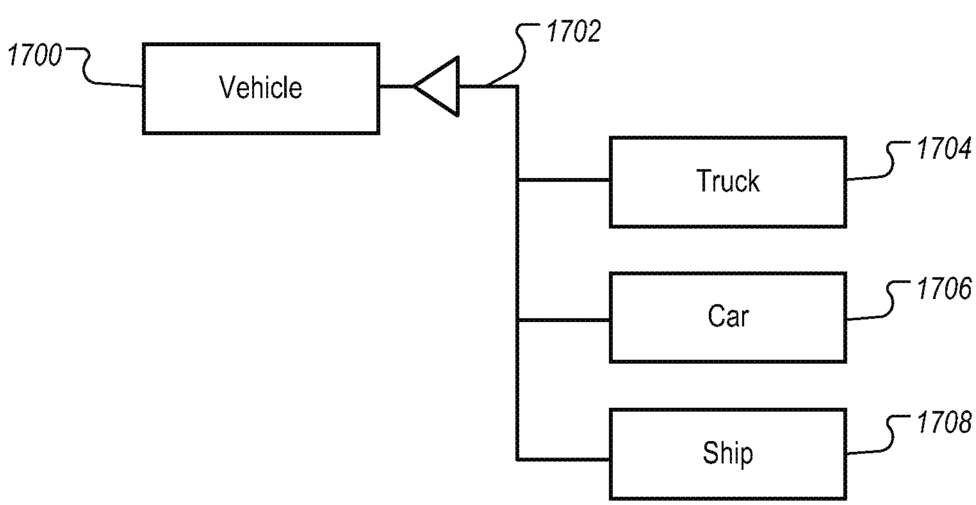
FIG. 17 depicts an example of a specialization in accordance with methods and systems consistent with the subject matter described herein.

Entity types may be divided into subtypes based on characteristics of the entity types. For example, FIG. 17 depicts an entity type "vehicle" 1700 specialized 1702 into subtypes "truck" 1704, "car" 1706, and "ship" 1708. These subtypes represent different aspects or the diversity of the entity type.

Subtypes may be defined based on related attributes. For example, although ships and cars are both vehicles, ships have an attribute, "draft," that is not found in cars. Subtypes also may be defined based on certain methods that can be applied to entities of this subtype and that modify such entities. For example, "drop anchor" can be applied to ships. If outgoing relationships to a specific object are restricted to a subset, then a subtype can be defined which reflects this subset.

Figure 18:
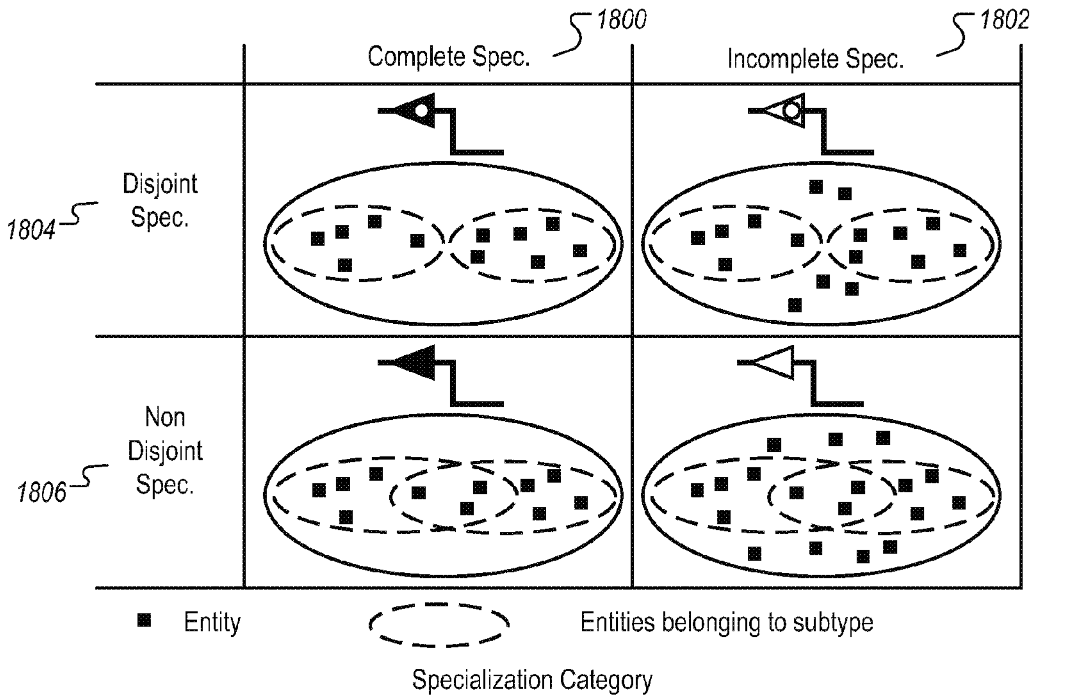
FIG. 18 depicts the categories of specializations in accordance with methods and systems consistent with the subject matter described herein.

As depicted in FIG. 18, specializations may further be characterized as complete specializations 1800 or incomplete specializations 1802. There is a complete specialization 1800 where each entity of the generalized type belongs to at least one subtype. With an incomplete specialization 1802, there is at least one entity that does not belong to a subtype. Specializations also may be disjoint 1804 or nondisjoint 1806. In a disjoint specialization 1804, each entity of the generalized type belongs to a maximum of one subtype. With a nondisjoint specialization 1806, one entity may belong to more than one subtype. As depicted in FIG. 18, four specialization categories result from the combination of the specialization characteristics.

e) Structural Patterns (1) Item

An item is an entity type which groups together features of another entity type. Thus, the features for the entity type chart of accounts are grouped together to form the entity type chart of accounts item. For example, a chart of accounts item is a category of values or value flows that can be recorded or represented in amounts of money in accounting, while a chart of accounts is a superordinate list of categories of values or value flows that is defined in accounting.

The cardinality between an entity type and its item is often either 1:n or 1:cn. For example, in the case of the entity type chart of accounts, there is a hierarchical relationship of the cardinality 1:n with the entity type chart of accounts item since a chart of accounts has at least one item in all cases.

(2) Hierarchy

Figure 19:
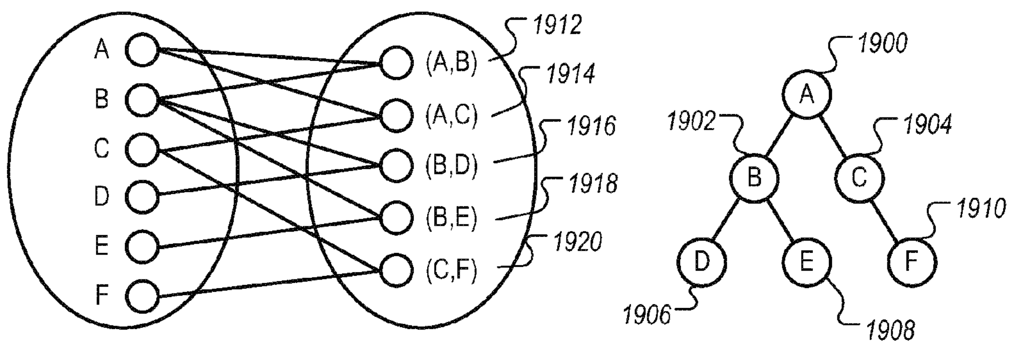
FIG. 19 depicts an example of a hierarchy in accordance with methods and systems consistent with the subject matter described herein.

A hierarchy describes the assignment of subordinate entities to superordinate entities and vice versa, where several entities of the same type are subordinate entities that have, at most, one directly superordinate entity. For example, in the hierarchy depicted in FIG. 19, entity B 1902 is subordinate to entity A 1900, resulting in the relationship (A,B) 1912. Similarly, entity C 1904 is subordinate to entity A 1900, resulting in the relationship (A,C) 1914. Entity D 1906 and entity E 1908 are subordinate to entity B 1902, resulting in the relationships (B,D) 1916 and (B,E) 1918, respectively. Entity F 1910 is subordinate to entity C 1904, resulting in the relationship (C,F) 1920.

Figure 20:
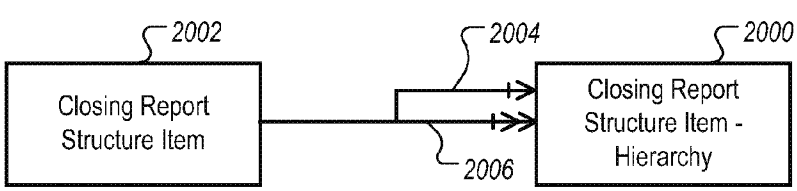
FIG. 20 depicts a graphical representation of a hierarchy in accordance with methods and systems consistent with the subject matter described herein.

Because each entity has at most one superordinate entity, the cardinality between a subordinate entity and its superordinate entity is 1:c. Similarly, each entity may have 0, 1 or many subordinate entities. Thus, the cardinality between a superordinate entity and its subordinate entity is 1:cn. FIG. 20 depicts a graphical representation of a Closing Report Structure Item hierarchy 2000 for a Closing Report Structure Item 2002. The hierarchy illustrates the 1:c cardinality 2004 between a subordinate entity and its superordinate entity, and the 1:cn cardinality 2006 between a superordinate entity and its subordinate entity.

3. Creation of the Business Object Model

Figure 21A:
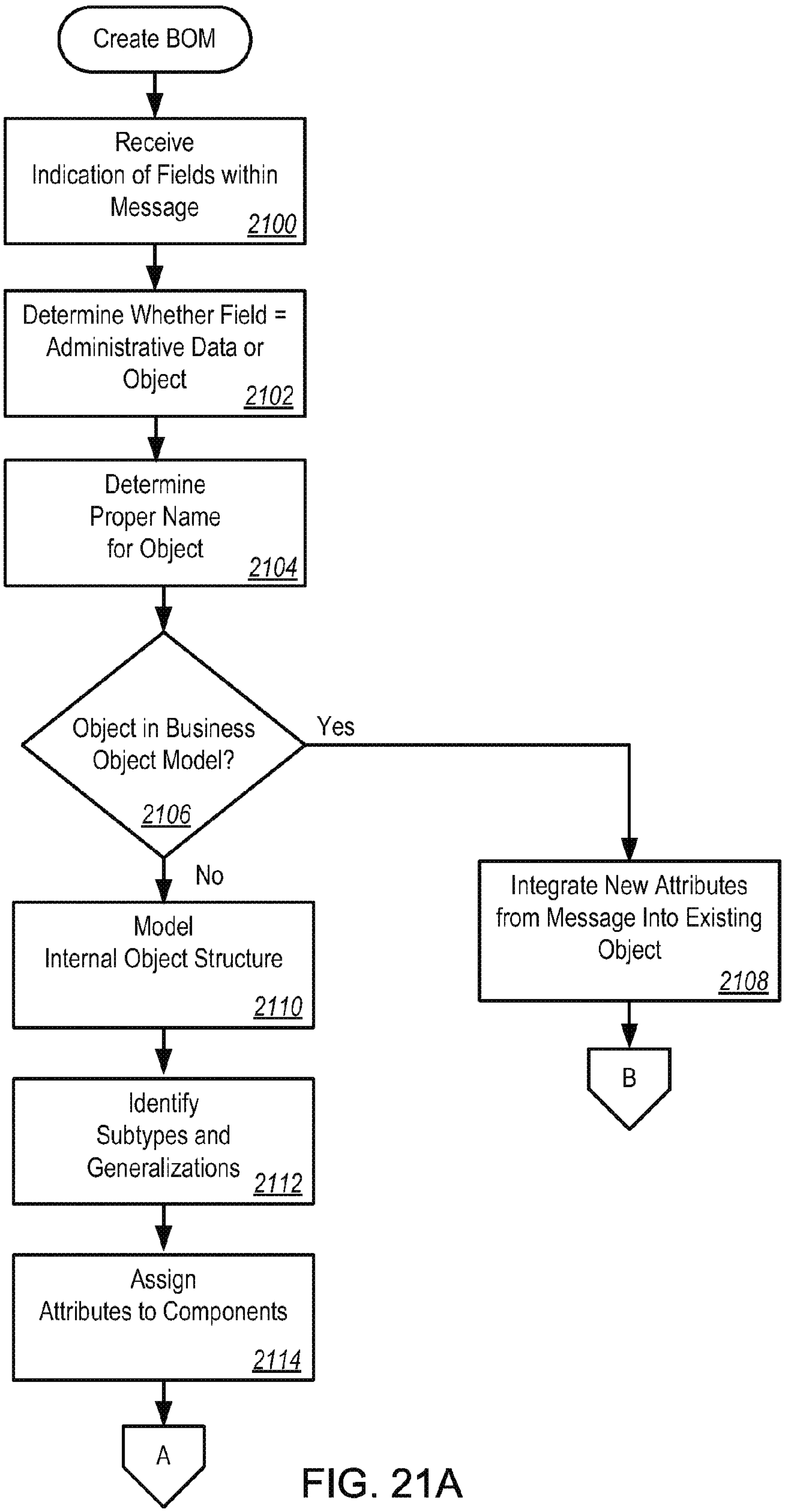
FIGS. 21A-B depict a flow diagram of the steps performed to create a business object model in accordance with methods and systems consistent with the subject matter described herein.
Figure 21B:
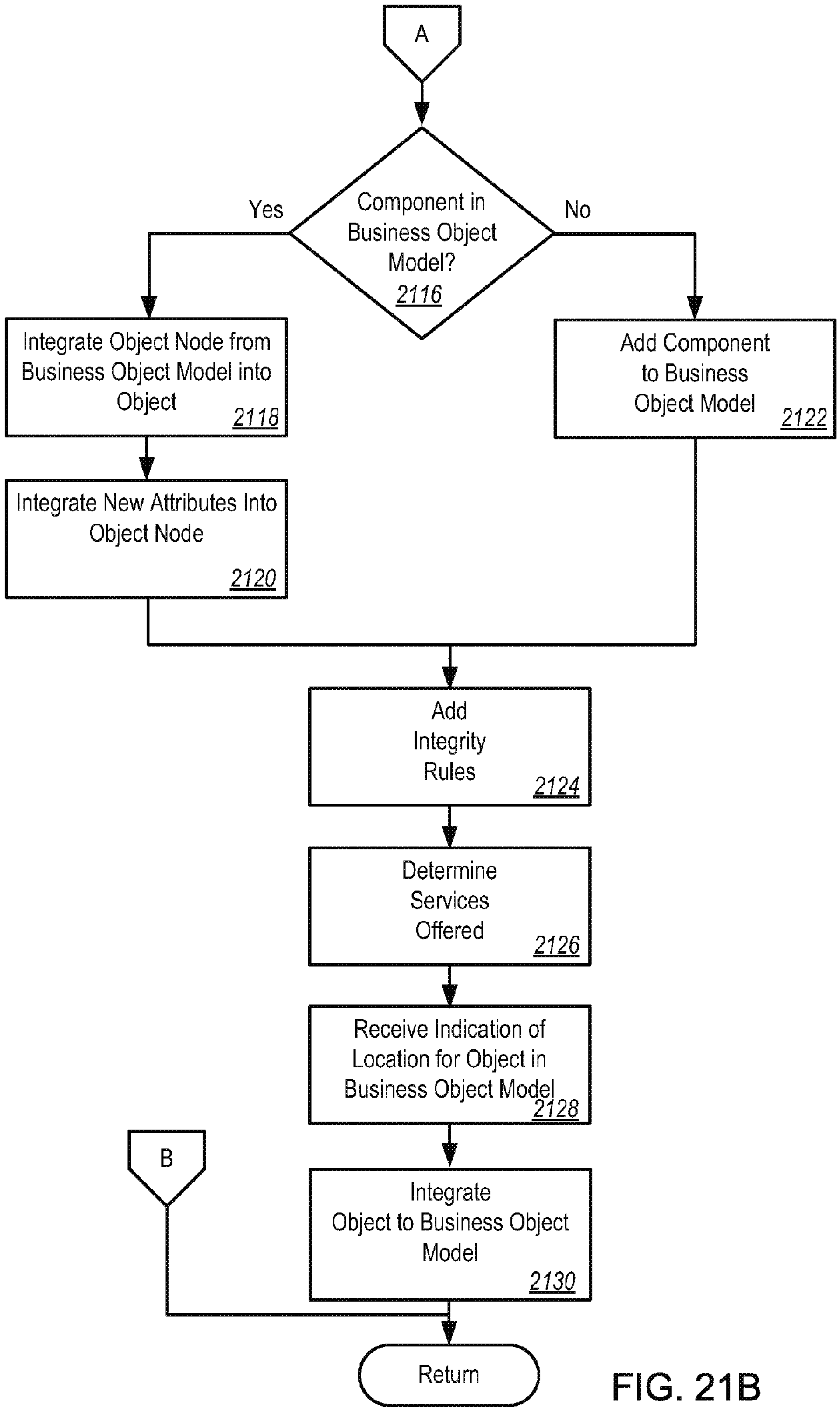

FIGS. 21A-B depict the steps performed using methods and systems consistent with the subject matter described herein to create a business object model. Although some steps are described as being performed by a computer, these steps may alternatively be performed manually, or computer-assisted, or any combination thereof. Likewise, although some steps are described as being performed by a computer, these steps may also be computer-assisted, or performed manually, or any combination thereof.

As discussed above, the designers create message choreographies that specify the sequence of messages between business entities during a transaction. After identifying the messages, the developers identify the fields contained in one of the messages (step 2100, FIG. 21A). The designers then determine whether each field relates to administrative data or is part of the object (step 2102). Thus, the first eleven fields identified below in the left column are related to administrative data, while the remaining fields are part of the object.

| | |
|---|---|
| MessageID | Admin |
| ReferenceID | |
| CreationDate | |
| SenderID | |
| AdditionalSenderID | |
| ContactPersonID | |

-continued

| | |
|---|---|
| SenderAddress | |
| RecipientID | |
| AdditionalRecipientID | |
| ContactPersonID | |
| RecipientAddress | |
| ID | Main Object |
| AdditionalID | |
| PostingDate | |
| LastChangeDate | |
| AcceptanceStatus | |
| Note | |
| CompleteTransmission Indicator | |
| Buyer | |
| BuyerOrganisationName | |
| Person Name | |
| FunctionalTitle | |
| DepartmentName | |
| CountryCode | |
| StreetPostalCode | |
| POBox Postal Code | |
| Company Postal Code | |
| City Name | |
| DistrictName | |
| PO Box ID | |
| PO Box Indicator | |
| PO Box Country Code | |
| PO Box Region Code | |
| PO Box City Name | |
| Street Name | |
| House ID | |
| Building ID | |
| Floor ID | |
| Room ID | |
| Care Of Name | |
| AddressDescription | |
| Telefonnumber | |
| MobileNumber | |
| Facsimile | |
| Email | |
| Seller | |
| SellerAddress | |
| Location | |
| LocationType | |
| DeliveryItemGroupID | |
| DeliveryPriority | |
| DeliveryCondition | |
| TransferLocation | |
| NumberofPartialDelivery | |
| QuantityTolerance | |
| MaximumLeadTime | |
| TransportServiceLevel | |
| TranportCondition | |
| TransportDescription | |
| CashDiscountTerms | |
| PaymentForm | |
| PaymentCardID | |
| PaymentCardReferenceID | |
| SequenceID | |
| Holder | |
| ExpirationDate | |
| AttachmentID | |
| AttachmentFilename | |
| DescriptionofMessage | |
| ConfirmationDescriptionof Message | |
| FollowUpActivity | |
| ItemID | |
| ParentItemID | |
| HierarchyType | |
| ProductID | |
| ProductType | |
| ProductNote | |
| ProductCategoryID | |
| Amount | |
| BaseQuantity | |
| ConfirmedAmount | |
| ConfirmedBaseQuantity | |
| ItemBuyer | |
| ItemBuyerOrganisationName | |
| Person Name | |
| FunctionalTitle | |

-continued

| |
|---|
| DepartmentName |
| CountryCode |
| StreetPostalCode |
| POBox Postal Code |
| Company Postal Code |
| City Name |
| DistrictName |
| PO Box ID |
| PO Box Indicator |
| PO Box Country Code |
| PO Box Region Code |
| PO Box City Name |
| Street Name |
| House ID |
| Building ID |
| Floor ID |
| Room ID |
| Care Of Name |
| AddressDescription |
| Telefonnumber |
| MobilNumber |
| Facsimile |
| Email |
| ItemSeller |
| ItemSellerAddress |
| ItemLocation |
| ItemLocationType |
| ItemDeliveryItemGroupID |
| ItemDeliveryPriority |
| ItemDeliveryCondition |
| ItemTransferLocation |
| ItemNumberofPartialDelivery |
| ItemQuantityTolerance |
| ItemMaximumLeadTime |
| ItemTransportServiceLevel |
| ItemTranportCondition |
| ItemTransportDescription |
| ContractReference |
| QuoteReference |
| CatalogueReference |
| ItemAttachmentID |
| ItemAttachmentFilename |
| ItemDescription |
| ScheduleLineID |
| DeliveryPeriod |
| Quantity |
| ConfirmedScheduleLineID |
| ConfirmedDeliveryPeriod |
| ConfirmedQuantity |

Next, the designers determine the proper name for the object according to the ISO 11179 naming standards (step 2104). In the example above, the proper name for the "Main Object" is "Purchase Order." After naming the object, the system that is creating the business object model determines whether the object already exists in the business object model (step 2106). If the object already exists, the system integrates new attributes from the message into the existing object (step 2108), and the process is complete.

If at step 2106 the system determines that the object does not exist in the business object model, the designers model the internal object structure (step 2110). To model the internal structure, the designers define the components. For the above example, the designers may define the components identified below.

| | | |
|---|---|---|
| ID | Purchase Order | |
| AdditionalID | | |
| PostingDate | | |
| LastChangeDate | | |
| AcceptanceStatus | | |
| Note | | |
| CompleteTransmission | | |
| Indicator | | |
| Buyer | Buyer | |
| BuyerOrganisationName | | |
| Person Name | | |
| FunctionalTitle | | |
| DepartmentName | | |
| CountryCode | | |
| StreetPostalCode | | |
| POBox Postal Code | | |
| Company Postal Code | | |
| City Name | | |
| DistrictName | | |
| PO Box ID | | |
| PO Box Indicator | | |
| PO Box Country Code | | |
| PO Box Region Code | | |
| PO Box City Name | | |
| Street Name | | |
| House ID | | |
| Building ID | | |
| Floor ID | | |
| Room ID | | |
| Care Of Name | | |
| AddressDescription | | |
| Telefonnumber | | |
| MobileNumber | | |
| Facsimile | | |
| Email | | |
| Seller | Seller | |
| SellerAddress | | |
| Location | Location | |
| LocationType | | |
| DeliveryItemGroupID | Delivery-Terms | |
| DeliveryPriority | | |
| DeliveryCondition | | |
| TransferLocation | | |
| NumberofPartialDelivery | | |
| QuantityTolerance | | |
| MaximumLeadTime | | |
| TransportServiceLevel | | |
| TranportCondition | | |
| TransportDescription | | |
| CashDiscountTerms | | |
| PaymentForm | Payment | |
| PaymentCardID | | |
| PaymentCardReferenceID | | |
| SequenceID | | |
| Holder | | |
| ExpirationDate | | |
| AttachmentID | | |
| AttachmentFilename | | |
| DescriptionofMessage | | |
| ConfirmationDescriptionof Message | | |
| FollowUpActivity | | |
| ItemID | Purchase Order Item | |
| ParentItemID | | |
| HierarchyType | | |
| ProductID | | Product |
| ProductType | | |
| ProductNote | | |
| ProductCategoryID | | ProductCategory |
| Amount | | |
| BaseQuantity | | |
| ConfirmedAmount | | |
| ConfirmedBaseQuantity | | |
| ItemBuyer | | Buyer |
| ItemBuyerOrganisation Name | | |
| Person Name | | |
| FunctionalTitle | | |
| DepartmentName | | |
| CountryCode | | |
| StreetPostalCode | | |
| POBox Postal Code | | |
| Company Postal Code | | |
| City Name | | |
| DistrictName | | |
| PO Box ID | | |
| PO Box Indicator | | |

-continued

| | |
|---|---|
| PO Box Country Code | |
| PO Box Region Code | |
| PO Box City Name | |
| Street Name | |
| House ID | |
| Building ID | |
| Floor ID | |
| Room ID | |
| Care Of Name | |
| AddressDescription | |
| Telefonnumber | |
| MobilNumber | |
| Facsimile | |
| Email | |
| ItemSeller | Seller |
| ItemSellerAddress | |
| ItemLocation | Location |
| ItemLocationType | |
| ItemDeliveryItemGroupID | |
| ItemDeliveryPriority | |
| ItemDeliveryCondition | |
| ItemTransferLocation | |
| ItemNumberofPartial | |

-continued

| | |
|---|---|
| Delivery | |
| ItemQuantityTolerance | |
| ItemMaximumLeadTime | |
| ItemTransportServiceLevel | |
| ItemTranportCondition | |
| ItemTransportDescription | |
| ContractReference | Contract |
| QuoteReference | Quote |
| CatalogueReference | Catalogue |
| ItemAttachmentID | |
| ItemAttachmentFilename | |
| ItemDescription | |
| ScheduleLineID | |
| DeliveryPeriod | |
| Quantity | |
| ConfirmedScheduleLineID | |
| ConfirmedDeliveryPeriod | |
| ConfirmedQuantity | |

During the step of modeling the internal structure, the designers also model the complete internal structure by identifying the compositions of the components and the corresponding cardinalities, as shown below.

| | | | | |
|---|---|---|---|---|
| PurchaseOrder | | | | 1 |
| | Buyer | | | 0 . . . 1 |
| | | Address | | 0 . . . 1 |
| | | ContactPerson | | 0 . . . 1 |
| | | | Address | 0 . . . 1 |
| | Seller | | | 0 . . . 1 |
| | Location | | | 0 . . . 1 |
| | | Address | | 0 . . . 1 |
| | DeliveryTerms | | | 0 . . . 1 |
| | | Incoterms | | 0 . . . 1 |
| | | PartialDelivery | | 0 . . . 1 |
| | | QuantityTolerance | | 0 . . . 1 |
| | | Transport | | 0 . . . 1 |
| | CashDiscount | | | 0 . . . 1 |
| | Terms | | | |
| | | MaximumCashDiscount | | 0 . . . 1 |
| | | NormalCashDiscount | | 0 . . . 1 |
| | PaymentForm | | | 0 . . . 1 |
| | | PaymentCard | | 0 . . . 1 |
| | Attachment | | | 0 . . . n |
| | Description | | | 0 . . . 1 |
| | Confirmation | | | 0 . . . 1 |
| | Description | | | |
| | Item | | | 0 . . . n |
| | | HierarchyRelationship | | 0 . . . 1 |
| | | Product | | 0 . . . 1 |
| | | ProductCategory | | 0 . . . 1 |
| | | Price | | 0 . . . 1 |
| | | | NetunitPrice | 0 . . . 1 |
| | | ConfirmedPrice | | 0 . . . 1 |
| | | | NetunitPrice | 0 . . . 1 |
| | | Buyer | | 0 . . . 1 |
| | | Seller | | 0 . . . 1 |
| | | Location | | 0 . . . 1 |
| | | DeliveryTerms | | 0 . . . 1 |
| | | Attachment | | 0 . . . n |
| | | Description | | 0 . . . 1 |
| | | ConfirmationDescription | | 0 . . . 1 |
| | | ScheduleLine | | 0 . . . n |
| | | | DeliveryPeriod | 1 |
| | | ConfirmedScheduleLine | | 0 . . . n |

After modeling the internal object structure, the developers identify the subtypes and generalizations for all objects and components (step 2112). For example, the Purchase Order may have subtypes Purchase Order Update, Purchase Order Cancellation and Purchase Order Information. Purchase Order Update may include Purchase Order Request, Purchase Order Change, and Purchase Order Confirmation. Moreover, Party may be identified as the generalization of Buyer and Seller. The subtypes and generalizations for the above example are shown below.

| | | | | | |
|---|---|---|---|---|---|
| Purchase Order | | | | | 1 |
| | PurchaseOrder Update | | | | |
| | | PurchaseOrder Request | | | |
| | | PurchaseOrder Change | | | |
| | | PurchaseOrder Confirmation | | | |
| | PurchaseOrder Cancellation | | | | |
| | PurchaseOrder Information | | | | |
| | Party | | | | |
| | | BuyerParty | | | 0 . . . 1 |
| | | | Address | | 0 . . . 1 |
| | | | ContactPerson | | 0 . . . 1 |
| | | | | Address | 0 . . . 1 |
| | | SellerParty | | | 0 . . . 1 |
| | Location | | | | |
| | | ShipToLocation | | | 0 . . . 1 |
| | | | Address | | 0 . . . 1 |
| | | ShipFromLocation | | | 0 . . . 1 |
| | | | Address | | 0 . . . 1 |
| | DeliveryTerms | | | | 0 . . . 1 |
| | | Incoterms | | | 0 . . . 1 |
| | | PartialDelivery | | | 0 . . . 1 |
| | | QuantityTolerance | | | 0 . . . 1 |
| | | Transport | | | 0 . . . 1 |
| | CashDiscount Terms | | | | 0 . . . 1 |
| | | MaximumCash Discount | | | 0 . . . 1 |
| | | NormalCashDiscount | | | 0 . . . 1 |
| | PaymentForm | | | | 0 . . . 1 |
| | | PaymentCard | | | 0 . . . 1 |
| | Attachment | | | | 0 . . . n |
| | Description | | | | 0 . . . 1 |
| | Confirmation Description | | | | 0 . . . 1 |
| | Item | | | | 0 . . . n |
| | | HierarchyRelationship | | | 0 . . . 1 |
| | | Product | | | 0 . . . 1 |
| | | ProductCategory | | | 0 . . . 1 |
| | | Price | | | 0 . . . 1 |
| | | | NetunitPrice | | 0 . . . 1 |
| | | ConfirmedPrice | | | 0 . . . 1 |
| | | | NetunitPrice | | 0 . . . 1 |
| | | Party | | | |
| | | | BuyerParty | | 0 . . . 1 |
| | | | SellerParty | | 0 . . . 1 |
| | | Location | | | |
| | | | ShipTo Location | | 0 . . . 1 |
| | | | ShipFrom Location | | 0 . . . 1 |
| | | DeliveryTerms | | | 0 . . . 1 |
| | | Attachment | | | 0 . . . n |
| | | Description | | | 0 . . . 1 |
| | | Confirmation Description | | | 0 . . . 1 |
| | | ScheduleLine | | | 0 . . . n |
| | | | Delivery Period | | 1 |
| | | ConfirmedScheduleLine | | | 0 . . . n |

After identifying the subtypes and generalizations, the developers assign the attributes to these components (step 2114). The attributes for a portion of the components are shown below.

| | | | | |
|---|---|---|---|---|
| Purchase Order | | | | 1 |
| | ID | | | 1 |
| | SellerID | | | 0 . . . 1 |
| | BuyerPosting DateTime | | | 0 . . . 1 |
| | BuyerLast ChangeDate Time | | | 0 . . . 1 |
| | SellerPosting DateTime | | | 0 . . . 1 |
| | SellerLast ChangeDate Time | | | 0 . . . 1 |
| | Acceptance StatusCode | | | 0 . . . 1 |
| | Note | | | 0 . . . 1 |
| | ItemList Complete Transmission Indicator | | | 0 . . . 1 |
| | BuyerParty | | | 0 . . . 1 |
| | | StandardID | | 0 . . . n |
| | | BuyerID | | 0 . . . 1 |
| | | SellerID | | 0 . . . 1 |
| | | Address | | 0 . . . 1 |
| | | ContactPerson | | 0 . . . 1 |
| | | | BuyerID | 0 . . . 1 |
| | | | SellerID | 0 . . . 1 |
| | | | Address | 0 . . . 1 |
| | SellerParty | | | 0 . . . 1 |
| | Product RecipientParty | | | 0 . . . 1 |
| | VendorParty | | | 0 . . . 1 |
| | Manufacturer Party | | | 0 . . . 1 |
| | BillToParty | | | 0 . . . 1 |
| | PayerParty | | | 0 . . . 1 |
| | CarrierParty | | | 0 . . . 1 |
| | ShipTo Location | | | 0 . . . 1 |
| | | StandardID | | 0 . . . n |
| | | BuyerID | | 0 . . . 1 |
| | | SellerID | | 0 . . . 1 |
| | | Address | | 0 . . . 1 |
| | ShipFrom Location | | | 0 . . . 1 |

The system then determines whether the component is one of the object nodes in the business object model (step 2116, FIG. 21B). If the system determines that the component is one of the object nodes in the business object model, the system integrates a reference to the corresponding object node from the business object model into the object (step 2118). In the above example, the system integrates the reference to the Buyer party represented by an ID and the reference to the ShipToLocation represented by an into the object, as shown below. The attributes that were formerly located in the PurchaseOrder object are now assigned to the new found object party. Thus, the attributes are removed from to the PurchaseOrder object.

-continued

| | | |
|---|---|---|
| PurchaseOrder | | |
| | ID | |
| | SellerID | |
| | BuyerPostingDateTime | |
| | BuyerLastChangeDateTime | |
| | SellerPostingDateTime | |
| | SellerLastChangeDateTime | |
| | AcceptanceStatusCode | |
| | Note | |
| | ItemListComplete | |
| | TransmissionIndicator | |
| | BuyerParty | |
| | | ID |
| | SellerParty | |
| | ProductRecipientParty | |
| | VendorParty | |
| | ManufacturerParty | |
| | BillToParty | |
| | PayerParty | |
| | CarrierParty | |
| | ShipToLocation | |
| | | ID |
| | ShipFromLocation | |

During the integration step, the designers classify the relationship (i.e., aggregation or association) between the object node and the object being integrated into the business object model. The system also integrates the new attributes into the object node (step 2120). If at step 2116, the system determines that the component is not in the business object model, the system adds the component to the business object model (step 2122).

Regardless of whether the component was in the business object model at step 2116, the next step in creating the business object model is to add the integrity rules (step 2124). There are several levels of integrity rules and constraints which should be described. These levels include consistency rules between attributes, consistency rules between components, and consistency rules to other objects. Next, the designers determine the services offered, which can be accessed via interfaces (step 2126). The services offered in the example above include PurchaseOrderCreateRequest, PurchaseOrderCancellationRequest, and PurchaseOrderReleaseRequest. The system then receives an indication of the location for the object in the business object model (step 2128). After receiving the indication of the location, the system integrates the object into the business object model (step 2130).

4. Structure of the Business Object Model

The business object model, which serves as the basis for the process of generating consistent interfaces, includes the elements contained within the interfaces. These elements are arranged in a hierarchical structure within the business object model.

5. Interfaces Derived from Business Object Model

Figure 27A:
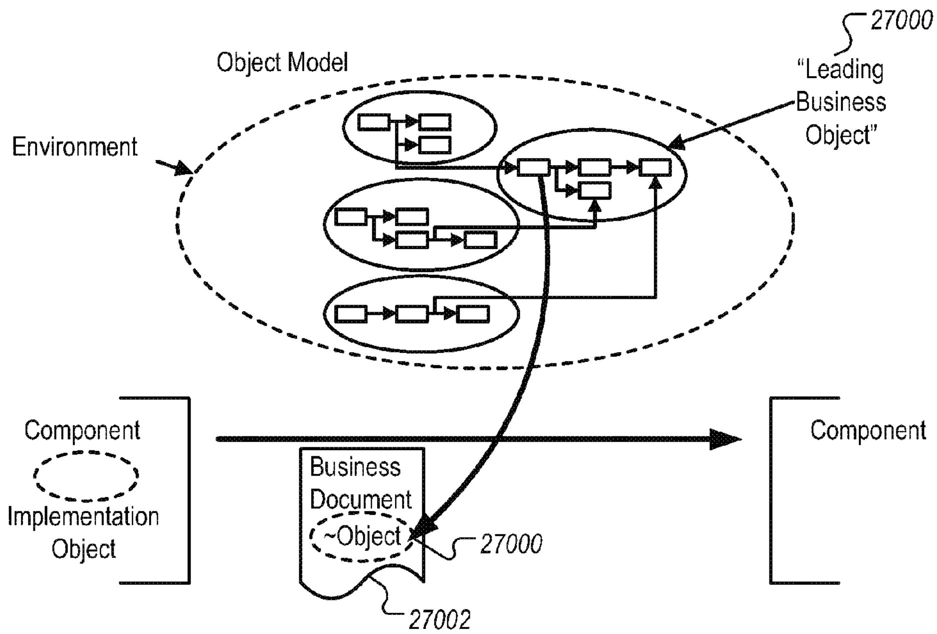
FIGS. 27A-E depict a hierarchization process in accordance with methods and systems consistent with the subject matter described herein.

Interfaces are the starting point of the communication between two business entities. The structure of each interface determines how one business entity communicates with another business entity. The business entities may act as a unified whole when, based on the business scenario, the business entities know what an interface contains from a business perspective and how to fill the individual elements or fields of the interface. As illustrated in FIG. 27A, communication between components takes place via messages that contain business documents (e.g., business document 27002). The business document 27002 ensures a holistic business-related understanding for the recipient of the message. The business documents are created and accepted or consumed by interfaces, specifically by inbound and outbound interfaces. The interface structure and, hence, the structure of the business document are derived by a mapping rule. This mapping rule is known as "hierarchization." An interface structure thus has a hierarchical structure created based on the leading business object 27000. The interface represents a usage-specific, hierarchical view of the underlying usage-neutral object model.

Figure 27B:
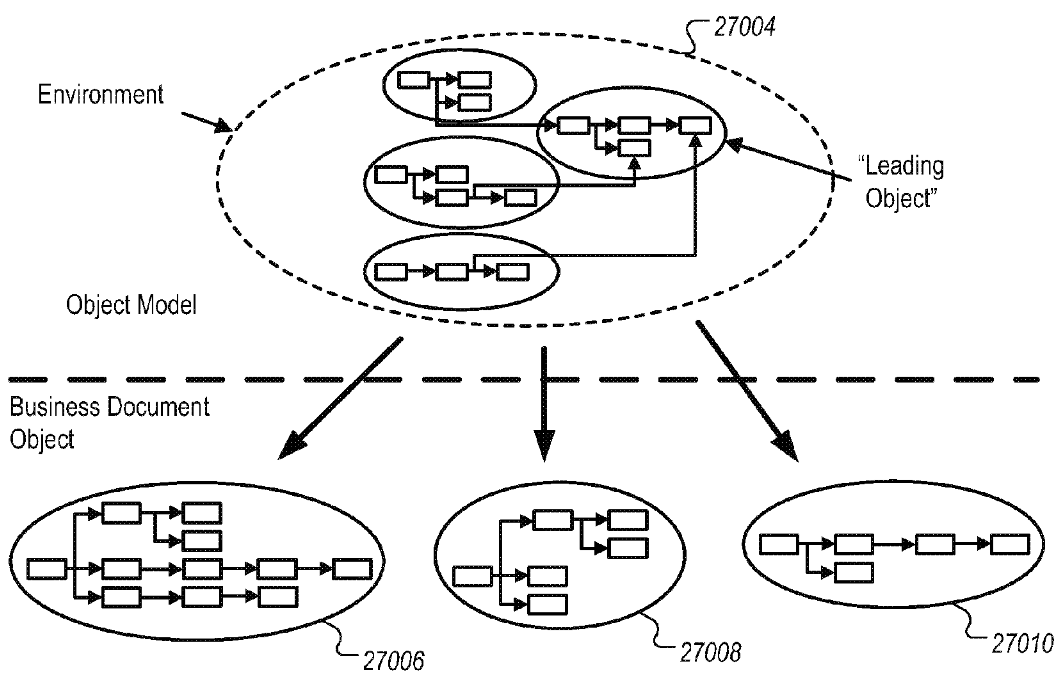

As illustrated in FIG. 27B, several business document objects 27006, 27008, and 27010 as overlapping views may be derived for a given leading object 27004. Each business document object results from the object model by hierarchization.

Figure 27C:
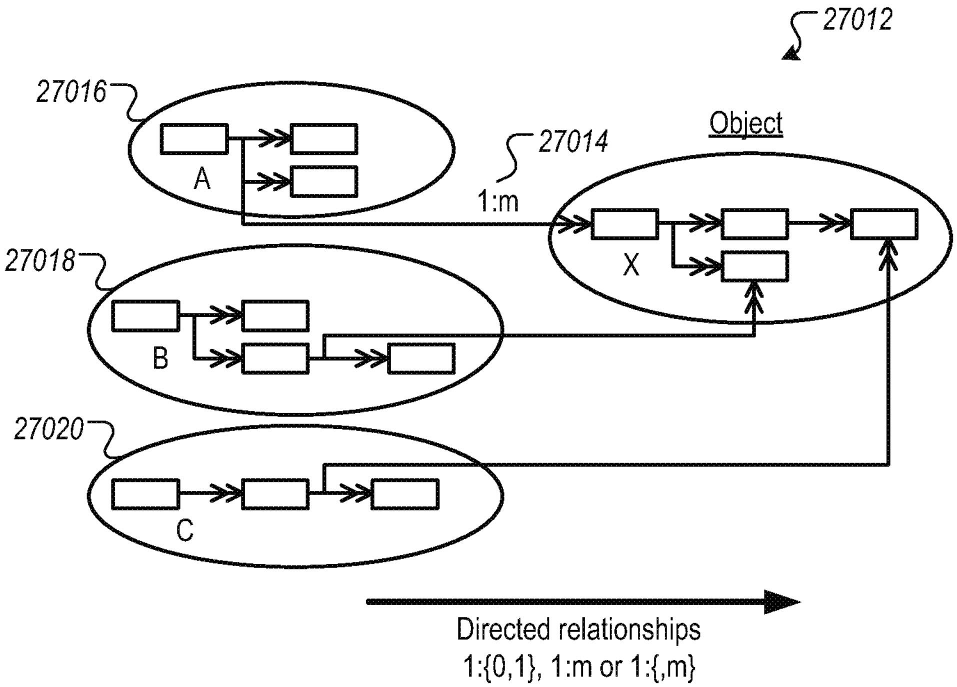

To illustrate the hierarchization process, FIG. 27C depicts an example of an object model 27012 (i.e., a portion of the business object model) that is used to derive a service operation signature (business document object structure). As depicted, leading object X 27014 in the object model 27012 is integrated in a net of object A 27016, object B 27018, and object C 27020. Initially, the parts of the leading object 27014 that are required for the business object document are adopted. In one variation, all parts required for a business document object are adopted from leading object 27014 (making such an operation a maximal service operation). Based on these parts, the relationships to the superordinate objects (i.e., objects A, B, and C from which object X depends) are inverted. In other words, these objects are adopted as dependent or subordinate objects in the new business document object.

For example, object A 27016, object B 27018, and object C 27020 have information that characterize object X. Because object A 27016, object B 27018, and object C 27020 are superordinate to leading object X 27014, the dependencies of these relationships change so that object A 27016, object B 27018, and object C 27020 become dependent and subordinate to leading object X 27014. This procedure is known as "derivation of the business document object by hierarchization."

Business-related objects generally have an internal structure (parts). This structure can be complex and reflect the individual parts of an object and their mutual dependency. When creating the operation signature, the internal structure of an object is strictly hierarchized. Thus, dependent parts keep their dependency structure, and relationships between the parts within the object that do not represent the hierarchical structure are resolved by prioritizing one of the relationships.

Relationships of object X to external objects that are referenced and whose information characterizes object X are added to the operation signature. Such a structure can be quite complex (see, for example, FIG. 27D). The cardinality to these referenced objects is adopted as 1:1 or 1:C, respectively. By this, the direction of the dependency changes. The required parts of this referenced object are adopted identically, both in their cardinality and in their dependency arrangement.

Figure 27D:
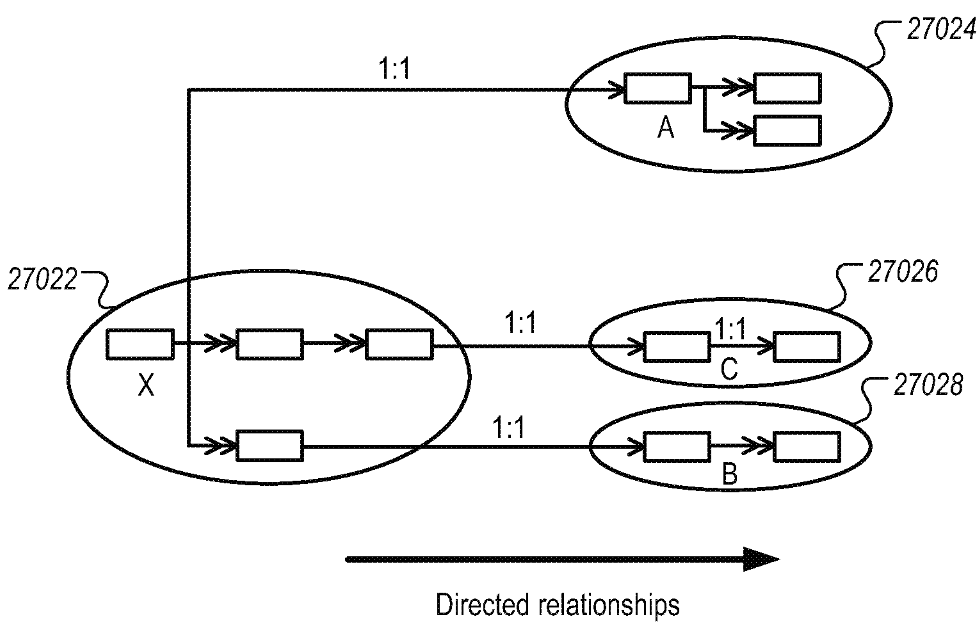

The newly created business document object contains all required information, including the incorporated master data information of the referenced objects. As depicted in FIG. 27D, components Xi in leading object X 27022 are adopted directly. The relationship of object X 27022 to object A 27024, object B 27028, and object C 27026 are inverted, and the parts required by these objects are added as objects that depend from object X 27022. As depicted, all of object A 27024 is adopted. B3 and B4 are adopted from object B 27028, but B1 is not adopted. From object C 27026, C2 and C1 are adopted, but C3 is not adopted.

Figure 27E:
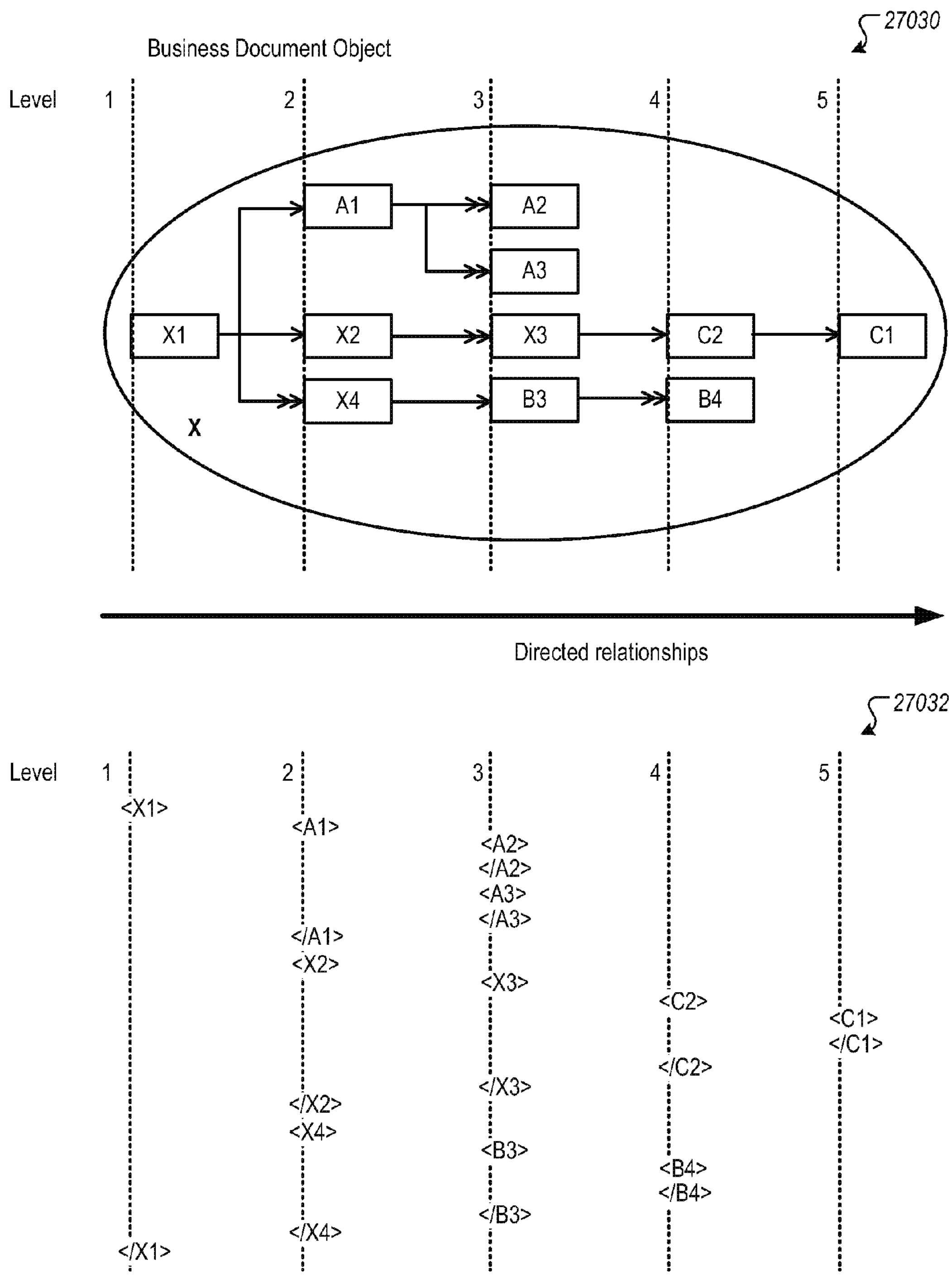

FIG. 27E depicts the business document object X 27030 created by this hierarchization process. As shown, the arrangement of the elements corresponds to their dependency levels, which directly leads to a corresponding representation as an XML structure 27032.

The following provides certain rules that can be adopted singly or in combination with regard to the hierarchization process. A business document object always refers to a leading business document object and is derived from this object. The name of the root entity in the business document entity is the name of the business object or the name of a specialization of the business object or the name of a service specific view onto the business object. The nodes and elements of the business object that are relevant (according to the semantics of the associated message type) are contained as entities and elements in the business document object.

The name of a business document entity is predefined by the name of the corresponding business object node. The name of the superordinate entity is not repeated in the name of the business document entity. The "full" semantic name results from the concatenation of the entity names along the hierarchical structure of the business document object.

The structure of the business document object is, except for deviations due to hierarchization, the same as the structure of the business object. The cardinalities of the business document object nodes and elements are adopted identically or more restrictively to the business document object. An object from which the leading business object is dependent can be adopted to the business document object. For this arrangement, the relationship is inverted, and the object (or its parts, respectively) are hierarchically subordinated in the business document object.

Nodes in the business object representing generalized business information can be adopted as explicit entities to the business document object (generally speaking, multiply TypeCodes out). When this adoption occurs, the entities are named according to their more specific semantic (name of TypeCode becomes prefix). Party nodes of the business object are modeled as explicit entities for each party role in the business document object. These nodes are given the name <Prefix><Party Role>Party, for example, BuyerParty, ItemBuyerParty. BTDReference nodes are modeled as separate entities for each reference type in the business document object. These nodes are given the name <Qualifier><BO><Node>Reference, for example SalesOrderReference, OriginSalesOrderReference, SalesOrderItemReference. A product node in the business object comprises all of the information on the Product, ProductCategory, and Batch. This information is modeled in the business document object as explicit entities for Product, ProductCategory, and Batch.

Entities which are connected by a 1:1 relationship as a result of hierarchization can be combined to a single entity, if they are semantically equivalent. Such a combination can often occurs if a node in the business document object that results from an assignment node is removed because it does not have any elements.

The message type structure is typed with data types. Elements are typed by GDTs according to their business objects. Aggregated levels are typed with message type specific data types (Intermediate Data Types), with their names being built according to the corresponding paths in the message type structure. The whole message type structured is typed by a message data type with its name being built according to the root entity with the suffix "Message". For the message type, the message category (e.g., information, notification, query, response, request, confirmation, etc.) is specified according to the suited transaction communication pattern.

In one variation, the derivation by hierarchization can be initiated by specifying a leading business object and a desired view relevant for a selected service operation. This view determines the business document object. The leading business object can be the source object, the target object, or a third object. Thereafter, the parts of the business object required for the view are determined. The parts are connected to the root node via a valid path along the hierarchy. Thereafter, one or more independent objects (object parts, respectively) referenced by the leading object which are relevant for the service may be determined (provided that a relationship exists between the leading object and the one or more independent objects).

Once the selection is finalized, relevant nodes of the leading object node that are structurally identical to the message type structure can then be adopted. If nodes are adopted from independent objects or object parts, the relationships to such independent objects or object parts are inverted. Linearization can occur such that a business object node containing certain TypeCodes is represented in the message type structure by explicit entities (an entity for each value of the TypeCode). The structure can be reduced by checking all 1:1 cardinalities in the message type structure. Entities can be combined if they are semantically equivalent, one of the entities carries no elements, or an entity solely results from an n:m assignment in the business object.

After the hierarchization is completed, information regarding transmission of the business document object (e.g., CompleteTransmissionIndicator, ActionCodes, message category, etc.) can be added. A standardized message header can be added to the message type structure and the message structure can be typed. Additionally, the message category for the message type can be designated.

Invoice Request and Invoice Confirmation are examples of interfaces. These invoice interfaces are used to exchange invoices and invoice confirmations between an invoicing party and an invoice recipient (such as between a seller and a buyer) in a B2B process. Companies can create invoices in electronic as well as in paper form. Traditional methods of communication, such as mail or fax, for invoicing are cost intensive, prone to error, and relatively slow, since the data is recorded manually. Electronic communication eliminates such problems. The motivating business scenarios for the Invoice Request and Invoice Confirmation interfaces are the Procure to Stock (PTS) and Sell from Stock (SFS) scenarios. In the PTS scenario, the parties use invoice interfaces to purchase and settle goods. In the SFS scenario, the parties use invoice interfaces to sell and invoice goods. The invoice interfaces directly integrate the applications implementing them and also form the basis for mapping data to widely-used XML standard formats such as RosettaNet, PIDX, xCBL, and CIDX.

The invoicing party may use two different messages to map a B2B invoicing process: (1) the invoicing party sends the message type InvoiceRequest to the invoice recipient to start a new invoicing process; and (2) the invoice recipient sends the message type InvoiceConfirmation to the invoicing party to confirm or reject an entire invoice or to temporarily assign it the status "pending."

An InvoiceRequest is a legally binding notification of claims or liabilities for delivered goods and rendered services—usually, a payment request for the particular goods and services. The message type InvoiceRequest is based on the message data type InvoiceMessage. The InvoiceRequest message (as defined) transfers invoices in the broader sense. This includes the specific invoice (request to settle a liability), the debit memo, and the credit memo.

InvoiceConfirmation is a response sent by the recipient to the invoicing party confirming or rejecting the entire invoice received or stating that it has been assigned temporarily the status "pending." The message type InvoiceConfirmation is based on the message data type InvoiceMessage. An InvoiceConfirmation is not mandatory in a B2B invoicing process, however, it automates collaborative processes and dispute management.

Usually, the invoice is created after it has been confirmed that the goods were delivered or the service was provided. The invoicing party (such as the seller) starts the invoicing process by sending an InvoiceRequest message. Upon receiving the InvoiceRequest message, the invoice recipient (for instance, the buyer) can use the InvoiceConfirmation message to completely accept or reject the invoice received or to temporarily assign it the status "pending." The InvoiceConfirmation is not a negotiation tool (as is the case in order management), since the options available are either to accept or reject the entire invoice. The invoice data in the InvoiceConfirmation message merely confirms that the invoice has been forwarded correctly and does not communicate any desired changes to the invoice. Therefore, the InvoiceConfirmation includes the precise invoice data that the invoice recipient received and checked. If the invoice recipient rejects an invoice, the invoicing party can send a new invoice after checking the reason for rejection (AcceptanceStatus and ConfirmationDescription at Invoice and InvoiceItem level). If the invoice recipient does not respond, the invoice is generally regarded as being accepted and the invoicing party can expect payment.

FIGS. 22A-F depict a flow diagram of the steps performed by methods and systems consistent with the subject matter described herein to generate an interface from the business object model. Although described as being performed by a computer, these steps may alternatively be performed manually, or using any combination thereof. The process begins when the system receives an indication of a package template from the designer, i.e., the designer provides a package template to the system (step 2200).

Package templates specify the arrangement of packages within a business transaction document. Package templates are used to define the overall structure of the messages sent between business entities. Methods and systems consistent with the subject matter described herein use package templates in conjunction with the business object model to derive the interfaces.

The system also receives an indication of the message type from the designer (step 2202). The system selects a package from the package template (step 2204), and receives an indication from the designer whether the package is required for the interface (step 2206). If the package is not required for the interface, the system removes the package from the package template (step 2208). The system then continues this analysis for the remaining packages within the package template (step 2210).

Figure 22A:
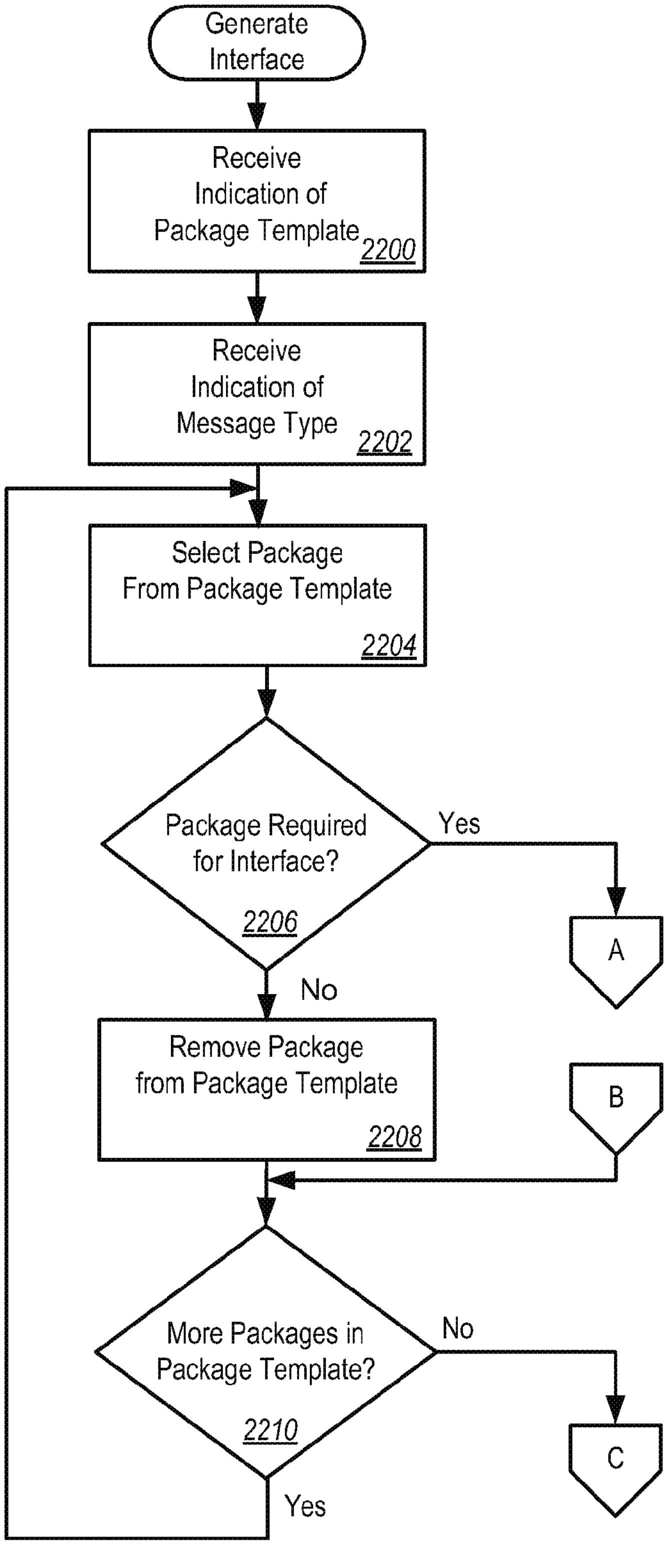
FIGS. 22A-F depict a flow diagram of the steps performed to generate an interface from the business object model in accordance with methods and systems consistent with the subject matter described herein.
Figure 22B:
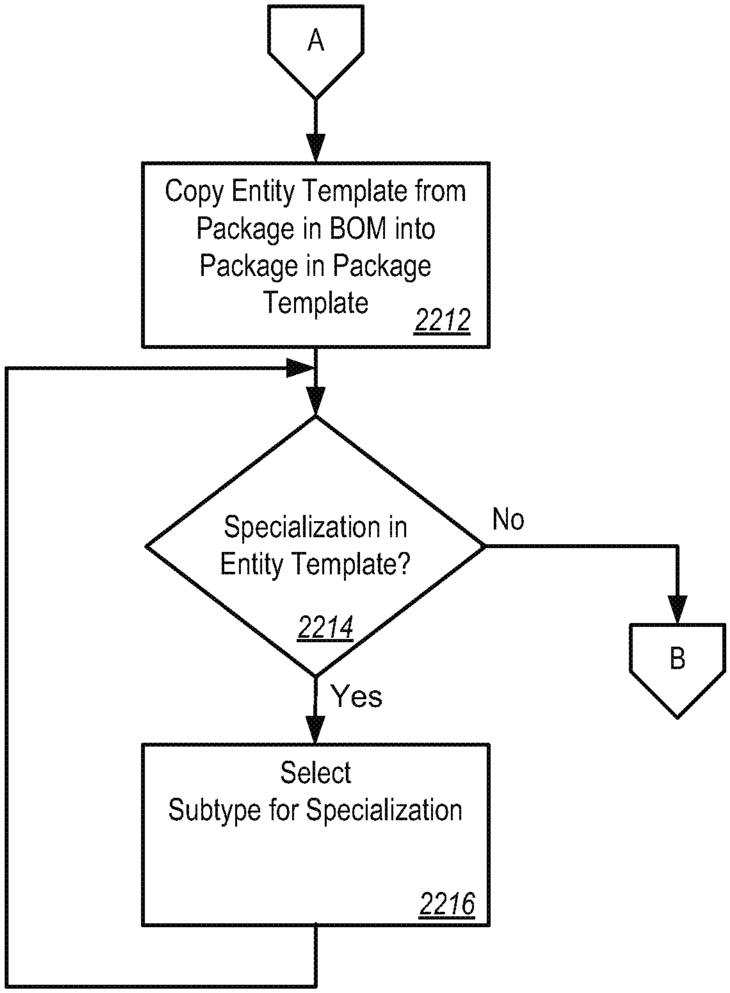
Figure 22C:
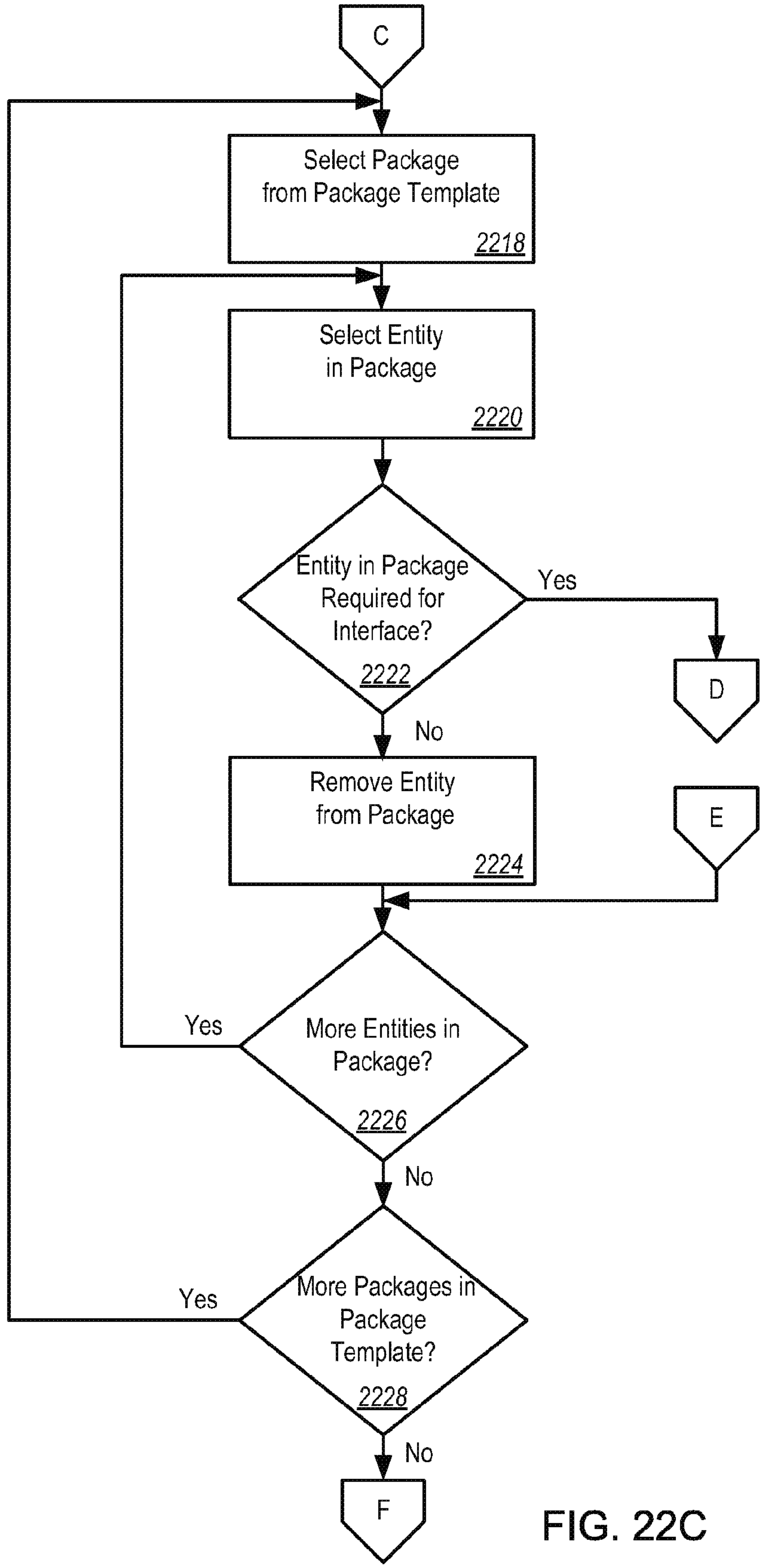

If, at step 2206, the package is required for the interface, the system copies the entity template from the package in the business object model into the package in the package template (step 2212, FIG. 22B). The system determines whether there is a specialization in the entity template (step 2214). If the system determines that there is a specialization in the entity template, the system selects a subtype for the specialization (step 2216). The system may either select the subtype for the specialization based on the message type, or it may receive this information from the designer. The system then determines whether there are any other specializations in the entity template (step 2214). When the system determines that there are no specializations in the entity template, the system continues this analysis for the remaining packages within the package template (step 2210, FIG. 22A).

At step 2210, after the system completes its analysis for the packages within the package template, the system selects one of the packages remaining in the package template (step 2218, FIG. 22C), and selects an entity from the package (step 2220). The system receives an indication from the designer whether the entity is required for the interface (step 2222). If the entity is not required for the interface, the system removes the entity from the package template (step 2224). The system then continues this analysis for the remaining entities within the package (step 2226), and for the remaining packages within the package template (step 2228).

Figure 22D:
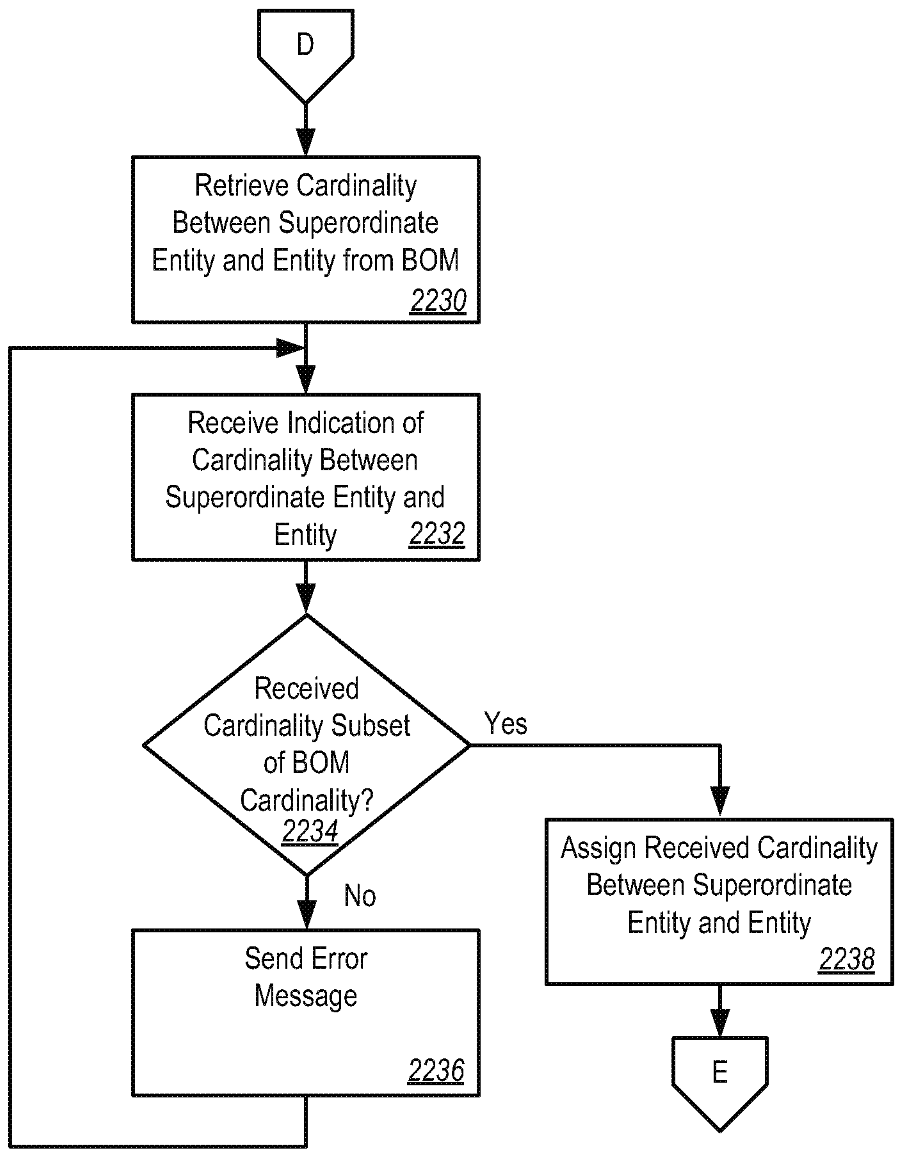

If, at step 2222, the entity is required for the interface, the system retrieves the cardinality between a superordinate entity and the entity from the business object model (step 2230, FIG. 22D). The system also receives an indication of the cardinality between the superordinate entity and the entity from the designer (step 2232). The system then determines whether the received cardinality is a subset of the business object model cardinality (step 2234). If the received cardinality is not a subset of the business object model cardinality, the system sends an error message to the designer (step 2236). If the received cardinality is a subset of the business object model cardinality, the system assigns the received cardinality as the cardinality between the superordinate entity and the entity (step 2238). The system then continues this analysis for the remaining entities within the package (step 2226, FIG. 22C), and for the remaining packages within the package template (step 2228).

Figure 22E:
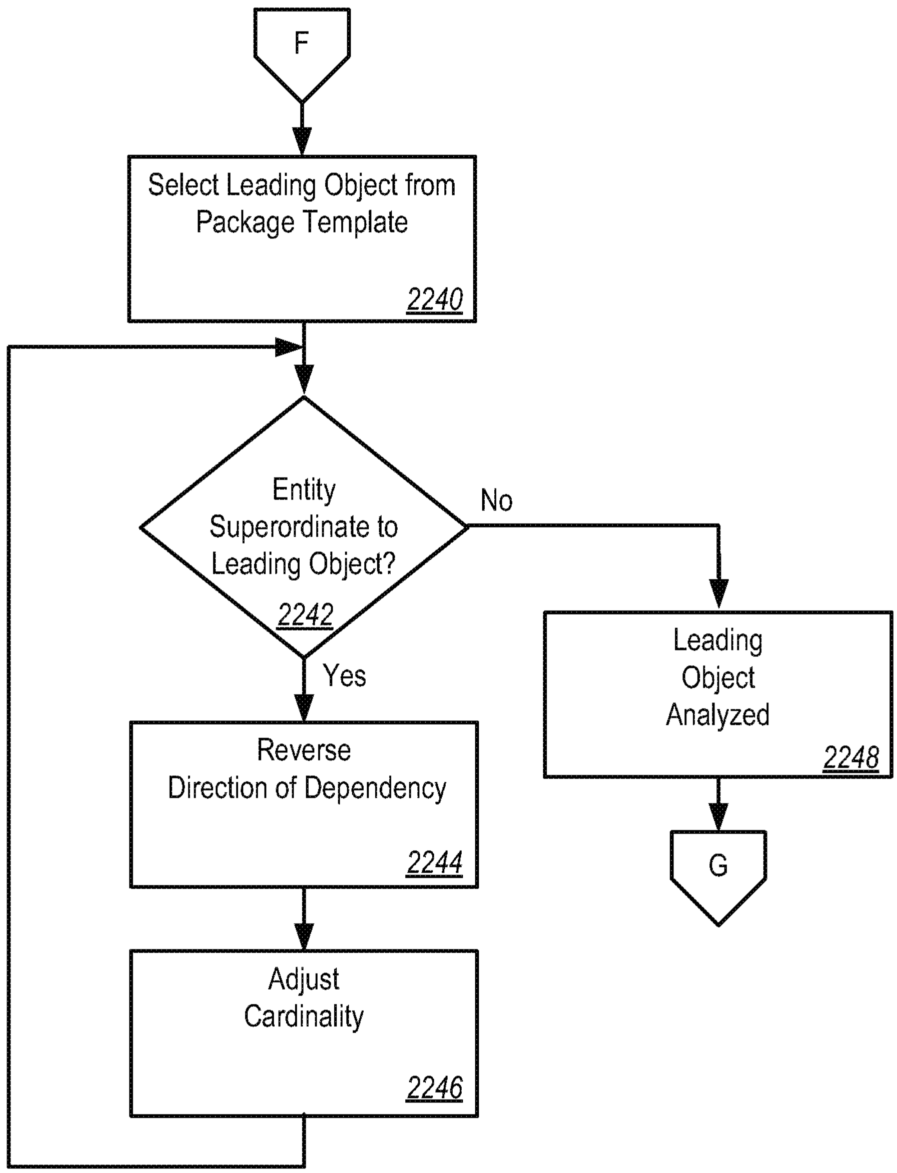

The system then selects a leading object from the package template (step 2240, FIG. 22E). The system determines whether there is an entity superordinate to the leading object (step 2242). If the system determines that there is an entity superordinate to the leading object, the system reverses the direction of the dependency (step 2244) and adjusts the cardinality between the leading object and the entity (step 2246). The system performs this analysis for entities that are superordinate to the leading object (step 2242). If the system determines that there are no entities superordinate to the leading object, the system identifies the leading object as analyzed (step 2248).

Figure 22F:
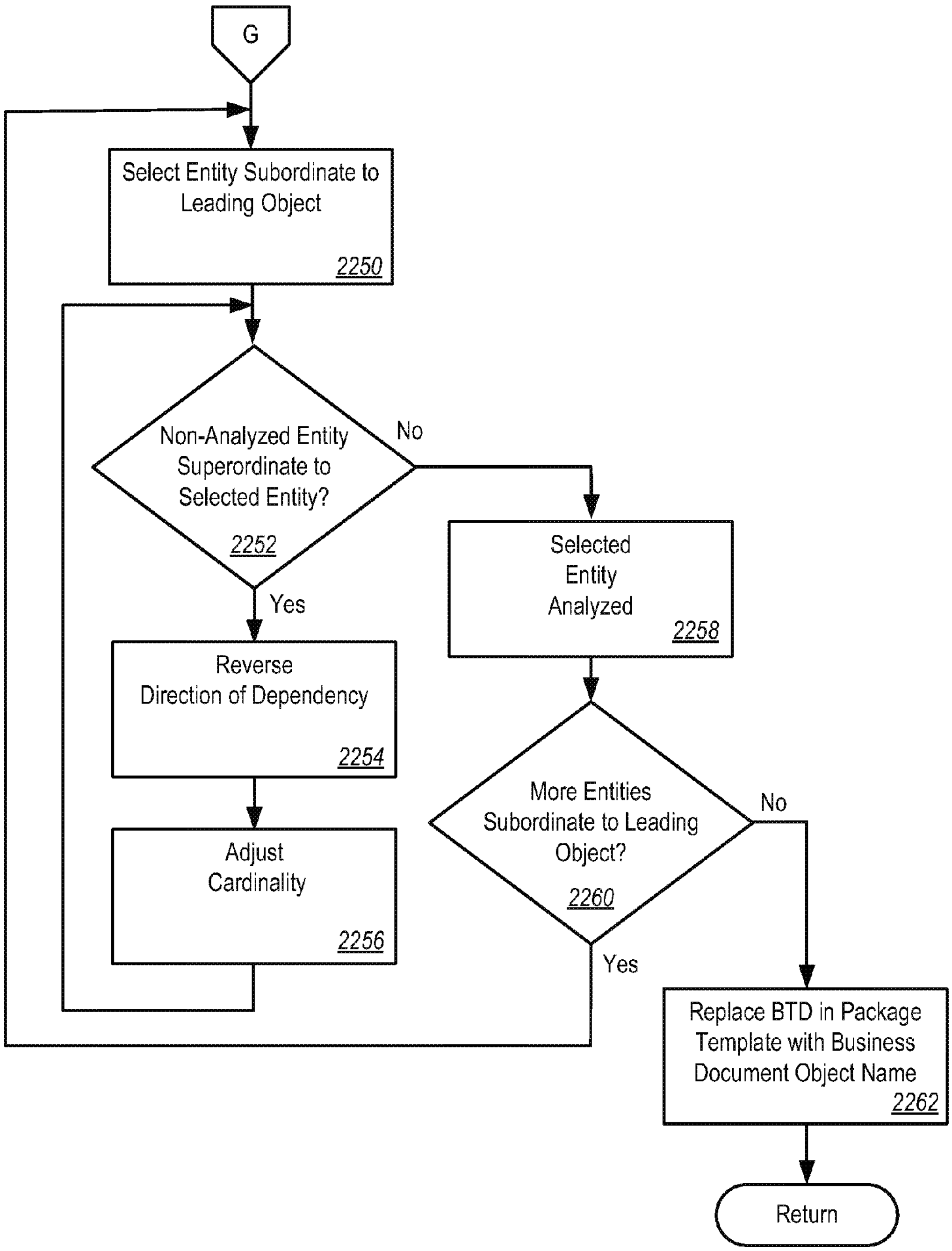

The system then selects an entity that is subordinate to the leading object (step 2250, FIG. 22F). The system determines whether any non-analyzed entities are superordinate to the selected entity (step 2252). If a non-analyzed entity is superordinate to the selected entity, the system reverses the direction of the dependency (step 2254) and adjusts the cardinality between the selected entity and the non-analyzed entity (step 2256). The system performs this analysis for non-analyzed entities that are superordinate to the selected entity (step 2252). If the system determines that there are no non-analyzed entities superordinate to the selected entity, the system identifies the selected entity as analyzed (step 2258), and continues this analysis for entities that are subordinate to the leading object (step 2260). After the packages have been analyzed, the system substitutes the BusinessTransactionDocument ("BTD") in the package template with the name of the interface (step 2262). This includes the "BTD" in the BTDItem package and the "BTD" in the BTDItemScheduleLine package.

6. Use of an Interface

The XI stores the interfaces (as an interface type). At runtime, the sending party's program instantiates the interface to create a business document, and sends the business document in a message to the recipient. The messages are preferably defined using XML. In the example depicted in FIG. 23, the Buyer 2300 uses an application 2306 in its system to instantiate an interface 2308 and create an interface object or business document object 2310. The Buyer's application 2306 uses data that is in the sender's component-specific structure and fills the business document object 2310 with the data. The Buyer's application 2306 then adds message identification 2312 to the business document and places the business document into a message 2302. The Buyer's application 2306 sends the message 2302 to the Vendor 2304. The Vendor 2304 uses an application 2314 in its system to receive the message 2302 and store the business document into its own memory. The Vendor's application 2314 unpacks the message 2302 using the corresponding interface 2316 stored in its XI to obtain the relevant data from the interface object or business document object 2318.

Figure 24:
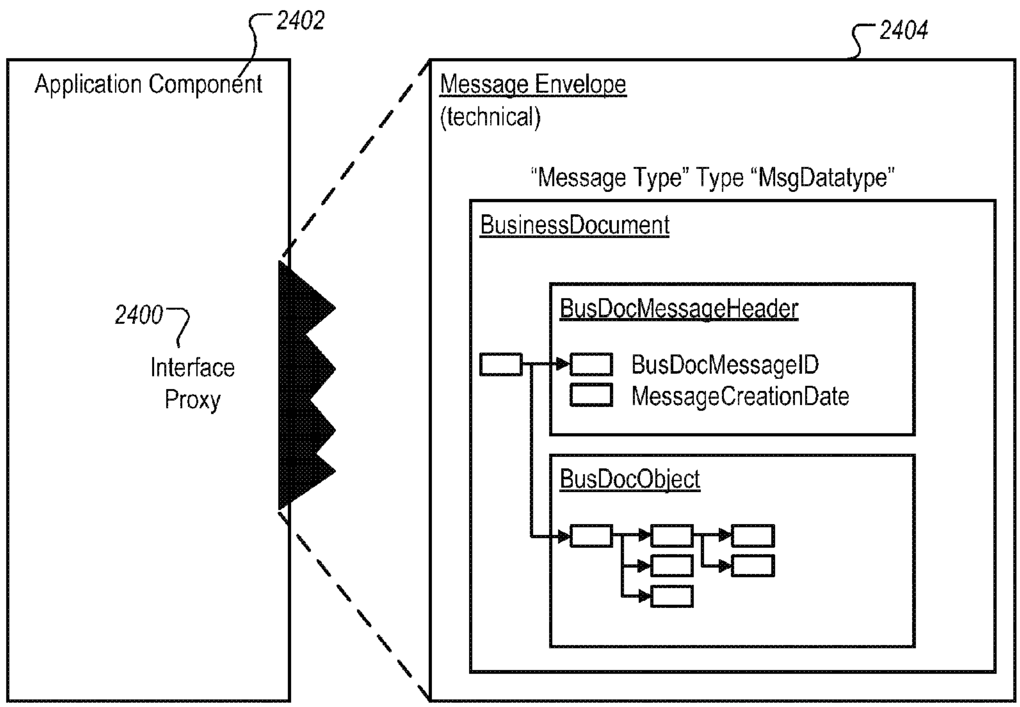
FIG. 24 depicts an interface proxy in accordance with methods and systems consistent with the subject matter described herein.
Figure 25:
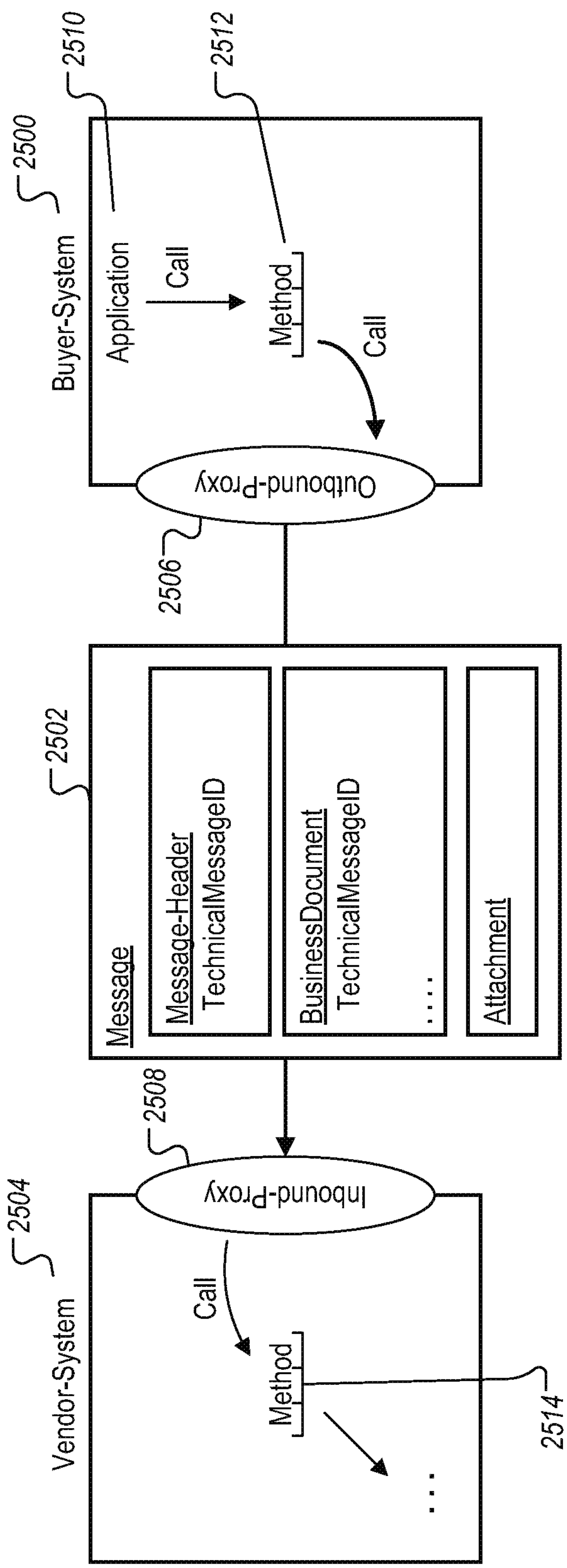
FIG. 25 depicts an example illustrating the transmittal of a message using proxies in accordance with methods and systems consistent with the subject matter described herein.

From the component's perspective, the interface is represented by an interface proxy 2400, as depicted in FIG. 24. The proxies 2400 shield the components 2402 of the sender and recipient from the technical details of sending messages 2404 via XI. In particular, as depicted in FIG. 25, at the sending end, the Buyer 2500 uses an application 2510 in its system to call an implemented method 2512, which generates the outbound proxy 2506. The outbound proxy 2506 parses the internal data structure of the components and converts them to the XML structure in accordance with the business document object. The outbound proxy 2506 packs the document into a message 2502. Transport, routing and mapping the XML message to the recipient 28304 is done by the routing system (XI, modeling environment 516, etc.).

When the message arrives, the recipient's inbound proxy 2508 calls its component-specific method 2514 for creating a document. The proxy 2508 at the receiving end downloads the data and converts the XML structure into the internal data structure of the recipient component 2504 for further processing.

Figure 26A:
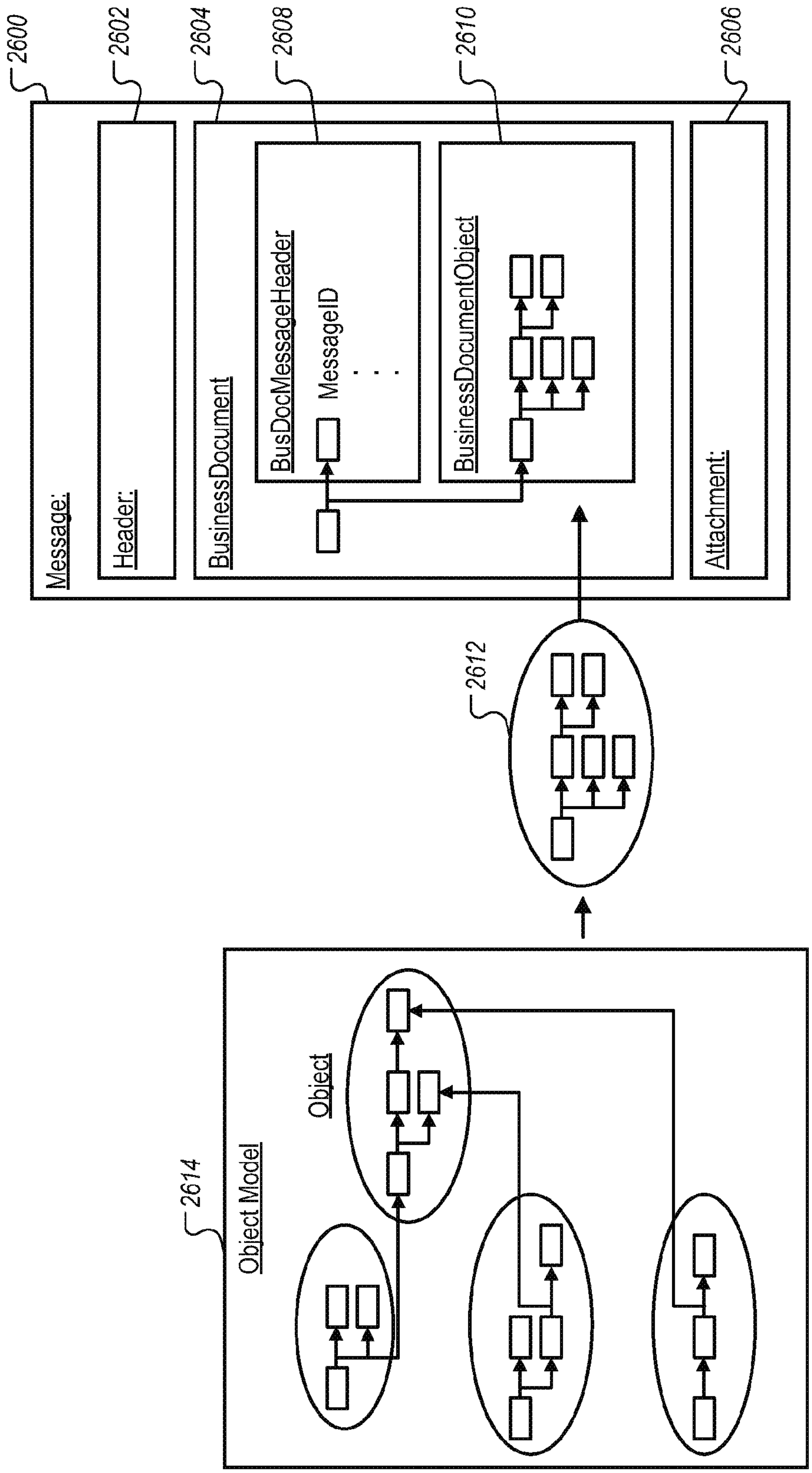
FIG. 26A depicts components of a message in accordance with methods and systems consistent with the subject matter described herein.

As depicted in FIG. 26A, a message 2600 includes a message header 2602 and a business document 2604. The message 2600 also may include an attachment 2606. For example, the sender may attach technical drawings, detailed specifications or pictures of a product to a purchase order for the product. The business document 2604 includes a business document message header 2608 and the business document object 2610. The business document message header 2608 includes administrative data, such as the message ID and a message description. As discussed above, the structure 2612 of the business document object 2610 is derived from the business object model 2614. Thus, there is a strong correlation between the structure of the business document object and the structure of the business object model. The business document object 2610 forms the core of the message 2600.

In collaborative processes as well as Q&A processes, messages should refer to documents from previous messages. A simple business document object ID or object ID is insufficient to identify individual messages uniquely because several versions of the same business document object can be sent during a transaction. A business document object ID with a version number also is insufficient because the same version of a business document object can be sent several times. Thus, messages require several identifiers during the course of a transaction.

Figure 26B:
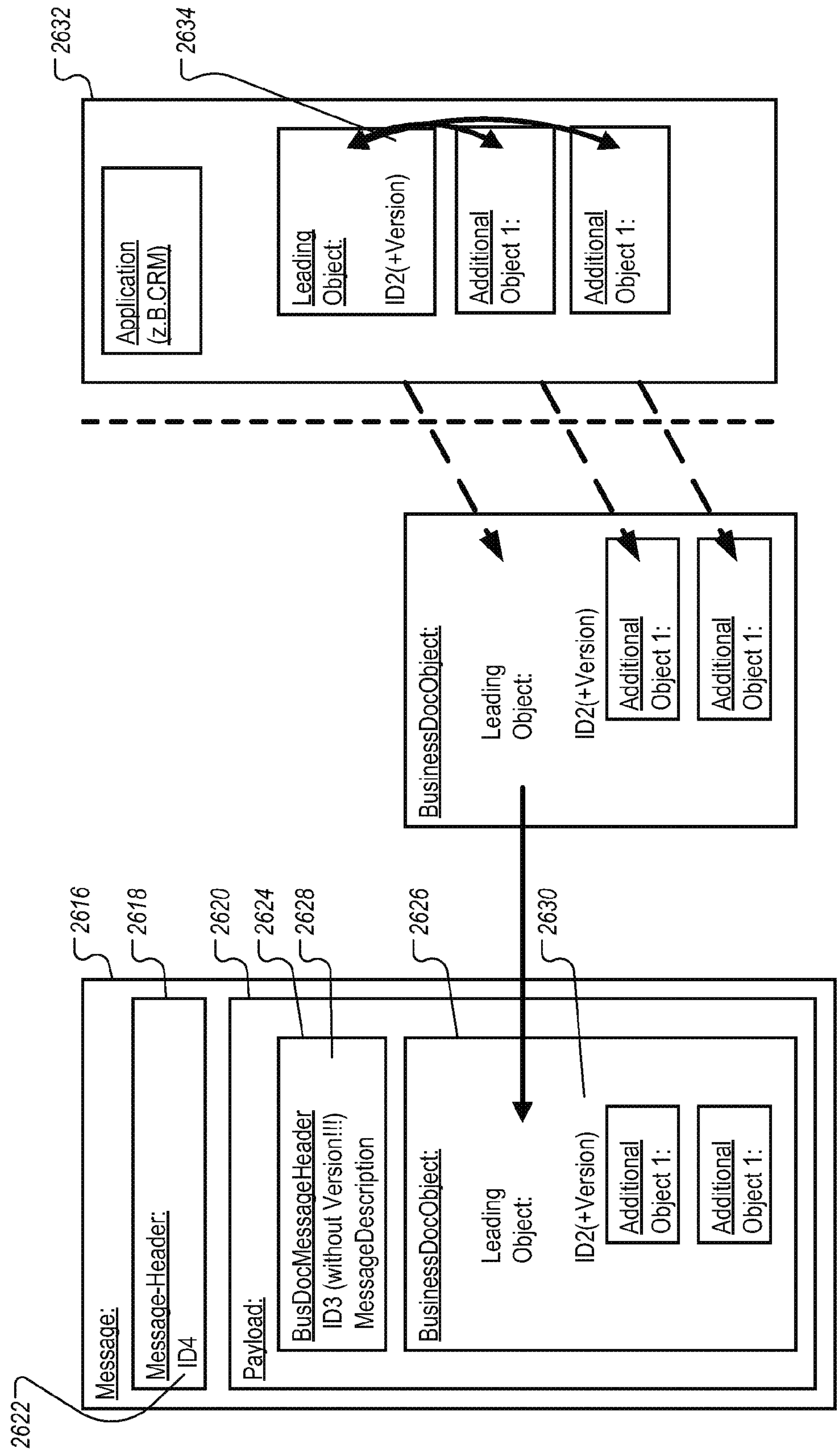
FIG. 26B depicts IDs used in a message in accordance with methods and systems consistent with the subject matter described herein.

As depicted in FIG. 26B, the message header 2618 in message 2616 includes a technical ID ("ID4") 2622 that identifies the address for a computer to route the message. The sender's system manages the technical ID 2622.

The administrative information in the business document message header 2624 of the payload or business document 2620 includes a BusinessDocumentMessageID ("ID3") 2628. The business entity or component 2632 of the business entity manages and sets the BusinessDocumentMessageID 2628. The business entity or component 2632 also can refer to other business documents using the BusinessDocumentMessageID 2628. The receiving component 2632 requires no knowledge regarding the structure of this ID. The BusinessDocumentMessageID 2628 is, as an ID, unique. Creation of a message refers to a point in time. No versioning is typically expressed by the ID. Besides the BusinessDocumentMessageID 2628, there also is a business document object ID 2630, which may include versions.

The component 2632 also adds its own component object ID 2634 when the business document object is stored in the component. The component object ID 2634 identifies the business document object when it is stored within the component. However, not all communication partners may be aware of the internal structure of the component object ID 2634. Some components also may include a versioning in their ID 2634.

7. Use of Interfaces Across Industries

Methods and systems consistent with the subject matter described herein provide interfaces that may be used across different business areas for different industries. Indeed, the interfaces derived using methods and systems consistent with the subject matter described herein may be mapped onto the interfaces of different industry standards. Unlike the interfaces provided by any given standard that do not include the interfaces required by other standards, methods and systems consistent with the subject matter described herein provide a set of consistent interfaces that correspond to the interfaces provided by different industry standards. Due to the different fields provided by each standard, the interface from one standard does not easily map onto another standard. By comparison, to map onto the different industry standards, the interfaces derived using methods and systems consistent with the subject matter described herein include most of the fields provided by the interfaces of different industry standards. Missing fields may easily be included into the business object model. Thus, by derivation, the interfaces can be extended consistently by these fields. Thus, methods and systems consistent with the subject matter described herein provide consistent interfaces or services that can be used across different industry standards.

Figure 28:
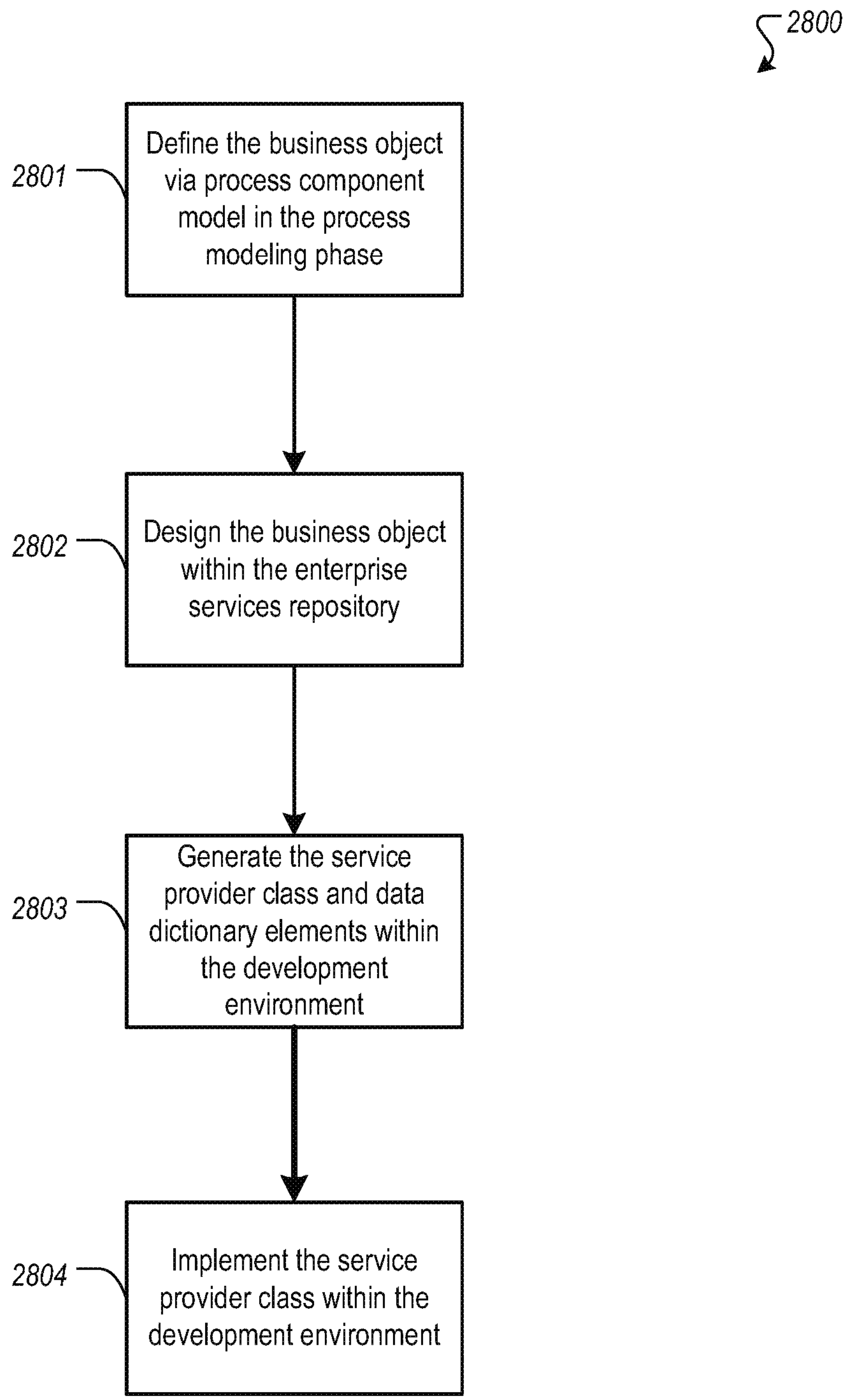
FIG. 28 illustrates an example method for service enabling in accordance with one embodiment of the present disclosure.
Figure 29:
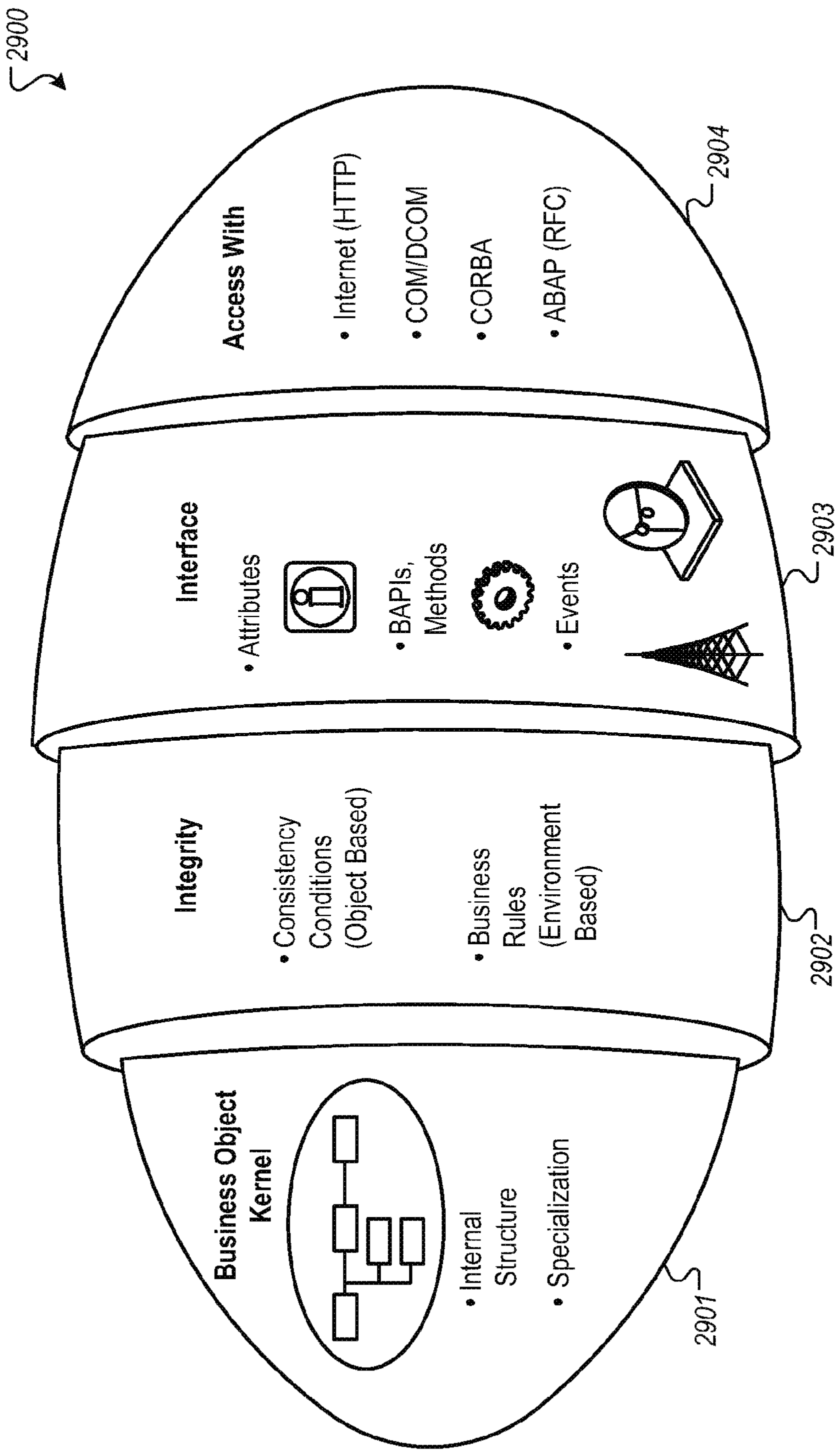
FIG. 29 is a graphical illustration of an example business object and associated components as may be used in the enterprise service infrastructure system of the present disclosure.

For example, FIG. 28 illustrates an example method 2800 for service enabling. In this example, the enterprise services infrastructure may offer one common and standard-based service infrastructure. Further, one central enterprise services repository may support uniform service definition, implementation and usage of services for user interface, and cross-application communication. In step 2801, a business object is defined via a process component model in a process modeling phase. Next, in step 2802, the business object is designed within an enterprise services repository. For example, FIG. 29 provides a graphical representation of one of the business objects 2900. As shown, an innermost layer or kernel 2901 of the business object may represent the business object's inherent data. Inherent data may include, for example, an employee's name, age, status, position, address, etc. A second layer 2902 may be considered the business object's logic. Thus, the layer 2902 includes the rules for consistently embedding the business object in a system environment as well as constraints defining values and domains applicable to the business object. For example, one such constraint may limit sale of an item only to a customer with whom a company has a business relationship. A third layer 2903 includes validation options for accessing the business object. For example, the third layer 2903 defines the business object's interface that may be interfaced by other business objects or applications. A fourth layer 2904 is the access layer that defines technologies that may externally access the business object.

Accordingly, the third layer 2903 separates the inherent data of the first layer 2901 and the technologies used to access the inherent data. As a result of the described structure, the business object reveals only an interface that includes a set of clearly defined methods. Thus, applications access the business object via those defined methods. An application wanting access to the business object and the data associated therewith usually includes the information or data to execute the clearly defined methods of the business object's interface. Such clearly defined methods of the business object's interface represent the business object's behavior. That is, when the methods are executed, the methods may change the business object's data. Therefore, an application may utilize any business object by providing the information or data without having any concern for the details related to the internal operation of the business object. Returning to method 2800, a service provider class and data dictionary elements are generated within a development environment at step 2803. In step 2804, the service provider class is implemented within the development environment.

Figure 30:
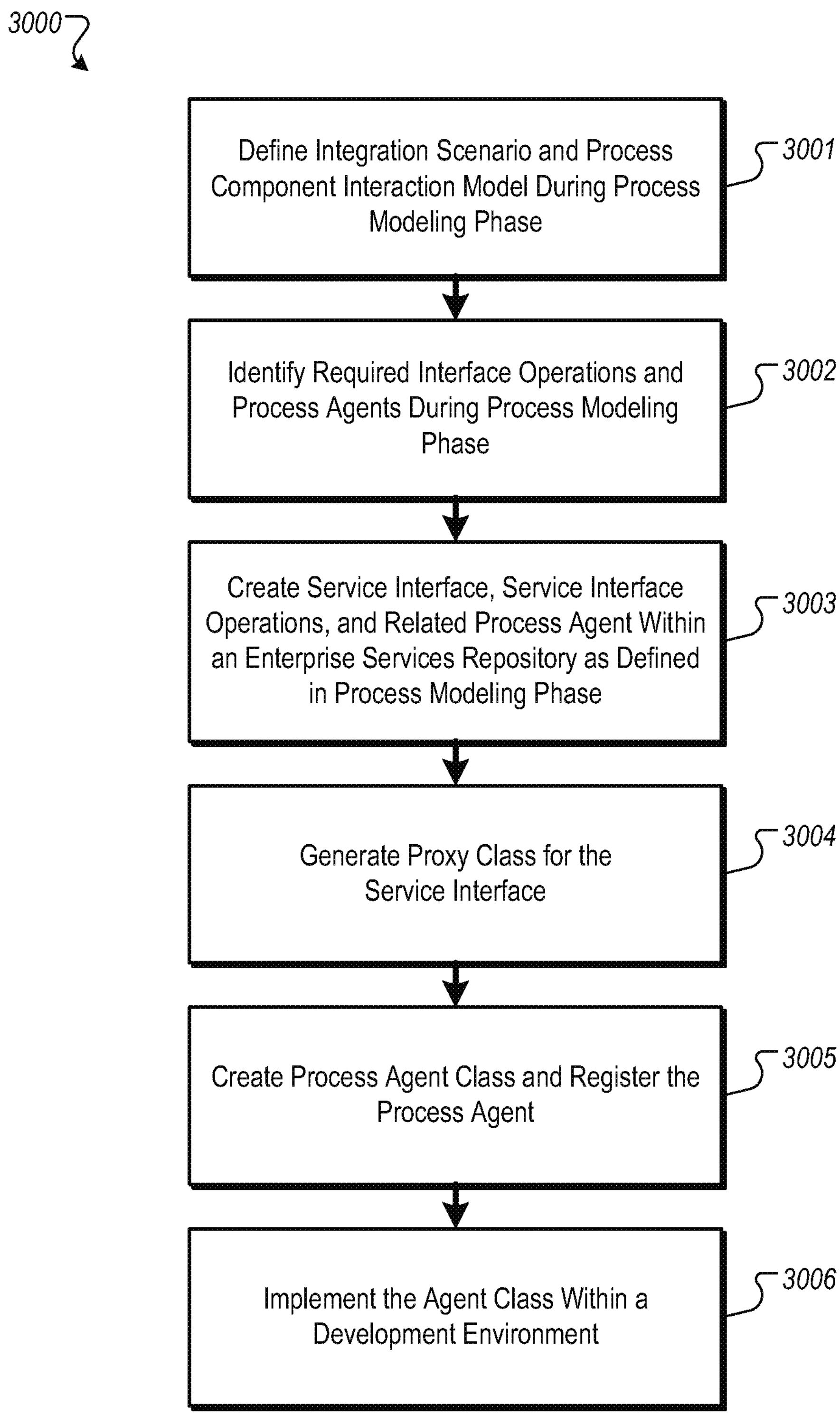
FIG. 30 illustrates an example method for managing a process agent framework in accordance with one embodiment of the present disclosure.

FIG. 30 illustrates an example method 3000 for a process agent framework. For example, the process agent framework may be the basic infrastructure to integrate business processes located in different deployment units. It may support a loose coupling of these processes by message based integration. A process agent may encapsulate the process integration logic and separate it from business logic of business objects. As shown in FIG. 30, an integration scenario and a process component interaction model are defined during a process modeling phase in step 3001. In step 3002, required interface operations and process agents are identified during the process modeling phase also. Next, in step 3003, a service interface, service interface operations, and the related process agent are created within an enterprise services repository as defined in the process modeling phase. In step 3004, a proxy class for the service interface is generated. Next, in step 3005, a process agent class is created and the process agent is registered. In step 3006, the agent class is implemented within a development environment.

Figure 31:
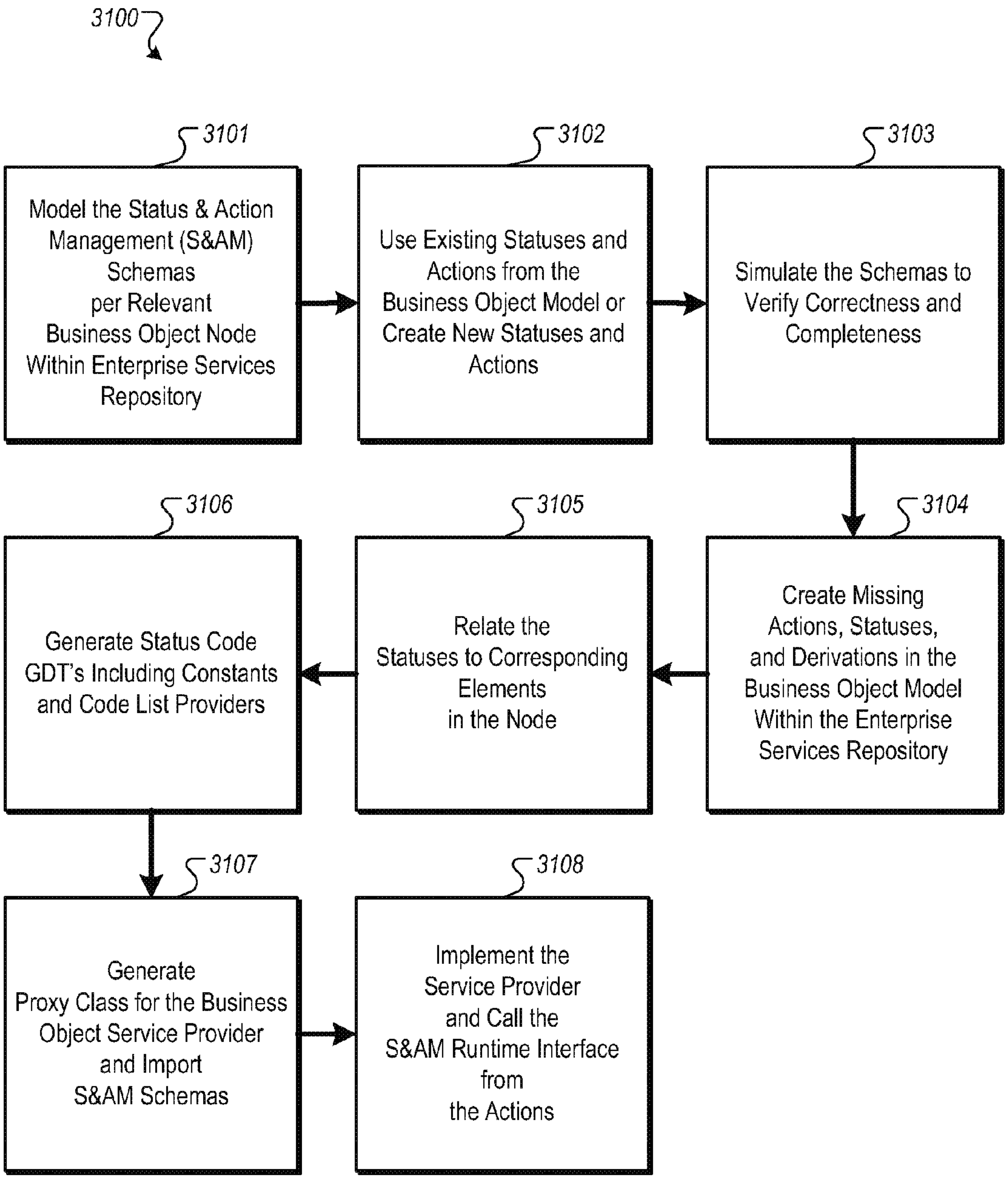
FIG. 31 illustrates an example method for status and action management in accordance with one embodiment of the present disclosure.

FIG. 31 illustrates an example method 3100 for status and action management (S&AM). For example, status and action management may describe the life cycle of a business object (node) by defining actions and statuses (as their result) of the business object (node), as well as, the constraints that the statuses put on the actions. In step 3101, the status and action management schemas are modeled per a relevant business object node within an enterprise services repository. In step 3102, existing statuses and actions from the business object model are used or new statuses and actions are created. Next, in step 3103, the schemas are simulated to verify correctness and completeness. In step 3104, missing actions, statuses, and derivations are created in the business object model with the enterprise services repository. Continuing with method 3100, the statuses are related to corresponding elements in the node in step 3105. In step 3106, status code GDT's are generated, including constants and code list providers. Next, in step 3107, a proxy class for a business object service provider is generated and the proxy class S&AM schemas are imported. In step 3108, the service provider is implemented and the status and action management runtime interface is called from the actions.

Regardless of the particular hardware or software architecture used, the disclosed systems or software are generally capable of implementing business objects and deriving (or otherwise utilizing) consistent interfaces that are suitable for use across industries, across businesses, and across different departments within a business in accordance with some or all of the following description. In short, system 100 contemplates using any appropriate combination and arrangement of logical elements to implement some or all of the described functionality.

Moreover, the preceding flowcharts and accompanying description illustrate example methods. The present services environment contemplates using or implementing any suitable technique for performing these and other tasks. It will be understood that these methods are for illustration purposes only and that the described or similar techniques may be performed at any appropriate time, including concurrently, individually, or in combination. In addition, many of the steps in these flowcharts may take place simultaneously and/or in different orders than as shown. Moreover, the services environment may use methods with additional steps, fewer steps, and/or different steps, so long as the methods remain appropriate. The message choreography of FIG. 32 describes a possible logical sequence of massages that can be used to realize a Credit Portfolio Management business scenario.

Credit Portfolio Model Interfaces

Figure 32:
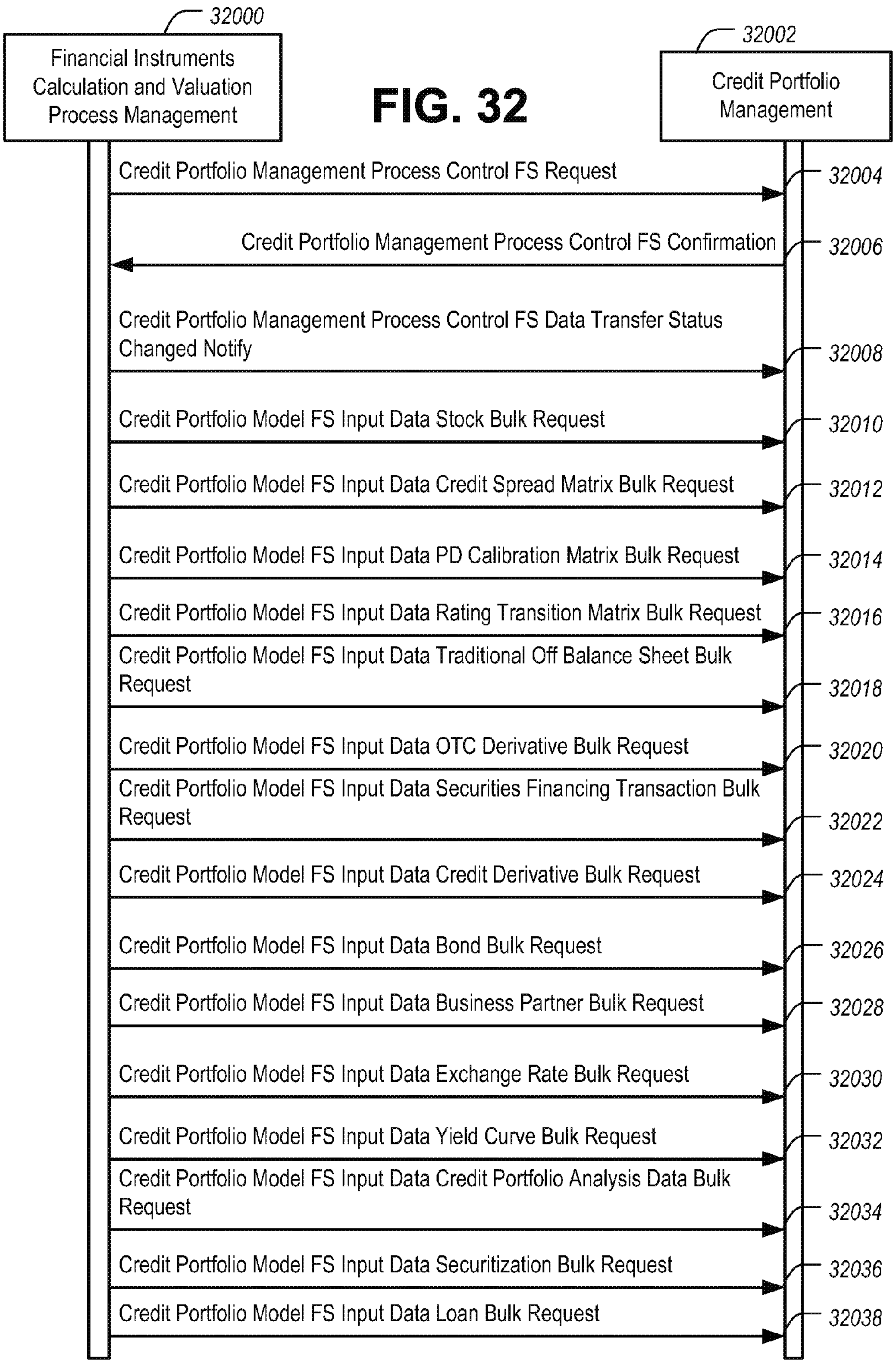
FIG. 32 illustrates an exemplary Credit Portfolio Model Message Choreography.

A "Financial Instruments Calculation and Valuation Process Management" system 32000 can request the creation of a credit portfolio management process control from a "Credit Portfolio Management" system 32002, using a Credit Portfolio Management Process Control FS Request message 32004 as shown, for example, in FIG. 32. The Credit Portfolio Management Process Control FS Request message 32004 can be sent by a Request Credit Portfolio Management Process Control operation that is included in a Credit Portfolio Management Process Control Out interface.

The "Credit Portfolio Management" system 32002 can request the confirmation of the creation of the credit portfolio management process control from the "Financial Instruments Calculation and Valuation Process Management" system 32000, using a Credit Portfolio management Process Control FS Confirmation message 32006 as shown, for example, in FIG. 32. The Credit Portfolio management Process Control FS Confirmation message 32006 is received by the Request Credit Portfolio Management Process Control operation.

The "Financial Instruments Calculation and Valuation Process Management" system 32000 can request the notification of a transfer status change of the credit portfolio management process control from the "Credit Portfolio Management" system 32002, using a Credit Portfolio Management Process Control FS Data Transfer Status Changed Notify message 32008 as shown, for examples, in FIG. 32. The Credit Portfolio Management Process Control FS Data Transfer Status Changed Notify message 32008 can be sent by a Notify of Data Transfer Status Change operation that is included in the Credit Portfolio Management Process Control Out interface.

The "Financial Instruments Calculation and Valuation Process Management" system 32000 can request the creation of several stocks from the "Credit Portfolio Management" system 32002, using a Credit Portfolio Model FS Input Data Stock Bulk Request message 32010 as shown, for example, in FIG. 32. The Credit Portfolio Model FS Input Data Stock Bulk Request message 32010 can be sent by a Request Input Data Stock as Bulk operation that is included in a Credit Portfolio Model Out interface.

The "Financial Instruments Calculation and Valuation Process Management" system 32000 can request the creation of several credit spread matrices from the "Credit Portfolio Management" system 32002, using a Credit Portfolio Model FS Input Data Credit Spread Matrix Bulk Request message 32012 as shown, for example, in FIG. 32. The Credit Portfolio Model FS Input Data Credit Spread Matrix Bulk Request message 32012 can be sent by a Request Input Data Credit Spread Matrix as Bulk operation included in the Credit Portfolio Model Out interface.

The "Financial Instruments Calculation and Valuation Process Management" system 32000 can request the creation of several PD calibration matrices from the "Credit Portfolio Management" system 32002, using a Credit Model FS Input Data PD Calibration Matrix Bulk Request message 32014 as shown, for example, in FIG. 32. The Credit Model FS Input Data PD Calibration Matrix Bulk Request message 32014 can be sent by a Request Input Data Probability of Default Calibration Matrix as Bulk operation included in the Credit Portfolio Model Out interface.

The "Financial Instruments Calculation and Valuation Process Management" system 32000 can request the creation of several rating transition matrices from the "Credit Portfolio Management" system 32002, using a Credit Portfolio Model FS Input Data Rating Transition Matrix Bulk Request message 32016 as shown, for example, in FIG. 32. The Credit Portfolio Model FS Input Data Rating Transition Matrix Bulk Request message 32016 can be sent by a Request Input Data Rating Transition Matrix as Bulk operation included in the Credit Portfolio Model Out interface.

The "Financial Instruments Calculation and Valuation Process Management" system 32000 can request the creation of several traditional off balance sheets from the "Credit Portfolio Management" system 32002, using a Credit Portfolio Model FS Input Data Traditional Off Balance Sheet Bulk Request message 32018 as shown, for example, in FIG. 32. The Portfolio Model FS Input Data Traditional Off Balance Sheet Bulk Request message 32018 can be sent by a Request Input Data Traditional Off Balance Sheet Item as Bulk operation included in the Credit Portfolio Model Out interface.

The "Financial Instruments Calculation and Valuation Process Management" system 32000 can request the creation of several OTC derivatives from the "Credit Portfolio Management" system 32002, using a Credit Portfolio Model FS Input Data OTC Derivative Bulk Request message 32020 as shown, for example, in FIG. 32. The Credit Portfolio Model FS Input Data OTC Derivative Bulk Request message 32020 can be sent by a Request Input Data OTC Derivative as Bulk operation included in the Credit Portfolio Model Out interface.

The "Financial Instruments Calculation and Valuation Process Management" system 32000 can request the creation of several securities financing transactions from the "Credit Portfolio Management" system 32002, using a Credit Portfolio Model FS Input Data Securities Financing Transaction Bulk Request message 32022 as shown, for example, in FIG. 32. The Credit Portfolio Model FS Input Data Securities Financing Transaction Bulk Request message 32022 can be sent by a Request Input Data Securities Financing Transaction as Bulk operation included in the Credit Portfolio Model Out interface.

The "Financial Instruments Calculation and Valuation Process Management" system 32000 can request the creation of several credit derivatives from the "Credit Portfolio Management" system 32002, using a Credit Portfolio Model FS Input Data Credit Derivative Bulk Request message 32024 as shown, for example, in FIG. 32. The Credit Portfolio Model FS Input Data Credit Derivative Bulk Request message 32024 can be sent by a Request Input Data Credit Derivative as Bulk operation included in the Credit Portfolio Model Out interface.

The "Financial Instruments Calculation and Valuation Process Management" system 32000 can request the creation of several bonds from the "Credit Portfolio Management" system 32002, using a Credit Portfolio Model FS Input Data Bond Bulk Request message 32026 as shown, for example, in FIG. 32. The Credit Portfolio Model FS Input Data Bond Bulk Request message 32026 can be sent by a Request Input Data Bond as Bulk operation included in the Credit Portfolio Model Out interface.

The "Financial Instruments Calculation and Valuation Process Management" system 32000 can request the creation of several business partners from the "Credit Portfolio Management" system 32002, using a Credit Portfolio Model FS Input Data Business Partner Bulk Request message 32028 as shown, for example, in FIG. 32. The Credit Portfolio Model FS Input Data Business Partner Bulk Request message 32028 can be sent by a Request Input Data Business Partner as Bulk operation included in the Credit Model Out interface.

The "Financial Instruments Calculation and Valuation Process Management" system 32000 can request the creation of several exchange rates from the "Credit Portfolio Management" system 32002, using a Credit Portfolio Model FS Input Data Exchange Rate Bulk Request message 32030 as shown, for example, in FIG. 32. The Credit Portfolio Model FS Input Data Exchange Rate Bulk Request message 32030 can be sent by a Request Input Data Exchange Rate as Bulk operation included in the Credit Model Out interface.

The "Financial Instruments Calculation and Valuation Process Management" system 32000 can request the creation of several yield curves from the "Credit Portfolio Management" system 32002, using a Credit Portfolio Model FS Input Data Yield Curve Bulk Request message 32032 as shown, for example, in FIG. 32. The Credit Portfolio Model FS Input Data Yield Curve Bulk Request message 32032 can be sent by a Request Input Data Yield Curve as Bulk operation included in the Credit Model Out interface.

The "Financial Instruments Calculation and Valuation Process Management" system 32000 can request the creation of several credit portfolio analyses from the "Credit Portfolio Management" system 32002, using a Credit Portfolio Model FS Input Data Credit Portfolio Analysis Data Bulk Request message 32032 as shown, for example, in FIG. 32. The Credit Portfolio Model FS Input Data Credit Portfolio Analysis Data Bulk Request message 32032 can be sent by a Request Input Data Credit Portfolio Analysis Data as Bulk operation included in the Credit Model Out interface.

The "Financial Instruments Calculation and Valuation Process Management" system 32000 can request the creation of several securitizations from the "Credit Portfolio Management" system 32002, using a Credit Portfolio Model FS Input Data Securitization Bulk Request message 32036 as shown, for example, in FIG. 32. The Credit Portfolio Model FS Input Data Securitization Bulk Request message 32036 can be sent by a Request Input Data Securitization as Bulk operation included in the Credit Model Out interface.

The "Financial Instruments Calculation and Valuation Process Management" system 32000 can request the creation of several loans from the "Credit Portfolio Management" system 32002, using a Credit Portfolio Model FS Input Data Loan Bulk Request message 32038 as shown, for example, in FIG. 32. The Credit Portfolio Model FS Input Data Loan Bulk Request message 32038 can be sent by a Request Input Data Loan as Bulk operation included in the Credit Portfolio Model Out interface.

Figures 1, 33:
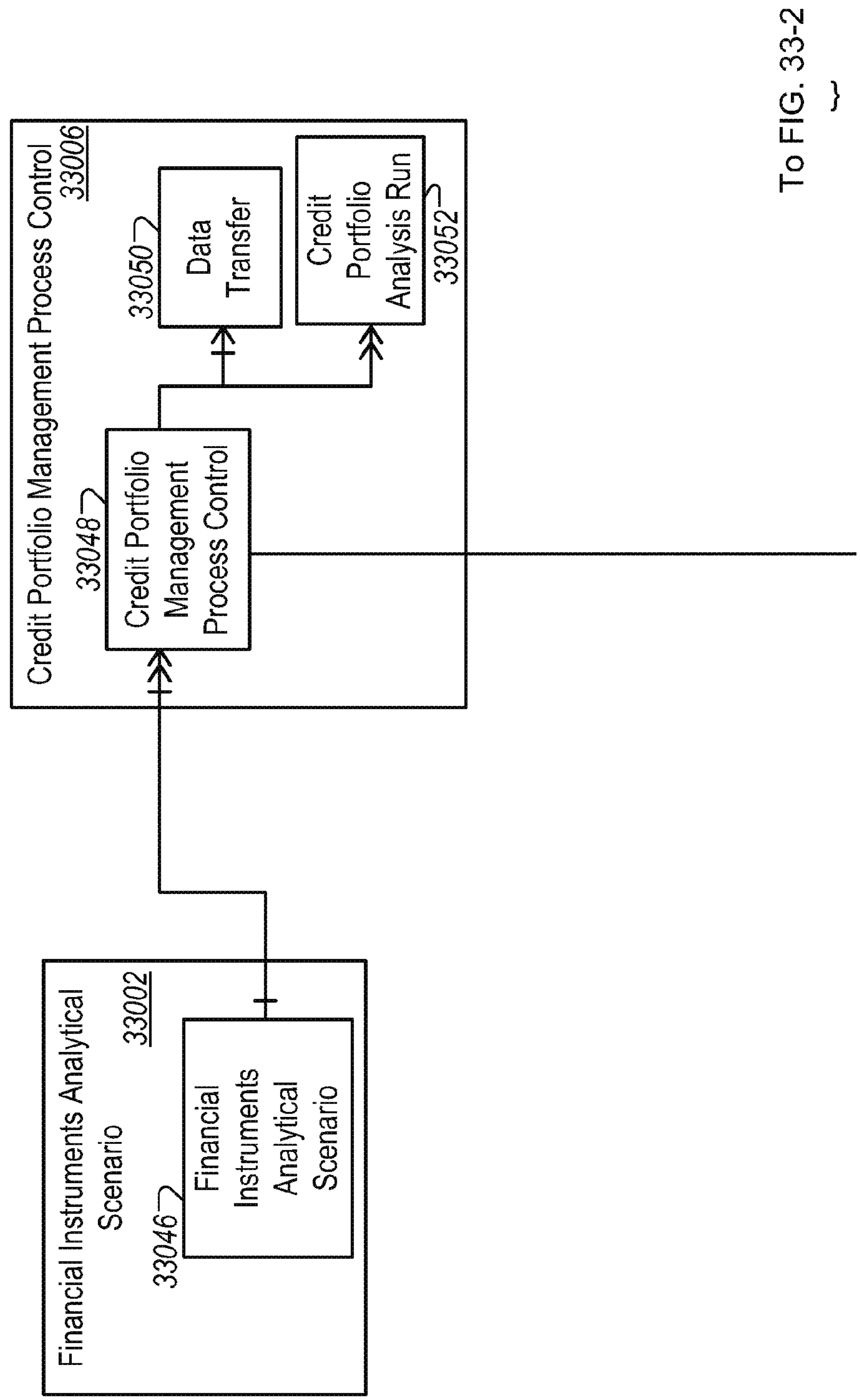
Figures 2, 33:
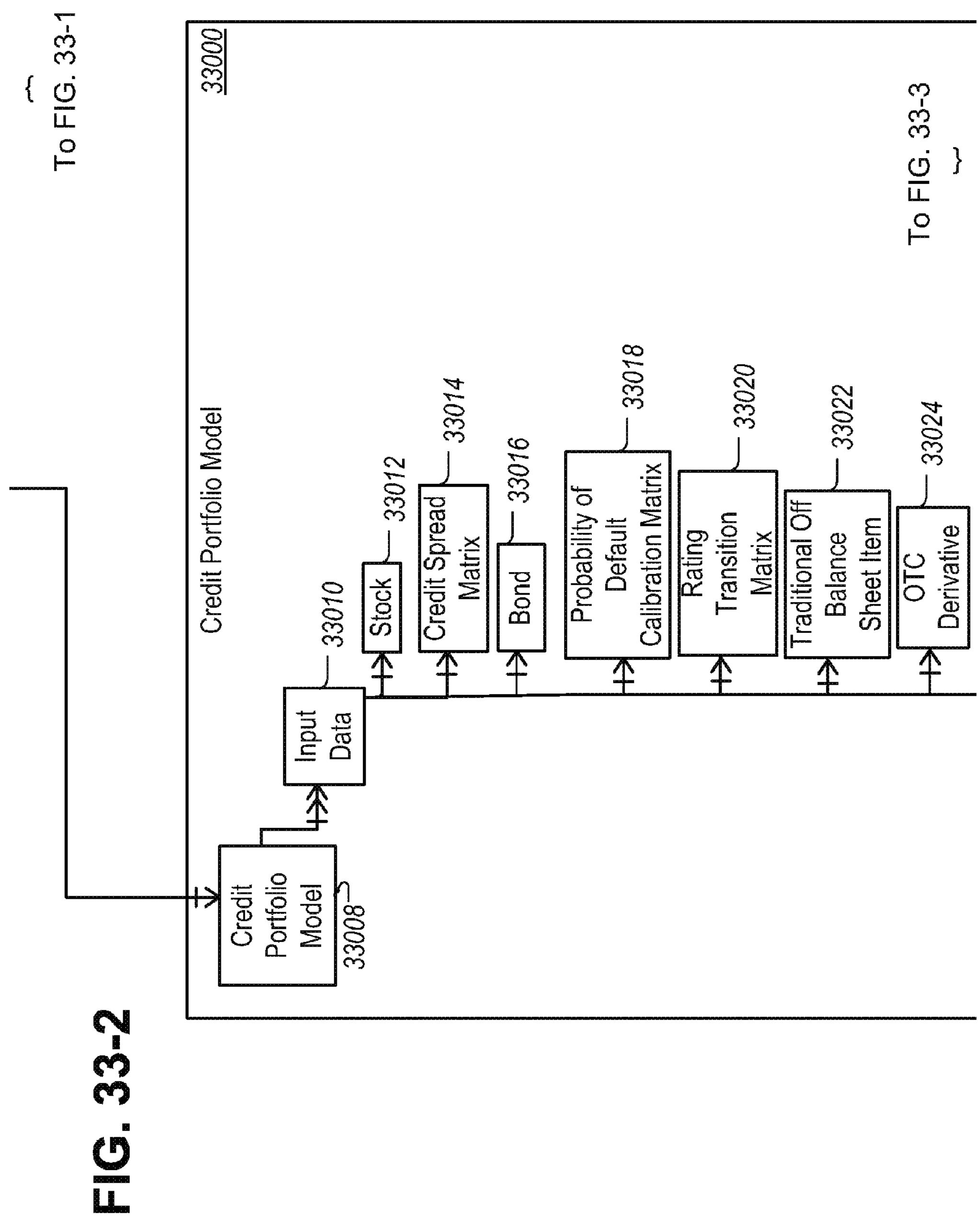
Figures 3, 33:
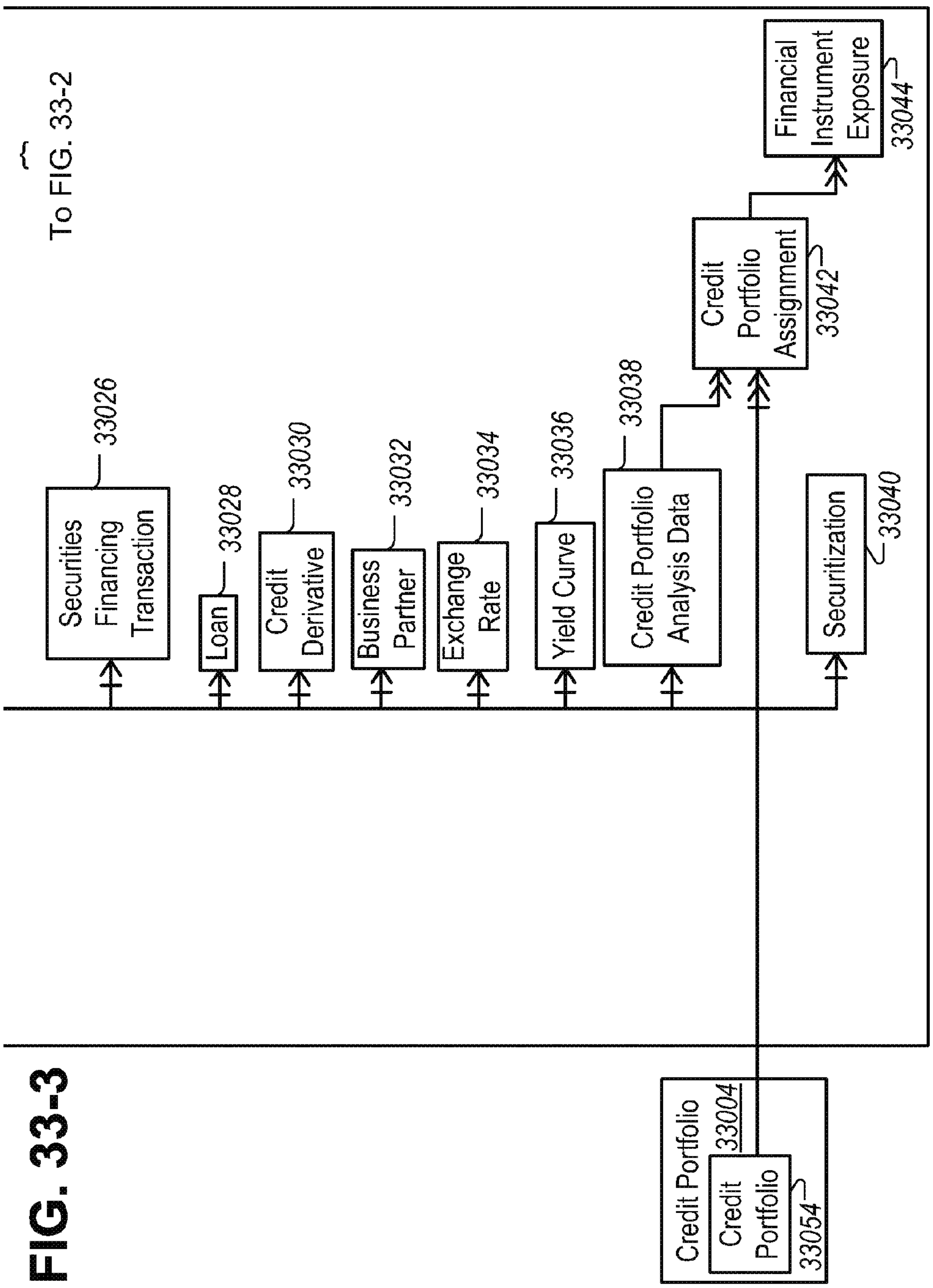

FIGS. 33-1 through 33-3 illustrate an example Credit Portfolio Model business object model 33000. Specifically, this model depicts interactions among various components of the Credit Portfolio Model, as well as external components that interact with the Credit Portfolio Model (shown here as 33002 through 33006 and 33046 through 33054). Credit Portfolio Model 33000 includes elements 33008 through 33044. Credit Portfolio Model 33000 includes for example, a Credit Spread Matrix 33014.

Figures 1, 34:
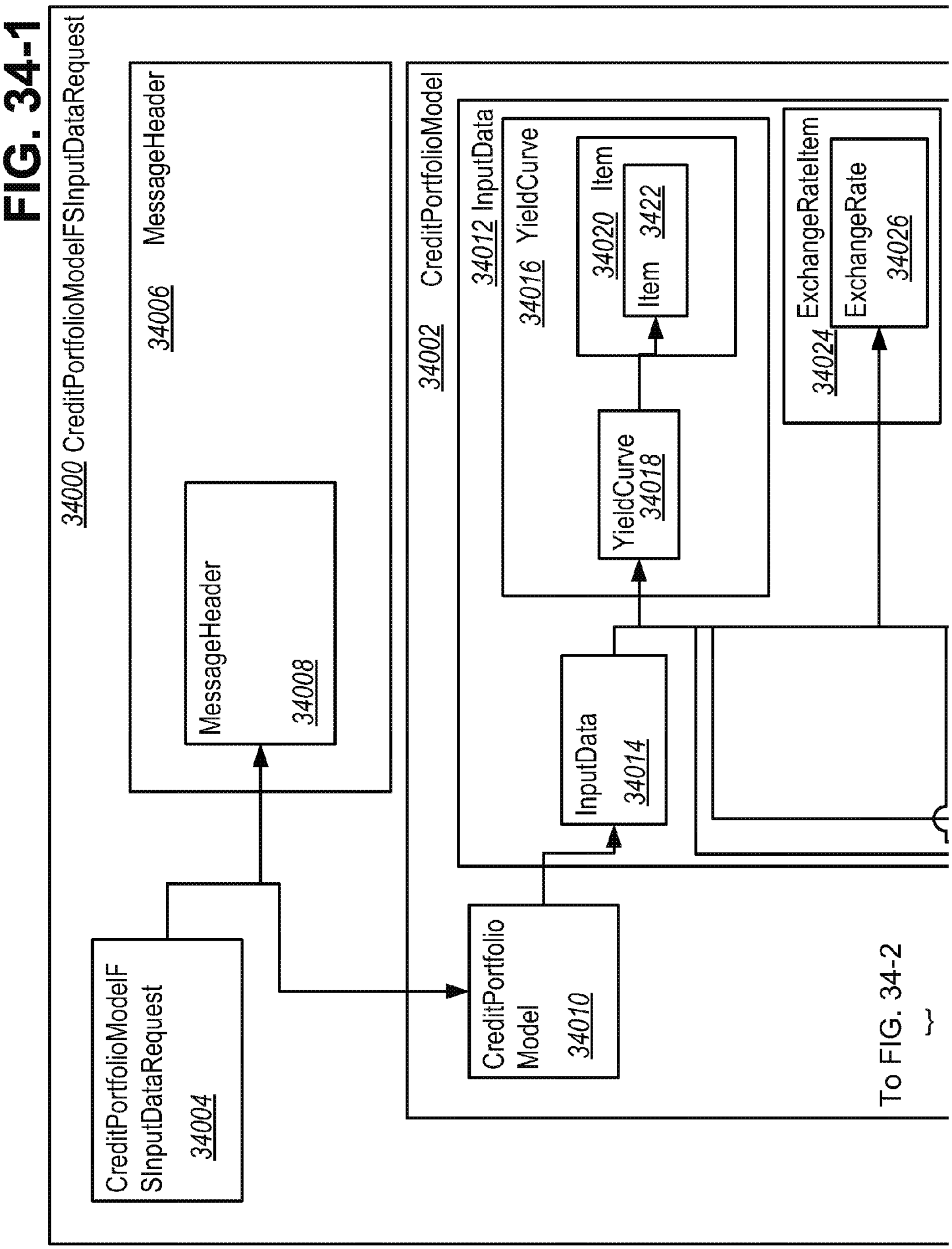
Figures 2, 34:
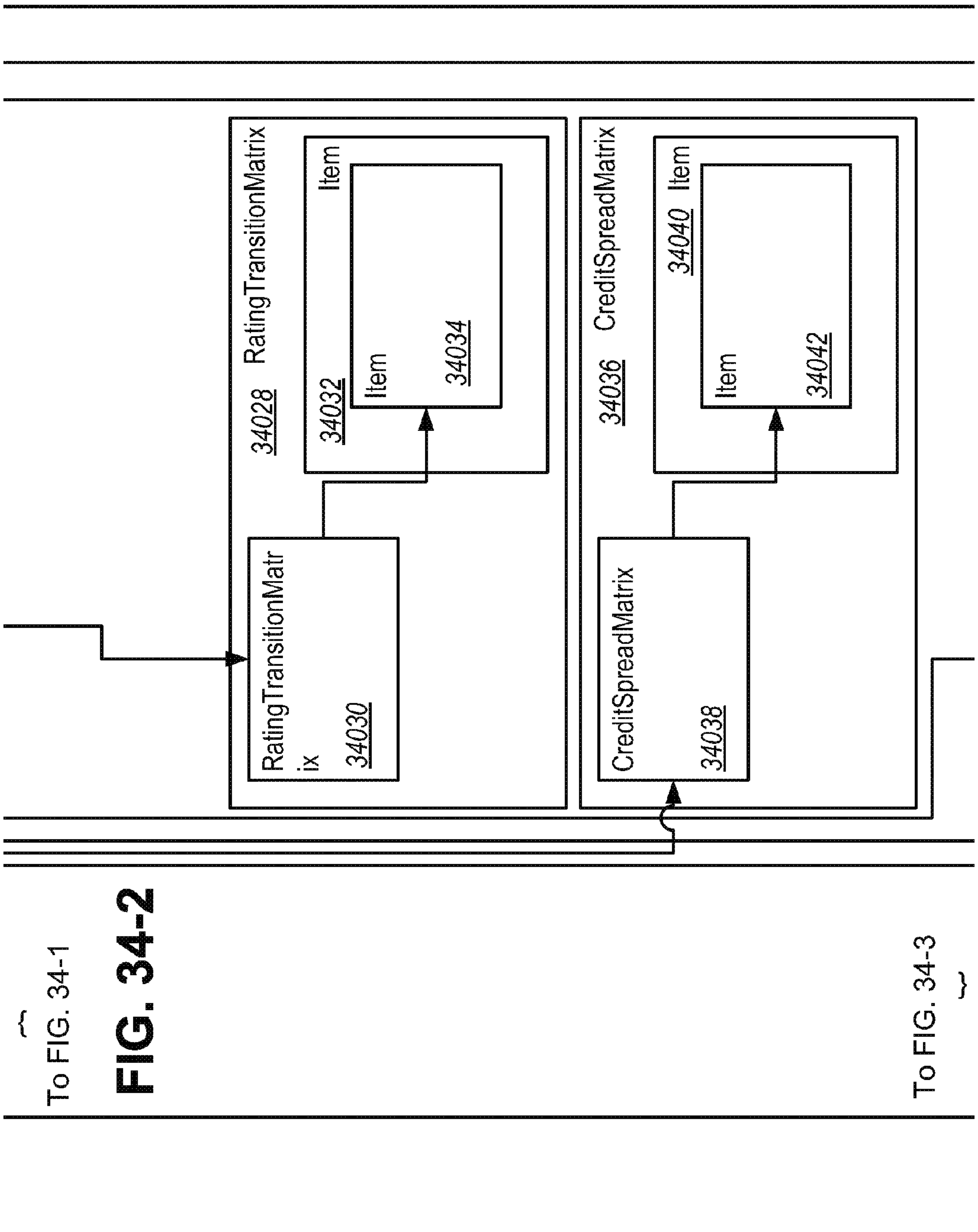
Figures 3, 34:
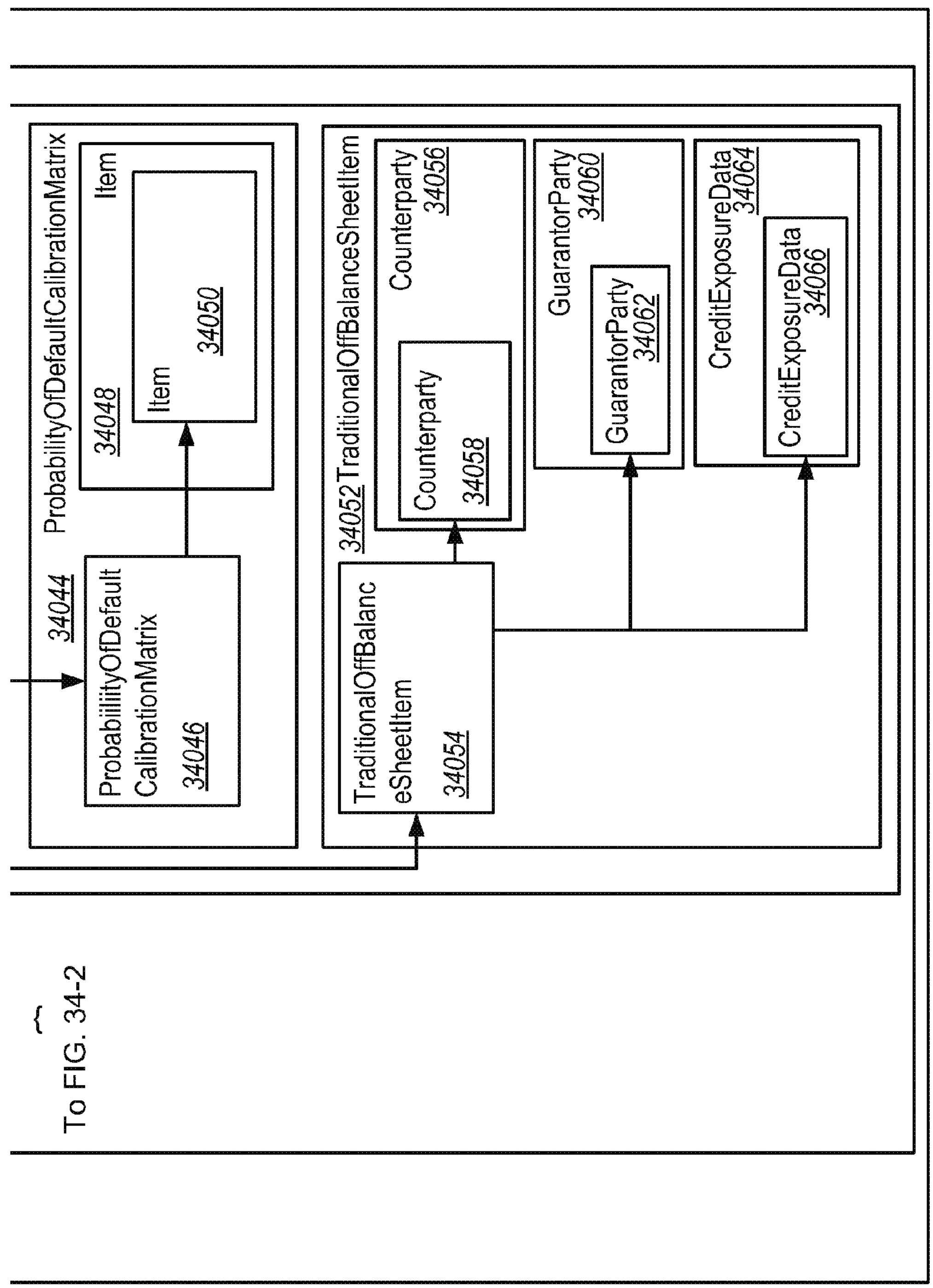

FIGS. 34-1 through 34-3 illustrate one example logical configuration of a CreditPortfolioModelFSInputDataRequest message 34000. Specifically, this figure depicts the arrangement and hierarchy of various component such as one or more levels of packages, entities, and datatypes, shown here as 34002 through 34066. As describes above, packages may be used to represent hierarchy levels. Entities are discrete business elements that are used during a business transaction. Data types are used to type object entities and interfaces with a structure. For example, the CreditPortfolioModelFSInputDataRequest message 34000 includes, among other things, a CreditPortfolioModel 34010. Accordingly, heterogeneous applications may communicate using this consistent message configured as such.

Figures 1, 35:
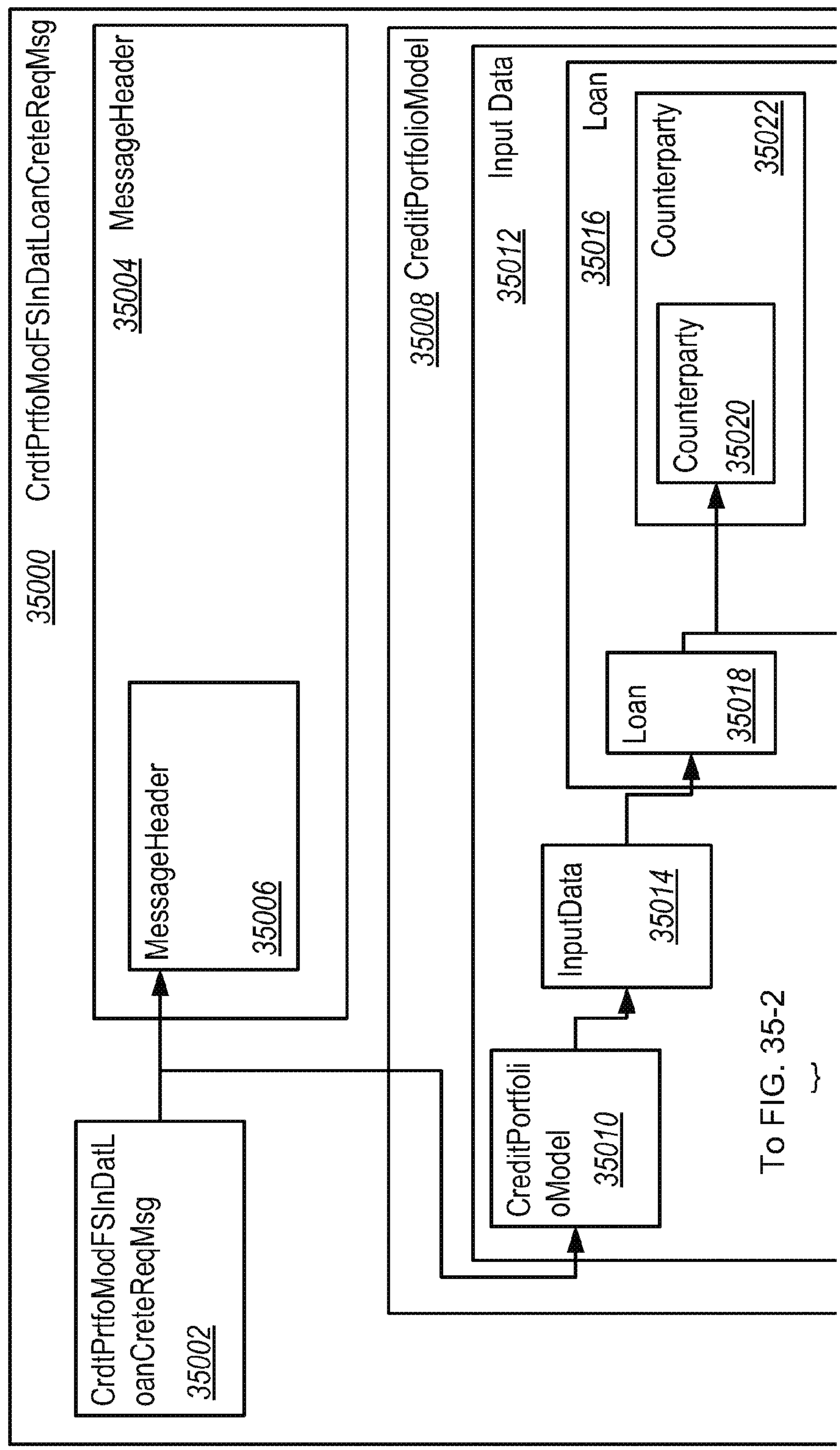
Figures 2, 35:
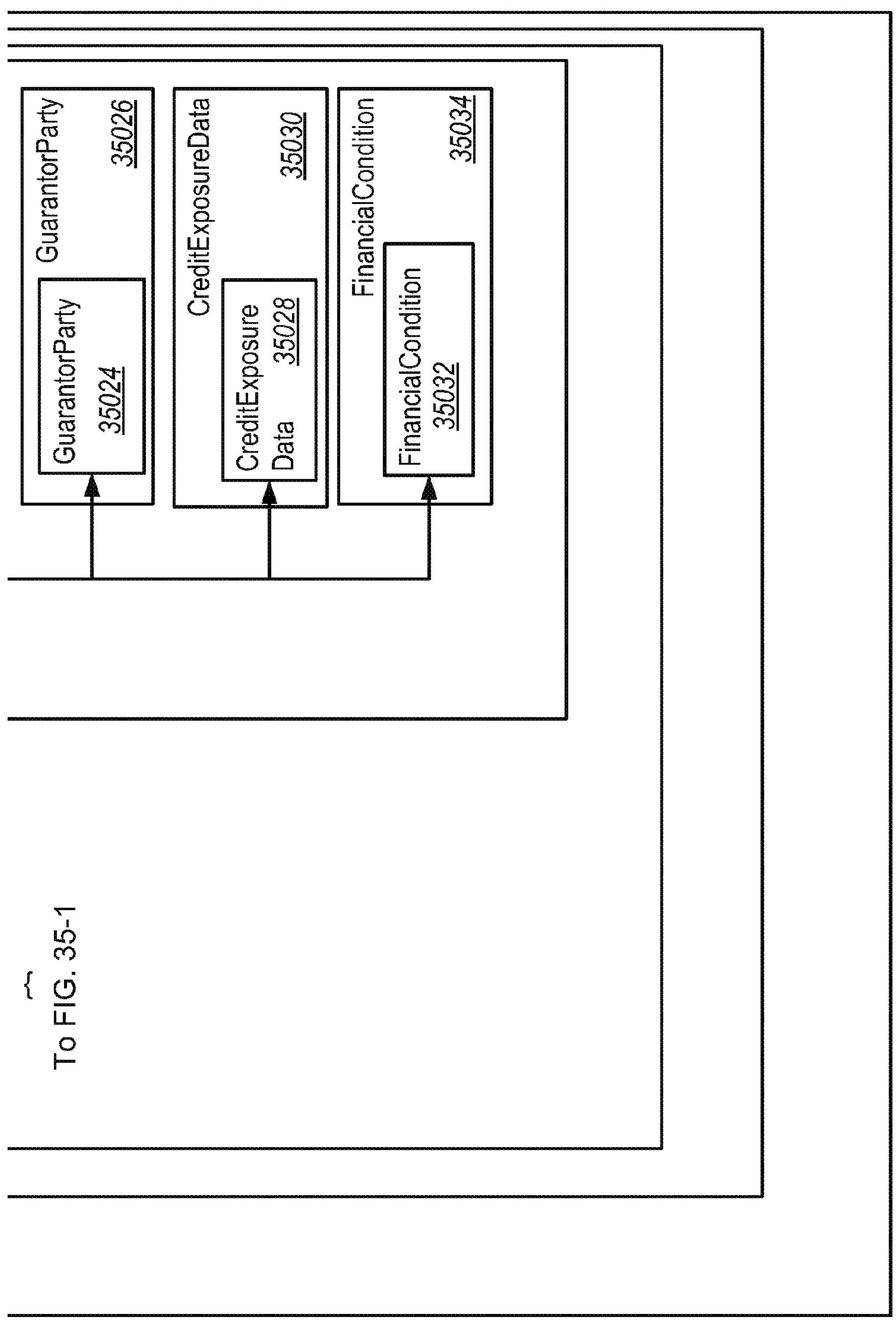

FIGS. 35-1 through 35-2 illustrate one example logical configuration of a CrdtPrtfoModFSInDatLoanCreteReqMsg message 35000. Specifically, this figure depicts the arrangement and hierarchy of various component such as one or more levels of packages, entities, and datatypes, shown here as 35002 through 35034. As describes above, packages may be used to represent hierarchy levels. Entities are discrete business elements that are used during a business transaction. Data types are used to type object entities and interfaces with a structure. For example, the CrdtPrtfoModFSInDatLoanCreteReqMsg message 35000 includes, among other things, a CreditPortfolioModel 35010. Accordingly, heterogeneous applications may communicate using this consistent message configured as such.

Figures 1, 36:
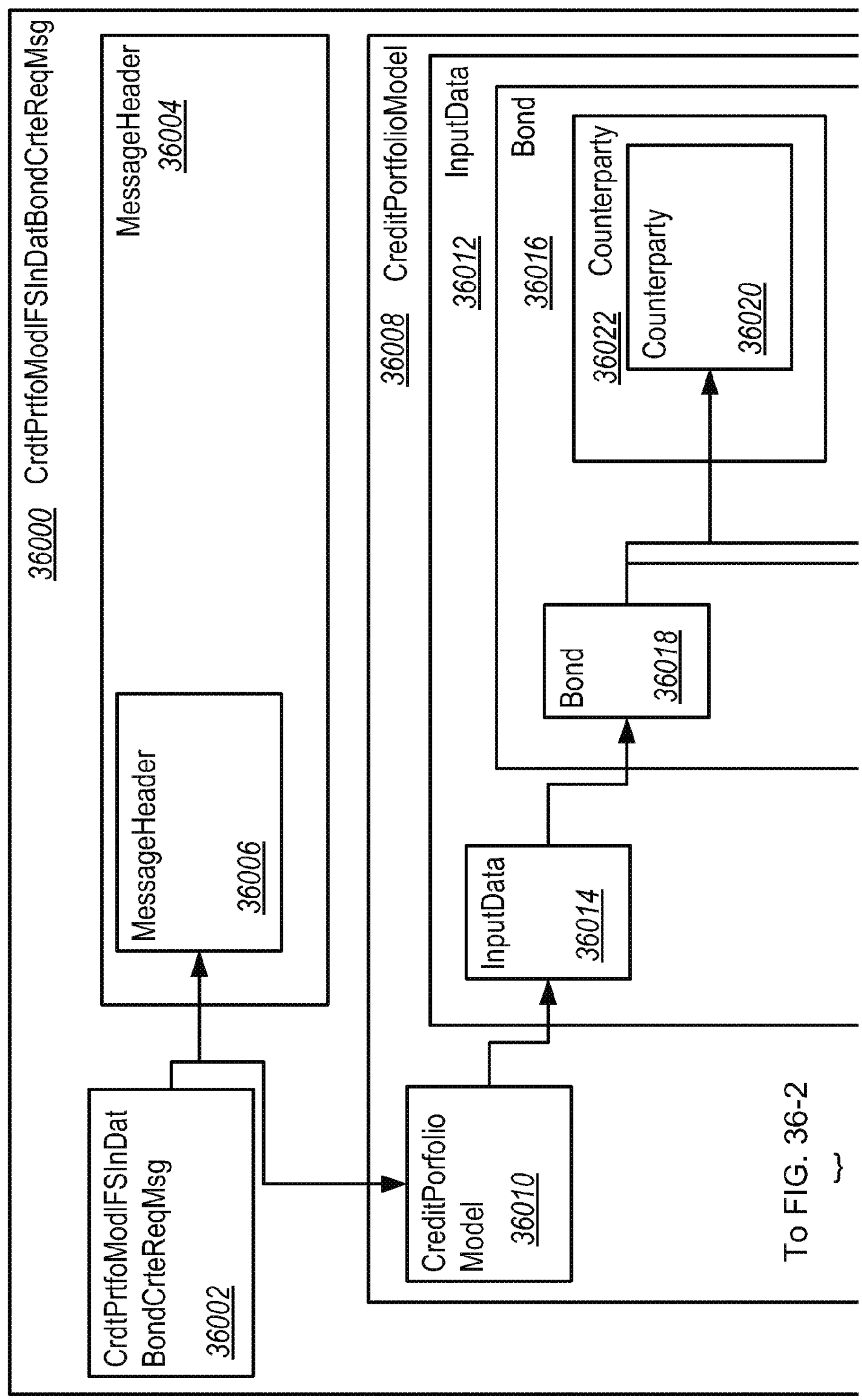
Figures 2, 36:
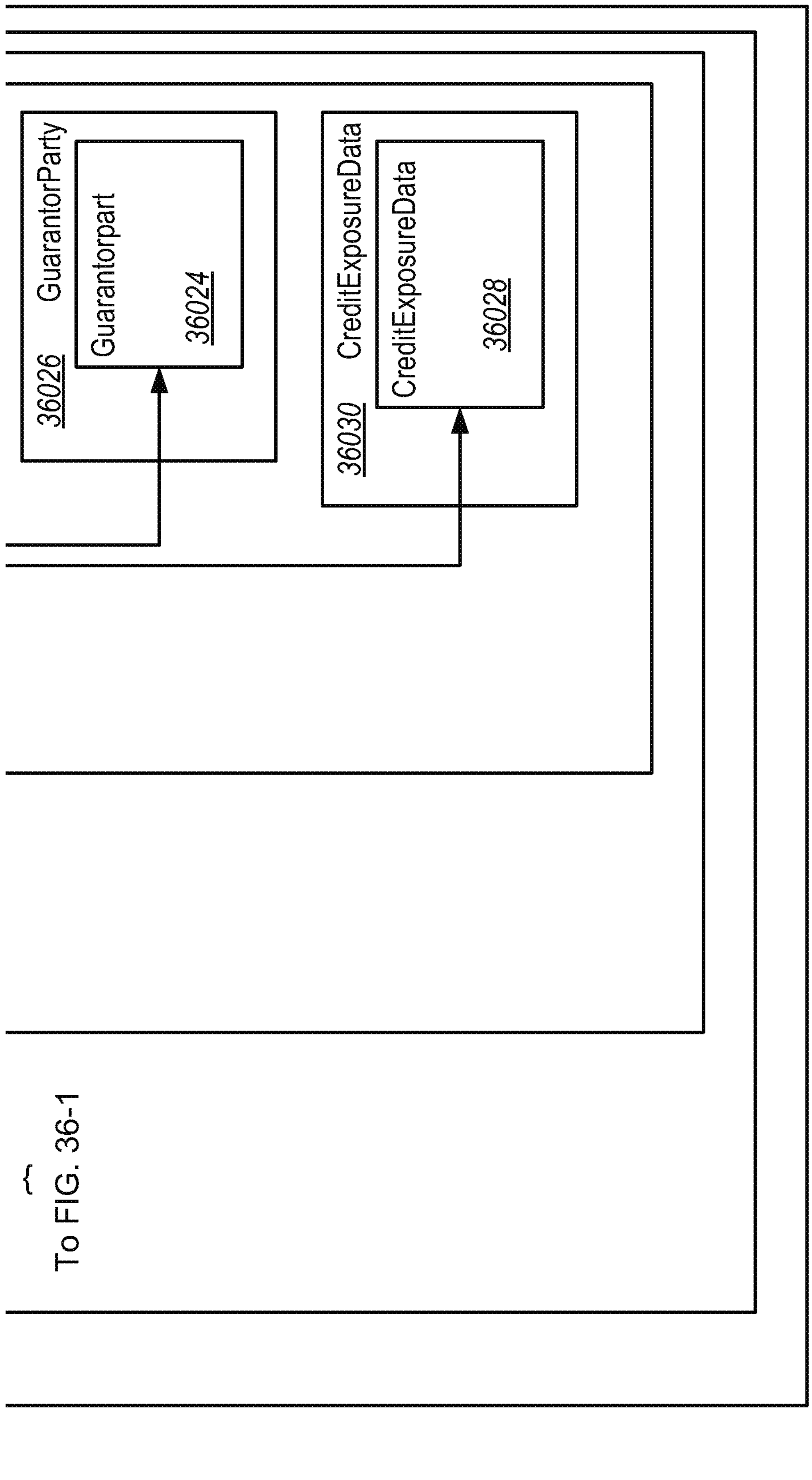

FIGS. 36-1 through 36-2 illustrate one example logical configuration of a CrdtPrtfoModlFSInDatBondCrteReqMsg message 36000. Specifically, this figure depicts the arrangement and hierarchy of various component such as one or more levels of packages, entities, and datatypes, shown here as 36002 through 36030. As describes above, packages may be used to represent hierarchy levels. Entities are discrete business elements that are used during a business transaction. Data types are used to type object entities and interfaces with a structure. For example, the CrdtPrtfoModlFSInDatBondCrteReqMsg message 36000 includes, among other things, a CreditPortfolioModel 36010. Accordingly, heterogeneous applications may communicate using this consistent message configured as such.

Figure 37:
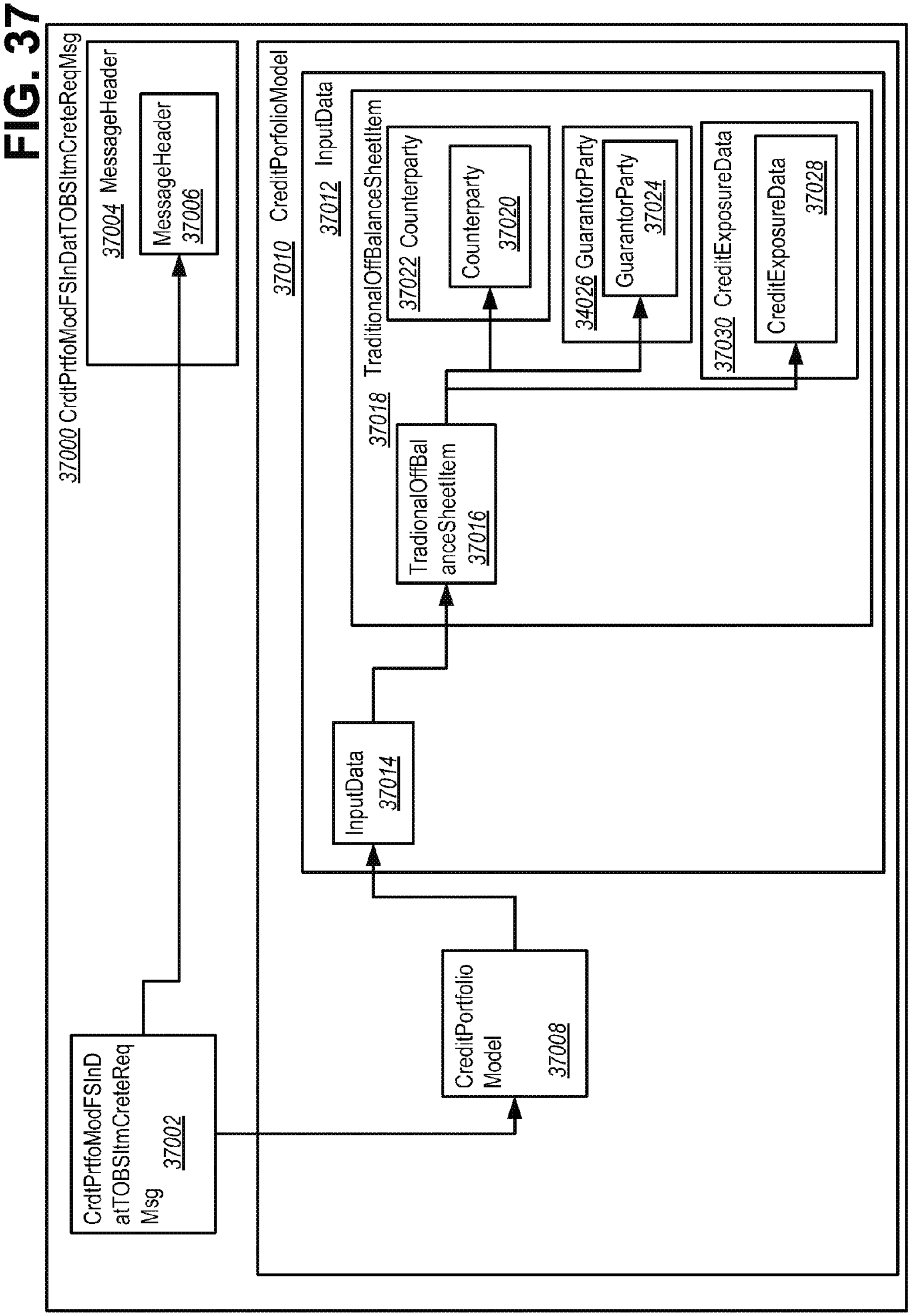
FIG. 37 illustrates an exemplary CrdtPrtfoModFSInDatTOBSItmCrteReqMsg Message Data Type.

FIG. 37 illustrates one example logical configuration of a CrdtPrtfoModFSInDatTOBSItmCreteReqMsg message 37000. Specifically, this figure depicts the arrangement and hierarchy of various component such as one or more levels of packages, entities, and datatypes, shown here as 37002 through 37030. As describes above, packages may be used to represent hierarchy levels. Entities are discrete business elements that are used during a business transaction. Data types are used to type object entities and interfaces with a structure. For example, the CrdtPrtfoModFSInDatTOBSItmCreteReqMsg message 37000 includes, among other things, a CreditPortfolioModel 37008. Accordingly, heterogeneous applications may communicate using this consistent message configured as such.

Figure 38:
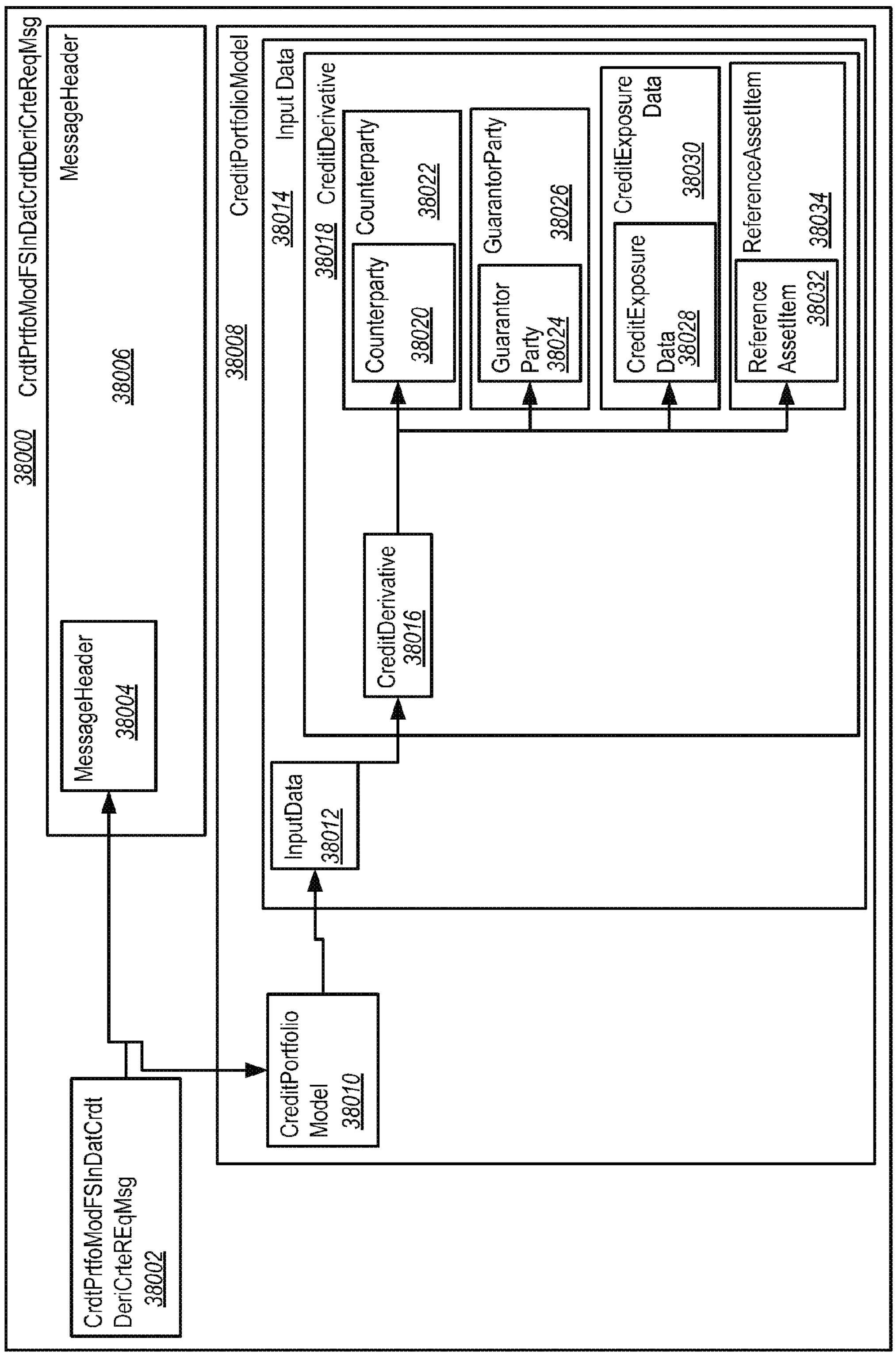
FIG. 38 illustrates an exemplary CrdtPrtfoModFSInDatCrdtDeriCrteReqMsg Message Data Type.

FIG. 38 illustrates one example logical configuration of a CrdtPrtfoModFSInDatCrdtDeriCrteReqMsg message 38000. Specifically, this figure depicts the arrangement and hierarchy of various component such as one or more levels of packages, entities, and datatypes, shown here as 38002 through 37034. As describes above, packages may be used to represent hierarchy levels. Entities are discrete business elements that are used during a business transaction. Data types are used to type object entities and interfaces with a structure.

For example, the CrdtPrtfoModFSInDatCrdtDeriCrteReqMsg message 38000 includes, among other things, a CreditPortfolioModel 38010. Accordingly, heterogeneous applications may communicate using this consistent message configured as such.

Figure 39:
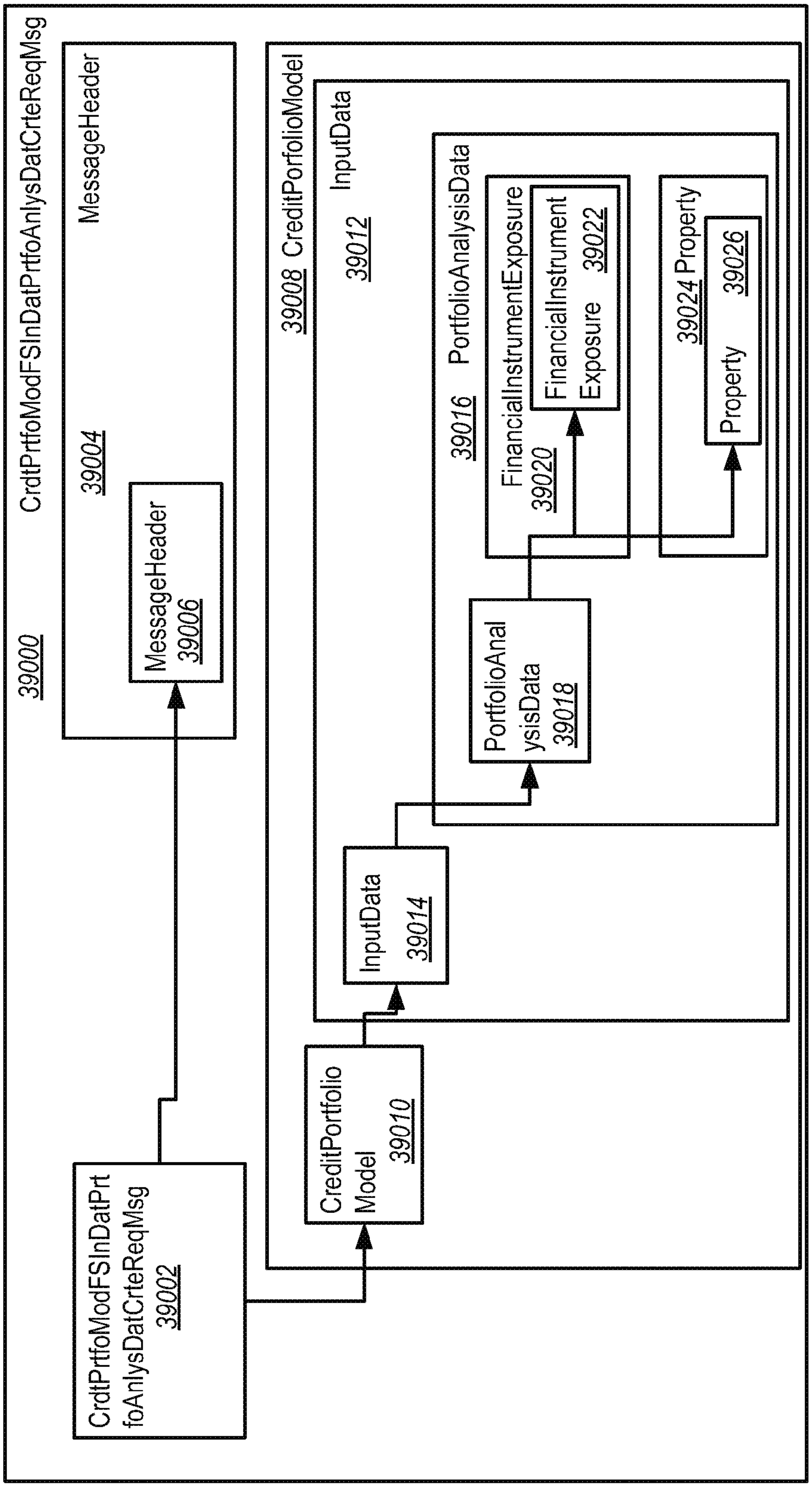
FIG. 39 illustrates an exemplary CrdtPrtfoModFSInDatPrtfoAnlysDatCrteReqMsg Message Data Type.

FIG. 39 illustrates one example logical configuration of a CrdtPrtfoModFSInDatPrtfoAnlysDatCrteReqMsg message 39000. Specifically, this figure depicts the arrangement and hierarchy of various component such as one or more levels of packages, entities, and datatypes, shown here as 39002 through 39026. As describes above, packages may be used to represent hierarchy levels. Entities are discrete business elements that are used during a business transaction. Data types are used to type object entities and interfaces with a structure. For example, the CrdtPrtfoModFSInDatPrtfoAnlysDatCrteReqMsg message 39000 includes, among other things, a CreditPortfolioModel 39010. Accordingly, heterogeneous applications may communicate using this consistent message configured as such.

Figure 40:
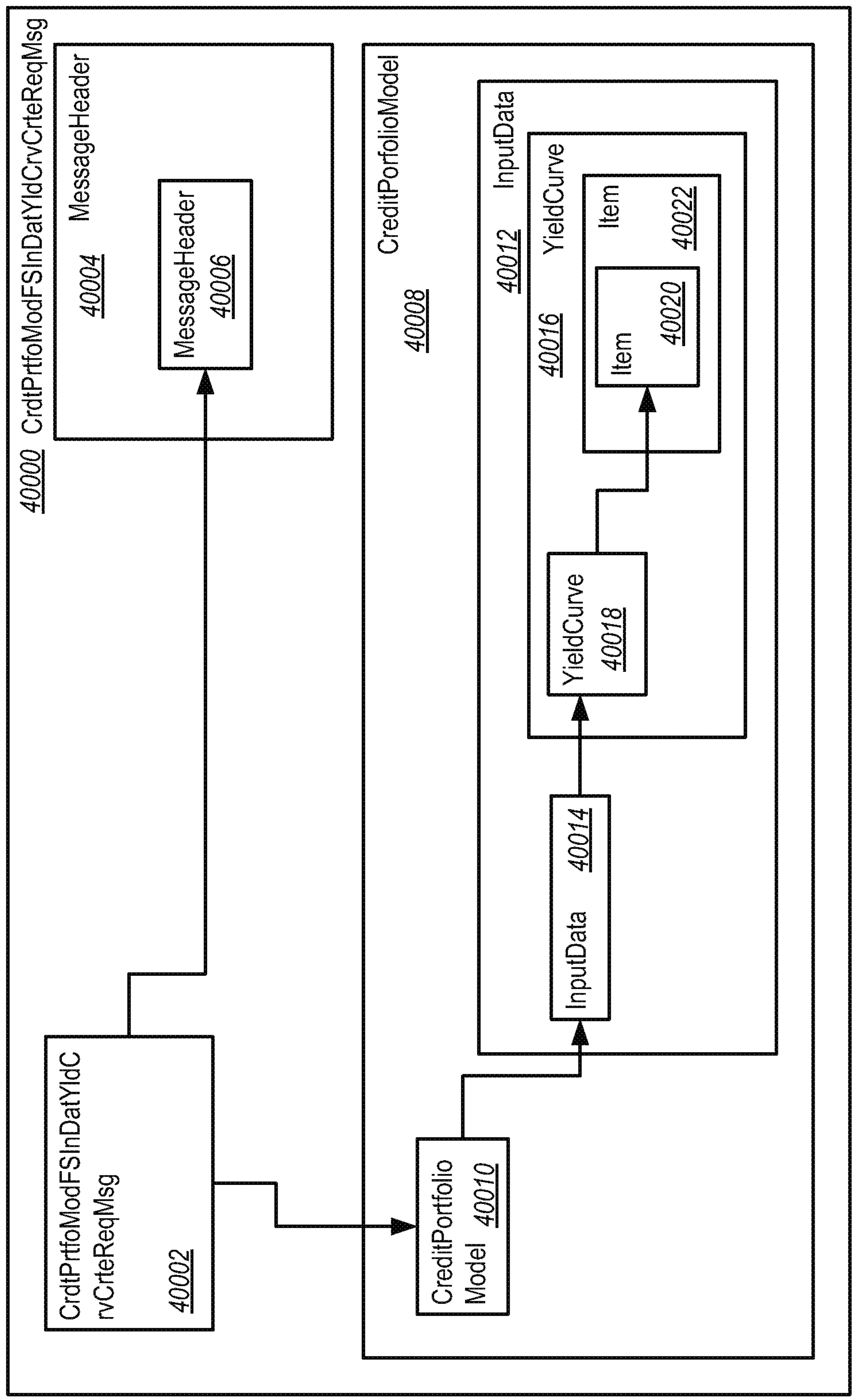
FIG. 40 illustrates an exemplary CrdtPrtfoModFSInDatYldCrvCrteReqMsg Message Data Type.

FIG. 40 illustrates one example logical configuration of a CrdtPrtfoModFSInDatYldCrvCrteReqMsg message 40000. Specifically, this figure depicts the arrangement and hierarchy of various component such as one or more levels of packages, entities, and datatypes, shown here as 40002 through 40022. As describes above, packages may be used to represent hierarchy levels. Entities are discrete business elements that are used during a business transaction. Data types are used to type object entities and interfaces with a structure. For example, the CrdtPrtfoModFSInDatYldCrvCrteReqMsg message 40000 includes, among other things, a CreditPortfolioModel 40010. Accordingly, heterogeneous applications may communicate using this consistent message configured as such.

Figure 41:
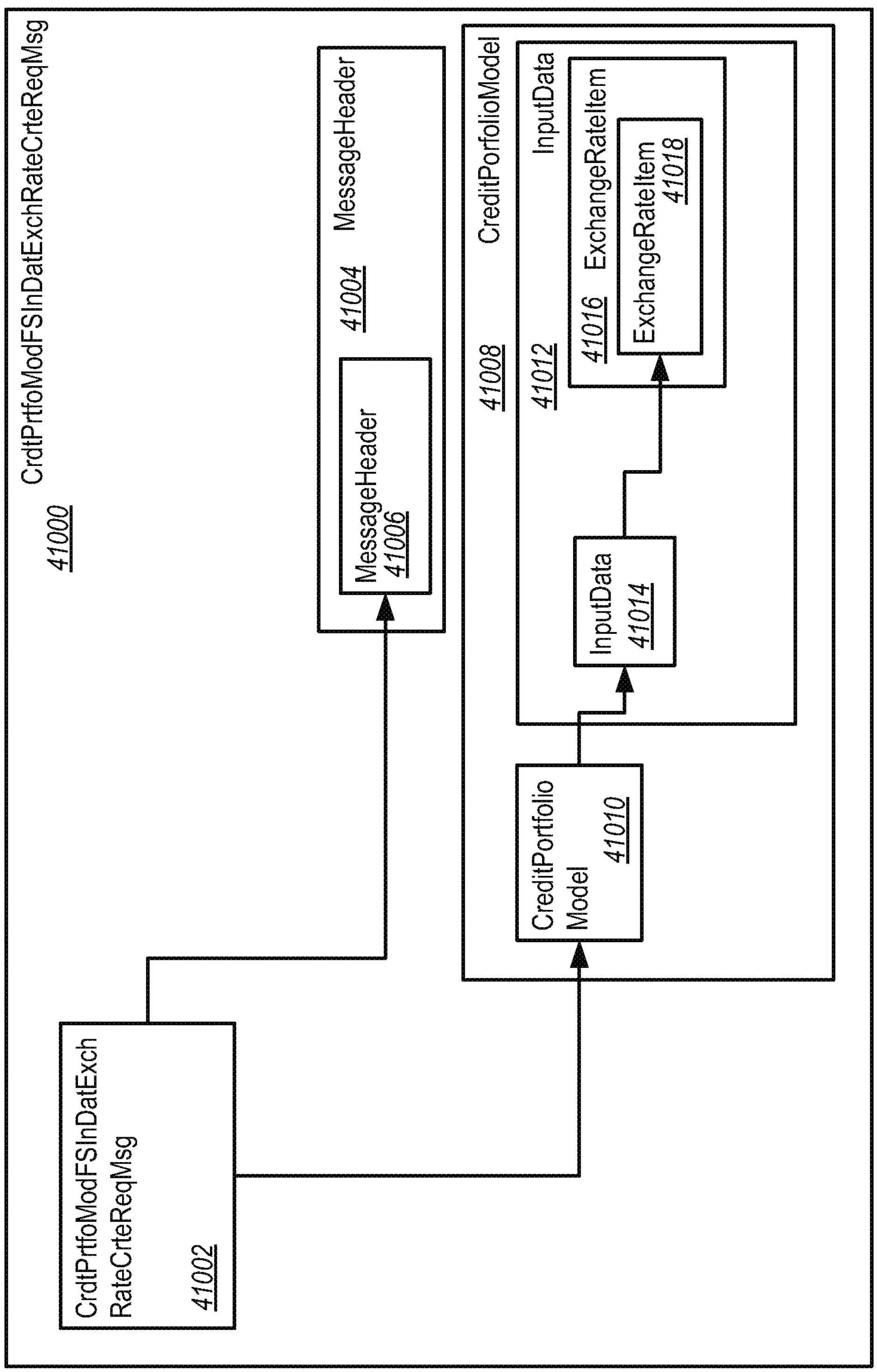
FIG. 41 illustrates an exemplary CrdtPrtfoModFSInDatExchRateCrteReqMsg Message Data Type.

FIG. 41 illustrates one example logical configuration of a CrdtPrtfoModFSInDatExchRateCrteReqMsg message 41000. Specifically, this figure depicts the arrangement and hierarchy of various component such as one or more levels of packages, entities, and datatypes, shown here as 41002 through 41018. As describes above, packages may be used to represent hierarchy levels. Entities are discrete business elements that are used during a business transaction. Data types are used to type object entities and interfaces with a structure. For example, the CrdtPrtfoModFSInDatExchRateCrteReqMsg message 41000 includes, among other things, a CreditPortfolioModel 41010. Accordingly, heterogeneous applications may communicate using this consistent message configured as such.

Figure 42:
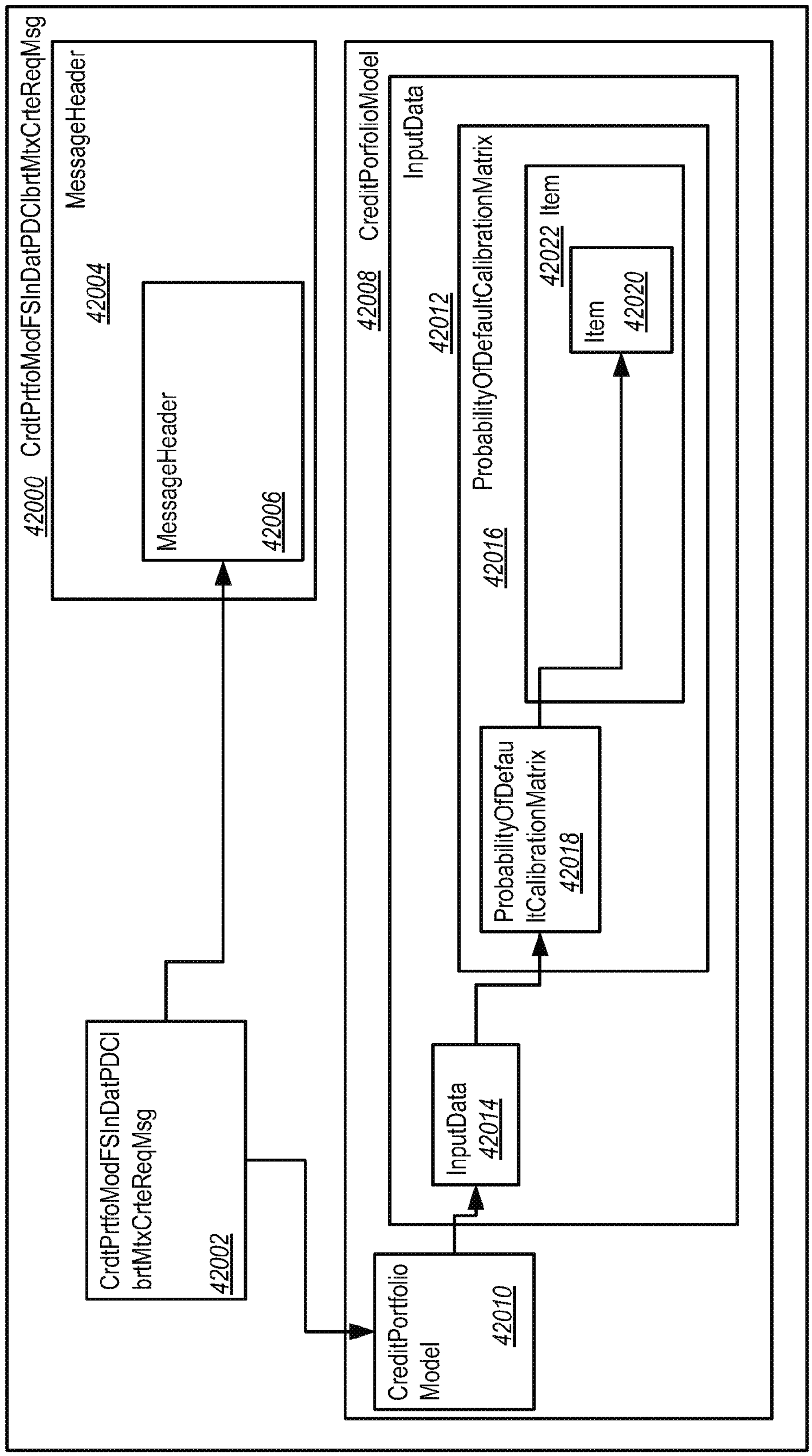
FIG. 42 illustrates an exemplary CrdtPrtfoModFSInDatPDClbrtMtxCrteReqMsg Message Data Type.

FIG. 42 illustrates one example logical configuration of a CrdtPrtfoModFSInDatPDClbrtMtxCrteReqMsg message 42000. Specifically, this figure depicts the arrangement and hierarchy of various component such as one or more levels of packages, entities, and datatypes, shown here as 42002 through 42022. As describes above, packages may be used to represent hierarchy levels. Entities are discrete business elements that are used during a business transaction. Data types are used to type object entities and interfaces with a structure. For example, the CrdtPrtfoModFSInDatPDClbrtMtxCrteReqMsg message 42000 includes, among other things, a CreditPortfolioModel 42010. Accordingly, heterogeneous applications may communicate using this consistent message configured as such.

Figure 43:
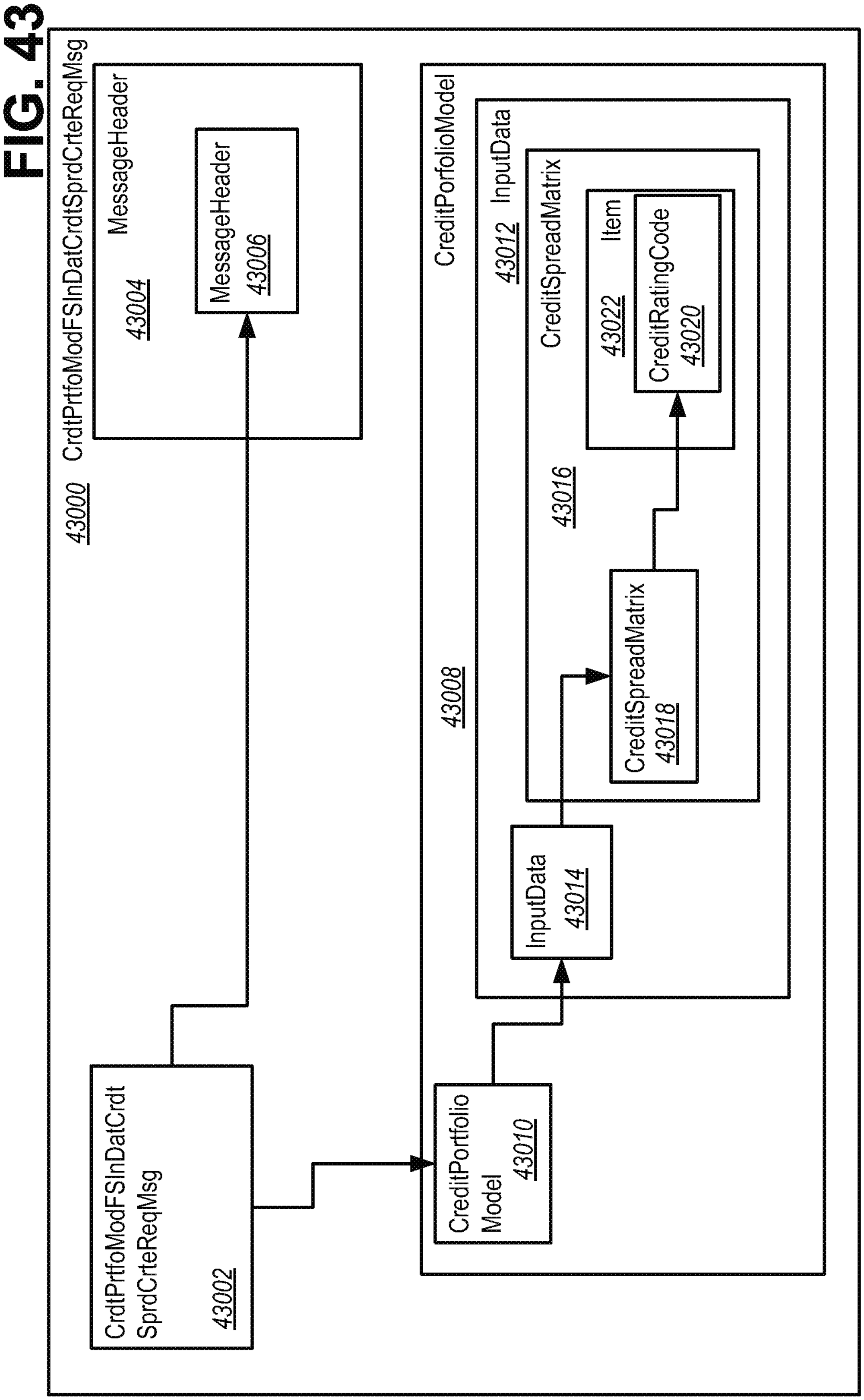
FIG. 43 illustrates an exemplary CrdtPrtfoModFSInDatCrdtSprdCrteReqMsg Message Data Type.

FIG. 43 illustrates one example logical configuration of a CrdtPrtfoModFSInDatCrdtSprdCrteReqMsg message 43000. Specifically, this figure depicts the arrangement and hierarchy of various component such as one or more levels of packages, entities, and datatypes, shown here as 43002 through 43022. As describes above, packages may be used to represent hierarchy levels. Entities are discrete business elements that are used during a business transaction. Data types are used to type object entities and interfaces with a structure. For example, the CrdtPrtfoModFSInDatCrdtSprdCrteReqMsg message 43000 includes, among other things, a CreditPortfolioModel 43010. Accordingly, heterogeneous applications may communicate using this consistent message configured as such.

Figure 44:
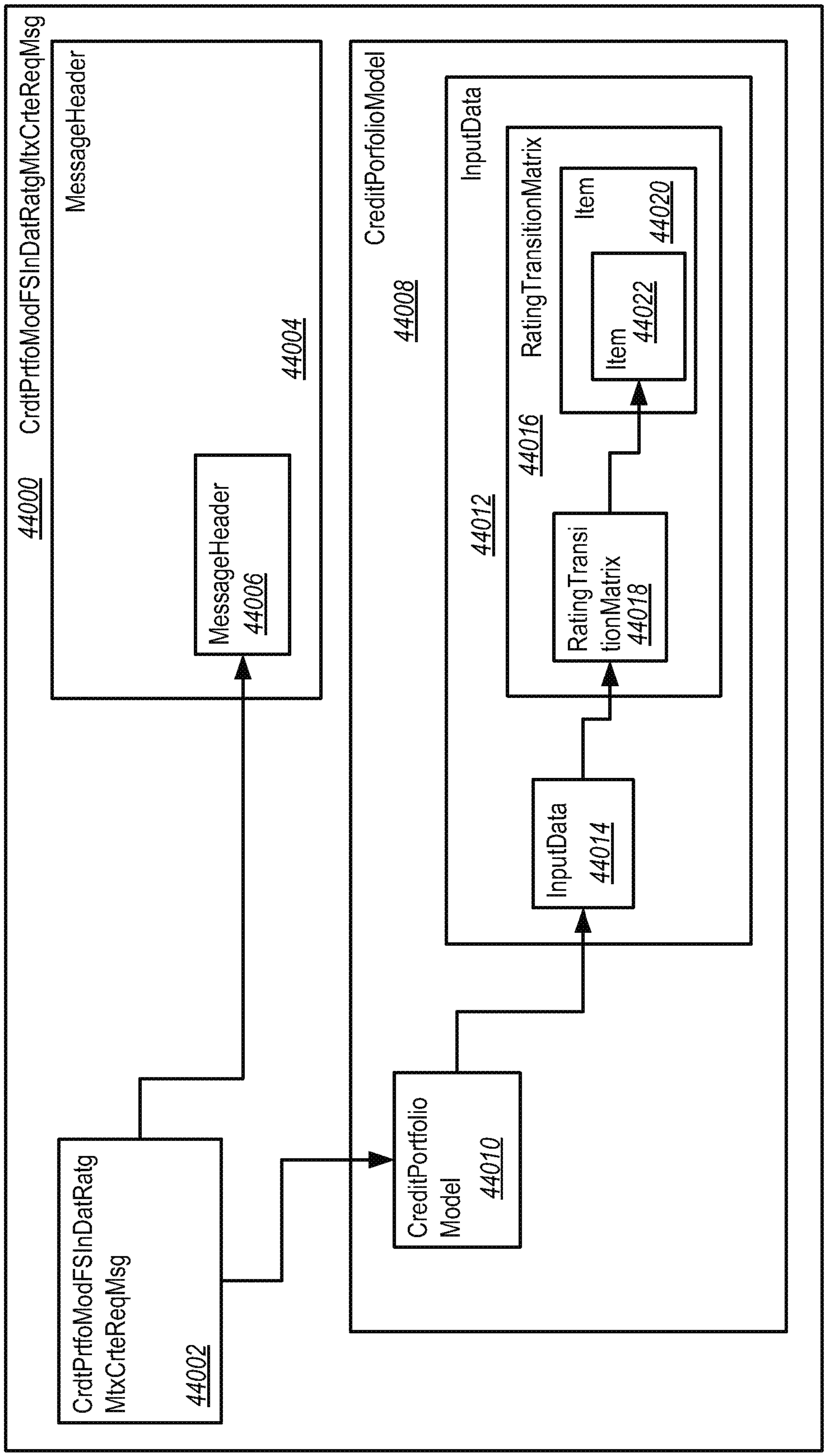
FIG. 44 illustrates an exemplary CrdtPrtfoModFSInDatRatgMtxCrteReqMsg Message Data Type.

FIG. 44 illustrates one example logical configuration of a CrdtPrtfoModFSInDatRatgMtxCrteReqMsg message 44000. Specifically, this figure depicts the arrangement and hierarchy of various component such as one or more levels of packages, entities, and datatypes, shown here as 44002 through 44022. As describes above, packages may be used to represent hierarchy levels. Entities are discrete business elements that are used during a business transaction. Data types are used to type object entities and interfaces with a structure. For example, the CrdtPrtfoModFSInDatRatgMtxCrteReqMsg message 44000 includes, among other things, a CreditPortfolioModel 44010. Accordingly, heterogeneous applications may communicate using this consistent message configured as such.

Figures 1, 45:
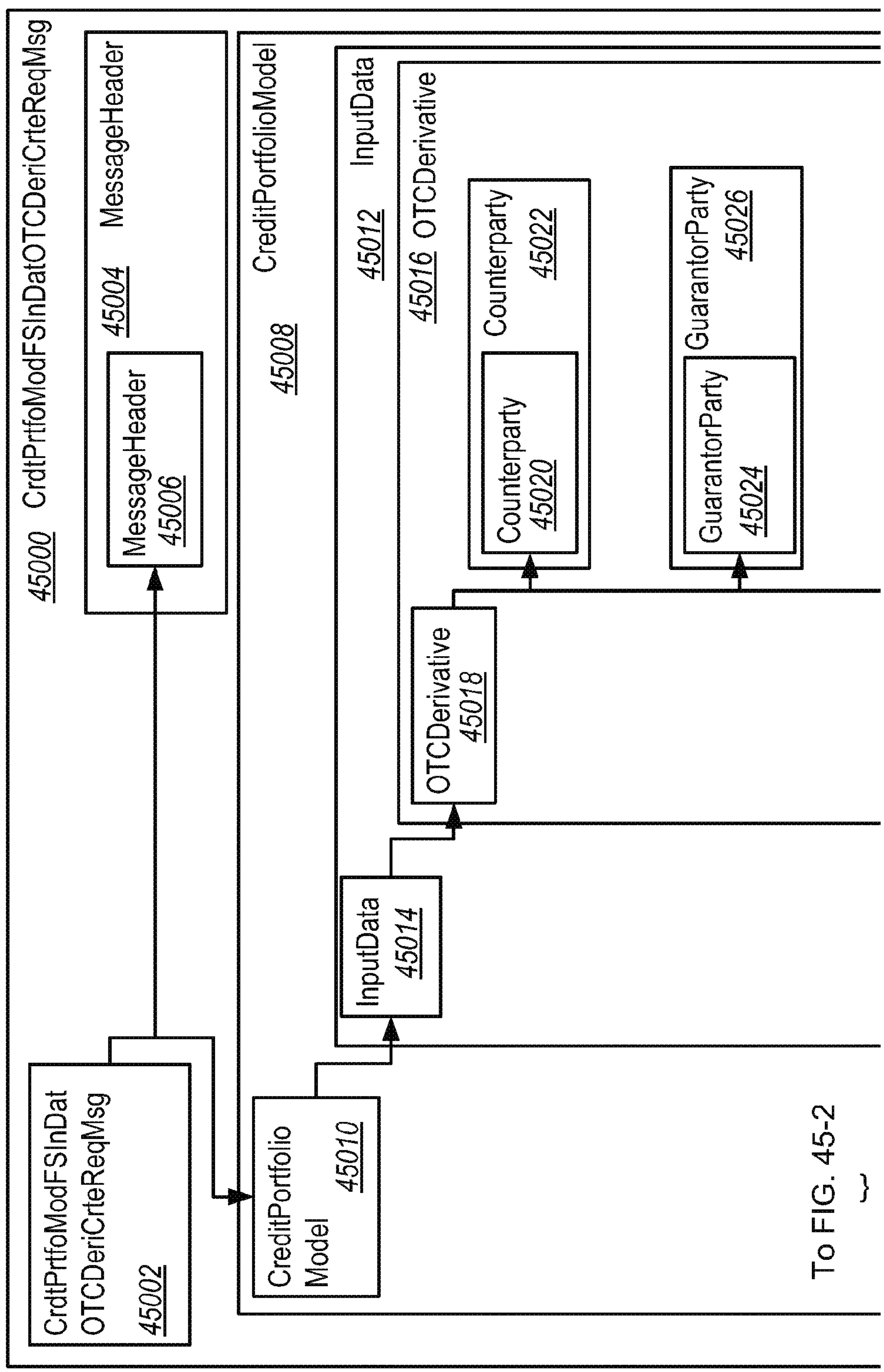
Figures 2, 45:
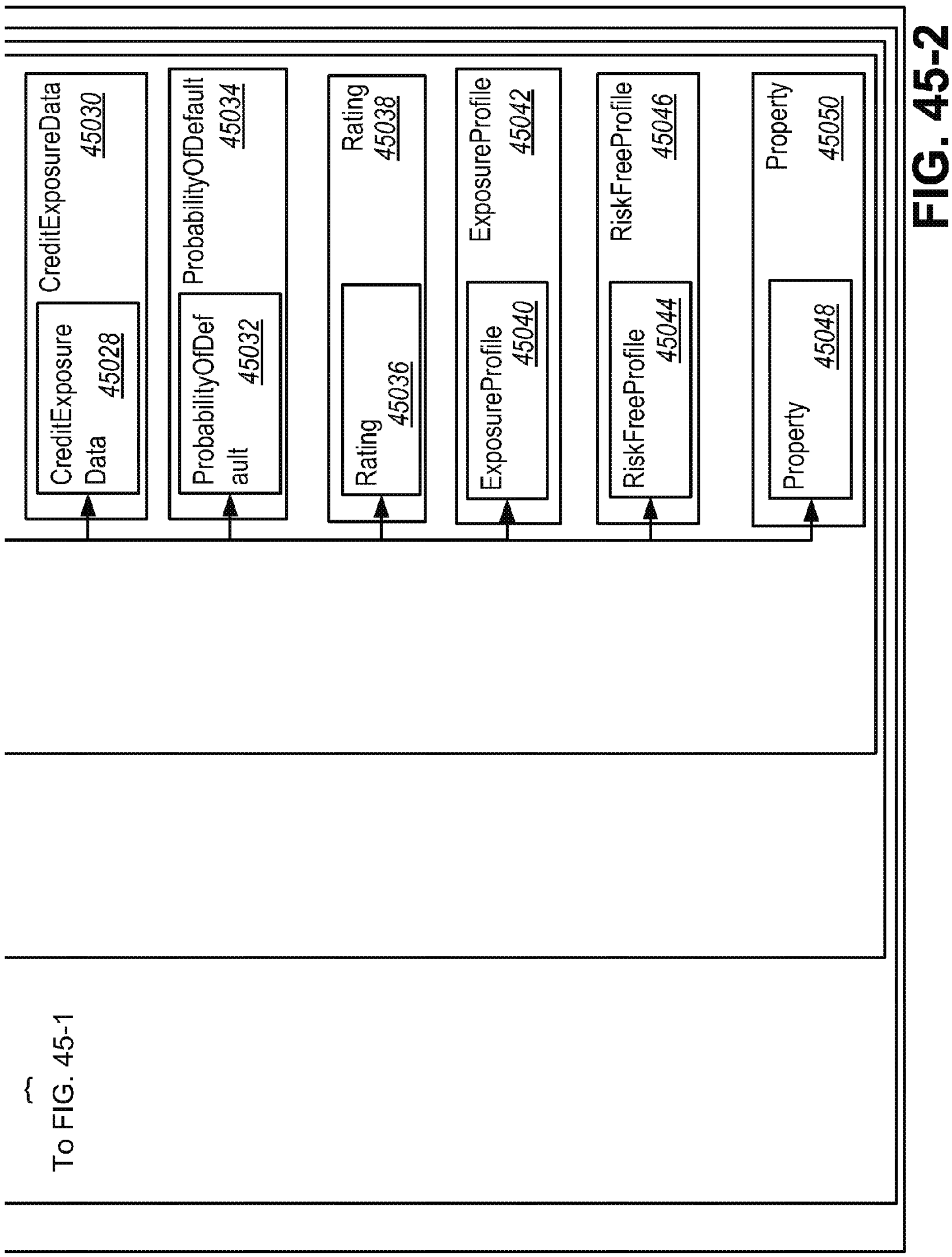

FIG. 45 illustrates one example logical configuration of a CrdtPrtfoModFSInDatOTCDeriCrteReqMsg message 45000. Specifically, this figure depicts the arrangement and hierarchy of various component such as one or more levels of packages, entities, and datatypes, shown here as 45002 through 45050. As describes above, packages may be used to represent hierarchy levels. Entities are discrete business elements that are used during a business transaction. Data types are used to type object entities and interfaces with a structure. For example, the CrdtPrtfoModFSInDatOTCDeriCrteReqMsg message 45000 includes, among other things, a CreditPortfolioModel 45010. Accordingly, heterogeneous applications may communicate using this consistent message configured as such.

Figures 1, 46:
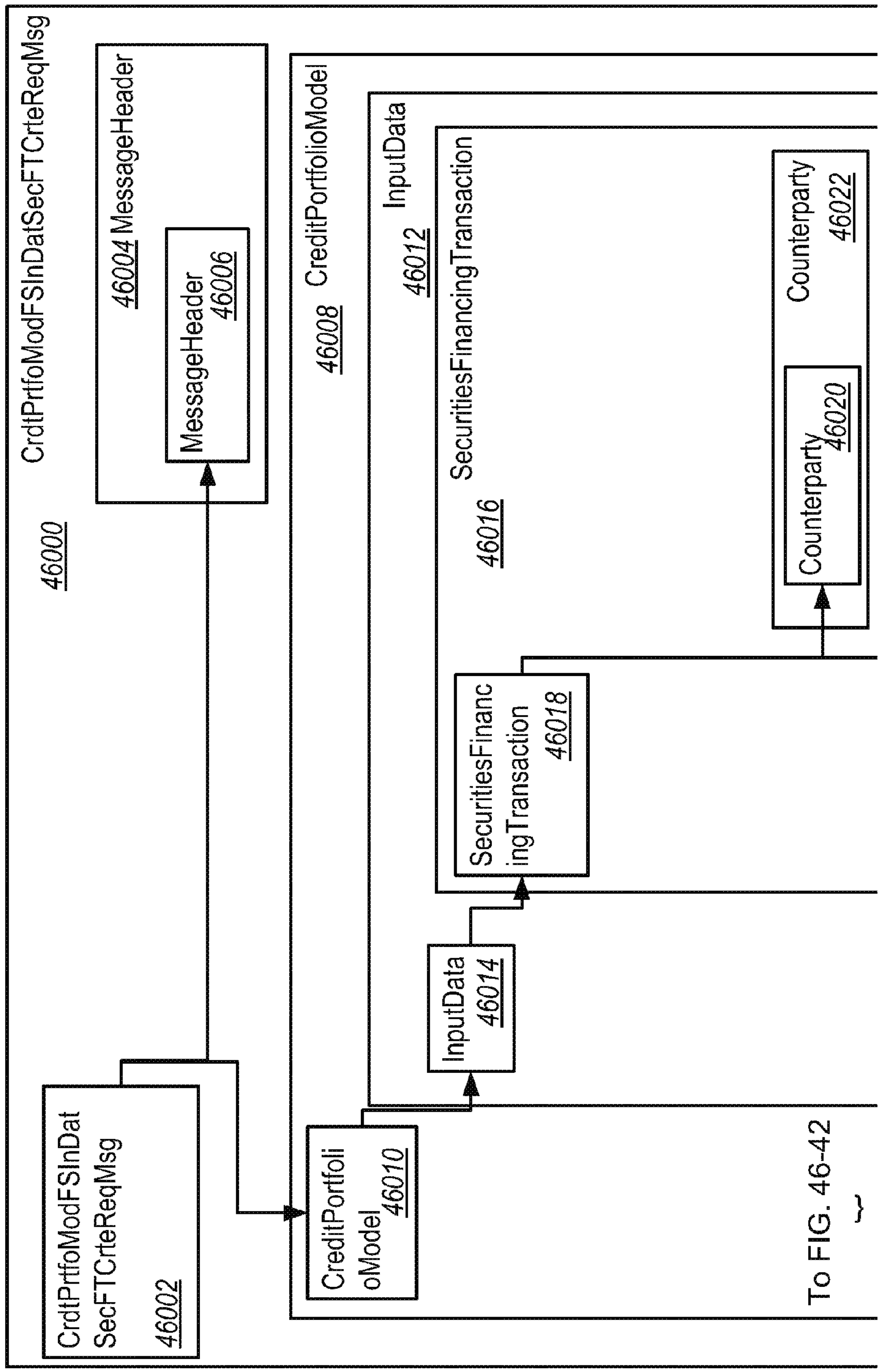
Figures 2, 46:
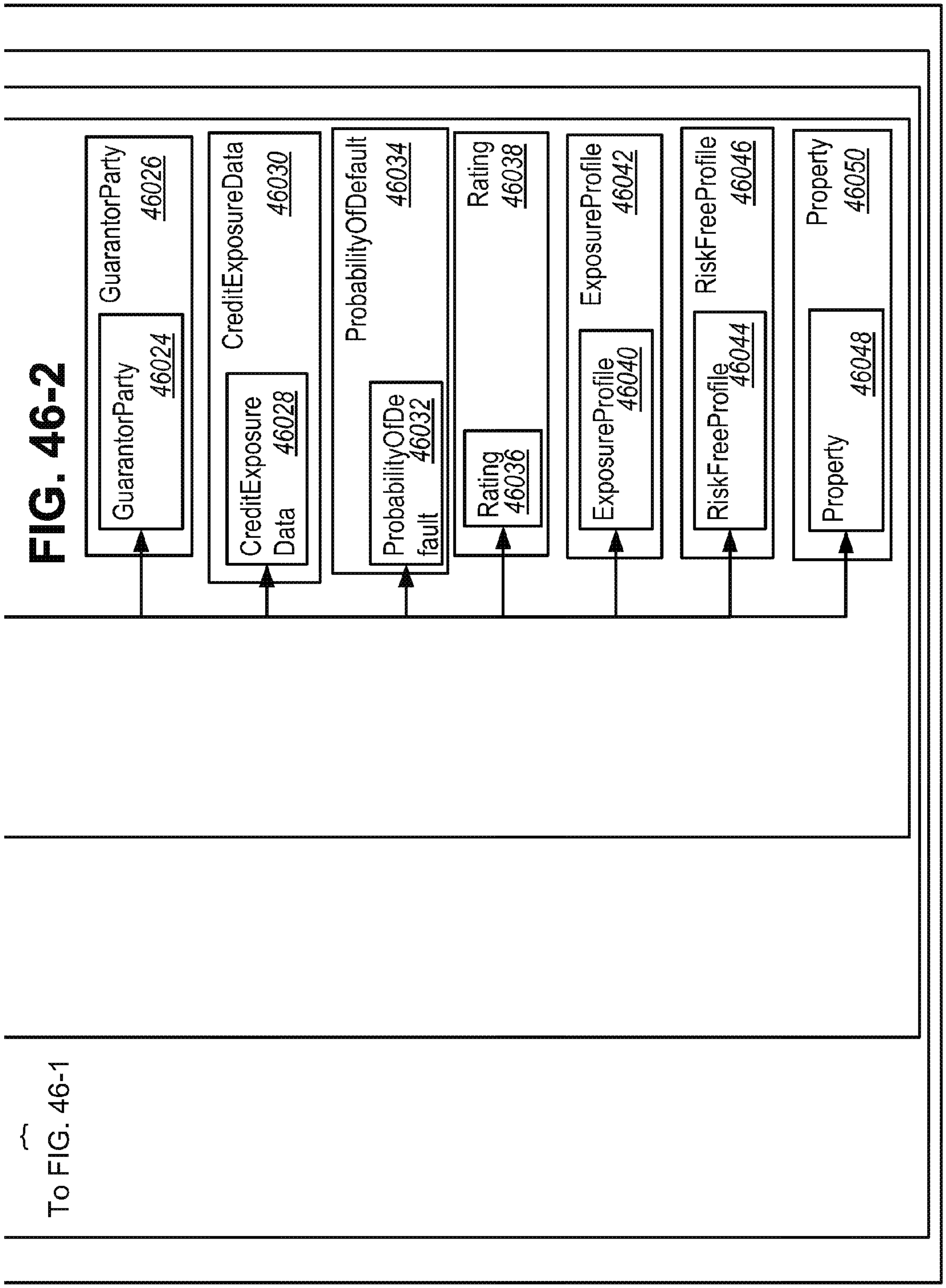

FIG. 46 illustrates one example logical configuration of a CrdtPrtfoModFSInDatSecFTCrteReqMsg message 46000. Specifically, this figure depicts the arrangement and hierarchy of various component such as one or more levels of packages, entities, and datatypes, shown here as 46002 through 46050. As describes above, packages may be used to represent hierarchy levels. Entities are discrete business elements that are used during a business transaction. Data types are used to type object entities and interfaces with a structure. For example, the CrdtPrtfoModFSInDatSecFTCrteReqMsg message 46000 includes, among other things, a CreditPortfolioModel 46010. Accordingly, heterogeneous applications may communicate using this consistent message configured as such.

Figures 1, 47:
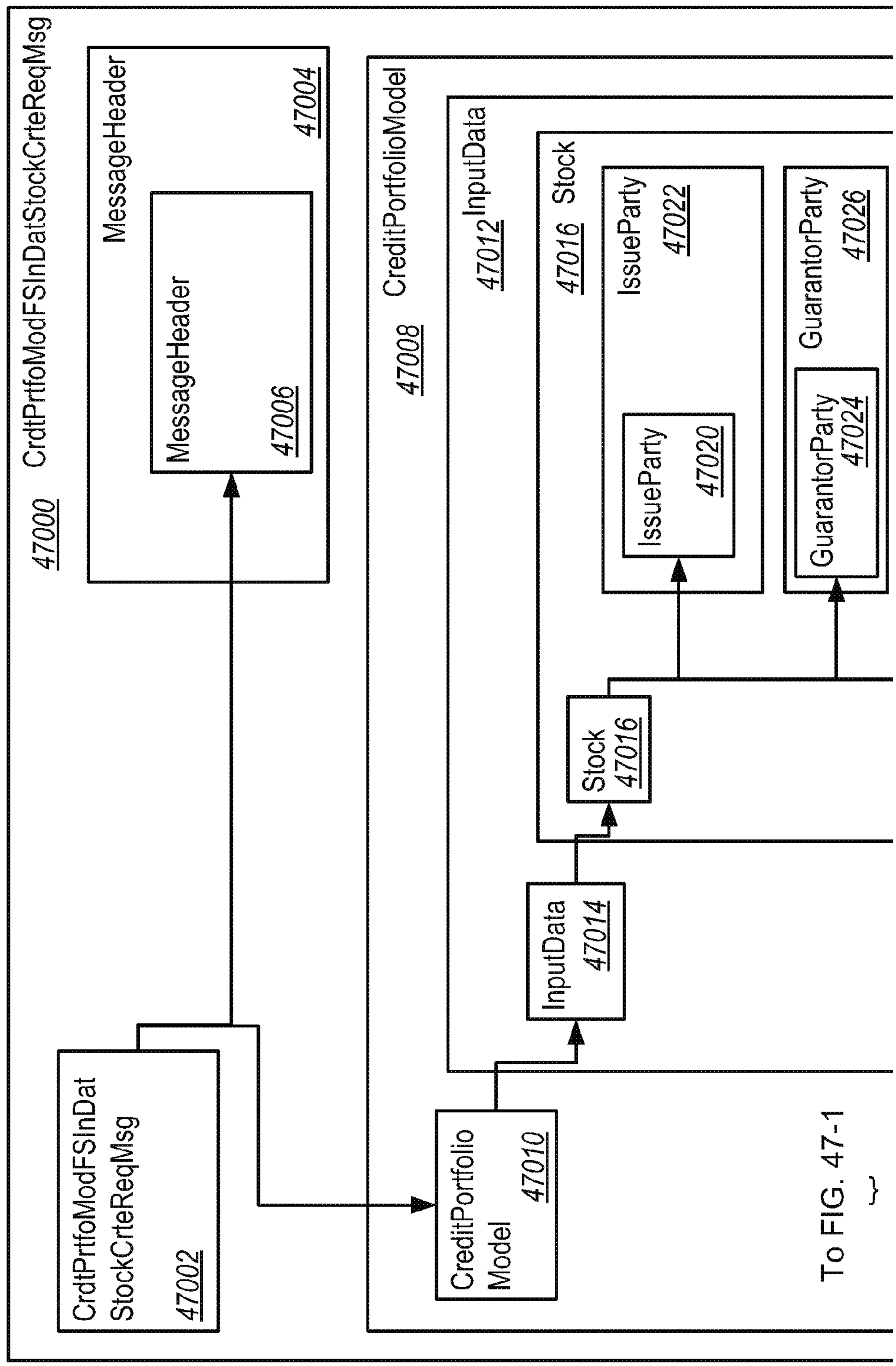
Figures 2, 47:
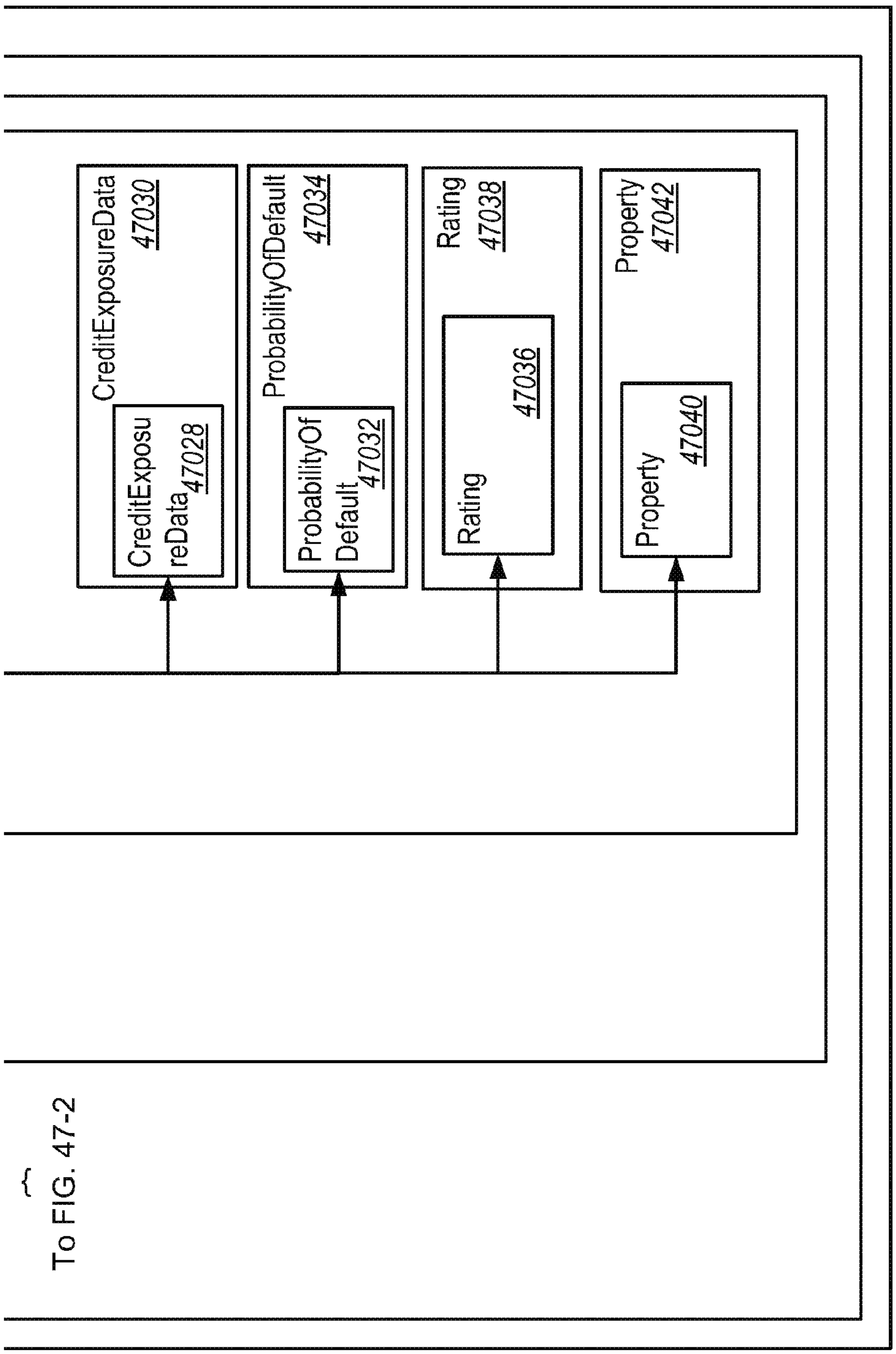

FIG. 47 illustrates one example logical configuration of a CrdtPrtfoModFSInDatStockCrteReqMsg message 47000. Specifically, this figure depicts the arrangement and hierarchy of various component such as one or more levels of packages, entities, and datatypes, shown here as 47002 through 47042. As describes above, packages may be used to represent hierarchy levels. Entities are discrete business elements that are used during a business transaction. Data types are used to type object entities and interfaces with a structure. For example, the CrdtPrtfoModFSInDatStockCrteReqMsg message 47000 includes, among other things, a CreditPortfolioModel 47010. Accordingly, heterogeneous applications may communicate using this consistent message configured as such.

Figures 1, 48:
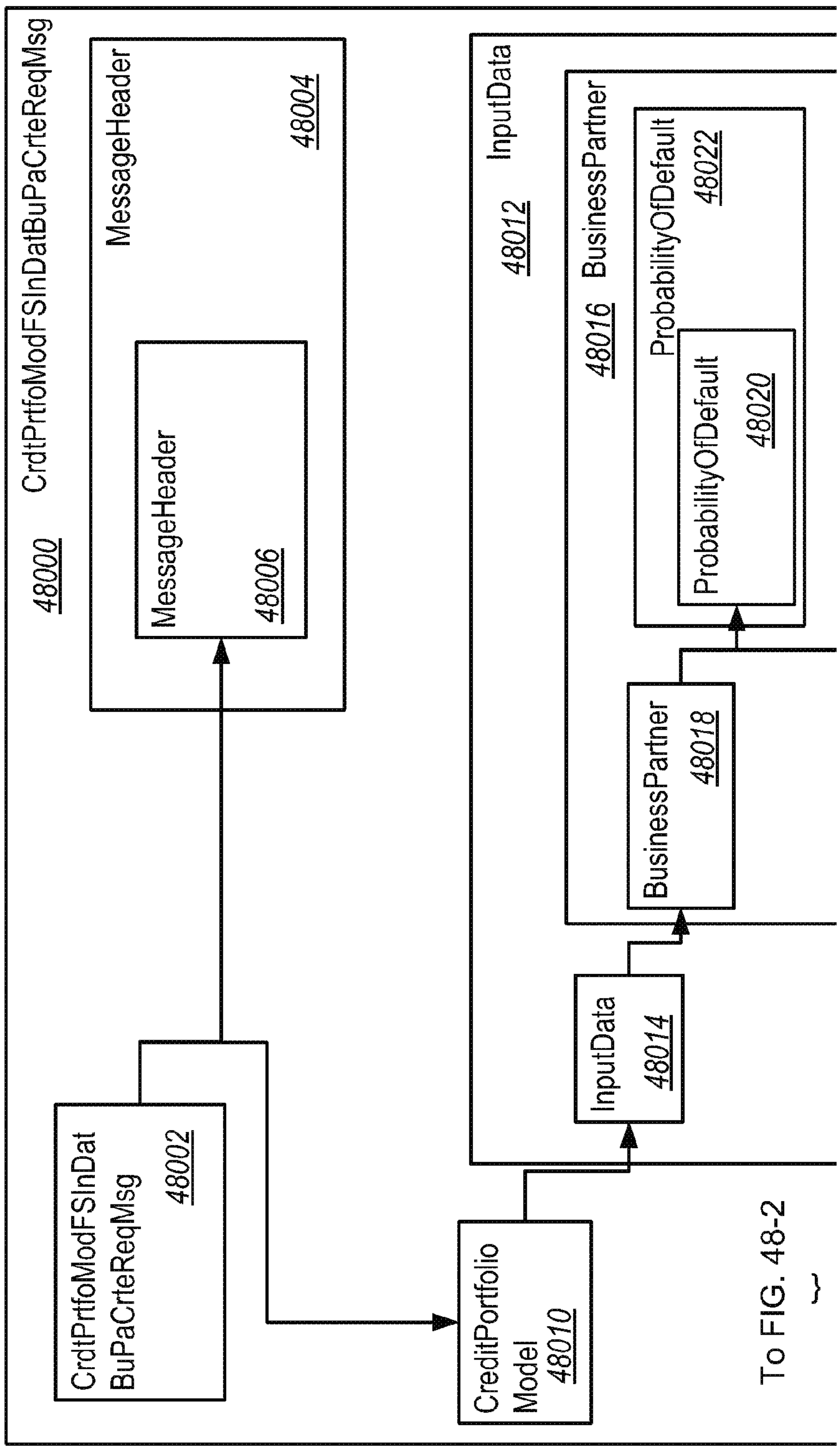
Figures 2, 48:
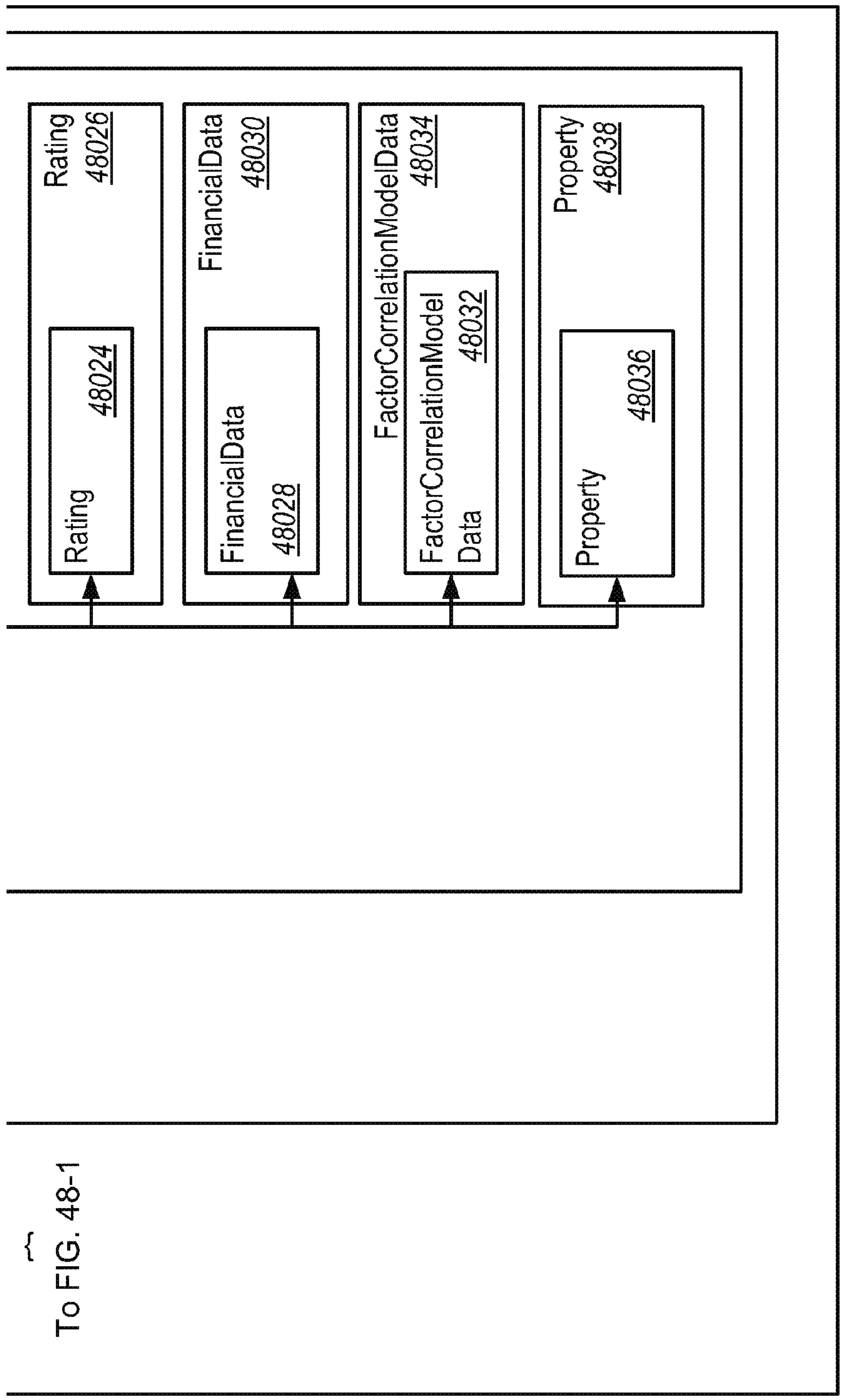

FIG. 48 illustrates one example logical configuration of a CrdtPrtfoModFSInDatBuPaCrteReqMsg message 48000. Specifically, this figure depicts the arrangement and hierarchy of various component such as one or more levels of packages, entities, and datatypes, shown here as 48002 through 48038.

As describes above, packages may be used to represent hierarchy levels. Entities are discrete business elements that are used during a business transaction. Data types are used to type object entities and interfaces with a structure. For example, the CrdtPrtfoModFSInDatBuPaCrteReqMsg message 48000 includes, among other things, a CreditPortfolioModel 48010. Accordingly, heterogeneous applications may communicate using this consistent message configured as such.

Figure 49:
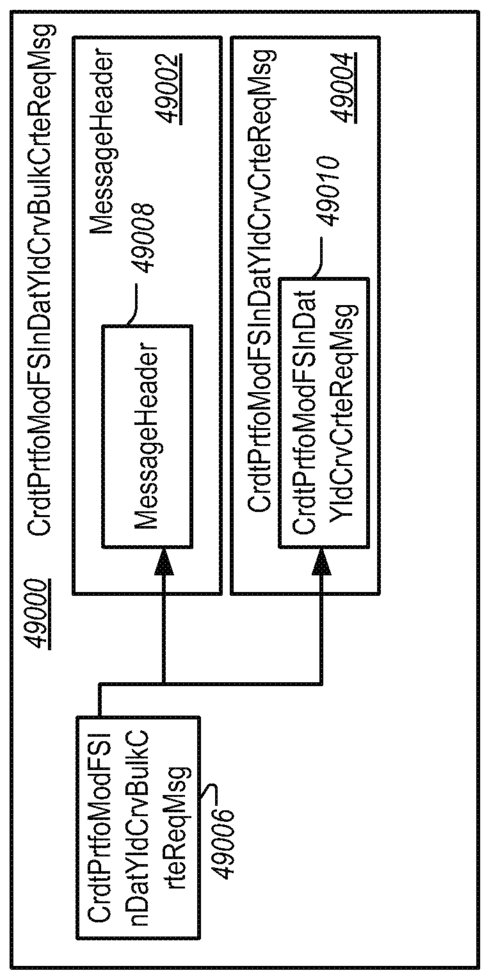
FIG. 49 illustrates an exemplary CrdtPrtfoModFSInDatYldCrvBulkCrteReqMsg Message Data Type.

FIG. 49 illustrates one example logical configuration of a CrdtPrtfoModFSInDatYldCrvBulkCrteReqMsg message 49000. Specifically, this figure depicts the arrangement and hierarchy of various component such as one or more levels of packages, entities, and datatypes, shown here as 49002 through 49010. As describes above, packages may be used to represent hierarchy levels. Entities are discrete business elements that are used during a business transaction. Data types are used to type object entities and interfaces with a structure. For example, the CrdtPrtfoModFSInDatYldCrvBulkCrteReqMsg message 49000 includes, among other things, a MessageHeader 49008. Accordingly, heterogeneous applications may communicate using this consistent message configured as such.

Figure 50:
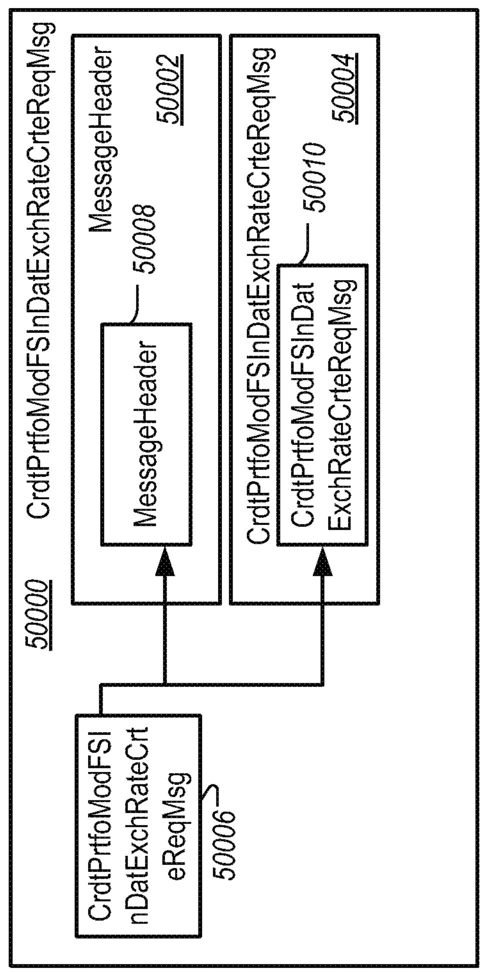
FIG. 50 illustrates an exemplary CrdtPrtfoModFSInDatExchRateCrteReqMsg Message Data Type.

FIG. 50 illustrates one example logical configuration of a CrdtPrtfoModFSInDatExchRateCrteReqMsg message 50000. Specifically, this figure depicts the arrangement and hierarchy of various component such as one or more levels of packages, entities, and datatypes, shown here as 50002 through 50010. As describes above, packages may be used to represent hierarchy levels. Entities are discrete business elements that are used during a business transaction. Data types are used to type object entities and interfaces with a structure. For example, the CrdtPrtfoModFSInDatExchRateCrteReqMsg message 50000 includes, among other things, a MessageHeader 50008. Accordingly, heterogeneous applications may communicate using this consistent message configured as such.

Figure 51:
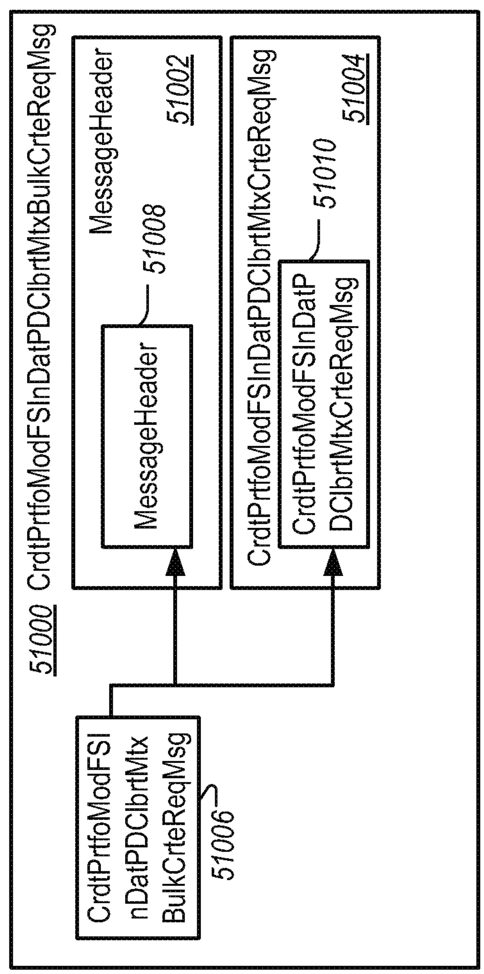
FIG. 51 illustrates an exemplary CrdtPrtfoModFSInDatPDClbrtMtxBulkCrteReqMsg Message Data Type.

FIG. 51 illustrates one example logical configuration of a CrdtPrtfoModFSInDatPDClbrtMtxBulkCrteReqMsg message 51000. Specifically, this figure depicts the arrangement and hierarchy of various component such as one or more levels of packages, entities, and datatypes, shown here as 51002 through 51010. As describes above, packages may be used to represent hierarchy levels. Entities are discrete business elements that are used during a business transaction. Data types are used to type object entities and interfaces with a structure. For example, the CrdtPrtfoModFSInDatPDClbrtMtxBulkCrteReqMsg message 51000 includes, among other things, a MessageHeader 51008. Accordingly, heterogeneous applications may communicate using this consistent message configured as such.

Figure 52:
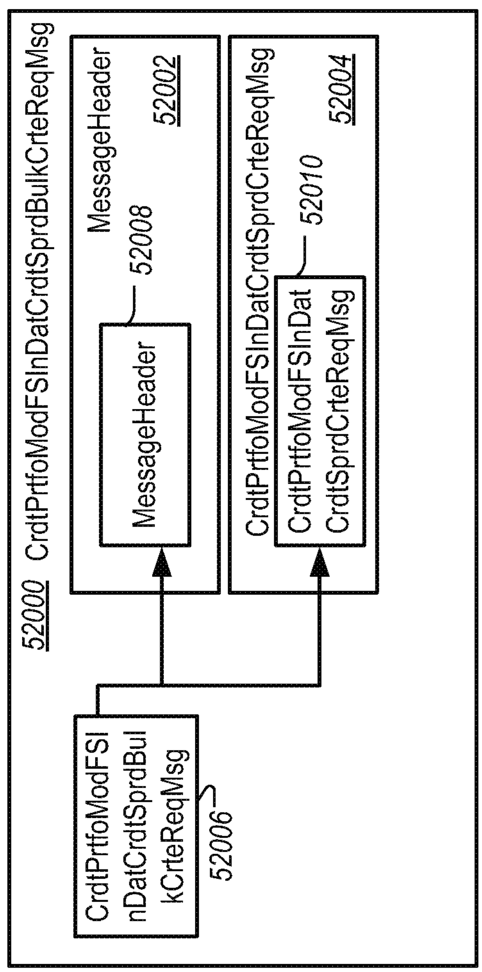
FIG. 52 illustrates an exemplary CrdtPrtfoModFSInDatCrdtSprdBulkCrteReqMsg Message Data Type.

FIG. 52 illustrates one example logical configuration of a CrdtPrtfoModFSInDatCrdtSprdBulkCrteReqMsg message 52000. Specifically, this figure depicts the arrangement and hierarchy of various component such as one or more levels of packages, entities, and datatypes, shown here as 52002 through 52010. As describes above, packages may be used to represent hierarchy levels. Entities are discrete business elements that are used during a business transaction. Data types are used to type object entities and interfaces with a structure. For example, the CrdtPrtfoModFSInDatCrdtSprdBulkCrteReqMsg message 52000 includes, among other things, a MessageHeader 52008. Accordingly, heterogeneous applications may communicate using this consistent message configured as such.

Figure 53:
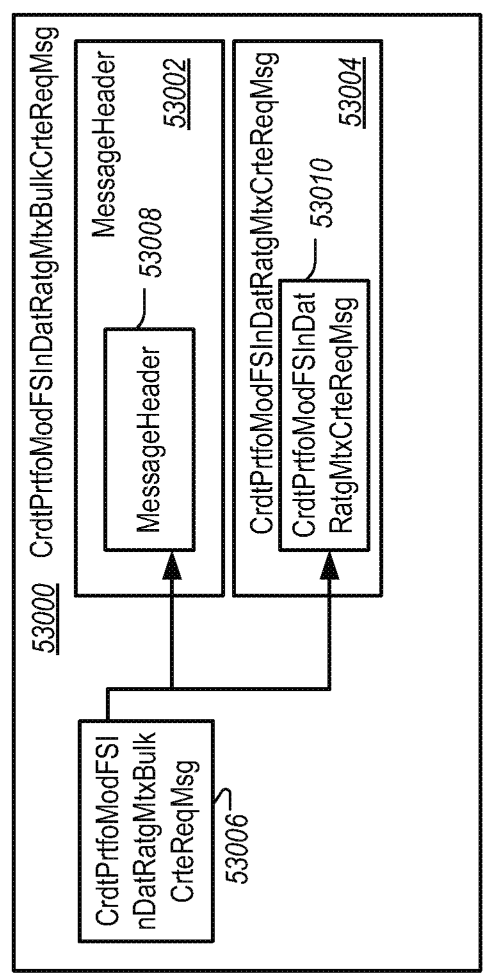
FIG. 53 illustrates an exemplary CrdtPrtfoModFSInDatRatgMtxBulkCrteReqMsg Message Data Type.

FIG. 53 illustrates one example logical configuration of a CrdtPrtfoModFSInDatRatgMtxBulkCrteReqMsg message 53000. Specifically, this figure depicts the arrangement and hierarchy of various component such as one or more levels of packages, entities, and datatypes, shown here as 53002 through 53010. As describes above, packages may be used to represent hierarchy levels. Entities are discrete business elements that are used during a business transaction. Data types are used to type object entities and interfaces with a structure. For example, the CrdtPrtfoModFSInDatRatgMtxBulkCrteReqMsg message 53000 includes, among other things, a MessageHeader 53008. Accordingly, heterogeneous applications may communicate using this consistent message configured as such.

Figure 54:
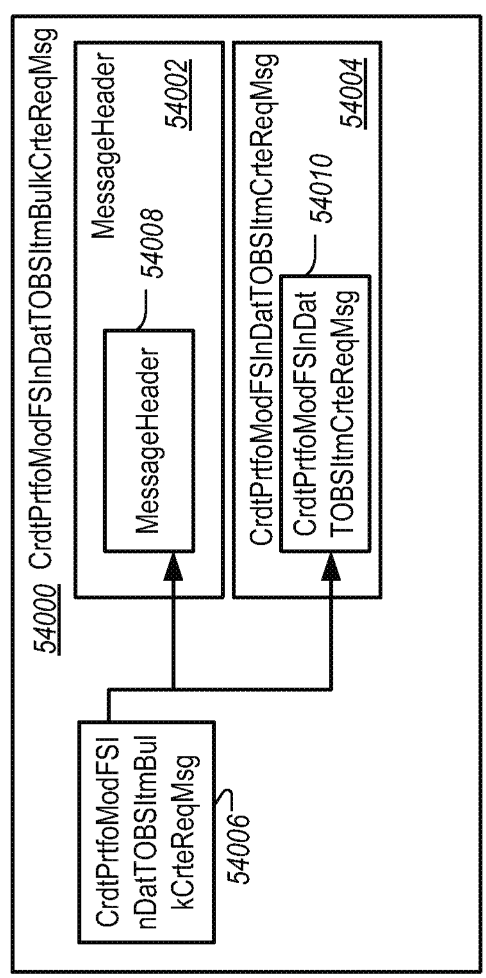
FIG. 54 illustrates an exemplary CrdtPrtfoModFSInDatTOBSItmBulkCrteReqMsg Message Data Type.

FIG. 54 illustrates one example logical configuration of a CrdtPrtfoModFSInDatTOBSItmBulkCrteReqMsg message 54000. Specifically, this figure depicts the arrangement and hierarchy of various component such as one or more levels of packages, entities, and datatypes, shown here as 54002 through 54010. As describes above, packages may be used to represent hierarchy levels. Entities are discrete business elements that are used during a business transaction. Data types are used to type object entities and interfaces with a structure. For example, the CrdtPrtfoModFSInDatTOBSItmBulkCrteReqMsg message 54000 includes, among other things, a MessageHeader 54008. Accordingly, heterogeneous applications may communicate using this consistent message configured as such.

Figure 55:
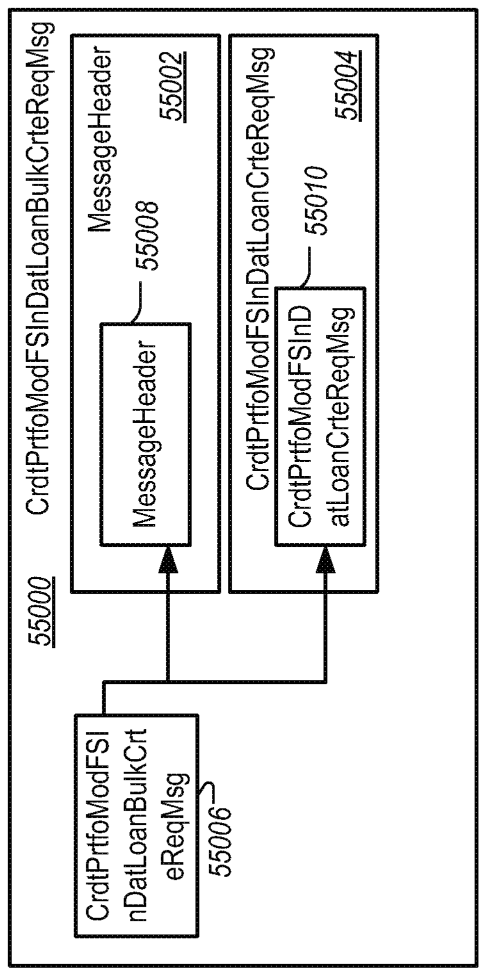
FIG. 55 illustrates an exemplary CrdtPrtfoModFSInDatLoanBulkCrteReqMsg Message Data Type.

FIG. 55 illustrates one example logical configuration of a CrdtPrtfoModFSInDatLoanBulkCrteReqMsg message 55000. Specifically, this figure depicts the arrangement and hierarchy of various component such as one or more levels of packages, entities, and datatypes, shown here as 55002 through 55010. As describes above, packages may be used to represent hierarchy levels. Entities are discrete business elements that are used during a business transaction. Data types are used to type object entities and interfaces with a structure. For example, the CrdtPrtfoModFSInDatLoanBulkCrteReqMsg message 55000 includes, among other things, a MessageHeader 55008. Accordingly, heterogeneous applications may communicate using this consistent message configured as such.

Figure 56:
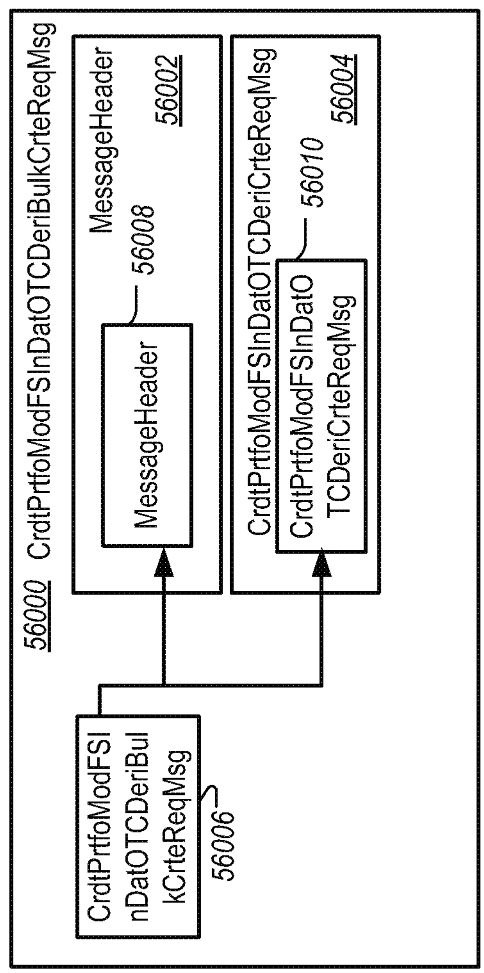
FIG. 56 illustrates an exemplary CrdtPrtfoModFSInDatOTCDeriBulkCrteReqMsg Message Data Type.

FIG. 56 illustrates one example logical configuration of a CrdtPrtfoModFSInDatOTCDeriBulkCrteReqMsg message 56000. Specifically, this figure depicts the arrangement and hierarchy of various component such as one or more levels of packages, entities, and datatypes, shown here as 56002 through 56010. As describes above, packages may be used to represent hierarchy levels. Entities are discrete business elements that are used during a business transaction. Data types are used to type object entities and interfaces with a structure. For example, the CrdtPrtfoModFSInDatOTCDeriBulkCrteReqMsg message 56000 includes, among other things, a MessageHeader 56008. Accordingly, heterogeneous applications may communicate using this consistent message configured as such.

Figure 57:
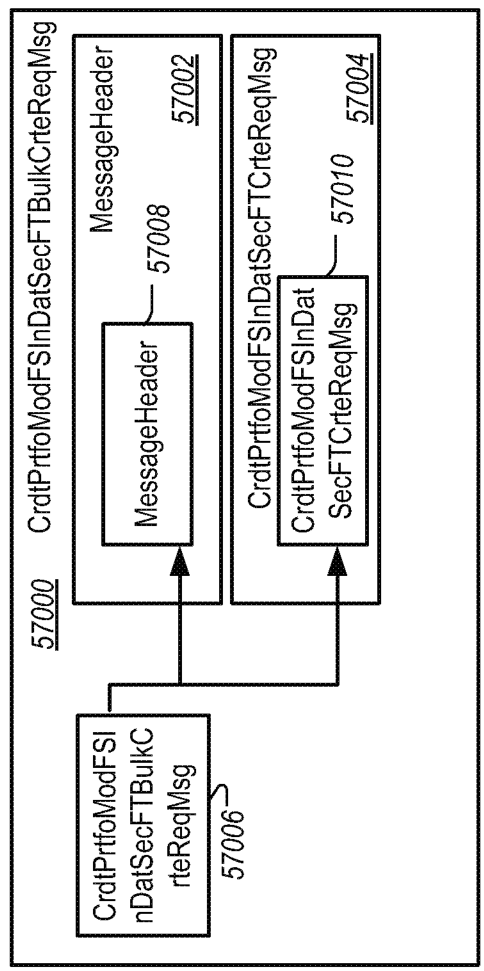
FIG. 57 illustrates an exemplary CrdtPrtfoModFSInDatSecFTBulkCrteReqMsg Message Data Type.

FIG. 57 illustrates one example logical configuration of a CrdtPrtfoModFSInDatSecFTBulkCrteReqMsg message 57000. Specifically, this figure depicts the arrangement and hierarchy of various component such as one or more levels of packages, entities, and datatypes, shown here as 57002 through 57010. As describes above, packages may be used to represent hierarchy levels. Entities are discrete business elements that are used during a business transaction. Data types are used to type object entities and interfaces with a structure. For example, the CrdtPrtfoModFSInDatSecFTBulkCrteReqMsg message 57000 includes, among other things, a MessageHeader 57008. Accordingly, heterogeneous applications may communicate using this consistent message configured as such.

Figure 58:
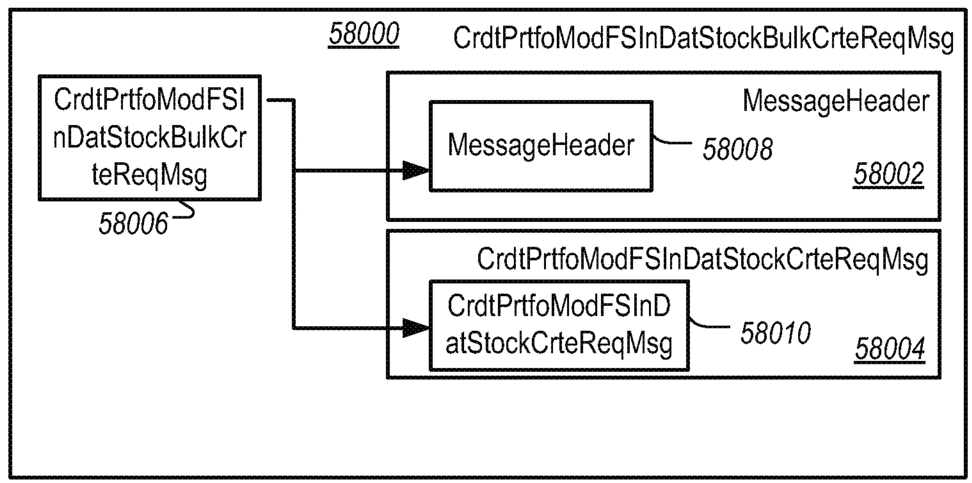
FIG. 58 illustrates an exemplary CrdtPrtfoModFSInDatStockBulkCrteReqMsg Message Data Type.

FIG. 58 illustrates one example logical configuration of a CrdtPrtfoModFSInDatStockBulkCrteReqMsg message 58000. Specifically, this figure depicts the arrangement and hierarchy of various component such as one or more levels of packages, entities, and datatypes, shown here as 58002 through 58010. As describes above, packages may be used to represent hierarchy levels. Entities are discrete business elements that are used during a business transaction. Data types are used to type object entities and interfaces with a structure. For example, the CrdtPrtfoModFSInDatStockBulkCrteReqMsg message 58000 includes, among other things, a MessageHeader 58008. Accordingly, heterogeneous applications may communicate using this consistent message configured as such.

Figure 59:
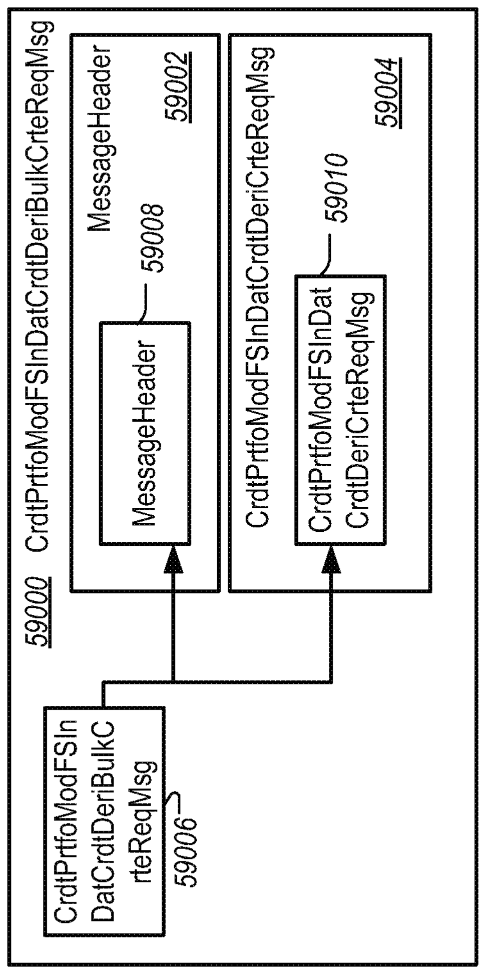
FIG. 59 illustrates an exemplary CrdtPrtfoModFSInDatCrdtDeriBulkCrteReqMsg Message Data Type.

FIG. 59 illustrates one example logical configuration of a CrdtPrtfoModFSInDatCrdtDeriBulkCrteReqMsg message 59000. Specifically, this figure depicts the arrangement and hierarchy of various component such as one or more levels of packages, entities, and datatypes, shown here as 59002 through 59010. As describes above, packages may be used to represent hierarchy levels. Entities are discrete business elements that are used during a business transaction. Data types are used to type object entities and interfaces with a structure. For example, the CrdtPrtfoModFSInDatCrdtDeriBulkCrteReqMsg message 59000 includes, among other things, a MessageHeader 59008. Accordingly, heterogeneous applications may communicate using this consistent message configured as such.

Figure 60:
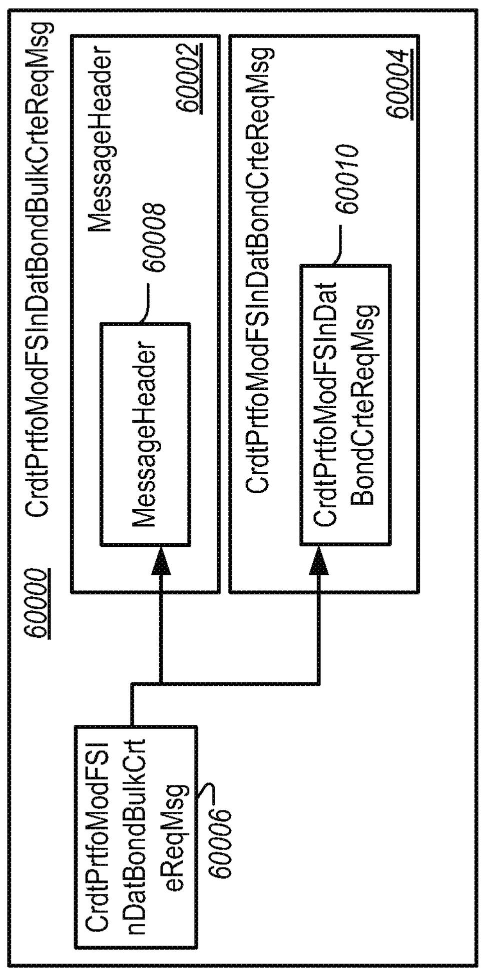
FIG. 60 illustrates an exemplary CrdtPrtfoModFSInDatBondBulkCrteReqMsg Message Data Type.

FIG. 60 illustrates one example logical configuration of a CrdtPrtfoModFSInDatBondBulkCrteReqMsg message 60000. Specifically, this figure depicts the arrangement and hierarchy of various component such as one or more levels of packages, entities, and datatypes, shown here as 60002 through 60010. As describes above, packages may be used to represent hierarchy levels. Entities are discrete business elements that are used during a business transaction. Data types are used to type object entities and interfaces with a structure. For example, the CrdtPrtfoModFSInDatBondBulkCrteReqMsg message 60000 includes, among other things, a MessageHeader 60008. Accordingly, heterogeneous applications may communicate using this consistent message configured as such.

Figure 61:
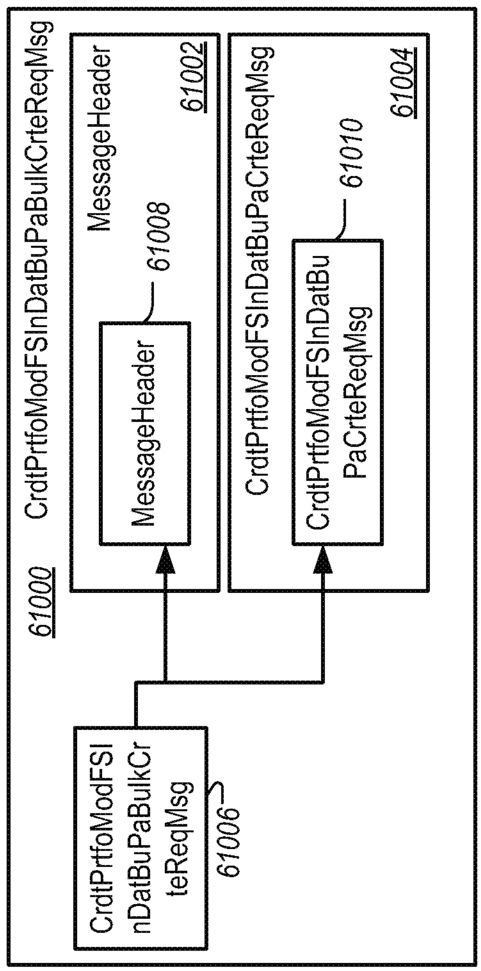
FIG. 61 illustrates an exemplary CrdtPrtfoModFSInDatBuPaBulkCrteReqMsg Message Data Type.

FIG. 61 illustrates one example logical configuration of a CrdtPrtfoModFSInDatBuPaBulkCrteReqMsg message 61000. Specifically, this figure depicts the arrangement and hierarchy of various component such as one or more levels of packages, entities, and datatypes, shown here as 61002 through 61010. As describes above, packages may be used to represent hierarchy levels. Entities are discrete business elements that are used during a business transaction. Data types are used to type object entities and interfaces with a structure. For example, the CrdtPrtfoModFSInDatBuPaBulkCrteReqMsg message 61000 includes, among other things, a MessageHeader 61008. Accordingly, heterogeneous applications may communicate using this consistent message configured as such.

Figure 62:
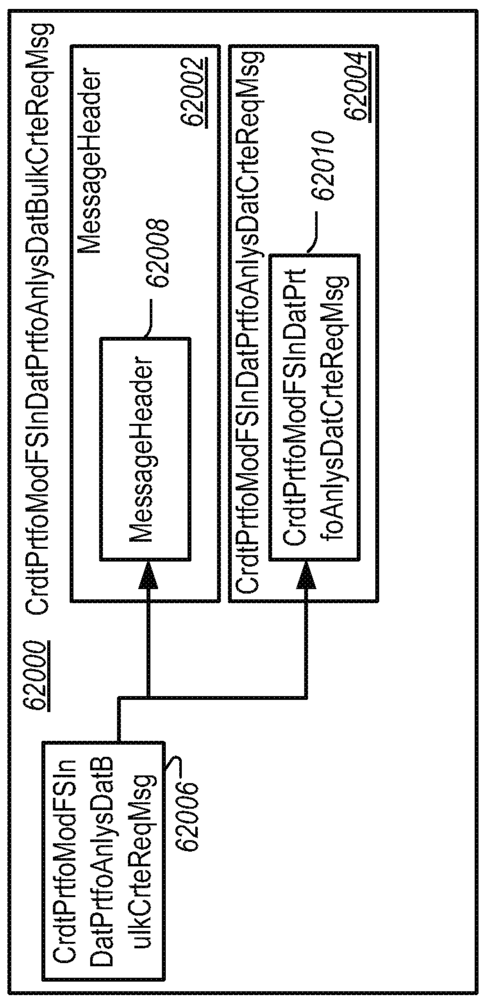
FIG. 62 illustrates an exemplary CrdtPrtfoModFSInDatPrtfoAnlysDatBulkCrteReqMsg Message Data Type.

FIG. 62 illustrates one example logical configuration of a CrdtPrtfoModFSInDatPrtfoAnlysDatBulkCrteReqMsg message 62000. Specifically, this figure depicts the arrangement and hierarchy of various component such as one or more levels of packages, entities, and datatypes, shown here as 62002 through 62010. As describes above, packages may be used to represent hierarchy levels. Entities are discrete business elements that are used during a business transaction. Data types are used to type object entities and interfaces with a structure. For example, the CrdtPrtfoModFSInDatPrtfoAnlysDatBulkCrteReqMsg message 62000 includes, among other things, a MessageHeader 62008. Accordingly, heterogeneous applications may communicate using this consistent message configured as such.

A credit portfolio model requires input data. In particular, these include the following: Financial Instrument and counterparty data for a given credit portfolio; Correlation data, rating transition matrices; and Financial market data (e.g., interest rate and spread curves).

A credit portfolio model can be used to perform a model-based risk analysis of a credit portfolio. The Credit Portfolio Model interface performs various operations, namely a RequestInputDataYieldCurve, a RequestInputDataExchangeRate, a Request Input Data Credit Spread Matrix, a Request Input Data Probability of Default Calibration Matrix, a Request Input Data Rating Transition Matrix, a Request Input Data Traditional Off Balance Sheet Item, a Request Input Data Loan, a Request Input Data OTC Derivative, a Request Input Data Securities Financing Transaction, a Request Input Data Stock, a Request Input Data Credit Derivative, a Request Input Data Securitization, a Request Input Data Bond, a Request Input Data Business Partner, a Request Input Data Portfolio Analysis Data, a RequestInputDataYieldCurveAsBulk, a RequestInputDataExchangeRateAsBulk, a Request Input Data Credit Spread Matrix as Bulk, a Request Input Data Probability of Default Calibration Matrix as Bulk, a Request Input Data Rating Transition Matrix as Bulk, a Request Input Data Traditional Off Balance Sheet Item as Bulk, a Request Input Data Loan as Bulk, a Request Input Data OTC Derivative as Bulk, a Request Input Data Securities Financing Transaction as Bulk, a Request Input Data Stock as Bulk, a Request Input Data Credit Derivative as Bulk, a Request Input Data Securitization as Bulk, a Request Input Data Bond as Bulk, a Request Input Data Business Partner as Bulk, and a Request Input Data Portfolio Analysis Data as Bulk. The RequestInputDataYieldCurve operation is a Request for creating a yield curve. This outbound operation is a Request for creating yield curves. The RequestInputDataYieldCurve operation includes a CreditPortfolioModelFSInputDataYieldCurveRequest message type. The structure of the CreditPortfolioModelFSInputDataYieldCurveRequest message type is specified by a CrdtPrtfoModFSInDatYldCrvCrteReqMsg message data type. The RequestInputDataExchangeRate operation is a Request for creating an exchange rate. This outbound operation is a Request for creating exchange rates. The RequestInputDataExchangeRate operation includes a CreditPortfolioModelFSInputDataExchangeRateRequest message type. The structure of the CreditPortfolioModelFSInputDataExchangeRateRequest message type is specified by a CrdtPrtfoModFSInDatExchRateCrteReqMsg message data type. The Request Input Data Credit Spread Matrix operation is a Request for creating a credit spread matrix. This outbound operation is a Request for creating credit spread matrices. The Request Input Data Credit Spread Matrix operation includes a CreditPortfolioModelFSInputDataCreditSpreadMatrixRequest message type. The structure of the CreditPortfolioModelFSInputDataCreditSpreadMatrixRequest message type is specified by a CrdtPrtfoModFSInDatCrdtSprdCrteReqMsg message data type. The Request Input Data Probability of Default Calibration Matrix operation is a Request for creating a probability of default calibration matrix. This outbound operation is a Request for creating probability of default matrices. The Request Input Data Probability of Default Calibration Matrix operation includes a CreditPortfolioModelFSInputDataProbabilityOfDefaultCalibrationMatrixRequest message type. The structure of the CreditPortfolioModelFSInputDataProbabilityOfDefaultCalibrationMatrixRequest message type is specified by a CrdtPrtfoModFSInDatPDClbrtMtxCrteReqMsg message data type. The Request Input Data Rating Transition Matrix operation is a Request for creating a rating transition matrix. This outbound operation is a Request for creating rating transition matrices. The Request Input Data Rating Transition Matrix operation includes a CreditPortfolioModelFSInputDataRatingTransitionMatrixRequest message type. The structure of the CreditPortfolioModelFSInputDataRatingTransitionMatrixRequest message type is specified by a CrdtPrtfoModFSInDatRatgMtxCrteReqMsg message data type. The Request Input Data Traditional Off Balance Sheet Item operation is a Request for creating a traditional off balance sheet. This outbound operation is a Request for creating traditional off balance sheets. The Request Input Data Traditional Off Balance Sheet Item operation includes a CreditPortfolioModelFSInputDataTraditionalOff-BalanceSheetItemRequest message type. The structure of the CreditPortfolioModelFSInputDataTraditionalOff-BalanceSheetItemRequest message type is specified by a CrdtPrtfoModFSInDatTOBSItmCrteReqMsg message data type. The Request Input Data Loan operation is a Request for creating a loan. This outbound operation is a Request for creating loans. The Request Input Data Loan operation includes a CreditPortfolioModelFSInputDataLoanRequest message type. The structure of the CreditPortfolioModelFSInputDataLoanRequest message type is specified by a CrdtPrtfoModFSInDatLoanCrteReqMsg message data type. The Request Input Data OTC Derivative operation is a Request for creating an OTC derivative. This outbound operation is a Request for creating derivatives. The Request Input Data OTC Derivative operation includes a CreditPortfolioModelFSInputDataOTCDerivativeRequest message type. The structure of the CreditPortfolioModelFSInputDataOTCDerivativeRequest message type is specified by a CrdtPrtfoModFSInDatOTCDeriCrteReqMsg message data type. The Request Input Data Securities Financing Transaction operation is a Request for creating a securities financing transaction. This outbound operation is a Request for creating SecuritiesFinancingTransactions. The Request Input Data Securities Financing Transaction operation includes a CreditPortfolioModelFSInputDataSecuritiesFinancingTransactionRequest message type. The structure of the CreditPortfolioModelFSInputDataSecuritiesFinancingTransactionRequest message type is specified by a CrdtPrtfoModFSInDatSecFTCrteReqMsg message data type. The Request Input Data Stock operation is a Request for creating a stock. This outbound operation is a Request for creating stock. The Request Input Data Stock operation includes a CreditPortfolioModelFSInputDataStockRequest message type. The structure of the CreditPortfolioModelFSInputDataStockRequest message type is specified by a CrdtPrtfoModFSInDatStockCrteReqMsg message data type. The Request Input Data Credit Derivative operation is a Request for creating a credit derivative. This outbound operation is a Request for creating credit derivatives. The Request Input Data Credit Derivative operation includes a CreditPortfolioModelFSInputDataCreditDerivativeRequest message type. The structure of the CreditPortfolioModelFSInputDataCreditDerivativeRequest message type is specified by a CrdtPrtfoModFSInDatCrdtDeriCrteReqMsg message data type. The Request Input Data Securitization operation is a Request for creating a securitization. This outbound operation is a Request for creating securitizations. The Request Input Data Securitization operation includes a CreditPortfolioModelFSInputDataSecuritizationRequest message type. The structure of the CreditPortfolioModelFSInputDataSecuritizationRequest message type is specified by a CreditPortfolioModelFSInputDataSecuritizationRequestMessage message data type. The Request Input Data Bond operation is a Request for creating a bond. This outbound operation is a Request for creating bonds. The Request Input Data Bond operation includes a CreditPortfolioModelFSInputDataBondRequest message type. The structure of the CreditPortfolioModelFSInputDataBondRequest message type is specified by a CrdtPrtfoModFSInDatBondCrteReqMsg message data type. The Request Input Data Business Partner operation is a Request for creating a business partner. This outbound operation is a Request for creating business partners. The Request Input Data Business Partner operation includes a CreditPortfolioModelFSInputDataBusinessPartnerRequest message type. The structure of the CreditPortfolioModelFSInputDataBusinessPartnerRequest message type is specified by a CrdtPrtfoModFSInDatBuPaCrteReqMsg message data type. The Request Input Data Portfolio Analysis Data operation is a Request for creating portfolio analysis data. This outbound operation is a Request for creating portfolio analysis data. The Request Input Data Portfolio Analysis Data operation includes a CreditPortfolioModelFSInputDataPortfolioAnalysisDataRequest message type. The structure of the CreditPortfolioModelFSInputDataPortfolioAnalysisDataRequest message type is specified by a CrdtPrtfoModFSInDatPrtfoAnlysDatkCrteReqMsg message data type. The RequestInputDataYieldCurveAsBulk operation is a BulkBulkRequest for creating a yield curve. This outbound operation is a BulkBulkRequest for creating yield curves. The RequestInputDataYieldCurveAsBulk operation includes a CreditPortfolioModelFSInputDataYieldCurveBulkBulkRequest message type. The structure of the CreditPortfolioModelFSInputDataYieldCurveBulkBulkRequest message type is specified by a CrdtPrtfoModFSInDatYldCrvBulkCrteReqMsg message data type. The RequestInputDataExchangeRateAsBulk operation is a BulkRequest for creating an exchange rate. This outbound operation is a BulkRequest for creating exchange rates. The RequestInputDataExchangeRateAsBulk operation includes a CreditPortfolioModelFSInputDataExchangeRateBulkRequest is a BulkRequest message type. The structure of the CreditPortfolioModelFSInputDataExchangeRateBulkRequest is a BulkRequest message type is specified by a CrdtPrtfoModFSInDatExchRateBulkCrteReq message data type. The Request Input Data Credit Spread Matrix as Bulk operation is a BulkRequest for creating a credit spread matrix. This outbound operation is a BulkRequest for creating credit spread matrices. The Request Input Data Credit Spread Matrix as Bulk operation includes a CreditPortfolioModelFSInputDataCreditSpreadMatrixBulkRequest message type. The structure of the CreditPortfolioModelFSInputDataCreditSpreadMatrixBulkRequest message type is specified by a CrdtPrtfoModFSInDatCrdtSprdBulkCrteReqMsg message data type. The Request Input Data Probability of Default Calibration Matrix as Bulk operation is a BulkRequest for creating a probability of default calibration matrix. This outbound operation is a BulkRequest for creating probability of default matrices. The Request Input Data Probability of Default Calibration Matrix as Bulk operation includes a CreditPortfolioModelFSInput- DataProbabilityOfDefaultCalibrationMatrixBulkRequest message type. The structure of the CreditPortfolioModelFS-InputDataProbabilityOfDe-faultCalibrationMatrixBulkRequest message type is specified by a CrdtPrtfoModFSInDatPDClbrtMtxBulkCrteReqMsg message data type. The Request Input Data Rating Transition Matrix as Bulk operation is a BulkRequest for creating a rating transition matrix. This outbound operation is a BulkRequest for creating rating transition matrices. The Request Input Data Rating Transition Matrix as Bulk operation includes a CreditPortfolioModelFSInput-DataRatingTransitionMatrixBulkRequest message type. The structure of the CreditPortfolioModelFSInput-DataRatingTransitionMatrixBulkRequest message type is specified by a CrdtPrtfoModFSInDatRatgMtx-BulkCrteReqMsg message data type. The Request Input Data Traditional Off Balance Sheet Item as Bulk operation is a BulkRequest for creating a traditional off balance sheet. This outbound operation is a BulkRequest for creating traditional off balance sheets. The Request Input Data Traditional Off Balance Sheet Item as Bulk operation includes a CreditPortfolioModelFSInputDataTraditionalOff-BalanceSheetItem-BulkRequest message type. The structure of the CreditPortfolioModelFSInputDataTraditionalOff-BalanceSheetItemBulkRequest message type is specified by a CrdtPrtfoModFSInDatTOBSItmBulkCrteReqMsg message data type. The Request Input Data Loan as Bulk operation is a BulkRequest for creating a loan. This outbound operation is a BulkRequest for creating loans. The Request Input Data Loan as Bulk operation includes a CreditPortfolioModelFSInputDataLoanBulkRequest message type. The structure of the CreditPortfolioModelFSInput-DataLoanBulkRequest message type is specified by a Crdt-PrtfoModFSInDatLoanBulkCrteReqMsg message data type. The Request Input Data OTC Derivative as Bulk operation is a BulkRequest for creating an OTC derivative. This outbound operation is a BulkRequest for creating derivatives. The Request Input Data OTC Derivative as Bulk operation includes a CreditPortfolioModelFSInput-DataOTCDerivativeBulkRequest message type. The structure of the CreditPortfolioModelFSInput-DataOTCDerivativeBulkRequest message type is specified by a CrdtPrtfoModFSInDatOTCDeriBulkCrteReqMsg message data type. The Request Input Data Securities Financing Transaction as Bulk operation is a BulkRequest for creating a securities financing transaction. This outbound operation is a BulkRequest for creating repo lending. The Request Input Data Securities Financing Transaction as Bulk operation includes a CreditPortfolioModelFSInput-DataSecuritiesFinancingTransactionBulkRequest message type. The structure of the CreditPortfolioModelFSInput-DataSecuritiesFinancingTransactionBulkRequest message type is specified by a CrdtPrtfoModFSInDatSecFT-BulkCrteReqMsg message data type. The Request Input Data Stock as Bulk operation is a BulkRequest for creating equity stock. This outbound operation is a BulkRequest for creating equity stock. The Request Input Data Stock as Bulk operation includes a CreditPortfolioModelFSInput-DataEquityStockBulkRequest message type. The structure of the CreditPortfolioModelFSInput-DataEquityStockBulkRequest message type is specified by a CrdtPrtfoModFSInDatStockBulkCrteReqMsg message data type. The Request Input Data Credit Derivative as Bulk operation is a BulkRequest for creating a credit derivative. This outbound operation is a BulkRequest for creating credit derivatives. The Request Input Data Credit Derivative as Bulk operation includes a CreditPortfolioModelFSInput-DataCreditDerivativeCreateBulkRequest message type. The structure of the CreditPortfolioModelFSInput-DataCreditDerivativeCreateBulkRequest message type is specified by a CrdtPrtfoModFSInDatCrdt-DeriBulkCrteReqMsg message data type. The Request Input Data Securitization as Bulk operation is a BulkRequest for creating securitization. This outbound operation is a BulkRequest for creating securitization. The Request Input Data Securitization as Bulk operation includes a CreditPortfolio-ModelFSInputDataSecuritizationCreateBulkRequest message type. The structure of the CreditPortfolioModelFSInput-DataSecuritizationCreateBulkRequest message type is specified by a CreditPortfolioModelFSInput-DataSecuritizationCreateBulkRequestMessage message data type. The Request Input Data Bond as Bulk operation is a BulkRequest for creating a bond. This outbound operation is a BulkRequest for creating bonds. The Request Input Data Bond as Bulk operation includes a CreditPortfolioModelFS-InputDataBondCreateBulkRequest message type. The structure of the CreditPortfolioModelFSInput-DataBondCreateBulkRequest message type is specified by a CrdtPrtfoModFSInDatBondBulkCrteReqMsg message data type. The Request Input Data Business Partner as Bulk operation is a BulkRequest for creating a business partner. This outbound operation is a BulkRequest for creating business partners. The Request Input Data Business Partner as Bulk operation includes a CreditPortfolioModelFSInput-DataBusinessPartnerBulkRequest message type. The structure of the CreditPortfolioModelFSInput-DataBusinessPartnerBulkRequest message type is specified by a CrdtPrtfoModFSInDatBuPaBulkCrteReqMsg message data type. The Request Input Data Portfolio Analysis Data as Bulk operation is a BulkRequest for creating portfolio analysis data. This outbound operation is a BulkRequest for creating portfolio analysis data. The Request Input Data Portfolio Analysis Data as Bulk operation includes a CreditPortfolio-ModelFSInputDataPortfolioAnalysisDataBulkRequest message type. The structure of the CreditPortfolioModelFSInput-DataPortfolioAnalysisDataBulkRequest message type is specified by a CrdtPrtfoModFSInDatPrt-foAnlysDatBulkCrteReqMsg message data type.

FIGS. 63-1 through 63-135 show an example configuration of an Element Structure that includes a CreditPortfolioModelFSInputDataRequest 630000 package. The CreditPortfolioModelFSInputDataRequest 630000 package is a Credit-PortfolioModelFSInputDataYieldCurveRequestMessage 630004 data type. The CreditPortfolioModelFSInput-DataRequest 630000 package includes a CreditPortfolio-ModelFSInputDataRequest 630002 entity. The CreditPortfolioModelFSInputDataRequest 630000 package includes various packages, namely a MessageHeader 630006 and a CreditPortfolioModel 630012. The MessageHeader 630006 package is a BusinessDocumentMessageHeader 630010 data type. The MessageHeader 630006 package includes a MessageHeader 630008 entity. The CreditPortfolioModel 630012 package includes a CreditPortfolioModel 630014 entity. The CreditPortfolioModel 630012 package includes an InputData 630032 package. The CreditPortfolioModel 630014 entity includes an ID 630016 attribute. The Credit-PortfolioModel 630014 entity includes various subordinate entities, namely a CreditPortfolioManagement-ProcessControl 630020 and a CreditPortfolio 630026. The ID 630016 attribute is a PDT_CreditPortfolioModelID 630018 data type.

The CreditPortfolioManagementProcessControl 630020 entity includes a DataTransferID 630022 attribute. The DataTransferID 630022 attribute is a PDT_CreditPortfolioManagementProcessControlDataTransferID 630024 data type. The CreditPortfolio 630026 entity includes an ID 630028 attribute. The ID 630028 attribute is a PDT_CreditPortfolioID 630030 data type. The InputData 630032 package includes an InputData 630034 entity. The InputData 630032 package includes various packages, namely a YieldCurve 630036, an ExchangeRateItem 630064, a RatingTransitionMatrix 630080, a CreditSpreadMatrix 630112, a ProbabilityOfDefaultCalibrationMatrix 630150, a TraditionalOffBalanceSheetItem 630184, a Loan 630580, an OTCDerivative 630996, a SecuritiesFinancingTransaction 631186, a Stock 631376, a CreditDerivative 631536, a Securitization 631886, a Bond 631960, a BusinessPartner 632340 and a PortfolioAnalysisData 632486. The YieldCurve 630036 package includes a YieldCurve 630038 entity. The YieldCurve 630036 package includes an Item 630052 package. The YieldCurve 630038 entity includes various attributes, namely an ID 630040, a YieldCurveModelID 630044 and a ValidityDate 630048. The ID 630040 attribute is a YieldCurveID 630042 data type. The YieldCurveModelID 630044 attribute is a PDT_YieldCurveModelID 630046 data type. The ValidityDate 630048 attribute is a Date 630050 data type. The Item 630052 package includes an Item 630054 entity. The Item 630054 entity includes various attributes, namely a TenorDuration 630056 and an InterestRateDoubleValue 630060. The TenorDuration 630056 attribute is a Duration 630058 data type. The InterestRateDoubleValue 630060 attribute is a DoubleValue 630062 data type.

The ExchangeRateItem 630064 package includes an ExchangeRate 630066 entity. The ExchangeRate 630066 entity includes various attributes, namely an ID 630068, a ValidityDate 630072 and an ExchangeRate 630076. The ID 630068 attribute is a PDT_ExchangeRateID 630070 data type. The ValidityDate 630072 attribute is a Date 630074 data type. The ExchangeRate 630076 attribute is an ExchangeRate 630078 data type.

The RatingTransitionMatrix 630080 package includes a RatingTransitionMatrix 630082 entity. The RatingTransitionMatrix 630080 package includes an Item 630096 package. The RatingTransitionMatrix 630082 entity includes various attributes, namely an ID 630084, a RatingModelID 630088 and a ValidityDatePeriod 630092. The ID 630084 attribute is a PDT_RatingTransitionMatrixID 630086 data type. The RatingModelID 630088 attribute is a PDT_RatingModelID 630090 data type. The ValidityDatePeriod 630092 attribute is a CLOSED_DatePeriod 630094 data type. The Item 630096 package includes an Item 630098 entity. The Item 630098 entity includes various attributes, namely a PeriodBeginCreditRatingCode 630100, a PeriodEndCreditRatingCode 630104 and a ProbabilityOfTransitionDoubleValue 630108. The PeriodBeginCreditRatingCode 630100 attribute is a CreditRatingCode 630102 data type. The PeriodEndCreditRatingCode 630104 attribute is a CreditRatingCode 630106 data type. The ProbabilityOfTransitionDoubleValue 630108 attribute is a DoubleValue 630110 data type. The CreditSpreadMatrix 630112 package includes a CreditSpreadMatrix 630114 entity. The CreditSpreadMatrix 630112 package includes an Item 630128 package. The CreditSpreadMatrix 630114 entity includes various attributes, namely an ID 630116, a RatingModelID 630120 and a ValidityDate 630124. The ID 630116 attribute is a PDT_CreditSpreadMatrixID 630118 data type. The RatingModelID 630120 attribute is a PDT_RatingModelID 630122 data type. The ValidityDate 630124 attribute is a Date 630126 data type. The Item 630128 package includes an Item 630130 entity. The Item 630130 entity includes various attributes, namely a CreditRatingCode 630132 and a YieldCurveModelID 630136. The Item 630130 entity includes a CreditSpread 630140 subordinate entity. The CreditRatingCode 630132 attribute is a CreditRatingCode 630134 data type. The YieldCurveModelID 630136 attribute is a PDT_YieldCurveModelID 630138 data type. The CreditSpread 630140 entity includes various attributes, namely a TermDuration 630142 and a SpreadDecimalValue 630146. The TermDuration 630142 attribute is a Duration 630144 data type. The SpreadDecimalValue 630146 attribute is a DecimalValue 630148 data type. The ProbabilityOfDefaultCalibrationMatrix 630150 package includes a ProbabilityOfDefaultCalibrationMatrix 630152 entity. The ProbabilityOfDefaultCalibrationMatrix 630150 package includes an Item 630166 package. The ProbabilityOfDefaultCalibrationMatrix 630152 entity includes various attributes, namely an ID 630154, a RatingModelID 630158 and a ValidityDate 630162. The ID 630154 attribute is a PDT_ProbabilityOfDefaultCalibrationMatrixID 630156 data type. The RatingModelID 630158 attribute is a PDT_RatingModelID 630160 data type. The ValidityDate 630162 attribute is a Date 630164 data type. The Item 630166 package includes an Item 630168 entity. The Item 630168 entity includes a CreditRatingCode 630170 attribute. The Item 630168 entity includes a ProbabilityOfDefault 630174 subordinate entity. The CreditRatingCode 630170 attribute is a CreditRatingCode 630172 data type. The ProbabilityOfDefault 630174 entity includes various attributes, namely a TermDuration 630176 and a ProbabilityOfDefaultDoubleValue 630180. The TermDuration 630176 attribute is a Duration 630178 data type. The ProbabilityOfDefaultDoubleValue 630180 attribute is a DoubleValue 630182 data type. The TraditionalOffBalanceSheetItem 630184 package includes a TraditionalOffBalanceSheetItem 630186 entity. The TraditionalOffBalanceSheetItem 630184 package includes various packages, namely a Counterparty 630216, a GuarantorParty 630224, a CreditExposureData 630236, a FinancialCondition 630300, a ProbabilityOfDefault 630404, a Rating 630420, a ProbabilityOfDefaultPriceMatrix 630456, a RatingPriceMatrix 630486, a Prepayment 630528, a SpreadCurve 630550 and a Property 630568. The TraditionalOffBalanceSheetItem 630186 entity includes various attributes, namely an ID 630188, a GuaranteeID 630192, a Description 630196, a CurrencyCode 630200, a ValidityPeriod 630204, an ExternalLineAmount 630208 and an UtilizationAmount 630212. The ID 630188 attribute is a PDT_TraditionalOffBalanceSheetItemID 630190 data type. The GuaranteeID 630192 attribute is an Identifier 630194 data type. The Description 630196 attribute is a Description 630198 data type. The CurrencyCode 630200 attribute is a CurrencyCode 630202 data type. The ValidityPeriod 630204 attribute is a CLOSED_DatePeriod 630206 data type. The ExternalLineAmount 630208 attribute is an Amount 630210 data type. The UtilizationAmount 630212 attribute is an Amount 630214 data type. The Counterparty 630216 package includes a Counterparty 630218 entity. The Counterparty 630218 entity includes an InternalID 630220 attribute. The InternalID 630220 attribute is a PartyInternalID 630222 data type. The GuarantorParty 630224 package includes a GuarantorParty 630226 entity. The GuarantorParty 630226 entity includes various attributes, namely an InternalID 630228 and a GuarantorSubstitutionCategoryCode 630232. The InternalID 630228 attribute is a PartyInternalID 630230 data type.

The GuarantorSubstitutionCategoryCode 630232 attribute is a CategoryCode 630234 data type. The CreditExposureData 630236 package includes a CreditExposureData 630238 entity. The CreditExposureData 630238 entity includes various attributes, namely a LossGivenDefaultDecimalValue 630240, a ShapeBetaDistributionDecimalValue 630244, an ExpectedLossGivenDefaultDecimalValue 630248, an ExposureAtDefaultAmount 630252, an ExpectedUsageDecimalValue 630256, an UsageGivenDefaultDecimalValue 630260, a CreditPortfolioManagementProductCode 630264, an IndividualAggregationConstituentsNumberValue 630268 and an ActualAggregateNumberValue 630272. The CreditExposureData 630238 entity includes various subordinate entities, namely a PriceAtHorizon 630276 and a CurrentPrice 630290. The LossGivenDefaultDecimalValue 630240 attribute is a DecimalValue 630242 data type. The ShapeBetaDistributionDecimalValue 630244 attribute is a DecimalValue 630246 data type. The ExpectedLossGivenDefaultDecimalValue 630248 attribute is a DecimalValue 630250 data type. The ExposureAtDefaultAmount 630252 attribute is an Amount 630254 data type. The ExpectedUsageDecimalValue 630256 attribute is a DecimalValue 630258 data type. The UsageGivenDefaultDecimalValue 630260 attribute is a DecimalValue 630262 data type. The CreditPortfolioManagementProductCode 630264 attribute is a Code 630266 data type. The IndividualAggregationConstituentsNumberValue 630268 attribute is a NumberValue 630270 data type. The ActualAggregateNumberValue 630272 attribute is a NumberValue 630274 data type. The PriceAtHorizon 630276 entity includes various attributes, namely a Duration 630278, an Amount 630282 and a DecimalValue 630286. The Duration 630278 attribute is a Duration 630280 data type. The Amount 630282 attribute is an Amount 630284 data type. The DecimalValue 630286 attribute is a DecimalValue 630288 data type. The CurrentPrice 630290 entity includes various attributes, namely an Amount 630292 and a DecimalValue 630296. The Amount 630292 attribute is an Amount 630294 data type. The DecimalValue 630296 attribute is a DecimalValue 630298 data type. The FinancialCondition 630300 package includes a FinancialCondition 630302 entity. The FinancialCondition 630302 entity includes various subordinate entities, namely an InterestCondition 630304, a FeeCondition 630352 and a PaymentCondition 630378. The InterestCondition 630304 entity includes a BankContractFinancialConditionSpecification 630306 subordinate entity. The BankContractFinancialConditionSpecification 630306 entity includes a BankContractFinancialConditionUsageCode 630308 attribute. The BankContractFinancialConditionSpecification 630306 entity includes various subordinate entities, namely a Calculation 630312 and an AmountSpecification 630320. The BankContractFinancialConditionUsageCode 630308 attribute is a BankContractFinancialConditionTypeUsageCode 630310 data type. The Calculation 630312 entity includes a RecurrenceSpecification 630314 subordinate entity. The RecurrenceSpecification 630314 entity includes a PeriodDurationDayRecurrence 630316 attribute. The PeriodDurationDayRecurrence 630316 attribute is a PeriodDurationDayRecurrence 630318 data type. The AmountSpecification 630320 entity includes various attributes, namely an Amount 630322 and a Percent 630326. The AmountSpecification 630320 entity includes various subordinate entities, namely an InterestSpecification 630330 and a VariableInterest 630336. The Amount 630322 attribute is an Amount 630324 data type. The Percent 630326 attribute is a Percent 630328 data type. The InterestSpecification 630330 entity includes an InterestCalculationMethodCode 630332 attribute. The InterestCalculationMethodCode 630332 attribute is an InterestCalculationMethodCode 630334 data type. The VariableInterest 630336 entity includes various attributes, namely a ReferenceInterestCurveCode 630338, a MarginPercent 630342 and a YieldCurveModelID 630348. The ReferenceInterestCurveCode 630338 attribute is a ReferenceInterestCurveCode 630340 data type. The MarginPercent 630342 attribute is a Percent; Qualifier: Margin 630344 data type. The YieldCurveModelID 630348 attribute is a PDT_YieldCurveModelID 630350 data type. The FeeCondition 630352 entity includes a BankContractFinancialConditionSpecification 630354 subordinate entity. The BankContractFinancialConditionSpecification 630354 entity includes a BankContractFinancialConditionUsageCode 630356 attribute. The BankContractFinancialConditionSpecification 630354 entity includes various subordinate entities, namely a Calculation 630360 and an AmountSpecification 630368. The BankContractFinancialConditionUsageCode 630356 attribute is a BankContractFinancialConditionTypeUsageCode 630358 data type. The Calculation 630360 entity includes a RecurrenceSpecification 630362 subordinate entity. The RecurrenceSpecification 630362 entity includes a PeriodDurationDayRecurrence 630364 attribute. The PeriodDurationDayRecurrence 630364 attribute is a PeriodDurationDayRecurrence 630366 data type. The AmountSpecification 630368 entity includes various attributes, namely an Amount 630370 and a Percent 630374. The Amount 630370 attribute is an Amount 630372 data type. The Percent 630374 attribute is a Percent 630376 data type. The PaymentCondition 630378 entity includes a BankContractFinancialConditionSpecification 630380 subordinate entity. The BankContractFinancialConditionSpecification 630380 entity includes a BankContractFinancialConditionUsageCode 630382 attribute. The BankContractFinancialConditionSpecification 630380 entity includes various subordinate entities, namely a Calculation 630386 and an AmountSpecification 630394. The BankContractFinancialConditionUsageCode 630382 attribute is a BankContractFinancialConditionTypeUsageCode 630384 data type. The Calculation 630386 entity includes a RecurrenceSpecification 630388 subordinate entity. The RecurrenceSpecification 630388 entity includes a PeriodDurationDayRecurrence 630390 attribute. The PeriodDurationDayRecurrence 630390 attribute is a PeriodDurationDayRecurrence 630392 data type. The AmountSpecification 630394 entity includes various attributes, namely an Amount 630396 and a Percent 630400. The Amount 630396 attribute is an Amount 630398 data type. The Percent 630400 attribute is a Percent 630402 data type. The ProbabilityOfDefault 630404 package includes a ProbabilityOfDefault 630406 entity. The ProbabilityOfDefault 630406 entity includes various attributes, namely a ValidityDatePeriod 630408, a TermDuration 630412 and a ProbabilityOfDefaultDoubleValue 630416. The ValidityDatePeriod 630408 attribute is a CLOSED_DatePeriod 630410 data type. The TermDuration 630412 attribute is a Duration 630414 data type. The ProbabilityOfDefaultDoubleValue 630416 attribute is a DoubleValue 630418 data type. The Rating 630420 package includes a Rating 630422 entity. The Rating 630422 entity includes various attributes, namely a ModelID 630424, a ValidityDatePeriod 630428, a Code 630432, a MasterCreditRatingCode 630436, an InternalRatingIndicator 630440, a MaturityCode 630444, a Date 630448 and a TendencyCode 630452. The ModelID 630424 attribute is a PDT_RatingModelID 630426 data type. The ValidityDatePeriod 630428 attribute is a CLOSED_DatePeriod 630430 data type. The Code 630432 attribute is a CreditRatingCode 630434 data type. The MasterCreditRatingCode 630436 attribute is a CreditRatingCode 630438 data type. The InternalRatingIndicator 630440 attribute is an Indicator 630442 data type. The MaturityCode 630444 attribute is a Code 630446 data type. The Date 630448 attribute is a Date 630450 data type. The TendencyCode 630452 attribute is a Code 630454 data type. The ProbabilityOfDefaultPriceMatrix 630456 package includes a ProbabilityOfDefaultPriceMatrix 630458 entity. The ProbabilityOfDefaultPriceMatrix 630458 entity includes an Item 630460 subordinate entity. The Item 630460 entity includes various attributes, namely a ValidityDate 630462, a ProbabilityOfDefaultDecimalValue 630466, an UsageDecimalValue 630470, a CommitmentFeeDecimalValue 630474, a FacilityFeeDecimalValue 630478 and a SpreadDecimalValue 630482. The ValidityDate 630462 attribute is a Date 630464 data type. The ProbabilityOfDefaultDecimalValue 630466 attribute is a DecimalValue 630468 data type. The UsageDecimalValue 630470 attribute is a DecimalValue 630472 data type. The CommitmentFeeDecimalValue 630474 attribute is a DecimalValue 630476 data type. The FacilityFeeDecimalValue 630478 attribute is a DecimalValue 630480 data type. The SpreadDecimalValue 630482 attribute is a DecimalValue 630484 data type. The RatingPriceMatrix 630486 package includes a RatingPriceMatrix 630488 entity. The RatingPriceMatrix 630488 entity includes an Item 630490 subordinate entity. The Item 630490 entity includes various attributes, namely a ValidityDate 630492, a RatingModelID 630496, a MinimumCreditRatingCode 630500, a MaximumCreditRatingCode 630504, a ProbabilityOfDefaultCalibrationMatrixID 630508, an UsageDecimalValue 630512, a CommitmentFeeDecimalValue 630516, a FacilityFeeDecimalValue 630520 and a SpreadDecimalValue 630524. The ValidityDate 630492 attribute is a Date 630494 data type. The RatingModelID 630496 attribute is a PDT_RatingModelID 630498 data type. The MinimumCreditRatingCode 630500 attribute is a CreditRatingCode 630502 data type. The MaximumCreditRatingCode 630504 attribute is a CreditRatingCode 630506 data type. The ProbabilityOfDefaultCalibrationMatrixID 630508 attribute is a PDT_ProbabilityOfDefaultCalibrationMatrixID 630510 data type. The UsageDecimalValue 630512 attribute is a DecimalValue 630514 data type. The CommitmentFeeDecimalValue 630516 attribute is a DecimalValue 630518 data type. The FacilityFeeDecimalValue 630520 attribute is a DecimalValue 630522 data type. The SpreadDecimalValue 630524 attribute is a DecimalValue 630526 data type. The Prepayment 630528 package includes a Prepayment 630530 entity. The Prepayment 630530 entity includes a PrepayableIndicator 630532 attribute. The Prepayment 630530 entity includes an Item 630536 subordinate entity. The PrepayableIndicator 630532 attribute is an Indicator 630534 data type. The Item 630536 entity includes various attributes, namely a PaymentDate 630538, a CostsOfPrepaymentFractionDecimalValue 630542 and a PenaltyOfPrepaymentFractionDecimalValue 630546. The PaymentDate 630538 attribute is a Date 630540 data type. The CostsOfPrepaymentFractionDecimalValue 630542 attribute is a DecimalValue 630544 data type. The PenaltyOfPrepaymentFractionDecimalValue 630546 attribute is a DecimalValue 630548 data type. The SpreadCurve 630550 package includes a SpreadCurve 630552 entity. The SpreadCurve 630552 entity includes an Item 630554 subordinate entity. The Item 630554 entity includes various attributes, namely a ValidityDate 630556, a Duration 630560 and a SpreadDecimalValue 630564. The ValidityDate 630556 attribute is a Date 630558 data type. The Duration 630560 attribute is a Duration 630562 data type. The SpreadDecimalValue 630564 attribute is a DecimalValue 630566 data type. The Property 630568 package includes a Property 630570 entity. The Property 630570 entity includes various attributes, namely an ID 630572 and a Value 630576. The ID 630572 attribute is a PropertyID 630574 data type. The Value 630576 attribute is a PropertyValue 630578 data type. The Loan 630580 package includes a Loan 630582 entity. The Loan 630580 package includes various packages, namely a Counterparty 630612, a GuarantorParty 630620, a CreditExposureData 630632, a FinancialCondition 630696, a CashFlowItem 630800, a ProbabilityOfDefault 630820, a Rating 630836, a ProbabilityOfDefaultPriceMatrix 630872, a RatingPriceMatrix 630902, a Prepayment 630944, a SpreadCurve 630966 and a Property 630984. The Loan 630582 entity includes various attributes, namely an ID 630584, a GuaranteeID 630588, a Description 630592, a CurrencyCode 630596, a ValidityPeriod 630600, an ExternalLineAmount 630604 and an UtilizationAmount 630608. The ID 630584 attribute is a PDT_LoanID 630586 data type. The GuaranteeID 630588 attribute is an Identifier 630590 data type. The Description 630592 attribute is a Description 630594 data type. The CurrencyCode 630596 attribute is a CurrencyCode 630598 data type. The ValidityPeriod 630600 attribute is a CLOSED_DatePeriod 630602 data type. The ExternalLineAmount 630604 attribute is an Amount 630606 data type. The UtilizationAmount 630608 attribute is an Amount 630610 data type. The Counterparty 630612 package includes a Counterparty 630614 entity. The Counterparty 630614 entity includes an InternalID 630616 attribute. The InternalID 630616 attribute is a PartyInternalID 630618 data type. The GuarantorParty 630620 package includes a GuarantorParty 630622 entity. The GuarantorParty 630622 entity includes various attributes, namely an InternalID 630624 and a GuarantorSubstitutionCategoryCode 630628. The InternalID 630624 attribute is a PartyInternalID 630626 data type. The GuarantorSubstitutionCategoryCode 630628 attribute is a Code 630630 data type. The CreditExposureData 630632 package includes a CreditExposureData 630634 entity. The CreditExposureData 630634 entity includes various attributes, namely a LossGivenDefaultDecimalValue 630636, a ShapeBetaDistributionDecimalValue 630640, an ExpectedLossGivenDefaultDecimalValue 630644, an ExposureAtDefaultAmount 630648, an ExpectedUsageDecimalValue 630652, an UsageGivenDefaultDecimalValue 630656, a CreditPortfolioManagementProductCode 630660, an IndividualAggregationConstituentsNumberValue 630664 and an ActualAggregateNumberValue 630668. The CreditExposureData 630634 entity includes various subordinate entities, namely a PriceAtHorizon 630672 and a CurrentPrice 630686. The LossGivenDefaultDecimalValue 630636 attribute is a DecimalValue 630638 data type. The ShapeBetaDistributionDecimalValue 630640 attribute is a DecimalValue 630642 data type. The ExpectedLossGivenDefaultDecimalValue 630644 attribute is a DecimalValue 630646 data type. The ExposureAtDefaultAmount 630648 attribute is an Amount 630650 data type. The ExpectedUsageDecimalValue 630652 attribute is a DecimalValue 630654 data type. The UsageGivenDefaultDecimalValue 630656 attribute is a DecimalValue 630658 data type. The CreditPortfolioManagementProductCode 630660 attribute is a Code 630662 data type. The IndividualAggregationConstituentsNumberValue 630664 attribute is a NumberValue 630666 data type. The ActualAggregateNumberValue 630668 attribute is a NumberValue 630670 data type. The PriceAtHorizon 630672 entity includes various attributes, namely a Duration 630674, an Amount 630678 and a DecimalValue 630682. The Duration 630674 attribute is a Duration 630676 data type. The Amount 630678 attribute is an Amount 630680 data type. The DecimalValue 630682 attribute is a DecimalValue 630684 data type. The CurrentPrice 630686 entity includes various attributes, namely an Amount 630688 and a DecimalValue 630692. The Amount 630688 attribute is an Amount 630690 data type. The DecimalValue 630692 attribute is a DecimalValue 630694 data type. The FinancialCondition 630696 package includes a FinancialCondition 630698 entity. The FinancialCondition 630698 entity includes various subordinate entities, namely an InterestCondition 630700, a FeeCondition 630748 and a PaymentCondition 630774. The InterestCondition 630700 entity includes a BankContractFinancialConditionSpecification 630702 subordinate entity. The BankContractFinancialConditionSpecification 630702 entity includes a BankContractFinancialConditionUsageCode 630704 attribute. The BankContractFinancialConditionSpecification 630702 entity includes various subordinate entities, namely a Calculation 630708 and an AmountSpecification 630716. The BankContractFinancialConditionUsageCode 630704 attribute is a BankContractFinancialConditionTypeUsageCode 630706 data type. The Calculation 630708 entity includes a RecurrenceSpecification 630710 subordinate entity. The RecurrenceSpecification 630710 entity includes a PeriodDurationDayRecurrence 630712 attribute. The PeriodDurationDayRecurrence 630712 attribute is a PeriodDurationDayRecurrence 630714 data type. The AmountSpecification 630716 entity includes various attributes, namely an Amount 630718 and a Percent 630722. The AmountSpecification 630716 entity includes various subordinate entities, namely an InterestSpecification 630726 and a VariableInterest 630732. The Amount 630718 attribute is an Amount 630720 data type. The Percent 630722 attribute is a Percent 630724 data type. The InterestSpecification 630726 entity includes an InterestCalculationMethodCode 630728 attribute. The InterestCalculationMethodCode 630728 attribute is an InterestCalculationMethodCode 630730 data type. The VariableInterest 630732 entity includes various attributes, namely a ReferenceInterestCurveCode 630734, a MarginPercent 630738 and a YieldCurveModelID 630744. The ReferenceInterestCurveCode 630734 attribute is a ReferenceInterestCurveCode 630736 data type. The MarginPercent 630738 attribute is a Percent; Qualifier: Margin 630740 data type. The YieldCurveModelID 630744 attribute is a PDT_YieldCurveModelID 630746 data type. The FeeCondition 630748 entity includes a BankContractFinancialConditionSpecification 630750 subordinate entity. The BankContractFinancialConditionSpecification 630750 entity includes a BankContractFinancialConditionUsageCode 630752 attribute. The BankContractFinancialConditionSpecification 630750 entity includes various subordinate entities, namely a Calculation 630756 and an AmountSpecification 630764. The BankContractFinancialConditionUsageCode 630752 attribute is a BankContractFinancialConditionTypeUsageCode 630754 data type. The Calculation 630756 entity includes a RecurrenceSpecification 630758 subordinate entity. The RecurrenceSpecification 630758 entity includes a PeriodDurationDayRecurrence 630760 attribute. The PeriodDurationDayRecurrence 630760 attribute is a PeriodDurationDayRecurrence 630762 data type. The AmountSpecification 630764 entity includes various attributes, namely an Amount 630766 and a Percent 630770. The Amount 630766 attribute is an Amount 630768 data type. The Percent 630770 attribute is a Percent 630772 data type. The PaymentCondition 630774 entity includes a BankContractFinancialConditionSpecification 630776 subordinate entity. The BankContractFinancialConditionSpecification 630776 entity includes a BankContractFinancialConditionUsageCode 630778 attribute. The BankContractFinancialConditionSpecification 630776 entity includes various subordinate entities, namely a Calculation 630782 and an AmountSpecification 630790. The BankContractFinancialConditionUsageCode 630778 attribute is a BankContractFinancialConditionTypeUsageCode 630780 data type. The Calculation 630782 entity includes a RecurrenceSpecification 630784 subordinate entity. The RecurrenceSpecification 630784 entity includes a PeriodDurationDayRecurrence 630786 attribute. The PeriodDurationDayRecurrence 630786 attribute is a PeriodDurationDayRecurrence 630788 data type. The AmountSpecification 630790 entity includes various attributes, namely an Amount 630792 and a Percent 630796. The Amount 630792 attribute is an Amount 630794 data type. The Percent 630796 attribute is a Percent 630798 data type. The CashFlowItem 630800 package includes a CashFlowItem 630802 entity. The CashFlowItem 630802 entity includes various attributes, namely a CashFlowDate 630804, an InterestCashFlowAmount 630808, a ChargeCashFlowAmount 630812 and a PaymentCashFlowAmount 630816. The CashFlowDate 630804 attribute is a Date 630806 data type. The InterestCashFlowAmount 630808 attribute is an Amount 630810 data type. The ChargeCashFlowAmount 630812 attribute is an Amount 630814 data type. The PaymentCashFlowAmount 630816 attribute is an Amount 630818 data type. The ProbabilityOfDefault 630820 package includes a ProbabilityOfDefault 630822 entity. The ProbabilityOfDefault 630822 entity includes various attributes, namely a ValidityDatePeriod 630824, a TermDuration 630828 and a ProbabilityOfDefaultDoubleValue 630832. The ValidityDatePeriod 630824 attribute is a CLOSED_DatePeriod 630826 data type. The TermDuration 630828 attribute is a Duration 630830 data type. The ProbabilityOfDefaultDoubleValue 630832 attribute is a DoubleValue 630834 data type. The Rating 630836 package includes a Rating 630838 entity. The Rating 630838 entity includes various attributes, namely a ModelID 630840, a ValidityDatePeriod 630844, a Code 630848, a MasterCreditRatingCode 630852, an InternalRatingIndicator 630856, a MaturityCode 630860, a Date 630864 and a TendencyCode 630868. The ModelID 630840 attribute is a PDT_RatingModelID 630842 data type. The ValidityDatePeriod 630844 attribute is a CLOSED_DatePeriod 630846 data type. The Code 630848 attribute is a CreditRatingCode 630850 data type. The MasterCreditRatingCode 630852 attribute is a CreditRatingCode 630854 data type. The InternalRatingIndicator 630856 attribute is an Indicator 630858 data type. The MaturityCode 630860 attribute is a Code 630862 data type. The Date 630864 attribute is a Date 630866 data type. The TendencyCode 630868 attribute is a Code 630870 data type. The ProbabilityOfDefaultPriceMatrix 630872 package includes a ProbabilityOfDefaultPriceMatrix 630874 entity. The ProbabilityOfDefaultPriceMatrix 630874 entity includes an Item 630876 subordinate entity. The Item 630876 entity includes various attributes, namely a ValidityDate 630878, a ProbabilityOfDefaultDecimalValue 630882, an UsageDecimalValue 630886, a CommitmentFeeDecimalValue 630890, a FacilityFeeDecimalValue 630894 and a SpreadDecimalValue 630898. The ValidityDate 630878 attribute is a Date 630880 data type. The ProbabilityOfDefaultDecimalValue 630882 attribute is a DecimalValue 630884 data type. The UsageDecimalValue 630886 attribute is a DecimalValue 630888 data type. The CommitmentFeeDecimalValue 630890 attribute is a DecimalValue 630892 data type. The FacilityFeeDecimalValue 630894 attribute is a DecimalValue 630896 data type. The SpreadDecimalValue 630898 attribute is a DecimalValue 630900 data type. The RatingPriceMatrix 630902 package includes a RatingPriceMatrix 630904 entity. The RatingPriceMatrix 630904 entity includes an Item 630906 subordinate entity. The Item 630906 entity includes various attributes, namely a ValidityDate 630908, a RatingModelID 630912, a MinimumCreditRatingCode 630916, a MaximumCreditRatingCode 630920, a ProbabilityOfDefaultCalibrationMatrixID 630924, an UsageDecimalValue 630928, a CommitmentFeeDecimalValue 630932, a FacilityFeeDecimalValue 630936 and a SpreadDecimalValue 630940. The ValidityDate 630908 attribute is a Date 630910 data type. The RatingModelID 630912 attribute is a PDT_RatingModelID 630914 data type. The MinimumCreditRatingCode 630916 attribute is a CreditRatingCode 630918 data type. The MaximumCreditRatingCode 630920 attribute is a CreditRatingCode 630922 data type. The ProbabilityOfDefaultCalibrationMatrixID 630924 attribute is a PDT_ProbabilityOfDefaultCalibrationMatrixID 630926 data type. The UsageDecimalValue 630928 attribute is a DecimalValue 630930 data type. The CommitmentFeeDecimalValue 630932 attribute is a DecimalValue 630934 data type. The FacilityFeeDecimalValue 630936 attribute is a DecimalValue 630938 data type. The SpreadDecimalValue 630940 attribute is a DecimalValue 630942 data type. The Prepayment 630944 package includes a Prepayment 630946 entity. The Prepayment 630946 entity includes a PrepayableIndicator 630948 attribute. The Prepayment 630946 entity includes an Item 630952 subordinate entity. The PrepayableIndicator 630948 attribute is an Indicator 630950 data type. The Item 630952 entity includes various attributes, namely a PaymentDate 630954, a CostsOfPrepaymentFractionDecimalValue 630958 and a PenaltyOfPrepaymentFractionDecimalValue 630962. The PaymentDate 630954 attribute is a Date 630956 data type. The CostsOfPrepaymentFractionDecimalValue 630958 attribute is a DecimalValue 630960 data type. The PenaltyOfPrepaymentFractionDecimalValue 630962 attribute is a DecimalValue 630964 data type. The SpreadCurve 630966 package includes a SpreadCurve 630968 entity. The SpreadCurve 630968 entity includes an Item 630970 subordinate entity. The Item 630970 entity includes various attributes, namely a ValidityDate 630972, a Duration 630976 and a SpreadDecimalValue 630980. The ValidityDate 630972 attribute is a Date 630974 data type. The Duration 630976 attribute is a Duration 630978 data type. The SpreadDecimalValue 630980 attribute is a DecimalValue 630982 data type. The Property 630984 package includes a Property 630986 entity. The Property 630986 entity includes various attributes, namely an ID 630988 and a Value 630992. The ID 630988 attribute is a PropertyID 630990 data type. The Value 630992 attribute is a PropertyValue 630994 data type. The OTCDerivative 630996 package includes an OTCDerivative 630998 entity. The OTCDerivative 630996 package includes various packages, namely a Counterparty 631020, a GuarantorParty 631028, a CreditExposureData 631040, a ProbabilityOfDefault 631088, a Rating 631104, an Exposure Profile 631140, a RiskFreeProfile 631158 and a Property 631172. The OTCDerivative 630998 entity includes various attributes, namely an ID 631000, a GuaranteeID 631004, a Description 631008, a CurrencyCode 631012 and a ValidityPeriod 631016. The ID 631000 attribute is a PDT_OTCDerivativeID 631002 data type. The GuaranteeID 631004 attribute is an Identifier 631006 data type. The Description 631008 attribute is a Description 631010 data type. The CurrencyCode 631012 attribute is a CurrencyCode 631014 data type. The ValidityPeriod 631016 attribute is a CLOSED_DatePeriod 631018 data type. The Counterparty 631020 package includes a Counterparty 631022 entity. The Counterparty 631022 entity includes an InternalID 631024 attribute. The InternalID 631024 attribute is a PartyInternalID 631026 data type. The GuarantorParty 631028 package includes a GuarantorParty 631030 entity. The GuarantorParty 631030 entity includes various attributes, namely an InternalID 631032 and a GuarantorSubstitutionCategoryCode 631036. The InternalID 631032 attribute is a PartyInternalID 631034 data type. The GuarantorSubstitutionCategoryCode 631036 attribute is a CategoryCode 631038 data type. The CreditExposureData 631040 package includes a CreditExposureData 631042 entity. The CreditExposureData 631042 entity includes various attributes, namely a LossGivenDefaultDecimalValue 631044, a ShapeBetaDistributionDecimalValue 631048, an ExpectedLossGivenDefaultDecimalValue 631052, an ExposureAtDefaultAmount 631056 and a CreditPortfolioManagementProductCode 631084. The CreditExposureData 631042 entity includes various subordinate entities, namely a PriceAtHorizon 631060 and a CurrentPrice 631074. The LossGivenDefaultDecimalValue 631044 attribute is a DecimalValue 631046 data type. The ShapeBetaDistributionDecimalValue 631048 attribute is a DecimalValue 631050 data type. The ExpectedLossGivenDefaultDecimalValue 631052 attribute is a DecimalValue 631054 data type. The ExposureAtDefaultAmount 631056 attribute is an Amount 631058 data type. The CreditPortfolioManagementProductCode 631084 attribute is a Code 631086 data type. The PriceAtHorizon 631060 entity includes various attributes, namely a Duration 631062, an Amount 631066 and a DecimalValue 631070. The Duration 631062 attribute is a Duration 631064 data type. The Amount 631066 attribute is an Amount 631068 data type. The DecimalValue 631070 attribute is a DecimalValue 631072 data type. The CurrentPrice 631074 entity includes various attributes, namely an Amount 631076 and a DecimalValue 631080. The Amount 631076 attribute is an Amount 631078 data type. The DecimalValue 631080 attribute is a DecimalValue 631082 data type. The ProbabilityOfDefault 631088 package includes a ProbabilityOfDefault 631090 entity. The ProbabilityOfDefault 631090 entity includes various attributes, namely a ValidityDatePeriod 631092, a TermDuration 631096 and a ProbabilityOfDefaultDecimalValue 631100. The ValidityDatePeriod 631092 attribute is a CLOSED_DatePeriod 631094 data type. The TermDuration 631096 attribute is a Duration 631098 data type. The ProbabilityOfDefaultDecimalValue 631100 attribute is a Decimalvalue 631102 data type. The Rating 631104 package includes a Rating 631106 entity. The Rating 631106 entity includes various attributes, namely a ValidityDatePeriod 631108, a RatingModelID 631112, a CreditRatingCode 631116, a MasterCreditRatingCode 631120, a RatingSource 631124, a MaturityCode 631128, a RatingDate 631132 and a RatingTendencyCode 631136. The ValidityDatePeriod 631108 attribute is a CLOSED_DatePeriod 631110 data type. The RatingModelID 631112 attribute is a PDT_RatingModelID 631114 data type. The CreditRatingCode 631116 attribute is a CreditRatingCode 631118 data type. The MasterCreditRatingCode 631120 attribute is a CreditRatingCode 631122 data type. The RatingSource 631124 attribute is a RatingSource 631126 data type. The MaturityCode 631128 attribute is a Code 631130 data type. The RatingDate 631132 attribute is a Date 631134 data type. The RatingTendencyCode 631136 attribute is a Code 631138 data type. The Exposure Profile 631140 package includes an Exposure Profile 631142 entity.

The Exposure Profile 631142 entity includes an Item 631144 subordinate entity. The Item 631144 entity includes various attributes, namely a Date 631146, a NegativeExposureAmount 631150 and a PositiveExposureAmount 631154. The Date 631146 attribute is a Date 631148 data type. The NegativeExposureAmount 631150 attribute is an Amount 631152 data type. The PositiveExposureAmount 631154 attribute is an Amount 631156 data type. The RiskFreeProfile 631158 package includes a RiskFreeProfile 631160 entity. The RiskFreeProfile 631160 entity includes an Item 631162 subordinate entity. The Item 631162 entity includes various attributes, namely a Date 631164 and a RiskFreeAmount 631168. The Date 631164 attribute is a Date 631166 data type. The RiskFreeAmount 631168 attribute is an Amount 631170 data type. The Property 631172 package is a Property 631176 data type. The Property 631172 package includes a Property 631174 entity. The Property 631174 entity includes various attributes, namely an ID 631178 and a Value 631182. The ID 631178 attribute is a PropertyID 631180 data type. The Value 631182 attribute is a PropertyValue 631184 data type. The SecuritiesFinancingTransaction 631186 package includes a SecuritiesFinancingTransaction 631188 entity. The SecuritiesFinancingTransaction 631186 package includes various packages, namely a Counterparty 631210, a GuarantorParty 631218, a CreditExposureData 631230, a ProbabilityOfDefault 631278, a Rating 631294, an Exposure Profile 631330, a RiskFreeProfile 631348 and a Property 631362. The SecuritiesFinancingTransaction 631188 entity includes various attributes, namely an ID 631190, a GuaranteeID 631194, a Description 631198, a CurrencyCode 631202 and a ValidityPeriod 631206. The ID 631190 attribute is a PDT_SecuritiesFinancingTransactionID 631192 data type. The GuaranteeID 631194 attribute is an Identifier 631196 data type. The Description 631198 attribute is a Description 631200 data type. The CurrencyCode 631202 attribute is a CurrencyCode 631204 data type. The ValidityPeriod 631206 attribute is a CLOSED_DatePeriod 631208 data type. The Counterparty 631210 package includes a Counterparty 631212 entity. The Counterparty 631212 entity includes an InternalID 631214 attribute. The InternalID 631214 attribute is a PartyInternalID 631216 data type. The GuarantorParty 631218 package includes a GuarantorParty 631220 entity. The GuarantorParty 631220 entity includes various attributes, namely an InternalID 631222 and a GuarantorSubstitutionCategoryCode 631226. The InternalID 631222 attribute is a PartyInternalID 631224 data type. The GuarantorSubstitutionCategoryCode 631226 attribute is a CategoryCode 631228 data type. The CreditExposureData 631230 package includes a CreditExposureData 631232 entity. The CreditExposureData 631232 entity includes various attributes, namely a LossGivenDefaultDecimalValue 631234, a ShapeBetaDistributionDecimalValue 631238, an ExpectedLossGivenDefaultDecimalValue 631242, an ExposureAtDefaultAmount 631246 and a CreditPortfolioManagementProductCode 631274. The CreditExposureData 631232 entity includes various subordinate entities, namely a PriceAtHorizon 631250 and a CurrentPrice 631264. The LossGivenDefaultDecimalValue 631234 attribute is a DecimalValue 631236 data type. The ShapeBetaDistributionDecimalValue 631238 attribute is a DecimalValue 631240 data type. The ExpectedLossGivenDefaultDecimalValue 631242 attribute is a DecimalValue 631244 data type. The ExposureAtDefaultAmount 631246 attribute is an Amount 631248 data type. The CreditPortfolioManagementProductCode 631274 attribute is a Code 631276 data type. The PriceAtHorizon 631250 entity includes various attributes, namely a Duration 631252, an Amount 631256 and a DecimalValue 631260. The Duration 631252 attribute is a Duration 631254 data type. The Amount 631256 attribute is an Amount 631258 data type. The DecimalValue 631260 attribute is a DecimalValue 631262 data type. The CurrentPrice 631264 entity includes various attributes, namely an Amount 631266 and a DecimalValue 631270. The Amount 631266 attribute is an Amount 631268 data type. The DecimalValue 631270 attribute is a DecimalValue 631272 data type. The ProbabilityOfDefault 631278 package includes a ProbabilityOfDefault 631280 entity. The ProbabilityOfDefault 631280 entity includes various attributes, namely a ValidityDatePeriod 631282, a TermDuration 631286 and a ProbabilityOfDefaultDoubleValue 631290. The ValidityDatePeriod 631282 attribute is a CLOSED_DatePeriod 631284 data type. The TermDuration 631286 attribute is a Duration 631288 data type. The ProbabilityOfDefaultDoubleValue 631290 attribute is a DoubleValue 631292 data type. The Rating 631294 package includes a Rating 631296 entity. The Rating 631296 entity includes various attributes, namely a ModelID 631298, a ValidityDatePeriod 631302, a Code 631306, a MasterCreditRatingCode 631310, an InternalRatingIndicator 631314, a MaturityCode 631318, a Date 631322 and a TendencyCode 631326. The ModelID 631298 attribute is a PDT_RatingModelID 631300 data type. The ValidityDatePeriod 631302 attribute is a CLOSED_DatePeriod 631304 data type. The Code 631306 attribute is a CreditRatingCode 631308 data type. The MasterCreditRatingCode 631310 attribute is a CreditRatingCode 631312 data type. The InternalRatingIndicator 631314 attribute is an Indicator 631316 data type. The MaturityCode 631318 attribute is a Code 631320 data type. The Date 631322 attribute is a Date 631324 data type. The TendencyCode 631326 attribute is a Code 631328 data type. The Exposure Profile 631330 package includes an Exposure Profile 631332 entity. The Exposure Profile 631332 entity includes an Item 631334 subordinate entity. The Item 631334 entity includes various attributes, namely a Date 631336, a NegativeExposureAmount 631340 and a PositiveExposureAmount 631344. The Date 631336 attribute is a Date 631338 data type. The NegativeExposureAmount 631340 attribute is an Amount 631342 data type. The PositiveExposureAmount 631344 attribute is an Amount 631346 data type. The RiskFreeProfile 631348 package includes a RiskFreeProfile 631350 entity. The RiskFreeProfile 631350 entity includes an Item 631352 subordinate entity. The Item 631352 entity includes various attributes, namely a Date 631354 and a RiskFreeAmount 631358. The Date 631354 attribute is a Date 631356 data type. The RiskFreeAmount 631358 attribute is an Amount 631360 data type. The Property 631362 package is a Property 631366 data type. The Property 631362 package includes a Property 631364 entity. The Property 631364 entity includes various attributes, namely an ID 631368 and a Value 631372. The ID 631368 attribute is a PropertyID 631370 data type. The Value 631372 attribute is a PropertyValue 631374 data type. The Stock 631376 package includes a Stock 631378 entity. The Stock 631376 package includes various packages, namely an IssuerParty 631400, a GuarantorParty 631408, a CreditExposureData 631420, a ProbabilityOfDefault 631472, a Rating 631488 and a Property 631524. The Stock 631378 entity includes various attributes, namely an ID 631380, a GuaranteeID 631384, a Description 631388, a CurrencyCode 631392 and a ValidityPeriod 631396. The ID 631380 attribute is a PDT_StockID 631382 data type. The GuaranteeID 631384 attribute is an Identifier 631386 data type. The Description 631388 attribute is a Description 631390 data type. The CurrencyCode 631392 attribute is a CurrencyCode 631394 data type. The ValidityPeriod 631396 attribute is a CLOSED_DatePeriod 631398 data type. The IssuerParty 631400 package includes an IssuerParty 631402 entity. The IssuerParty 631402 entity includes an InternalID 631404 attribute. The InternalID 631404 attribute is a Party-InternalID 631406 data type. The GuarantorParty 631408 package includes a GuarantorParty 631410 entity. The GuarantorParty 631410 entity includes various attributes, namely an InternalID 631412 and a GuarantorSubstitutionCode 631416. The InternalID 631412 attribute is a PartyInternalID 631414 data type. The GuarantorSubstitutionCode 631416 attribute is a Code 631418 data type. The CreditExposure-Data 631420 package includes a CreditExposureData 631422 entity. The CreditExposureData 631422 entity includes various attributes, namely a LossGivenDefaultDecimalValue 631424, a ShapeBetaDistributionDecimalValue 631428, an ExpectedLossGivenDefaultDecimalValue 631432, an ExposureAtDefaultAmount 631436, a Credit-PortfolioManagementProductCode 631464 and a RecoveryAmount 631468. The CreditExposureData 631422 entity includes various subordinate entities, namely a PriceAtHorizon 631440 and a CurrentPrice 631454. The LossGivenDefaultDecimalValue 631424 attribute is a DecimalValue 631426 data type. The ShapeBetaDistributionDecimalValue 631428 attribute is a DecimalValue 631430 data type. The ExpectedLossGivenDefaultDecimalValue 631432 attribute is a DecimalValue 631434 data type. The ExposureAtDefaultAmount 631436 attribute is an Amount 631438 data type. The CreditPortfolioManagementProductCode 631464 attribute is a Code 631466 data type. The RecoveryAmount 631468 attribute is an Amount 631470 data type. The PriceAtHorizon 631440 entity includes various attributes, namely a Duration 631442, an Amount 631446 and a DecimalValue 631450. The Duration 631442 attribute is a Duration 631444 data type. The Amount 631446 attribute is an Amount 631448 data type. The DecimalValue 631450 attribute is a Decimal-Value 631452 data type. The CurrentPrice 631454 entity includes various attributes, namely an Amount 631456 and a DecimalValue 631460. The Amount 631456 attribute is an Amount 631458 data type. The DecimalValue 631460 attribute is a DecimalValue 631462 data type. The ProbabilityOfDefault 631472 package includes a ProbabilityOfDefault 631474 entity. The ProbabilityOfDefault 631474 entity includes various attributes, namely a ValidityDatePeriod 631476, a TermDuration 631480 and a ProbabilityOfDefault-DoubleValue 631484. The ValidityDatePeriod 631476 attribute is a CLOSED_DatePeriod 631478 data type. The TermDuration 631480 attribute is a Duration 631482 data type. The ProbabilityOfDefaultDoubleValue 631484 attribute is a DoubleValue 631486 data type. The Rating 631488 package includes a Rating 631490 entity. The Rating 631490 entity includes various attributes, namely a ModelID 631492, a ValidityDatePeriod 631496, a Code 631500, a MasterCreditRatingCode 631504, an InternalRatingIndicator 631508, a MaturityCode 631512, a Date 631516 and a TendencyCode 631520. The ModelID 631492 attribute is a PDT_RatingModelID 631494 data type. The ValidityDatePeriod 631496 attribute is a CLOSED_DatePeriod 631498 data type. The Code 631500 attribute is a CreditRatingCode 631502 data type. The MasterCreditRatingCode 631504 attribute is a CreditRatingCode 631506 data type. The InternalRatingIndicator 631508 attribute is an Indicator 631510 data type. The MaturityCode 631512 attribute is a Code 631514 data type. The Date 631516 attribute is a Date 631518 data type. The TendencyCode 631520 attribute is a Code 631522 data type. The Property 631524 package includes a Property 631526 entity. The Property 631526 entity includes various attributes, namely an ID 631528 and a Value 631532. The ID 631528 attribute is a PropertyID 631530 data type. The Value 631532 attribute is a PropertyValue 631534 data type. The CreditDerivative 631536 package includes a CreditDerivative 631538 entity. The CreditDerivative 631536 package includes various packages, namely a Counterparty 631580, a GuarantorParty 631588, a CreditExposureData 631600, a ReferenceAssetItem 631656, a FinancialCondition 631700, a ProbabilityOfDefault 631804, a Rating 631820, a SpreadCurve 631856 and a Property 631874. The Credit-Derivative 631538 entity includes various attributes, namely an ID 631540, a GuaranteeID 631544, a Description 631548, a CurrencyCode 631552, a ValidityPeriod 631556, a Basket-Name 631560, a FundedIndicator 631564, an OriginalNumberValue 631568, a BeginCountNumberValue 631572 and an EndCountNumberValue 631576. The ID 631540 attribute is a PDT_CreditDerivativeID 631542 data type. The GuaranteeID 631544 attribute is an Identifier 631546 data type. The Description 631548 attribute is a Description 631550 data type. The CurrencyCode 631552 attribute is a CurrencyCode 631554 data type. The ValidityPeriod 631556 attribute is a CLOSED_DatePeriod 631558 data type. The BasketName 631560 attribute is a Name 631562 data type. The FundedIndicator 631564 attribute is an Indicator 631566 data type. The OriginalNumberValue 631568 attribute is a Number-Value 631570 data type. The BeginCountNumberValue 631572 attribute is a NumberValue 631574 data type. The EndCountNumberValue 631576 attribute is a NumberValue 631578 data type. The Counterparty 631580 package includes a Counterparty 631582 entity. The Counterparty 631582 entity includes an InternalID 631584 attribute. The InternalID 631584 attribute is a PartyInternalID 631586 data type. The GuarantorParty 631588 package includes a GuarantorParty 631590 entity. The GuarantorParty 631590 entity includes various attributes, namely an InternalID 631592 and a GuarantorSubstitutionCategoryCode 631596. The InternalID 631592 attribute is a PartyInternalID 631594 data type. The GuarantorSubstitutionCategoryCode 631596 attribute is a CategoryCode 631598 data type. The CreditExposureData 631600 package includes a CreditExposureData 631602 entity. The CreditExposureData 631602 entity includes various attributes, namely a LossGivenDefaultDecimalValue 631604, a ShapeBetaDistributionDecimalValue 631608, an ExpectedLossGivenDefaultDecimalValue 631612, an ExposureAtDefaultAmount 631616, a CreditPortfolioManagementProductCode 631644, a ProtectionBuyerIndicator 631648 and a RestructuringCategoryCode 631652. The CreditExposureData 631602 entity includes various subordinate entities, namely a PriceAtHorizon 631620 and a CurrentPrice 631634. The LossGivenDefaultDecimalValue 631604 attribute is a DecimalValue 631606 data type. The ShapeBetaDistributionDecimalValue 631608 attribute is a DecimalValue 631610 data type. The ExpectedLossGiven-DefaultDecimalValue 631612 attribute is a DecimalValue 631614 data type. The ExposureAtDefaultAmount 631616 attribute is an Amount 631618 data type. The CreditPortfolioManagementProductCode 631644 attribute is a Code 631646 data type. The ProtectionBuyerIndicator 631648 attribute is an Indicator 631650 data type. The Restructuring-CategoryCode 631652 attribute is a Code 631654 data type. The PriceAtHorizon 631620 entity includes various attributes, namely a Duration 631622, an Amount 631626 and a DecimalValue 631630. The Duration 631622 attribute is a Duration 631624 data type. The Amount 631626 attribute is an Amount 631628 data type. The DecimalValue 631630 attribute is a DecimalValue 631632 data type. The Current-Price 631634 entity includes various attributes, namely an Amount 631636 and a DecimalValue 631640. The Amount 631636 attribute is an Amount 631638 data type. The DecimalValue 631640 attribute is a DecimalValue 631642 data type. The ReferenceAssetItem 631656 package includes a ReferenceAssetItem 631658 entity. The ReferenceAssetItem 631658 entity includes various attributes, namely an ID 631660 and a GuaranteeID 631664. The ReferenceAssetItem 631658 entity includes various subordinate entities, namely a Counterparty 631668, a GuarantorParty 631674 and a CreditExposureData 631684. The ID 631660 attribute is a PDT_ReferenceAssetDataItemID 631662 data type. The GuaranteeID 631664 attribute is a PDT_GuaranteeID 631666 data type. The Counterparty 631668 entity includes an InternalID 631670 attribute. The InternalID 631670 attribute is a PartyInternalID 631672 data type. The GuarantorParty 631674 entity includes various attributes, namely an InternalID 631676 and a GuarantorSubstitutionCategoryCode 631680. The InternalID 631676 attribute is a PartyInternalID 631678 data type. The GuarantorSubstitutionCategoryCode 631680 attribute is a CategoryCode 631682 data type. The CreditExposureData 631684 entity includes various attributes, namely a LossGivenDefaultDecimalValue 631686, a ShapeBetaDistributionDecimalValue 631690 and an ExpectedLossGivenDefaultDecimalValue 631694. The LossGivenDefaultDecimalValue 631686 attribute is a DecimalValue 631688 data type. The ShapeBetaDistributionDecimalValue 631690 attribute is a DecimalValue 631692 data type. The ExpectedLossGivenDefaultDecimalValue 631694 attribute is a DecimalValue 631696 data type. The FinancialCondition 631700 package includes a FinancialCondition 631702 entity. The FinancialCondition 631702 entity includes various subordinate entities, namely an InterestCondition 631704, a FeeCondition 631752 and a PaymentCondition 631778. The InterestCondition 631704 entity includes a BankContractFinancialConditionSpecification 631706 subordinate entity. The BankContractFinancialConditionSpecification 631706 entity includes a BankContractFinancialConditionUsageCode 631708 attribute. The BankContractFinancialConditionSpecification 631706 entity includes various subordinate entities, namely a Calculation 631712 and an AmountSpecification 631720. The BankContractFinancialConditionUsageCode 631708 attribute is a BankContractFinancialConditionTypeUsageCode 631710 data type. The Calculation 631712 entity includes a RecurrenceSpecification 631714 subordinate entity. The RecurrenceSpecification 631714 entity includes a PeriodDurationDayRecurrence 631716 attribute. The PeriodDurationDayRecurrence 631716 attribute is a PeriodDurationDayRecurrence 631718 data type. The AmountSpecification 631720 entity includes various attributes, namely an Amount 631722 and a Percent 631726. The AmountSpecification 631720 entity includes various subordinate entities, namely an InterestSpecification 631730 and a VariableInterest 631736. The Amount 631722 attribute is an Amount 631724 data type. The Percent 631726 attribute is a Percent 631728 data type. The InterestSpecification 631730 entity includes an InterestCalculationMethodCode 631732 attribute. The InterestCalculationMethodCode 631732 attribute is an InterestCalculationMethodCode 631734 data type. The VariableInterest 631736 entity includes various attributes, namely a ReferenceInterestCurveCode 631738, a MarginPercent 631742 and a YieldCurveModelID 631748. The ReferenceInterestCurveCode 631738 attribute is a ReferenceInterestCurveCode 631740 data type. The MarginPercent 631742 attribute is a Percent; Qualifier: Margin 631744 data type. The YieldCurveModelID 631748 attribute is a PDT_YieldCurveModelID 631750 data type. The FeeCondition 631752 entity includes a BankContractFinancialConditionSpecification 631754 subordinate entity. The BankContractFinancialConditionSpecification 631754 entity includes a BankContractFinancialConditionUsageCode 631756 attribute. The BankContractFinancialConditionSpecification 631754 entity includes various subordinate entities, namely a Calculation 631760 and an AmountSpecification 631768. The BankContractFinancialConditionUsageCode 631756 attribute is a BankContractFinancialConditionTypeUsageCode 631758 data type. The Calculation 631760 entity includes a RecurrenceSpecification 631762 subordinate entity. The RecurrenceSpecification 631762 entity includes a PeriodDurationDayRecurrence 631764 attribute. The PeriodDurationDayRecurrence 631764 attribute is a PeriodDurationDayRecurrence 631766 data type. The AmountSpecification 631768 entity includes various attributes, namely an Amount 631770 and a Percent 631774. The Amount 631770 attribute is an Amount 631772 data type. The Percent 631774 attribute is a Percent 631776 data type. The PaymentCondition 631778 entity includes a BankContractFinancialConditionSpecification 631780 subordinate entity. The BankContractFinancialConditionSpecification 631780 entity includes a BankContractFinancialConditionUsageCode 631782 attribute. The BankContractFinancialConditionSpecification 631780 entity includes various subordinate entities, namely a Calculation 631786 and an AmountSpecification 631794. The BankContractFinancialConditionUsageCode 631782 attribute is a BankContractFinancialConditionTypeUsageCode 631784 data type. The Calculation 631786 entity includes a RecurrenceSpecification 631788 subordinate entity. The RecurrenceSpecification 631788 entity includes a PeriodDurationDayRecurrence 631790 attribute. The PeriodDurationDayRecurrence 631790 attribute is a PeriodDurationDayRecurrence 631792 data type. The AmountSpecification 631794 entity includes various attributes, namely an Amount 631796 and a Percent 631800. The Amount 631796 attribute is an Amount 631798 data type. The Percent 631800 attribute is a Percent 631802 data type. The ProbabilityOfDefault 631804 package includes a ProbabilityOfDefault 631806 entity. The ProbabilityOfDefault 631806 entity includes various attributes, namely a ValidityDatePeriod 631808, a TermDuration 631812 and a ProbabilityOfDefaultDoubleValue 631816. The ValidityDatePeriod 631808 attribute is a CLOSED_DatePeriod 631810 data type. The TermDuration 631812 attribute is a Duration 631814 data type. The ProbabilityOfDefaultDoubleValue 631816 attribute is a DoubleValue 631818 data type. The Rating 631820 package includes a Rating 631822 entity. The Rating 631822 entity includes various attributes, namely a ModelID 631824, a ValidityDatePeriod 631828, a Code 631832, a MasterCreditRatingCode 631836, an InternalRatingIndicator 631840, a MaturityCode 631844, a Date 631848 and a TendencyCode 631852. The ModelID 631824 attribute is a PDT_RatingModelID 631826 data type. The ValidityDatePeriod 631828 attribute is a CLOSED_DatePeriod 631830 data type. The Code 631832 attribute is a CreditRatingCode 631834 data type. The MasterCreditRatingCode 631836 attribute is a CreditRatingCode 631838 data type. The InternalRatingIndicator 631840 attribute is an Indicator 631842 data type. The MaturityCode 631844 attribute is a Code 631846 data type. The Date 631848 attribute is a Date 631850 data type. The TendencyCode 631852 attribute is a Code 631854 data type. The SpreadCurve 631856 package includes a SpreadCurve 631858 entity. The SpreadCurve 631858 entity includes an Item 631860 subordinate entity. The Item 631860 entity includes various attributes, namely a ValidityDate 631862, a Duration 631866 and a SpreadDecimalValue 631870. The ValidityDate 631862 attribute is a Date 631864 data type. The Duration 631866 attribute is a Duration 631868 data type. The SpreadDecimalValue 631870 attribute is a DecimalValue 631872 data type. The Property 631874 package includes a Property 631876 entity. The Property 631876 entity includes various attributes, namely an ID 631878 and a Value 631882. The ID 631878 attribute is a PropertyID 631880 data type. The Value 631882 attribute is a PropertyValue 631884 data type. The Securitization 631886 package includes a Securitization 631888 entity. The Securitization 631886 package includes various packages, namely a BasicData 631898, an ABSRsqApproximatedCorrelation 631918, a Rating 631928, a SpreadCurveMatrix 631940 and a Property 631950. The Securitization 631888 entity includes various attributes, namely an ID 631890 and a GuaranteeID 631894. The ID 631890 attribute is an Identifier 631892 data type. The GuaranteeID 631894 attribute is an Identifier 631896 data type. The BasicData 631898 package includes a BasicData 631900 entity. The BasicData 631900 entity includes various attributes, namely an ObjectDatePeriod 631902, a FundedIndicator 631906, an AttachmentPointPercent 631910 and a DetachmentPointPercent 631914. The ObjectDatePeriod 631902 attribute is a CLOSED_DatePeriod 631904 data type. The FundedIndicator 631906 attribute is an Indicator 631908 data type. The AttachmentPointPercent 631910 attribute is a Percent 631912 data type. The DetachmentPointPercent 631914 attribute is a Percent 631916 data type. The ABSRsqApproximatedCorrelation 631918 package includes an ABSRsqApproximatedCorrelation 631920 entity. The ABSRsqApproximatedCorrelation 631920 entity includes a Date 631922 attribute. The Date 631922 attribute is a Date 631924 data type. The Rating 631928 package includes a SpreadQuote 631930 entity. The SpreadQuote 631930 entity includes a PriceDate 631932 attribute. The PriceDate 631932 attribute is a PriceDate 631934 data type. The SpreadCurveMatrix 631940 package includes an ABSCorrelationData 631942 entity. The ABSCorrelationData 631942 entity includes a Date 631944 attribute. The Date 631944 attribute is a Date 631946 data type. The Property 631950 package is a Property 631954 data type. The Property 631950 package includes a Property 631952 entity. The Bond 631960 package includes a Bond 631962 entity. The Bond 631960 package includes various packages, namely a Counterparty 631992, a GuarantorParty 632000, a CreditExposureData 632012, a FinancialCondition 632064, a CashFlowItem 632168, a ProbabilityOfDefault 632188, a Rating 632204, a SinkData 632240, an Option 632258, a SpreadCurve 632310 and a Property 632328. The Bond 631962 entity includes various attributes, namely an ID 631964, a GuaranteeID 631968, a Description 631972, a CurrencyCode 631976, a ValidityPeriod 631980, a SeniorityCode 631984 and an IssuedAmount 631988. The ID 631964 attribute is a PDT_BondID 631966 data type. The GuaranteeID 631968 attribute is an Identifier 631970 data type. The Description 631972 attribute is a Description 631974 data type. The CurrencyCode 631976 attribute is a CurrencyCode 631978 data type. The ValidityPeriod 631980 attribute is a CLOSED_DatePeriod 631982 data type. The SeniorityCode 631984 attribute is a Code 631986 data type. The IssuedAmount 631988 attribute is an Amount 631990 data type. The Counterparty 631992 package includes a Counterparty 631994 entity. The Counterparty 631994 entity includes an InternalID 631996 attribute. The InternalID 631996 attribute is a PartyInternalID 631998 data type. The GuarantorParty 632000 package includes a GuarantorParty 632002 entity. The GuarantorParty 632002 entity includes various attributes, namely an InternalID 632004 and a GuarantorSubstitutionCategoryCode 632008. The InternalID 632004 attribute is a PartyInternalID 632006 data type. The GuarantorSubstitutionCategoryCode 632008 attribute is a Code 632010 data type. The CreditExposureData 632012 package includes a CreditExposureData 632014 entity. The CreditExposureData 632014 entity includes various attributes, namely a LossGivenDefaultDecimalValue 632016, a ShapeBetaDistributionDecimalValue 632020, an ExpectedLossGivenDefaultDecimalValue 632024, an ExposureAtDefaultAmount 632028, a CreditPortfolioManagementProductCode 632056 and a RecoveryAmount 632060. The CreditExposureData 632014 entity includes various subordinate entities, namely a PriceAtHorizon 632032 and a CurrentPrice 632046. The LossGivenDefaultDecimalValue 632016 attribute is a DecimalValue 632018 data type. The ShapeBetaDistributionDecimalValue 632020 attribute is a DecimalValue 632022 data type. The ExpectedLossGivenDefaultDecimalValue 632024 attribute is a DecimalValue 632026 data type. The ExposureAtDefaultAmount 632028 attribute is an Amount 632030 data type. The CreditPortfolioManagementProductCode 632056 attribute is a Code 632058 data type. The RecoveryAmount 632060 attribute is an Amount 632062 data type. The PriceAtHorizon 632032 entity includes various attributes, namely a Duration 632034, an Amount 632038 and a DecimalValue 632042. The Duration 632034 attribute is a Duration 632036 data type. The Amount 632038 attribute is an Amount 632040 data type. The DecimalValue 632042 attribute is a DecimalValue 632044 data type. The CurrentPrice 632046 entity includes various attributes, namely an Amount 632048 and a DecimalValue 632052. The Amount 632048 attribute is an Amount 632050 data type. The DecimalValue 632052 attribute is a DecimalValue 632054 data type. The FinancialCondition 632064 package includes a FinancialCondition 632066 entity. The FinancialCondition 632066 entity includes various subordinate entities, namely an InterestCondition 632068, a FeeCondition 632116 and a PaymentCondition 632142. The InterestCondition 632068 entity includes a BankContractFinancialConditionSpecification 632070 subordinate entity. The BankContractFinancialConditionSpecification 632070 entity includes a BankContractFinancialConditionUsageCode 632072 attribute. The BankContractFinancialConditionSpecification 632070 entity includes various subordinate entities, namely a Calculation 632076, an AmountSpecification 632084 and an InterestSpecification 632094. The BankContractFinancialConditionUsageCode 632072 attribute is a BankContractFinancialConditionTypeUsageCode 632074 data type. The Calculation 632076 entity includes a RecurrenceSpecification 632078 subordinate entity. The RecurrenceSpecification 632078 entity includes a PeriodDurationDayRecurrence 632080 attribute. The PeriodDurationDayRecurrence 632080 attribute is a PeriodDurationDayRecurrence 632082 data type. The AmountSpecification 632084 entity includes various attributes, namely an Amount 632086 and a Percent 632090. The Amount 632086 attribute is an Amount 632088 data type. The Percent 632090 attribute is a Percent 632092 data type. The InterestSpecification 632094 entity includes an InterestCalculationMethodCode 632096 attribute. The InterestSpecification 632094 entity includes a VariableInterest 632100 subordinate entity. The InterestCalculationMethodCode 632096 attribute is an InterestCalculationMethodCode 632098 data type. The VariableInterest 632100 entity includes various attributes, namely a ReferenceInterestCurveCode 632102, a MarginPercent 632106 and a YieldCurve- ModelID 632112. The ReferenceInterestCurveCode 632102 attribute is a ReferenceInterestCurveCode 632104 data type. The MarginPercent 632106 attribute is a Percent; Qualifier: Margin 632108 data type. The YieldCurveModelID 632112 attribute is a PDT_YieldCurveModelID 632114 data type. The FeeCondition 632116 entity includes a BankContractFinancialConditionSpecification 632118 subordinate entity. The BankContractFinancialConditionSpecification 632118 entity includes a BankContractFinancialConditionUsageCode 632120 attribute. The BankContractFinancialConditionSpecification 632118 entity includes various subordinate entities, namely a Calculation 632124 and an AmountSpecification 632132. The BankContractFinancialConditionUsageCode 632120 attribute is a BankContractFinancialConditionTypeUsageCode 632122 data type. The Calculation 632124 entity includes a RecurrenceSpecification 632126 subordinate entity. The RecurrenceSpecification 632126 entity includes a PeriodDurationDayRecurrence 632128 attribute. The PeriodDurationDayRecurrence 632128 attribute is a PeriodDurationDayRecurrence 632130 data type. The AmountSpecification 632132 entity includes various attributes, namely an Amount 632134 and a Percent 632138. The Amount 632134 attribute is an Amount 632136 data type. The Percent 632138 attribute is a Percent 632140 data type. The PaymentCondition 632142 entity includes a BankContractFinancialConditionSpecification 632144 subordinate entity. The BankContractFinancialConditionSpecification 632144 entity includes a BankContractFinancialConditionUsageCode 632146 attribute. The BankContractFinancialConditionSpecification 632144 entity includes various subordinate entities, namely a Calculation 632150 and an AmountSpecification 632158. The BankContractFinancialConditionUsageCode 632146 attribute is a BankContractFinancialConditionTypeUsageCode 632148 data type. The Calculation 632150 entity includes a RecurrenceSpecification 632152 subordinate entity. The RecurrenceSpecification 632152 entity includes a PeriodDurationDayRecurrence 632154 attribute. The PeriodDurationDayRecurrence 632154 attribute is a PeriodDurationDayRecurrence 632156 data type. The AmountSpecification 632158 entity includes various attributes, namely an Amount 632160 and a Percent 632164. The Amount 632160 attribute is an Amount 632162 data type. The Percent 632164 attribute is a Percent 632166 data type. The CashFlowItem 632168 package includes a CashFlowItem 632170 entity. The CashFlowItem 632170 entity includes various attributes, namely a CashFlowDate 632172, an InterestCashFlowAmount 632176, a ChargeCashFlowAmount 632180 and a PaymentCashFlowAmount 632184. The CashFlowDate 632172 attribute is a Date 632174 data type. The InterestCashFlowAmount 632176 attribute is an Amount 632178 data type. The ChargeCashFlowAmount 632180 attribute is an Amount 632182 data type. The PaymentCashFlowAmount 632184 attribute is an Amount 632186 data type. The ProbabilityOfDefault 632188 package includes a ProbabilityOfDefault 632190 entity. The ProbabilityOfDefault 632190 entity includes various attributes, namely a ValidityDatePeriod 632192, a TermDuration 632196 and a ProbabilityOfDefaultDoubleValue 632200. The ValidityDatePeriod 632192 attribute is a CLOSED_DatePeriod 632194 data type. The TermDuration 632196 attribute is a Duration 632198 data type. The ProbabilityOfDefaultDoubleValue 632200 attribute is a DoubleValue 632202 data type. The Rating 632204 package includes a Rating 632206 entity. The Rating 632206 entity includes various attributes, namely a ModelID 632208, a ValidityDatePeriod 632212, a Code 632216, a MasterCreditRatingCode 632220, an InternalRatingIndicator 632224, a MaturityCode 632228, a Date 632232 and a TendencyCode 632236. The ModelID 632208 attribute is a PDT_RatingModelID 632210 data type. The ValidityDatePeriod 632212 attribute is a CLOSED_DatePeriod 632214 data type. The Code 632216 attribute is a CreditRatingCode 632218 data type. The MasterCreditRatingCode 632220 attribute is a CreditRatingCode 632222 data type. The InternalRatingIndicator 632224 attribute is an Indicator 632226 data type. The MaturityCode 632228 attribute is a Code 632230 data type. The Date 632232 attribute is a Date 632234 data type. The TendencyCode 632236 attribute is a Code 632238 data type. The SinkData 632240 package includes a SinkData 632242 entity. The SinkData 632242 entity includes an Item 632244 subordinate entity. The Item 632244 entity includes various attributes, namely a RepaymentDate 632246, a RepaymentAmount 632250 and a PriceOfRepaymentFractionDecimalValue 632254. The RepaymentDate 632246 attribute is a Date 632248 data type. The RepaymentAmount 632250 attribute is an Amount 632252 data type. The PriceOfRepaymentFractionDecimalValue 632254 attribute is a DecimalValue 632256 data type. The Option 632258 package includes an Option 632260 entity. The Option 632260 entity includes various attributes, namely a ValidityPeriod 632262, a CategoryCode 632266, a StyleCode 632270, a MutualRightOfNoticePurchaseIndicator 632274, a QuotationCode 632278 and a SingleExerciseIndicator 632282. The Option 632260 entity includes various subordinate entities, namely an Item 632286 and an ExerciseDateSpecification 632304. The ValidityPeriod 632262 attribute is a CLOSED_DatePeriod 632264 data type. The CategoryCode 632266 attribute is a Code 632268 data type. The StyleCode 632270 attribute is a Code 632272 data type. The MutualRightOfNoticePurchaseIndicator 632274 attribute is an Indicator 632276 data type. The QuotationCode 632278 attribute is a Code 632280 data type. The SingleExerciseIndicator 632282 attribute is an Indicator 632284 data type. The Item 632286 entity includes various attributes, namely a ValidityPeriod 632288, an ExercisePriceFractionDecimalValue 632292, a StrikePercent 632296 and a StrikeAmount 632300. The ValidityPeriod 632288 attribute is a CLOSED_DatePeriod 632290 data type. The ExercisePriceFractionDecimalValue 632292 attribute is a DecimalValue 632294 data type. The StrikePercent 632296 attribute is a Percent 632298 data type. The StrikeAmount 632300 attribute is a StrikeAmount 632302 data type. The SpreadCurve 632310 package includes a SpreadCurve 632312 entity. The SpreadCurve 632312 entity includes an Item 632314 subordinate entity. The Item 632314 entity includes various attributes, namely a ValidityDate 632316, a Duration 632320 and a SpreadDecimalValue 632324. The ValidityDate 632316 attribute is a Date 632318 data type. The Duration 632320 attribute is a Duration 632322 data type. The SpreadDecimalValue 632324 attribute is a DecimalValue 632326 data type. The Property 632328 package includes a Property 632330 entity. The Property 632330 entity includes various attributes, namely an ID 632332 and a Value 632336. The ID 632332 attribute is a PropertyID 632334 data type. The Value 632336 attribute is a PropertyValue 632338 data type. The BusinessPartner 632340 package includes a BusinessPartner 632342 entity. The BusinessPartner 632340 package includes various packages, namely a ProbabilityOfDefault 632364, a Rating 632380, a FinancialData 632416, a FactorCorrelationModelData 632442 and a Property 632474. The BusinessPartner 632342 entity includes various attributes, namely an ID 632344, a Name 632348, a CountryCode 632352, a SegmentCode 632356 and a ValidityDate 632360. The ID 632344 attribute is a PartyInternalID 632346 data type. The Name 632348 attribute is a Name 632350 data type. The CountryCode 632352 attribute is a CountryCode 632354 data type. The SegmentCode 632356 attribute is a Code 632358 data type. The ValidityDate 632360 attribute is a Date 632362 data type. The ProbabilityOfDefault 632364 package includes a ProbabilityOfDefault 632366 entity. The ProbabilityOfDefault 632366 entity includes various attributes, namely a ValidityDatePeriod 632368, a TermDuration 632372 and a ProbabilityOfDefaultDoubleValue 632376. The ValidityDatePeriod 632368 attribute is a CLOSED_DatePeriod 632370 data type. The TermDuration 632372 attribute is a Duration 632374 data type. The ProbabilityOfDefaultDoubleValue 632376 attribute is a DoubleValue 632378 data type. The Rating 632380 package includes a Rating 632382 entity. The Rating 632382 entity includes various attributes, namely a ModelID 632384, a ValidityDatePeriod 632388, a Code 632392, a MasterCreditRatingCode 632396, an InternalRatingIndicator 632400, a MaturityCode 632404, a Date 632408 and a TendencyCode 632412. The ModelID 632384 attribute is a PDT_RatingModelID 632386 data type. The ValidityDatePeriod 632388 attribute is a CLOSED_DatePeriod 632390 data type. The Code 632392 attribute is a CreditRatingCode 632394 data type. The MasterCreditRatingCode 632396 attribute is a CreditRatingCode 632398 data type. The InternalRatingIndicator 632400 attribute is an Indicator 632402 data type. The MaturityCode 632404 attribute is a Code 632406 data type. The Date 632408 attribute is a Date 632410 data type. The TendencyCode 632412 attribute is a Code 632414 data type. The FinancialData 632416 package includes a FinancialData 632418 entity. The FinancialData 632418 entity includes an Item 632420 subordinate entity. The Item 632420 entity includes various attributes, namely a FiscalYear 632422, a FiscalValidityDatePeriod 632426, a BalanceSheetCurrencyCode 632430, a TotalAssetsAmount 632434 and an AnnualSalesAmount 632438. The FiscalYear 632422 attribute is a FiscalYearID 632424 data type. The FiscalValidityDatePeriod 632426 attribute is a CLOSED_DatePeriod 632428 data type. The BalanceSheetCurrencyCode 632430 attribute is a CurrencyCode 632432 data type. The TotalAssetsAmount 632434 attribute is an Amount 632436 data type. The AnnualSalesAmount 632438 attribute is an Amount 632440 data type. The FactorCorrelationModelData 632442 package includes a FactorCorrelationModelData 632444 entity. The FactorCorrelationModelData 632444 entity includes an Item 632446 subordinate entity. The Item 632446 entity includes various attributes, namely a CorrelationModel 632448 and a RSquaredDoubleValue 632452. The Item 632446 entity includes a FactorWeight 632456 subordinate entity. The CorrelationModel 632448 attribute is a PDT_CorrelationModelID 632450 data type. The RSquaredDoubleValue 632452 attribute is a DoubleValue 632454 data type. The FactorWeight 632456 entity includes various attributes, namely a ValidityDate 632458, a FactorTypeCode 632462, a FactorName 632466 and a WeightingFactorValue 632470. The ValidityDate 632458 attribute is a Date 632460 data type. The FactorTypeCode 632462 attribute is a Code 632464 data type. The FactorName 632466 attribute is a Name 632468 data type. The WeightingFactorValue 632470 attribute is a WeightingFactorValue 632472 data type. The Property 632474 package includes a Property 632476 entity. The Property 632476 entity includes various attributes, namely an ID 632478 and a Value 632482. The ID 632478 attribute is a PropertyID 632480 data type. The Value 632482 attribute is a PropertyValue 632484 data type. The PortfolioAnalysisData 632486 package includes a PortfolioAnalysisData 632488 entity. The PortfolioAnalysisData 632486 package includes various packages, namely a FinancialInstrumentExposure 632504 and a Property 632528. The PortfolioAnalysisData 632488 entity includes various attributes, namely an ID 632490 and a ValidityDate 632494. The PortfolioAnalysisData 632488 entity includes a CreditPortfolioAssignment 632498 subordinate entity. The ID 632490 attribute is a PDT_PortfolioAnalysisDataID 632492 data type. The ValidityDate 632494 attribute is a Date 632496 data type. The CreditPortfolioAssignment 632498 entity includes a CreditPortfolioID 632500 attribute. The CreditPortfolioID 632500 attribute is a PDT_CreditPortfolioID 632502 data type. The FinancialInstrumentExposure 632504 package includes a FinancialInstrumentExposure 632506 entity. The FinancialInstrumentExposure 632506 entity includes various attributes, namely an ID 632508, a GuaranteeID 632512, a Description 632516, an Amount 632520 and a ShareNumberValue 632524. The ID 632508 attribute is an Identifier 632510 data type. The GuaranteeID 632512 attribute is a PDT_GuaranteeID 632514 data type. The Description 632516 attribute is a Description 632518 data type. The Amount 632520 attribute is an Amount 632522 data type. The ShareNumberValue 632524 attribute is a NumberValue 632526 data type. The Property 632528 package includes a Property 632530 entity. The Property 632530 entity includes various attributes, namely an ID 632532 and a Value 632536. The ID 632532 attribute is a PropertyID 632534 data type. The Value 632536 attribute is a PropertyValue 632538 data type.

FIGS. 64-1 through 64-25 show an example configuration of an Element Structure that includes a CrdtPrtfoModFSInDatLoanCrteReqMsg 64000 package. The CrdtPrtfoModFSInDatLoanCrteReqMsg 64000 package includes a CrdtPrtfoModFSInDatLoanCrteReqMsg 64002 entity. The CrdtPrtfoModFSInDatLoanCrteReqMsg 64000 package includes various packages, namely a MessageHeader 64004 and a CreditPortfolioModel 64010.

The MessageHeader 64004 package includes a MessageHeader 64006 entity. The MessageHeader 64006 entity has a cardinality of 1 64008 meaning that for each instance of the MessageHeader 64004 package there is one MessageHeader 64006 entity.

The CreditPortfolioModel 64010 package includes a CreditPortfolioModel 64012 entity. The CreditPortfolioModel 64010 package includes an InputData 64036 package. The CreditPortfolioModel 64012 entity has a cardinality of 1 64014 meaning that for each instance of the CreditPortfolioModel 64010 package there is one CreditPortfolioModel 64012 entity. The CreditPortfolioModel 64012 entity includes an ID 64016 attribute. The CreditPortfolioModel 64012 entity includes various subordinate entities, namely a CreditPortfolioManagementProcessControl 64020 and a CreditPortfolio 64028. The ID 64016 attribute has a cardinality of 1 64018 meaning that for each instance of the CreditPortfolioModel 64012 entity there is one ID 64016 attribute.

The CreditPortfolioManagementProcessControl 64020 entity has a cardinality of 1 64022 meaning that for each instance of the CreditPortfolioModel 64012 entity there is one CreditPortfolioManagementProcessControl 64020 entity. The CreditPortfolioManagementProcessControl 64020 entity includes a DataTransferID 64024 attribute. The DataTransferID 64024 attribute has a cardinality of 1 64026 meaning that for each instance of the CreditPortfolioManagementProcessControl 64020 entity there is one DataTransferID 64024 attribute.

The CreditPortfolio 64028 entity has a cardinality of 1 64030 meaning that for each instance of the CreditPortfolioModel 64012 entity there is one CreditPortfolio 64028 entity.

The CreditPortfolio 64028 entity includes an ID 64032 attribute. The ID 64032 attribute has a cardinality of 1 64034 meaning that for each instance of the CreditPortfolio 64028 entity there is one ID 64032 attribute.

The InputData 64036 package includes an InputData 64038 entity. The InputData 64036 package includes a Loan 64040 package. The Loan 64040 package includes a Loan 64042 entity. The Loan 64040 package includes various packages, namely a Counterparty 64074, a GuarantorParty 64084, a CreditExposureData 64096, a FinancialCondition 64166, a CashFlowItem 64240, a ProbabilityOfDefault 64252, a Rating 64270, a ProbabilityOfDefaultPriceMatrix 64308, a RatingPriceMatrix 64342, a Prepayment 64388, a SpreadCurve 64414 and a Property 64436.

The Loan 64042 entity has a cardinality of 1 64044 meaning that for each instance of the Loan 64040 package there is one Loan 64042 entity. The Loan 64042 entity includes various attributes, namely an ID 64046, a GuaranteeID 64050, a Description 64054, a CurrencyCode 64058, a ValidityPeriod 64062, an ExternalLineAmount 64066 and an UtilizationAmount 64070. The ID 64046 attribute has a cardinality of 1 64048 meaning that for each instance of the Loan 64042 entity there is one ID 64046 attribute. The GuaranteeID 64050 attribute has a cardinality of 0 . . . 1 64052 meaning that for each instance of the Loan 64042 entity there may be one GuaranteeID 64050 attribute. The Description 64054 attribute has a cardinality of 0 . . . 1 64056 meaning that for each instance of the Loan 64042 entity there may be one Description 64054 attribute. The CurrencyCode 64058 attribute has a cardinality of 1 64060 meaning that for each instance of the Loan 64042 entity there is one CurrencyCode 64058 attribute. The ValidityPeriod 64062 attribute has a cardinality of 1 64064 meaning that for each instance of the Loan 64042 entity there is one ValidityPeriod 64062 attribute. The ExternalLineAmount 64066 attribute has a cardinality of 0 . . . 1 64068 meaning that for each instance of the Loan 64042 entity there may be one ExternalLineAmount 64066 attribute. The UtilizationAmount 64070 attribute has a cardinality of 0 . . . 1 64072 meaning that for each instance of the Loan 64042 entity there may be one UtilizationAmount 64070 attribute.

The Counterparty 64074 package includes a Counterparty 64076 entity. The Counterparty 64076 entity has a cardinality of 1 64078 meaning that for each instance of the Counterparty 64074 package there is one Counterparty 64076 entity. The Counterparty 64076 entity includes an InternalID 64080 attribute. The InternalID 64080 attribute has a cardinality of 1 64082 meaning that for each instance of the Counterparty 64076 entity there is one InternalID 64080 attribute.

The GuarantorParty 64084 package includes a GuarantorParty 64086 entity. The GuarantorParty 64086 entity has a cardinality of 0 . . . 1 64088 meaning that for each instance of the GuarantorParty 64084 package there may be one GuarantorParty 64086 entity. The GuarantorParty 64086 entity includes an InternalID 64090 attribute. The InternalID 64090 attribute has a cardinality of 0 . . . 1 64092 meaning that for each instance of the GuarantorParty 64086 entity there may be one InternalID 64090 attribute.

The CreditExposureData 64096 package includes a CreditExposureData 64098 entity. The CreditExposureData 64098 entity has a cardinality of 1 64100 meaning that for each instance of the CreditExposureData 64096 package there is one CreditExposureData 64098 entity. The CreditExposureData 64098 entity includes various attributes, namely a LossGivenDefaultDecimalValue 64102, a ShapeBetaDistributionDecimalValue 64106, an ExpectedLossGivenDefault DecimalValue 64110, an ExposureAtDefaultAmount 64114, an ExpectedUsageDecimalValue 64118, an UsageGivenDefaultDecimalValue 64122, a CreditPortfolioManagementProductCode 64126, an IndividualAggregationConstituentsNumberValue 64130 and an ActualAggregateNumberValue 64134. The CreditExposureData 64098 entity includes various subordinate entities, namely a PriceAtHorizon 64138 and a CurrentPrice 64154. The LossGivenDefaultDecimalValue 64102 attribute has a cardinality of 0 . . . 1 64104 meaning that for each instance of the CreditExposureData 64098 entity there may be one LossGivenDefaultDecimalValue 64102 attribute. The ShapeBetaDistributionDecimalValue 64106 attribute has a cardinality of 0 . . . 1 64108 meaning that for each instance of the CreditExposureData 64098 entity there may be one ShapeBetaDistributionDecimalValue 64106 attribute. The ExpectedLossGivenDefaultDecimalValue 64110 attribute has a cardinality of 0 . . . 1 64112 meaning that for each instance of the CreditExposureData 64098 entity there may be one ExpectedLossGivenDefaultDecimalValue 64110 attribute. The ExposureAtDefaultAmount 64114 attribute has a cardinality of 0 . . . 1 64116 meaning that for each instance of the CreditExposureData 64098 entity there may be one ExposureAtDefaultAmount 64114 attribute. The ExpectedUsageDecimalValue 64118 attribute has a cardinality of 0 . . . 1 64120 meaning that for each instance of the CreditExposureData 64098 entity there may be one ExpectedUsageDecimalValue 64118 attribute. The UsageGivenDefaultDecimalValue 64122 attribute has a cardinality of 0 . . . 1 64124 meaning that for each instance of the CreditExposureData 64098 entity there may be one UsageGivenDefaultDecimalValue 64122 attribute. The CreditPortfolioManagementProductCode 64126 attribute has a cardinality of 1 64128 meaning that for each instance of the CreditExposureData 64098 entity there is one CreditPortfolioManagementProductCode 64126 attribute. The IndividualAggregationConstituentsNumberValue 64130 attribute has a cardinality of 0 . . . 1 64132 meaning that for each instance of the CreditExposureData 64098 entity there may be one IndividualAggregationConstituentsNumberValue 64130 attribute. The ActualAggregateNumberValue 64134 attribute has a cardinality of 0 . . . 1 64136 meaning that for each instance of the CreditExposureData 64098 entity there may be one ActualAggregateNumberValue 64134 attribute.

The PriceAtHorizon 64138 entity has a cardinality of 0 . . . 1 64140 meaning that for each instance of the CreditExposureData 64098 entity there may be one PriceAtHorizon 64138 entity. The PriceAtHorizon 64138 entity includes various attributes, namely a Duration 64142, an Amount 64146 and a DecimalValue 64150. The Duration 64142 attribute has a cardinality of 0 . . . 1 64144 meaning that for each instance of the PriceAtHorizon 64138 entity there may be one Duration 64142 attribute. The Amount 64146 attribute has a cardinality of 0 . . . 1 64148 meaning that for each instance of the PriceAtHorizon 64138 entity there may be one Amount 64146 attribute. The DecimalValue 64150 attribute has a cardinality of 0 . . . 1 64152 meaning that for each instance of the PriceAtHorizon 64138 entity there may be one DecimalValue 64150 attribute.

The CurrentPrice 64154 entity has a cardinality of 0 . . . 1 64156 meaning that for each instance of the CreditExposureData 64098 entity there may be one CurrentPrice 64154 entity. The CurrentPrice 64154 entity includes various attributes, namely an Amount 64158 and a DecimalValue 64162. The Amount 64158 attribute has a cardinality of 0 . . . 1 64160 meaning that for each instance of the CurrentPrice 64154 entity there may be one Amount 64158 attribute. The DecimalValue 64162 attribute has a cardinality of 0 . . . 1

64164 meaning that for each instance of the CurrentPrice 64154 entity there may be one DecimalValue 64162 attribute.

The FinancialCondition 64166 package includes a FinancialCondition 64168 entity. The FinancialCondition 64168 entity has a cardinality of 0 . . . n 64170 meaning that for each instance of the FinancialCondition 64166 package there may be one or more FinancialCondition 64168 entities. The FinancialCondition 64168 entity includes various subordinate entities, namely an InterestCondition 64172, a FeeCondition 64204 and a PaymentCondition 64222. The InterestCondition 64172 entity includes a BankContractFinancialConditionSpecification 64174 subordinate entity. The BankContractFinancialConditionSpecification 64174 entity includes various subordinate entities, namely a Calculation 64178, an AmountSpecification 64184 and an InterestSpecification 64190. The Calculation 64178 entity includes a RecurrenceSpecification 64180 subordinate entity. The InterestSpecification 64190 entity includes a VariableInterest 64194 subordinate entity. The FeeCondition 64204 entity includes a BankContractFinancialConditionSpecification 64206 subordinate entity. The BankContractFinancialConditionSpecification 64206 entity includes various subordinate entities, namely a Calculation 64210 and an AmountSpecification 64216. The Calculation 64210 entity includes a RecurrenceSpecification 64212 subordinate entity. The PaymentCondition 64222 entity includes a BankContractFinancialConditionSpecification 64224 subordinate entity. The BankContractFinancialConditionSpecification 64224 entity includes various subordinate entities, namely a Calculation 64228 and an AmountSpecification 64234. The Calculation 64228 entity includes a RecurrenceSpecification 64230 subordinate entity. The CashFlowItem 64240 package includes a CashFlowItem 64242 entity.

The ProbabilityOfDefault 64252 package includes a ProbabilityOfDefault 64254 entity. The ProbabilityOfDefault 64254 entity has a cardinality of 0 . . . n 64256 meaning that for each instance of the ProbabilityOfDefault 64252 package there may be one or more ProbabilityOfDefault 64254 entities. The ProbabilityOfDefault 64254 entity includes various attributes, namely a ValidityDatePeriod 64258, a Code 64262 and a DoubleValue 64266. The ValidityDatePeriod 64258 attribute has a cardinality of 1 64260 meaning that for each instance of the ProbabilityOfDefault 64254 entity there is one ValidityDatePeriod 64258 attribute. The Code 64262 attribute has a cardinality of 1 64264 meaning that for each instance of the ProbabilityOfDefault 64254 entity there is one Code 64262 attribute. The DoubleValue 64266 attribute has a cardinality of 1 64268 meaning that for each instance of the ProbabilityOfDefault 64254 entity there is one DoubleValue 64266 attribute.

The Rating 64270 package includes a Rating 64272 entity. The Rating 64272 entity has a cardinality of 0 . . . n 64274 meaning that for each instance of the Rating 64270 package there may be one or more Rating 64272 entities. The Rating 64272 entity includes various attributes, namely a ModelID 64276, a ValidityDatePeriod 64280, a Code 64284, a MasterCreditRatingCode 64288, an InternalRatingIndicator 64292, a MaturityDuration 64296, a Date 64300 and a TendencyCode 64304. The ModelID 64276 attribute has a cardinality of 1 64278 meaning that for each instance of the Rating 64272 entity there is one ModelID 64276 attribute. The ValidityDatePeriod 64280 attribute has a cardinality of 1 64282 meaning that for each instance of the Rating 64272 entity there is one ValidityDatePeriod 64280 attribute. The Code 64284 attribute has a cardinality of 1 64286 meaning that for each instance of the Rating 64272 entity there is one Code 64284 attribute. The MasterCreditRatingCode 64288 attribute has a cardinality of 0 . . . 1 64290 meaning that for each instance of the Rating 64272 entity there may be one MasterCreditRatingCode 64288 attribute. The InternalRatingIndicator 64292 attribute has a cardinality of 0 . . . 1 64294 meaning that for each instance of the Rating 64272 entity there may be one InternalRatingIndicator 64292 attribute. The MaturityDuration 64296 attribute has a cardinality of 0 . . . 1 64298 meaning that for each instance of the Rating 64272 entity there may be one MaturityDuration 64296 attribute. The Date 64300 attribute has a cardinality of 1 64302 meaning that for each instance of the Rating 64272 entity there is one Date 64300 attribute. The TendencyCode 64304 attribute has a cardinality of 0 . . . 1 64306 meaning that for each instance of the Rating 64272 entity there may be one TendencyCode 64304 attribute.

The ProbabilityOfDefaultPriceMatrix 64308 package includes a ProbabilityOfDefaultPriceMatrix 64310 entity. The ProbabilityOfDefaultPriceMatrix 64310 entity has a cardinality of 0 . . . 1 64312 meaning that for each instance of the ProbabilityOfDefaultPriceMatrix 64308 package there may be one ProbabilityOfDefaultPriceMatrix 64310 entity. The ProbabilityOfDefaultPriceMatrix 64310 entity includes an Item 64314 subordinate entity.

The Item 64314 entity has a cardinality of 1 . . . n 64316 meaning that for each instance of the ProbabilityOfDefaultPriceMatrix 64310 entity there are one or more Item 64314 entities. The Item 64314 entity includes various attributes, namely a ValidityDate 64318, a ProbabilityOfDefaultDecimalValue 64322, an UsageDecimalValue 64326, a CommitmentFeeDecimalValue 64330, a FacilityFeeDecimalValue 64334 and a SpreadDecimalValue 64338. The ValidityDate 64318 attribute has a cardinality of 1 64320 meaning that for each instance of the Item 64314 entity there is one ValidityDate 64318 attribute. The ProbabilityOfDefaultDecimalValue 64322 attribute has a cardinality of 1 64324 meaning that for each instance of the Item 64314 entity there is one ProbabilityOfDefaultDecimalValue 64322 attribute. The UsageDecimalValue 64326 attribute has a cardinality of 1 64328 meaning that for each instance of the Item 64314 entity there is one UsageDecimalValue 64326 attribute. The CommitmentFeeDecimalValue 64330 attribute has a cardinality of 0 . . . 1 64332 meaning that for each instance of the Item 64314 entity there may be one CommitmentFeeDecimalValue 64330 attribute. The FacilityFeeDecimalValue 64334 attribute has a cardinality of 0 . . . 1 64336 meaning that for each instance of the Item 64314 entity there may be one FacilityFeeDecimalValue 64334 attribute. The SpreadDecimalValue 64338 attribute has a cardinality of 0 . . . 1 64340 meaning that for each instance of the Item 64314 entity there may be one SpreadDecimalValue 64338 attribute.

The RatingPriceMatrix 64342 package includes a RatingPriceMatrix 64344 entity. The RatingPriceMatrix 64344 entity has a cardinality of 0 . . . 1 64346 meaning that for each instance of the RatingPriceMatrix 64342 package there may be one RatingPriceMatrix 64344 entity. The RatingPriceMatrix 64344 entity includes an Item 64348 subordinate entity.

The Item 64348 entity has a cardinality of 1 . . . n 64350 meaning that for each instance of the RatingPriceMatrix 64344 entity there are one or more Item 64348 entities. The Item 64348 entity includes various attributes, namely a ValidityDate 64352, a RatingModelID 64356, a MinimumCreditRatingCode 64360, a MaximumCreditRatingCode 64364, a ProbabilityOfDefaultCalibrationMatrixID 64368, an UsageDecimalValue 64372, a CommitmentFeeDecimalValue 64376, a FacilityFeeDecimalValue 64380 and a SpreadDecimalValue 64384. The ValidityDate 64352 attribute has a cardinality of 1 64354 meaning that for each instance of the Item 64348 entity there is one ValidityDate 64352 attribute.

The RatingModelID 64356 attribute has a cardinality of 1 64358 meaning that for each instance of the Item 64348 entity there is one RatingModelID 64356 attribute. The MinimumCreditRatingCode 64360 attribute has a cardinality of 1 64362 meaning that for each instance of the Item 64348 entity there is one MinimumCreditRatingCode 64360 attribute. The MaximumCreditRatingCode 64364 attribute has a cardinality of 1 64366 meaning that for each instance of the Item 64348 entity there is one MaximumCreditRatingCode 64364 attribute. The ProbabilityOfDefaultCalibrationMatrixID 64368 attribute has a cardinality of 1 64370 meaning that for each instance of the Item 64348 entity there is one ProbabilityOfDefaultCalibrationMatrixID 64368 attribute. The UsageDecimalValue 64372 attribute has a cardinality of 1 64374 meaning that for each instance of the Item 64348 entity there is one UsageDecimalValue 64372 attribute. The CommitmentFeeDecimalValue 64376 attribute has a cardinality of 0 . . . 1 64378 meaning that for each instance of the Item 64348 entity there may be one CommitmentFeeDecimalValue 64376 attribute. The FacilityFeeDecimalValue 64380 attribute has a cardinality of 0 . . . 1 64382 meaning that for each instance of the Item 64348 entity there may be one FacilityFeeDecimalValue 64380 attribute. The SpreadDecimalValue 64384 attribute has a cardinality of 0 . . . 1 64386 meaning that for each instance of the Item 64348 entity there may be one SpreadDecimalValue 64384 attribute.

The Prepayment 64388 package includes a Prepayment 64390 entity. The Prepayment 64390 entity has a cardinality of 0 . . . n 64392 meaning that for each instance of the Prepayment 64388 package there may be one or more Prepayment 64390 entities. The Prepayment 64390 entity includes a PrepayableIndicator 64394 attribute. The Prepayment 64390 entity includes an Item 64398 subordinate entity. The PrepayableIndicator 64394 attribute has a cardinality of 1 64396 meaning that for each instance of the Prepayment 64390 entity there is one PrepayableIndicator 64394 attribute.

The Item 64398 entity has a cardinality of 0 . . . n 64400 meaning that for each instance of the Prepayment 64390 entity there may be one or more Item 64398 entities. The Item 64398 entity includes various attributes, namely a PaymentDate 64402, a CostsOfPrepaymentFractionDecimalValue 64406 and a PenaltyOfPrepaymentFractionDecimalValue 64410. The PaymentDate 64402 attribute has a cardinality of 1 64404 meaning that for each instance of the Item 64398 entity there is one PaymentDate 64402 attribute. The CostsOfPrepaymentFractionDecimalValue 64406 attribute has a cardinality of 0 . . . 1 64408 meaning that for each instance of the Item 64398 entity there may be one CostsOfPrepaymentFractionDecimalValue 64406 attribute. The PenaltyOfPrepaymentFractionDecimalValue 64410 attribute has a cardinality of 0 . . . 1 64412 meaning that for each instance of the Item 64398 entity there may be one PenaltyOfPrepaymentFractionDecimalValue 64410 attribute.

The SpreadCurve 64414 package includes a SpreadCurve 64416 entity. The SpreadCurve 64416 entity has a cardinality of 0 . . . 1 64418 meaning that for each instance of the SpreadCurve 64414 package there may be one SpreadCurve 64416 entity. The SpreadCurve 64416 entity includes an Item 64420 subordinate entity.

The Item 64420 entity has a cardinality of 1 . . . n 64422 meaning that for each instance of the SpreadCurve 64416 entity there are one or more Item 64420 entities. The Item 64420 entity includes various attributes, namely a ValidityDate 64424, a Duration 64428 and a SpreadDoubleValue 64432. The ValidityDate 64424 attribute has a cardinality of 1 64426 meaning that for each instance of the Item 64420 entity there is one ValidityDate 64424 attribute. The Duration 64428 attribute has a cardinality of 1 64430 meaning that for each instance of the Item 64420 entity there is one Duration 64428 attribute. The SpreadDoubleValue 64432 attribute has a cardinality of 1 64434 meaning that for each instance of the Item 64420 entity there is one SpreadDoubleValue 64432 attribute.

The Property 64436 package includes a Property 64438 entity. The Property 64438 entity has a cardinality of 0 . . . n 64440 meaning that for each instance of the Property 64436 package there may be one or more Property 64438 entities. The Property 64438 entity includes various attributes, namely an ID 64442 and a Value 64446. The ID 64442 attribute has a cardinality of 1 64444 meaning that for each instance of the Property 64438 entity there is one ID 64442 attribute. The Value 64446 attribute has a cardinality of 1 64448 meaning that for each instance of the Property 64438 entity there is one Value 64446 attribute. The data types of the various packages, entities, and attributes are described with respect to FIGS. 63-1 through 63-135.

FIGS. 65-1 through 65-24 show an example configuration of an Element Structure that includes a CrdtPrtfoModFSInDatBondCrteReqMsg 65000 package. The CrdtPrtfoModFSInDatBondCrteReqMsg 65000 package includes a CrdtPrtfoModFSInDatBondCrteReqMsg 65002 entity. The CrdtPrtfoModFSInDatBondCrteReqMsg 65000 package includes various packages, namely a MessageHeader 65004 and a CreditPortfolioModel 65010.

The MessageHeader 65004 package includes a MessageHeader 65006 entity. The MessageHeader 65006 entity has a cardinality of 1 65008 meaning that for each instance of the MessageHeader 65004 package there is one MessageHeader 65006 entity.

The CreditPortfolioModel 65010 package includes a CreditPortfolioModel 65012 entity. The CreditPortfolioModel 65010 package includes an InputData 65036 package. The CreditPortfolioModel 65012 entity has a cardinality of 1 65014 meaning that for each instance of the CreditPortfolioModel 65010 package there is one CreditPortfolioModel 65012 entity. The CreditPortfolioModel 65012 entity includes an ID 65016 attribute. The CreditPortfolioModel 65012 entity includes various subordinate entities, namely a CreditPortfolioManagementProcessControl 65020 and a CreditPortfolio 65028. The ID 65016 attribute has a cardinality of 1 65018 meaning that for each instance of the CreditPortfolioModel 65012 entity there is one ID 65016 attribute.

The CreditPortfolioManagementProcessControl 65020 entity has a cardinality of 1 65022 meaning that for each instance of the CreditPortfolioModel 65012 entity there is one CreditPortfolioManagementProcessControl 65020 entity. The CreditPortfolioManagementProcessControl 65020 entity includes a DataTransferID 65024 attribute. The DataTransferID 65024 attribute has a cardinality of 1 65026 meaning that for each instance of the CreditPortfolioManagementProcessControl 65020 entity there is one DataTransferID 65024 attribute. The CreditPortfolio 65028 entity has a cardinality of 1 65030 meaning that for each instance of the CreditPortfolioModel 65012 entity there is one CreditPortfolio 65028 entity. The CreditPortfolio 65028 entity includes an ID 65032 attribute. The ID 65032 attribute has a cardinality of 1 65034 meaning that for each instance of the CreditPortfolio 65028 entity there is one ID 65032 attribute. The InputData 65036 package includes an InputData 65038 entity. The InputData 65036 package includes a Bond 65042 package. The InputData 65038 entity has a cardinality of 1 65040 meaning that for each instance of the InputData 65036 package there is one InputData 65038 entity.

The Bond 65042 package includes a Bond 65044 entity. The Bond 65042 package includes various packages, namely a Counterparty 65076, a GuarantorParty 65090, a CreditExposureData 65100, a FinancialCondition 65162, a CashFlowItem 65234, a ProbabilityOfDefault 65246, a Rating 65264, a SinkData 65302, an Option 65324, a SpreadCurve 65382 and a Property 65404. The Bond 65044 entity has a cardinality of 1 65046 meaning that for each instance of the Bond 65042 package there is one Bond 65044 entity. The Bond 65044 entity includes various attributes, namely an ID 65048, a GuaranteeID 65052, a Description 65056, a CurrencyCode 65060, a ValidityPeriod 65064, a SeniorityCode 65068 and an IssuedAmount 65072. The ID 65048 attribute has a cardinality of 1 65050 meaning that for each instance of the Bond 65044 entity there is one ID 65048 attribute. The GuaranteeID 65052 attribute has a cardinality of 0 . . . 1 65054 meaning that for each instance of the Bond 65044 entity there may be one GuaranteeID 65052 attribute. The Description 65056 attribute has a cardinality of 0 . . . 1 65058 meaning that for each instance of the Bond 65044 entity there may be one Description 65056 attribute. The CurrencyCode 65060 attribute has a cardinality of 1 65062 meaning that for each instance of the Bond 65044 entity there is one CurrencyCode 65060 attribute. The ValidityPeriod 65064 attribute has a cardinality of 1 65066 meaning that for each instance of the Bond 65044 entity there is one ValidityPeriod 65064 attribute. The SeniorityCode 65068 attribute has a cardinality of 1 65070 meaning that for each instance of the Bond 65044 entity there is one SeniorityCode 65068 attribute. The IssuedAmount 65072 attribute has a cardinality of 1 65074 meaning that for each instance of the Bond 65044 entity there is one IssuedAmount 65072 attribute.

The Counterparty 65076 package includes a Counterparty 65078 entity. The Counterparty 65078 entity has a cardinality of 1 65080 meaning that for each instance of the Counterparty 65076 package there is one Counterparty 65078 entity. The Counterparty 65078 entity includes various attributes, namely an InternalID 65082 and a GuarantorSubstitutionCategoryCode 65086. The InternalID 65082 attribute has a cardinality of 1 65084 meaning that for each instance of the Counterparty 65078 entity there is one InternalID 65082 attribute. The GuarantorSubstitutionCategoryCode 65086 attribute has a cardinality of 0 . . . 1 65088 meaning that for each instance of the Counterparty 65078 entity there may be one GuarantorSubstitutionCategoryCode 65086 attribute.

The GuarantorParty 65090 package includes a GuarantorParty 65092 entity. The GuarantorParty 65092 entity has a cardinality of 0 . . . 1 65094 meaning that for each instance of the GuarantorParty 65090 package there may be one GuarantorParty 65092 entity. The GuarantorParty 65092 entity includes an InternalID 65096 attribute. The InternalID 65096 attribute has a cardinality of 0 . . . 1 65098 meaning that for each instance of the GuarantorParty 65092 entity there may be one InternalID 65096 attribute.

The CreditExposureData 65100 package includes a CreditExposureData 65102 entity. The CreditExposureData 65102 entity has a cardinality of 1 65104 meaning that for each instance of the CreditExposureData 65100 package there is one CreditExposureData 65102 entity. The CreditExposureData 65102 entity includes various attributes, namely a LossGivenDefaultDecimalValue 65106, a ShapeBetaDistributionDecimalValue 65110, an ExpectedLossGivenDefaultDecimalValue 65114, an ExposureAtDefaultAmount 65118, a CreditPortfolioManagementProductCode 65154 and a RecoveryAmount 65158. The CreditExposureData 65102 entity includes various subordinate entities, namely a PriceAtHorizon 65122 and a CurrentPrice 65138. The LossGivenDefaultDecimalValue 65106 attribute has a cardinality of 0 . . . 1 65108 meaning that for each instance of the CreditExposureData 65102 entity there may be one LossGivenDefaultDecimalValue 65106 attribute. The ShapeBetaDistributionDecimalValue 65110 attribute has a cardinality of 0 . . . 1 65112 meaning that for each instance of the CreditExposureData 65102 entity there may be one ShapeBetaDistributionDecimalValue 65110 attribute. The ExpectedLossGivenDefaultDecimalValue 65114 attribute has a cardinality of 0 . . . 1 65116 meaning that for each instance of the CreditExposureData 65102 entity there may be one ExpectedLossGivenDefaultDecimalValue 65114 attribute. The ExposureAtDefaultAmount 65118 attribute has a cardinality of 0 . . . 1 65120 meaning that for each instance of the CreditExposureData 65102 entity there may be one ExposureAtDefaultAmount 65118 attribute. The CreditPortfolioManagementProductCode 65154 attribute has a cardinality of 1 65156 meaning that for each instance of the CreditExposureData 65102 entity there is one CreditPortfolioManagementProductCode 65154 attribute. The RecoveryAmount 65158 attribute has a cardinality of 0 . . . 1 65160 meaning that for each instance of the CreditExposureData 65102 entity there may be one RecoveryAmount 65158 attribute.

The PriceAtHorizon 65122 entity has a cardinality of 0 . . . 1 65124 meaning that for each instance of the CreditExposureData 65102 entity there may be one PriceAtHorizon 65122 entity. The PriceAtHorizon 65122 entity includes various attributes, namely a Duration 65126, an Amount 65130 and a DecimalValue 65134. The Duration 65126 attribute has a cardinality of 0 . . . 1 65128 meaning that for each instance of the PriceAtHorizon 65122 entity there may be one Duration 65126 attribute. The Amount 65130 attribute has a cardinality of 0 . . . 1 65132 meaning that for each instance of the PriceAtHorizon 65122 entity there may be one Amount 65130 attribute. The DecimalValue 65134 attribute has a cardinality of 0 . . . 1 65136 meaning that for each instance of the PriceAtHorizon 65122 entity there may be one DecimalValue 65134 attribute.

The CurrentPrice 65138 entity has a cardinality of 0 . . . 1 65140 meaning that for each instance of the CreditExposureData 65102 entity there may be one CurrentPrice 65138 entity. The CurrentPrice 65138 entity includes various attributes, namely a Duration 65142, an Amount 65146 and a DecimalValue 65150. The Duration 65142 attribute has a cardinality of 0 . . . 1 65144 meaning that for each instance of the CurrentPrice 65138 entity there may be one Duration 65142 attribute. The Amount 65146 attribute has a cardinality of 0 . . . 1 65148 meaning that for each instance of the CurrentPrice 65138 entity there may be one Amount 65146 attribute. The DecimalValue 65150 attribute has a cardinality of 0 . . . 1 65152 meaning that for each instance of the CurrentPrice 65138 entity there may be one DecimalValue 65150 attribute.

The FinancialCondition 65162 package includes a FinancialCondition 65164 entity. The FinancialCondition 65164 entity includes various subordinate entities, namely an InterestCondition 65166, a FeeCondition 65198 and a PaymentCondition 65216. The InterestCondition 65166 entity includes a BankContractFinancialConditionSpecification 65168 subordinate entity. The BankContractFinancialConditionSpecification 65168 entity includes various subordinate entities, namely a Calculation 65172, an AmountSpecification 65178 and an InterestSpecification 65184. The Calculation 65172 entity includes a RecurrenceSpecification 65174 subordinate entity. The InterestSpecification 65184 entity includes a VariableInterest 65188 subordinate entity. The FeeCondition 65198 entity includes a BankContractFinancialConditionSpecification 65200 subordinate entity. The BankContractFinancialConditionSpecification 65200 entity includes various subordinate entities, namely a Calculation 65204 and an AmountSpecification 65210. The Calculation 65204 entity includes a RecurrenceSpecification 65206 subordinate entity. The PaymentCondition 65216 entity includes a BankContractFinancialConditionSpecification 65218 subordinate entity. The BankContractFinancialConditionSpecification 65218 entity includes various subordinate entities, namely a Calculation 65222 and an AmountSpecification 65228. The Calculation 65222 entity includes a RecurrenceSpecification 65224 subordinate entity. The CashFlowItem 65234 package includes a CashFlowItem 65236 entity.

The ProbabilityOfDefault 65246 package includes a ProbabilityOfDefault 65248 entity. The ProbabilityOfDefault 65248 entity has a cardinality of 0 . . . n 65250 meaning that for each instance of the ProbabilityOfDefault 65246 package there may be one or more ProbabilityOfDefault 65248 entities. The ProbabilityOfDefault 65248 entity includes various attributes, namely a ValidityDatePeriod 65252, a Code 65256 and a DoubleValue 65260. The ValidityDatePeriod 65252 attribute has a cardinality of 1 65254 meaning that for each instance of the ProbabilityOfDefault 65248 entity there is one ValidityDatePeriod 65252 attribute. The Code 65256 attribute has a cardinality of 1 65258 meaning that for each instance of the ProbabilityOfDefault 65248 entity there is one Code 65256 attribute. The DoubleValue 65260 attribute has a cardinality of 1 65262 meaning that for each instance of the ProbabilityOfDefault 65248 entity there is one DoubleValue 65260 attribute.

The Rating 65264 package includes a Rating 65266 entity. The Rating 65266 entity has a cardinality of 0 . . . n 65268 meaning that for each instance of the Rating 65264 package there may be one or more Rating 65266 entities. The Rating 65266 entity includes various attributes, namely a ModelID 65270, a ValidityDatePeriod 65274, a Code 65278, a MasterCreditRatingCode 65282, an InternalRatingIndicator 65286, a Maturity 65290, a Date 65294 and a TendencyCode 65298. The ModelID 65270 attribute has a cardinality of 1 65272 meaning that for each instance of the Rating 65266 entity there is one ModelID 65270 attribute. The ValidityDatePeriod 65274 attribute has a cardinality of 1 65276 meaning that for each instance of the Rating 65266 entity there is one ValidityDatePeriod 65274 attribute. The Code 65278 attribute has a cardinality of 1 65280 meaning that for each instance of the Rating 65266 entity there is one Code 65278 attribute. The MasterCreditRatingCode 65282 attribute has a cardinality of 0 . . . 1 65284 meaning that for each instance of the Rating 65266 entity there may be one MasterCreditRatingCode 65282 attribute. The InternalRatingIndicator 65286 attribute has a cardinality of 0 . . . 1 65288 meaning that for each instance of the Rating 65266 entity there may be one InternalRatingIndicator 65286 attribute. The Maturity 65290 attribute has a cardinality of 0 . . . 1 65292 meaning that for each instance of the Rating 65266 entity there may be one Maturity 65290 attribute. The Date 65294 attribute has a cardinality of 1 65296 meaning that for each instance of the Rating 65266 entity there is one Date 65294 attribute. The TendencyCode 65298 attribute has a cardinality of 0 . . . 1 65300 meaning that for each instance of the Rating 65266 entity there may be one TendencyCode 65298 attribute.

The SinkData 65302 package includes a SinkData 65304 entity. The SinkData 65304 entity has a cardinality of 0 . . . 1 65306 meaning that for each instance of the SinkData 65302 package there may be one SinkData 65304 entity. The SinkData 65304 entity includes an Item 65308 subordinate entity. The Item 65308 entity has a cardinality of 1 . . . n 65310 meaning that for each instance of the SinkData 65304 entity there are one or more Item 65308 entities. The Item 65308 entity includes various attributes, namely a RepaymentDate 65312, a RepaymentAmount 65316 and a PriceOfRepaymentFractionDecimalValue 65320. The RepaymentDate 65312 attribute has a cardinality of 1 65314 meaning that for each instance of the Item 65308 entity there is one RepaymentDate 65312 attribute. The RepaymentAmount 65316 attribute has a cardinality of 1 65318 meaning that for each instance of the Item 65308 entity there is one RepaymentAmount 65316 attribute. The PriceOfRepaymentFractionDecimalValue 65320 attribute has a cardinality of 1 65322 meaning that for each instance of the Item 65308 entity there is one PriceOfRepaymentFractionDecimalValue 65320 attribute.

The Option 65324 package includes an Option 65326 entity. The Option 65326 entity has a cardinality of 1 . . . n 65328 meaning that for each instance of the Option 65324 package there are one or more Option 65326 entities. The Option 65326 entity includes various attributes, namely a ValidityPeriod 65330, a CategoryCode 65334, a StyleCode 65338, a MutualRightOfNoticePurchaseIndicator 65342, a QuotationCode 65346 and a SingleExerciseIndicator 65350. The Option 65326 entity includes various subordinate entities, namely an Item 65354 and an ExerciseDateSpecification 65374. The ValidityPeriod 65330 attribute has a cardinality of 1 65332 meaning that for each instance of the Option 65326 entity there is one ValidityPeriod 65330 attribute. The CategoryCode 65334 attribute has a cardinality of 1 65336 meaning that for each instance of the Option 65326 entity there is one CategoryCode 65334 attribute. The StyleCode 65338 attribute has a cardinality of 1 65340 meaning that for each instance of the Option 65326 entity there is one StyleCode 65338 attribute. The MutualRightOfNoticePurchaseIndicator 65342 attribute has a cardinality of 0 . . . 1 65344 meaning that for each instance of the Option 65326 entity there may be one MutualRightOfNoticePurchaseIndicator 65342 attribute. The QuotationCode 65346 attribute has a cardinality of 0 . . . 1 65348 meaning that for each instance of the Option 65326 entity there may be one QuotationCode 65346 attribute. The SingleExerciseIndicator 65350 attribute has a cardinality of 0 . . . 1 65352 meaning that for each instance of the Option 65326 entity there may be one SingleExerciseIndicator 65350 attribute.

The Item 65354 entity has a cardinality of 1 . . . n 65356 meaning that for each instance of the Option 65326 entity there are one or more Item 65354 entities. The Item 65354 entity includes various attributes, namely a ValidityPeriod 65358, an ExercisePriceFractionDecimalValue 65362, a StrikePercent 65366 and a StrikeAmount 65370. The ValidityPeriod 65358 attribute has a cardinality of 0 . . . 1 65360 meaning that for each instance of the Item 65354 entity there may be one ValidityPeriod 65358 attribute. The ExercisePriceFractionDecimalValue 65362 attribute has a cardinality of 0 . . . 1 65364 meaning that for each instance of the Item 65354 entity there may be one ExercisePriceFractionDecimalValue 65362 attribute. The StrikePercent 65366 attribute has a cardinality of 0 . . . 1 65368 meaning that for each instance of the Item 65354 entity there may be one StrikePercent 65366 attribute. The StrikeAmount 65370 attribute has a cardinality of 0 . . . 1 65372 meaning that for each instance of the Item 65354 entity there may be one StrikeAmount 65370 attribute.

The ExerciseDateSpecification 65374 entity has a cardinality of 0 . . . n 65376 meaning that for each instance of the Option 65326 entity there may be one or more ExerciseDateSpecification 65374 entities. The ExerciseDateSpecification 65374 entity includes an ExcerciseValidityPeriod 65378 attribute. The ExcerciseValidityPeriod 65378 attribute has a cardinality of 1 65380 meaning that for each instance of the ExerciseDateSpecification 65374 entity there is one ExcerciseValidityPeriod 65378 attribute.

The SpreadCurve 65382 package includes a SpreadCurve 65384 entity. The SpreadCurve 65384 entity has a cardinality of 0 . . . 1 65386 meaning that for each instance of the SpreadCurve 65382 package there may be one SpreadCurve 65384 entity. The SpreadCurve 65384 entity includes an Item 65388 subordinate entity. The Item 65388 entity has a cardinality of 1 . . . n 65390 meaning that for each instance of the SpreadCurve 65384 entity there are one or more Item 65388 entities. The Item 65388 entity includes various attributes, namely a ValidityDate 65392, a Duration 65396 and a SpreadDoubleValue 65400. The ValidityDate 65392 attribute has a cardinality of 1 65394 meaning that for each instance of the Item 65388 entity there is one ValidityDate 65392 attribute. The Duration 65396 attribute has a cardinality of 1 65398 meaning that for each instance of the Item 65388 entity there is one Duration 65396 attribute. The SpreadDoubleValue 65400 attribute has a cardinality of 1 65402 meaning that for each instance of the Item 65388 entity there is one SpreadDoubleValue 65400 attribute.

The Property 65404 package includes a Property 65406 entity. The Property 65406 entity has a cardinality of 0 . . . n 65408 meaning that for each instance of the Property 65404 package there may be one or more Property 65406 entities. The Property 65406 entity includes various attributes, namely an ID 65410 and a Value 65414. The ID 65410 attribute has a cardinality of 1 65412 meaning that for each instance of the Property 65406 entity there is one ID 65410 attribute. The Value 65414 attribute has a cardinality of 1 65416 meaning that for each instance of the Property 65406 entity there is one Value 65414 attribute. The data types of the various packages, entities, and attributes are described with respect to FIGS. 63-1 through 63-135.

FIGS. 66-1 through 66-25 show an example configuration of an Element Structure that includes a CrdtPrtfoModFSInDatTOBSItmCrteReqMsg 66000 package. The CrdtPrtfoModFSInDatTOBSItmCrteReqMsg 66000 package includes a CrdtPrtfoModFSInDatTOBSItmCrteReqMsg 66002 entity. The CrdtPrtfoModFSInDatTOBSItmCrteReqMsg 66000 package includes various packages, namely a MessageHeader 66004 and a CreditPortfolioModel 66010.

The MessageHeader 66004 package includes a MessageHeader 66006 entity. The MessageHeader 66006 entity has a cardinality of 1 66008 meaning that for each instance of the MessageHeader 66004 package there is one MessageHeader 66006 entity.

The CreditPortfolioModel 66010 package includes a CreditPortfolioModel 66012 entity. The CreditPortfolioModel 66010 package includes an InputData 66036 package. The CreditPortfolioModel 66012 entity has a cardinality of 1 66014 meaning that for each instance of the CreditPortfolioModel 66010 package there is one CreditPortfolioModel 66012 entity. The CreditPortfolioModel 66012 entity includes an ID 66016 attribute. The CreditPortfolioModel 66012 entity includes various subordinate entities, namely a CreditPortfolioManagementProcessControl 66020 and a CreditPortfolio 66028. The ID 66016 attribute has a cardinality of 1 66018 meaning that for each instance of the CreditPortfolioModel 66012 entity there is one ID 66016 attribute.

The CreditPortfolioManagementProcessControl 66020 entity has a cardinality of 1 66022 meaning that for each instance of the CreditPortfolioModel 66012 entity there is one CreditPortfolioManagementProcessControl 66020 entity. The CreditPortfolioManagementProcessControl 66020 entity includes a DataTransferID 66024 attribute. The DataTransferID 66024 attribute has a cardinality of 1 66026 meaning that for each instance of the CreditPortfolioManagementProcessControl 66020 entity there is one DataTransferID 66024 attribute.

The CreditPortfolio 66028 entity has a cardinality of 1 66030 meaning that for each instance of the CreditPortfolioModel 66012 entity there is one CreditPortfolio 66028 entity. The CreditPortfolio 66028 entity includes an ID 66032 attribute. The ID 66032 attribute has a cardinality of 1 66034 meaning that for each instance of the CreditPortfolio 66028 entity there is one ID 66032 attribute.

The InputData 66036 package includes an InputData 66038 entity. The InputData 66036 package includes a TraditionalOffBalanceSheetItem 66040 package.

The TraditionalOffBalanceSheetItem 66040 package includes a TraditionalOffBalanceSheetItem 66042 entity. The TraditionalOffBalanceSheetItem 66040 package includes various packages, namely a Counterparty 66074, a GuarantorParty 66086, a CreditExposureData 66096, a FinancialCondition 66170, a ProbabilityOfDefault 66242, a Rating 66260, a ProbabilityOfDefaultPriceMatrix 66298, a RatingPriceMatrix 66332, a Prepayment 66378, a SpreadCurve 66404 and a Property 66426.

The TraditionalOffBalanceSheetItem 66042 entity has a cardinality of 1 66044 meaning that for each instance of the TraditionalOffBalanceSheetItem 66040 package there is one TraditionalOffBalanceSheetItem 66042 entity. The TraditionalOffBalanceSheetItem 66042 entity includes various attributes, namely an ID 66046, a GuaranteeID 66050, a Description 66054, a CurrencyCode 66058, a ValidityPeriod 66062, an ExternalLineAmount 66066 and an UtilizationAmount 66070. The ID 66046 attribute has a cardinality of 1 66048 meaning that for each instance of the TraditionalOffBalanceSheetItem 66042 entity there is one ID 66046 attribute. The GuaranteeID 66050 attribute has a cardinality of 0 . . . 1 66052 meaning that for each instance of the TraditionalOffBalanceSheetItem 66042 entity there may be one GuaranteeID 66050 attribute. The Description 66054 attribute has a cardinality of 0 . . . 1 66056 meaning that for each instance of the TraditionalOffBalanceSheetItem 66042 entity there may be one Description 66054 attribute. The CurrencyCode 66058 attribute has a cardinality of 1 66060 meaning that for each instance of the TraditionalOffBalanceSheetItem 66042 entity there is one CurrencyCode 66058 attribute. The ValidityPeriod 66062 attribute has a cardinality of 1 66064 meaning that for each instance of the TraditionalOffBalanceSheetItem 66042 entity there is one ValidityPeriod 66062 attribute. The ExternalLineAmount 66066 attribute has a cardinality of 0 . . . 1 66068 meaning that for each instance of the TraditionalOffBalanceSheetItem 66042 entity there may be one ExternalLineAmount 66066 attribute. The UtilizationAmount 66070 attribute has a cardinality of 0 . . . 1 66072 meaning that for each instance of the TraditionalOffBalanceSheetItem 66042 entity there may be one UtilizationAmount 66070 attribute.

The Counterparty 66074 package includes a Counterparty 66076 entity. The Counterparty 66076 entity has a cardinality of 1 66078 meaning that for each instance of the Counterparty 66074 package there is one Counterparty 66076 entity. The Counterparty 66076 entity includes an InternalID 66080 attribute. The InternalID 66080 attribute has a cardinality of 1 66082 meaning that for each instance of the Counterparty 66076 entity there is one InternalID 66080 attribute.

The GuarantorParty 66086 package includes a GuarantorParty 66088 entity. The GuarantorParty 66088 entity has a cardinality of 0 . . . 1 66090 meaning that for each instance of the GuarantorParty 66086 package there may be one GuarantorParty 66088 entity. The GuarantorParty 66088 entity includes an InternalID 66092 attribute. The InternalID 66092 attribute has a cardinality of 0 . . . 1 66094 meaning that for each instance of the GuarantorParty 66088 entity there may be one InternalID 66092 attribute.

The CreditExposureData 66096 package includes a CreditExposureData 66098 entity. The CreditExposureData 66098 entity has a cardinality of 1 66100 meaning that for each instance of the CreditExposureData 66096 package there is one CreditExposureData 66098 entity. The CreditExposureData 66098 entity includes various attributes, namely a LossGivenDefaultDecimalValue 66102, a ShapeBetaDistributionDecimalValue 66106, an ExpectedLossGivenDefaultDecimalValue 66110, an ExposureAtDefaultAmount 66114, an ExpectedUsageDecimalValue 66118, an UsageGivenDefaultDecimalValue 66122, a CreditPortfolioManagementProductCode 66126, an IndividualAggregationConstituentsNumberValue 66130 and an ActualAggregateNumberValue 66134. The CreditExposureData 66098 entity includes various subordinate entities, namely a PriceAtHorizon 66138 and a CurrentPrice 66154. The LossGivenDefaultDecimalValue 66102 attribute has a cardinality of 0 . . . 1 66104 meaning that for each instance of the CreditExposureData 66098 entity there may be one LossGivenDefaultDecimalValue 66102 attribute. The ShapeBetaDistributionDecimalValue 66106 attribute has a cardinality of 0 . . . 1 66108 meaning that for each instance of the CreditExposureData 66098 entity there may be one ShapeBetaDistributionDecimalValue 66106 attribute. The ExpectedLossGivenDefaultDecimalValue 66110 attribute has a cardinality of 0 . . . 1 66112 meaning that for each instance of the CreditExposureData 66098 entity there may be one ExpectedLossGivenDefaultDecimalValue 66110 attribute. The ExposureAtDefaultAmount 66114 attribute has a cardinality of 0 . . . 1 66116 meaning that for each instance of the CreditExposureData 66098 entity there may be one ExposureAtDefaultAmount 66114 attribute. The ExpectedUsageDecimalValue 66118 attribute has a cardinality of 0 . . . 1 66120 meaning that for each instance of the CreditExposureData 66098 entity there may be one ExpectedUsageDecimalValue 66118 attribute. The UsageGivenDefaultDecimalValue 66122 attribute has a cardinality of 0 . . . 1 66124 meaning that for each instance of the CreditExposureData 66098 entity there may be one UsageGivenDefaultDecimalValue 66122 attribute. The CreditPortfolioManagementProductCode 66126 attribute has a cardinality of 1 66128 meaning that for each instance of the CreditExposureData 66098 entity there is one CreditPortfolioManagementProductCode 66126 attribute. The IndividualAggregationConstituentsNumberValue 66130 attribute has a cardinality of 0 . . . 1 66132 meaning that for each instance of the CreditExposureData 66098 entity there may be one IndividualAggregationConstituentsNumberValue 66130 attribute. The ActualAggregateNumberValue 66134 attribute has a cardinality of 0 . . . 1 66136 meaning that for each instance of the CreditExposureData 66098 entity there may be one ActualAggregateNumberValue 66134 attribute.

The PriceAtHorizon 66138 entity has a cardinality of 0 . . . 1 66140 meaning that for each instance of the CreditExposureData 66098 entity there may be one PriceAtHorizon 66138 entity. The PriceAtHorizon 66138 entity includes various attributes, namely a Duration 66142, an Amount 66146 and a DecimalValue 66150. The Duration 66142 attribute has a cardinality of 0 . . . 1 66144 meaning that for each instance of the PriceAtHorizon 66138 entity there may be one Duration 66142 attribute. The Amount 66146 attribute has a cardinality of 0 . . . 1 66148 meaning that for each instance of the PriceAtHorizon 66138 entity there may be one Amount 66146 attribute. The DecimalValue 66150 attribute has a cardinality of 0 . . . 1 66152 meaning that for each instance of the PriceAtHorizon 66138 entity there may be one DecimalValue 66150 attribute.

The CurrentPrice 66154 entity has a cardinality of 0 . . . 1 66156 meaning that for each instance of the CreditExposureData 66098 entity there may be one CurrentPrice 66154 entity. The CurrentPrice 66154 entity includes various attributes, namely a Duration 66158, an Amount 66162 and a DecimalValue 66166. The Duration 66158 attribute has a cardinality of 0 . . . 1 66160 meaning that for each instance of the CurrentPrice 66154 entity there may be one Duration 66158 attribute. The Amount 66162 attribute has a cardinality of 0 . . . 1 66164 meaning that for each instance of the CurrentPrice 66154 entity there may be one Amount 66162 attribute. The DecimalValue 66166 attribute has a cardinality of 0 . . . 1 66168 meaning that for each instance of the CurrentPrice 66154 entity there may be one DecimalValue 66166 attribute.

The FinancialCondition 66170 package includes a FinancialCondition 66172 entity. The FinancialCondition 66172 entity includes various subordinate entities, namely an InterestCondition 66174, a FeeCondition 66206 and a PaymentCondition 66224. The InterestCondition 66174 entity includes a BankContractFinancialConditionSpecification 66176 subordinate entity. The BankContractFinancialConditionSpecification 66176 entity includes various subordinate entities, namely a Calculation 66180, an AmountSpecification 66186 and an InterestSpecification 66192. The Calculation 66180 entity includes a RecurrenceSpecification 66182 subordinate entity. The InterestSpecification 66192 entity includes a VariableInterest 66196 subordinate entity. The FeeCondition 66206 entity includes a BankContractFinancialConditionSpecification 66208 subordinate entity. The BankContractFinancialConditionSpecification 66208 entity includes various subordinate entities, namely a Calculation 66212 and an AmountSpecification 66218. The Calculation 66212 entity includes a RecurrenceSpecification 66214 subordinate entity. The PaymentCondition 66224 entity includes a BankContractFinancialConditionSpecification 66226 subordinate entity. The BankContractFinancialConditionSpecification 66226 entity includes various subordinate entities, namely a Calculation 66230 and an AmountSpecification 66236. The Calculation 66230 entity includes a RecurrenceSpecification 66232 subordinate entity.

The ProbabilityOfDefault 66242 package includes a ProbabilityOfDefault 66244 entity. The ProbabilityOfDefault 66244 entity has a cardinality of 0 . . . n 66246 meaning that for each instance of the ProbabilityOfDefault 66242 package there may be one or more ProbabilityOfDefault 66244 entities. The ProbabilityOfDefault 66244 entity includes various attributes, namely a ValidityDatePeriod 66248, a Code 66252 and a DoubleValue 66256. The ValidityDatePeriod 66248 attribute has a cardinality of 1 66250 meaning that for each instance of the ProbabilityOfDefault 66244 entity there is one ValidityDatePeriod 66248 attribute. The Code 66252 attribute has a cardinality of 1 66254 meaning that for each instance of the ProbabilityOfDefault 66244 entity there is one Code 66252 attribute. The DoubleValue 66256 attribute has a cardinality of 1 66258 meaning that for each instance of the ProbabilityOfDefault 66244 entity there is one DoubleValue 66256 attribute.

The Rating 66260 package includes a Rating 66262 entity. The Rating 66262 entity has a cardinality of 0 . . . n 66264 meaning that for each instance of the Rating 66260 package there may be one or more Rating 66262 entities. The Rating 66262 entity includes various attributes, namely a ModelID 66266, a ValidityDatePeriod 66270, a Code 66274, a MasterCreditRatingCode 66278, an InternalRatingIndicator 66282, a MaturityDuration 66286, a Date 66290 and a TendencyCode 66294. The ModelID 66266 attribute has a cardinality of 1 66268 meaning that for each instance of the Rating 66262 entity there is one ModelID 66266 attribute. The ValidityDatePeriod 66270 attribute has a cardinality of 1 66272 meaning that for each instance of the Rating 66262 entity there is one ValidityDatePeriod 66270 attribute. The Code 66274 attribute has a cardinality of 1 66276 meaning that for each instance of the Rating 66262 entity there is one Code 66274 attribute. The MasterCreditRatingCode 66278 attribute has a cardinality of 0 . . . 1 66280 meaning that for each instance of the Rating 66262 entity there may be one MasterCreditRatingCode 66278 attribute. The InternalRatingIndicator 66282 attribute has a cardinality of 0 . . . 1 66284 meaning that for each instance of the Rating 66262 entity there may be one InternalRatingIndicator 66282 attribute. The MaturityDuration 66286 attribute has a cardinality of 0 . . . 1 66288 meaning that for each instance of the Rating 66262 entity there may be one MaturityDuration 66286 attribute. The Date 66290 attribute has a cardinality of 1 66292 meaning that for each instance of the Rating 66262 entity there is one Date 66290 attribute. The TendencyCode 66294 attribute has a cardinality of 0 . . . 1 66296 meaning that for each instance of the Rating 66262 entity there may be one TendencyCode 66294 attribute.

The ProbabilityOfDefaultPriceMatrix 66298 package includes a ProbabilityOfDefaultPriceMatrix 66300 entity. The ProbabilityOfDefaultPriceMatrix 66300 entity has a cardinality of 0 . . . 1 66302 meaning that for each instance of the ProbabilityOfDefaultPriceMatrix 66298 package there may be one ProbabilityOfDefaultPriceMatrix 66300 entity. The ProbabilityOfDefaultPriceMatrix 66300 entity includes an Item 66304 subordinate entity.

The Item 66304 entity has a cardinality of 1 . . . n 66306 meaning that for each instance of the ProbabilityOfDefaultPriceMatrix 66300 entity there are one or more Item 66304 entities. The Item 66304 entity includes various attributes, namely a ValidityDate 66308, a ProbabilityOfDefaultDecimalValue 66312, an UsageDecimalValue 66316, a CommitmentFeeDecimalValue 66320, a FacilityFeeDecimalValue 66324 and a SpreadDecimalValue 66328. The ValidityDate 66308 attribute has a cardinality of 1 66310 meaning that for each instance of the Item 66304 entity there is one ValidityDate 66308 attribute. The ProbabilityOfDefaultDecimalValue 66312 attribute has a cardinality of 1 66314 meaning that for each instance of the Item 66304 entity there is one ProbabilityOfDefaultDecimalValue 66312 attribute. The UsageDecimalValue 66316 attribute has a cardinality of 1 66318 meaning that for each instance of the Item 66304 entity there is one UsageDecimalValue 66316 attribute. The CommitmentFeeDecimalValue 66320 attribute has a cardinality of 0 . . . 1 66322 meaning that for each instance of the Item 66304 entity there may be one CommitmentFeeDecimalValue 66320 attribute. The FacilityFeeDecimalValue 66324 attribute has a cardinality of 0 . . . 1 66326 meaning that for each instance of the Item 66304 entity there may be one FacilityFeeDecimalValue 66324 attribute. The SpreadDecimalValue 66328 attribute has a cardinality of 0 . . . 1 66330 meaning that for each instance of the Item 66304 entity there may be one SpreadDecimalValue 66328 attribute.

The RatingPriceMatrix 66332 package includes a RatingPriceMatrix 66334 entity. The RatingPriceMatrix 66334 entity has a cardinality of 0 . . . 1 66336 meaning that for each instance of the RatingPriceMatrix 66332 package there may be one RatingPriceMatrix 66334 entity. The RatingPriceMatrix 66334 entity includes an Item 66338 subordinate entity.

The Item 66338 entity has a cardinality of 1 . . . n 66340 meaning that for each instance of the RatingPriceMatrix 66334 entity there are one or more Item 66338 entities. The Item 66338 entity includes various attributes, namely a ValidityDate 66342, a RatingModelID 66346, a MinimumCreditRatingCode 66350, a MaximumCreditRatingCode 66354, a ProbabilityOfDefaultCalibrationMatrixID 66358, an UsageDecimalValue 66362, a CommitmentFeeDecimalValue 66366, a FacilityFeeDecimalValue 66370 and a SpreadDecimalValue 66374. The ValidityDate 66342 attribute has a cardinality of 1 66344 meaning that for each instance of the Item 66338 entity there is one ValidityDate 66342 attribute. The RatingModelID 66346 attribute has a cardinality of 1 66348 meaning that for each instance of the Item 66338 entity there is one RatingModelID 66346 attribute. The MinimumCreditRatingCode 66350 attribute has a cardinality of 1 66352 meaning that for each instance of the Item 66338 entity there is one MinimumCreditRatingCode 66350 attribute. The MaximumCreditRatingCode 66354 attribute has a cardinality of 1 66356 meaning that for each instance of the Item 66338 entity there is one MaximumCreditRatingCode 66354 attribute. The ProbabilityOfDefaultCalibrationMatrixID 66358 attribute has a cardinality of 1 66360 meaning that for each instance of the Item 66338 entity there is one ProbabilityOfDefaultCalibrationMatrixID 66358 attribute. The UsageDecimalValue 66362 attribute has a cardinality of 1 66364 meaning that for each instance of the Item 66338 entity there is one UsageDecimalValue 66362 attribute. The CommitmentFeeDecimalValue 66366 attribute has a cardinality of 0 . . . 1 66368 meaning that for each instance of the Item 66338 entity there may be one CommitmentFeeDecimalValue 66366 attribute. The FacilityFeeDecimalValue 66370 attribute has a cardinality of 0 . . . 1 66372 meaning that for each instance of the Item 66338 entity there may be one FacilityFeeDecimalValue 66370 attribute. The SpreadDecimalValue 66374 attribute has a cardinality of 0 . . . 1 66376 meaning that for each instance of the Item 66338 entity there may be one SpreadDecimalValue 66374 attribute.

The Prepayment 66378 package includes a Prepayment 66380 entity. The Prepayment 66380 entity has a cardinality of 0 . . . n 66382 meaning that for each instance of the Prepayment 66378 package there may be one or more Prepayment 66380 entities. The Prepayment 66380 entity includes a PrepayableIndicator 66384 attribute. The Prepayment 66380 entity includes an Item 66388 subordinate entity. The PrepayableIndicator 66384 attribute has a cardinality of 1 66386 meaning that for each instance of the Prepayment 66380 entity there is one PrepayableIndicator 66384 attribute.

The Item 66388 entity has a cardinality of 0 . . . n 66390 meaning that for each instance of the Prepayment 66380 entity there may be one or more Item 66388 entities. The Item 66388 entity includes various attributes, namely a PaymentDate 66392, a CostsOfPrepaymentFractionDecimalValue 66396 and a PenaltyOfPrepaymentFractionDecimalValue 66400. The PaymentDate 66392 attribute has a cardinality of 1 66394 meaning that for each instance of the Item 66388 entity there is one PaymentDate 66392 attribute. The CostsOfPrepaymentFractionDecimalValue 66396 attribute has a cardinality of 0 . . . 1 66398 meaning that for each instance of the Item 66388 entity there may be one CostsOfPrepayment- FractionDecimalValue 66396 attribute. The PenaltyOfPrepaymentFractionDecimalValue 66400 attribute has a cardinality of 0 . . . 1 66402 meaning that for each instance of the Item 66388 entity there may be one PenaltyOfPrepaymentFractionDecimalValue 66400 attribute.

The SpreadCurve 66404 package includes a SpreadCurve 66406 entity. The SpreadCurve 66406 entity has a cardinality of 0 . . . 1 66408 meaning that for each instance of the SpreadCurve 66404 package there may be one SpreadCurve 66406 entity. The SpreadCurve 66406 entity includes an Item 66410 subordinate entity.

The Item 66410 entity has a cardinality of 1 . . . n 66412 meaning that for each instance of the SpreadCurve 66406 entity there are one or more Item 66410 entities. The Item 66410 entity includes various attributes, namely a ValidityDate 66414, a Duration 66418 and a SpreadDoubleValue 66422. The ValidityDate 66414 attribute has a cardinality of 1 66416 meaning that for each instance of the Item 66410 entity there is one ValidityDate 66414 attribute. The Duration 66418 attribute has a cardinality of 1 66420 meaning that for each instance of the Item 66410 entity there is one Duration 66418 attribute. The SpreadDoubleValue 66422 attribute has a cardinality of 1 66424 meaning that for each instance of the Item 66410 entity there is one SpreadDoubleValue 66422 attribute.

The Property 66426 package includes a Property 66428 entity. The Property 66428 entity has a cardinality of 0 . . . n 66430 meaning that for each instance of the Property 66426 package there may be one or more Property 66428 entities. The Property 66428 entity includes various attributes, namely an ID 66432 and a Value 66436. The ID 66432 attribute has a cardinality of 1 66434 meaning that for each instance of the Property 66428 entity there is one ID 66432 attribute. The Value 66436 attribute has a cardinality of 1 66438 meaning that for each instance of the Property 66428 entity there is one Value 66436 attribute. The data types of the various packages, entities, and attributes are described with respect to FIGS. 63-1 through 63-135.

Figure 23:
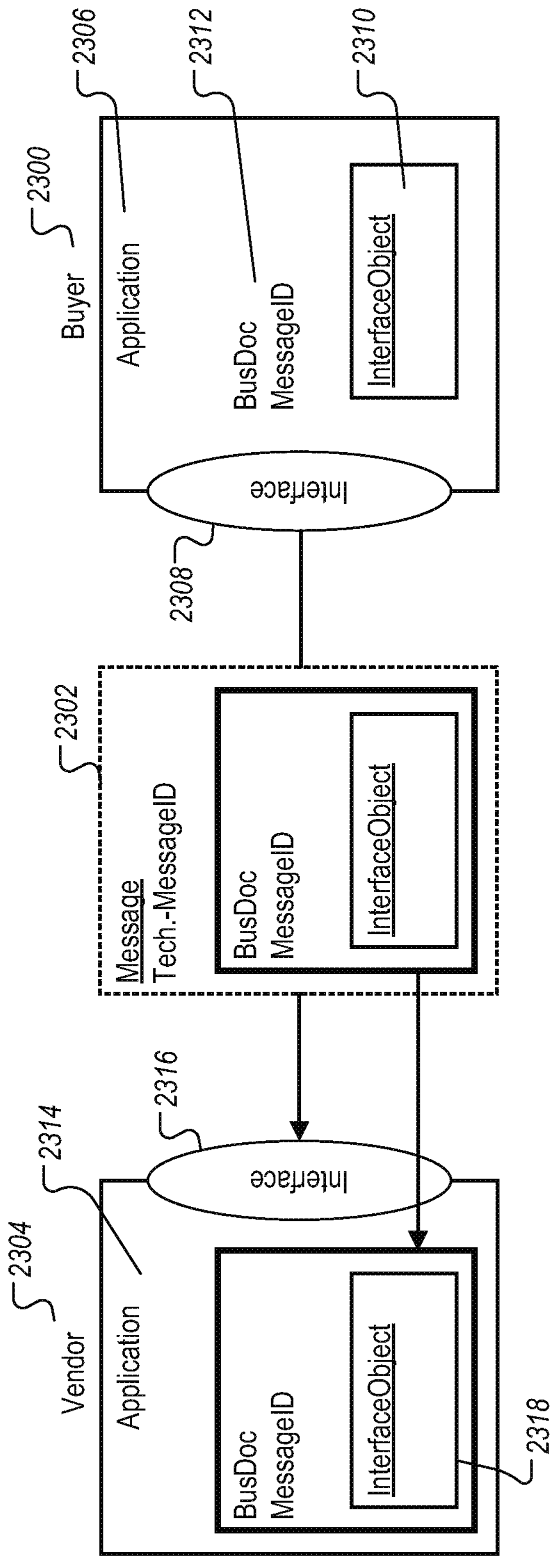
FIG. 23 depicts an example illustrating the transmittal of a business document in accordance with methods and systems consistent with the subject matter described herein.

FIGS. 67-1 through 67-23 show an example configuration of an Element Structure that includes a CrdtPrtfoModFSInDatCrdtDeriCrteReqMsg 67000 package. The CrdtPrtfoModFSInDatCrdtDeriCrteReqMsg 67000 package includes a CrdtPrtfoModFSInDatCrdtDeriCrteReqMsg 67002 entity. The CrdtPrtfoModFSInDatCrdtDeriCrteReqMsg 67000 package includes various packages, namely a MessageHeader 67004 and a CreditPortfolioModel 67010.

The MessageHeader 67004 package includes a MessageHeader 67006 entity. The MessageHeader 67006 entity has a cardinality of 1 67008 meaning that for each instance of the MessageHeader 67004 package there is one MessageHeader 67006 entity.

The CreditPortfolioModel 67010 package includes a CreditPortfolioModel 67012 entity. The CreditPortfolioModel 67010 package includes an InputData 67036 package. The CreditPortfolioModel 67012 entity has a cardinality of 1 67014 meaning that for each instance of the CreditPortfolioModel 67010 package there is one CreditPortfolioModel 67012 entity. The CreditPortfolioModel 67012 entity includes an ID 67016 attribute. The CreditPortfolioModel 67012 entity includes various subordinate entities, namely a CreditPortfolioManagementProcessControl 67020 and a CreditPortfolio 67028. The ID 67016 attribute has a cardinality of 1 67018 meaning that for each instance of the CreditPortfolioModel 67012 entity there is one ID 67016 attribute.

The CreditPortfolioManagementProcessControl 67020 entity has a cardinality of 1 67022 meaning that for each instance of the CreditPortfolioModel 67012 entity there is one CreditPortfolioManagementProcessControl 67020 entity. The CreditPortfolioManagementProcessControl 67020 entity includes a DataTransferID 67024 attribute. The DataTransferID 67024 attribute has a cardinality of 1 67026 meaning that for each instance of the CreditPortfolioManagementProcessControl 67020 entity there is one DataTransferID 67024 attribute.

The CreditPortfolio 67028 entity has a cardinality of 1 67030 meaning that for each instance of the CreditPortfolioModel 67012 entity there is one CreditPortfolio 67028 entity. The CreditPortfolio 67028 entity includes an ID 67032 attribute. The ID 67032 attribute has a cardinality of 1 67034 meaning that for each instance of the CreditPortfolio 67028 entity there is one ID 67032 attribute.

The InputData 67036 package includes an InputData 67038 entity. The InputData 67036 package includes a CreditDerivative 67040 package.

The CreditDerivative 67040 package includes a CreditDerivative 67042 entity. The CreditDerivative 67040 package includes various packages, namely a Counterparty 67084, a GuarantorParty 67094, a CreditExposureData 67106, a ReferenceAssetItem 67170, a FinancialCondition 67222, a ProbabilityOfDefault 67294, a Rating 67312, a SpreadCurve 67350 and a Property 67372.

The CreditDerivative 67042 entity includes various attributes, namely an ID 67044, a GuaranteeID 67048, a Description 67052, a CurrencyCode 67056, a ValidityPeriod 67060, a BasketName 67064, a FundedIndicator 67068, an OriginalNumberValue 67072, a BeginCountNumberValue 67076 and an EndCountNumberValue 67080. The ID 67044 attribute has a cardinality of 1 67046 meaning that for each instance of the CreditDerivative 67042 entity there is one ID 67044 attribute. The GuaranteeID 67048 attribute has a cardinality of 0 . . . 1 67050 meaning that for each instance of the CreditDerivative 67042 entity there may be one GuaranteeID 67048 attribute. The Description 67052 attribute has a cardinality of 0 . . . 1 67054 meaning that for each instance of the CreditDerivative 67042 entity there may be one Description 67052 attribute. The CurrencyCode 67056 attribute has a cardinality of 1 67058 meaning that for each instance of the CreditDerivative 67042 entity there is one CurrencyCode 67056 attribute. The ValidityPeriod 67060 attribute has a cardinality of 1 67062 meaning that for each instance of the CreditDerivative 67042 entity there is one ValidityPeriod 67060 attribute. The BasketName 67064 attribute has a cardinality of 0 . . . 1 67066 meaning that for each instance of the CreditDerivative 67042 entity there may be one BasketName 67064 attribute. The FundedIndicator 67068 attribute has a cardinality of 0 . . . 1 67070 meaning that for each instance of the CreditDerivative 67042 entity there may be one FundedIndicator 67068 attribute. The OriginalNumberValue 67072 attribute has a cardinality of 0 . . . 1 67074 meaning that for each instance of the CreditDerivative 67042 entity there may be one OriginalNumberValue 67072 attribute. The BeginCountNumberValue 67076 attribute has a cardinality of 0 . . . 1 67078 meaning that for each instance of the CreditDerivative 67042 entity there may be one BeginCountNumberValue 67076 attribute. The EndCountNumberValue 67080 attribute has a cardinality of 0 . . . 1 67082 meaning that for each instance of the CreditDerivative 67042 entity there may be one EndCountNumberValue 67080 attribute.

The Counterparty 67084 package includes a Counterparty 67086 entity. The Counterparty 67086 entity has a cardinality of 1 67088 meaning that for each instance of the Counterparty 67084 package there is one Counterparty 67086 entity. The Counterparty 67086 entity includes an InternalID 67090 attribute. The InternalID 67090 attribute has a cardinality of 1

67092 meaning that for each instance of the Counterparty 67086 entity there is one InternalID 67090 attribute.

The GuarantorParty 67094 package includes a GuarantorParty 67096 entity. The GuarantorParty 67096 entity has a cardinality of 0 . . . 1 67098 meaning that for each instance of the GuarantorParty 67094 package there may be one GuarantorParty 67096 entity. The GuarantorParty 67096 entity includes an InternalID 67100 attribute. The InternalID 67100 attribute has a cardinality of 0 . . . 1 67102 meaning that for each instance of the GuarantorParty 67096 entity there may be one InternalID 67100 attribute.

The CreditExposureData 67106 package includes a CreditExposureData 67108 entity. The CreditExposureData 67108 entity has a cardinality of 1 67110 meaning that for each instance of the CreditExposureData 67106 package there is one CreditExposureData 67108 entity. The CreditExposureData 67108 entity includes various attributes, namely a LossGivenDefaultDecimalValue 67112, a ShapeBetaDistributionDecimalValue 67116, an ExpectedLossGivenDefaultDecimalValue 67120, an ExposureAtDefaultAmount 67124, a CreditPortfolioManagementProductCode 67158, a ProtectionBuyerIndicator 67162 and a RestructuringCategoryCode 67166. The CreditExposureData 67108 entity includes various subordinate entities, namely a PriceAtHorizon 67128 and a CurrentPrice 67144. The LossGivenDefaultDecimalValue 67112 attribute has a cardinality of 0 . . . 1 67114 meaning that for each instance of the CreditExposureData 67108 entity there may be one LossGivenDefaultDecimalValue 67112 attribute. The ShapeBetaDistributionDecimalValue 67116 attribute has a cardinality of 0 . . . 1 67118 meaning that for each instance of the CreditExposureData 67108 entity there may be one ShapeBetaDistributionDecimalValue 67116 attribute. The ExpectedLossGivenDefaultDecimalValue 67120 attribute has a cardinality of 0 . . . 1 67122 meaning that for each instance of the CreditExposureData 67108 entity there may be one ExpectedLossGivenDefaultDecimalValue 67120 attribute. The ExposureAtDefaultAmount 67124 attribute has a cardinality of 0 . . . 1 67126 meaning that for each instance of the CreditExposureData 67108 entity there may be one ExposureAtDefaultAmount 67124 attribute. The CreditPortfolioManagementProductCode 67158 attribute has a cardinality of 1 67160 meaning that for each instance of the CreditExposureData 67108 entity there is one CreditPortfolioManagementProductCode 67158 attribute. The ProtectionBuyerIndicator 67162 attribute has a cardinality of 0 . . . 1 67164 meaning that for each instance of the CreditExposureData 67108 entity there may be one ProtectionBuyerIndicator 67162 attribute. The RestructuringCategoryCode 67166 attribute has a cardinality of 0 . . . 1 67168 meaning that for each instance of the CreditExposureData 67108 entity there may be one RestructuringCategoryCode 67166 attribute.

The PriceAtHorizon 67128 entity has a cardinality of 0 . . . 1 67130 meaning that for each instance of the CreditExposureData 67108 entity there may be one PriceAtHorizon 67128 entity. The PriceAtHorizon 67128 entity includes various attributes, namely a Duration 67132, an Amount 67136 and a DecimalValue 67140. The Duration 67132 attribute has a cardinality of 0 . . . 1 67134 meaning that for each instance of the PriceAtHorizon 67128 entity there may be one Duration 67132 attribute. The Amount 67136 attribute has a cardinality of 0 . . . 1 67138 meaning that for each instance of the PriceAtHorizon 67128 entity there may be one Amount 67136 attribute. The DecimalValue 67140 attribute has a cardinality of 0 . . . 1 67142 meaning that for each instance of the PriceAtHorizon 67128 entity there may be one DecimalValue 67140 attribute.

The CurrentPrice 67144 entity includes various attributes, namely a Duration 67146, an Amount 67150 and a DecimalValue 67154. The Duration 67146 attribute has a cardinality of 0 . . . 1 67148 meaning that for each instance of the CurrentPrice 67144 entity there may be one Duration 67146 attribute. The Amount 67150 attribute has a cardinality of 0 . . . 1 67152 meaning that for each instance of the CurrentPrice 67144 entity there may be one Amount 67150 attribute. The DecimalValue 67154 attribute has a cardinality of 0 . . . 1 67156 meaning that for each instance of the CurrentPrice 67144 entity there may be one DecimalValue 67154 attribute.

The ReferenceAssetItem 67170 package includes a ReferenceAssetItem 67172 entity. The ReferenceAssetItem 67172 entity has a cardinality of 0 . . . 1 67174 meaning that for each instance of the ReferenceAssetItem 67170 package there may be one ReferenceAssetItem 67172 entity. The ReferenceAssetItem 67172 entity includes various attributes, namely an ID 67176 and a GuaranteeID 67180. The ReferenceAssetItem 67172 entity includes various subordinate entities, namely a Counterparty 67184, a GuarantorParty 67194 and a CreditExposureData 67202. The ID 67176 attribute has a cardinality of 1 67178 meaning that for each instance of the ReferenceAssetItem 67172 entity there is one ID 67176 attribute. The GuaranteeID 67180 attribute has a cardinality of 1 67182 meaning that for each instance of the ReferenceAssetItem 67172 entity there is one GuaranteeID 67180 attribute.

The Counterparty 67184 entity has a cardinality of 1 67186 meaning that for each instance of the ReferenceAssetItem 67172 entity there is one Counterparty 67184 entity. The Counterparty 67184 entity includes an InternalID 67188 attribute. The InternalID 67188 attribute has a cardinality of 1 67190 meaning that for each instance of the Counterparty 67184 entity there is one InternalID 67188 attribute.

The GuarantorParty 67194 entity has a cardinality of 0 . . . 1 67196 meaning that for each instance of the ReferenceAssetItem 67172 entity there may be one GuarantorParty 67194 entity. The GuarantorParty 67194 entity includes an InternalID 67198 attribute. The InternalID 67198 attribute has a cardinality of 0 . . . 1 67200 meaning that for each instance of the GuarantorParty 67194 entity there may be one InternalID 67198 attribute.

The CreditExposureData 67202 entity has a cardinality of 1 67204 meaning that for each instance of the ReferenceAssetItem 67172 entity there is one CreditExposureData 67202 entity. The CreditExposureData 67202 entity includes various attributes, namely a LossGivenDefaultDecimalValue 67206, a ShapeBetaDistributionDecimalValue 67210, an ExpectedLossGivenDefaultDecimalValue 67214 and a SeniorityCode 67218. The LossGivenDefaultDecimalValue 67206 attribute has a cardinality of 0 . . . 1 67208 meaning that for each instance of the CreditExposureData 67202 entity there may be one LossGivenDefaultDecimalValue 67206 attribute. The ShapeBetaDistributionDecimalValue 67210 attribute has a cardinality of 0 . . . 1 67212 meaning that for each instance of the CreditExposureData 67202 entity there may be one ShapeBetaDistributionDecimalValue 67210 attribute. The ExpectedLossGivenDefaultDecimalValue 67214 attribute has a cardinality of 0 . . . 1 67216 meaning that for each instance of the CreditExposureData 67202 entity there may be one ExpectedLossGivenDefaultDecimalValue 67214 attribute. The SeniorityCode 67218 attribute has a cardinality of 0 . . . 1 67220 meaning that for each instance of the CreditExposureData 67202 entity there may be one SeniorityCode 67218 attribute.

The FinancialCondition 67222 package includes a FinancialCondition 67224 entity. The FinancialCondition 67224 entity includes various subordinate entities, namely an InterestCondition 67226, a FeeCondition 67258 and a PaymentCondition 67276. The InterestCondition 67226 entity includes a BankContractFinancialConditionSpecification 67228 subordinate entity. The BankContractFinancialConditionSpecification 67228 entity includes various subordinate entities, namely a Calculation 67232, an AmountSpecification 67238 and an InterestSpecification 67244. The Calculation 67232 entity includes a RecurrenceSpecification 67234 subordinate entity. The InterestSpecification 67244 entity includes a VariableInterest 67248 subordinate entity. The FeeCondition 67258 entity includes a BankContractFinancialConditionSpecification 67260 subordinate entity. The BankContractFinancialConditionSpecification 67260 entity includes various subordinate entities, namely a Calculation 67264 and an AmountSpecification 67270. The Calculation 67264 entity includes a RecurrenceSpecification 67266 subordinate entity. The PaymentCondition 67276 entity includes a BankContractFinancialConditionSpecification 67278 subordinate entity. The BankContractFinancialConditionSpecification 67278 entity includes various subordinate entities, namely a Calculation 67282 and an AmountSpecification 67288. The Calculation 67282 entity includes a RecurrenceSpecification 67284 subordinate entity.

The ProbabilityOfDefault 67294 package includes a ProbabilityOfDefault 67296 entity. The ProbabilityOfDefault 67296 entity has a cardinality of 0 . . . n 67298 meaning that for each instance of the ProbabilityOfDefault 67294 package there may be one or more ProbabilityOfDefault 67296 entities. The ProbabilityOfDefault 67296 entity includes various attributes, namely a ValidityDatePeriod 67300, a Code 67304 and a DoubleValue 67308. The ValidityDatePeriod 67300 attribute has a cardinality of 1 67302 meaning that for each instance of the ProbabilityOfDefault 67296 entity there is one ValidityDatePeriod 67300 attribute. The Code 67304 attribute has a cardinality of 1 67306 meaning that for each instance of the ProbabilityOfDefault 67296 entity there is one Code 67304 attribute. The DoubleValue 67308 attribute has a cardinality of 1 67310 meaning that for each instance of the ProbabilityOfDefault 67296 entity there is one DoubleValue 67308 attribute.

The Rating 67312 package includes a Rating 67314 entity. The Rating 67314 entity has a cardinality of 0 . . . n 67316 meaning that for each instance of the Rating 67312 package there may be one or more Rating 67314 entities. The Rating 67314 entity includes various attributes, namely a ModelID 67318, a ValidityDatePeriod 67322, a Code 67326, a MasterCreditRatingCode 67330, an InternalRatingIndicator 67334, a MaturityDuration 67338, a Date 67342 and a TendencyCode 67346. The ModelID 67318 attribute has a cardinality of 1 67320 meaning that for each instance of the Rating 67314 entity there is one ModelID 67318 attribute. The ValidityDatePeriod 67322 attribute has a cardinality of 1 67324 meaning that for each instance of the Rating 67314 entity there is one ValidityDatePeriod 67322 attribute. The Code 67326 attribute has a cardinality of 1 67328 meaning that for each instance of the Rating 67314 entity there is one Code 67326 attribute. The MasterCreditRatingCode 67330 attribute has a cardinality of 0 . . . 1 67332 meaning that for each instance of the Rating 67314 entity there may be one MasterCreditRatingCode 67330 attribute. The InternalRatingIndicator 67334 attribute has a cardinality of 0 . . . 1 67336 meaning that for each instance of the Rating 67314 entity there may be one InternalRatingIndicator 67334 attribute.

The MaturityDuration 67338 attribute has a cardinality of 0 . . . 1 67340 meaning that for each instance of the Rating 67314 entity there may be one MaturityDuration 67338 attribute. The Date 67342 attribute has a cardinality of 1 67344 meaning that for each instance of the Rating 67314 entity there is one Date 67342 attribute. The TendencyCode 67346 attribute has a cardinality of 0 . . . 1 67348 meaning that for each instance of the Rating 67314 entity there may be one TendencyCode 67346 attribute.

The SpreadCurve 67350 package includes a SpreadCurve 67352 entity. The SpreadCurve 67352 entity has a cardinality of 0 . . . 1 67354 meaning that for each instance of the SpreadCurve 67350 package there may be one SpreadCurve 67352 entity. The SpreadCurve 67352 entity includes an Item 67356 subordinate entity.

The Item 67356 entity has a cardinality of 1 . . . n 67358 meaning that for each instance of the SpreadCurve 67352 entity there are one or more Item 67356 entities. The Item 67356 entity includes various attributes, namely a ValidityDate 67360, a Duration 67364 and a SpreadDoubleValue 67368. The ValidityDate 67360 attribute has a cardinality of 1 67362 meaning that for each instance of the Item 67356 entity there is one ValidityDate 67360 attribute. The Duration 67364 attribute has a cardinality of 1 67366 meaning that for each instance of the Item 67356 entity there is one Duration 67364 attribute. The SpreadDoubleValue 67368 attribute has a cardinality of 1 67370 meaning that for each instance of the Item 67356 entity there is one SpreadDoubleValue 67368 attribute.

The Property 67372 package includes a Property 67374 entity. The Property 67374 entity has a cardinality of 0 . . . n 67376 meaning that for each instance of the Property 67372 package there may be one or more Property 67374 entities. The Property 67374 entity includes various attributes, namely an ID 67378 and a Value 67382. The ID 67378 attribute has a cardinality of 1 67380 meaning that for each instance of the Property 67374 entity there is one ID 67378 attribute. The Value 67382 attribute has a cardinality of 1 67384 meaning that for each instance of the Property 67374 entity there is one Value 67382 attribute. The data types of the various packages, entities, and attributes are described with respect to FIGS. 63-1 through 63-135.

FIGS. 68-1 through 68-5 show an example configuration of an Element Structure that includes a CrdtPrtfoModFSInDatPrtfoAnlysDatCrteReqMsg 68000 package. The CrdtPrtfoModFSInDatPrtfoAnlysDatCrteReqMsg 68000 package includes a CrdtPrtfoModFSInDatPrtfoAnlysDatCrteReqMsg 68002 entity. The CrdtPrtfoModFSInDatPrtfoAnlysDatCrteReqMsg 68000 package includes various packages, namely a MessageHeader 68004 and a CreditPortfolioModel 68010.

The MessageHeader 68004 package includes a MessageHeader 68006 entity. The MessageHeader 68006 entity has a cardinality of 1 68008 meaning that for each instance of the MessageHeader 68004 package there is one MessageHeader 68006 entity.

The CreditPortfolioModel 68010 package includes a CreditPortfolioModel 68012 entity. The CreditPortfolioModel 68010 package includes an InputData 68032 package. The CreditPortfolioModel 68012 entity has a cardinality of 1 68014 meaning that for each instance of the CreditPortfolioModel 68010 package there is one CreditPortfolioModel 68012 entity. The CreditPortfolioModel 68012 entity includes an ID 68016 attribute. The CreditPortfolioModel 68012 entity includes various subordinate entities, namely a CreditPortfolioManagementProcessControl 68020 and a CreditPortfolio 68024. The ID 68016 attribute has a cardinality of 1 68018 meaning that for each instance of the CreditPortfolioModel 68012 entity there is one ID 68016 attribute.

The CreditPortfolio 68024 entity has a cardinality of 1 68026 meaning that for each instance of the CreditPortfolioModel 68012 entity there is one CreditPortfolio 68024 entity. The CreditPortfolio 68024 entity includes an ID 68028 attribute. The ID 68028 attribute has a cardinality of 1 68030 meaning that for each instance of the CreditPortfolio 68024 entity there is one ID 68028 attribute.

The InputData 68032 package includes an InputData 68034 entity. The InputData 68032 package includes a PortfolioAnalysisData 68038 package. The InputData 68034 entity has a cardinality of 1 68036 meaning that for each instance of the InputData 68032 package there is one InputData 68034 entity.

The PortfolioAnalysisData 68038 package includes a PortfolioAnalysisData 68040 entity. The PortfolioAnalysisData 68038 package includes various packages, namely a FinancialInstrumentExposure 68056 and a Property 68082. The PortfolioAnalysisData 68040 entity has a cardinality of 1 68042 meaning that for each instance of the PortfolioAnalysisData 68038 package there is one PortfolioAnalysisData 68040 entity. The PortfolioAnalysisData 68040 entity includes an ID 68044 attribute. The PortfolioAnalysisData 68040 entity includes a CreditPortfolioAssignment 68050 subordinate entity. The ID 68044 attribute has a cardinality of 1 68046 meaning that for each instance of the PortfolioAnalysisData 68040 entity there is one ID 68044 attribute.

The CreditPortfolioAssignment 68050 entity has a cardinality of 1 68052 meaning that for each instance of the PortfolioAnalysisData 68040 entity there is one CreditPortfolioAssignment 68050 entity.

The FinancialInstrumentExposure 68056 package includes a FinancialInstrumentExposure 68058 entity. The FinancialInstrumentExposure 68058 entity has a cardinality of 1 . . . n 68060 meaning that for each instance of the FinancialInstrumentExposure 68056 package there are one or more FinancialInstrumentExposure 68058 entities. The FinancialInstrumentExposure 68058 entity includes various attributes, namely an ID 68062, a GuaranteeID 68066, a Description 68070, an Amount 68074 and a ShareNumberValue 68078. The ID 68062 attribute has a cardinality of 1 68064 meaning that for each instance of the FinancialInstrumentExposure 68058 entity there is one ID 68062 attribute. The GuaranteeID 68066 attribute has a cardinality of 0 . . . 1 68068 meaning that for each instance of the FinancialInstrumentExposure 68058 entity there may be one GuaranteeID 68066 attribute. The Description 68070 attribute has a cardinality of 0 . . . 1 68072 meaning that for each instance of the FinancialInstrumentExposure 68058 entity there may be one Description 68070 attribute. The Amount 68074 attribute has a cardinality of 1 68076 meaning that for each instance of the FinancialInstrumentExposure 68058 entity there is one Amount 68074 attribute. The ShareNumberValue 68078 attribute has a cardinality of 1 68080 meaning that for each instance of the FinancialInstrumentExposure 68058 entity there is one ShareNumberValue 68078 attribute.

The Property 68082 package includes a Property 68084 entity. The Property 68084 entity has a cardinality of 0 . . . n 68086 meaning that for each instance of the Property 68082 package there may be one or more Property 68084 entities. The Property 68084 entity includes various attributes, namely an ID 68088 and a Value 68092. The ID 68088 attribute has a cardinality of 1 68090 meaning that for each instance of the Property 68084 entity there is one ID 68088 attribute. The Value 68092 attribute has a cardinality of 1 68094 meaning that for each instance of the Property 68084 entity there is one Value 68092 attribute. The data types of the various packages, entities, and attributes are described with respect to FIGS. 63-1 through 63-135.

FIGS. 69-1 through 69-3 show an example configuration of an Element Structure that includes a CrdtPrtfoModFSInDatYldCrvCrteReqMsg 69000 package. The CrdtPrtfoModFSInDatYldCrvCrteReqMsg 69000 package includes a CrdtPrtfoModFSInDatYldCrvCrteReqMsg 69002 entity. The CrdtPrtfoModFSInDatYldCrvCrteReqMsg 69000 package includes various packages, namely a MessageHeader 69004 and a CreditPortfolioModel 69010.

The MessageHeader 69004 package includes a MessageHeader 69006 entity. The MessageHeader 69006 entity has a cardinality of 1 69008 meaning that for each instance of the MessageHeader 69004 package there is one MessageHeader 69006 entity.

The CreditPortfolioModel 69010 package includes a CreditPortfolioModel 69012 entity. The CreditPortfolioModel 69010 package includes an InputData 69036 package. The CreditPortfolioModel 69012 entity has a cardinality of 1 69014 meaning that for each instance of the CreditPortfolioModel 69010 package there is one CreditPortfolioModel 69012 entity. The CreditPortfolioModel 69012 entity includes an ID 69016 attribute. The CreditPortfolioModel 69012 entity includes various subordinate entities, namely a CreditPortfolioManagementProcessControl 69020 and a CreditPortfolio 69028. The ID 69016 attribute has a cardinality of 1 69018 meaning that for each instance of the CreditPortfolioModel 69012 entity there is one ID 69016 attribute.

The CreditPortfolioManagementProcessControl 69020 entity has a cardinality of 1 69022 meaning that for each instance of the CreditPortfolioModel 69012 entity there is one CreditPortfolioManagementProcessControl 69020 entity. The CreditPortfolioManagementProcessControl 69020 entity includes a DataTransferID 69024 attribute. The DataTransferID 69024 attribute has a cardinality of 1 69026 meaning that for each instance of the CreditPortfolioManagementProcessControl 69020 entity there is one DataTransferID 69024 attribute.

The CreditPortfolio 69028 entity has a cardinality of 1 69030 meaning that for each instance of the CreditPortfolioModel 69012 entity there is one CreditPortfolio 69028 entity. The CreditPortfolio 69028 entity includes an ID 69032 attribute. The ID 69032 attribute has a cardinality of 1 69034 meaning that for each instance of the CreditPortfolio 69028 entity there is one ID 69032 attribute.

The InputData 69036 package includes an InputData 69038 entity. The InputData 69036 package includes a YieldCurve 69042 package. The InputData 69038 entity has a cardinality of 1 69040 meaning that for each instance of the InputData 69036 package there is one InputData 69038 entity.

The YieldCurve 69042 package includes a YieldCurve 69044 entity. The YieldCurve 69042 package includes an Item 69058 package. The YieldCurve 69044 entity has a cardinality of 1 69046 meaning that for each instance of the YieldCurve 69042 package there is one YieldCurve 69044 entity. The YieldCurve 69044 entity includes various attributes, namely an ID 69048 and a VailidityDate 69054. The ID 69048 attribute has a cardinality of 1 69050 meaning that for each instance of the YieldCurve 69044 entity there is one ID 69048 attribute. The VailidityDate 69054 attribute has a cardinality of 1 69056 meaning that for each instance of the YieldCurve 69044 entity there is one VailidityDate 69054 attribute.

The Item 69058 package includes an Item 69060 entity. The Item 69060 entity has a cardinality of 1 . . . n 69062 meaning that for each instance of the Item 69058 package there are one or more Item 69060 entities. The Item 69060 entity includes various attributes, namely a TenorDuration 69064 and an InterestRateDoubleValue 69068. The TenorDuration 69064 attribute has a cardinality of 1 69066 meaning that for each instance of the Item 69060 entity there is one TenorDuration 69064 attribute. The InterestRateDoubleValue 69068 attribute has a cardinality of 1 69070 meaning that for each instance of the Item 69060 entity there is one InterestRateDoubleValue 69068 attribute. The data types of the various packages, entities, and attributes are described with respect to FIGS. 63-1 through 63-135.

FIGS. 70-1 through 70-3 show an example configuration of an Element Structure that includes a CrdtPrtfoModFSInDatExchRateCrteReqMsg 70000 package. The CrdtPrtfoModFSInDatExchRateCrteReqMsg 70000 package includes a CreditPortfolioModelFSInputDataExchangeRateRequestMessage 70002 entity. The CrdtPrtfoModFSInDatExchRateCrteReqMsg 70000 package includes various packages, namely a MessageHeader 70004 and a CreditPortfolioModel 70010.

The MessageHeader 70004 package includes a MessageHeader 70006 entity. The MessageHeader 70006 entity has a cardinality of 1 70008 meaning that for each instance of the MessageHeader 70004 package there is one MessageHeader 70006 entity.

The CreditPortfolioModel 70010 package includes a CreditPortfolioModel 70012 entity. The CreditPortfolioModel 70010 package includes an InputData 70036 package. The CreditPortfolioModel 70012 entity has a cardinality of 1 70014 meaning that for each instance of the CreditPortfolioModel 70010 package there is one CreditPortfolioModel 70012 entity. The CreditPortfolioModel 70012 entity includes an ID 70016 attribute. The CreditPortfolioModel 70012 entity includes various subordinate entities, namely a CreditPortfolioManagementProcessControl 70020 and a CreditPortfolio 70028. The ID 70016 attribute has a cardinality of 1 70018 meaning that for each instance of the CreditPortfolioModel 70012 entity there is one ID 70016 attribute.

The CreditPortfolioManagementProcessControl 70020 entity has a cardinality of 1 70022 meaning that for each instance of the CreditPortfolioModel 70012 entity there is one CreditPortfolioManagementProcessControl 70020 entity. The CreditPortfolioManagementProcessControl 70020 entity includes a DataTransferID 70024 attribute. The DataTransferID 70024 attribute has a cardinality of 1 70026 meaning that for each instance of the CreditPortfolioManagementProcessControl 70020 entity there is one DataTransferID 70024 attribute.

The CreditPortfolio 70028 entity has a cardinality of 1 70030 meaning that for each instance of the CreditPortfolioModel 70012 entity there is one CreditPortfolio 70028 entity. The CreditPortfolio 70028 entity includes an ID 70032 attribute. The ID 70032 attribute has a cardinality of 1 70034 meaning that for each instance of the CreditPortfolio 70028 entity there is one ID 70032 attribute.

The InputData 70036 package includes an InputData 70038 entity. The InputData 70036 package includes an ExchangeRateItem 70042 package.

The InputData 70038 entity has a cardinality of 1 70040 meaning that for each instance of the InputData 70036 package there is one InputData 70038 entity.

The ExchangeRateItem 70042 package includes an ExchangeRateItem 70044 entity. The ExchangeRateItem 70044 entity has a cardinality of 1 . . . n 70046 meaning that for each instance of the ExchangeRateItem 70042 package there are one or more ExchangeRateItem 70044 entities. The ExchangeRateItem 70044 entity includes various attributes, namely an ID 70048, a ValidityDate 70052 and an ExchangeRate 70056. The ID 70048 attribute has a cardinality of 1 70050 meaning that for each instance of the ExchangeRateItem 70044 entity there is one ID 70048 attribute. The ValidityDate 70052 attribute has a cardinality of 1 70054 meaning that for each instance of the ExchangeRateItem 70044 entity there is one ValidityDate 70052 attribute. The ExchangeRate 70056 attribute has a cardinality of 1 70058 meaning that for each instance of the ExchangeRateItem 70044 entity there is one ExchangeRate 70056 attribute. The data types of the various packages, entities, and attributes are described with respect to FIGS. 63-1 through 63-135.

FIGS. 71-1 through 71-4 show an example configuration of an Element Structure that includes a CrdtPrtfoModFSInDatPDClbrtMtxCrteReqMsg 71000 package. The CrdtPrtfoModFSInDatPDClbrtMtxCrteReqMsg 71000 package includes a CrdtPrtfoModFSInDatPDClbrtMtxCrteReqMsg 71002 entity. The CrdtPrtfoModFSInDatPDClbrtMtxCrteReqMsg 71000 package includes various packages, namely a MessageHeader 71004 and a CreditPortfolioModel 71010.

The MessageHeader 71004 package includes a MessageHeader 71006 entity. The MessageHeader 71006 entity has a cardinality of 1 71008 meaning that for each instance of the MessageHeader 71004 package there is one MessageHeader 71006 entity.

The CreditPortfolioModel 71010 package includes a CreditPortfolioModel 71012 entity. The CreditPortfolioModel 71010 package includes an InputData 71036 package. The CreditPortfolioModel 71012 entity has a cardinality of 1 71014 meaning that for each instance of the CreditPortfolioModel 71010 package there is one CreditPortfolioModel 71012 entity. The CreditPortfolioModel 71012 entity includes an ID 71016 attribute. The CreditPortfolioModel 71012 entity includes various subordinate entities, namely a CreditPortfolioManagementProcessControl 71020 and a CreditPortfolio 71028. The ID 71016 attribute has a cardinality of 1 71018 meaning that for each instance of the CreditPortfolioModel 71012 entity there is one ID 71016 attribute.

The CreditPortfolioManagementProcessControl 71020 entity has a cardinality of 1 71022 meaning that for each instance of the CreditPortfolioModel 71012 entity there is one CreditPortfolioManagementProcessControl 71020 entity. The CreditPortfolioManagementProcessControl 71020 entity includes a DataTransferID 71024 attribute. The DataTransferID 71024 attribute has a cardinality of 1 71026 meaning that for each instance of the CreditPortfolioManagementProcessControl 71020 entity there is one DataTransferID 71024 attribute.

The CreditPortfolio 71028 entity has a cardinality of 1 71030 meaning that for each instance of the CreditPortfolioModel 71012 entity there is one CreditPortfolio 71028 entity. The CreditPortfolio 71028 entity includes an ID 71032 attribute. The ID 71032 attribute has a cardinality of 1 71034 meaning that for each instance of the CreditPortfolio 71028 entity there is one ID 71032 attribute.

The InputData 71036 package includes an InputData 71038 entity. The InputData 71036 package includes a ProbabilityOfDefaultCalibrationMatrix 71042 package. The InputData 71038 entity has a cardinality of 1 71040 meaning that for each instance of the InputData 71036 package there is one InputData 71038 entity.

The ProbabilityOfDefaultCalibrationMatrix 71042 package includes a ProbabilityOfDefaultCalibrationMatrix 71044 entity. The ProbabilityOfDefaultCalibrationMatrix 71042 package includes an Item 71060 package. The ProbabilityOfDefaultCalibrationMatrix 71044 entity has a cardinality of 1 71046 meaning that for each instance of the ProbabilityOfDefaultCalibrationMatrix 71042 package there is one ProbabilityOfDefaultCalibrationMatrix 71044 entity. The ProbabilityOfDefaultCalibrationMatrix 71044 entity includes various attributes, namely an ID 71048, a RatingModel ID 71052 and a ValidityDatePeriod 71056. The ID 71048 attribute has a cardinality of 1 71050 meaning that for each instance of the ProbabilityOfDefaultCalibrationMatrix 71044 entity there is one ID 71048 attribute. The RatingModelID 71052 attribute has a cardinality of 1 71054 meaning that for each instance of the ProbabilityOfDefaultCalibrationMatrix 71044 entity there is one RatingModelID 71052 attribute. The ValidityDatePeriod 71056 attribute has a cardinality of 1 71058 meaning that for each instance of the ProbabilityOfDefaultCalibrationMatrix 71044 entity there is one ValidityDatePeriod 71056 attribute.

The Item 71060 package includes an Item 71062 entity. The Item 71062 entity has a cardinality of 1 . . . n 71064 meaning that for each instance of the Item 71060 package there are one or more Item 71062 entities. The Item 71062 entity includes a CreditRatingCode 71066 attribute. The Item 71062 entity includes a ProbabilityOfDefault 71070 subordinate entity. The CreditRatingCode 71066 attribute has a cardinality of 1 71068 meaning that for each instance of the Item 71062 entity there is one CreditRatingCode 71066 attribute.

The ProbabilityOfDefault 71070 entity has a cardinality of 1 . . . n 71072 meaning that for each instance of the Item 71062 entity there is one or more ProbabilityOfDefault 71070 entities. The ProbabilityOfDefault 71070 entity includes various attributes, namely a TermDuration 71074 and a DoubleValue 71078. The TermDuration 71074 attribute has a cardinality of 1 71076 meaning that for each instance of the ProbabilityOfDefault 71070 entity there is one TermDuration 71074 attribute. The DoubleValue 71078 attribute has a cardinality of 1 71080 meaning that for each instance of the ProbabilityOfDefault 71070 entity there is one DoubleValue 71078 attribute. The data types of the various packages, entities, and attributes are described with respect to FIGS. 63-1 through 63-135.

FIGS. 72-1 through 72-4 show an example configuration of an Element Structure that includes a CrdtPrtfoModFSInDatCrdtSprdCrteReqMsg 72000 package. The CrdtPrtfoModFSInDatCrdtSprdCrteReqMsg 72000 package includes a CrdtPrtfoModFSInDatCrdtSprdCrteReqMsg 72002 entity. The CrdtPrtfoModFSInDatCrdtSprdCrteReqMsg 72000 package includes various packages, namely a MessageHeader 72004 and a CreditPortfolioModel 72010.

The MessageHeader 72004 package includes a MessageHeader 72006 entity. The MessageHeader 72006 entity has a cardinality of 1 72008 meaning that for each instance of the MessageHeader 72004 package there is one MessageHeader 72006 entity.

The CreditPortfolioModel 72010 package includes a CreditPortfolioModel 72012 entity. The CreditPortfolioModel 72010 package includes an InputData 72034 package. The CreditPortfolioModel 72012 entity has a cardinality of 1 72014 meaning that for each instance of the CreditPortfolioModel 72010 package there is one CreditPortfolioModel 72012 entity. The CreditPortfolioModel 72012 entity includes an ID 72016 attribute. The CreditPortfolioModel 72012 entity includes various subordinate entities, namely a CreditPortfolioManagementProcessControl 72020 and a CreditPortfolio 72026. The ID 72016 attribute has a cardinality of 1 72018 meaning that for each instance of the CreditPortfolioModel 72012 entity there is one ID 72016 attribute.

The CreditPortfolioManagementProcessControl 72020 entity includes a DataTransferID 72022 attribute. The DataTransferID 72022 attribute has a cardinality of 1 72024 meaning that for each instance of the CreditPortfolioManagementProcessControl 72020 entity there is one DataTransferID 72022 attribute.

The CreditPortfolio 72026 entity has a cardinality of 1 72028 meaning that for each instance of the CreditPortfolioModel 72012 entity there is one CreditPortfolio 72026 entity. The CreditPortfolio 72026 entity includes an ID 72030 attribute. The ID 72030 attribute has a cardinality of 1 72032 meaning that for each instance of the CreditPortfolio 72026 entity there is one ID 72030 attribute.

The InputData 72034 package includes an InputData 72036 entity. The InputData 72034 package includes a CreditSpreadMatrix 72040 package. The InputData 72036 entity has a cardinality of 1 72038 meaning that for each instance of the InputData 72034 package there is one InputData 72036 entity.

The CreditSpreadMatrix 72040 package includes a CreditSpreadMatrix 72042 entity. The CreditSpreadMatrix 72040 package includes an Item 72062 package. The CreditSpreadMatrix 72042 entity has a cardinality of 1 72044 meaning that for each instance of the CreditSpreadMatrix 72040 package there is one CreditSpreadMatrix 72042 entity. The CreditSpreadMatrix 72042 entity includes various attributes, namely an ID 72046, a RatingModelID 72050 and a ValidityDatePeriod 72054. The CreditSpreadMatrix 72042 entity includes an Item 72058 subordinate entity. The ID 72046 attribute has a cardinality of 1 72048 meaning that for each instance of the CreditSpreadMatrix 72042 entity there is one ID 72046 attribute. The RatingModelID 72050 attribute has a cardinality of 1 72052 meaning that for each instance of the CreditSpreadMatrix 72042 entity there is one RatingModelID 72050 attribute. The ValidityDatePeriod 72054 attribute has a cardinality of 1 72056 meaning that for each instance of the CreditSpreadMatrix 72042 entity there is one ValidityDatePeriod 72054 attribute.

The Item 72058 entity has a cardinality of 1 . . . n 72060 meaning that for each instance of the CreditSpreadMatrix 72042 entity there are one or more Item 72058 entities. The Item 72062 package includes various entities, namely a CreditRatingCode 72064, a YieldCurveModelID 72068 and a CreditSpread 72070.

The CreditRatingCode 72064 entity has a cardinality of 1 72066 meaning that for each instance of the Item 72062 package there is one CreditRatingCode 72064 entity. The CreditSpread 72070 entity has a cardinality of 1 . . . n 72072 meaning that for each instance of the Item 72062 package there are one or more CreditSpread 72070 entities. The CreditSpread 72070 entity includes various attributes, namely a TermDuration 72074 and a DecimalValue 72078. The TermDuration 72074 attribute has a cardinality of 1 72076 meaning that for each instance of the CreditSpread 72070 entity there is one TermDuration 72074 attribute. The DecimalValue 72078 attribute has a cardinality of 1 72080 meaning that for each instance of the CreditSpread 72070 entity there is one DecimalValue 72078 attribute. The data types of the various packages, entities, and attributes are described with respect to FIGS. 63-1 through 63-135.

FIGS. 73-1 through 73-3 show an example configuration of an Element Structure that includes a CrdtPrtfoModFSInDatRatgMtxCrteReqMsg 73000 package. The CrdtPrtfoModFSInDatRatgMtxCrteReqMsg 73000 package includes a CrdtPrtfoModFSInDatRatgMtxCrteReqMsg 73002 entity.

The CrdtPrtfoModFSInDatRatgMtxCrteReqMsg 73000 package includes various packages, namely a MessageHeader 73004 and a CreditPortfolioModel 73010.

The MessageHeader 73004 package includes a MessageHeader 73006 entity. The MessageHeader 73006 entity has a cardinality of 1 73008 meaning that for each instance of the MessageHeader 73004 package there is one MessageHeader 73006 entity.

The CreditPortfolioModel 73010 package includes a CreditPortfolioModel 73012 entity. The CreditPortfolioModel 73010 package includes an InputData 73036 package. The CreditPortfolioModel 73012 entity has a cardinality of 1 73014 meaning that for each instance of the CreditPortfolioModel 73010 package there is one CreditPortfolioModel 73012 entity. The CreditPortfolioModel 73012 entity includes an ID 73016 attribute. The CreditPortfolioModel 73012 entity includes various subordinate entities, namely a CreditPortfolioManagementProcessControl 73020 and a CreditPortfolio 73028. The ID 73016 attribute has a cardinality of 1 73018 meaning that for each instance of the CreditPortfolioModel 73012 entity there is one ID 73016 attribute.

The CreditPortfolioManagementProcessControl 73020 entity has a cardinality of 1 73022 meaning that for each instance of the CreditPortfolioModel 73012 entity there is one CreditPortfolioManagementProcessControl 73020 entity. The CreditPortfolioManagementProcessControl 73020 entity includes a DataTransferID 73024 attribute. The DataTransferID 73024 attribute has a cardinality of 1 73026 meaning that for each instance of the CreditPortfolioManagementProcessControl 73020 entity there is one DataTransferID 73024 attribute.

The CreditPortfolio 73028 entity has a cardinality of 1 73030 meaning that for each instance of the CreditPortfolioModel 73012 entity there is one CreditPortfolio 73028 entity. The CreditPortfolio 73028 entity includes an ID 73032 attribute. The ID 73032 attribute has a cardinality of 1 73034 meaning that for each instance of the CreditPortfolio 73028 entity there is one ID 73032 attribute. The InputData 73036 package includes an InputData 73038 entity. The InputData 73036 package includes a RatingTransitionMatrix 73040 package.

The RatingTransitionMatrix 73040 package includes a RatingTransitionMatrix 73042 entity. The RatingTransitionMatrix 73040 package includes an Item 73058 package. The RatingTransitionMatrix 73042 entity has a cardinality of 1 73044 meaning that for each instance of the RatingTransitionMatrix 73040 package there is one RatingTransitionMatrix 73042 entity. The RatingTransitionMatrix 73042 entity includes various attributes, namely an ID 73046, a RatingModelID 73050 and a ValidityDatePeriod 73054. The ID 73046 attribute has a cardinality of 1 73048 meaning that for each instance of the RatingTransitionMatrix 73042 entity there is one ID 73046 attribute. The RatingModelID 73050 attribute has a cardinality of 1 73052 meaning that for each instance of the RatingTransitionMatrix 73042 entity there is one RatingModelID 73050 attribute. The ValidityDatePeriod 73054 attribute has a cardinality of 1 73056 meaning that for each instance of the RatingTransitionMatrix 73042 entity there is one ValidityDatePeriod 73054 attribute.

The Item 73058 package includes an Item 73060 entity. The Item 73060 entity has a cardinality of 1 . . . n 73062 meaning that for each instance of the Item 73058 package there are one or more Item 73060 entities. The Item 73060 entity includes various attributes, namely a PeriodBeginCreditRatingCode 73064, a PeriodEndCreditRatingCode 73068 and a ProbabilityOfTransitionDoubleValue 73072. The PeriodBeginCreditRatingCode 73064 attribute has a cardinality of 1 73066 meaning that for each instance of the Item 73060 entity there is one PeriodBeginCreditRatingCode 73064 attribute. The PeriodEndCreditRatingCode 73068 attribute has a cardinality of 1 73070 meaning that for each instance of the Item 73060 entity there is one PeriodEndCreditRatingCode 73068 attribute. The ProbabilityOfTransitionDoubleValue 73072 attribute has a cardinality of 1 73074 meaning that for each instance of the Item 73060 entity there is one ProbabilityOfTransitionDoubleValue 73072 attribute. The data types of the various packages, entities, and attributes are described with respect to FIGS. 63-1 through 63-135.

FIGS. 74-1 through 74-10 show an example configuration of an Element Structure that includes a CrdtPrtfoModFSInDatOTCDeriCrteReqMsg 74000 package. The CrdtPrtfoModFSInDatOTCDeriCrteReqMsg 74000 package includes a CrdtPrtfoModFSInDatOTCDeriCrteReqMsg 74002 entity. The CrdtPrtfoModFSInDatOTCDeriCrteReqMsg 74000 package includes various packages, namely a MessageHeader 74004 and a CreditPortfolioModel 74010.

The MessageHeader 74004 package includes a MessageHeader 74006 entity. The MessageHeader 74006 entity has a cardinality of 1 74008 meaning that for each instance of the MessageHeader 74004 package there is one MessageHeader 74006 entity.

The CreditPortfolioModel 74010 package includes a CreditPortfolioModel 74012 entity. The CreditPortfolioModel 74010 package includes an InputData 74036 package. The CreditPortfolioModel 74012 entity has a cardinality of 1 74014 meaning that for each instance of the CreditPortfolioModel 74010 package there is one CreditPortfolioModel 74012 entity. The CreditPortfolioModel 74012 entity includes an ID 74016 attribute. The CreditPortfolioModel 74012 entity includes various subordinate entities, namely a CreditPortfolioManagementProcessControl 74020 and a CreditPortfolio 74028. The ID 74016 attribute has a cardinality of 1 74018 meaning that for each instance of the CreditPortfolioModel 74012 entity there is one ID 74016 attribute.

The CreditPortfolioManagementProcessControl 74020 entity has a cardinality of 1 74022 meaning that for each instance of the CreditPortfolioModel 74012 entity there is one CreditPortfolioManagementProcessControl 74020 entity. The CreditPortfolioManagementProcessControl 74020 entity includes a DataTransferID 74024 attribute. The DataTransferID 74024 attribute has a cardinality of 1 74026 meaning that for each instance of the CreditPortfolioManagementProcessControl 74020 entity there is one DataTransferID 74024 attribute.

The CreditPortfolio 74028 entity has a cardinality of 1 74030 meaning that for each instance of the CreditPortfolioModel 74012 entity there is one CreditPortfolio 74028 entity. The CreditPortfolio 74028 entity includes an ID 74032 attribute. The ID 74032 attribute has a cardinality of 1 74034 meaning that for each instance of the CreditPortfolio 74028 entity there is one ID 74032 attribute.

The InputData 74036 package includes an InputData 74038 entity. The InputData 74036 package includes an OTCDerivative 74042 package. The InputData 74038 entity has a cardinality of 1 74040 meaning that for each instance of the InputData 74036 package there is one InputData 74038 entity.

The OTCDerivative 74042 package includes an OTCDerivative 74044 entity. The OTCDerivative 74042 package includes various packages, namely a Counterparty 74068, a GuarantorParty 74080, a CreditExposureData 74090, a ProbabilityOfDefault 74146, a Rating 74164, an ExposureProfile 74202, a RiskFreeProfile 74224 and a Property 74242.

The OTCDerivative 74044 entity has a cardinality of 1 74046 meaning that for each instance of the OTCDerivative 74042 package there is one OTCDerivative 74044 entity. The OTC-Derivative 74044 entity includes various attributes, namely an ID 74048, a GuaranteeID 74052, a Description 74056, a CurrencyCode 74060 and a ValidityPeriod 74064. The ID 74048 attribute has a cardinality of 1 74050 meaning that for each instance of the OTCDerivative 74044 entity there is one ID 74048 attribute. The GuaranteeID 74052 attribute has a cardinality of 0 . . . 1 74054 meaning that for each instance of the OTCDerivative 74044 entity there may be one GuaranteeID 74052 attribute. The Description 74056 attribute has a cardinality of 0 . . . 1 74058 meaning that for each instance of the OTCDerivative 74044 entity there may be one Description 74056 attribute. The CurrencyCode 74060 attribute has a cardinality of 1 74062 meaning that for each instance of the OTCDerivative 74044 entity there is one CurrencyCode 74060 attribute. The ValidityPeriod 74064 attribute has a cardinality of 1 74066 meaning that for each instance of the OTCDerivative 74044 entity there is one ValidityPeriod 74064 attribute.

The Counterparty 74068 package includes a Counterparty 74070 entity. The Counterparty 74070 entity has a cardinality of 1 74072 meaning that for each instance of the Counterparty 74068 package there is one Counterparty 74070 entity. The Counterparty 74070 entity includes an InternalID 74074 attribute. The InternalID 74074 attribute has a cardinality of 1 74076 meaning that for each instance of the Counterparty 74070 entity there is one InternalID 74074 attribute.

The GuarantorParty 74080 package includes a GuarantorParty 74082 entity. The GuarantorParty 74082 entity has a cardinality of 0 . . . 1 74084 meaning that for each instance of the GuarantorParty 74080 package there may be one GuarantorParty 74082 entity. The GuarantorParty 74082 entity includes an InternalID 74086 attribute. The InternalID 74086 attribute has a cardinality of 0 . . . 1 74088 meaning that for each instance of the GuarantorParty 74082 entity there may be one InternalID 74086 attribute.

The CreditExposureData 74090 package includes a CreditExposureData 74092 entity. The CreditExposureData 74092 entity has a cardinality of 1 74094 meaning that for each instance of the CreditExposureData 74090 package there is one CreditExposureData 74092 entity. The CreditExposureData 74092 entity includes various attributes, namely a LossGivenDefaultDecimalValue 74096, a ShapeBetaDistributionDecimalValue 74100, an ExpectedLossGivenDefaultDecimalValue 74104, an ExposureAtDefaultAmount 74108 and a CreditPortfolioManagementProductCode 74142. The CreditExposureData 74092 entity includes various subordinate entities, namely a PriceAtHorizon 74112 and a CurrentPrice 74128. The LossGivenDefaultDecimalValue 74096 attribute has a cardinality of 0 . . . 1 74098 meaning that for each instance of the CreditExposureData 74092 entity there may be one LossGivenDefaultDecimalValue 74096 attribute. The ShapeBetaDistributionDecimalValue 74100 attribute has a cardinality of 0 . . . 1 74102 meaning that for each instance of the CreditExposureData 74092 entity there may be one ShapeBetaDistributionDecimalValue 74100 attribute. The ExpectedLossGivenDefaultDecimalValue 74104 attribute has a cardinality of 0 . . . 1 74106 meaning that for each instance of the CreditExposureData 74092 entity there may be one ExpectedLossGivenDefaultDecimalValue 74104 attribute. The ExposureAtDefaultAmount 74108 attribute has a cardinality of 0 . . . 1 74110 meaning that for each instance of the CreditExposureData 74092 entity there may be one ExposureAtDefaultAmount 74108 attribute. The CreditPortfolioManagementProductCode 74142 attribute has a cardinality of 1 74144 meaning that for each instance of the CreditExposureData 74092 entity there is one CreditPortfolioManagementProductCode 74142 attribute.

The PriceAtHorizon 74112 entity has a cardinality of 0 . . . 1 74114 meaning that for each instance of the CreditExposureData 74092 entity there may be one PriceAtHorizon 74112 entity. The PriceAtHorizon 74112 entity includes various attributes, namely a Duration 74116, an Amount 74120 and a DecimalValue 74124. The Duration 74116 attribute has a cardinality of 0 . . . 1 74118 meaning that for each instance of the PriceAtHorizon 74112 entity there may be one Duration 74116 attribute. The Amount 74120 attribute has a cardinality of 0 . . . 1 74122 meaning that for each instance of the PriceAtHorizon 74112 entity there may be one Amount 74120 attribute. The DecimalValue 74124 attribute has a cardinality of 0 . . . 1 74126 meaning that for each instance of the PriceAtHorizon 74112 entity there may be one DecimalValue 74124 attribute.

The CurrentPrice 74128 entity includes various attributes, namely a Duration 74130, an Amount 74134 and a DecimalValue 74138. The Duration 74130 attribute has a cardinality of 0 . . . 1 74132 meaning that for each instance of the CurrentPrice 74128 entity there may be one Duration 74130 attribute. The Amount 74134 attribute has a cardinality of 0 . . . 1 74136 meaning that for each instance of the CurrentPrice 74128 entity there may be one Amount 74134 attribute. The DecimalValue 74138 attribute has a cardinality of 0 . . . 1 74140 meaning that for each instance of the CurrentPrice 74128 entity there may be one DecimalValue 74138 attribute.

The ProbabilityOfDefault 74146 package includes a ProbabilityOfDefault 74148 entity. The ProbabilityOfDefault 74148 entity has a cardinality of 0 . . . n 74150 meaning that for each instance of the ProbabilityOfDefault 74146 package there may be one or more ProbabilityOfDefault 74148 entities. The ProbabilityOfDefault 74148 entity includes various attributes, namely a ValidityDatePeriod 74152, a Code 74156 and a DoubleValue 74160. The ValidityDatePeriod 74152 attribute has a cardinality of 1 74154 meaning that for each instance of the ProbabilityOfDefault 74148 entity there is one ValidityDatePeriod 74152 attribute. The Code 74156 attribute has a cardinality of 1 74158 meaning that for each instance of the ProbabilityOfDefault 74148 entity there is one Code 74156 attribute. The DoubleValue 74160 attribute has a cardinality of 1 74162 meaning that for each instance of the ProbabilityOfDefault 74148 entity there is one DoubleValue 74160 attribute.

The Rating 74164 package includes a Rating 74166 entity. The Rating 74166 entity has a cardinality of 0 . . . n 74168 meaning that for each instance of the Rating 74164 package there may be one or more Rating 74166 entities. The Rating 74166 entity includes various attributes, namely a ModelID 74170, a ValidityDatePeriod 74174, a Code 74178, a MasterCreditRatingCode 74182, an InternalRatingIndicator 74186, a Maturity 74190, a Date 74194 and a TendencyCode 74198. The ModelID 74170 attribute has a cardinality of 1 74172 meaning that for each instance of the Rating 74166 entity there is one ModelID 74170 attribute. The ValidityDatePeriod 74174 attribute has a cardinality of 1 74176 meaning that for each instance of the Rating 74166 entity there is one ValidityDatePeriod 74174 attribute. The Code 74178 attribute has a cardinality of 1 74180 meaning that for each instance of the Rating 74166 entity there is one Code 74178 attribute. The MasterCreditRatingCode 74182 attribute has a cardinality of 0 . . . 1 74184 meaning that for each instance of the Rating 74166 entity there may be one MasterCreditRatingCode 74182 attribute. The InternalRatingIndicator 74186 attribute has a cardinality of 0 . . . 1 74188 meaning that for each instance of the Rating 74166 entity there may be one InternalRatingIndicator 74186 attribute. The Maturity 74190 attribute has a cardinality of 0 . . . 1 74192 meaning that for each instance of the Rating 74166 entity there may be one Maturity 74190 attribute. The Date 74194 attribute has a cardinality of 1 74196 meaning that for each instance of the Rating 74166 entity there is one Date 74194 attribute. The TendencyCode 74198 attribute has a cardinality of 0 . . . 1 74200 meaning that for each instance of the Rating 74166 entity there may be one TendencyCode 74198 attribute.

The ExposureProfile 74202 package includes an ExposureProfile 74204 entity. The ExposureProfile 74204 entity has a cardinality of 0 . . . 1 74206 meaning that for each instance of the ExposureProfile 74202 package there may be one ExposureProfile 74204 entity. The ExposureProfile 74204 entity includes an Item 74208 subordinate entity.

The Item 74208 entity has a cardinality of 0 . . . n 74210 meaning that for each instance of the ExposureProfile 74204 entity there may be one or more Item 74208 entities. The Item 74208 entity includes various attributes, namely a Date 74212, a NegativeExposureAmount 74216 and a PositiveExposureAmount 74220. The Date 74212 attribute has a cardinality of 1 74214 meaning that for each instance of the Item 74208 entity there is one Date 74212 attribute. The NegativeExposureAmount 74216 attribute has a cardinality of 0 . . . 1 74218 meaning that for each instance of the Item 74208 entity there may be one NegativeExposureAmount 74216 attribute. The PositiveExposureAmount 74220 attribute has a cardinality of 0 . . . 1 74222 meaning that for each instance of the Item 74208 entity there may be one PositiveExposureAmount 74220 attribute.

The RiskFreeProfile 74224 package includes a RiskFreeProfile 74226 entity. The RiskFreeProfile 74226 entity has a cardinality of 0 . . . 1 74228 meaning that for each instance of the RiskFreeProfile 74224 package there may be one RiskFreeProfile 74226 entity. The RiskFreeProfile 74226 entity includes an Item 74230 subordinate entity.

The Item 74230 entity has a cardinality of 0 . . . n 74232 meaning that for each instance of the RiskFreeProfile 74226 entity there may be one or more Item 74230 entities. The Item 74230 entity includes various attributes, namely a Date 74234 and a RiskFreeAmount 74238. The Date 74234 attribute has a cardinality of 1 74236 meaning that for each instance of the Item 74230 entity there is one Date 74234 attribute. The RiskFreeAmount 74238 attribute has a cardinality of 1 74240 meaning that for each instance of the Item 74230 entity there is one RiskFreeAmount 74238 attribute.

The Property 74242 package includes a Property 74244 entity. The Property 74244 entity has a cardinality of 0 . . . n 74246 meaning that for each instance of the Property 74242 package there may be one or more Property 74244 entities. The Property 74244 entity includes various attributes, namely an ID 74248 and a Value 74252. The ID 74248 attribute has a cardinality of 1 74250 meaning that for each instance of the Property 74244 entity there is one ID 74248 attribute. The Value 74252 attribute has a cardinality of 1 74254 meaning that for each instance of the Property 74244 entity there is one Value 74252 attribute. The data types of the various packages, entities, and attributes are described with respect to FIGS. 63-1 through 63-135.

FIGS. 75-1 through 75-11 show an example configuration of an Element Structure that includes a CrdtPrtfoModFSInDatSecFTCrteReqMsg 75000 package. The CrdtPrtfoModFSInDatSecFTCrteReqMsg 75000 package includes a CrdtPrtfoModFSInDatSecFTCrteReqMsg 75002 entity. The CrdtPrtfoModFSInDatSecFTCrteReqMsg 75000 package includes various packages, namely a MessageHeader 75004 and a CreditPortfolioModel 75010.

The MessageHeader 75004 package includes a MessageHeader 75006 entity. The MessageHeader 75006 entity has a cardinality of 1 75008 meaning that for each instance of the MessageHeader 75004 package there is one MessageHeader 75006 entity.

The CreditPortfolioModel 75010 package includes a CreditPortfolioModel 75012 entity. The CreditPortfolioModel 75010 package includes an InputData 75036 package. The CreditPortfolioModel 75012 entity has a cardinality of 1 75014 meaning that for each instance of the CreditPortfolioModel 75010 package there is one CreditPortfolioModel 75012 entity. The CreditPortfolioModel 75012 entity includes an ID 75016 attribute. The CreditPortfolioModel 75012 entity includes various subordinate entities, namely a CreditPortfolioManagementProcessControl 75020 and a CreditPortfolio 75028. The ID 75016 attribute has a cardinality of 1 75018 meaning that for each instance of the CreditPortfolioModel 75012 entity there is one ID 75016 attribute.

The CreditPortfolioManagementProcessControl 75020 entity has a cardinality of 1 75022 meaning that for each instance of the CreditPortfolioModel 75012 entity there is one CreditPortfolioManagementProcessControl 75020 entity. The CreditPortfolioManagementProcessControl 75020 entity includes a DataTransferID 75024 attribute. The DataTransferID 75024 attribute has a cardinality of 1 75026 meaning that for each instance of the CreditPortfolioManagementProcessControl 75020 entity there is one DataTransferID 75024 attribute.

The CreditPortfolio 75028 entity has a cardinality of 1 75030 meaning that for each instance of the CreditPortfolioModel 75012 entity there is one CreditPortfolio 75028 entity. The CreditPortfolio 75028 entity includes an ID 75032 attribute. The ID 75032 attribute has a cardinality of 1 75034 meaning that for each instance of the CreditPortfolio 75028 entity there is one ID 75032 attribute.

The InputData 75036 package includes an InputData 75038 entity. The InputData 75036 package includes a SecuritiesFinancingTransaction 75042 package. The InputData 75038 entity has a cardinality of 1 75040 meaning that for each instance of the InputData 75036 package there is one InputData 75038 entity.

The SecuritiesFinancingTransaction 75042 package includes a SecuritiesFinancingTransaction 75044 entity. The SecuritiesFinancingTransaction 75042 package includes various packages, namely a Counterparty 75068, a GuarantorParty 75080, a CreditExposureData 75090, a ProbabilityOfDefault 75146, a Rating 75164, an ExposureProfile 75202, a RiskFreeProfile 75224 and a Property 75242.

The SecuritiesFinancingTransaction 75044 entity has a cardinality of 1 75046 meaning that for each instance of the SecuritiesFinancingTransaction 75042 package there is one SecuritiesFinancingTransaction 75044 entity. The SecuritiesFinancingTransaction 75044 entity includes various attributes, namely an ID 75048, a GuaranteeID 75052, a Description 75056, a CurrencyCode 75060 and a ValidityPeriod 75064. The ID 75048 attribute has a cardinality of 1 75050 meaning that for each instance of the SecuritiesFinancingTransaction 75044 entity there is one ID 75048 attribute. The GuaranteeID 75052 attribute has a cardinality of 0 . . . 1 75054 meaning that for each instance of the SecuritiesFinancingTransaction 75044 entity there may be one GuaranteeID 75052 attribute. The Description 75056 attribute has a cardinality of 0 . . . 1 75058 meaning that for each instance of the SecuritiesFinancingTransaction 75044 entity there may be one Description 75056 attribute. The CurrencyCode 75060 attribute has a cardinality of 1 75062 meaning that for each instance of the SecuritiesFinancingTransaction 75044 entity there is one CurrencyCode 75060 attribute. The ValidityPeriod 75064 attribute has a cardinality of 1 75066 meaning that for each instance of the SecuritiesFinancingTransaction 75044 entity there is one ValidityPeriod 75064 attribute.

The Counterparty 75068 package includes a Counterparty 75070 entity. The Counterparty 75070 entity has a cardinality of 1 75072 meaning that for each instance of the Counterparty 75068 package there is one Counterparty 75070 entity. The Counterparty 75070 entity includes an InternalID 75074 attribute. The InternalID 75074 attribute has a cardinality of 1 75076 meaning that for each instance of the Counterparty 75070 entity there is one InternalID 75074 attribute.

The GuarantorParty 75080 package includes a GuarantorParty 75082 entity. The GuarantorParty 75082 entity has a cardinality of 0 . . . 1 75084 meaning that for each instance of the GuarantorParty 75080 package there may be one GuarantorParty 75082 entity. The GuarantorParty 75082 entity includes an InternalID 75086 attribute. The InternalID 75086 attribute has a cardinality of 0 . . . 1 75088 meaning that for each instance of the GuarantorParty 75082 entity there may be one InternalID 75086 attribute.

The CreditExposureData 75090 package includes a CreditExposureData 75092 entity. The CreditExposureData 75092 entity has a cardinality of 1 75094 meaning that for each instance of the CreditExposureData 75090 package there is one CreditExposureData 75092 entity. The CreditExposureData 75092 entity includes various attributes, namely a LossGivenDefaultDecimalValue 75096, a ShapeBetaDistributionDecimalValue 75100, an ExpectedLossGivenDefaultDecimalValue 75104, an ExposureAtDefaultAmount 75108 and a CreditPortfolioManagementProductCode 75142. The CreditExposureData 75092 entity includes various subordinate entities, namely a PriceAtHorizon 75112 and a CurrentPrice 75128. The LossGivenDefaultDecimalValue 75096 attribute has a cardinality of 0 . . . 1 75098 meaning that for each instance of the CreditExposureData 75092 entity there may be one LossGivenDefaultDecimalValue 75096 attribute. The ShapeBetaDistributionDecimalValue 75100 attribute has a cardinality of 0 . . . 1 75102 meaning that for each instance of the CreditExposureData 75092 entity there may be one ShapeBetaDistributionDecimalValue 75100 attribute. The ExpectedLossGivenDefaultDecimalValue 75104 attribute has a cardinality of 0 . . . 1 75106 meaning that for each instance of the CreditExposureData 75092 entity there may be one ExpectedLossGivenDefaultDecimalValue 75104 attribute. The ExposureAtDefaultAmount 75108 attribute has a cardinality of 0 . . . 1 75110 meaning that for each instance of the CreditExposureData 75092 entity there may be one ExposureAtDefaultAmount 75108 attribute. The CreditPortfolioManagementProductCode 75142 attribute has a cardinality of 1 75144 meaning that for each instance of the CreditExposureData 75092 entity there is one CreditPortfolioManagementProductCode 75142 attribute.

The PriceAtHorizon 75112 entity has a cardinality of 0 . . . 1 75114 meaning that for each instance of the CreditExposureData 75092 entity there may be one PriceAtHorizon 75112 entity. The PriceAtHorizon 75112 entity includes various attributes, namely a Duration 75116, an Amount 75120 and a DecimalValue 75124. The Duration 75116 attribute has a cardinality of 0 . . . 1 75118 meaning that for each instance of the PriceAtHorizon 75112 entity there may be one Duration 75116 attribute. The Amount 75120 attribute has a cardinality of 0 . . . 1 75122 meaning that for each instance of the PriceAtHorizon 75112 entity there may be one Amount 75120 attribute. The DecimalValue 75124 attribute has a cardinality of 0 . . . 1 75126 meaning that for each instance of the PriceAtHorizon 75112 entity there may be one DecimalValue 75124 attribute.

The CurrentPrice 75128 entity includes various attributes, namely a Duration 75130, an Amount 75134 and a DecimalValue 75138. The Duration 75130 attribute has a cardinality of 0 . . . 1 75132 meaning that for each instance of the CurrentPrice 75128 entity there may be one Duration 75130 attribute. The Amount 75134 attribute has a cardinality of 0 . . . 1 75136 meaning that for each instance of the CurrentPrice 75128 entity there may be one Amount 75134 attribute. The DecimalValue 75138 attribute has a cardinality of 0 . . . 1 75140 meaning that for each instance of the CurrentPrice 75128 entity there may be one DecimalValue 75138 attribute.

The ProbabilityOfDefault 75146 package includes a ProbabilityOfDefault 75148 entity. The ProbabilityOfDefault 75148 entity has a cardinality of 0 . . . n 75150 meaning that for each instance of the ProbabilityOfDefault 75146 package there may be one or more ProbabilityOfDefault 75148 entities. The ProbabilityOfDefault 75148 entity includes various attributes, namely a ValidityDatePeriod 75152, a Code 75156 and a DoubleValue 75160. The ValidityDatePeriod 75152 attribute has a cardinality of 1 75154 meaning that for each instance of the ProbabilityOfDefault 75148 entity there is one ValidityDatePeriod 75152 attribute. The Code 75156 attribute has a cardinality of 1 75158 meaning that for each instance of the ProbabilityOfDefault 75148 entity there is one Code 75156 attribute. The DoubleValue 75160 attribute has a cardinality of 1 75162 meaning that for each instance of the ProbabilityOfDefault 75148 entity there is one DoubleValue 75160 attribute.

The Rating 75164 package includes a Rating 75166 entity. The Rating 75166 entity has a cardinality of 0 . . . n 75168 meaning that for each instance of the Rating 75164 package there may be one or more Rating 75166 entities. The Rating 75166 entity includes various attributes, namely a ModelID 75170, a ValidityDatePeriod 75174, a Code 75178, a MasterCreditRatingCode 75182, an InternalRatingIndicator 75186, a Maturity 75190, a Date 75194 and a TendencyCode 75198. The ModelID 75170 attribute has a cardinality of 1 75172 meaning that for each instance of the Rating 75166 entity there is one ModelID 75170 attribute. The ValidityDatePeriod 75174 attribute has a cardinality of 1 75176 meaning that for each instance of the Rating 75166 entity there is one ValidityDatePeriod 75174 attribute. The Code 75178 attribute has a cardinality of 1 75180 meaning that for each instance of the Rating 75166 entity there is one Code 75178 attribute. The MasterCreditRatingCode 75182 attribute has a cardinality of 0 . . . 1 75184 meaning that for each instance of the Rating 75166 entity there may be one MasterCreditRatingCode 75182 attribute. The InternalRatingIndicator 75186 attribute has a cardinality of 0 . . . 1 75188 meaning that for each instance of the Rating 75166 entity there may be one InternalRatingIndicator 75186 attribute. The Maturity 75190 attribute has a cardinality of 0 . . . 1 75192 meaning that for each instance of the Rating 75166 entity there may be one Maturity 75190 attribute. The Date 75194 attribute has a cardinality of 1 75196 meaning that for each instance of the Rating 75166 entity there is one Date 75194 attribute. The TendencyCode 75198 attribute has a cardinality of 0 . . . 1 75200 meaning that for each instance of the Rating 75166 entity there may be one TendencyCode 75198 attribute.

The ExposureProfile 75202 package includes an ExposureProfile 75204 entity. The ExposureProfile 75204 entity has a cardinality of 0 . . . 1 75206 meaning that for each instance of the ExposureProfile 75202 package there may be one ExposureProfile 75204 entity. The ExposureProfile 75204 entity includes an Item 75208 subordinate entity.

The Item 75208 entity has a cardinality of 0 . . . n 75210 meaning that for each instance of the ExposureProfile 75204 entity there may be one or more Item 75208 entities. The Item 75208 entity includes various attributes, namely a Date 75212, a NegativeExposureAmount 75216 and a PositiveExposureAmount 75220. The Date 75212 attribute has a cardinality of 1 75214 meaning that for each instance of the Item 75208 entity there is one Date 75212 attribute. The NegativeExposureAmount 75216 attribute has a cardinality of 0 . . . 1 75218 meaning that for each instance of the Item 75208 entity there may be one NegativeExposureAmount 75216 attribute. The PositiveExposureAmount 75220 attribute has a cardinality of 0 . . . 1 75222 meaning that for each instance of the Item 75208 entity there may be one PositiveExposureAmount 75220 attribute.

The RiskFreeProfile 75224 package includes a RiskFreeProfile 75226 entity. The RiskFreeProfile 75226 entity has a cardinality of 0 . . . 1 75228 meaning that for each instance of the RiskFreeProfile 75224 package there may be one RiskFreeProfile 75226 entity. The RiskFreeProfile 75226 entity includes an Item 75230 subordinate entity.

The Item 75230 entity has a cardinality of 0 . . . n 75232 meaning that for each instance of the RiskFreeProfile 75226 entity there may be one or more Item 75230 entities. The Item 75230 entity includes various attributes, namely a Date 75234 and a RiskFreeAmount 75238. The Date 75234 attribute has a cardinality of 1 75236 meaning that for each instance of the Item 75230 entity there is one Date 75234 attribute. The RiskFreeAmount 75238 attribute has a cardinality of 1 75240 meaning that for each instance of the Item 75230 entity there is one RiskFreeAmount 75238 attribute.

The Property 75242 package includes a Property 75244 entity. The Property 75244 entity has a cardinality of 0 . . . n 75246 meaning that for each instance of the Property 75242 package there may be one or more Property 75244 entities. The Property 75244 entity includes various attributes, namely an ID 75248 and a Value 75252. The ID 75248 attribute has a cardinality of 1 75250 meaning that for each instance of the Property 75244 entity there is one ID 75248 attribute. The Value 75252 attribute has a cardinality of 1 75254 meaning that for each instance of the Property 75244 entity there is one Value 75252 attribute. The data types of the various packages, entities, and attributes are described with respect to FIGS. 63-1 through 63-135.

FIGS. 76-1 through 76-9 show an example configuration of an Element Structure that includes a CrdtPrtfoModFSInDatStockCrteReqMsg 76000 package. The CrdtPrtfoModFSInDatStockCrteReqMsg 76000 package includes a CrdtPrtfoModFSInDatStockCrteReqMsg 76002 entity. The CrdtPrtfoModFSInDatStockCrteReqMsg 76000 package includes various packages, namely a MessageHeader 76004 and a CreditPortfolioModel 76010.

The MessageHeader 76004 package includes a MessageHeader 76006 entity. The MessageHeader 76006 entity has a cardinality of 1 76008 meaning that for each instance of the MessageHeader 76004 package there is one MessageHeader 76006 entity.

The CreditPortfolioModel 76010 package includes a CreditPortfolioModel 76012 entity. The CreditPortfolioModel 76010 package includes an InputData 76036 package. The CreditPortfolioModel 76012 entity has a cardinality of 1 76014 meaning that for each instance of the CreditPortfolioModel 76010 package there is one CreditPortfolioModel 76012 entity. The CreditPortfolioModel 76012 entity includes an ID 76016 attribute. The CreditPortfolioModel 76012 entity includes various subordinate entities, namely a CreditPortfolioManagementProcessControl 76020 and a CreditPortfolio 76028. The ID 76016 attribute has a cardinality of 1 76018 meaning that for each instance of the CreditPortfolioModel 76012 entity there is one ID 76016 attribute.

The CreditPortfolioManagementProcessControl 76020 entity has a cardinality of 1 76022 meaning that for each instance of the CreditPortfolioModel 76012 entity there is one CreditPortfolioManagementProcessControl 76020 entity. The CreditPortfolioManagementProcessControl 76020 entity includes a DataTransferID 76024 attribute. The DataTransferID 76024 attribute has a cardinality of 1 76026 meaning that for each instance of the CreditPortfolioManagementProcessControl 76020 entity there is one DataTransferID 76024 attribute.

The CreditPortfolio 76028 entity has a cardinality of 1 76030 meaning that for each instance of the CreditPortfolioModel 76012 entity there is one CreditPortfolio 76028 entity. The CreditPortfolio 76028 entity includes an ID 76032 attribute. The ID 76032 attribute has a cardinality of 1 76034 meaning that for each instance of the CreditPortfolio 76028 entity there is one ID 76032 attribute.

The InputData 76036 package includes an InputData 76038 entity. The InputData 76036 package includes a Stock 76042 package. The InputData 76038 entity has a cardinality of 1 76040 meaning that for each instance of the InputData 76036 package there is one InputData 76038 entity.

The Stock 76042 package includes a Stock 76044 entity. The Stock 76042 package includes various packages, namely an IssuerParty 76066, a GuarantorParty 76080, a CreditExposureData 76090, a ProbabilityOfDefault 76152, a Rating 76170 and a Property 76208. The Stock 76044 entity includes various attributes, namely an ID 76046, a GuaranteeID 76050, a Description 76054, a CurrencyCode 76058 and a ValidityPeriod 76062. The ID 76046 attribute has a cardinality of 1 76048 meaning that for each instance of the Stock 76044 entity there is one ID 76046 attribute. The GuaranteeID 76050 attribute has a cardinality of 0 . . . 1 76052 meaning that for each instance of the Stock 76044 entity there may be one GuaranteeID 76050 attribute. The Description 76054 attribute has a cardinality of 0 . . . 1 76056 meaning that for each instance of the Stock 76044 entity there may be one Description 76054 attribute. The CurrencyCode 76058 attribute has a cardinality of 1 76060 meaning that for each instance of the Stock 76044 entity there is one CurrencyCode 76058 attribute. The ValidityPeriod 76062 attribute has a cardinality of 1 76064 meaning that for each instance of the Stock 76044 entity there is one ValidityPeriod 76062 attribute.

The IssuerParty 76066 package includes an IssuerParty 76068 entity. The IssuerParty 76068 entity has a cardinality of 1 76070 meaning that for each instance of the IssuerParty 76066 package there is one IssuerParty 76068 entity. The IssuerParty 76068 entity includes various attributes, namely an InternalID 76072 and a GuarantorSubstitutionCode 76076. The InternalID 76072 attribute has a cardinality of 1 76074 meaning that for each instance of the IssuerParty 76068 entity there is one InternalID 76072 attribute. The GuarantorSubstitutionCode 76076 attribute has a cardinality of 0 . . . 1 76078 meaning that for each instance of the IssuerParty 76068 entity there may be one GuarantorSubstitutionCode 76076 attribute.

The GuarantorParty 76080 package includes a GuarantorParty 76082 entity. The GuarantorParty 76082 entity has a cardinality of 0 . . . 1 76084 meaning that for each instance of the GuarantorParty 76080 package there may be one GuarantorParty 76082 entity. The GuarantorParty 76082 entity includes an InternalID 76086 attribute. The InternalID 76086 attribute has a cardinality of 0 . . . 1 76088 meaning that for each instance of the GuarantorParty 76082 entity there may be one InternalID 76086 attribute.

The CreditExposureData 76090 package includes a CreditExposureData 76092 entity. The CreditExposureData 76092 entity has a cardinality of 1 76094 meaning that for each instance of the CreditExposureData 76090 package there is one CreditExposureData 76092 entity. The CreditExposureData 76092 entity includes various attributes, namely a LossGivenDefaultDecimalValue 76096, a ShapeBetaDistributionDecimalValue 76100, an ExpectedLossGivenDefaultDecimalValue 76104, an ExposureAtDefaultAmount 76108, a CreditPortfolioManagementProductCode 76144 and a RecoveryAmount 76148. The CreditExposureData 76092 entity includes various subordinate entities, namely a PriceAtHorizon 76112 and a CurrentPrice 76128. The LossGivenDefaultDecimalValue 76096 attribute has a cardinality of 0 . . . 1 76098 meaning that for each instance of the CreditExposureData 76092 entity there may be one LossGivenDefaultDecimalValue 76096 attribute. The ShapeBetaDistributionDecimalValue 76100 attribute has a cardinality of 0 . . . 1 76102 meaning that for each instance of the CreditExposureData 76092 entity there may be one ShapeBetaDistributionDecimalValue 76100 attribute. The ExpectedLossGivenDefaultDecimalValue 76104 attribute has a cardinality of 0 . . . 1 76106 meaning that for each instance of the CreditExposureData 76092 entity there may be one ExpectedLossGivenDefaultDecimalValue 76104 attribute. The ExposureAtDefaultAmount 76108 attribute has a cardinality of 0 . . . 1 76110 meaning that for each instance of the CreditExposureData 76092 entity there may be one ExposureAtDefaultAmount 76108 attribute. The CreditPortfolioManagementProductCode 76144 attribute has a cardinality of 1 76146 meaning that for each instance of the CreditExposureData 76092 entity there is one CreditPortfolioManagementProductCode 76144 attribute. The RecoveryAmount 76148 attribute has a cardinality of 0 . . . 1 76150 meaning that for each instance of the CreditExposureData 76092 entity there may be one RecoveryAmount 76148 attribute.

The PriceAtHorizon 76112 entity has a cardinality of 0 . . . 1 76114 meaning that for each instance of the CreditExposureData 76092 entity there may be one PriceAtHorizon 76112 entity. The PriceAtHorizon 76112 entity includes various attributes, namely a Duration 76116, an Amount 76120 and a DecimalValue 76124. The Duration 76116 attribute has a cardinality of 0 . . . 1 76118 meaning that for each instance of the PriceAtHorizon 76112 entity there may be one Duration 76116 attribute. The Amount 76120 attribute has a cardinality of 0 . . . 1 76122 meaning that for each instance of the PriceAtHorizon 76112 entity there may be one Amount 76120 attribute. The DecimalValue 76124 attribute has a cardinality of 0 . . . 1 76126 meaning that for each instance of the PriceAtHorizon 76112 entity there may be one DecimalValue 76124 attribute.

The CurrentPrice 76128 entity has a cardinality of 0 . . . 1 76130 meaning that for each instance of the CreditExposureData 76092 entity there may be one CurrentPrice 76128 entity. The CurrentPrice 76128 entity includes various attributes, namely a Duration 76132, an Amount 76136 and a DecimalValue 76140. The Duration 76132 attribute has a cardinality of 0 . . . 1 76134 meaning that for each instance of the CurrentPrice 76128 entity there may be one Duration 76132 attribute. The Amount 76136 attribute has a cardinality of 0 . . . 1 76138 meaning that for each instance of the CurrentPrice 76128 entity there may be one Amount 76136 attribute. The DecimalValue 76140 attribute has a cardinality of 0 . . . 1 76142 meaning that for each instance of the CurrentPrice 76128 entity there may be one DecimalValue 76140 attribute.

The ProbabilityOfDefault 76152 package includes a ProbabilityOfDefault 76154 entity. The ProbabilityOfDefault 76154 entity has a cardinality of 0 . . . n 76156 meaning that for each instance of the ProbabilityOfDefault 76152 package there may be one or more ProbabilityOfDefault 76154 entities. The ProbabilityOfDefault 76154 entity includes various attributes, namely a ValidityDatePeriod 76158, a Code 76162 and a DoubleValue 76166. The ValidityDatePeriod 76158 attribute has a cardinality of 1 76160 meaning that for each instance of the ProbabilityOfDefault 76154 entity there is one ValidityDatePeriod 76158 attribute. The Code 76162 attribute has a cardinality of 1 76164 meaning that for each instance of the ProbabilityOfDefault 76154 entity there is one Code 76162 attribute. The DoubleValue 76166 attribute has a cardinality of 1 76168 meaning that for each instance of the ProbabilityOfDefault 76154 entity there is one DoubleValue 76166 attribute.

The Rating 76170 package includes a Rating 76172 entity. The Rating 76172 entity has a cardinality of 0 . . . n 76174 meaning that for each instance of the Rating 76170 package there may be one or more Rating 76172 entities. The Rating 76172 entity includes various attributes, namely a ModelID 76176, a ValidityDatePeriod 76180, a Code 76184, a MasterCreditRatingCode 76188, an InternalRatingIndicator 76192, a Maturity 76196, a Date 76200 and a TendencyCode 76204. The ModelID 76176 attribute has a cardinality of 1 76178 meaning that for each instance of the Rating 76172 entity there is one ModelID 76176 attribute. The ValidityDatePeriod 76180 attribute has a cardinality of 1 76182 meaning that for each instance of the Rating 76172 entity there is one ValidityDatePeriod 76180 attribute. The Code 76184 attribute has a cardinality of 1 76186 meaning that for each instance of the Rating 76172 entity there is one Code 76184 attribute. The MasterCreditRatingCode 76188 attribute has a cardinality of 0 . . . 1 76190 meaning that for each instance of the Rating 76172 entity there may be one MasterCreditRatingCode 76188 attribute. The InternalRatingIndicator 76192 attribute has a cardinality of 0 . . . 1 76194 meaning that for each instance of the Rating 76172 entity there may be one InternalRatingIndicator 76192 attribute. The Maturity 76196 attribute has a cardinality of 0 . . . 1 76198 meaning that for each instance of the Rating 76172 entity there may be one Maturity 76196 attribute. The Date 76200 attribute has a cardinality of 1 76202 meaning that for each instance of the Rating 76172 entity there is one Date 76200 attribute. The TendencyCode 76204 attribute has a cardinality of 0 . . . 1 76206 meaning that for each instance of the Rating 76172 entity there may be one TendencyCode 76204 attribute.

The Property 76208 package includes a Property 76210 entity. The Property 76210 entity has a cardinality of 0 . . . n 76212 meaning that for each instance of the Property 76208 package there may be one or more Property 76210 entities. The Property 76210 entity includes various attributes, namely an ID 76214 and a Value 76218. The ID 76214 attribute has a cardinality of 1 76216 meaning that for each instance of the Property 76210 entity there is one ID 76214 attribute. The Value 76218 attribute has a cardinality of 1 76220 meaning that for each instance of the Property 76210 entity there is one Value 76218 attribute. The data types of the various packages, entities, and attributes are described with respect to FIGS. 63-1 through 63-135.

FIGS. 77-1 through 77-10 show an example configuration of an Element Structure that includes a CrdtPrtfoModFSIn- DatBuPaCrteReqMsg 77000 package. The CrdtPrtfoModFSInDatBuPaCrteReqMsg 77000 package includes a CrdtPrtfoModFSInDatBuPaCrteReqMsg 77002 entity. The CrdtPrtfoModFSInDatBuPaCrteReqMsg 77000 package includes various packages, namely a MessageHeader 77004 and a CreditPortfolioModel 77010.

The MessageHeader 77004 package includes a MessageHeader 77006 entity. The MessageHeader 77006 entity has a cardinality of 1 77008 meaning that for each instance of the MessageHeader 77004 package there is one MessageHeader 77006 entity.

The CreditPortfolioModel 77010 package includes a CreditPortfolioModel 77012 entity. The CreditPortfolioModel 77010 package includes an InputData 77036 package. The CreditPortfolioModel 77012 entity has a cardinality of 1 77014 meaning that for each instance of the CreditPortfolioModel 77010 package there is one CreditPortfolioModel 77012 entity. The CreditPortfolioModel 77012 entity includes an ID 77016 attribute. The CreditPortfolioModel 77012 entity includes various subordinate entities, namely a CreditPortfolioManagementProcessControl 77020 and a CreditPortfolio 77028. The ID 77016 attribute has a cardinality of 1 77018 meaning that for each instance of the CreditPortfolioModel 77012 entity there is one ID 77016 attribute.

The CreditPortfolioManagementProcessControl 77020 entity has a cardinality of 1 77022 meaning that for each instance of the CreditPortfolioModel 77012 entity there is one CreditPortfolioManagementProcessControl 77020 entity. The CreditPortfolioManagementProcessControl 77020 entity includes a DataTransferID 77024 attribute. The DataTransferID 77024 attribute has a cardinality of 1 77026 meaning that for each instance of the CreditPortfolioManagementProcessControl 77020 entity there is one DataTransferID 77024 attribute.

The CreditPortfolio 77028 entity has a cardinality of 1 77030 meaning that for each instance of the CreditPortfolioModel 77012 entity there is one CreditPortfolio 77028 entity. The CreditPortfolio 77028 entity includes an ID 77032 attribute. The ID 77032 attribute has a cardinality of 1 77034 meaning that for each instance of the CreditPortfolio 77028 entity there is one ID 77032 attribute.

The InputData 77036 package includes an InputData 77038 entity. The InputData 77036 package includes a BusinessPartner 77042 package. The InputData 77038 entity has a cardinality of 1 77040 meaning that for each instance of the InputData 77036 package there is one InputData 77038 entity.

The BusinessPartner 77042 package includes a BusinessPartner 77044 entity. The BusinessPartner 77042 package includes various packages, namely a ProbabilityOfDefault 77068, a Rating 77086, a FinancialData 77124, a FactorCorrelationModelData 77154 and a Property 77192. The BusinessPartner 77044 entity has a cardinality of 1 77046 meaning that for each instance of the BusinessPartner 77042 package there is one BusinessPartner 77044 entity. The BusinessPartner 77044 entity includes various attributes, namely an ID 77048, a Name 77052, a CountryCode 77056, a SegmentCode 77060 and a ValidityDate 77064. The ID 77048 attribute has a cardinality of 1 77050 meaning that for each instance of the BusinessPartner 77044 entity there is one ID 77048 attribute. The Name 77052 attribute has a cardinality of 0 . . . 1 77054 meaning that for each instance of the BusinessPartner 77044 entity there may be one Name 77052 attribute. The CountryCode 77056 attribute has a cardinality of 0 . . . 1 77058 meaning that for each instance of the BusinessPartner 77044 entity there may be one CountryCode 77056 attribute. The SegmentCode 77060 attribute has a cardinality of 0 . . . 1 77062 meaning that for each instance of the BusinessPartner 77044 entity there may be one SegmentCode 77060 attribute. The ValidityDate 77064 attribute has a cardinality of 1 77066 meaning that for each instance of the BusinessPartner 77044 entity there is one ValidityDate 77064 attribute.

The ProbabilityOfDefault 77068 package includes a ProbabilityOfDefault 77070 entity. The ProbabilityOfDefault 77070 entity has a cardinality of 0 . . . n 77072 meaning that for each instance of the ProbabilityOfDefault 77068 package there may be one or more ProbabilityOfDefault 77070 entities. The ProbabilityOfDefault 77070 entity includes various attributes, namely a ValidityDatePeriod 77074, a Code 77078 and a DoubleValue 77082. The ValidityDatePeriod 77074 attribute has a cardinality of 1 77076 meaning that for each instance of the ProbabilityOfDefault 77070 entity there is one ValidityDatePeriod 77074 attribute. The Code 77078 attribute has a cardinality of 1 77080 meaning that for each instance of the ProbabilityOfDefault 77070 entity there is one Code 77078 attribute. The DoubleValue 77082 attribute has a cardinality of 1 77084 meaning that for each instance of the ProbabilityOfDefault 77070 entity there is one DoubleValue 77082 attribute.

The Rating 77086 package includes a Rating 77088 entity. The Rating 77088 entity has a cardinality of 0 . . . n 77090 meaning that for each instance of the Rating 77086 package there may be one or more Rating 77088 entities. The Rating 77088 entity includes various attributes, namely a ModelID 77092, a ValidityDatePeriod 77096, a Code 77100, a MasterCreditRatingCode 77104, an InternalRatingIndicator 77108, a Maturity 77112, a Date 77116 and a TendencyCode 77120. The ModelID 77092 attribute has a cardinality of 1 77094 meaning that for each instance of the Rating 77088 entity there is one ModelID 77092 attribute. The ValidityDatePeriod 77096 attribute has a cardinality of 1 77098 meaning that for each instance of the Rating 77088 entity there is one ValidityDatePeriod 77096 attribute. The Code 77100 attribute has a cardinality of 1 77102 meaning that for each instance of the Rating 77088 entity there is one Code 77100 attribute. The MasterCreditRatingCode 77104 attribute has a cardinality of 0 . . . 1 77106 meaning that for each instance of the Rating 77088 entity there may be one MasterCreditRatingCode 77104 attribute. The InternalRatingIndicator 77108 attribute has a cardinality of 0 . . . 1 77110 meaning that for each instance of the Rating 77088 entity there may be one InternalRatingIndicator 77108 attribute. The Maturity 77112 attribute has a cardinality of 0 . . . 1 77114 meaning that for each instance of the Rating 77088 entity there may be one Maturity 77112 attribute. The Date 77116 attribute has a cardinality of 1 77118 meaning that for each instance of the Rating 77088 entity there is one Date 77116 attribute. The TendencyCode 77120 attribute has a cardinality of 0 . . . 1 77122 meaning that for each instance of the Rating 77088 entity there may be one TendencyCode 77120 attribute.

The FinancialData 77124 package includes a FinancialData 77126 entity. The FinancialData 77126 entity has a cardinality of 0 . . . 1 77128 meaning that for each instance of the FinancialData 77124 package there may be one FinancialData 77126 entity. The FinancialData 77126 entity includes an Item 77130 subordinate entity.

The Item 77130 entity has a cardinality of 1 . . . n 77132 meaning that for each instance of the FinancialData 77126 entity there are one or more Item 77130 entities. The Item 77130 entity includes various attributes, namely a FiscalYear 77134, a FiscalValidityDatePeriod 77138, a BalanceSheetCurrencyCode 77142, a TotalAssetsAmount 77146 and an AnnualSalesAmount 77150. The FiscalYear 77134 attribute has a cardinality of 1 77136 meaning that for each instance of the Item 77130 entity there is one FiscalYear 77134 attribute. The FiscalValidityDatePeriod 77138 attribute has a cardinality of 1 77140 meaning that for each instance of the Item 77130 entity there is one FiscalValidityDatePeriod 77138 attribute. The BalanceSheetCurrencyCode 77142 attribute has a cardinality of 1 77144 meaning that for each instance of the Item 77130 entity there is one BalanceSheetCurrencyCode 77142 attribute. The TotalAssetsAmount 77146 attribute has a cardinality of 1 77148 meaning that for each instance of the Item 77130 entity there is one TotalAssetsAmount 77146 attribute. The AnnualSalesAmount 77150 attribute has a cardinality of 1 77152 meaning that for each instance of the Item 77130 entity there is one AnnualSalesAmount 77150 attribute.

The FactorCorrelationModelData 77154 package includes a FactorCorrelationModelData 77156 entity. The FactorCorrelationModelData 77156 entity has a cardinality of 0 . . . 1 77158 meaning that for each instance of the FactorCorrelationModelData 77154 package there may be one FactorCorrelationModelData 77156 entity. The FactorCorrelationModelData 77156 entity includes an Item 77160 subordinate entity.

The Item 77160 entity has a cardinality of 1 . . . n 77162 meaning that for each instance of the FactorCorrelationModelData 77156 entity there are one or more Item 77160 entities. The Item 77160 entity includes various attributes, namely a CorrelationModel 77164 and a RSquaredDoubleValue 77168. The Item 77160 entity includes a FactorWeight 77172 subordinate entity. The CorrelationModel 77164 attribute has a cardinality of 1 77166 meaning that for each instance of the Item 77160 entity there is one CorrelationModel 77164 attribute. The RSquaredDoubleValue 77168 attribute has a cardinality of 1 77170 meaning that for each instance of the Item 77160 entity there is one RSquaredDoubleValue 77168 attribute.

The FactorWeight 77172 entity has a cardinality of 1 . . . n 77174 meaning that for each instance of the Item 77160 entity there are one or more FactorWeight 77172 entities. The FactorWeight 77172 entity includes various attributes, namely a ValidityDate 77176, a FactorTypeCode 77180, a FactorName 77184 and a WeightingFactorValue 77188. The ValidityDate 77176 attribute has a cardinality of 1 77178 meaning that for each instance of the FactorWeight 77172 entity there is one ValidityDate 77176 attribute. The FactorTypeCode 77180 attribute has a cardinality of 1 77182 meaning that for each instance of the FactorWeight 77172 entity there is one FactorTypeCode 77180 attribute. The FactorName 77184 attribute has a cardinality of 1 77186 meaning that for each instance of the FactorWeight 77172 entity there is one FactorName 77184 attribute. The WeightingFactorValue 77188 attribute has a cardinality of 1 77190 meaning that for each instance of the FactorWeight 77172 entity there is one WeightingFactorValue 77188 attribute.

The Property 77192 package includes a Property 77194 entity. The Property 77194 entity has a cardinality of 0 . . . n 77196 meaning that for each instance of the Property 77192 package there may be one or more Property 77194 entities. The Property 77194 entity includes various attributes, namely an ID 77198 and a Value 77202. The ID 77198 attribute has a cardinality of 1 77200 meaning that for each instance of the Property 77194 entity there is one ID 77198 attribute. The Value 77202 attribute has a cardinality of 1 77204 meaning that for each instance of the Property 77194 entity there is one Value 77202 attribute. The data types of the various packages, entities, and attributes are described with respect to FIGS. 63-1 through 63-135.

FIG. 78 shows an example configuration of an Element Structure that includes a CrdtPrtfoModFSInDatYldCrvBulkCrteReqMsg 78000 package. Specifically, this figure depicts the arrangement and hierarchy of various components such as one or more levels of packages, entities, and datatypes, shown here as 78000 through 78020. As described above, packages may be used to represent hierarchy levels. Entities are discrete business elements that are used during a business transaction. Data types are used to type object entities and interfaces with a structure. For example, the CrdtPrtfoModFSInDatYldCrvBulkCrteReqMsg 78000 includes, among other things, a CrdtPrtfoModFSInDatYldCrvBulkCrteReqMsg 78002. Accordingly, heterogeneous applications may communicate using this consistent message configured as such.

FIG. 79 shows an example configuration of an Element Structure that includes a CrdtPrtfoModFSInDatExchRateCrteReqMsg 79000 package. Specifically, this figure depicts the arrangement and hierarchy of various components such as one or more levels of packages, entities, and datatypes, shown here as 79000 through 79020. As described above, packages may be used to represent hierarchy levels. Entities are discrete business elements that are used during a business transaction. Data types are used to type object entities and interfaces with a structure. For example, the CrdtPrtfoModFSInDatExchRateCrteReqMsg 79000 includes, among other things, a CrdtPrtfoModFSInDatExchRateCrteReqMsg 79002. Accordingly, heterogeneous applications may communicate using this consistent message configured as such.

FIG. 80 shows an example configuration of an Element Structure that includes a CrdtPrtfoModFSInDatPDClbrtMtxBulkCrteReqMsg 80000 package. Specifically, this figure depicts the arrangement and hierarchy of various components such as one or more levels of packages, entities, and datatypes, shown here as 80000 through 80020. As described above, packages may be used to represent hierarchy levels. Entities are discrete business elements that are used during a business transaction. Data types are used to type object entities and interfaces with a structure. For example, the CrdtPrtfoModFSInDatPDClbrtMtxBulkCrteReqMsg 80000 includes, among other things, a CrdtPrtfoModFSInDatPDClbrtMtxBulkCrteReqMsg 80002. Accordingly, heterogeneous applications may communicate using this consistent message configured as such.

FIG. 81 shows an example configuration of an Element Structure that includes a CrdtPrtfoModFSInDatCrdtSprdBulkCrteReqMsg 81000 package. Specifically, this figure depicts the arrangement and hierarchy of various components such as one or more levels of packages, entities, and datatypes, shown here as 81000 through 81020. As described above, packages may be used to represent hierarchy levels. Entities are discrete business elements that are used during a business transaction. Data types are used to type object entities and interfaces with a structure. For example, the CrdtPrtfoModFSInDatCrdtSprdBulkCrteReqMsg 81000 includes, among other things, a CrdtPrtfoModFSInDatCrdtSprdBulkCrteReqMsg 81002. Accordingly, heterogeneous applications may communicate using this consistent message configured as such.

FIG. 82 shows an example configuration of an Element Structure that includes a CrdtPrtfoModFSInDatRatgMtxBulkCrteReqMsg 82000 package. Specifically, this figure depicts the arrangement and hierarchy of various components such as one or more levels of packages, entities, and datatypes, shown here as 82000 through 82020. As described above, packages may be used to represent hierarchy levels.

Entities are discrete business elements that are used during a business transaction. Data types are used to type object entities and interfaces with a structure. For example, the CrdtPrtfoModFSInDatRatgMtxBulkCrteReqMsg 82000 includes, among other things, a CrdtPrtfoModFSInDatRatgMtxBulkCrteReqMsg 82002. Accordingly, heterogeneous applications may communicate using this consistent message configured as such.

FIG. 83 shows an example configuration of an Element Structure that includes a CrdtPrtfoModFSInDatTOBSItmBulkCrteReqMsg 83000 package. Specifically, this figure depicts the arrangement and hierarchy of various components such as one or more levels of packages, entities, and datatypes, shown here as 83000 through 83020. As described above, packages may be used to represent hierarchy levels. Entities are discrete business elements that are used during a business transaction. Data types are used to type object entities and interfaces with a structure. For example, the CrdtPrtfoModFSInDatTOBSItmBulkCrteReqMsg 83000 includes, among other things, a CrdtPrtfoModFSInDatTOBSItmBulkCrteReqMsg 83002. Accordingly, heterogeneous applications may communicate using this consistent message configured as such.

FIG. 84 shows an example configuration of an Element Structure that includes a CrdtPrtfoModFSInDatLoanBulkCrteReqMsg 84000 package. Specifically, this figure depicts the arrangement and hierarchy of various components such as one or more levels of packages, entities, and datatypes, shown here as 84000 through 84020. As described above, packages may be used to represent hierarchy levels. Entities are discrete business elements that are used during a business transaction. Data types are used to type object entities and interfaces with a structure. For example, the CrdtPrtfoModFSInDatLoanBulkCrteReqMsg 84000 includes, among other things, a CrdtPrtfoModFSInDatLoanBulkCrteReqMsg 84002. Accordingly, heterogeneous applications may communicate using this consistent message configured as such.

FIG. 85 shows an example configuration of an Element Structure that includes a CrdtPrtfoModFSInDatOTCDeriBulkCrteReqMsg 85000 package. Specifically, this figure depicts the arrangement and hierarchy of various components such as one or more levels of packages, entities, and datatypes, shown here as 85000 through 85020. As described above, packages may be used to represent hierarchy levels. Entities are discrete business elements that are used during a business transaction. Data types are used to type object entities and interfaces with a structure. For example, the CrdtPrtfoModFSInDatOTCDeriBulkCrteReqMsg 85000 includes, among other things, a CrdtPrtfoModFSInDatOTCDeriBulkCrteReqMsg 85002. Accordingly, heterogeneous applications may communicate using this consistent message configured as such.

FIG. 86 shows an example configuration of an Element Structure that includes a CrdtPrtfoModFSInDatSecFTBulkCrteReqMsg 86000 package. Specifically, this figure depicts the arrangement and hierarchy of various components such as one or more levels of packages, entities, and datatypes, shown here as 86000 through 86020. As described above, packages may be used to represent hierarchy levels. Entities are discrete business elements that are used during a business transaction. Data types are used to type object entities and interfaces with a structure. For example, the CrdtPrtfoModFSInDatSecFTBulkCrteReqMsg 86000 includes, among other things, a CrdtPrtfoModFSInDatSecFTBulkCrteReqMsg 86002. Accordingly, heterogeneous applications may communicate using this consistent message configured as such.

FIG. 87 shows an example configuration of an Element Structure that includes a CrdtPrtfoModFSInDatStockBulkCrteReqMsg 87000 package. Specifically, this figure depicts the arrangement and hierarchy of various components such as one or more levels of packages, entities, and datatypes, shown here as 87000 through 87020. As described above, packages may be used to represent hierarchy levels. Entities are discrete business elements that are used during a business transaction. Data types are used to type object entities and interfaces with a structure. For example, the CrdtPrtfoModFSInDatStockBulkCrteReqMsg 87000 includes, among other things, a CrdtPrtfoModFSInDatStockBulkCrteReqMsg 87002. Accordingly, heterogeneous applications may communicate using this consistent message configured as such.

FIG. 88 shows an example configuration of an Element Structure that includes a CrdtPrtfoModFSInDatCrdtDeriBulkCrteReqMsg 88000 package. Specifically, this figure depicts the arrangement and hierarchy of various components such as one or more levels of packages, entities, and datatypes, shown here as 88000 through 88020. As described above, packages may be used to represent hierarchy levels. Entities are discrete business elements that are used during a business transaction. Data types are used to type object entities and interfaces with a structure. For example, the CrdtPrtfoModFSInDatCrdtDeriBulkCrteReqMsg 88000 includes, among other things, a CrdtPrtfoModFSInDatCrdtDeriBulkCrteReqMsg 88002. Accordingly, heterogeneous applications may communicate using this consistent message configured as such.

FIG. 89 shows an example configuration of an Element Structure that includes a CrdtPrtfoModFSInDatBondBulkCrteReqMsg 89000 package. Specifically, this figure depicts the arrangement and hierarchy of various components such as one or more levels of packages, entities, and datatypes, shown here as 89000 through 89020. As described above, packages may be used to represent hierarchy levels. Entities are discrete business elements that are used during a business transaction. Data types are used to type object entities and interfaces with a structure. For example, the CrdtPrtfoModFSInDatBondBulkCrteReqMsg 89000 includes, among other things, a CrdtPrtfoModFSInDatBondBulkCrteReqMsg 89002. Accordingly, heterogeneous applications may communicate using this consistent message configured as such.

FIG. 90 shows an example configuration of an Element Structure that includes a CrdtPrtfoModFSInDatBuPaBulkCrteReqMsg 90000 package. Specifically, this figure depicts the arrangement and hierarchy of various components such as one or more levels of packages, entities, and datatypes, shown here as 90000 through 90020. As described above, packages may be used to represent hierarchy levels. Entities are discrete business elements that are used during a business transaction. Data types are used to type object entities and interfaces with a structure. For example, the CrdtPrtfoModFSInDatBuPaBulkCrteReqMsg 90000 includes, among other things, a CrdtPrtfoModFSInDatBuPaBulkCrteReqMsg 90002. Accordingly, heterogeneous applications may communicate using this consistent message configured as such.

FIG. 91 shows an example configuration of an Element Structure that includes a CrdtPrtfoModFSInDatPrtfoAnlysDatBulkCrteReqMsg 91000 package. Specifically, this figure depicts the arrangement and hierarchy of various components such as one or more levels of packages, entities, and datatypes, shown here as 91000 through 91020. As described above, packages may be used to represent hierarchy levels. Entities are discrete business elements that are used during a business transaction. Data types are used to type object entities and interfaces with a structure. For example, the CrdtPrtfoModFSInDatPrtfoAnlysDatBulkCrteReqMsg 91000 includes, among other things, a CrdtPrtfoModFSInDatPrtfoAnlysDatBulkCrteReqMsg 91002. Accordingly, heterogeneous applications may communicate using this consistent message configured as such.

Credit Portfolio Analytical Result Interfaces

Figure 92:
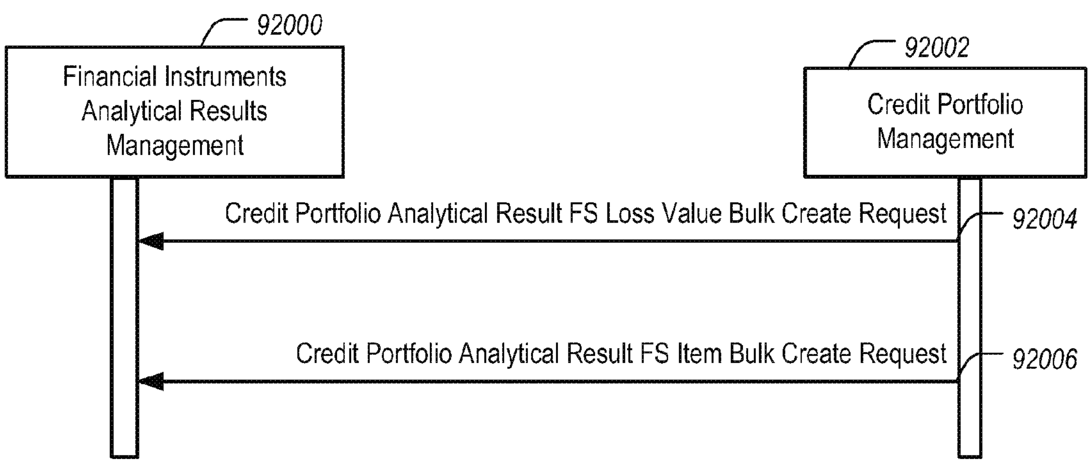
FIG. 92 illustrates an exemplary Credit Portfolio Analytical Result Message Choreography.

The message choreography of FIG. 92 describes a possible logical sequence of messages that can be used to realize a Credit Portfolio Management business scenario.

A "Financial Instruments Analytical Results Management" system 92002 can request the creation of several loss value analytical results from a "Credit Portfolio Management" system 92000, using a Credit Portfolio Analytical Result FS Loss Value Bulk Create Request message 92004 as shown, for example, in FIG. 92. The Credit Portfolio Analytical Result FS Loss Value Bulk Create Request message 92004 is received by a Create Result Loss Value as Bulk operation included in a Credit Portfolio Analytical Result In interface.

The "Financial Instruments Analytical Results Management" system 92002 can request the creation of several item analytical results from the "Credit Portfolio Management" system 92000, using a Credit Portfolio Analytical Result FS Item Bulk Create Request message 92006 as shown, for example, in FIG. 92. The Credit Portfolio Analytical Result FS Item Bulk Create Request message 92006 is received by a Create Result Item as Bulk operation included in the Create Portfolio Analytical Result In interface.

Figure 93:
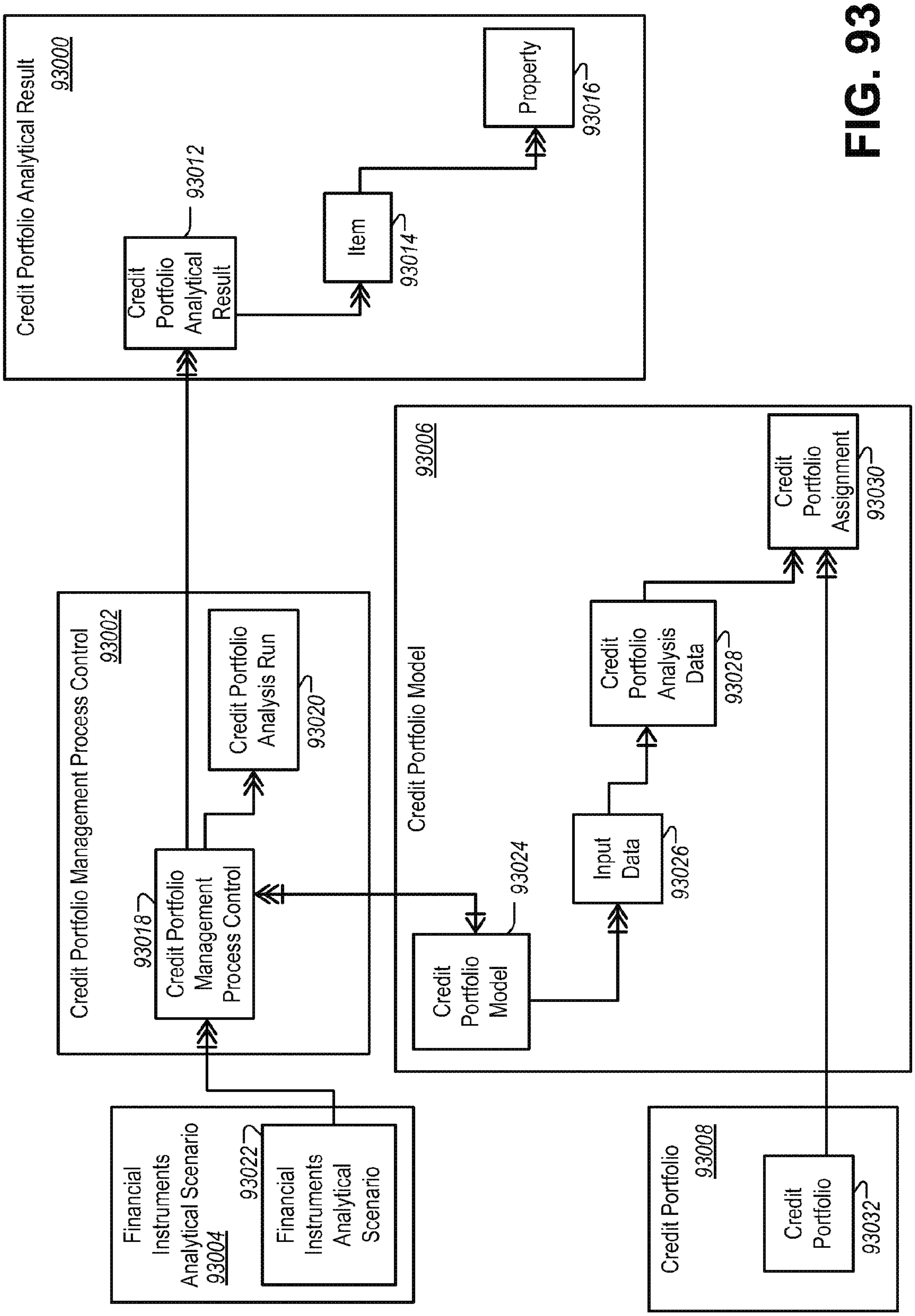
FIG. 93 illustrates an exemplary Credit Portfolio Analytical Result Object Model.

FIG. 93 illustrates an example Credit Portfolio Analytical Result business object model 93000. Specifically, this model depicts interactions among various components of the Credit Portfolio Analytical Result, as well as external components that interact with the Credit Portfolio Analytical Result (shown here as 93002 through 93010 and 93018 through 93032). Credit Portfolio Analytical Result 93000 includes elements 93012 through 93016. Credit Portfolio Analytical Result 93000 includes for example, a Property 93016.

Credit Portfolio Analytical Result is an analytical result for a credit portfolio. It is produced by a credit portfolio risk modeling and analysis tool and relevant for the measurement and management of credit portfolio risk. For example, the Credit Portfolio Analytical Result is composed of the following figures: Credit Value-at-Risk for a credit portfolio, Expected Shortfall for a credit portfolio, Economic Capital for a credit portfolio, Standard Deviation for a credit portfolio, Expected Loss for a credit portfolio, and Risk Contributions with regard to a subset of a credit portfolio for the Credit Value at Risk, Expected Shortfall, and Standard Deviation risk measures.

The Credit Portfolio Analytical Result interface performs various operations, namely a Create Result Loss Value, a Create Result Item, a Create Result Loss Value as Bulk, and a Create Result Item as Bulk. The Create Result Loss Value operation creates the request for credit portfolio analytical result on portfolio level. This inbound operation is a request for loss value. The Create Result Loss Value operation includes a CreditPortfolioAnalyticalResultFSLossValueCreateRequest message type. The structure of the CreditPortfolioAnalyticalResultFSLossValueCreateRequest message type is specified by a CrdtPrtfoAnlytRsltFSLossValueCrteReqMsg message data type. The Create Result Item operation creates the request for Credit Portfolio Management results on instrument level. This inbound operation is a request for an item. The Create Result Item operation includes a CreditPortfolioAnalyticalResultFSItemCreateRequest message type. The structure of the CreditPortfolioAnalyticalResultFSItemCreateRequest message type is specified by a CrdtPrtfoAnlytRsltFSItmCrteReqMsg message data type. The Create Result Loss Value as Bulk operation creates the request for credit portfolio analytical result on portfolio level. This inbound operation is a request for loss value. The Create Result Loss Value as Bulk operation includes a CreditPortfolioAnalyticalResultFSLossValueBulkCreateRequest message type. The structure of the CreditPortfolioAnalyticalResultFSLossValueBulkCreateRequest message type is specified by a CrdtPrtfoAnlytRsltFSLossValueBulkCrteReqMsg message data type. The Create Result Item as Bulk operation creates the request for Credit Portfolio Management results on instrument level. This inbound operation is a request for an item. The Create Result Item as Bulk operation includes a CreditPortfolioAnalyticalResultFSItemBulkCreateRequest message type. The structure of the CreditPortfolioAnalyticalResultFSItemBulkCreateRequest message type is specified by a CrdtPrtfoAnlytRsltFSItmBulkCrteReqMsg message data type.

FIGS. 94-1 through 94-10 show an example configuration of an Element Structure that includes a CreditPortfolioAnalyticalResultFSCreateRequestMessage 94000 package. The CreditPortfolioAnalyticalResultFSCreateRequestMessage 94000 package is a CrdtPortfolioAnlytlRsltFSLossValueCrteReqMsg 94004 data type. The CreditPortfolioAnalyticalResultFSCreateRequestMessage 94000 package includes a CreditPortfolioAnalyticalResultFSCreateRequestMessage 94002 entity. The CreditPortfolioAnalyticalResultFSCreateRequestMessage 94000 package includes various packages, namely a MessageHeader 94006 and a CreditPortfolioAnalyticalResult 94012.

The MessageHeader 94006 package is a BusinessDocumentMessageHeader 94010 data type. The MessageHeader 94006 package includes a MessageHeader 94008 entity.

The CreditPortfolioAnalyticalResult 94012 package includes a CreditPortfolioAnalyticalResult 94014 entity. The CreditPortfolioAnalyticalResult 94012 package includes various packages, namely a CreditPortfolioManagementProcessControl 94056 and an Item 94128. A CreditPortfolioAnalyticalResult creates the request for Credit Portfolio Management results on instrument level. The CreditPortfolioAnalyticalResult 94014 entity includes various attributes, namely an ID 94016, a CreationDateTime 94020, an ExpectedLossAmount 94024, an UnexpectedLossAmount 94028, an ExpectedShortfallAmount 94032, a CreditValueAtRiskAmount 94036, an EconomicCapitalAmount 94040, a TotalExposureAmount 94044, a MeanValueofLossesAmount 94048 and a PortfolioDiversificationDecimalValue 94052.

The ID 94016 attribute is a PDT_CreditPortfolioAnalyticalResult 94018 data type. A CreditPortfolioAnalyticalResult is a unique identification for a credit portfolio analytical result. The CreationDateTime 94020 attribute is a GLOBAL_DateTime 94022 data type. A CreationDateTime is the specification of an exact day and time.

The ExpectedLossAmount 94024 attribute is an Amount 94026 data type. In order to consider stochastic LGDs the Expected LGD is the expected value of the LGD value distribution. Together with the LGD Shape Parameter it determines the density function of LGD when assuming that LGD is beta distributed. The UnexpectedLossAmount 94028 attribute is an Amount 94030 data type. An UnexpectedLossAmount is the standard deviation of Loss Distribution. The ExpectedShortfallAmount 94032 attribute is an Amount 94034 data type. An ExpectedShortfallAmount is the expected shortfall of the portfolio. The CreditValueAtRiskAmount 94036 attribute is an Amount 94038 data type. A CreditValueAtRiskAmount is the credit value at risk for the portfolio. The EconomicCapitalAmount 94040 attribute is an Amount 94042 data type. An EconomicCapitalAmount is the economic loss amount. The TotalExposureAmount 94044 attribute is an Amount 94046 data type. A TotalExposureAmount is the total exposure amount of all portfolio instruments. Different evaluation approaches for different portfolio instruments are possible. The MeanValueofLossesAmount 94048 attribute is an Amount 94050 data type. A MeanValueofLossesAmount is the mean value of the losses. The PortfolioDiversificationDecimalValue 94052 attribute is a DecimalValue 94054 data type.

The CreditPortfolioManagementProcessControl 94056 package includes various entities, namely a CreditPortfolioManagementProcessControl 94058 and a LossDistribution 94110. The CreditPortfolioManagementProcessControl 94056 package includes various packages, namely a CreditPortfolioModel 94094 and a LossDistribution 94108. The CreditPortfolioManagementProcessControl 94058 entity includes various attributes, namely an ID 94060, a DataTransferID 94064 and a ValidityDate 94068. The CreditPortfolioManagementProcessControl 94058 entity includes a CreditPortfolioAnalysisRun 94072 subordinate entity. The ID 94060 attribute is a PDT_CreditPortfolioManagementProcessControlID 94062 data type. The DataTransferID 94064 attribute is a PDT_CreditPortfolioManagementProcessControlDataTransferID 94066 data type. The ValidityDate 94068 attribute is a Date 94070 data type. The CreditPortfolioAnalysisRun 94072 entity includes various attributes, namely an ID 94074, a LossDefinitionParadigmCode 94078, a Duration 94082, a SimulationTrialsNumberValue 94086 and a ConfidenceLevelCode 94090. The ID 94074 attribute is a PDT_CreditPortfolioAnalysisRunID 94076 data type. The LossDefinitionParadigmCode 94078 attribute is a Code 94080 data type. A LossDefinitionParadigmCode is the code of the loss definition paradigm, e.g., a credit migration approach vs a default-only approach. The Duration 94082 attribute is a Duration 94084 data type. A Duration is a period of time of a particular length without a fixed start or end time. This period of time is expressed, for example, in years or months. The SimulationTrialsNumberValue 94086 attribute is a NumberValue 94088 data type. A SimulationTrialsNumberValue is the number of simulation trials of the credit portfolio model analysis. The ConfidenceLevelCode 94090 attribute is a Code 94092 data type. A ConfidenceLevelCode is the code of the confidence level. The LossDistribution 94110 entity includes various attributes, namely a LossAmount 94112, a LossPercent 94116, a NumberOfSimulatedLossesNumberValue 94120 and a RelativeNumberOfSimulatedLossesDecimalValue 94124. The LossAmount 94112 attribute is an Amount 94114 data type. A LossAmount is the amount of losses for a given loss interval.

The LossPercent 94116 attribute is a Percentage 94118 data type. A LossPercent is the relative loss of the given loss interval according to the total loss. The NumberOfSimulatedLossesNumberValue 94120 attribute is a NumberValue 94122 data type. A NumberOfSimulatedLossesNumberValue is the number of simulated losses for the given loss interval. The RelativeNumberOfSimulatedLossesDecimalValue 94124 attribute is a DecimalValue 94126 data type. A RelativeNumberOfSimulatedLossesDecimalValue is the relative number of simulated losses for the given loss interval.

The CreditPortfolioModel 94094 package includes a CreditPortfolioModel 94096 entity. The CreditPortfolioModel 94096 entity includes an ID 94098 attribute. The CreditPortfolioModel 94096 entity includes a CreditPortfolio 94102 subordinate entity.

The ID 94098 attribute is a PDT_CreditPortfolioModelID 94100 data type. The CreditPortfolio 94102 entity includes an ID 94104 attribute. The ID 94104 attribute is a PDT_CreditPortfolioID 94106 data type.

The LossDistribution 94108 package includes a LossDistribution 94110 entity. The LossDistribution 94110 entity includes various attributes, namely a LossAmount 94112, a LossPercent 94116, a NumberOfSimulatedLossesNumberValue 94120 and a RelativeNumberOfSimulatedLossesDecimalValue 94124. The LossAmount 94112 attribute is an Amount 94114 data type. A LossAmount is the amount of losses for a given loss interval.

The LossPercent 94116 attribute is a Percentage 94118 data type. A LossPercent is the relative loss of the given loss interval according to the total loss. The NumberOfSimulatedLossesNumberValue 94120 attribute is a NumberValue 94122 data type. A NumberOfSimulatedLossesNumberValue is the number of simulated losses for the given loss interval. The RelativeNumberOfSimulatedLossesDecimalValue 94124 attribute is a DecimalValue 94126 data type. A RelativeNumberOfSimulatedLossesDecimalValue is the relative number of simulated losses for the given loss interval.

The Item 94128 package includes an Item 94130 entity. A CreditPortfoliolAnalyticalResultItem creates the request for Credit Portfolio Management results on instrument level. The Item 94130 entity includes various attributes, namely an ID 94132, a FinancialInstrumentID 94136, a FinancialInstrumentCategoryCode 94140, a StandardisedFinancialInstrumentAccountID 94144, a GuaranteeID 94148, an ExposureID 94152, an AggregationID 94156, an ExpectedLossAmount 94160, an UnexpectedLossAmount 94164, a DiversificationDecimalValue 94170, a ContributionToExpectedShortfallAmount 94174, a ContributionToCreditValueAtRiskAmount 94178, a ContributionToEconomicCapitalAccordingToExpectedShortfallAmount 94182, a ContributionToEconomicCapitalAccordingToCreditValueAtRiskAmount 94186 and an ExposureAmount 94190. The ID 94132 attribute is a PDT_CreditPortfolioAnalyticalResultItemID 94134 data type. A CreditPortfoliolAnalyticalResultItemID is a unique identification for a credit portfolio analytical result item. The FinancialInstrumentID 94136 attribute is a BusinessTransactionDocumentID 94138 data type. A BusinessTransactionDocumentID is a unique identifier for a business transaction document. The FinancialInstrumentCategoryCode 94140 attribute is a FinancialInstrumentCategoryCode 94142 data type. A FinancialInstrumentCategoryCode is the coded representation of the category of a financial instrument. The StandardisedFinancialInstrumentAccountID 94144 attribute is a FinancialInstrumentAccountID 94146 data type. A FinancialInstrumentAccountID is the unique identifier of an account for financial instruments. The GuaranteeID 94148 attribute is an Identifier 94150 data type. A GuaranteeID is an unique identification for guarantee. The ExposureID 94152 attribute is an Identifier 94154 data type. An ExposureID is a unique identification for an exposure. The AggregationID 94156 attribute is an Identifier 94158 data type. An AggregationID is a unique identification for an aggregation ID. The ExpectedLossAmount 94160 attribute is an Amount 94162 data type. In order to consider stochastic LGDs the Expected LGD is the expected value of the LGD value distribution. Together with the LGD Shape Parameter it determines the density function of LGD when assuming that LGD is beta distributed. The UnexpectedLossAmount 94164 attribute is an Amount 94166 data type. An UnexpectedLossAmount is the standard deviation of the loss distribution with regard to the loss item. A ContributionToUnexpectedLossAmount is the contribution of the loss item to the unexpected loss amount of the portfolio. The DiversificationDecimalValue 94170 attribute is a DecimalValue 94172 data type. The ContributionToExpectedShortfallAmount 94174 attribute is an Amount 94176 data type. A ContributionToExpectedShortfallAmount is the contribution of the loss item to the expected shortfall amount of the portfolio. The ContributionToCreditValueAtRiskAmount 94178 attribute is an Amount 94180 data type. A ContributionToCreditValueAtRiskAmount is the contribution of the loss item to the credit value at risk amount. The ContributionToEconomicCapitalAccordingToExpectedShortfallAmount 94182 attribute is an Amount 94184 data type. A ContributionToEconomicCapitalAccordingToExpectedShortfallAmount is the contribution of the loss item to the economic capital according to the expected shortfall amount.

The ContributionToEconomicCapitalAccordingToCreditValueAtRiskAmount 94186 attribute is an Amount 94188 data type. A ContributionToEconomicCapitalAccordingToCreditValueAtRiskAmount is the contribution of the loss item to the economic capital according to the credit value at risk amount. The ExposureAmount 94190 attribute is an Amount 94192 data type. An ExposureAmount is the exposure amount of the loss item.

FIGS. 95-1 through 95-6 show an example configuration of an Element Structure that includes a CrdtPrtfoAnlytRsltFSLossValueCrteReqMsg 95000 package. The CrdtPrtfoAnlytRsltFSLossValueCrteReqMsg 95000 package includes a CrdtPrtfoAnlytRsltFSLossValueCrteReqMsg 95002 entity. The CrdtPrtfoAnlytRsltFSLossValueCrteReqMsg 95000 package includes various packages, namely a MessageHeader 95004 and a CreditPortfolioAnalyticalResult 95010.

The MessageHeader 95004 package includes a MessageHeader 95006 entity. The MessageHeader 95006 entity has a cardinality of 1 95008 meaning that for each instance of the MessageHeader 95004 package there is one MessageHeader 95006 entity.

The CreditPortfolioAnalyticalResult 95010 package includes a CreditPortfolioAnalyticalResult 95012 entity. The CreditPortfolioAnalyticalResult 95010 package includes various packages, namely a CreditPortfolioManagementProcessControl 95056 and a LossDistribution 95114. The CreditPortfolioAnalyticalResult 95012 entity has a cardinality of 1 95014 meaning that for each instance of the CreditPortfolioAnalyticalResult 95010 package there is one CreditPortfolioAnalyticalResult 95012 entity. The CreditPortfolioAnalyticalResult 95012 entity includes various attributes, namely an ID 95016, a CreationDateTime 95020, an ExpectedLossAmount 95024, an UnexpectedLossAmount 95028, an ExpectedShortfallAmount 95032, a CreditValueAtRiskAmount 95036, an EconomicCapitalAmount 95040, a TotalExposureAmount 95044, a MeanValueOfLossesAmount 95048 and a PortfolioDiversificationDecimalValue 95052. The ID 95016 attribute has a cardinality of 1 95018 meaning that for each instance of the CreditPortfolioAnalyticalResult 95012 entity there is one ID 95016 attribute. The CreationDateTime 95020 attribute has a cardinality of 1 95022 meaning that for each instance of the CreditPortfolioAnalyticalResult 95012 entity there is one CreationDateTime 95020 attribute. The ExpectedLossAmount 95024 attribute has a cardinality of 0 . . . 1 95026 meaning that for each instance of the CreditPortfolioAnalyticalResult 95012 entity there may be one ExpectedLossAmount 95024 attribute. The UnexpectedLossAmount 95028 attribute has a cardinality of 0 . . . 1 95030 meaning that for each instance of the CreditPortfolioAnalyticalResult 95012 entity there may be one UnexpectedLossAmount 95028 attribute. The ExpectedShortfallAmount 95032 attribute has a cardinality of 0 . . . 1 95034 meaning that for each instance of the CreditPortfolioAnalyticalResult 95012 entity there may be one ExpectedShortfallAmount 95032 attribute. The CreditValueAtRiskAmount 95036 attribute has a cardinality of 0 . . . 1 95038 meaning that for each instance of the CreditPortfolioAnalyticalResult 95012 entity there may be one CreditValueAtRiskAmount 95036 attribute. The EconomicCapitalAmount 95040 attribute has a cardinality of 0 . . . 1 95042 meaning that for each instance of the CreditPortfolioAnalyticalResult 95012 entity there may be one EconomicCapitalAmount 95040 attribute. The TotalExposureAmount 95044 attribute has a cardinality of 0 . . . 1 95046 meaning that for each instance of the CreditPortfolioAnalyticalResult 95012 entity there may be one TotalExposureAmount 95044 attribute. The MeanValueOfLossesAmount 95048 attribute has a cardinality of 0 . . . 1 95050 meaning that for each instance of the CreditPortfolioAnalyticalResult 95012 entity there may be one MeanValueOfLossesAmount 95048 attribute. The PortfolioDiversificationDecimalValue 95052 attribute has a cardinality of 0 . . . 1 95054 meaning that for each instance of the CreditPortfolioAnalyticalResult 95012 entity there may be one PortfolioDiversificationDecimalValue 95052 attribute.

The CreditPortfolioManagementProcessControl 95056 package includes a CreditPortfolioManagementProcessControl 95058 entity. The CreditPortfolioManagementProcessControl 95058 entity has a cardinality of 1 95060 meaning that for each instance of the CreditPortfolioManagementProcessControl 95056 package there is one CreditPortfolioManagementProcessControl 95058 entity. The CreditPortfolioManagementProcessControl 95058 entity includes various attributes, namely an ID 95062, a DataTransferID 95066 and a ValidityDate 95070. The CreditPortfolioManagementProcessControl 95058 entity includes various subordinate entities, namely a CreditPortfolioAnalysisRun 95074 and a CreditPortfolioModel 95098. The ID 95062 attribute has a cardinality of 1 95064 meaning that for each instance of the CreditPortfolioManagementProcessControl 95058 entity there is one ID 95062 attribute. The DataTransferID 95066 attribute has a cardinality of 1 95068 meaning that for each instance of the CreditPortfolioManagementProcessControl 95058 entity there is one DataTransferID 95066 attribute. The ValidityDate 95070 attribute has a cardinality of 1 95072 meaning that for each instance of the CreditPortfolioManagementProcessControl 95058 entity there is one ValidityDate 95070 attribute.

The CreditPortfolioAnalysisRun 95074 entity has a cardinality of 1 95076 meaning that for each instance of the CreditPortfolioManagementProcessControl 95058 entity there is one CreditPortfolioAnalysisRun 95074 entity. The CreditPortfolioAnalysisRun 95074 entity includes various attributes, namely an ID 95078, a LossDefinitionParadigmCode 95082, a Duration 95086, a SimulationTrialsNumberValue 95090 and a ConfidenceLevelCode 95094. The ID 95078 attribute has a cardinality of 1 95080 meaning that for each instance of the CreditPortfolioAnalysisRun 95074 entity there is one ID 95078 attribute. The LossDefinitionParadigmCode 95082 attribute has a cardinality of 0 . . . 1

95084 meaning that for each instance of the CreditPortfolioAnalysisRun 95074 entity there may be one LossDefinitionParadigmCode 95082 attribute. The Duration 95086 attribute has a cardinality of 0 . . . 1 95088 meaning that for each instance of the CreditPortfolioAnalysisRun 95074 entity there may be one Duration 95086 attribute. The SimulationTrialsNumberValue 95090 attribute has a cardinality of 0 . . . 1 95092 meaning that for each instance of the CreditPortfolioAnalysisRun 95074 entity there may be one SimulationTrialsNumberValue 95090 attribute. The ConfidenceLevelCode 95094 attribute has a cardinality of 0 . . . 1 95096 meaning that for each instance of the CreditPortfolioAnalysisRun 95074 entity there may be one ConfidenceLevelCode 95094 attribute.

The CreditPortfolioModel 95098 entity has a cardinality of 1 95100 meaning that for each instance of the CreditPortfolioManagementProcessControl 95058 entity there is one CreditPortfolioModel 95098 entity. The CreditPortfolioModel 95098 entity includes an ID 95102 attribute. The CreditPortfolioModel 95098 entity includes a CreditPortfolio 95106 subordinate entity. The ID 95102 attribute has a cardinality of 1 95104 meaning that for each instance of the CreditPortfolioModel 95098 entity there is one ID 95102 attribute.

The CreditPortfolio 95106 entity has a cardinality of 1 95108 meaning that for each instance of the CreditPortfolioModel 95098 entity there is one CreditPortfolio 95106 entity. The CreditPortfolio 95106 entity includes an ID 95110 attribute. The ID 95110 attribute has a cardinality of 1 95112 meaning that for each instance of the CreditPortfolio 95106 entity there is one ID 95110 attribute.

The LossDistribution 95114 package includes a LossDistribution 95116 entity. The LossDistribution 95116 entity has a cardinality of 0 . . . n 95118 meaning that for each instance of the LossDistribution 95114 package there may be one or more LossDistribution 95116 entities. The LossDistribution 95116 entity includes various attributes, namely a LossAmount 95120, a LossPercent 95124, a NumberOfSimulatedLossesNumberValue 95128 and a RelativeNumberOfSimulatedLossesDecimalValue 95132. The LossAmount 95120 attribute has a cardinality of 1 95122 meaning that for each instance of the LossDistribution 95116 entity there is one LossAmount 95120 attribute. The LossPercent 95124 attribute has a cardinality of 0 . . . 1 95126 meaning that for each instance of the LossDistribution 95116 entity there may be one LossPercent 95124 attribute. The NumberOfSimulatedLossesNumberValue 95128 attribute has a cardinality of 0 . . . 1 95130 meaning that for each instance of the LossDistribution 95116 entity there may be one NumberOfSimulatedLossesNumberValue 95128 attribute. The RelativeNumberOfSimulatedLossesDecimalValue 95132 attribute has a cardinality of 0 . . . 1 95134 meaning that for each instance of the LossDistribution 95116 entity there may be one RelativeNumberOfSimulatedLossesDecimalValue 95132 attribute. The data types of the various packages, entities, and attributes shown in FIG. 95 are described with respect to FIGS. 94-1 through 94-10.

FIGS. 96-1 through 96-7 show an example configuration of an Element Structure that includes a CrdtPrtfoAnlytRsltFSItmCrteReqMsg 96000 package. The CrdtPrtfoAnlytRsltFSItmCrteReqMsg 96000 package includes a CrdtPrtfoAnlytRsltFSItmCrteReqMsg 96002 entity. The CrdtPrtfoAnlytRsltFSItmCrteReqMsg 96000 package includes various packages, namely a MessageHeader 96004 and a CreditPortfolioAnalyticalResult 96010.

The MessageHeader 96004 package includes a MessageHeader 96006 entity. The MessageHeader 96006 entity has a cardinality of 1 96008 meaning that for each instance of the MessageHeader 96004 package there is one MessageHeader 96006 entity.

The CreditPortfolioAnalyticalResult 96010 package includes a CreditPortfolioAnalyticalResult 96012 entity. The CreditPortfolioAnalyticalResult 96010 package includes various packages, namely a CreditPortfolioManagementProcessControl 96024 and an Item 96082. The CreditPortfolioAnalyticalResult 96012 entity has a cardinality of 1 96014 meaning that for each instance of the CreditPortfolioAnalyticalResult 96010 package there is one CreditPortfolioAnalyticalResult 96012 entity. The CreditPortfolioAnalyticalResult 96012 entity includes various attributes, namely an ID 96016 and a CreationDateTime 96020. The ID 96016 attribute has a cardinality of 1 96018 meaning that for each instance of the CreditPortfolioAnalyticalResult 96012 entity there is one ID 96016 attribute. The CreationDateTime 96020 attribute has a cardinality of 1 96022 meaning that for each instance of the CreditPortfolioAnalyticalResult 96012 entity there is one CreationDateTime 96020 attribute.

The CreditPortfolioManagementProcessControl 96024 package includes a CreditPortfolioManagementProcessControl 96026 entity. The CreditPortfolioManagementProcessControl 96026 entity has a cardinality of 1 96028 meaning that for each instance of the CreditPortfolioManagementProcessControl 96024 package there is one CreditPortfolioManagementProcessControl 96026 entity. The CreditPortfolioManagementProcessControl 96026 entity includes various attributes, namely an ID 96030, a DataTransferID 96034 and a ValidityDate 96038. The CreditPortfolioManagementProcessControl 96026 entity includes various subordinate entities, namely a CreditPortfolioAnalysisRun 96042 and a CreditPortfolioModel 96066. The ID 96030 attribute has a cardinality of 1 96032 meaning that for each instance of the CreditPortfolioManagementProcessControl 96026 entity there is one ID 96030 attribute. The DataTransferID 96034 attribute has a cardinality of 1 96036 meaning that for each instance of the CreditPortfolioManagementProcessControl 96026 entity there is one DataTransferID 96034 attribute. The ValidityDate 96038 attribute has a cardinality of 1 96040 meaning that for each instance of the CreditPortfolioManagementProcessControl 96026 entity there is one ValidityDate 96038 attribute.

The CreditPortfolioAnalysisRun 96042 entity has a cardinality of 1 96044 meaning that for each instance of the CreditPortfolioManagementProcessControl 96026 entity there is one CreditPortfolioAnalysisRun 96042 entity. The CreditPortfolioAnalysisRun 96042 entity includes various attributes, namely an ID 96046, a LossDefinitionParadigmCode 96050, a Duration 96054, a SimulationTrialsNumberValue 96058 and a ConfidenceLevelCode 96062. The ID 96046 attribute has a cardinality of 1 96048 meaning that for each instance of the CreditPortfolioAnalysisRun 96042 entity there is one ID 96046 attribute. The LossDefinitionParadigmCode 96050 attribute has a cardinality of 1 96052 meaning that for each instance of the CreditPortfolioAnalysisRun 96042 entity there is one LossDefinitionParadigmCode 96050 attribute. The Duration 96054 attribute has a cardinality of 1 96056 meaning that for each instance of the CreditPortfolioAnalysisRun 96042 entity there is one Duration 96054 attribute. The SimulationTrialsNumberValue 96058 attribute has a cardinality of 1 96060 meaning that for each instance of the CreditPortfolioAnalysisRun 96042 entity there is one SimulationTrialsNumberValue 96058 attribute. The ConfidenceLevelCode 96062 attribute has a cardinality of 1 96064 meaning that for each instance of the CreditPortfolioAnalysisRun 96042 entity there is one ConfidenceLevelCode 96062 attribute.

The CreditPortfolioModel 96066 entity has a cardinality of 1 96068 meaning that for each instance of the CreditPortfolioManagementProcessControl 96026 entity there is one CreditPortfolioModel 96066 entity. The CreditPortfolioModel 96066 entity includes an ID 96070 attribute. The CreditPortfolioModel 96066 entity includes a CreditPortfolio 96074 subordinate entity. The ID 96070 attribute has a cardinality of 1 96072 meaning that for each instance of the CreditPortfolioModel 96066 entity there is one ID 96070 attribute. The CreditPortfolio 96074 entity has a cardinality of 1 96076 meaning that for each instance of the CreditPortfolioModel 96066 entity there is one CreditPortfolio 96074 entity. The CreditPortfolio 96074 entity includes an ID 96078 attribute. The ID 96078 attribute has a cardinality of 1 96080 meaning that for each instance of the CreditPortfolio 96074 entity there is one ID 96078 attribute.

The Item 96082 package includes an Item 96084 entity. The Item 96084 entity has a cardinality of 1 . . . n 96086 meaning that for each instance of the Item 96082 package there are one or more Item 96084 entities. The Item 96084 entity includes various attributes, namely an ID 96088, a FinancialInstrumentID 96092, a FinancialInstrumentCategoryCode 96096, a StandardisedFinancialInstrumentAccountID 96100, a GuaranteeID 96104, an ExposureID 96108, an AggregationID 96112, an ExpectedLossAmount 96116, an UnexpectedLossAmount 96120, a ContributionToUnexpectedLossAmount 96124, a DiversificationDecimalValue 96128, a ContributionToExpectedShortfallAmount 96132, a ContributionToCreditValueAtRiskAmount 96136, a ContributionToEconomicCapitalAccordingToExpectedShortfallAmount 96140, a ContributionToEconomicCapitalAccordingToCreditValueAtRiskAmount 96144 and an ExposureAmount 96148. The ID 96088 attribute has a cardinality of 1 96090 meaning that for each instance of the Item 96084 entity there is one ID 96088 attribute. The FinancialInstrumentID 96092 attribute has a cardinality of 0 . . . 1 96094 meaning that for each instance of the Item 96084 entity there may be one FinancialInstrumentID 96092 attribute. The FinancialInstrumentCategoryCode 96096 attribute has a cardinality of 0 . . . 1 96098 meaning that for each instance of the Item 96084 entity there may be one FinancialInstrumentCategoryCode 96096 attribute. The StandardisedFinancialInstrumentAccountID 96100 attribute has a cardinality of 0 . . . 1 96102 meaning that for each instance of the Item 96084 entity there may be one StandardisedFinancialInstrumentAccountID 96100 attribute. The GuaranteeID 96104 attribute has a cardinality of 0 . . . 1 96106 meaning that for each instance of the Item 96084 entity there may be one GuaranteeID 96104 attribute. The ExposureID 96108 attribute has a cardinality of 0 . . . 1 96110 meaning that for each instance of the Item 96084 entity there may be one ExposureID 96108 attribute. The AggregationID 96112 attribute has a cardinality of 0 . . . 1 96114 meaning that for each instance of the Item 96084 entity there may be one AggregationID 96112 attribute. The ExpectedLossAmount 96116 attribute has a cardinality of 0 . . . 1 96118 meaning that for each instance of the Item 96084 entity there may be one ExpectedLossAmount 96116 attribute. The UnexpectedLossAmount 96120 attribute has a cardinality of 0 . . . 1 96122 meaning that for each instance of the Item 96084 entity there may be one UnexpectedLossAmount 96120 attribute. The ContributionToUnexpectedLossAmount 96124 attribute has a cardinality of 0 . . . 1 96126 meaning that for each instance of the Item 96084 entity there may be one ContributionToUnexpectedLossAmount 96124 attribute. The DiversificationDecimalValue 96128 attribute has a cardinality of 0 . . . 1 96130 meaning that for each instance of the Item 96084 entity there may be one DiversificationDecimalValue 96128 attribute. The ContributionToExpectedShortfallAmount 96132 attribute has a cardinality of 0 . . . 1 96134 meaning that for each instance of the Item 96084 entity there may be one ContributionToExpectedShortfallAmount 96132 attribute. The ContributionToCreditValueAtRiskAmount 96136 attribute has a cardinality of 0 . . . 1 96138 meaning that for each instance of the Item 96084 entity there may be one ContributionToCreditValueAtRiskAmount 96136 attribute. The ContributionToEconomicCapitalAccordingToExpectedShortfallAmount 96140 attribute has a cardinality of 0 . . . 1 96142 meaning that for each instance of the Item 96084 entity there may be one ContributionToEconomicCapitalAccordingToExpectedShortfallAmount 96140 attribute.

The ContributionToEconomicCapitalAccordingToCreditValueAtRiskAmount 96144 attribute has a cardinality of 0 . . . 1 96146 meaning that for each instance of the Item 96084 entity there may be one ContributionToEconomicCapitalAccordingToCreditValueAtRiskAmount 96144 attribute. The ExposureAmount 96148 attribute has a cardinality of 0 . . . 1 96150 meaning that for each instance of the Item 96084 entity there may be one ExposureAmount 96148 attribute. The data types of the various packages, entities, and attributes shown in FIG. 96 are described with respect to FIGS. 94-1 through 94-10.

FIG. 97 shows an example configuration of an Element Structure that includes a CrdtPrtfoAnlytRsltFSLossValueBulkCrteReqMsg 97000 package. Specifically, this figure depicts the arrangement and hierarchy of various components such as one or more levels of packages, entities, and datatypes, shown here as 97000 through 97020. As described above, packages may be used to represent hierarchy levels. Entities are discrete business elements that are used during a business transaction. Data types are used to type object entities and interfaces with a structure. For example, the CrdtPrtfoAnlytRsltFSLossValueBulkCrteReqMsg 97000 includes, among other things, a CrdtPrtfoAnlytRsltFSLossValueBulkCrteReqMsg 97002. Accordingly, heterogeneous applications may communicate using this consistent message configured as such.

FIG. 98 shows an example configuration of an Element Structure that includes a CrdtPrtfoAnlytRsltFSItmBulkCrteReqMsg 98000 package. Specifically, this figure depicts the arrangement and hierarchy of various components such as one or more levels of packages, entities, and datatypes, shown here as 98000 through 98020. As described above, packages may be used to represent hierarchy levels. Entities are discrete business elements that are used during a business transaction. Data types are used to type object entities and interfaces with a structure. For example, the CrdtPrtfoAnlytRsltFSItmBulkCrteReqMsg 98000 includes, among other things, a CrdtPrtfoAnlytRsltFSItmBulkCrteReqMsg 98002. Accordingly, heterogeneous applications may communicate using this consistent message configured as such.

Credit Portfolio Management Process Control Interfaces

Figures 1, 99:
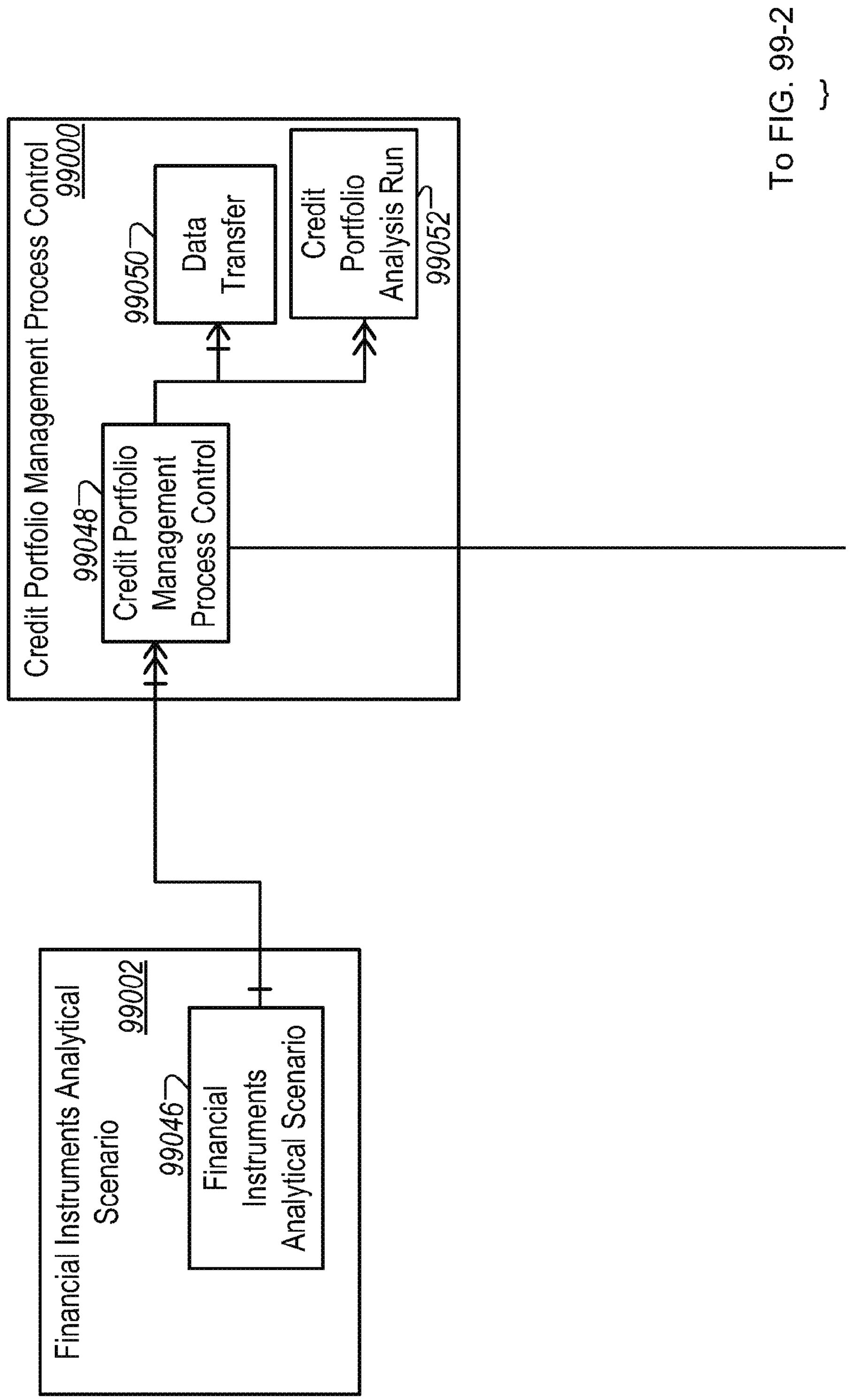
Figures 2, 99:
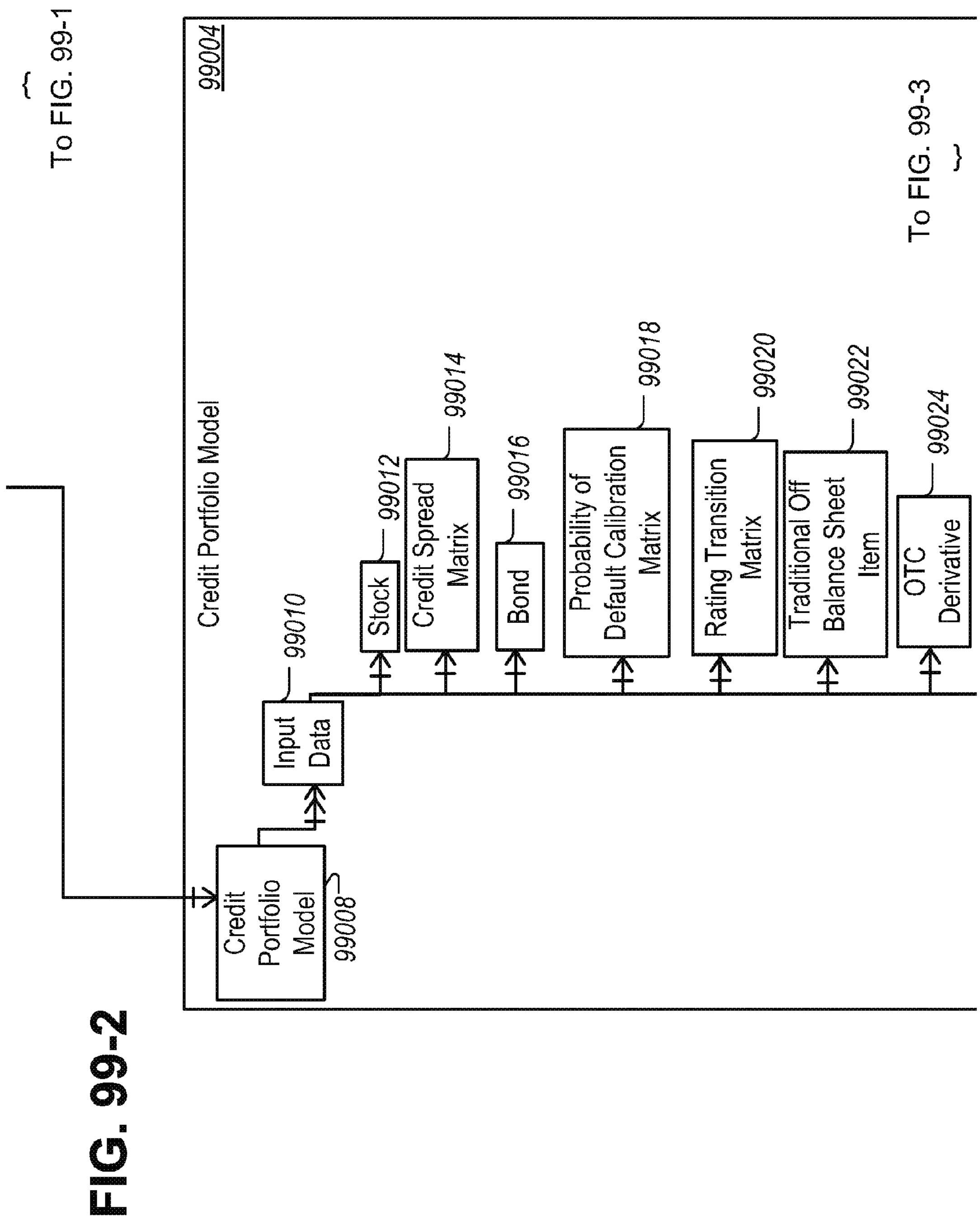
Figures 3, 99:
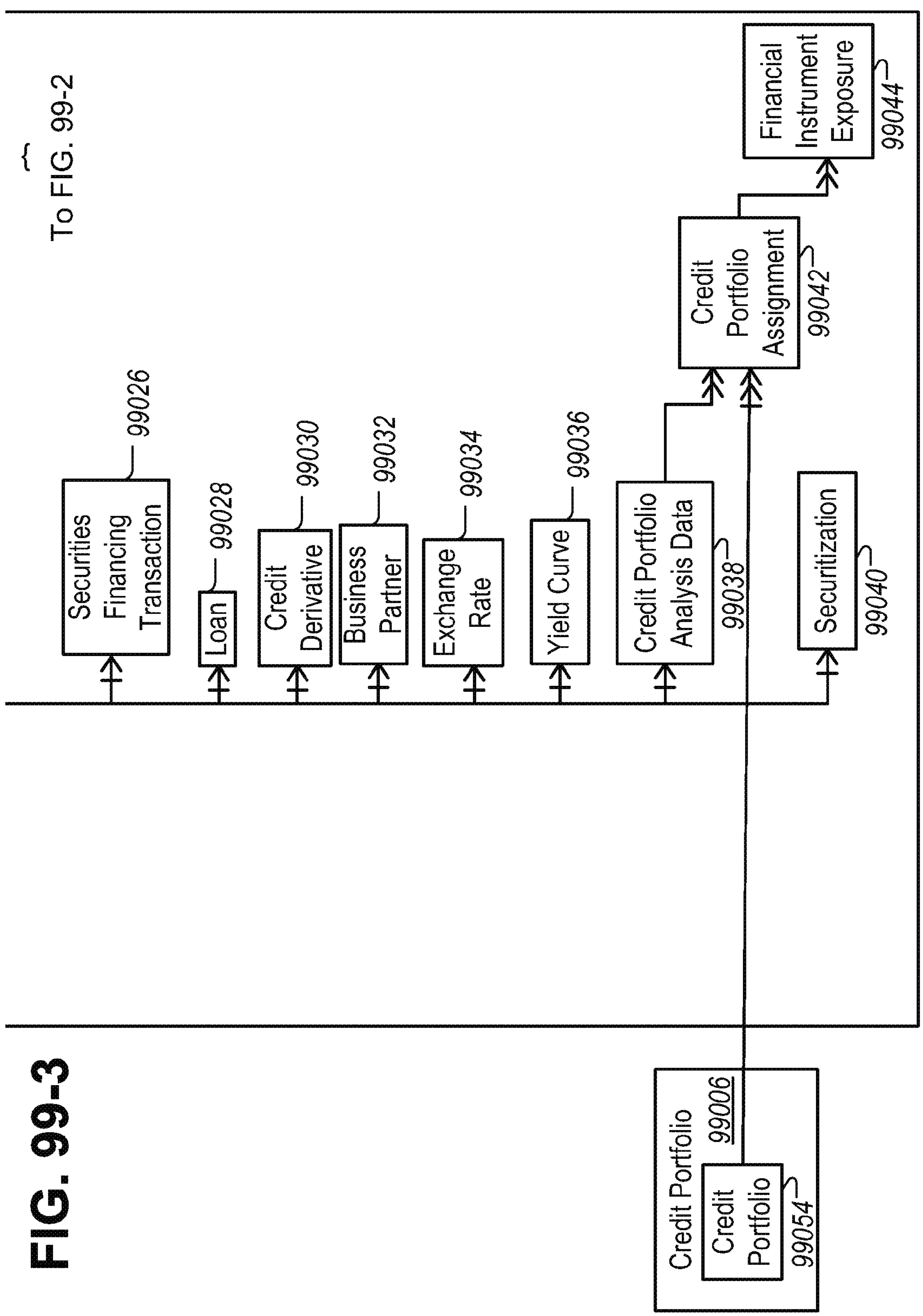

FIGS. 99-1 through 99-3 illustrate an example Credit Portfolio Management Process Control business object model 99000. Specifically, this model depicts interactions among various components of the Credit Portfolio Management Process Control, as well as external components that interact with the Credit Portfolio Management Process Control (shown here as 99002 through 99046 and 99054). Credit Portfolio Management Process Control 99000 includes elements 99048 through 99052. Credit Portfolio Management Process Control 99000 includes for example, a Data Transfer 99050.

Credit Portfolio Management Process Control is the business object that is responsible for the selection of data relevant for Credit Portfolio Management, such as data from Financial Instruments Analytical Source Data, Financial Instruments Reference Data, Financial Market Data Management and Financial Instruments Results Data. It is also responsible for the transformation of these data into the Credit Portfolio Management specific view format.

The Credit Portfolio Management Process Control interface performs various operations, namely a Request Credit Portfolio Management Process Control and a Notify of Data Transfer Status Change. The Request Credit Portfolio Management Process Control operation requests that the receiving party initializes relevant system parameters so that the data transfer can be started. The Request Credit Portfolio Management Process Control operation includes various message types, namely a Credit Portfolio Management Process Control FS Request_sync and a Credit Portfolio Management Process Control FS Confirmation_sync. The structure of the Credit Portfolio Management Process Control FS Request_sync message type is specified by a CrdtPrtfoMgmtProcCtrlFSReqMsg message data type. The structure of the Credit Portfolio Management Process Control FS Confirmation_sync message type is specified by a CrdtPrtfoMgmtProcCtrlFSConfMsg message data type. The Notify of Data Transfer Status Change operation requests that the receiving party finalizes the data transfer process. The Notify of Data Transfer Status Change operation includes a Credit Portfolio Management Process Control FS Data Transfer Status Changed Notification message type. The structure of the Credit Portfolio Management Process Control FS Data Transfer Status Changed Notification message type is specified by a CrdtPrtfoMgmtProcCtrlFSDataTransfStsChgdNotifMsg message data type.

FIGS. 100-1 through 100-11 show an example configuration of an Element Structure that includes a CreditPortfolioManagementProcessControlMessage 100000 package. The CreditPortfolioManagementProcessControlMessage 100000 package is a CreditPortfolioManagementProcessControlMessage 100004 data type. The CreditPortfolioManagementProcessControlMessage 100000 package includes a CreditPortfolioManagementProcessControlMessage 100002 entity. The CreditPortfolioManagementProcessControlMessage 100000 package includes various packages, namely a MessageHeader 100006 and a CreditPortfolioManagementProcessControl 100012.

The MessageHeader 100006 package is a BusinessDocumentMessageHeader 100010 data type. The MessageHeader 100006 package includes a MessageHeader 100008 entity.

The CreditPortfolioManagementProcessControl 100012 package is a CreditPortfolioManagementProcessControl 100016 data type. The CreditPortfolioManagementProcessControl 100012 package includes various entities, namely a CreditPortfolioManagementProcessControl 100014 and a Log 100158. The CreditPortfolioManagementProcessControl 100014 entity includes various attributes, namely an ID 100018 and a ValidityDate 100022. The ID 100018 attribute is a CreditPortfolioManagementProcessControlID 100020 data type. The ValidityDate 100022 attribute is a Date 100024 data type. A ValidityDate is the specification of an exact day of the validity of a CreditPortfolioManagementProcessControl in the Gregorian calendar. A log is for informational purposes and is optional.

FIGS. 101-1 through 101-3 show an example configuration of an Element Structure that includes a CrdtPrtfoMgmtProcCtrlFSReqMsg 101000 package. The CrdtPrtfoMgmtProcCtrlFSReqMsg 101000 package includes a CrdtPrtfoMgmtProcCtrlFSReqMsg 101002 entity. The CrdtPrtfoMgmtProcCtrlFSReqMsg 101000 package includes various packages, namely a MessageHeader 101004 and a CreditPortfolioManagementProcessControl 101010. The MessageHeader 101004 package includes a MessageHeader 101006 entity. The MessageHeader 101006 entity has a cardinality of 1 101008 meaning that for each instance of the MessageHeader 101004 package there is one MessageHeader 101006 entity.

The CreditPortfolioManagementProcessControl 101010 package includes a CreditPortfolioManagementProcessControl 101012 entity. The CreditPortfolioManagementProcessControl 101012 entity has a cardinality of 1 101014 meaning that for each instance of the CreditPortfolioManagementProcessControl 101010 package there is one CreditPortfolioManagementProcessControl 101012 entity. The CreditPortfolioManagementProcessControl 101012 entity includes various attributes, namely an ID 101016 and a ValidityDate 101020. The ID 101016 attribute has a cardinality of 1 101018 meaning that for each instance of the CreditPortfolioManagementProcessControl 101012 entity there is one ID 101016 attribute. The ValidityDate 101020 attribute has a cardinality of 1 101022 meaning that for each instance of the CreditPortfolioManagementProcessControl 101012 entity there is one ValidityDate 101020 attribute. The data types of the various packages, entities, and attributes are described with respect to FIGS. 101-1 through 101-3.

FIG. 102 shows an example configuration of an Element Structure that includes a CrdtPrtfoMgmtProcCtrlFSConfMsg 102000 package. The CrdtPrtfoMgmtProcCtrlFSConfMsg 102000 package includes a CrdtPrtfoMgmtProcCtrlFSConfMsg 102002 entity. The CrdtPrtfoMgmtProcCtrlFSConfMsg 102000 package includes various packages, namely a MessageHeader 102004, a CreditPortfolioManagementProcessControl 102010, and a Log 102026.

The MessageHeader 102004 package includes a MessageHeader 102006 entity. The MessageHeader 102006 entity has a cardinality of 1 102008 meaning that for each instance of the MessageHeader 102004 package there is one MessageHeader 102006 entity. The CreditPortfolioManagementProcessControl 102010 package includes a CreditPortfolioManagementProcessControl 102012 entity. The CreditPortfolioManagementProcessControl 102010 package includes a DataTransfer 102016 package.

The CreditPortfolioManagementProcessControl 102012 entity has a cardinality of 0 . . . 1 102014 meaning that for each instance of the CreditPortfolioManagementProcessControl 102010 package there may be one CreditPortfolioManagementProcessControl 102012 entity.

The DataTransfer 102016 package includes a DataTransfer 102018 entity. The DataTransfer 102018 entity has a cardinality of 1 102020 meaning that for each instance of the DataTransfer 102016 package there is one DataTransfer 102018 entity. The DataTransfer 102018 entity includes an ID 102022 attribute. The ID 102022 attribute has a cardinality of 1 102024 meaning that for each instance of the DataTransfer 102018 entity there is one ID 102022 attribute.

The Log 102026 package includes a Log 102028 entity. The Log 102028 entity has a cardinality of 1 102030 meaning that for each instance of the Log 102026 package there is one Log 102028 entity. The data types of the various packages, entities, and attributes are described with respect to FIG. 100.

FIGS. 103-1 through 103-6 show an example configuration of an Element Structure that includes a CrdtPrtfoMgmtProcCtrlFSDataTransfStsChgdNotifMsg 103000 package. The CrdtPrtfoMgmtProcCtrlFSDataTransfStsChgdNotifMsg 103000 package includes a CrdtPrtfoMgmtProcCtrlFSDataTransfStsChgdNotifMsg 103002 entity. The CrdtPrtfoMgmtProcCtrlFSDataTransfStsChgdNotifMsg 103000 package includes various packages, namely a MessageHeader 103004 and a CreditPortfolioManagementProcessControl 103010.

The MessageHeader 103004 package includes a MessageHeader 103006 entity. The MessageHeader 103006 entity has a cardinality of 1 103008 meaning that for each instance of the MessageHeader 103004 package there is one MessageHeader 103006 entity.

The CreditPortfolioManagementProcessControl 103010 package includes a CreditPortfolioManagementProcessControl 103012 entity. The CreditPortfolioManagementProcessControl 103012 entity has a cardinality of 1 103014 meaning that for each instance of the CreditPortfolioManagementProcessControl 103010 package there is one CreditPortfolioManagementProcessControl 103012 entity. The CreditPortfolioManagementProcessControl 103012 entity includes various attributes, namely an ID 103016 and a ValidityDate 103020. The ID 103016 attribute has a cardinality of 1 103018 meaning that for each instance of the CreditPortfolioManagementProcessControl 103012 entity there is one ID 103016 attribute. The ValidityDate 103020 attribute has a cardinality of 1 103022 meaning that for each instance of the CreditPortfolioManagementProcessControl 103012 entity there is one ValidityDate 103020 attribute. The data types of the various packages, entities, and attributes are described with respect to FIG. 100.

Financial Instrument Exposure Profile Analytical Result Interfaces

Figure 104:
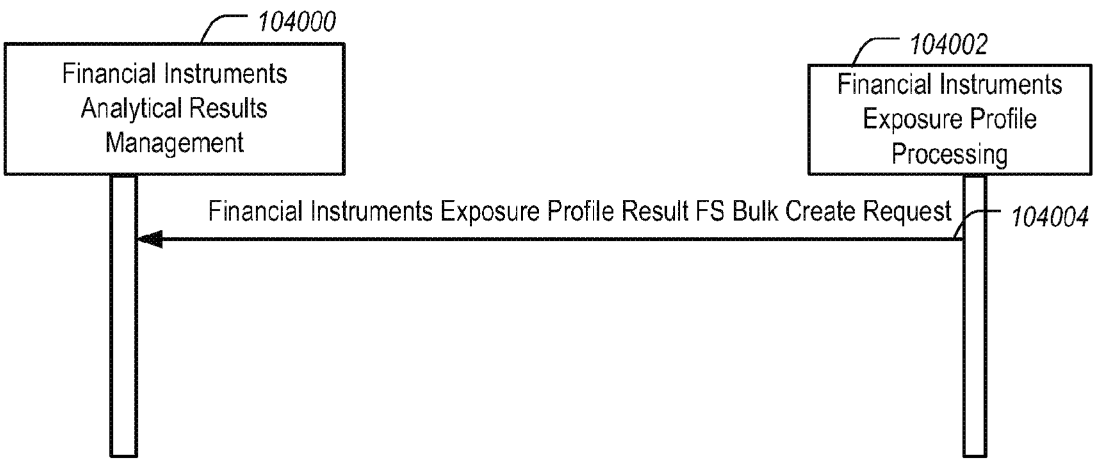
FIG. 104 illustrates an exemplary Financial Instrument Exposure Profile Analytical Result Message Choreography.

The message choreography of FIG. 104 describes a possible logical sequence of messages that can be used to realize a Credit Portfolio Management business scenario.

A "Financial Instruments Exposure Profile Processing" system 104002 can request the creation of several exposure profile results from a "Financial Instruments Analytical Results Management" system 104000, using a Financial Instruments Exposure Profile Result FS Bulk Create Request message 104004 as shown, for example, in FIG. 104. The Financial Instruments Exposure Profile Result FS Bulk Create Request message 104004 is received by a Create Result as Bulk operation included in a Financial Instruments Exposure Profile Analytical Result In interface.

Figure 105:
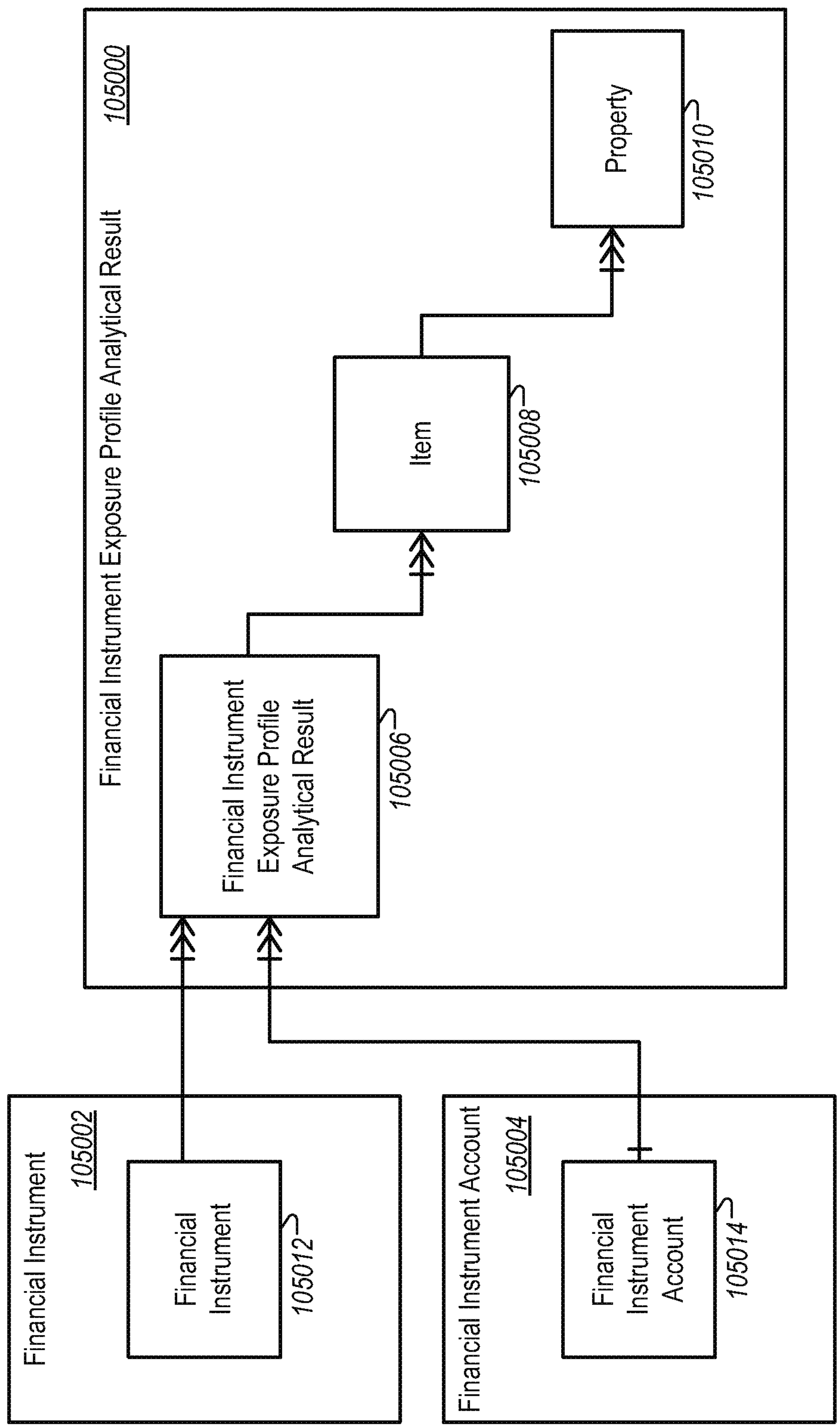
FIG. 105 shows an exemplary Financial Instrument Exposure Profile Analytical Result Object Model.

FIG. 105 illustrates an example Financial Instrument Exposure Profile Analytical Result business object model 105000. Specifically, this model depicts interactions among various components of the Financial Instrument Exposure Profile Analytical Result, as well as external components that interact with the Financial Instrument Exposure Profile Analytical Result (shown here as 105002 through 105004 and 105012 through 105014). Financial Instrument Exposure Profile Analytical Result 105000 includes elements 105006 through 105010. Financial Instrument Exposure Profile Analytical Result 105000 includes for example, an Item 105008.

Financial Instrument Exposure Profile Analytical Result is an analytical result of an exposure profile calculation of a financial instrument. The exposure profile itself is a sequence of future, discrete credit exposure amounts for pre-defined time bands up to the final maturity of the financial instrument. Exposure profiles are generated by means of an exposure profile processing, possibly provided by a third party. The Financial Instrument Exposure Profile Analytical Result interface performs various operations, namely a Create Result and a Create Result as Bulk. The Create Result operation creates the request for exposure profile data. This inbound operation is a request for creating exposure profiles. The Create Result operation includes a FinancialInstrumentExposureProfileResultFSCreateRequest message type. The structure of the FinancialInstrumentExposureProfileResultFSCreateRequest message type is specified by a FinInstrExpsrPrflAnlytlRsltFSCrteReqMsg message data type. The Create Result as Bulk operation creates the request for exposure profile data. This inbound operation is a request for creating exposure profiles. The Create Result as Bulk operation includes a FinancialInstrumentExposureProfileResultFSBulkCreateRequest message type. The structure of the FinancialInstrumentExposureProfileResultFSBulkCreateRequest message type is specified by a FinInstrExpsrPrflAnlytlRsltFSBulkCrteReqMsg message data type.

FIGS. 106-1 through 106-3 show an example configuration of an Element Structure that includes a FinancialInstrumentExposureProfileAnalyticalResultFSMessage 106000 package. The FinancialInstrumentExposureProfileAnalyticalResultFSMessage 106000 package is a FinInstrsExposureProfileResultFSCrteReqMsg 106004 data type. The FinancialInstrumentExposureProfileAnalyticalResultFSMessage 106000 package includes a FinancialInstrumentExposureProfileAnalyticalResultFSMessage 106002 entity. The FinancialInstrumentExposureProfileAnalyticalResultFSMessage 106000 package includes various packages, namely a MessageHeader 106006 and a FinancialInstrumentExposureProfileAnalyticalResult 106014.

The MessageHeader 106006 package is a BusinessDocumentMessageHeader 106012 data type. The MessageHeader 106006 package includes a MessageHeader 106008 entity. The MessageHeader 106008 entity has a cardinality of 1 106010 meaning that for each instance of the MessageHeader 106006 package there is one MessageHeader 106008 entity.

The FinancialInstrumentExposureProfileAnalyticalResult 106014 package is a FinInstrsExposureProfileResult 106020 data type. The FinancialInstrumentExposureProfileAnalyticalResult 106014 package includes a FinancialInstrumentExposureProfileAnalyticalResult 106016 entity. The FinancialInstrumentExposureProfileAnalyticalResult 106014 package includes an Item 106070 package. The FinancialInstrumentExposureProfileAnalyticalResult 106016 entity has a cardinality of 1 106018 meaning that for each instance of the FinancialInstrumentExposureProfileAnalyticalResult 106014 package there is one FinancialInstrumentExposureProfileAnalyticalResult 106016 entity. A FinancialInstrumentsExposureProfileResultFSCreateRequest creates the request for exposure profile data. The FinancialInstrumentExposureProfileAnalyticalResult 106016 entity includes various attributes, namely an ID 106022, a GroupID 106028, a FinancialInstrumentID 106034, a FinancialInstrumentCategoryCode 106040, a StandardisedFinancialInstrumentAccountID 106046, a KeyDate 106052, a CreationDateTime 106058 and a MaximumOriginalMaturityDuration 106064.

The ID 106022 attribute is a PDT_FinancialInstrumentExposureProfileAnalyticalResultID 106026 data type. The ID 106022 attribute has a cardinality of 1 106024 meaning that for each instance of the FinancialInstrumentExposureProfileAnalyticalResult 106016 entity there is one ID 106022 attribute. A FinInstrsExposureProfileResultID is a unique identification for an exposure profile result ID.

The GroupID 106028 attribute is a BusinessTransactionDocumentGroupID 106032 data type. The GroupID 106028 attribute has a cardinality of 1 106030 meaning that for each instance of the FinancialInstrumentExposureProfileAnalyticalResult 106016 entity there is one GroupID 106028 attribute. A BusinessTransactionDocumentGroupID uniquely identifies a group of business documents that are to be considered as one group within a business process.

The FinancialInstrumentID 106034 attribute is a BusinessTransactionDocumentID 106038 data type. The FinancialInstrumentID 106034 attribute has a cardinality of 0 . . . 1 106036 meaning that for each instance of the FinancialInstrumentExposureProfileAnalyticalResult 106016 entity there may be one FinancialInstrumentID 106034 attribute. A BusinessTransactionDocumentID is a unique identifier for a business transaction document.

The FinancialInstrumentCategoryCode 106040 attribute is a FinancialInstrumentCategoryCode 106044 data type. The FinancialInstrumentCategoryCode 106040 attribute has a cardinality of 0 . . . 1 106042 meaning that for each instance of the FinancialInstrumentExposureProfileAnalyticalResult 106016 entity there may be one FinancialInstrumentCategoryCode 106040 attribute. A FinancialInstrumentCategoryCode is the coded representation of the category of a financial instrument.

The StandardisedFinancialInstrumentAccountID 106046 attribute is a FinancialInstrumentAccountID 106050 data type. The StandardisedFinancialInstrumentAccountID 106046 attribute has a cardinality of 0 . . . 1 106048 meaning that for each instance of the FinancialInstrumentExposureProfileAnalyticalResult 106016 entity there may be one StandardisedFinancialInstrumentAccountID 106046 attribute. A FinancialInstrumentAccountID is the unique identifier of an account for financial instruments.

The KeyDate 106052 attribute is a Date 106056 data type. The KeyDate 106052 attribute has a cardinality of 1 106054 meaning that for each instance of the FinancialInstrumentExposureProfileAnalyticalResult 106016 entity there is one KeyDate 106052 attribute. A Date is the specification of an exact day in the Gregorian calendar. The CreationDateTime 106058 attribute is a GLOBAL_DateTime 106062 data type. The CreationDateTime 106058 attribute has a cardinality of 1 106060 meaning that for each instance of the FinancialInstrumentExposureProfileAnalyticalResult 106016 entity there is one CreationDateTime 106058 attribute. A GLOBAL_DateTime is an accurate-to-the-second time-point of a calendar day in timezone UTC.

The MaximumOriginalMaturityDuration 106064 attribute is a DAY_Duration 106068 data type. The MaximumOriginalMaturityDuration 106064 attribute has a cardinality of 0 . . . 1 106066 meaning that for each instance of the FinancialInstrumentExposureProfileAnalyticalResult 106016 entity there may be one MaximumOriginalMaturityDuration 106064 attribute.

The Item 106070 package is a FinInstrsExposureProfileResultItem 106076 data type. The Item 106070 package includes an Item 106072 entity. The Item 106072 entity has a cardinality of 0 . . . n 106074 meaning that for each instance of the Item 106070 package there may be one or more Item 106072 entities. The Item 106072 entity includes various attributes, namely a Date 106078, a PositiveExposureAmount 106084, a NegativeExposureAmount 106090 and a Property 106096.

The Date 106078 attribute is a Date 106082 data type. The Date 106078 attribute has a cardinality of 1 106080 meaning that for each instance of the Item 106072 entity there is one Date 106078 attribute. A Date is the specification of an exact day of a risk-free profile in the Gregorian calendar.

The PositiveExposureAmount 106084 attribute is an Amount 106088 data type. The PositiveExposureAmount 106084 attribute has a cardinality of 0 . . . 1 106086 meaning that for each instance of the Item 106072 entity there may be one PositiveExposureAmount 106084 attribute. A PositiveExposureAmount is the positive exposure amount of an exposure profile analytical result item. The NegativeExposureAmount 106090 attribute is an Amount 106094 data type. The NegativeExposureAmount 106090 attribute has a cardinality of 0 . . . 1 106092 meaning that for each instance of the Item 106072 entity there may be one NegativeExposureAmount 106090 attribute. A NegativeExposureAmount is the negative exposure amount of an exposure profile analytical result item.

The Property 106096 attribute is a Property 106100 data type. The Property 106096 attribute has a cardinality of 0 . . . n 106098 meaning that for each instance of the Item 106072 entity there may be one or more Property 106096 attributes. A property is an object attribute.

FIGS. 107-1 through 107-4 show an example configuration of an Element Structure that includes a FinInstrExpsrPrflAnlytlRsltFSCrteReqMsg 107000 package. The FinInstrExpsrPrflAnlytlRsltFSCrteReqMsg 107000 package is a FinInstrExpsrPrflAnlytlRsltFSCrteReqMsg 107004 data type. The FinInstrExpsrPrflAnlytlRsltFSCrteReqMsg 107000 package includes a FinInstrExpsrPrflAnlytlRsltFSCrteReqMsg 107002 entity. The FinInstrExpsrPrflAnlytlRsltFSCrteReqMsg 107000 package includes various packages, namely a MessageHeader 107006 and a FinancialInstrumentExposureProfileAnalyticalResult 107014.

The MessageHeader 107006 package is a BusinessDocumentMessageHeader 107012 data type. The MessageHeader 107006 package includes a MessageHeader 107008 entity. The MessageHeader 107008 entity has a cardinality of 1 107010 meaning that for each instance of the MessageHeader 107006 package there is one MessageHeader 107008 entity.

The FinancialInstrumentExposureProfileAnalyticalResult 107014 package is a FinInstrExpsrPrflAnlytlRsltFSCrteReqMsgAnItlRslt 107020 data type. The FinancialInstrumentExposureProfileAnalyticalResult 107014 package includes a FinancialInstrumentExposureProfileAnalyticalResult 107016 entity. The FinancialInstrumentExposureProfileAnalyticalResult 107014 package includes an Item 107070 package. The FinancialInstrumentExposureProfileAnalyticalResult 107016 entity has a cardinality of 1 107018 meaning that for each instance of the FinancialInstrumentExposureProfileAnalyticalResult 107014 package there is one FinancialInstrumentExposureProfileAnalyticalResult 107016 entity. A FinancialInstrumentsExposureProfileResultFSCreateRequest creates the request for exposure profile data. The FinancialInstrumentExposureProfileAnalyticalResult 107016 entity includes various attributes, namely an ID 107022, a GroupID 107028, a FinancialInstrumentID 107034, a FinancialInstrumentCategoryCode 107040, a StandardisedFinancialInstrumentAccountID 107046, a KeyDate 107052, a CreationDateTime 107058 and a MaximumOriginalMaturityDuration 107064.

The ID 107022 attribute is a PDT_FinancialInstrumentExposureProfileAnalyticalResultID 107026 data type. The ID 107022 attribute has a cardinality of 1 107024 meaning that for each instance of the FinancialInstrumentExposureProfileAnalyticalResult 107016 entity there is one ID 107022 attribute. A FinInstrsExposureProfileResultID is a unique identification for an exposure profile result ID.

The GroupID 107028 attribute is a BusinessTransactionDocumentGroupID 107032 data type. The GroupID 107028 attribute has a cardinality of 1 107030 meaning that for each instance of the FinancialInstrumentExposureProfileAnalyticalResult 107016 entity there is one GroupID 107028 attribute. A BusinessTransactionDocumentGroupID uniquely identifies a group of business documents that are to be considered as one group within a business process.

The FinancialInstrumentID 107034 attribute is a BusinessTransactionDocumentID 107038 data type. The FinancialInstrumentID 107034 attribute has a cardinality of 0 . . . 1 107036 meaning that for each instance of the FinancialInstrumentExposureProfileAnalyticalResult 107016 entity there may be one FinancialInstrumentID 107034 attribute. A BusinessTransactionDocumentID is a unique identifier for a business transaction document.

The FinancialInstrumentCategoryCode 107040 attribute is a FinancialInstrumentCategoryCode 107044 data type. The FinancialInstrumentCategoryCode 107040 attribute has a cardinality of 0 . . . 1 107042 meaning that for each instance of the FinancialInstrumentExposureProfileAnalyticalResult 107016 entity there may be one FinancialInstrumentCategoryCode 107040 attribute. The FinancialInstrumentCategoryCode is the coded representation of the category of a financial instrument.

The StandardisedFinancialInstrumentAccountID 107046 attribute is a FinancialInstrumentAccountID 107050 data type. The StandardisedFinancialInstrumentAccountID 107046 attribute has a cardinality of 0 . . . 1 107048 meaning that for each instance of the FinancialInstrumentExposureProfileAnalyticalResult 107016 entity there may be one StandardisedFinancialInstrumentAccountID 107046 attribute. A FinancialInstrumentAccountID is the unique identifier of an account for financial instruments.

The KeyDate 107052 attribute is a Date 107056 data type. The KeyDate 107052 attribute has a cardinality of 1 107054 meaning that for each instance of the FinancialInstrumentExposureProfileAnalyticalResult 107016 entity there is one KeyDate 107052 attribute. A Date is the specification of an exact day in the Gregorian calendar.

The CreationDateTime 107058 attribute is a GLOBAL_DateTime 107062 data type. The CreationDateTime 107058 attribute has a cardinality of 1 107060 meaning that for each instance of the FinancialInstrumentExposureProfileAnalyticalResult 107016 entity there is one CreationDateTime 107058 attribute. A GLOBAL_DateTime is the accurate-to-the-second time-point of a calendar day in timezone UTC.

The MaximumOriginalMaturityDuration 107064 attribute is a DAY_Duration 107068 data type. The MaximumOriginalMaturityDuration 107064 attribute has a cardinality of 0 . . . 1 107066 meaning that for each instance of the FinancialInstrumentExposureProfileAnalyticalResult 107016 entity there may be one MaximumOriginalMaturityDuration 107064 attribute. A Duration is a period of time of a particular length without a fixed start or end time. This period of time is expressed in years, months, days, hours, minutes, seconds, and fractions of a second. A MaximumOriginalMaturityDuration is the maximum original duration of all considered financial instruments in case of netting agreements.

The Item 107070 package is a FinInstrExpsrPrflAnlytlRsltFSCrteReqMsgAnItlRsltItm 107076 data type. The Item 107070 package includes an Item 107072 entity. The Item 107070 package includes a Property 107096 package. The Item 107072 entity has a cardinality of 0 . . . n 107074 meaning that for each instance of the Item 107070 package there may be one or more Item 107072 entities. The Item

107072 entity includes various attributes, namely a Date 107078, a PositiveExposureAmount 107084 and a NegativeExposureAmount 107090.

The Date 107078 attribute is a Date 107082 data type. The Date 107078 attribute has a cardinality of 1 107080 meaning that for each instance of the Item 107072 entity there is one Date 107078 attribute. A Date is the specification of an exact day of a risk-free profile in the Gregorian calendar.

The PositiveExposureAmount 107084 attribute is an Amount 107088 data type. The PositiveExposureAmount 107084 attribute has a cardinality of 0 . . . 1 107086 meaning that for each instance of the Item 107072 entity there may be one PositiveExposureAmount 107084 attribute. A PositiveExposureAmount is the positive exposure amount of an exposure profile analytical result item. The NegativeExposureAmount 107090 attribute is an Amount 107094 data type. The NegativeExposureAmount 107090 attribute has a cardinality of 0 . . . 1 107092 meaning that for each instance of the Item 107072 entity there may be one NegativeExposureAmount 107090 attribute. A NegativeExposureAmount is the negative exposure amount of an exposure profile analytical result item.

The Property 107096 package is a FinInstrExpsrPrflAnlytlRsltFSCrteReqMsgAnItlRsltItmProp 107102 data type. The Property 107096 package includes a Property 107098 entity. The Property 107098 entity has a cardinality of 0 . . . n 107100 meaning that for each instance of the Property 107096 package there may be one or more Property 107098 entities. A property is an object attribute. The Property 107098 entity includes various attributes, namely an ID 107104 and a Value 107110. The ID 107104 attribute is a PropertyID 107108 data type. The ID 107104 attribute has a cardinality of 1 107106 meaning that for each instance of the Property 107098 entity there is one ID 107104 attribute. The Value 107110 attribute is a PropertyValue 107114 data type. The Value 107110 attribute has a cardinality of 1 107112 meaning that for each instance of the Property 107098 entity there is one Value 107110 attribute.

FIG. 108 shows an example configuration of an Element Structure that includes a FinInstrExpsrPrflAnlytlRsltFSBulkCrteReqMsg 108000 package. The FinInstrExpsrPrflAnlytlRsltFSBulkCrteReqMsg 108000 package is a FinInstrExpsrPrflAnlytlRsltFSBulkCrteReqMsg 108004 data type. The FinInstrExpsrPrflAnlytlRsltFSBulkCrteReqMsg 108000 package includes a FinancialInstrumentsExposureProfileAnalyticalResultFSCreateRequestMessage 108002 entity. The FinInstrExpsrPrflAnlytlRsltFSBulkCrteReqMsg 108000 package includes various packages, namely a MessageHeader 108006 and a FinInstrExpsrPrflAnlytlRsltFSCrteReqMsg 108014.

The MessageHeader 108006 package is a BusinessDocumentMessageHeader 108012 data type. The MessageHeader 108006 package includes a MessageHeader 108008 entity. The MessageHeader 108008 entity has a cardinality of 1 108010 meaning that for each instance of the MessageHeader 108006 package there is one MessageHeader 108008 entity.

The FinInstrExpsrPrflAnlytlRsltFSCrteReqMsg 108014 package is a FinInstrExpsrPrflAnlytlRsltFSCrteReqMsg 108020 data type. The FinInstrExpsrPrflAnlytlRsltFSCrteReqMsg 108014 package includes a FinInstrExpsrPrflAnlytlRsltFSCrteReqMsg 108016 entity. The FinInstrExpsrPrflAnlytlRsltFSCrteReqMsg 108016 entity has a cardinality of 1 . . . n 108018 meaning that for each instance of the FinInstrExpsrPrflAnlytlRsltFSCrteReqMsg 108014 package there are one or more FinInstrExpsrPrflAnlytlRsltF- SCrteReqMsg 108016 entities. A FinancialInstrumentExposureProfileResultFSCreateRequest creates the request for exposure profile data.

Material Supply and Demand Allocation Interfaces

In the fashion industry there are several weeks or months between the order creation and the delivery of the goods to the customer. In this time period, there could be shortage in supply due to several reasons. Material Supply and Demand allocation will be used to optimally allocate the available quantities to open requirements. The MaterialSupplyAndDemandAllocation interface performs various operations, namely a MaterialSupplyAndDemandAllocationERPCreateRequestConfirmation_In, a MaterialSupplyAndDemandAllocationERPCancelRequestConfirmation_In, a MaterialSupplyAnd DemandAllocationERPByIDQueryResponse_In, a MaterialSupplyAndDemandAllocationERPItemUpdateRequestConfirmation_In, a MaterialSupplyAndDemandAllocation ERPByElementsQueryResponse_In and a Material SupplyAndDemandAllocationERPCreateCheckQueryResponse_In.

The MaterialSupplyAnd DemandAllocationERPCreateRequest Confirmation_In operation is a request to and confirmation from the Supply and Demand Matching for allocating a sales order or customer contract. The MaterialSupplyAndDemandAllocationERPCreateRequestConfirmation_In operation includes various message types, namely a MaterialSupplyAndDemandAllocationERPCreateRequest_sync and a MaterialSupplyAndDemandAllocationERPCreateConfirmation_sync. The structure of the MaterialSupplyAndDemandAllocationERPCreateRequest_sync message type is specified by a MaterialSupplyAndDemandAllocationERPCreateRequestMessage_sync message data type. The structure of the MaterialSupplyAndDemandAllocationERPCreateConfirmation_sync message type is specified by a MaterialSupplyAndDemandAllocationERPCreateConfirmationMessage_sync message data type. The MaterialSupplyAndDemandAllocationERPCancelRequestConfirmation_In operation is a request to and confirmation from the Supply and Demand Matching for de-allocating a sales order or customer contract. The MaterialSupplyAndDemandAllocationERPCancelRequestConfirmation_In operation includes various message types, namely a MaterialSupplyAndDemandAllocationERPCancelRequest_sync and a MaterialSupplyAndDemandAllocationERPCancelConfirmation_sync. The structure of the MaterialSupplyAndDemandAllocationERPCancelRequest_sync message type is specified by a MaterialSupplyAndDemandAllocationERPCancelRequestMessage_sync message data type. The structure of the MaterialSupplyAndDemandAllocationERPCancelConfirmation_sync message type is specified by a MaterialSupplyAndDemandAllocationERPCancelConfirmationMessage_sync message data type. The MaterialSupplyAndDemandAllocationERPByIDQueryResponse_In operation is a query to and response from the Supply and Demand Matching to find allocation data for a given allocation number. The MaterialSupplyAndDemandAllocationERPByIDQueryResponse_In operation includes various message types, namely a MaterialSupplyAndDemandAllocationERPByIDQuery_sync and a MaterialSupplyAndDemandAllocationERPByIDResponse_sync. The structure of the MaterialSupplyAndDemandAllocationERPByIDQuery_sync message type is specified by a MaterialSupplyAndDemandAllocationERPByIDQueryMessage_sync message data type. The structure of the MaterialSupplyAndDemandAllocationERPByIDResponse_sync message type is specified by a MaterialSupplyAndDemandAllocationERPByIDResponseMessage_sync message data type. The MaterialSupplyAndDemandAllocationERPItemUpdateRequestConfirmation_In operation is a request to and confirmation from the Supply and Demand Matching to change the status from F to R or R to F. The Material SupplyAndDemandAllocationERPItemUpdateRequestConfirmation_In operation includes various message types, namely a MaterialSupplyAndDemandAllocationERPItemUpdateRequest_sync and a MaterialSupplyAndDemandAllocationERPItemUpdateConfirmation_sync. The structure of the MaterialSupplyAndDemandAllocationERPItemUpdateRequest_sync message type is specified by a MaterialSupplyAndDemandAllocationERPUpdateRequestMessage_sync message data type. The structure of the MaterialSupplyAndDemandAllocationERPItemUpdateConfirmation_sync message type is specified by a MaterialSupplyAndDemandAllocationERPUpdateConfirmationMessage_sync message data type. The MaterialSupplyAndDemandAllocationERPByElementsQueryResponse_In operation is a query to and response from the Supply and Demand Matching to find allocation data for given selection criteria. The MaterialSupplyAndDemandAllocationERPByElementsQueryResponse_In operation includes various message types, namely a MaterialSupplyAndDemandAllocationERPByElementsQuery_sync and a MaterialSupplyAndDemandAllocationERPByElementsResponse_sync. The structure of the MaterialSupplyAndDemandAllocationERPByElementsQuery_sync message type is specified by a MaterialSupplyAndDemandAllocationERPByElementsQueryMessage_sync message data type. The structure of the MaterialSupplyAndDemandAllocationERPByElementsResponse_Sync message type is specified by a MaterialSupplyAndDemandAllocationERPByElementsResponseMessage_sync message data type. The MaterialSupplyAndDemandAllocationERPCreateCheckQueryResponse_In operation is a query to and response from the Supply and Demand Matching for allocating a sales order or customer contract in simulation mode. The MaterialSupplyAndDemandAllocationERPCreateCheckQueryResponse_In operation includes various message types, namely a MaterialSupplyAndDemandAllocationERPCreateCheckQuery_sync and a MaterialSupplyAndDemandAllocationERPCreateCheckResponse_sync. The structure of the MaterialSupplyAndDemandAllocationERPCreateCheckQuery_sync message type is specified by a MaterialSupplyAndDemandAllocationERPCreateCheckQueryMessage_sync message data type. The structure of the MaterialSupplyAndDemandAllocationERPCreateCheckResponse_sync message type is specified by a MaterialSupplyAndDemandAllocationERPCreateCheckResponseMessage_sync message data type.

FIGS. 109-1 through 109-11 show an example configuration of an Element Structure that includes a MaterialSupplyAndDemandAllocationMessage 109000 package. The MaterialSupplyAndDemandAllocationMessage 109000 package is a MatlSupAndDmndAllocMsg 109004 data type. The MaterialSupplyAndDemandAllocationMessage 109000 package includes a MaterialSupplyAndDemandAllocationMessage 109002 entity. The MaterialSupplyAndDemandAllocationMessage 109000 package includes various packages, namely a MessageHeader 109006, a MaterialSupplyAndDemandAllocationERP 109012, a ProcessingConditions 109198 and a Log 109214.

The message data type MaterialSupplyAndDemandAllocationMessage is used as an abstract maximal message data type, which unifies all packages and entities for the following concrete message data types.

The MessageHeader 109006 package is a BasicBusinessDocumentMessageHeader 109010 data type. The MessageHeader 109006 package includes a MessageHeader 109008 entity. A BasicBusinessDocumentMessageHeader is a collection of identification data of an instance of a business document message, or reference data to another instance of a business document message, or both. The subject of the identification data is the message instance that conveys them, whereas the reference data are related to a different message instance previously exchanged between the same interaction parties.

The MaterialSupplyAndDemandAllocationERP 109012 package includes a MaterialSupplyAndDemandAllocation 109014 entity. The MaterialSupplyAndDemandAllocation 109014 entity includes various attributes, namely an ID 109016, a ChangeStateID 109020, a ProcessingTypeCode 109024 and a ProcessingTypeName 109028. The MaterialSupplyAndDemandAllocation 109014 entity includes various subordinate entities, namely a SystemAdministrativeData 109032 and an Item 109046. The ID 109016 attribute is a MaterialSupplyAndDemandAllocationID 109018 data type. The ChangeStateID 109020 attribute is a ChangeStateID 109022 data type. A ChangeStateID is a unique identifier for the change state of a particular allocation item. The ProcessingTypeCode 109024 attribute is a MaterialSupplyAndDemandAllocationProcessingTypeCode 109026 data type. A MaterialSupplyAndDemandAllocationProcessingTypeCode is the coded representation of the way in which Material Supply And Demand Allocation is processed. The ProcessingTypeName 109028 attribute is a MEDIUM_Name 109030 data type. A ProcessingTypeName is a name of a MaterialSupplyAndDemandAllocationProcessingTypeCode. A SystemAdministrativeData is administrative data that is stored in a system. This data includes system users and dates. The SystemAdministrativeData 109032 entity includes various attributes, namely a CreationDate 109034, a CreationUserAccountID 109038 and a LastChangeDate 109042. The CreationDate 109034 attribute is a Date 109036 data type. A CreationDate is a creation date of a SalesOrder. The CreationUserAccountID 109038 attribute is an UserAccountID 109040 data type. A CreationUserAccountID is an AccountID of the creator. The LastChangeDate 109042 attribute is a Date 109044 data type. A LastChangeDate is a last change date of a SalesOrder.

The Item 109046 entity includes various attributes, namely a @actionCode 109048, a ProductInternalID 109052, a PhysicalPropertyValueCombinationID 109056, a PlantID 109060, a MaterialSupplyAndDemandAllocationStatusCode 109064, a MaterialSupplyAndDemandAllocationStatusName 109068, a MaterialSupplyAndDemandAllocationUserStatusCode 109072 and a MaterialSupplyAndDemandAllocationUserStatusName 109076. The Item 109046 entity includes various subordinate entities, namely a DemandReference 109080, a SupplyReference 109122 and a Quantity 109180. The @actionCode 109048 attribute is an ActionCode 109050 data type. An ActionCode is an operation to be performed (e.g., Allocate, Release, Block). The ProductInternalID 109052 attribute is a ProductInternalID 109054 data type. A ProductInternalID is an identifier specified for a product. The PhysicalPropertyValueCombinationID 109056 attribute is a PropertyValueCombinationID 109058 data type. A PhysicalPropertyValueCombinationID is an identifier for value combination of values of different properties of product configuration which are represented by matrix-defining properties and allowed values for a matrix material or product (e.g., Color, Size). It is a concatenated value of characteristic values which define structural properties (e.g., Color, Size) defined for a Matrix Material. The combination can include up to three characteristic values in one grid. The PlantID 109060 attribute is a PlantID 109062 data type. A PlantID is a proprietary identifier for a location.

The MaterialSupplyAndDemandAllocationStatusCode 109064 attribute is a MaterialSupplyAndDemandAllocationitemStatusCode 109066 data type. The MaterialSupplyAndDemandAllocationStatusName 109068 attribute is a MEDIUM_Name 109070 data type. A MaterialSupplyAndDemandAllocationStatusName is a Name of MaterialSupplyAndDemandAllocationType Code. The MaterialSupplyAndDemandAllocationUserStatusCode 109072 attribute is a MaterialSupplyAndDemandAllocationItemUserStatusCode 109074 data type. The MaterialSupplyAndDemandAllocationUserStatusName 109076 attribute is a MEDIUM_Name 109078 data type. A MaterialSupplyAndDemandAllocationUserStatusCode is a Name of MaterialSupplyAndDemandAllocationitemStatusCode.

The DemandReference 109080 entity includes various attributes, namely an ID 109082, an ItemID 109086, an AlternateItemID 109090, a MaterialSupplyAndDemandTypeCode 109094, a MaterialSupplyAndDemandTypeName 109098, a RequirementSegmentationPropertyValueCombinationID 109102, a SoldtoPartyInternalID 109106, a ShiptoPartyInternalID 109110, a ProductAvailabilityDate 109114 and a SalesOrderItemScheduleLineDate 109118. The ID 109082 attribute is a BusinessTransactionDocumentID 109084 data type. An ID is a unique identifier assigned by the buyer for a SalesOrder. The ItemID 109086 attribute is a BusinessTransactionDocumentItemID 109088 data type. An ItemID is a unique identifier assigned by the buyer for a SalesOrderItem. The AlternateItemID 109090 attribute is a BusinessTransactionDocumentItemID 109092 data type. An AlternateItemID is a unique identifier assigned by the buyer for a SalesOrderItem. The MaterialSupplyAndDemandTypeCode 109094 attribute is a MaterialSupplyAndDemandTypeCode 109096 data type. The MaterialSupplyAndDemandTypeName 109098 attribute is a LONG Name 109100 data type.

The RequirementSegmentationPropertyValueCombinationID 109102 attribute is a PropertyValueCombinationID 109104 data type. A RequirementSegmentationPropertyValueCombinationID is an identifier for value combination of Values of different segmentation properties of a matrix material or product when used in a requirement item (e.g., Sales Order Item). It is a concatenated value of characteristic values which define segmentation properties (e.g., Country of Origin, Quality) defined for a Matrix Material. The SoldtoPartyInternalID 109106 attribute is a PartyInternalID 109108 data type. A PartyInternalID is a proprietary identifier for a party. The ShiptoPartyInternalID 109110 attribute is a PartyInternalID 109112 data type. A PartyInternalID is a proprietary identifier for a party.

The ProductAvailabilityDate 109114 attribute is a Date 109116 data type. A ProductAvailabilityDate is an Availability Time Point. The SalesOrderItemScheduleLineDate 109118 attribute is a Date 109120 data type. A SalesOrderItemScheduleLineDate is a Date of a ScheduleLine, such as a Confirmed Delivery Date for a Schedule Line (e.g., Sales Order). The SupplyReference 109122 entity includes various attributes, namely an ID 109124, an ItemID 109128, an AlternateItemID 109132, a BatchID 109136, an InventoryManagedLocationInternalID 109140, a MaterialSupplyAndDemandTypeCode 109144, a MaterialSupplyAndDemandTypeName 109148, an InventorySpecialStockTypeCode 109152, an InventorySpecialStockTypeName 109156, a StockSegmentationAllowedPropertyValueCombinationID 109160, a VendorPartyInternalID 109164, a Receiptdate 109168, a PurchaseOrderItemScheduleLineDeliyeryDate 109172 and a PurchaseOrderItemConfirmationDeliveryDate 109176. The ID 109124 attribute is a BusinessTransactionDocumentID 109126 data type. A BusinessTransactionDocumentID is a unique identifier for a business transaction document. The ItemID 109128 attribute is a BusinessTransactionDocumentItemID 109130 data type. An ItemID is a unique identifier assigned by the buyer for a SalesOrderItem. The AlternateItemID 109132 attribute is a BusinessTransactionDocumentItemID 109134 data type. An AlternateItemID is a unique identifier assigned by the buyer for a SalesOrderItem. The BatchID 109136 attribute is a BatchID 109138 data type. A BatchID is a unique identifier for a batch in the context of a material number. The InventoryManagedLocationInternalID 109140 attribute is a LocationInternalID 109142 data type. An InventoryManagedLocationInternalID is the storage location at which materials are stored. The MaterialSupplyAndDemandTypeCode 109144 attribute is a MaterialSupplyAndDemandTypeCode 109146 data type. A MaterialSupplyAndDemandTypeCode is a StockType (e.g., Batch, Purchase Order). The MaterialSupplyAndDemandTypeName 109148 attribute is a LONG Name 109150 data type. A MaterialSupplyAndDemandTypeName is a Name of StockTypeCode. The InventorySpecialStockTypeCode 109152 attribute is an InventorySpecialStockTypeCode 109154 data type. An InventorySpecialStockTypeCode is the coded representation of an inventory special stock type. A special stock is a separate stock within inventory management and is a stock of a material that is managed separately due to the ownership situation or the location where it is held (e.g., consignment stock of the vendor). The InventorySpecialStockTypeName 109156 attribute is a MEDIUM_Name 109158 data type. An InventorySpecialStockTypeName is a Name of Inventory Special StockType code. The StockSegmentationAllowedPropertyValueCombinationID 109160 attribute is a PropertyValueCombinationID 109162 data type. A PropertyValueCombinationID is an identifier for combination of values of different properties. It can contain concatenated value of characteristic values which define properties (e.g., color, size, quality, country of origin) of a matrix material. The VendorPartyInternalID 109164 attribute is a PartyInternalID 109166 data type. A PartyInternalID is a proprietary identifier for a party. The Receiptdate 109168 attribute is a Date 109170 data type. A Receiptdate is a Receipt Time Point. The PurchaseOrderItemScheduleLineDeliveryDate 109172 attribute is a Date 109174 data type. A PurchaseOrderItemScheduleLineDeliveryDate is a Delivery Time Point, such as a Confirmed Delivery Date for Schedule Line (e.g., Purchase Order). The PurchaseOrderItemConfirmationDeliveryDate 109176 attribute is a Date 109178 data type. A PurchaseOrderItemConfirmationDeliveryDate is a Delivery Time Point, such as a Notified Delivery Date for Schedule Line (e.g., Purchase Order). The Quantity 109180 entity includes various attributes, namely an OpenQuantity 109182, a ReleasedAllocatedQuantity 109186, a ReservedAllocatedQuantity 109190 and a DeliveredQuantity 109194. The OpenQuantity 109182 attribute is a Quantity 109184 data type. An OpenQuantity is a Quantity that has not yet been delivered, moved, produced, checked or packed. The ReleasedAllocatedQuantity 109186 attribute is a Quantity 109188 data type. A ReleasedAllocatedQuantity is an Allocated quantity which is released for delivery. The ReservedAllocatedQuantity 109190 attribute is a Quantity 109192 data type. A ReservedAllocatedQuantity is an Allocated quantity which is not released. The DeliveredQuantity 109194 attribute is a Quantity 109196 data type. A DeliveredQuantity is an Acknowledged or Delivered Quantity. The ProcessingConditions 109198 package includes a ProcessingConditions 109200 entity. The ProcessingConditions 109200 entity includes various attributes, namely a QueryHitsMaximumNumberValue 109202, a ReturnedQueryHitsNumberValue 109206 and a MoreElementsAvailableIndicator 109210. The QueryHitsMaximumNumberValue 109202 attribute is a NumberValue 109204 data type. The ReturnedQueryHitsNumberValue 109206 attribute is a NumberValue 109208 data type. The MoreElementsAvailableIndicator 109210 attribute is an Indicator 109212 data type. The Log 109214 package is a LOG 109218 data type. The Log 109214 package includes a Log 109216 entity. A Log is a sequence of messages that result when an application executes a task.

FIGS. 110-1 through 110-3 show an example configuration of an Element Structure that includes a MaterialSupplyAndDemandAllocationERPCreateRequestMessage_sync 110000 package. The MaterialSupplyAndDemandAllocationERPCreateRequestMessage_sync 110000 package includes a MaterialSupplyAndDemandAllocationERPCreateRequestMessage_sync 110002 entity. The MaterialSupplyAndDemandAllocationERPCreateRequestMessage_sync 110000 package includes various packages, namely a MessageHeader 110004 and a MaterialSupplyAndDemandAllocationERP 110010.

The MessageHeader 110004 package includes a MessageHeader 110006 entity. The MessageHeader 110006 entity has a cardinality of 0 . . . 1 110008 meaning that for each instance of the MessageHeader 110004 package there may be one MessageHeader 110006 entity. The MaterialSupplyAndDemandAllocationERP 110010 package includes a MaterialSupplyAndDemandAllocation 110012 entity. The MaterialSupplyAndDemandAllocation 110012 entity has a cardinality of 1 110014 meaning that for each instance of the MaterialSupplyAndDemandAllocationERP 110010 package there is one MaterialSupplyAndDemandAllocation 110012 entity. The MaterialSupplyAndDemandAllocation 110012 entity includes a ProcessingTypeCode 110016 attribute. The MaterialSupplyAndDemandAllocation 110012 entity includes an Item 110020 subordinate entity. The ProcessingTypeCode 110016 attribute has a cardinality of 1 110018 meaning that for each instance of the MaterialSupplyAndDemandAllocation 110012 entity there is one ProcessingTypeCode 110016 attribute.

The Item 110020 entity has a cardinality of 1 . . . n 110022 meaning that for each instance of the MaterialSupplyAndDemandAllocation 110012 entity there are one or more Item 110020 entities. The Item 110020 entity includes various subordinate entities, namely a DemandReference 110024, a SupplyReference 110040 and a Quantity 110064. The DemandReference 110024 entity has a cardinality of 1

110026 meaning that for each instance of the Item 110020 entity there is one DemandReference 110024 entity. The DemandReference 110024 entity includes various attributes, namely an ID 110028, an ItemID 110032 and an AlternateItemID 110036. The ID 110028 attribute has a cardinality of 1 110030 meaning that for each instance of the DemandReference 110024 entity there is one ID 110028 attribute. The ItemID 110032 attribute has a cardinality of 0 . . . 1 110034 meaning that for each instance of the DemandReference 110024 entity there may be one ItemID 110032 attribute. The AlternateItemID 110036 attribute has a cardinality of 0 . . . 1 110038 meaning that for each instance of the DemandReference 110024 entity there may be one AlternateItemID 110036 attribute. The SupplyReference 110040 entity has a cardinality of 0 . . . 1 110042 meaning that for each instance of the Item 110020 entity there may be one SupplyReference 110040 entity. The SupplyReference 110040 entity includes various attributes, namely an ID 110044, a BatchID 110048, an InventoryManagedLocationInternalID 110052, a MaterialSupplyAndDemandTypeCode 110056 and an InventorySpecialStockTypeCode 110060. The ID 110044 attribute has a cardinality of 0 . . . 1 110046 meaning that for each instance of the SupplyReference 110040 entity there may be one ID 110044 attribute. The BatchID 110048 attribute has a cardinality of 0 . . . 1 110050 meaning that for each instance of the SupplyReference 110040 entity there may be one BatchID 110048 attribute. The InventoryManagedLocationInternalID 110052 attribute has a cardinality of 0 . . . 1 110054 meaning that for each instance of the SupplyReference 110040 entity there may be one InventoryManagedLocationInternalID 110052 attribute. The MaterialSupplyAndDemandTypeCode 110056 attribute has a cardinality of 0 . . . 1 110058 meaning that for each instance of the SupplyReference 110040 entity there may be one MaterialSupplyAndDemandTypeCode 110056 attribute. The InventorySpecialStockTypeCode 110060 attribute has a cardinality of 0 . . . 1 110062 meaning that for each instance of the SupplyReference 110040 entity there may be one InventorySpecialStockTypeCode 110060 attribute. The Quantity 110064 entity has a cardinality of 0 . . . 1 110066 meaning that for each instance of the Item 110020 entity there may be one Quantity 110064 entity. The Quantity 110064 entity includes an OpenQuantity 110068 attribute. The OpenQuantity 110068 attribute has a cardinality of 0 . . . 1 110070 meaning that for each instance of the Quantity 110064 entity there may be one OpenQuantity 110068 attribute. The data types of the various packages, entities, and attributes are described with respect to FIGS. 109-1 through 109-11.

FIGS. 111-1 through 111-9 show an example configuration of an Element Structure that includes a MaterialSupplyAndDemandAllocationERPCreateConfirmationMessage_sync 111000 package. The MaterialSupplyAndDemandAllocationERPCreateConfirmationMessage_sync 111000 package includes a MaterialSupplyAndDemandAllocationERPCreateConfirmationMessage_sync 111002 entity. The MaterialSupplyAndDemandAllocationERPCreateConfirmationMessage_sync 111000 package includes various packages, namely a MessageHeader 111004, a MaterialSupplyAndDemandAllocationERP 111010 and a Log 111200.

The MessageHeader 111004 package includes a MessageHeader 111006 entity. The MessageHeader 111006 entity has a cardinality of 0 . . . 1 111008 meaning that for each instance of the MessageHeader 111004 package there may be one MessageHeader 111006 entity.

The MaterialSupplyAndDemandAllocationERP 111010 package includes a MaterialSupplyAndDemandAllocation 111012 entity. The MaterialSupplyAndDemandAllocation 111012 entity has a cardinality of 1 111014 meaning that for each instance of the MaterialSupplyAndDemandAllocationERP 111010 package there is one MaterialSupplyAndDemandAllocation 111012 entity. The MaterialSupplyAndDemandAllocation 111012 entity includes various attributes, namely an ID 111016, a ProcessingTypeCode 111020 and a ProcessingTypeName 111024. The MaterialSupplyAndDemandAllocation 111012 entity includes various subordinate entities, namely a SystemAdministrativeData 111028 and an Item 111044. The ID 111016 attribute has a cardinality of 1 111018 meaning that for each instance of the MaterialSupplyAndDemandAllocation 111012 entity there is one ID 111016 attribute. The ProcessingTypeCode 111020 attribute has a cardinality of 1 111022 meaning that for each instance of the MaterialSupplyAndDemandAllocation 111012 entity there is one ProcessingTypeCode 111020 attribute. The ProcessingTypeName 111024 attribute has a cardinality of 1 111026 meaning that for each instance of the MaterialSupplyAndDemandAllocation 111012 entity there is one ProcessingTypeName 111024 attribute.

The SystemAdministrativeData 111028 entity has a cardinality of 1 111030 meaning that for each instance of the MaterialSupplyAndDemandAllocation 111012 entity there is one SystemAdministrativeData 111028 entity. The SystemAdministrativeData 111028 entity includes various attributes, namely a CreationDate 111032, a CreationUserAccountID 111036 and a LastChangeDate 111040. The CreationDate 111032 attribute has a cardinality of 0 . . . 1 111034 meaning that for each instance of the SystemAdministrativeData 111028 entity there may be one CreationDate 111032 attribute. The CreationUserAccountID 111036 attribute has a cardinality of 1 111038 meaning that for each instance of the SystemAdministrativeData 111028 entity there is one CreationUserAccountID 111036 attribute. The LastChangeDate 111040 attribute has a cardinality of 0 . . . 1 111042 meaning that for each instance of the SystemAdministrativeData 111028 entity there may be one LastChangeDate 111040 attribute.

The Item 111044 entity has a cardinality of 0 . . . n 111046 meaning that for each instance of the MaterialSupplyAndDemandAllocation 111012 entity there may be one or more Item 111044 entities. The Item 111044 entity includes various attributes, namely a ProductInternalID 111048, a PhysicalPropertyValueCombinationID 111052, a PlantID 111056, a MaterialSupplyAndDemandAllocationStatusCode 111060, a MaterialSupplyAndDemandAllocationStatusName 111064, a MaterialSupplyAndDemandAllocationUserStatusCode 111068 and a MaterialSupplyAndDemandAllocationUserStatusName 111072. The Item 111044 entity includes various subordinate entities, namely a DemandReference 111076, a SupplyReference 111120 and a Quantity 111180. The ProductInternalID 111048 attribute has a cardinality of 1 111050 meaning that for each instance of the Item 111044 entity there is one ProductInternalID 111048 attribute. The PhysicalPropertyValueCombinationID 111052 attribute has a cardinality of 0 . . . 1 111054 meaning that for each instance of the Item 111044 entity there may be one PhysicalPropertyValueCombinationID 111052 attribute. The PlantID 111056 attribute has a cardinality of 1 111058 meaning that for each instance of the Item 111044 entity there is one PlantID 111056 attribute. The MaterialSupplyAndDemandAllocationStatusCode 111060 attribute has a cardinality of 1 111062 meaning that for each instance of the Item 111044 entity there is one MaterialSupplyAndDemandAllocationStatusCode 111060 attribute. The MaterialSupplyAndDemandAllocationStatusName 111064 attribute has a cardinality of 1 111066 meaning that for each instance of the Item 111044 entity there is one MaterialSupplyAndDemandAllocationStatusName 111064 attribute. The MaterialSupplyAndDemandAllocationUserStatusCode 111068 attribute has a cardinality of 0 . . . 1 111070 meaning that for each instance of the Item 111044 entity there may be one MaterialSupplyAndDemandAllocationUserStatusCode 111068 attribute. The MaterialSupplyAndDemandAllocationUserStatusName 111072 attribute has a cardinality of 0 . . . 1 111074 meaning that for each instance of the Item 111044 entity there may be one MaterialSupplyAndDemandAllocationUserStatusName 111072 attribute.

The DemandReference 111076 entity has a cardinality of 1 111078 meaning that for each instance of the Item 111044 entity there is one DemandReference 111076 entity. The DemandReference 111076 entity includes various attributes, namely an ID 111080, an ItemID 111084, an AlternateItemID 111088, a MaterialSupplyAndDemandTypeCode 111092, a MaterialSupplyAndDemandTypeName 111096, a RequirementSegmentationPropertyValueCombinationID 111100, a SoldtoPartyInternalID 111104, a ShiptoPartyInternalID 111108, a ProductAvailabilityDate 111112 and a SalesOrderItemScheduleLineDate 111116. The ID 111080 attribute has a cardinality of 1 111082 meaning that for each instance of the DemandReference 111076 entity there is one ID 111080 attribute. The ItemID 111084 attribute has a cardinality of 1 111086 meaning that for each instance of the DemandReference 111076 entity there is one ItemID 111084 attribute. The AlternateItemID 111088 attribute has a cardinality of 1 111090 meaning that for each instance of the DemandReference 111076 entity there is one AlternateItemID 111088 attribute. The MaterialSupplyAndDemandTypeCode 111092 attribute has a cardinality of 1 111094 meaning that for each instance of the DemandReference 111076 entity there is one MaterialSupplyAndDemandTypeCode 111092 attribute. The MaterialSupplyAndDemandTypeName 111096 attribute has a cardinality of 1 111098 meaning that for each instance of the DemandReference 111076 entity there is one MaterialSupplyAndDemandTypeName 111096 attribute. The RequirementSegmentationPropertyValueCombinationID 111100 attribute has a cardinality of 0 . . . 1 111102 meaning that for each instance of the DemandReference 111076 entity there may be one RequirementSegmentationPropertyValueCombinationID 111100 attribute. The SoldtoPartyInternalID 111104 attribute has a cardinality of 0 . . . 1 111106 meaning that for each instance of the DemandReference 111076 entity there may be one SoldtoPartyInternalID 111104 attribute. The ShiptoPartyInternalID 111108 attribute has a cardinality of 0 . . . 1 111110 meaning that for each instance of the DemandReference 111076 entity there may be one ShiptoPartyInternalID 111108 attribute. The ProductAvailabilityDate 111112 attribute has a cardinality of 0 . . . 1 111114 meaning that for each instance of the DemandReference 111076 entity there may be one ProductAvailabilityDate 111112 attribute. The SalesOrderItemScheduleLineDate 111116 attribute has a cardinality of 0 . . . 1 111118 meaning that for each instance of the DemandReference 111076 entity there may be one SalesOrderItemScheduleLineDate 111116 attribute.

The SupplyReference 111120 entity has a cardinality of 0 . . . 1 111122 meaning that for each instance of the Item 111044 entity there may be one SupplyReference 111120 entity. The SupplyReference 111120 entity includes various attributes, namely an ID 111124, an ItemID 111128, an AlternateItemID 111132, a BatchID 111136, an InventoryManagedLocationInternalID 111140, a MaterialSupplyAndDemandTypeCode 111144, a MaterialSupplyAndDemandTypeName 111148, an InventorySpecialStockTypeCode 111152, an InventorySpecialStockTypeName 111156, a StockSegmentationAllowedPropertyValueCombinationID 111160, a VendorPartyInternalID 111164, a Receiptdate 111168, a PurchaseOrderItemScheduleLineDeliveryDate 111172 and a PurchaseOrderItemConfirmationDeliveryDate 111176. The ID 111124 attribute has a cardinality of 0 . . . 1 111126 meaning that for each instance of the SupplyReference 111120 entity there may be one ID 111124 attribute. The ItemID 111128 attribute has a cardinality of 0 . . . 1 111130 meaning that for each instance of the SupplyReference 111120 entity there may be one ItemID 111128 attribute. The AlternateItemID 111132 attribute has a cardinality of 0 . . . 1 111134 meaning that for each instance of the SupplyReference 111120 entity there may be one AlternateItemID 111132 attribute. The BatchID 111136 attribute has a cardinality of 0 . . . 1 111138 meaning that for each instance of the SupplyReference 111120 entity there may be one BatchID 111136 attribute. The InventoryManagedLocationInternalID 111140 attribute has a cardinality of 0 . . . 1 111142 meaning that for each instance of the SupplyReference 111120 entity there may be one InventoryManagedLocationInternalID 111140 attribute. The MaterialSupplyAndDemandTypeCode 111144 attribute has a cardinality of 0 . . . 1 111146 meaning that for each instance of the SupplyReference 111120 entity there may be one MaterialSupplyAndDemandTypeCode 111144 attribute. The MaterialSupplyAndDemandTypeName 111148 attribute has a cardinality of 0 . . . 1 111150 meaning that for each instance of the SupplyReference 111120 entity there may be one MaterialSupplyAndDemandTypeName 111148 attribute. The InventorySpecialStockTypeCode 111152 attribute has a cardinality of 0 . . . 1 111154 meaning that for each instance of the SupplyReference 111120 entity there may be one InventorySpecialStockTypeCode 111152 attribute. The InventorySpecialStockTypeName 111156 attribute has a cardinality of 0 . . . 1 111158 meaning that for each instance of the SupplyReference 111120 entity there may be one InventorySpecialStockTypeName 111156 attribute. The StockSegmentationAllowedPropertyValueCombinationID 111160 attribute has a cardinality of 0 . . . 1 111162 meaning that for each instance of the SupplyReference 111120 entity there may be one StockSegmentationAllowedPropertyValueCombinationID 111160 attribute. The VendorPartyInternalID 111164 attribute has a cardinality of 0 . . . 1 111166 meaning that for each instance of the SupplyReference 111120 entity there may be one VendorPartyInternalID 111164 attribute. The Receiptdate 111168 attribute has a cardinality of 0 . . . 1 111170 meaning that for each instance of the SupplyReference 111120 entity there may be one Receiptdate 111168 attribute. The PurchaseOrderItemScheduleLineDeliveryDate 111172 attribute has a cardinality of 0 . . . 1 111174 meaning that for each instance of the SupplyReference 111120 entity there may be one PurchaseOrderItemScheduleLineDeliveryDate 111172 attribute. The PurchaseOrderItemConfirmationDeliveryDate 111176 attribute has a cardinality of 0 . . . 1 111178 meaning that for each instance of the SupplyReference 111120 entity there may be one PurchaseOrderItemConfirmationDeliveryDate 111176 attribute.

The Quantity 111180 entity has a cardinality of 0 . . . 1 111182 meaning that for each instance of the Item 111044 entity there may be one Quantity 111180 entity. The Quantity 111180 entity includes various attributes, namely an OpenQuantity 111184, a ReleasedAllocatedQuantity 111188, a ReservedAllocatedQuantity 111192 and a DeliveredQuantity 111196. The OpenQuantity 111184 attribute has a cardinality of 0 . . . 1 111186 meaning that for each instance of the Quantity 111180 entity there may be one OpenQuantity 111184 attribute. The ReleasedAllocatedQuantity 111188 attribute has a cardinality of 0 . . . 1 111190 meaning that for each instance of the Quantity 111180 entity there may be one ReleasedAllocatedQuantity 111188 attribute. The ReservedAllocatedQuantity 111192 attribute has a cardinality of 0 . . . 1 111194 meaning that for each instance of the Quantity 111180 entity there may be one ReservedAllocatedQuantity 111192 attribute. The DeliveredQuantity 111196 attribute has a cardinality of 0 . . . 1 111198 meaning that for each instance of the Quantity 111180 entity there may be one DeliveredQuantity 111196 attribute.

The Log 111200 package includes a Log 111202 entity. The Log 111202 entity has a cardinality of 1 111204 meaning that for each instance of the Log 111200 package there is one Log 111202 entity. The data types of the various packages, entities, and attributes are described with respect to FIGS. 109-1 through 109-11.

FIGS. 112-1 through 112-4 show an example configuration of an Element Structure that includes a MaterialSupplyAndDemandAllocationERPCancelRequestMessage_sync 112000 package. The MaterialSupplyAndDemandAllocationERPCancelRequestMessage_sync 112000 package includes a MaterialSupplyAndDemandAllocationERPCancelRequestMessage_sync 112002 entity. The MaterialSupplyAndDemandAllocationERPCancelRequestMessage_sync 112000 package includes various packages, namely a MessageHeader 112004 and a MaterialSupplyAndDemandAllocationERP 112010.

The MessageHeader 112004 package includes a MessageHeader 112006 entity. The MessageHeader 112006 entity has a cardinality of 0 . . . 1 112008 meaning that for each instance of the MessageHeader 112004 package there may be one MessageHeader 112006 entity.

The MaterialSupplyAndDemandAllocationERP 112010 package includes a MaterialSupplyAndDemandAllocation 112012 entity. The MaterialSupplyAndDemandAllocation 112012 entity has a cardinality of 1 112014 meaning that for each instance of the MaterialSupplyAndDemandAllocationERP 112010 package there is one MaterialSupplyAndDemandAllocation 112012 entity. The MaterialSupplyAndDemandAllocation 112012 entity includes various attributes, namely an ID 112016 and a ChangeStateID 112020. The MaterialSupplyAndDemandAllocation 112012 entity includes an Item 112024 subordinate entity. The ID 112016 attribute has a cardinality of 1 112018 meaning that for each instance of the MaterialSupplyAndDemandAllocation 112012 entity there is one ID 112016 attribute. The ChangeStateID 112020 attribute has a cardinality of 1 112022 meaning that for each instance of the MaterialSupplyAndDemandAllocation 112012 entity there is one ChangeStateID 112020 attribute.

The Item 112024 entity has a cardinality of 1 . . . n 112026 meaning that for each instance of the MaterialSupplyAndDemandAllocation 112012 entity there are one or more Item 112024 entities. The Item 112024 entity includes various attributes, namely a ProductInternalID 112028, a PlantID 112032 and a MaterialSupplyAndDemandAllocationStatusCode 112036. The Item 112024 entity includes various subordinate entities, namely a DemandReference 112040, a SupplyReference 112060 and a Quantity 112092. The ProductInternalID 112028 attribute has a cardinality of 0 . . . 1 112030 meaning that for each instance of the Item 112024 entity there may be one ProductInternalID 112028 attribute. The PlantID 112032 attribute has a cardinality of 0 . . . 1 112034 meaning that for each instance of the Item 112024 entity there may be one PlantID 112032 attribute. The MaterialSupplyAndDemandAllocationStatusCode 112036 attribute has a cardinality of 0 . . . 1 112038 meaning that for each instance of the Item 112024 entity there may be one MaterialSupplyAndDemandAllocationStatusCode 112036 attribute.

The DemandReference 112040 entity has a cardinality of 1 112042 meaning that for each instance of the Item 112024 entity there is one DemandReference 112040 entity. The DemandReference 112040 entity includes various attributes, namely an ID 112044, an ItemID 112048, an AlternateItemID 112052 and a SoldtoPartyInternalID 112056. The ID 112044 attribute has a cardinality of 1 112046 meaning that for each instance of the DemandReference 112040 entity there is one ID 112044 attribute. The ItemID 112048 attribute has a cardinality of 0 . . . 1 112050 meaning that for each instance of the DemandReference 112040 entity there may be one ItemID 112048 attribute. The AlternateItemID 112052 attribute has a cardinality of 0 . . . 1 112054 meaning that for each instance of the DemandReference 112040 entity there may be one AlternateItemID 112052 attribute. The SoldtoPartyInternalID 112056 attribute has a cardinality of 0 . . . 1 112058 meaning that for each instance of the DemandReference 112040 entity there may be one SoldtoPartyInternalID 112056 attribute.

The SupplyReference 112060 entity has a cardinality of 0 . . . 1 112062 meaning that for each instance of the Item 112024 entity there may be one SupplyReference 112060 entity. The SupplyReference 112060 entity includes various attributes, namely an ID 112064, an ItemID 112068, an AlternateItemID 112072, a BatchID 112076, an InventoryManagedLocationInternalID 112080, a MaterialSupplyAndDemandTypeCode 112084 and an InventorySpecialStockTypeCode 112088. The ID 112064 attribute has a cardinality of 0 . . . 1 112066 meaning that for each instance of the SupplyReference 112060 entity there may be one ID 112064 attribute. The ItemID 112068 attribute has a cardinality of 0 . . . 1 112070 meaning that for each instance of the SupplyReference 112060 entity there may be one ItemID 112068 attribute. The AlternateItemID 112072 attribute has a cardinality of 0 . . . 1 112074 meaning that for each instance of the SupplyReference 112060 entity there may be one AlternateItemID 112072 attribute. The BatchID 112076 attribute has a cardinality of 0 . . . 1 112078 meaning that for each instance of the SupplyReference 112060 entity there may be one BatchID 112076 attribute. The InventoryManagedLocationInternalID 112080 attribute has a cardinality of 0 . . . 1 112082 meaning that for each instance of the SupplyReference 112060 entity there may be one InventoryManagedLocationInternalID 112080 attribute. The MaterialSupplyAndDemandTypeCode 112084 attribute has a cardinality of 0 . . . 1 112086 meaning that for each instance of the SupplyReference 112060 entity there may be one MaterialSupplyAndDemandTypeCode 112084 attribute. The InventorySpecialStockTypeCode 112088 attribute has a cardinality of 0 . . . 1 112090 meaning that for each instance of the SupplyReference 112060 entity there may be one InventorySpecialStockTypeCode 112088 attribute.

The Quantity 112092 entity has a cardinality of 0 . . . 1 112094 meaning that for each instance of the Item 112024 entity there may be one Quantity 112092 entity. The Quantity 112092 entity includes an OpenQuantity 112096 attribute. The OpenQuantity 112096 attribute has a cardinality of 0 . . . 1 112098 meaning that for each instance of the Quantity 112092 entity there may be one OpenQuantity 112096 attribute. The data types of the various packages, entities, and attributes are described with respect to FIGS. 109-1 through 109-11.

FIG. 113 shows an example configuration of an Element Structure that includes a MaterialSupplyAndDemandAllocationERPCancelConfirmationMessage_sync 113000 package. The MaterialSupplyAndDemandAllocationERPCancelConfirmationMessage_sync 113000 package includes a MaterialSupplyAndDemandAllocationERPCancelConfirmationMessage_sync 113002 entity. The MaterialSupplyAndDemandAllocationERPCancelConfirmationMessage_sync 113000 package includes various packages, namely a MessageHeader 113004 and a Log 113010.

The MessageHeader 113004 package includes a MessageHeader 113006 entity. The MessageHeader 113006 entity has a cardinality of 0 . . . 1 113008 meaning that for each instance of the MessageHeader 113004 package there may be one MessageHeader 113006 entity.

The Log 113010 package includes a Log 113012 entity. The Log 113012 entity has a cardinality of 1 113014 meaning that for each instance of the Log 113010 package there is one Log 113012 entity. The data types of the various packages, entities, and attributes are described with respect to FIGS. 109-1 through 109-11.

FIG. 114 shows an example configuration of an Element Structure that includes a MaterialSupplyAndDemandAllocationERPByIDQueryMessage_sync 114000 package. The MaterialSupplyAndDemandAllocationERPByIDQueryMessage_sync 114000 package includes a MaterialSupplyAndDemandAllocationERPByIDQueryMessage_sync 114002 entity. The MaterialSupplyAndDemandAllocationERPByIDQueryMessage_sync 114000 package includes a MaterialSupplyAndDemandAllocationERP 114004 package.

The MaterialSupplyAndDemandAllocationERP 114004 package includes a MaterialSupplyAndDemandAllocationSelectionByID 114006 entity. The MaterialSupplyAndDemandAllocationSelectionByID 114006 entity has a cardinality of 1 114008 meaning that for each instance of the MaterialSupplyAndDemandAllocationERP 114004 package there is one MaterialSupplyAndDemandAllocationSelectionByID 114006 entity. The MaterialSupplyAndDemandAllocationSelectionByID 114006 entity includes a MaterialSupplyAndDemandAllocationID 114010 attribute. The MaterialSupplyAndDemandAllocationID 114010 attribute has a cardinality of 1 114012 meaning that for each instance of the MaterialSupplyAndDemandAllocationSelectionByID 114006 entity there is one MaterialSupplyAndDemandAllocationID 114010 attribute. The data types of the various packages, entities, and attributes are described with respect to FIGS. 109-1 through 109-11.

FIGS. 115-1 through 115-9 show an example configuration of an Element Structure that includes a MaterialSupplyAndDemandAllocationERPByIDResponseMessage_sync 115000 package. The MaterialSupplyAndDemandAllocationERPByIDResponseMessage_sync 115000 package includes a MaterialSupplyAndDemandAllocationERPByIDResponseMessage_sync 115002 entity. The MaterialSupplyAndDemandAllocationERPByIDResponseMessage_sync 115000 package includes various packages, namely a MaterialSupplyAndDemandAllocationERP 115004 and a Log 115190.

The MaterialSupplyAndDemandAllocationERP 115004 package includes a MaterialSupplyAndDemandAllocation 115006 entity. The MaterialSupplyAndDemandAllocation 115006 entity has a cardinality of 1 115008 meaning that for each instance of the MaterialSupplyAndDemandAllocationERP 115004 package there is one MaterialSupplyAndDemandAllocation 115006 entity. The MaterialSupplyAndDemandAllocation 115006 entity includes various attributes, namely an ID 115010 and a ChangeStateID 115014. The MaterialSupplyAndDemandAllocation 115006 entity includes various subordinate entities, namely a SystemAdministrativeData 115018 and an Item 115034. The ID 115010 attribute has a cardinality of 1 115012 meaning that for each instance of the MaterialSupplyAndDemandAllocation 115006 entity there is one ID 115010 attribute. The ChangeStateID 115014 attribute has a cardinality of 1 115016 meaning that for each instance of the MaterialSupplyAndDemandAllocation 115006 entity there is one ChangeStateID 115014 attribute.

The SystemAdministrativeData 115018 entity has a cardinality of 1 115020 meaning that for each instance of the MaterialSupplyAndDemandAllocation 115006 entity there is one SystemAdministrativeData 115018 entity. The SystemAdministrativeData 115018 entity includes various attributes, namely a CreationDate 115022, a CreationUserAccountID 115026 and a LastChangeDate 115030. The CreationDate 115022 attribute has a cardinality of 0 . . . 1 115024 meaning that for each instance of the SystemAdministrativeData 115018 entity there may be one CreationDate 115022 attribute. The CreationUserAccountID 115026 attribute has a cardinality of 1 115028 meaning that for each instance of the SystemAdministrativeData 115018 entity there is one CreationUserAccountID 115026 attribute. The LastChangeDate 115030 attribute has a cardinality of 0 . . . 1 115032 meaning that for each instance of the SystemAdministrativeData 115018 entity there may be one LastChangeDate 115030 attribute.

The Item 115034 entity has a cardinality of 0 . . . n 115036 meaning that for each instance of the MaterialSupplyAndDemandAllocation 115006 entity there may be one or more Item 115034 entities. The Item 115034 entity includes various attributes, namely a ProductInternalID 115038, a PhysicalPropertyValueCombinationID 115042, a PlantID 115046, a MaterialSupplyAndDemandAllocationStatusCode 115050, a MaterialSupplyAndDemandAllocationStatusName 115054, a MaterialSupplyAndDemandAllocationUserStatusCode 115058 and a MaterialSupplyAndDemandAllocationUserStatusName 115062. The Item 115034 entity includes various subordinate entities, namely a DemandReference 115066, a SupplyReference 115110 and a Quantity 115170. The ProductInternalID 115038 attribute has a cardinality of 1 115040 meaning that for each instance of the Item 115034 entity there is one ProductInternalID 115038 attribute. The PhysicalPropertyValueCombinationID 115042 attribute has a cardinality of 0 . . . 1 115044 meaning that for each instance of the Item 115034 entity there may be one PhysicalPropertyValueCombinationID 115042 attribute. The PlantID 115046 attribute has a cardinality of 1 115048 meaning that for each instance of the Item 115034 entity there is one PlantID 115046 attribute. The MaterialSupplyAndDemandAllocationStatusCode 115050 attribute has a cardinality of 1 115052 meaning that for each instance of the Item 115034 entity there is one MaterialSupplyAndDemandAllocationStatusCode 115050 attribute. The MaterialSupplyAndDemandAllocationStatusName 115054 attribute has a cardinality of 1 115056 meaning that for each instance of the Item 115034 entity there is one MaterialSupplyAndDemandAllocationStatusName 115054 attribute. The MaterialSupplyAndDemandAllocationUserStatusCode 115058 attribute has a cardinality of 0 . . . 1 115060 meaning that for each instance of the Item 115034 entity there may be one MaterialSupplyAndDemandAllocationUserStatusCode 115058 attribute. The MaterialSupplyAndDemandAllocationUserStatusName 115062 attribute has a cardinality of 0 . . . 1 115064 meaning that for each instance of the Item 115034 entity there may be one MaterialSupplyAndDemandAllocationUserStatusName 115062 attribute.

The DemandReference 115066 entity has a cardinality of 1 115068 meaning that for each instance of the Item 115034 entity there is one DemandReference 115066 entity. The DemandReference 115066 entity includes various attributes, namely an ID 115070, an ItemID 115074, an AlternateItemID 115078, a MaterialSupplyAndDemandTypeCode 115082, a MaterialSupplyAndDemandTypeName 115086, a RequirementSegmentationPropertyValueCombinationID 115090, a SoldtoPartyInternalID 115094, a ShiptoPartyInternalID 115098, a ProductAvailabilityDate 115102 and a SalesOrderItemScheduleLineDate 115106. The ID 115070 attribute has a cardinality of 1 115072 meaning that for each instance of the DemandReference 115066 entity there is one ID 115070 attribute. The ItemID 115074 attribute has a cardinality of 1 115076 meaning that for each instance of the DemandReference 115066 entity there is one ItemID 115074 attribute. The AlternateItemID 115078 attribute has a cardinality of 1 115080 meaning that for each instance of the DemandReference 115066 entity there is one AlternateItemID 115078 attribute. The MaterialSupplyAndDemandTypeCode 115082 attribute has a cardinality of 1 115084 meaning that for each instance of the DemandReference 115066 entity there is one MaterialSupplyAndDemandTypeCode 115082 attribute. The MaterialSupplyAndDemandTypeName 115086 attribute has a cardinality of 1 115088 meaning that for each instance of the DemandReference 115066 entity there is one MaterialSupplyAndDemandTypeName 115086 attribute. The RequirementSegmentationPropertyValueCombinationID 115090 attribute has a cardinality of 0 . . . 1 115092 meaning that for each instance of the DemandReference 115066 entity there may be one RequirementSegmentationPropertyValueCombinationID 115090 attribute. The SoldtoPartyInternalID 115094 attribute has a cardinality of 0 . . . 1 115096 meaning that for each instance of the DemandReference 115066 entity there may be one SoldtoPartyInternalID 115094 attribute. The ShiptoPartyInternalID 115098 attribute has a cardinality of 0 . . . 1 115100 meaning that for each instance of the DemandReference 115066 entity there may be one ShiptoPartyInternalID 115098 attribute. The ProductAvailabilityDate 115102 attribute has a cardinality of 0 . . . 1 115104 meaning that for each instance of the DemandReference 115066 entity there may be one ProductAvailabilityDate 115102 attribute. The SalesOrderItemScheduleLineDate 115106 attribute has a cardinality of 0 . . . 1 115108 meaning that for each instance of the DemandReference 115066 entity there may be one SalesOrderItemScheduleLineDate 115106 attribute.

The SupplyReference 115110 entity has a cardinality of 0 . . . 1 115112 meaning that for each instance of the Item 115034 entity there may be one SupplyReference 115110 entity. The SupplyReference 115110 entity includes various attributes, namely an ID 115114, an ItemID 115118, an AlternateItemID 115122, a BatchID 115126, an InventoryManagedLocationInternalID 115130, a MaterialSupplyAndDemandTypeCode 115134, a MaterialSupplyAndDemandTypeName 115138, an InventorySpecialStockTypeCode 115142, an InventorySpecialStockTypeName 115146, a StockSegmentationAllowedPropertyValueCombinationID 115150, a VendorPartyInternalID 115154, a ReceiptDate 115158, a PurchaseOrderItemScheduleLineDeliveryDate 115162 and a PurchaseOrderItemConfirmationDeliveryDate 115166. The ID 115114 attribute has a cardinality of 0 . . . 1 115116 meaning that for each instance of the SupplyReference 115110 entity there may be one ID 115114 attribute. The ItemID 115118 attribute has a cardinality of 0 . . . 1 115120 meaning that for each instance of the SupplyReference 115110 entity there may be one ItemID 115118 attribute. The AlternateItemID 115122 attribute has a cardinality of 0 . . . 1 115124 meaning that for each instance of the SupplyReference 115110 entity there may be one AlternateItemID 115122 attribute. The BatchID 115126 attribute has a cardinality of 0 . . . 1 115128 meaning that for each instance of the SupplyReference 115110 entity there may be one BatchID 115126 attribute. The InventoryManagedLocationInternalID 115130 attribute has a cardinality of 0 . . . 1 115132 meaning that for each instance of the SupplyReference 115110 entity there may be one InventoryManagedLocationInternalID 115130 attribute. The MaterialSupplyAndDemandTypeCode 115134 attribute has a cardinality of 0 . . . 1 115136 meaning that for each instance of the SupplyReference 115110 entity there may be one MaterialSupplyAndDemandTypeCode 115134 attribute. The MaterialSupplyAndDemandTypeName 115138 attribute has a cardinality of 0 . . . 1 115140 meaning that for each instance of the SupplyReference 115110 entity there may be one MaterialSupplyAndDemandTypeName 115138 attribute. The InventorySpecialStockTypeCode 115142 attribute has a cardinality of 0 . . . 1 115144 meaning that for each instance of the SupplyReference 115110 entity there may be one InventorySpecialStockTypeCode 115142 attribute. The InventorySpecialStockTypeName 115146 attribute has a cardinality of 0 . . . 1 115148 meaning that for each instance of the SupplyReference 115110 entity there may be one InventorySpecialStockTypeName 115146 attribute. The StockSegmentationAllowedPropertyValueCombinationID 115150 attribute has a cardinality of 0 . . . 1 115152 meaning that for each instance of the SupplyReference 115110 entity there may be one StockSegmentationAllowedPropertyValueCombinationID 115150 attribute. The VendorPartyInternalID 115154 attribute has a cardinality of 0 . . . 1 115156 meaning that for each instance of the SupplyReference 115110 entity there may be one VendorPartyInternalID 115154 attribute. The ReceiptDate 115158 attribute has a cardinality of 0 . . . 1 115160 meaning that for each instance of the SupplyReference 115110 entity there may be one ReceiptDate 115158 attribute. The PurchaseOrderhemScheduleLineDeliveryDate 115162 attribute has a cardinality of 0 . . . 1 115164 meaning that for each instance of the SupplyReference 115110 entity there may be one PurchaseOrderhemScheduleLineDeliveryDate 115162 attribute. The PurchaseOrderItemConfirmationDeliveryDate 115166 attribute has a cardinality of 0 . . . 1 115168 meaning that for each instance of the SupplyReference 115110 entity there may be one PurchaseOrderItemConfirmationDeliveryDate 115166 attribute.

The Quantity 115170 entity has a cardinality of 0 . . . 1 115172 meaning that for each instance of the Item 115034 entity there may be one Quantity 115170 entity. The Quantity 115170 entity includes various attributes, namely an OpenQuantity 115174, a ReleasedAllocatedQuantity 115178, a ReservedAllocatedQuantity 115182 and a DeliveredQuantity 115186. The OpenQuantity 115174 attribute has a cardinality of 0 . . . 1 115176 meaning that for each instance of the Quantity 115170 entity there may be one OpenQuantity 115174 attribute. The ReleasedAllocatedQuantity 115178 attribute has a cardinality of 0 . . . 1 115180 meaning that for each instance of the Quantity 115170 entity there may be one ReleasedAllocatedQuantity 115178 attribute. The ReservedAllocatedQuantity 115182 attribute has a cardinality of 0 . . . 1 115184 meaning that for each instance of the Quantity 115170 entity there may be one ReservedAllocatedQuantity 115182 attribute. The DeliveredQuantity 115186 attribute has a cardinality of 0 . . . 1 115188 meaning that for each instance of the Quantity 115170 entity there may be one DeliveredQuantity 115186 attribute.

The Log 115190 package includes a Log 115192 entity. The Log 115192 entity has a cardinality of 1 115194 meaning that for each instance of the Log 115190 package there is one Log 115192 entity. The data types of the various packages, entities, and attributes are described with respect to FIGS. 109-1 through 109-11.

FIGS. 116-1 through 116-13 show an example configuration of an Element Structure that includes a MaterialSupplyAndDemandAllocationERPByElementsQueryMessage_sync 116000 package. The MaterialSupplyAndDemandAllocationERPByElementsQueryMessage_sync 116000 package includes a MaterialSupplyAndDemandAllocationERPByElementsQueryMessage_sync 116002 entity. The MaterialSupplyAndDemandAllocationERPByElementsQueryMessage_sync 116000 package includes a Selection 116004 package.

The Selection 116004 package includes various entities, namely an ItemBasicDataSelectionByElements 116006 and a ProcessingConditions 116292. The ItemBasicDataSelectionByElements 116006 entity has a cardinality of 1 116008 meaning that for each instance of the Selection 116004 package there is one ItemBasicDataSelectionByElements 116006 entity. The ItemBasicDataSelectionByElements 116006 entity includes various subordinate entities, namely a SelectionByID 116010, a SelectionByRequirementDocumentID 116030, a SelectionByRequirementSegmentationPropertyValueCombinationID 116050, a SelectionByProductionOrderID 116070, a SelectionByPurchaseOrderID 116090, a SelectionByBatchD 116110, a SelectionByVendorID 116130, a SelectionByStockSegmentationAllowedPropertyValueCombinationID 116150, a SelectionByMaterialSupplyAndDemandAllocationStatusCode 116170, a SelectionByProductID 116190, a SelectionByPhysicalPropertyValueCombinationID 116210, a SelectionByLocationID 116230, a SelectionBySoldtoParty 116250 and a SelectionByProductAvailabilityDate 116270.

The SelectionByID 116010 entity has a cardinality of 0 . . . N 116012 meaning that for each instance of the ItemBasicDataSelectionByElements 116006 entity there may be one or more SelectionByID 116010 entities. The SelectionByID 116010 entity includes various attributes, namely an InclusionExclusionCode 116014, an IntervalBoundaryTypeCode 116018, a LowerBoundaryMaterialSupplyAndDemandAllocationID 116022 and an UpperBoundaryMaterialSupplyAndDemandAllocationID 116026. The InclusionExclusionCode 116014 attribute has a cardinality of 0 . . . 1 116016 meaning that for each instance of the SelectionByID 116010 entity there may be one InclusionExclusionCode 116014 attribute. The IntervalBoundaryTypeCode 116018 attribute has a cardinality of 0 . . . 1 116020 meaning that for each instance of the SelectionByID 116010 entity there may be one IntervalBoundaryTypeCode 116018 attribute. The LowerBoundaryMaterialSupplyAndDemandAllocationID 116022 attribute has a cardinality of 0 . . . 1 116024 meaning that for each instance of the SelectionByID 116010 entity there may be one LowerBoundaryMaterialSupplyAndDemandAllocationID 116022 attribute. The UpperBoundaryMaterialSupplyAndDemandAllocationID 116026 attribute has a cardinality of 0 . . . 1 116028 meaning that for each instance of the SelectionByID 116010 entity there may be one UpperBoundaryMaterialSupplyAndDemandAllocationID 116026 attribute.

The SelectionByRequirementDocumentID 116030 entity has a cardinality of 0 . . . N 116032 meaning that for each instance of the ItemBasicDataSelectionByElements 116006 entity there may be one or more SelectionByRequirementDocumentID 116030 entities. The SelectionByRequirementDocumentID 116030 entity includes various attributes, namely an InclusionExclusionCode 116034, an IntervalBoundaryTypeCode 116038, a LowerBoundaryBusinessTransactionDocumentID 116042 and an UpperBoundaryBusinessTransactionDocumentID 116046. The InclusionExclusionCode 116034 attribute has a cardinality of 0 . . . 1 116036 meaning that for each instance of the SelectionByRequirementDocumentID 116030 entity there may be one InclusionExclusionCode 116034 attribute. The IntervalBoundaryTypeCode 116038 attribute has a cardinality of 0 . . . 1 116040 meaning that for each instance of the SelectionByRequirementDocumentID 116030 entity there may be one IntervalBoundaryTypeCode 116038 attribute. The LowerBoundaryBusinessTransactionDocumentID 116042 attribute has a cardinality of 0 . . . 1 116044 meaning that for each instance of the SelectionByRequirementDocumentID 116030 entity there may be one LowerBoundaryBusinessTransactionDocumentID 116042 attribute. The UpperBoundaryBusinessTransactionDocumentID 116046 attribute has a cardinality of 0 . . . 1 116048 meaning that for each instance of the SelectionByRequirementDocumentID 116030 entity there may be one UpperBoundaryBusinessTransactionDocumentID 116046 attribute.

The SelectionByRequirementSegmentationPropertyValueCombinationID 116050 entity has a cardinality of 0 . . . N 116052 meaning that for each instance of the ItemBasicDataSelectionByElements 116006 entity there may be one or more SelectionByRequirementSegmentationPropertyValueCombinationID 116050 entities. The SelectionByRequirementSegmentationPropertyValueCombinationID 116050 entity includes various attributes, namely an InclusionExclusionCode 116054, an IntervalBoundaryTypeCode 116058, a LowerBoundaryPropertyValueCombinationID 116062 and an UpperBoundaryPropertyValueCombinationID 116066. The InclusionExclusionCode 116054 attribute has a cardinality of 0 . . . 1 116056 meaning that for each instance of the SelectionByRequirementSegmentationPropertyValueCombinationID 116050 entity there may be one InclusionExclusionCode 116054 attribute. The IntervalBoundaryTypeCode 116058 attribute has a cardinality of 0 . . . 1 116060 meaning that for each instance of the SelectionByRequirementSegmentationPropertyValueCombinationID 116050 entity there may be one IntervalBoundaryTypeCode 116058 attribute. The LowerBoundaryPropertyValueCombinationID 116062 attribute has a cardinality of 0 . . . 1 116064 meaning that for each instance of the SelectionByRequirementSegmentationPropertyValueCombinationID 116050 entity there may be one LowerBoundaryPropertyValueCombinationID 116062 attribute. The UpperBoundaryPropertyValueCombinationID 116066 attribute has a cardinality of 0 . . . 1 116068 meaning that for each instance of the SelectionByRequirementSegmentationPropertyValueCombinationID 116050 entity there may be one UpperBoundaryPropertyValueCombinationID 116066 attribute.

The SelectionByProductionOrderID 116070 entity has a cardinality of 0 . . . N 116072 meaning that for each instance of the ItemBasicDataSelectionByElements 116006 entity there may be one or more SelectionByProductionOrderID 116070 entities. The SelectionByProductionOrderID 116070 entity includes various attributes, namely an InclusionExclusionCode 116074, an IntervalBoundaryTypeCode 116078, a LowerBoundaryBusinessTransactionDocumentID 116082 and an UpperBoundaryBusinessTransactionDocumentID 116086. The InclusionExclusionCode 116074 attribute has a cardinality of 0 . . . 1 116076 meaning that for each instance of the SelectionByProductionOrderID 116070 entity there may be one InclusionExclusionCode 116074 attribute. The IntervalBoundaryTypeCode 116078 attribute has a cardinality of 0 . . . 1 116080 meaning that for each instance of the SelectionByProductionOrderID 116070 entity there may be one IntervalBoundaryTypeCode 116078 attribute. The LowerBoundaryBusinessTransactionDocumentID 116082 attribute has a cardinality of 0 . . . 1 116084 meaning that for each instance of the SelectionByProductionOrderID 116070 entity there may be one LowerBoundaryBusinessTransactionDocumentID 116082 attribute. The UpperBoundaryBusinessTransactionDocumentID 116086 attribute has a cardinality of 0 . . . 1 116088 meaning that for each instance of the SelectionByProductionOrderID 116070 entity there may be one UpperBoundaryBusinessTransactionDocumentID 116086 attribute.

The SelectionByPurchaseOrderID 116090 entity has a cardinality of 0 . . . N 116092 meaning that for each instance of the ItemBasicDataSelectionByElements 116006 entity there may be one or more SelectionByPurchaseOrderID 116090 entities. The SelectionByPurchaseOrderID 116090 entity includes various attributes, namely an InclusionExclusionCode 116094, an IntervalBoundaryTypeCode 116098, a LowerBoundaryBusinessTransactionDocumentID 116102 and an UpperBoundaryBusinessTransactionDocumentID 116106. The InclusionExclusionCode 116094 attribute has a cardinality of 0 . . . 1 116096 meaning that for each instance of the SelectionByPurchaseOrderID 116090 entity there may be one InclusionExclusionCode 116094 attribute. The IntervalBoundaryTypeCode 116098 attribute has a cardinality of 0 . . . 1 116100 meaning that for each instance of the SelectionByPurchaseOrderID 116090 entity there may be one IntervalBoundaryTypeCode 116098 attribute. The LowerBoundaryBusinessTransactionDocumentID 116102 attribute has a cardinality of 0 . . . 1 116104 meaning that for each instance of the SelectionByPurchaseOrderID 116090 entity there may be one LowerBoundaryBusinessTransactionDocumentID 116102 attribute. The UpperBoundaryBusinessTransactionDocumentID 116106 attribute has a cardinality of 0 . . . 1 116108 meaning that for each instance of the SelectionByPurchaseOrderID 116090 entity there may be one UpperBoundaryBusinessTransactionDocumentID 116106 attribute.

The SelectionByBatchD 116110 entity has a cardinality of 0 . . . N 116112 meaning that for each instance of the ItemBasicDataSelectionByElements 116006 entity there may be one or more SelectionByBatchD 116110 entities. The SelectionByBatchD 116110 entity includes various attributes, namely an InclusionExclusionCode 116114, an IntervalBoundaryTypeCode 116118, a LowerBoundaryBusinessTransactionDocumentID 116122 and an UpperBoundaryBusinessTransactionDocumentID 116126. The InclusionExclusionCode 116114 attribute has a cardinality of 0 . . . 1 116116 meaning that for each instance of the SelectionByBatchD 116110 entity there may be one InclusionExclusionCode 116114 attribute.

The IntervalBoundaryTypeCode 116118 attribute has a cardinality of 0 . . . 1 116120 meaning that for each instance of the SelectionByBatchD 116110 entity there may be one IntervalBoundaryTypeCode 116118 attribute. The LowerBoundaryBusinessTransactionDocumentID 116122 attribute has a cardinality of 0 . . . 1 116124 meaning that for each instance of the SelectionByBatchD 116110 entity there may be one LowerBoundaryBusinessTransactionDocumentID 116122 attribute. The UpperBoundaryBusinessTransactionDocumentID 116126 attribute has a cardinality of 0 . . . 1 116128 meaning that for each instance of the SelectionByBatchD 116110 entity there may be one UpperBoundaryBusinessTransactionDocumentID 116126 attribute.

The SelectionByVendorID 116130 entity has a cardinality of 0 . . . N 116132 meaning that for each instance of the ItemBasicDataSelectionByElements 116006 entity there may be one or more SelectionByVendorID 116130 entities. The SelectionByVendorID 116130 entity includes various attributes, namely an InclusionExclusionCode 116134, an IntervalBoundaryTypeCode 116138, a LowerBoundaryBusinessTransactionDocumentID 116142 and an UpperBoundaryBusinessTransactionDocumentID 116146. The InclusionExclusionCode 116134 attribute has a cardinality of 0 . . . 1 116136 meaning that for each instance of the SelectionByVendorID 116130 entity there may be one InclusionExclusionCode 116134 attribute.

The IntervalBoundaryTypeCode 116138 attribute has a cardinality of 0 . . . 1 116140 meaning that for each instance of the SelectionByVendorID 116130 entity there may be one IntervalBoundaryTypeCode 116138 attribute. The LowerBoundaryBusinessTransactionDocumentID 116142 attribute has a cardinality of 0 . . . 1 116144 meaning that for each instance of the SelectionByVendorID 116130 entity there may be one LowerBoundaryBusinessTransactionDocumentID 116142 attribute. The UpperBoundaryBusinessTransactionDocumentID 116146 attribute has a cardinality of 0 . . . 1 116148 meaning that for each instance of the SelectionByVendorID 116130 entity there may be one UpperBoundaryBusinessTransactionDocumentID 116146 attribute.

The SelectionByStockSegmentationAllowedPropertyValueCombinationID 116150 entity has a cardinality of 0 . . . N 116152 meaning that for each instance of the ItemBasicDataSelectionByElements 116006 entity there may be one or more SelectionByStockSegmentationAllowedPropertyValueCombinationID 116150 entities. The SelectionByStockSegmentationAllowedPropertyValueCombinationID 116150 entity includes various attributes, namely an InclusionExclusionCode 116154, an IntervalBoundaryTypeCode 116158, a LowerBoundaryPropertyValueCombinationID 116162 and an UpperBoundaryPropertyValueCombinationID 116166. The InclusionExclusionCode 116154 attribute has a cardinality of 0 . . . 1 116156 meaning that for each instance of the SelectionByStockSegmentationAllowedPropertyValueCombinationID 116150 entity there may be one InclusionExclusionCode 116154 attribute. The IntervalBoundaryTypeCode 116158 attribute has a cardinality of 0 . . . 1 116160 meaning that for each instance of the SelectionByStockSegmentationAllowedPropertyValueCombinationID 116150 entity there may be one IntervalBoundaryTypeCode 116158 attribute. The LowerBoundaryPropertyValueCombinationID 116162 attribute has a cardinality of 0 . . . 1 116164 meaning that for each instance of the SelectionByStockSegmentationAllowedPropertyValueCombinationID 116150 entity there may be one LowerBoundaryPropertyValueCombinationID 116162 attribute. The UpperBoundaryPropertyValueCombinationID 116166 attribute has a cardinality of 0 . . . 1 116168 meaning that for each instance of the SelectionByStockSegmentationAllowedPropertyValueCombinationID 116150 entity there may be one UpperBoundaryPropertyValueCombinationID 116166 attribute.

The SelectionByMaterialSupplyAndDemandAllocation StatusCode 116170 entity has a cardinality of 0 . . . N 116172 meaning that for each instance of the ItemBasicDataSelectionByElements 116006 entity there may be one or more SelectionByMaterialSupplyAndDemandAllocationStatusCode 116170 entities. The SelectionByMaterialSupplyAndDemandAllocationStatusCode 116170 entity includes various attributes, namely an InclusionExclusionCode 116174, an IntervalBoundaryTypeCode 116178, a LowerBoundaryMaterialSupplyAndDemandAllocationitemStatusCode 116182 and an UpperBoundaryMaterialSupplyAndDemandAllocationitemStatusCode 116186. The InclusionExclusionCode 116174 attribute has a cardinality of 0 . . . 1 116176 meaning that for each instance of the SelectionByMaterialSupplyAndDemandAllocationStatusCode 116170 entity there may be one InclusionExclusionCode 116174 attribute. The IntervalBoundaryTypeCode 116178 attribute has a cardinality of 0 . . . 1 116180 meaning that for each instance of the SelectionByMaterialSupplyAndDemandAllocationStatusCode 116170 entity there may be one IntervalBoundaryTypeCode 116178 attribute. The LowerBoundaryMaterialSupplyAndDemandAllocationitemStatusCode 116182 attribute has a cardinality of 0 . . . 1 116184 meaning that for each instance of the SelectionByMaterialSupplyAndDemandAllocation StatusCode 116170 entity there may be one LowerBoundaryMaterialSupplyAndDemandAllocationhem StatusCode 116182 attribute. The UpperBoundaryMaterialSupplyAndDemandAllocationhemStatusCode 116186 attribute has a cardinality of 0 . . . 1 116188 meaning that for each instance of the SelectionBy MaterialSupplyAndDemandAllocationStatusCode 116170 entity there may be one UpperBoundaryMaterialSupplyAndDemand AllocationhemStatusCode 116186 attribute.

The SelectionByProductID 116190 entity has a cardinality of 0 . . . N 116192 meaning that for each instance of the ItemBasicDataSelectionByElements 116006 entity there may be one or more SelectionByProductID 116190 entities. The SelectionByProductID 116190 entity includes various attributes, namely an InclusionExclusionCode 116194, an IntervalBoundaryTypeCode 116198, a LowerBoundaryProductInternalID 116202 and an UpperBoundaryProductInternalID 116206. The InclusionExclusionCode 116194 attribute has a cardinality of 0 . . . 1 116196 meaning that for each instance of the SelectionByProductID 116190 entity there may be one InclusionExclusionCode 116194 attribute. The IntervalBoundaryTypeCode 116198 attribute has a cardinality of 0 . . . 1 116200 meaning that for each instance of the SelectionByProductID 116190 entity there may be one IntervalBoundaryTypeCode 116198 attribute. The LowerBoundaryProductInternalID 116202 attribute has a cardinality of 0 . . . 1 116204 meaning that for each instance of the SelectionByProductID 116190 entity there may be one LowerBoundaryProductInternalID 116202 attribute. The UpperBoundaryProductInternalID 116206 attribute has a cardinality of 0 . . . 1 116208 meaning that for each instance of the SelectionByProductID 116190 entity there may be one UpperBoundaryProductInternalID 116206 attribute.

The SelectionByPhysicalPropertyValueCombinationID 116210 entity has a cardinality of 0 . . . N 116212 meaning that for each instance of the ItemBasicDataSelectionByElements 116006 entity there may be one or more SelectionByPhysicalPropertyValueCombinationID 116210 entities. The SelectionByPhysicalPropertyValueCombinationID 116210 entity includes various attributes, namely an InclusionExclusionCode 116214, an IntervalBoundaryTypeCode 116218, a LowerBoundaryPropertyValueCombinationID 116222 and an UpperBoundaryPropertyValueCombinationID 116226. The InclusionExclusionCode 116214 attribute has a cardinality of 0 . . . 1 116216 meaning that for each instance of the SelectionByPhysicalPropertyValueCombinationID 116210 entity there may be one InclusionExclusionCode 116214 attribute. The IntervalBoundaryTypeCode 116218 attribute has a cardinality of 0 . . . 1 116220 meaning that for each instance of the SelectionByPhysicalPropertyValueCombinationID 116210 entity there may be one IntervalBoundaryTypeCode 116218 attribute. The LowerBoundaryPropertyValueCombinationID 116222 attribute has a cardinality of 0 . . . 1 116224 meaning that for each instance of the SelectionByPhysicalPropertyValueCombinationID 116210 entity there may be one LowerBoundaryPropertyValueCombinationID 116222 attribute. The UpperBoundaryPropertyValueCombinationID 116226 attribute has a cardinality of 0 . . . 1 116228 meaning that for each instance of the SelectionByPhysicalPropertyValueCombinationID 116210 entity there may be one UpperBoundaryPropertyValueCombinationID 116226 attribute.

The SelectionByLocationID 116230 entity has a cardinality of 0 . . . N 116232 meaning that for each instance of the ItemBasicDataSelectionByElements 116006 entity there may be one or more SelectionByLocationID 116230 entities. The SelectionByLocationID 116230 entity includes various attributes, namely an InclusionExclusionCode 116234, an IntervalBoundaryTypeCode 116238, a LowerBoundaryLocationInternalID 116242 and an UpperBoundaryLocationInternalID 116246. The InclusionExclusionCode 116234 attribute has a cardinality of 0 . . . 1 116236 meaning that for each instance of the SelectionByLocationID 116230 entity there may be one InclusionExclusionCode 116234 attribute. The IntervalBoundaryTypeCode 116238 attribute has a cardinality of 0 . . . 1 116240 meaning that for each instance of the SelectionByLocationID 116230 entity there may be one IntervalBoundaryTypeCode 116238 attribute. The LowerBoundaryLocationInternalID 116242 attribute has a cardinality of 0 . . . 1 116244 meaning that for each instance of the SelectionByLocationID 116230 entity there may be one LowerBoundaryLocationInternalID 116242 attribute. The UpperBoundaryLocationInternalID 116246 attribute has a cardinality of 0 . . . 1 116248 meaning that for each instance of the SelectionByLocationID 116230 entity there may be one UpperBoundaryLocationInternalID 116246 attribute.

The SelectionBySoldtoParty 116250 entity has a cardinality of 0 . . . N 116252 meaning that for each instance of the ItemBasicDataSelectionByElements 116006 entity there may be one or more SelectionBySoldtoParty 116250 entities. The SelectionBySoldtoParty 116250 entity includes various attributes, namely an InclusionExclusionCode 116254, an IntervalBoundaryTypeCode 116258, a LowerBoundaryPartyInternalID 116262 and an UpperBoundaryPartyInternalID 116266. The InclusionExclusionCode 116254 attribute has a cardinality of 0 . . . 1 116256 meaning that for each instance of the SelectionBySoldtoParty 116250 entity there may be one InclusionExclusionCode 116254 attribute. The Interval- BoundaryTypeCode 116258 attribute has a cardinality of 0 . . . 1 116260 meaning that for each instance of the SelectionBySoldtoParty 116250 entity there may be one IntervalBoundaryTypeCode 116258 attribute. The LowerBoundaryPartyInternalID 116262 attribute has a cardinality of 0 . . . 1 116264 meaning that for each instance of the SelectionBySoldtoParty 116250 entity there may be one LowerBoundaryPartyInternalID 116262 attribute. The UpperBoundaryPartyInternalID 116266 attribute has a cardinality of 0 . . . 1 116268 meaning that for each instance of the SelectionBySoldtoParty 116250 entity there may be one UpperBoundaryPartyInternalID 116266 attribute.

The SelectionByProductAvailabilityDate 116270 entity has a cardinality of 0 . . . N 116272 meaning that for each instance of the ItemBasicDataSelectionByElements 116006 entity there may be one or more SelectionByProductAvailabilityDate 116270 entities. The SelectionByProductAvailabilityDate 116270 entity includes various attributes, namely an InclusionExclusionCode 116274, an IntervalBoundaryTypeCode 116278, a LowerBoundaryDate 116282 and an UpperBoundaryDate 116286. The InclusionExclusionCode 116274 attribute has a cardinality of 0 . . . 1 116276 meaning that for each instance of the SelectionByProductAvailabilityDate 116270 entity there may be one InclusionExclusionCode 116274 attribute. The IntervalBoundaryTypeCode 116278 attribute has a cardinality of 0 . . . 1 116280 meaning that for each instance of the SelectionByProductAvailabilityDate 116270 entity there may be one IntervalBoundaryTypeCode 116278 attribute. The LowerBoundaryDate 116282 attribute has a cardinality of 0 . . . 1 116284 meaning that for each instance of the SelectionByProductAvailabilityDate 116270 entity there may be one LowerBoundaryDate 116282 attribute. The UpperBoundaryDate 116286 attribute has a cardinality of 0 . . . 1 116288 meaning that for each instance of the SelectionByProductAvailabilityDate 116270 entity there may be one UpperBoundaryDate 116286 attribute.

The ProcessingConditions 116292 entity has a cardinality of 0 . . . 1 116294 meaning that for each instance of the Selection 116004 package there may be one ProcessingConditions 116292 entity. The ProcessingConditions 116292 entity includes a QueryHitsMaximumNumberValue 116296 attribute. The QueryHitsMaximumNumberValue 116296 attribute has a cardinality of 1 116298 meaning that for each instance of the ProcessingConditions 116292 entity there is one QueryHitsMaximumNumberValue 116296 attribute. The data types of the various packages, entities, and attributes are described with respect to FIGS. 109-1 through 109-11.

FIGS. 117-1 through 117-6 show an example configuration of an Element Structure that includes a MaterialSupplyAndDemandAllocationERPByElementsResponseMessage_sync 117000 package. The MaterialSupplyAndDemandAllocationERPByElementsResponseMessage_sync 117000 package includes a MaterialSupplyAndDemandAllocationERPByElementsResponseMessage_sync 117002 entity. The MaterialSupplyAndDemandAllocationERPByElementsResponseMessage_sync 117000 package includes various packages, namely a MaterialSupplyAndDemandAllocationERP 117004, a ProcessingConditions 117102 and a Log 117116.

The MaterialSupplyAndDemandAllocationERP 117004 package includes a MaterialSupplyAndDemandAllocation 117006 entity. The MaterialSupplyAndDemandAllocation 117006 entity has a cardinality of 0 . . . n 117008 meaning that for each instance of the MaterialSupplyAndDemandAllocationERP 117004 package there may be one or more MaterialSupplyAndDemandAllocation 117006 entities. The MaterialSupplyAndDemandAllocation 117006 entity includes an ID 117010 attribute. The MaterialSupplyAndDemandAllocation 117006 entity includes an Item 117014 subordinate entity.

The ID 117010 attribute has a cardinality of 1 117012 meaning that for each instance of the MaterialSupplyAndDemandAllocation 117006 entity there is one ID 117010 attribute. The Item 117014 entity has a cardinality of 1 117016 meaning that for each instance of the MaterialSupplyAndDemandAllocation 117006 entity there is one Item 117014 entity. The Item 117014 entity includes various attributes, namely a ProductInternalID 117018, a PlantID 117022, a MaterialSupplyAndDemandAllocationStatusCode 117026 and a MaterialSupplyAndDemandAllocationStatusName 117030. The Item 117014 entity includes various subordinate entities, namely a DemandReference 117034 and a SupplyReference 117062.

The ProductInternalID 117018 attribute has a cardinality of 1 117020 meaning that for each instance of the Item 117014 entity there is one ProductInternalID 117018 attribute. The PlantID 117022 attribute has a cardinality of 1 117024 meaning that for each instance of the Item 117014 entity there is one PlantID 117022 attribute. The MaterialSupplyAndDemandAllocationStatusCode 117026 attribute has a cardinality of 1 117028 meaning that for each instance of the Item 117014 entity there is one MaterialSupplyAndDemandAllocationStatusCode 117026 attribute. The MaterialSupplyAndDemandAllocationStatusName 117030 attribute has a cardinality of 1 117032 meaning that for each instance of the Item 117014 entity there is one MaterialSupplyAndDemandAllocationStatusName 117030 attribute.

The DemandReference 117034 entity has a cardinality of 1 117036 meaning that for each instance of the Item 117014 entity there is one DemandReference 117034 entity. The DemandReference 117034 entity includes various attributes, namely an ID 117038, an ItemID 117042, an AlternateItemID 117046, a MaterialSupplyAndDemandTypeCode 117050, a MaterialSupplyAndDemandTypeName 117054 and a SoldtoPartyInternalID 117058. The ID 117038 attribute has a cardinality of 1 117040 meaning that for each instance of the DemandReference 117034 entity there is one ID 117038 attribute. The ItemID 117042 attribute has a cardinality of 1 117044 meaning that for each instance of the DemandReference 117034 entity there is one ItemID 117042 attribute. The AlternateItemID 117046 attribute has a cardinality of 1 117048 meaning that for each instance of the DemandReference 117034 entity there is one AlternateItemID 117046 attribute. The MaterialSupplyAndDemandTypeCode 117050 attribute has a cardinality of 1 117052 meaning that for each instance of the DemandReference 117034 entity there is one MaterialSupplyAndDemandTypeCode 117050 attribute. The MaterialSupplyAndDemandTypeName 117054 attribute has a cardinality of 1 117056 meaning that for each instance of the DemandReference 117034 entity there is one MaterialSupplyAndDemandTypeName 117054 attribute. The SoldtoPartyInternalID 117058 attribute has a cardinality of 0 . . . 1 117060 meaning that for each instance of the DemandReference 117034 entity there may be one SoldtoPartyInternalID 117058 attribute.

The SupplyReference 117062 entity has a cardinality of 0 . . . 1 117064 meaning that for each instance of the Item 117014 entity there may be one SupplyReference 117062 entity. The SupplyReference 117062 entity includes various attributes, namely an ID 117066, an ItemID 117070, an AlternateItemID 117074, a BatchID 117078, an InventoryManagedLocationInternalID 117082, a MaterialSupplyAndDemandTypeCode 117086, a MaterialSupplyAndDemandTypeName 117090, an InventorySpecialStockTypeCode 117094 and an InventorySpecialStockTypeName 117098. The ID 117066 attribute has a cardinality of 0 . . . 1 117068 meaning that for each instance of the SupplyReference 117062 entity there may be one ID 117066 attribute. The ItemID 117070 attribute has a cardinality of 0 . . . 1 117072 meaning that for each instance of the SupplyReference 117062 entity there may be one ItemID 117070 attribute. The AlternateItemID 117074 attribute has a cardinality of 0 . . . 1 117076 meaning that for each instance of the SupplyReference 117062 entity there may be one AlternateItemID 117074 attribute. The BatchID 117078 attribute has a cardinality of 0 . . . 1 117080 meaning that for each instance of the SupplyReference 117062 entity there may be one BatchID 117078 attribute. The InventoryManagedLocationInternalID 117082 attribute has a cardinality of 0 . . . 1 117084 meaning that for each instance of the SupplyReference 117062 entity there may be one InventoryManagedLocationInternalID 117082 attribute. The MaterialSupplyAndDemandTypeCode 117086 attribute has a cardinality of 0 . . . 1 117088 meaning that for each instance of the SupplyReference 117062 entity there may be one MaterialSupplyAndDemandTypeCode 117086 attribute. The MaterialSupplyAndDemandTypeName 117090 attribute has a cardinality of 0 . . . 1 117092 meaning that for each instance of the SupplyReference 117062 entity there may be one MaterialSupplyAndDemandTypeName 117090 attribute. The InventorySpecialStockTypeCode 117094 attribute has a cardinality of 0 . . . 1 117096 meaning that for each instance of the SupplyReference 117062 entity there may be one InventorySpecialStockTypeCode 117094 attribute. The InventorySpecialStockTypeName 117098 attribute has a cardinality of 0 . . . 1 117100 meaning that for each instance of the SupplyReference 117062 entity there may be one InventorySpecialStockTypeName 117098 attribute.

The ProcessingConditions 117102 package includes a ProcessingConditions 117104 entity. The ProcessingConditions 117104 entity has a cardinality of 0 . . . 1 117106 meaning that for each instance of the ProcessingConditions 117102 package there may be one ProcessingConditions 117104 entity. The ProcessingConditions 117104 entity includes various attributes, namely a ReturnedQueryHitsNumberValue 117108 and a MoreElementsAvailableIndicator 117112. The ReturnedQueryHitsNumberValue 117108 attribute has a cardinality of 1 117110 meaning that for each instance of the ProcessingConditions 117104 entity there is one ReturnedQueryHitsNumberValue 117108 attribute. The MoreElementsAvailableIndicator 117112 attribute has a cardinality of 1 117114 meaning that for each instance of the ProcessingConditions 117104 entity there is one MoreElementsAvailableIndicator 117112 attribute.

The Log 117116 package includes a Log 117118 entity. The Log 117118 entity has a cardinality of 1 117120 meaning that for each instance of the Log 117116 package there is one Log 117118 entity. The data types of the various packages, entities, and attributes are described with respect to FIGS. 109-1 through 109-11.

FIGS. 118-1 through 118-4 show an example configuration of an Element Structure that includes a MaterialSupplyAndDemandAllocationERPUpdateRequestMessage_sync 118000 package. The MaterialSupplyAndDemandAllocationERPUpdateRequestMessage_sync 118000 package includes a MaterialSupplyAndDemandAllocationERPUpdateRequestMessage_sync 118002 entity. The MaterialSupplyAndDemandAllocationERPUpdateRequestMessage_sync 118000 package includes various packages, namely a MessageHeader 118004 and a MaterialSupplyAndDemandAllocationERP 118010.

The MessageHeader 118004 package includes a MessageHeader 118006 entity. The MessageHeader 118006 entity has a cardinality of 0 . . . 1 118008 meaning that for each instance of the MessageHeader 118004 package there may be one MessageHeader 118006 entity.

The MaterialSupplyAndDemandAllocationERP 118010 package includes a MaterialSupplyAndDemandAllocation 118012 entity. The MaterialSupplyAndDemandAllocation 118012 entity has a cardinality of 1 118014 meaning that for each instance of the MaterialSupplyAndDemandAllocationERP 118010 package there is one MaterialSupplyAndDemandAllocation 118012 entity. The MaterialSupplyAndDemandAllocation 118012 entity includes various attributes, namely an ID 118016 and a ChangeStateID 118020. The MaterialSupplyAndDemandAllocation 118012 entity includes an Item 118024 subordinate entity. The ID 118016 attribute has a cardinality of 1 118018 meaning that for each instance of the MaterialSupplyAndDemandAllocation 118012 entity there is one ID 118016 attribute. The ChangeStateID 118020 attribute has a cardinality of 1 118022 meaning that for each instance of the MaterialSupplyAndDemandAllocation 118012 entity there is one ChangeStateID 118020 attribute.

The Item 118024 entity has a cardinality of 1 . . . n 118026 meaning that for each instance of the MaterialSupplyAndDemandAllocation 118012 entity there are one or more Item 118024 entities. The Item 118024 entity includes various attributes, namely a ProductInternalID 118028, a PlantID 118032 and a MaterialSupplyAndDemandAllocationStatusCode 118036. The Item 118024 entity includes various subordinate entities, namely a DemandReference 118040 and a SupplyReference 118060. The ProductInternalID 118028 attribute has a cardinality of 0 . . . 1 118030 meaning that for each instance of the Item 118024 entity there may be one ProductInternalID 118028 attribute. The PlantID 118032 attribute has a cardinality of 0 . . . 1 118034 meaning that for each instance of the Item 118024 entity there may be one PlantID 118032 attribute. The MaterialSupplyAndDemandAllocationStatusCode 118036 attribute has a cardinality of 1 118038 meaning that for each instance of the Item 118024 entity there is one MaterialSupplyAndDemandAllocationStatusCode 118036 attribute.

The DemandReference 118040 entity has a cardinality of 1 118042 meaning that for each instance of the Item 118024 entity there is one DemandReference 118040 entity. The DemandReference 118040 entity includes various attributes, namely an ID 118044, an ItemID 118048, an AlternateItemID 118052 and a SoldtoPartyInternalID 118056. The ID 118044 attribute has a cardinality of 1 118046 meaning that for each instance of the DemandReference 118040 entity there is one ID 118044 attribute. The ItemID 118048 attribute has a cardinality of 0 . . . 1 118050 meaning that for each instance of the DemandReference 118040 entity there may be one ItemID 118048 attribute. The AlternateItemID 118052 attribute has a cardinality of 0 . . . 1 118054 meaning that for each instance of the DemandReference 118040 entity there may be one AlternateItemID 118052 attribute. The SoldtoPartyInternalID 118056 attribute has a cardinality of 0 . . . 1 118058 meaning that for each instance of the DemandReference 118040 entity there may be one SoldtoPartyInternalID 118056 attribute.

The SupplyReference 118060 entity has a cardinality of 0 . . . 1 118062 meaning that for each instance of the Item 118024 entity there may be one SupplyReference 118060 entity. The SupplyReference 118060 entity includes various attributes, namely an ID 118064, an ItemID 118068, an AlternateItemID 118072, a BatchID 118076, an InventoryManagedLocationInternalID 118080, a MaterialSupplyAndDemandTypeCode 118084 and an InventorySpecialStockTypeCode 118088. The ID 118064 attribute has a cardinality of 0 . . . 1 118066 meaning that for each instance of the SupplyReference 118060 entity there may be one ID 118064 attribute. The ItemID 118068 attribute has a cardinality of 0 . . . 1 118070 meaning that for each instance of the SupplyReference 118060 entity there may be one ItemID 118068 attribute. The AlternateItemID 118072 attribute has a cardinality of 0 . . . 1 118074 meaning that for each instance of the SupplyReference 118060 entity there may be one AlternateItemID 118072 attribute. The BatchID 118076 attribute has a cardinality of 0 . . . 1 118078 meaning that for each instance of the SupplyReference 118060 entity there may be one BatchID 118076 attribute. The InventoryManagedLocationInternalID 118080 attribute has a cardinality of 0 . . . 1 118082 meaning that for each instance of the SupplyReference 118060 entity there may be one InventoryManagedLocationInternalID 118080 attribute. The MaterialSupplyAndDemandTypeCode 118084 attribute has a cardinality of 0 . . . 1 118086 meaning that for each instance of the SupplyReference 118060 entity there may be one MaterialSupplyAndDemandTypeCode 118084 attribute. The InventorySpecialStockTypeCode 118088 attribute has a cardinality of 0 . . . 1 118090 meaning that for each instance of the SupplyReference 118060 entity there may be one InventorySpecialStockTypeCode 118088 attribute. The data types of the various packages, entities, and attributes are described with respect to FIGS. 109-1 through 109-11.

FIG. 119 shows an example configuration of an Element Structure that includes a MaterialSupplyAndDemandAllocationERPUpdateConfirmationMessage_sync 119000 package. The MaterialSupplyAndDemandAllocationERPUpdateConfirmationMessage_sync 119000 package includes a MaterialSupplyAndDemandAllocationERPUpdateConfirmationMessage_sync 119002 entity. The MaterialSupplyAndDemandAllocationERPUpdateConfirmationMessage_sync 119000 package includes various packages, namely a MessageHeader 119004 and a Log 119010.

The MessageHeader 119004 package includes a MessageHeader 119006 entity. The MessageHeader 119006 entity has a cardinality of 0 . . . 1 119008 meaning that for each instance of the MessageHeader 119004 package there may be one MessageHeader 119006 entity.

The Log 119010 package includes a Log 119012 entity. The Log 119012 entity has a cardinality of 1 119014 meaning that for each instance of the Log 119010 package there is one Log 119012 entity. The data types of the various packages, entities, and attributes are described with respect to FIGS. 109-1 through 109-11.

FIGS. 120-1 through 120-3 show an example configuration of an Element Structure that includes a MaterialSupplyAndDemandAllocationERPCreateCheckQueryMessage_sync 120000 package. The MaterialSupplyAndDemandAllocationERPCreateCheckQueryMessage_sync 120000 package includes a MaterialSupplyAndDemandAllocationERPCreateCheckQueryMessage_sync 120002 entity. The MaterialSupplyAndDemandAllocationERPCreateCheckQueryMessage_sync 120000 package includes a MaterialSupplyAndDemandAllocationERP 120004 package.

The MaterialSupplyAndDemandAllocationERP 120004 package includes a MaterialSupplyAndDemandAllocation 120006 entity. The MaterialSupplyAndDemandAllocation 120006 entity has a cardinality of 1 120008 meaning that for each instance of the MaterialSupplyAndDemandAllocationERP 120004 package there is one MaterialSupplyAndDemandAllocation 120006 entity. The MaterialSupplyAndDemandAllocation 120006 entity includes a ProcessingTypeCode 120010 attribute. The MaterialSupplyAndDemandAllocation 120006 entity includes an Item 120014 subordinate entity. The ProcessingTypeCode 120010 attribute has a cardinality of 1 120012 meaning that for each instance of the MaterialSupplyAndDemandAllocation 120006 entity there is one ProcessingTypeCode 120010 attribute.

The Item 120014 entity has a cardinality of 1 . . . n 120016 meaning that for each instance of the MaterialSupplyAndDemandAllocation 120006 entity there are one or more Item 120014 entities. The Item 120014 entity includes various subordinate entities, namely a DemandReference 120018, a SupplyReference 120034 and a Quantity 120058.

The DemandReference 120018 entity has a cardinality of 1 120020 meaning that for each instance of the Item 120014 entity there is one DemandReference 120018 entity. The DemandReference 120018 entity includes various attributes, namely an ID 120022, an ItemID 120026 and an AlternateItemID 120030. The ID 120022 attribute has a cardinality of 1 120024 meaning that for each instance of the DemandReference 120018 entity there is one ID 120022 attribute. The ItemID 120026 attribute has a cardinality of 0 . . . 1 120028 meaning that for each instance of the DemandReference 120018 entity there may be one ItemID 120026 attribute. The AlternateItemID 120030 attribute has a cardinality of 0 . . . 1 120032 meaning that for each instance of the DemandReference 120018 entity there may be one AlternateItemID 120030 attribute.

The SupplyReference 120034 entity has a cardinality of 0 . . . 1 120036 meaning that for each instance of the Item 120014 entity there may be one SupplyReference 120034 entity. The SupplyReference 120034 entity includes various attributes, namely an ID 120038, a BatchID 120042, an InventoryManagedLocationInternalID 120046, a MaterialSupplyAndDemandTypeCode 120050 and an InventorySpecialStockTypeCode 120054. The ID 120038 attribute has a cardinality of 0 . . . 1 120040 meaning that for each instance of the SupplyReference 120034 entity there may be one ID 120038 attribute. The BatchID 120042 attribute has a cardinality of 0 . . . 1 120044 meaning that for each instance of the SupplyReference 120034 entity there may be one BatchID 120042 attribute. The InventoryManagedLocationInternalID 120046 attribute has a cardinality of 0 . . . 1 120048 meaning that for each instance of the SupplyReference 120034 entity there may be one InventoryManagedLocationInternalID 120046 attribute. The MaterialSupplyAndDemandTypeCode 120050 attribute has a cardinality of 0 . . . 1 120052 meaning that for each instance of the SupplyReference 120034 entity there may be one MaterialSupplyAndDemandTypeCode 120050 attribute. The InventorySpecialStockTypeCode 120054 attribute has a cardinality of 0 . . . 1 120056 meaning that for each instance of the SupplyReference 120034 entity there may be one InventorySpecialStockTypeCode 120054 attribute.

The Quantity 120058 entity has a cardinality of 0 . . . 1 120060 meaning that for each instance of the Item 120014 entity there may be one Quantity 120058 entity. The Quantity 120058 entity includes an OpenQuantity 120062 attribute. The OpenQuantity 120062 attribute has a cardinality of 0 . . . 1 120064 meaning that for each instance of the Quantity 120058 entity there may be one OpenQuantity 120062 attribute. The data types of the various packages, entities, and attributes are described with respect to FIGS. 109-1 through 109-11.

FIGS. 121-1 through 121-9 show an example configuration of an Element Structure that includes a MaterialSupplyAndDemandAllocationERPCreateCheckResponseMessage_sync 121000 package. The MaterialSupplyAndDemandAllocationERPCreateCheckResponseMessage_sync 121000 package includes a MaterialSupplyAndDemandAllocationERPCreateCheckResponseMessage_sync 121002 entity. The MaterialSupplyAndDemandAllocationERPCreateCheckResponseMessage_sync 121000 package includes various packages, namely a MaterialSupplyAndDemandAllocationERP 121004 and a Log 121190.

The MaterialSupplyAndDemandAllocationERP 121004 package includes a MaterialSupplyAndDemandAllocation 121006 entity. The MaterialSupplyAndDemandAllocation 121006 entity has a cardinality of 0 . . . 1 121008 meaning that for each instance of the MaterialSupplyAndDemandAllocationERP 121004 package there may be one MaterialSupplyAndDemandAllocation 121006 entity. The MaterialSupplyAndDemandAllocation 121006 entity includes various attributes, namely a ProcessingTypeCode 121010 and a ProcessingTypeName 121014. The MaterialSupplyAndDemandAllocation 121006 entity includes various subordinate entities, namely a SystemAdministrativeData 121018 and an Item 121034. The ProcessingTypeCode 121010 attribute has a cardinality of 1 121012 meaning that for each instance of the MaterialSupplyAndDemandAllocation 121006 entity there is one ProcessingTypeCode 121010 attribute. The ProcessingTypeName 121014 attribute has a cardinality of 1 121016 meaning that for each instance of the MaterialSupplyAndDemandAllocation 121006 entity there is one ProcessingTypeName 121014 attribute.

The SystemAdministrativeData 121018 entity has a cardinality of 1 121020 meaning that for each instance of the MaterialSupplyAndDemandAllocation 121006 entity there is one SystemAdministrativeData 121018 entity. The SystemAdministrativeData 121018 entity includes various attributes, namely a CreationDate 121022, a CreationUserAccountID 121026 and a LastChangeDate 121030. The CreationDate 121022 attribute has a cardinality of 0 . . . 1 121024 meaning that for each instance of the SystemAdministrativeData 121018 entity there may be one CreationDate 121022 attribute. The CreationUserAccountID 121026 attribute has a cardinality of 1 121028 meaning that for each instance of the SystemAdministrativeData 121018 entity there is one CreationUserAccountID 121026 attribute. The LastChangeDate 121030 attribute has a cardinality of 0 . . . 1 121032 meaning that for each instance of the SystemAdministrativeData 121018 entity there may be one LastChangeDate 121030 attribute.

The Item 121034 entity has a cardinality of 0 . . . n 121036 meaning that for each instance of the MaterialSupplyAndDemandAllocation 121006 entity there may be one or more Item 121034 entities. The Item 121034 entity includes various attributes, namely a ProductInternalID 121038, a PhysicalPropertyValueCombinationID 121042, a PlantID 121046, a MaterialSupplyAndDemandAllocationStatusCode 121050, a MaterialSupplyAndDemandAllocationStatusName 121054, a MaterialSupplyAndDemandAllocationUserStatusCode 121058 and a MaterialSupplyAndDemandAllocationUserStatusName 121062. The Item 121034 entity includes various subordinate entities, namely a DemandReference 121066, a SupplyReference 121110 and a Quantity 121170. The ProductInternalID 121038 attribute has a cardinality of 1 121040 meaning that for each instance of the Item 121034 entity there is one ProductInternalID 121038 attribute. The PhysicalPropertyValueCombinationID 121042 attribute has a cardinality of 0 . . . 1 121044 meaning that for each instance of the Item 121034 entity there may be one PhysicalPropertyValueCombinationID 121042 attribute. The PlantID 121046 attribute has a cardinality of 1 121048 meaning that for each instance of the Item 121034 entity there is one PlantID 121046 attribute. The MaterialSupplyAndDemandAllocationStatusCode 121050 attribute has a cardinality of 1 121052 meaning that for each instance of the Item 121034 entity there is one MaterialSupplyAndDemandAllocationStatusCode 121050 attribute. The MaterialSupplyAndDemandAllocationStatusName 121054 attribute has a cardinality of 1 121056 meaning that for each instance of the Item 121034 entity there is one MaterialSupplyAndDemandAllocationStatusName 121054 attribute. The MaterialSupplyAndDemandAllocationUserStatusCode 121058 attribute has a cardinality of 0 . . . 1 121060 meaning that for each instance of the Item 121034 entity there may be one MaterialSupplyAndDemandAllocationUserStatusCode 121058 attribute. The MaterialSupplyAndDemandAllocationUserStatusName 121062 attribute has a cardinality of 0 . . . 1 121064 meaning that for each instance of the Item 121034 entity there may be one MaterialSupplyAndDemandAllocationUserStatusName 121062 attribute.

The DemandReference 121066 entity has a cardinality of 1 121068 meaning that for each instance of the Item 121034 entity there is one DemandReference 121066 entity. The DemandReference 121066 entity includes various attributes, namely an ID 121070, an ItemID 121074, an AlternateItemID 121078, a MaterialSupplyAndDemandTypeCode 121082, a MaterialSupplyAndDemandTypeName 121086, a RequirementSegmentationPropertyValueCombinationID 121090, a SoldtoPartyInternalID 121094, a ShiptoPartyInternalID 121098, a ProductAvailabilityDate 121102 and a SalesOrderItemScheduleLineDate 121106. The ID 121070 attribute has a cardinality of 1 121072 meaning that for each instance of the DemandReference 121066 entity there is one ID 121070 attribute. The ItemID 121074 attribute has a cardinality of 1 121076 meaning that for each instance of the DemandReference 121066 entity there is one ItemID 121074 attribute. The AlternateItemID 121078 attribute has a cardinality of 1 121080 meaning that for each instance of the DemandReference 121066 entity there is one AlternateItemID 121078 attribute. The MaterialSupplyAndDemandTypeCode 121082 attribute has a cardinality of 1 121084 meaning that for each instance of the DemandReference 121066 entity there is one MaterialSupplyAndDemandTypeCode 121082 attribute. The MaterialSupplyAndDemandTypeName 121086 attribute has a cardinality of 1 121088 meaning that for each instance of the DemandReference 121066 entity there is one MaterialSupplyAndDemandTypeName 121086 attribute. The RequirementSegmentationPropertyValueCombinationID 121090 attribute has a cardinality of 0 . . . 1 121092 meaning that for each instance of the DemandReference 121066 entity there may be one RequirementSegmentationPropertyValueCombinationID 121090 attribute. The SoldtoPartyInternalID 121094 attribute has a cardinality of 0 . . . 1 121096 meaning that for each instance of the DemandReference 121066 entity there may be one SoldtoPartyInternalID 121094 attribute. The ShiptoPartyInternalID 121098 attribute has a cardinality of 0 . . . 1 121100 meaning that for each instance of the DemandReference 121066 entity there may be one ShiptoPartyInternalID 121098 attribute. The ProductAvailabilityDate 121102 attribute has a cardinality of 0 . . . 1 121104 meaning that for each instance of the DemandReference 121066 entity there may be one ProductAvailabilityDate 121102 attribute. The SalesOrderItemScheduleLineDate 121106 attribute has a cardinality of 0 . . . 1 121108 meaning that for each instance of the DemandReference 121066 entity there may be one SalesOrderItemScheduleLineDate 121106 attribute.

The SupplyReference 121110 entity has a cardinality of 0 . . . 1 121112 meaning that for each instance of the Item 121034 entity there may be one SupplyReference 121110 entity. The SupplyReference 121110 entity includes various attributes, namely an ID 121114, an ItemID 121118, an AlternateItemID 121122, a BatchID 121126, an InventoryManagedLocationInternalID 121130, a MaterialSupplyAndDemandTypeCode 121134, a MaterialSupplyAndDemandTypeName 121138, an InventorySpecialStockTypeCode 121142, an InventorySpecialStockTypeName 121146, a StockSegmentationAllowedPropertyValueCombinationID 121150, a VendorPartyInternalID 121154, a ReceiptDate 121158, a PurchaseOrderItemScheduleLineDeliveryDate 121162 and a PurchaseOrderItemConfirmationDeliveryDate 121166. The ID 121114 attribute has a cardinality of 0 . . . 1 121116 meaning that for each instance of the SupplyReference 121110 entity there may be one ID 121114 attribute. The ItemID 121118 attribute has a cardinality of 0 . . . 1 121120 meaning that for each instance of the SupplyReference 121110 entity there may be one ItemID 121118 attribute. The AlternateItemID 121122 attribute has a cardinality of 0 . . . 1 121124 meaning that for each instance of the SupplyReference 121110 entity there may be one AlternateItemID 121122 attribute. The BatchID 121126 attribute has a cardinality of 0 . . . 1 121128 meaning that for each instance of the SupplyReference 121110 entity there may be one BatchID 121126 attribute. The InventoryManagedLocationInternalID 121130 attribute has a cardinality of 0 . . . 1 121132 meaning that for each instance of the SupplyReference 121110 entity there may be one InventoryManagedLocationInternalID 121130 attribute. The MaterialSupplyAndDemandTypeCode 121134 attribute has a cardinality of 0 . . . 1 121136 meaning that for each instance of the SupplyReference 121110 entity there may be one MaterialSupplyAndDemandTypeCode 121134 attribute. The MaterialSupplyAndDemandTypeName 121138 attribute has a cardinality of 0 . . . 1 121140 meaning that for each instance of the SupplyReference 121110 entity there may be one MaterialSupplyAndDemandTypeName 121138 attribute. The InventorySpecialStockTypeCode 121142 attribute has a cardinality of 0 . . . 1 121144 meaning that for each instance of the SupplyReference 121110 entity there may be one InventorySpecialStockTypeCode 121142 attribute. The InventorySpecialStockTypeName 121146 attribute has a cardinality of 0 . . . 1 121148 meaning that for each instance of the SupplyReference 121110 entity there may be one InventorySpecialStockTypeName 121146 attribute. The StockSegmentationAllowedPropertyValueCombinationID 121150 attribute has a cardinality of 0 . . . 1 121152 meaning that for each instance of the SupplyReference 121110 entity there may be one StockSegmentationAllowedPropertyValueCombinationID 121150 attribute. The VendorPartyInternalID 121154 attribute has a cardinality of 0 . . . 1 121156 meaning that for each instance of the SupplyReference 121110 entity there may be one VendorPartyInternalID 121154 attribute. The ReceiptDate 121158 attribute has a cardinality of 0 . . . 1 121160 meaning that for each instance of the SupplyReference 121110 entity there may be one ReceiptDate 121158 attribute. The PurchaseOrderhemScheduleLineDeliveryDate 121162 attribute has a cardinality of 0 . . . 1 121164 meaning that for each instance of the SupplyReference 121110 entity there may be one PurchaseOrderhemScheduleLineDeliveryDate 121162 attribute. The PurchaseOrderItemConfirmationDeliveryDate 121166 attribute has a cardinality of 0 . . . 1 121168 meaning that for each instance of the SupplyReference 121110 entity there may be one PurchaseOrderItemConfirmationDeliveryDate 121166 attribute.

The Quantity 121170 entity has a cardinality of 0 . . . 1 121172 meaning that for each instance of the Item 121034 entity there may be one Quantity 121170 entity. The Quantity 121170 entity includes various attributes, namely an OpenQuantity 121174, a ReleasedAllocatedQuantity 121178, a ReservedAllocatedQuantity 121182 and a DeliveredQuantity 121186. The OpenQuantity 121174 attribute has a cardinality of 0 . . . 1 121176 meaning that for each instance of the Quantity 121170 entity there may be one OpenQuantity 121174 attribute. The ReleasedAllocatedQuantity 121178 attribute has a cardinality of 0 . . . 1 121180 meaning that for each instance of the Quantity 121170 entity there may be one ReleasedAllocatedQuantity 121178 attribute. The ReservedAllocatedQuantity 121182 attribute has a cardinality of 0 . . . 1 121184 meaning that for each instance of the Quantity 121170 entity there may be one ReservedAllocatedQuantity 121182 attribute. The DeliveredQuantity 121186 attribute has a cardinality of 0 . . . 1 121188 meaning that for each instance of the Quantity 121170 entity there may be one DeliveredQuantity 121186 attribute.

The Log 121190 package includes a Log 121192 entity. The Log 121192 entity has a cardinality of 1 121194 meaning that for each instance of the Log 121190 package there is one Log 121192 entity. The data types of the various packages, entities, and attributes are described with respect to FIG. 121.

A number of implementations have been described. Nevertheless, it will be understood that various modifications may be made without departing from the spirit and scope of the disclosure. Accordingly, other implementations are within the scope of the following claims.

What is claimed is:

1. A non-transitory computer readable medium including program code for providing a message-based interface for performing a financial instrument exposure profile analytical result service, the medium comprising:

program code for receiving via a message-based interface derived from a common business object model, where the common business object model includes business objects having relationships that enable derivation of message-based interfaces and message packages, the message-based interface exposing at least one service as defined in a service registry and from a heterogeneous application executing in an environment of computer systems providing message-based services, a first message for requesting creation of a financial instrument exposure profile analytical result, where the financial instrument exposure profile analytical result comprises an analytical result of an exposure profile calculation of a financial instrument, the first message including a first message package derived from the common business object model, the first message package hierarchically organized in memory, the hierarchical organization of the first message package including:

at the first hierarchical level within the first message package, a financial instrument exposure profile analytical result create request message entity; and at the first hierarchical level within the first message package, a financial instrument exposure profile analytical result package, where the financial instrument exposure profile analytical result package includes, at a second hierarchical level within the first message package, a financial instrument exposure profile analytical result entity, where the financial instrument exposure profile analytical result entity includes, at a third hierarchical level within the first message package, an identifier (ID), a group ID, a key date, and a creation date time;

program code for processing the first message based on the hierarchical organization of the first message package, where processing the first message includes unpacking the first message package based the first message package's structure and the first message package's derivation from on the common business object model, wherein the particular structure of the first message package is used at least in part to identify the purpose of the first message; and program code for sending a second message to the heterogeneous application responsive to the first message, where the second message includes a second message package derived from the common business object model to provide consistent semantics with the first message package.

2. The medium of claim 1, wherein the financial instrument exposure profile analytical result package further includes, at the second hierarchical level within the first message package, an item package, where the item package includes, at the third hierarchical level within the first message package, at least one item entity and a property package, where each item entity includes, at a fourth hierarchical level within the first message package, a date, and where each property package includes, at the fourth hierarchical level within the first message package, at least one property entity, and where each property entity includes, at a fifth hierarchical level within the first message package, an ID and a value.

3. The medium of claim 1, wherein the financial instrument exposure profile analytical result entity further includes, at the third hierarchical level within the first message package, at least one of a financial instrument ID, a financial instrument category code, a standardized financial instrument account ID, and a maximum original maturity duration.

4. A distributed system operating in a plurality of computer systems providing message-based services defined in a service registry, the system comprising:

at least one processor operable to execute computer readable instructions embodied on non-transitory media;

a graphical user interface executable by the at least one processor and comprising computer readable instructions, embedded on non-transitory media, for requesting creation of a financial instrument exposure profile analytical result, where the financial instrument exposure profile analytical result comprises an analytical result of an exposure profile calculation of a financial instrument, using a request;

a first memory storing a user interface controller executable by the at least one processor for processing the request and involving a message including a message package, derived from a common business object model, where the common business object model includes business objects having relationships that enable derivation of message-based service interfaces and message packages, the message package hierarchically organized, the hierarchical organization of the first message package including:

at a first hierarchical level within the first message package, a financial instrument exposure profile analytical result package, where the financial instrument exposure profile analytical result package includes, at a second hierarchical level within the first message package, a financial instrument exposure profile analytical result entity, where the financial instrument exposure profile analytical result entity includes, at a third hierarchical level within the first message package, an identifier (ID), a group ID, a key date, and a creation date time;

a second memory, remote from the graphical user interface, storing a plurality of service interfaces executable by the at least one processor and derived from the common business object model to provide consistent semantics with messages derived from the common business object model, where one of the message-based service interfaces processes the message based on the hierarchical organization of the message package, where processing the message includes unpacking the first message package based on the message package's structure and the message package's derivation from the common business object model, wherein the particular structure of the message package is used at least in part to identify the purpose of the message.

5. The distributed system of claim 4, wherein the first memory is remote from the graphical user interface.

6. The distributed system of claim 4, wherein the first memory is remote from the second memory.

* * * * *